US010703768B2

(12) United States Patent
Sung et al.

(10) Patent No.: US 10,703,768 B2
(45) Date of Patent: Jul. 7, 2020

(54) COMPOUND AND COLOR CONVERSION FILM COMPRISING SAME

(71) Applicant: LG CHEM, LTD., Seoul (KR)

(72) Inventors: Jiyeon Sung, Daejeon (KR); Hoyong Lee, Daejeon (KR); Cheol Jun Song, Daejeon (KR)

(73) Assignee: LG CHEM, LTD., Seoul (KR)

(*) Notice: Subject to any disclaimer, the term of this patent is extended or adjusted under 35 U.S.C. 154(b) by 0 days.

(21) Appl. No.: 16/069,863

(22) PCT Filed: Mar. 8, 2017

(86) PCT No.: PCT/KR2017/002494

§ 371 (c)(1),
(2) Date: Jul. 12, 2018

(87) PCT Pub. No.: WO2017/155297

PCT Pub. Date: Sep. 14, 2017

(65) Prior Publication Data

US 2019/0062348 A1 Feb. 28, 2019

(30) Foreign Application Priority Data

Mar. 8, 2016 (KR) ........................ 10-2016-0027736

(51) Int. Cl.

| | |
|---|---|
| *C07F 5/02* | (2006.01) |
| *G02B 5/22* | (2006.01) |
| *C09K 11/06* | (2006.01) |
| *F21V 8/00* | (2006.01) |

(Continued)

(52) U.S. Cl.

CPC ................ *C07F 5/022* (2013.01); *C07F 5/02* (2013.01); *G02B 6/005* (2013.01); *G02B 6/0031* (2013.01); *G02B 6/0046* (2013.01); *G02B 6/0055* (2013.01); *G02F 2001/133614* (2013.01)

(58) Field of Classification Search

CPC ....... C07F 5/022; G02B 6/005; G02B 6/0031; G02B 6/0046; G02B 6/0055; C09K 11/02; C09K 11/06; C09K 2211/1011; C09K 2211/1022; C09K 2211/1007; C08K 5/55; F21V 9/16; F21V 8/00; F21K 9/64

See application file for complete search history.

(56) References Cited

U.S. PATENT DOCUMENTS

| | | | | |
|---|---|---|---|---|
| 2011/0303903 | A1 | 12/2011 | Yoshinaga et al. | |
| 2017/0349822 | A1* | 12/2017 | Lee | C07F 5/02 |
| 2018/0134952 | A1 | 5/2018 | Ichihashi et al. | |

FOREIGN PATENT DOCUMENTS

| | | |
|---|---|---|
| JP | 2010-040735 | 2/2010 |
| JP | 2010-061824 | 3/2010 |
| JP | 4827434 | 11/2011 |

(Continued)

OTHER PUBLICATIONS

Pena-Cabrera, E. et al., "Simple, General, and Efficient Synthesis of Meso-Subsituted Borondipyrromethenes from Single Platform," Organic Letters 9(20); 3985-3988 (2007).

(Continued)

*Primary Examiner* — Bijan Ahvazi
(74) *Attorney, Agent, or Firm* — Dentons US LLP

(57) ABSTRACT

The present specification relates to a compound represented by Chemical Formula 1, and a color conversion film, a backlight unit and a display apparatus including the same.

11 Claims, 1 Drawing Sheet

(51) Int. Cl.
*F21K 9/64* (2016.01)
*G02F 1/13357* (2006.01)

(56) References Cited

FOREIGN PATENT DOCUMENTS

| | | |
|---|---|---|
| JP | 2011-241160 | 12/2011 |
| KR | 10-2000-0011622 | 2/2000 |
| KR | 10-1590299 | 2/2016 |
| KR | 10-2016-0027736 | 3/2016 |
| WO | 2016190283 | 7/2017 |

OTHER PUBLICATIONS

Findlay et al., "An Organic Down-Converting Material for White-Light Emission from Hybrid LEDs," Adv. Mater. 26: 7290-7294 (2014).

Tobisu et al., "Palladium(II)-catalyzed synthesis of dibenzothiophene derivatives via the cleavage of carbon-sulfur and carbon-hydrogen bonds," Chem Sci. 7: 2587-2591 (2016).

International Search Report and the Written Opinion of PCT/KR2017/002494, dated Jun. 16, 2017.

Office Action of Taiwanese Patent Office in Appl'n No. 106107505 dated Sep. 19, 2017.

Office Action of Taiwanese Patent Office in Appl'n No. 106107505 dated Feb. 12, 2018.

* cited by examiner

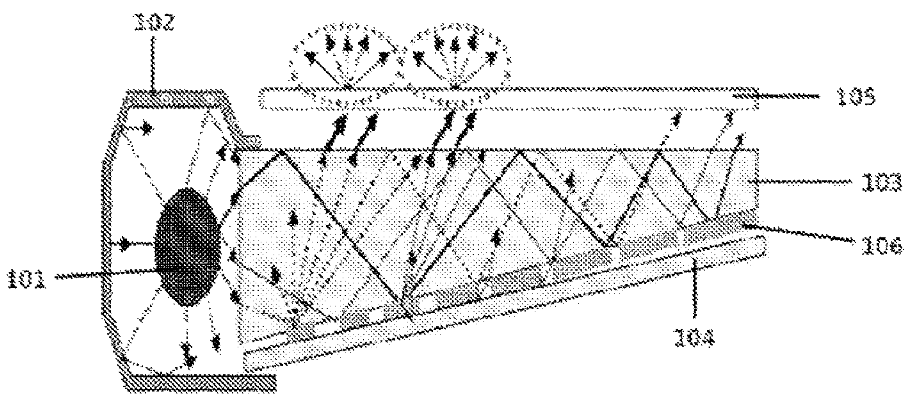
102
105
103
106
101
104

COMPOUND AND COLOR CONVERSION FILM COMPRISING SAME

TECHNICAL FIELD

This application is a National Stage Application of International Application No. PCT/KR2017/002494 filed on Mar. 8, 2017, which claims priority to and the benefits of Korean Patent Application No. 10-2016-0027736, filed with the Korean Intellectual Property Office on Mar. 8, 2016, both of which are incorporated herein in their entirety by reference for all purposes as if fully set forth herein.

TECHNICAL FIELD

The present disclosure relates to a novel compound, and a color conversion film, a backlight unit and a display apparatus including the same.

BACKGROUND ART

Existing light emitting diodes (LED) are obtained by mixing a green phosphorescent substance and a red phosphorescent substance to a blue light emitting diode, or mixing a yellow phosphorescent substance and a blue-green phosphorescent substance to a UV light emitting diode. However, with such a method, it is difficult to control colors, and therefore, color rendering is not favorable. Accordingly, color gamut declines.

In order to overcome such color gamut decline and reduce production costs, methods of obtaining green and red in a manner of filming quantum dots and binding the dots to a blue LED have been recently tried. However, cadmium series quantum dots have safety problems, and other quantum dots have significantly decreased efficiency compared to cadmium series quantum dots. In addition, quantum dots have reduced stability for oxygen and water, and have a disadvantage in that the performance is significantly degraded when aggregated. Furthermore, unit costs of production are high since, when producing quantum dots, maintaining the sizes is difficult.

PRIOR ART DOCUMENTS

Patent Documents

Korean Patent Application Laid-Open Publication No. 2000-0011622

DISCLOSURE

Technical Problem

The present specification provides a novel compound, and a color conversion film, a backlight unit and a display apparatus including the same.

Technical Solution

One embodiment of the present specification provides a compound represented by the following Chemical Formula 1.

[Chemical Formula 1]

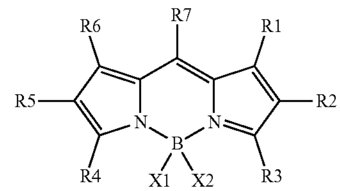

In Chemical Formula 1,

X1 and X2 are the same as or different from each other, and each independently a halogen group; a nitrile group; a substituted or unsubstituted alkyl group; or a substituted or unsubstituted alkoxy group, R1, R3, R4 and R6 are the same as or different from each other, and each independently a substituted or unsubstituted aryl group; or a substituted or unsubstituted heteroaryl group, R2 and R5 are the same as or different from each other, and each independently hydrogen; deuterium; halogen; a nitrile group; a nitro group; a hydroxyl group; a carboxyl group (—COOH); an ether group; an ester group; an imide group; an amide group; a substituted or unsubstituted alkyl group; a substituted or unsubstituted cycloalkyl group; a substituted or unsubstituted alkoxy group; a substituted or unsubstituted aryloxy group; a substituted or unsubstituted alkylthioxy group; a substituted or unsubstituted arylthioxy group; a substituted or unsubstituted alkylsulfoxy group; a substituted or unsubstituted arylsulfoxy group; a substituted or unsubstituted alkenyl group; a substituted or unsubstituted silyl group; a substituted or unsubstituted boron group; a substituted or unsubstituted amine group; a substituted or unsubstituted arylphosphine group; a substituted or unsubstituted phosphine oxide group; a substituted or unsubstituted coumarin group; a substituted or unsubstituted monocyclic or dicyclic aryl group; a substituted or unsubstituted anthracenyl group; a substituted or unsubstituted phenanthrenyl group; a substituted or unsubstituted phenalenyl group; a substituted or unsubstituted tetracyclic or more aryl group; a substituted or unsubstituted monocyclic or dicyclic heteroaryl group; or a substituted or unsubstituted tetracyclic or more heteroaryl group, R7 is a group represented by the following Chemical Formula 2,

[Chemical Formula 2]

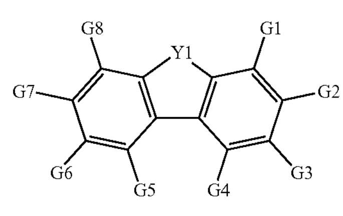

in Chemical Formula 2,

Y1 is O or S, any one of G1 to G8 is a site bonding to Chemical Formula 1, and the rest are the same as or different from each other and each independently hydrogen; deuterium; halogen; a nitrile group; a nitro group; a hydroxyl group; a carboxyl group (—COOH); an ether group; an ester group; an imide group; an amide group; a substituted or unsubstituted alkyl group; a substituted or unsubstituted cycloalkyl group; a substituted or unsubstituted alkoxy group; a substituted or unsubstituted aryloxy group; a substituted or unsubstituted alkylthioxy group; a substituted or unsubstituted arylthioxy group; a substituted or unsubstituted alkylsulfoxy group; a substituted or unsubstituted arylsulfoxy group; a substituted or unsubstituted alkenyl group; a substituted or unsubstituted silyl group; a substituted or unsubstituted boron group; a substituted or unsubstituted amine group; a substituted or unsubstituted arylphosphine group; a substituted or unsubstituted phosphine oxide group; a substituted or unsubstituted aryl group; or a substituted or unsubstituted heteroaryl group, or adjacent groups bond to each other to form a ring substituted with R', when adjacent groups among G1 to G8 bond to each other to form a ring substituted with R', any one of groups among G1 to G8 not forming the ring by the adjacent group bonding to each other and R' is a site bonding to Chemical Formula 1, and R' is hydrogen; deuterium; halogen; a nitrile group; a nitro group; a hydroxyl group; a carboxyl group (—COOH); an ether group; an ester group; an imide group; an amide group; a substituted or unsubstituted alkyl group; a substituted or unsubstituted cycloalkyl group; a substituted or unsubstituted alkoxy group; a substituted or unsubstituted aryloxy group; a substituted or unsubstituted alkylthioxy group; a substituted or unsubstituted arylthioxy group; a substituted or unsubstituted alkylsulfoxy group; a substituted or unsubstituted arylsulfoxy group; a substituted or unsubstituted alkenyl group; a substituted or unsubstituted silyl group; a substituted or unsubstituted boron group; a substituted or unsubstituted amine group; a substituted or unsubstituted arylphosphine group; a substituted or unsubstituted phosphine oxide group; a substituted or unsubstituted aryl group; or a substituted or unsubstituted heteroaryl group.

Another embodiment of the present specification provides a color conversion film including a resin matrix; and the compound represented by Chemical Formula 1 dispersed into the resin matrix.

Still another embodiment of the present specification provides a backlight unit including the color conversion film.

Yet another embodiment of the present specification provides a display apparatus including the backlight unit.

Advantageous Effects

A metal complex according to one embodiment of the present specification, that is, a compound represented by Chemical Formula 1, is stable for water or oxygen as well as having high fluorescence efficiency, and have low unit costs of production compared to quantum dots. Accordingly, by using the compound represented by Chemical Formula 1 described in the present specification as a fluorescent material of a color conversion film, a color conversion film having excellent luminance and color gamut, and with simple manufacturing process and low manufacturing costs can be provided.

DESCRIPTION OF DRAWINGS

FIG. 1 is a mimetic diagram using a color conversion film according to one embodiment of the present specification in a backlight.

REFERENCE NUMERAL

101: Side Chain-Type Light Source
102: Reflecting Plate
103: Light Guide Plate
104: Reflective Layer
105: Color Conversion Film
106: Light Dispersion Pattern

MODE FOR DISCLOSURE

Hereinafter, the present disclosure will be described in more detail.

A color conversion film according to one embodiment of the present specification provides a compound represented by Chemical Formula 1.

The compound represented by Chemical Formula 1 according to one embodiment of the present specification is a pyrromethene compound having boron metal as a complex, and by R7 of Chemical Formula 1 having a substituent represented by Chemical Formula 2, a full width at half maximum (FWHM) is narrow, and high quantum efficiency is obtained.

In the present specification, a certain part "including" certain constituents means capable of further including other constituents, and does not exclude other constituents unless particularly stated on the contrary.

In the present specification, one member being placed "on" another member includes not only a case of the one member adjoining the another member but a case of still another member being present between the two members.

Examples of the substituents in the present specification are described below, however, the substituents are not limited thereto.

The term "substitution" means a hydrogen atom bonding to a carbon atom of a compound is changed to another substituent, and the position of substitution is not limited as long as it is a position at which the hydrogen atom is substituted, that is, a position at which a substituent can substitute, and when two or more substituents substitute, the two or more substituents may be the same as or different from each other.

The term "substituted or unsubstituted" in the present specification means being substituted with one, two or more substituents selected from the group consisting of deuterium; a halogen group; a nitrile group; a nitro group; an imide group; an amide group; a carbonyl group; an ester group; a hydroxyl group; a substituted or unsubstituted alkyl group; a substituted or unsubstituted cycloalkyl group; a substituted or unsubstituted alkoxy group; a substituted or unsubstituted aryloxy group; a substituted or unsubstituted alkylthioxy group; a substituted or unsubstituted arylthioxy group; a substituted or unsubstituted alkylsulfoxy group; a substituted or unsubstituted arylsulfoxy group; a substituted or unsubstituted alkenyl group; a substituted or unsubstituted silyl group; a substituted or unsubstituted boron group; a substituted or unsubstituted amine group; a substituted or unsubstituted arylphosphine group; a substituted or unsubstituted phosphine oxide group; a substituted or unsubstituted aryl group; and a substituted or unsubstituted heterocyclic group, or being substituted with a substituent linking two or more substituents among the substituents illustrated above, or having no substituents. For example, "a substituent linking two or more substituents" may include a biphenyl group. In other words, a biphenyl group may be an aryl group, or interpreted as a substituent linking two phenyl groups.

In the present specification,

means a site bonding to other substituents or bonding sites.

In the present specification, the halogen group may be a fluoro group, a chloro group, a bromo group or an iodo group.

In the present specification, the number of carbon atoms of the imide group is not particularly limited, but is preferably from 1 to 30. Specifically, compounds having structures as below may be included, however, the imide group is not limited thereto.

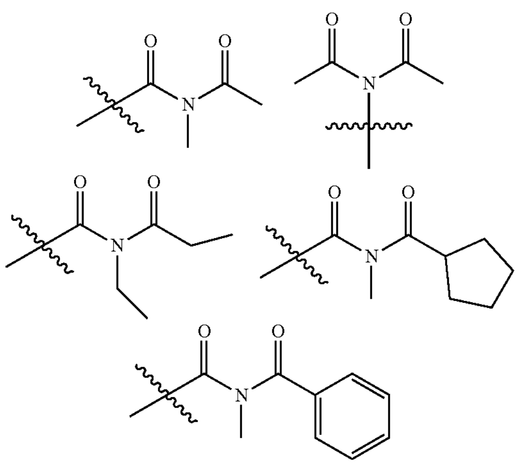

In the present specification, in the amide group, the nitrogen of the amide group may be substituted with hydrogen, a linear, branched or cyclic alkyl group having 1 to 30 carbon atoms or an aryl group having 6 to 30 carbon atoms. Specifically, compounds having the following structural formulae may be included, however, the amide group is not limited thereto.

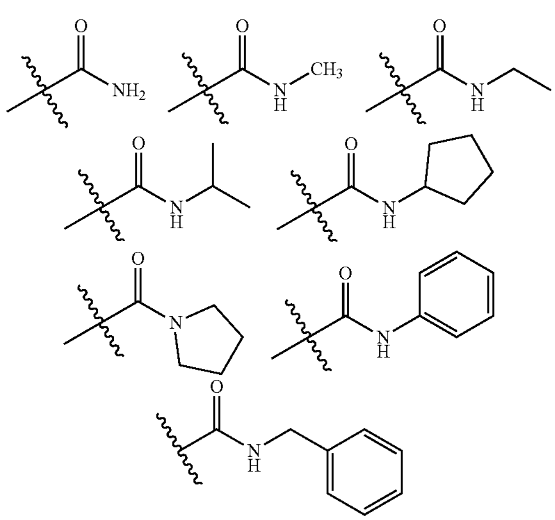

In the present specification, the number of carbon atoms of the carbonyl group is not particularly limited, but is preferably from 1 to 30. Specifically, compounds having structures as below may be included, however, the carbonyl group is not limited thereto.

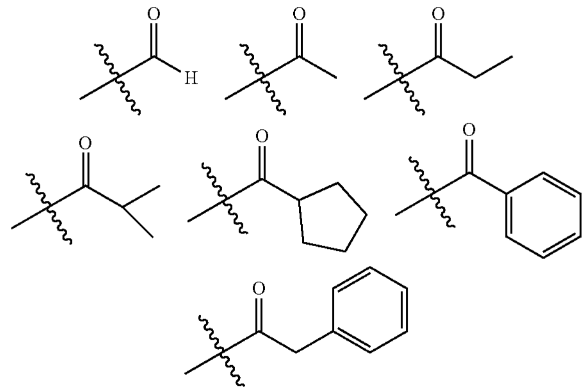

In the present specification, in the ester group, the oxygen of the ester group may be substituted with a linear, branched or cyclic alkyl group having 1 to 25 carbon atoms or an aryl group having 6 to 30 carbon atoms. Specifically, compounds having the following structural formulae may be included, however, the ester group is not limited thereto.

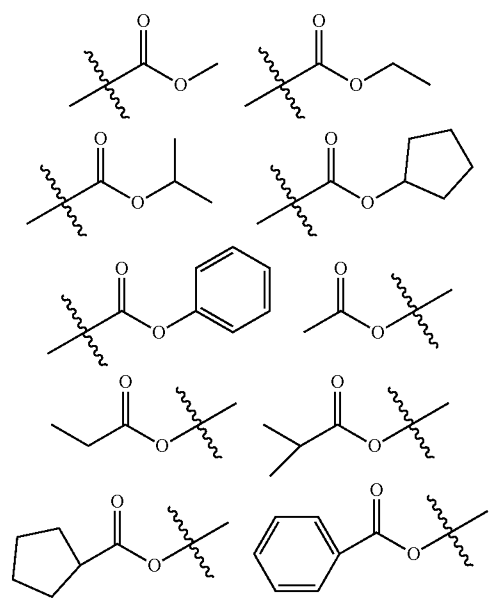

In the present specification, the alkyl group may be linear or branched, and the number of carbon atoms is not particularly limited, but is preferably from 1 to 30. Specific examples thereof may include methyl, ethyl, propyl, n-propyl, isopropyl, butyl, n-butyl, isobutyl, tert-butyl, sec-butyl, 1-methyl-butyl, 1-ethyl-butyl, pentyl, n-pentyl, isopentyl, neopentyl, tert-pentyl, hexyl, n-hexyl, 1-methylpentyl, 2-methylpentyl, 4-methyl-2-pentyl, 3,3-dimethylbutyl, 2-ethylbutyl, heptyl, n-heptyl, 1-methylhexyl, cyclopentylmethyl, cyclohexylmethyl, octyl, n-octyl, tert-octyl, 1-methylheptyl, 2-ethylhexyl, 2-propylpentyl, n-nonyl, 2,2-dimethylheptyl, 1-ethyl-propyl, 1,1-dimethyl-propyl, isohexyl, 2-methylpentyl, 4-methylhexyl, 5-methylhexyl and the like, but are not limited thereto.

In the present specification, the cycloalkyl group is not particularly limited, but preferably has 3 to 30 carbon atoms, and specific examples thereof may include cyclopropyl, cyclobutyl, cyclopentyl, 3-methylcyclopentyl, 2,3-dimethylcyclopentyl, cyclohexyl, 3-methylcyclohexyl, 4-methylcyclohexyl, 2,3-dimethylcyclohexyl, 3,4,5-trimethylcyclohexyl, 4-tert-butylcyclohexyl, cycloheptyl, cyclooctyl and the like, but are not limited thereto.

In the present specification, the alkoxy group may be linear, branched or cyclic. The number of carbon atoms of the alkoxy group is not particularly limited, but is preferably from 1 to 30. Specific examples thereof may include methoxy, ethoxy, n-propoxy, isopropoxy, n-butoxy, isobutoxy, tert-butoxy, sec-butoxy, n-pentyloxy, neopentyloxy, isopentyloxy, n-hexyloxy, 3,3-dimethylbutyloxy, 2-ethylbutyloxy, n-octyloxy, n-nonyloxy, n-decyloxy, benxyloxy, p-methylbenxyloxy and the like, but are not limited thereto.

In the present specification, the amine group may be selected from the group consisting of —$NH_2$; a monoalkylamine group; a dialkylamine group; an N-alkylarylamine group; a monoarylamine group; a diarylamine group; an N-arylheteroarylamine group; an N-alkylheteroarylamine group, a monoheteroarylamine group and a diheteroarylamine group, and the number of carbon atoms is, although not particularly limited thereto, preferably from 1 to 30. Specific examples of the amine group may include a methylamine group, a dimethylamine group, an ethylamine group, a diethylamine group, a phenylamine group, a naphthylamine group, a biphenylamine group, an anthracenylamine group, a 9-methyl-anthracenylamine group, a diphenylamine group, a ditolylamine group, an N-phenyltolylamine group, a triphenylamine group, an N-phenylbiphenylamine group; an N-phenylnaphthylamine group; an N-biphenylnaphthylamine group; an N-naphthylfluorenylamine group; an N-phenylphenanthrenylamine group; an N-biphenylphenanthrenylamine group; an N-phenylfluorenylamine group; an N-phenylterphenylamine group; an N-phenanthrenylfluorenylamine group; an N-biphenylfluorenylamine group and the like, but are not limited thereto.

In the present specification, the N-alkylarylamine group means an amine group in which N of the amine group is substituted with an alkyl group and an aryl group.

In the present specification, the N-arylheteroarylamine group means an amine group in which N of the amine group is substituted with an aryl group and a heteroaryl group.

In the present specification, the N-alkylheteroarylamine group means an amine group in which N of the amine group is substituted with an alkyl group and a heteroaryl group.

In the present specification, the alkyl group in the alkylamine group, the N-alkylarylamine group, the alkylthioxy group, the alkylsulfoxy group and the N-alkylheteroarylamine group is the same as the examples of the alkyl group described above. Specific examples of the alkylthioxy group may include a methylthioxy group, an ethylthioxy group, a tert-butylthioxy group, a hexylthioxy group, an octylthioxy group and the like, and specific examples of the alkylsulfoxy group may include mesyl, an ethylsulfoxy group, a propylsulfoxy group, a butylsulfoxy group and the like, however, the examples are not limited thereto.

In the present specification, the alkenyl group may be linear or branched, and although not particularly limited thereto, the number of carbon atoms is preferably from 2 to 30. Specific examples thereof may include vinyl, 1-propenyl, isopropenyl, 1-butenyl, 2-butenyl, 3-butenyl, 1-pentenyl, 2-pentenyl, 3-pentenyl, 3-methyl-1-butenyl, 1,3-butadienyl, allyl, 1-phenylvinyl-1-yl, 2-phenylvinyl-1-yl, 2,2-diphenylvinyl-1-yl, 2-phenyl-2-(naphthyl-1-yl)vinyl-1-yl, 2,2-bis(diphenyl-1-yl)vinyl-1-yl, a stilbenyl group, a styrenyl group and the like, but are not limited thereto.

In the present specification, specific examples of the silyl group may include a trimethylsilyl group, a triethylsilyl group, a t-butyldimethylsilyl group, a vinyldimethylsilyl group, a propyldimethylsilyl group, a triphenylsilyl group, a diphenylsilyl group, a phenylsilyl group and the like, but are not limited thereto.

In the present specification, the boron group may be —$BR_{100}R_{101}$, and $R_{100}$ and $R_{101}$ are the same as or different from each other and may be each independently selected from the group consisting of hydrogen; deuterium; halogen; a nitrile group; a substituted or unsubstituted monocyclic or multicyclic cycloalkyl group having 3 to 30 carbon atoms; a substituted or unsubstituted linear or branched alkyl group having 1 to 30 carbon atoms; a substituted or unsubstituted monocyclic or multicyclic aryl group having 6 to 30 carbon atoms; and a substituted or unsubstituted monocyclic or multicyclic heteroaryl group having 2 to 30 carbon atoms.

In the present specification, specific examples of the phosphine oxide group may include a diphenylphosphine oxide group, a dinaphthylphosphine oxide group and the like, but are not limited thereto.

In the present specification, the aryl group is not particularly limited, but preferably has 6 to 30 carbon atoms, and the aryl group may be monocyclic or multicyclic.

When the aryl group is a monocyclic aryl group, the number of carbon atoms is not particularly limited, but is preferably from 6 to 30. Specific examples of the monocyclic aryl group may include a phenyl group, a biphenyl group, a terphenyl group and the like, but are not limited thereto.

When the aryl group is a multicyclic aryl group, the number of carbon atoms is not particularly limited, but is preferably from 10 to 30. Specific examples of the multicyclic aryl group may include a naphthyl group, an anthracenyl group, a phenanthryl group, a triphenyl group, a pyrenyl group, a perylenyl group, a chrysenyl group, a fluorenyl group and the like, but are not limited thereto.

In the present specification, the fluorenyl group may be substituted, and adjacent groups may bond to each other to form a ring.

When the fluorenyl group is substituted,

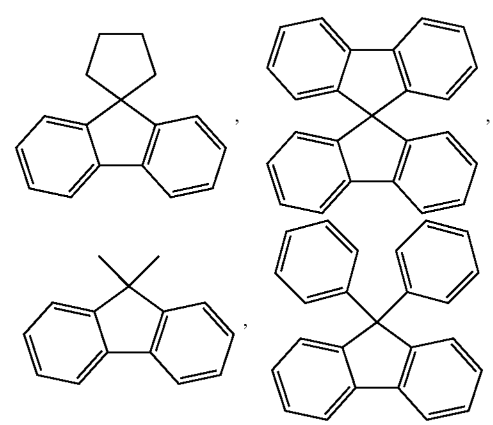

and the like may be included. However, the compound is not limited thereto.

In the present specification, an "adjacent" group may mean a substituent substituting an atom directly linking to an atom substituted by the corresponding substituent, a substituent sterically most closely positioned to the corresponding substituent, or another substituent substituting an atom substituted by the corresponding substituent. For example, two substituents substituting ortho positions in a benzene ring, and two substituents substituting the same carbon in an aliphatic ring may be interpreted as groups "adjacent" to each other.

In the present specification, the aryl group in the aryloxy group, the arylthioxy group, the arylsulfoxy group, the N-alkylarylamine group, the N-arylheteroarylamine group and the arylphosphine group may be same as the examples of the aryl group described above. Specific examples of the aryloxy group may include a phenoxy group, a p-tolyloxy group, an m-tolyloxy group, a 3,5-dimethyl-phenoxy group, a 2,4,6-trimethylphenoxy group, a p-tert-butylphenoxy group, a 3-biphenyloxy group, a 4-biphenyloxy group, a 1-naphthyloxy group, a 2-naphthyloxy group, a 4-methyl-1-naphthyloxy group, a 5-methyl-2-naphthyloxy group, a 1-anthryloxy group, a 2-anthryloxy group, a 9-anthryloxy group, a 1-phenanthryloxy group, a 3-phenanthryloxy group, a 9-phenanthryloxy group and the like, and specific examples of the arylthioxy group may include a phenylthioxy group, a 2-methylphenylthioxy group, a 4-tert-butylphenylthioxy group and the like, and specific examples of the arylsulfoxy group may include a benzenesulfoxy group, a p-toluenesulfoxy group and the like, however, the examples are not limited thereto.

In the present specification, examples of the arylamine group include a substituted or unsubstituted monoarylamine group, a substituted or unsubstituted diarylamine group, or a substituted or unsubstituted triarylamine group. The aryl group in the arylamine group may be a monocyclic aryl group or a multicyclic aryl group. The arylamine group including two or more aryl groups may include monocyclic aryl groups, multicyclic aryl groups, or both monocyclic aryl groups and multicyclic aryl groups. For example, the aryl group in the arylamine group may be selected from among the examples of the aryl group described above.

In the present specification, the heteroaryl group is a group including one or more atoms that are not carbon, that is, heteroatoms, and specifically, the heteroatom may include one or more atoms selected from the group consisting of O, N, Se, S and the like. The number of carbon atoms is not particularly limited, but is preferably from 2 to 30, and the heteroaryl group may be monocyclic or multicyclic. Examples of the heterocyclic group may include a thiophene group, a furanyl group, a pyrrole group, an imidazolyl group, a thiazolyl group, an oxazolyl group, an oxadiazolyl group, a pyridyl group, a bipyridyl group, a pyrimidyl group, a triazinyl group, a triazolyl group, an acridyl group, a pyridazinyl group, a pyrazinyl group, a qinolinyl group, a quinazolinyl group, a quinoxalinyl group, a phthalazinyl group, a pyridopyrimidyl group, a pyridopyrazinyl group, a pyrazinopyrazinyl group, an isoquinolinyl group, an indolyl group, a carbazolyl group, a benzoxazolyl group, a benzimidazolyl group, a benzothiazolyl group, a benzocarbazolyl group, a benzothiophene group, a dibenzothiophene group, a benzofuranyl group, a phenanthrolinyl group, an isoxazolyl group, a thiadiazolyl group, a phenothiazinyl group, a dibenzofuranyl group and the like, but are not limited thereto.

In the present specification, in the coumarin group, the carbon of the coumarin group may be substituted with a halogen group, a nitrile group, a linear, branched or cyclic alkyl group having 1 to 25 carbon atoms; an amine group; a linear or branched alkoxy group having 1 to 25 carbon atoms; or an aryl group having 6 to 30 carbon atoms. Specifically, compounds having the following structural formulae may be included, however, the coumarin group is not limited thereto.

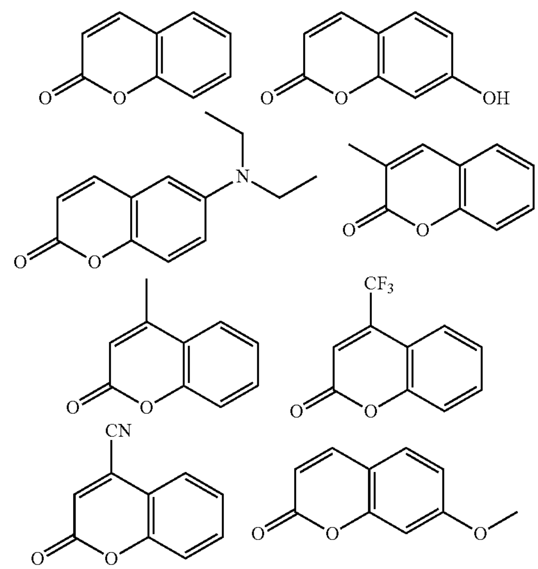

In the present specification, examples of the heteroarylamine group include a substituted or unsubstituted monoheteroarylamine group, a substituted or unsubstituted diheteroarylamine group, or a substituted or unsubstituted triheteroarylamine group. The heteroarylamine group including two or more heteroaryl groups may include monocyclic heteroaryl groups, multicyclic heteroaryl groups, or both monocyclic heteroaryl groups and multicyclic heteroaryl groups. For example, the heteroaryl group in the heteroarylamine group may be selected from among the examples of the heteroraryl group described above.

In the present specification, examples of the heteroaryl group in the N-arylheteroarylamine group and the N-alkylheteroarylamine group are the same as the examples of the heteroaryl group described above.

According to one embodiment of the present specification, Chemical Formula 2 is represented by any one of the following Chemical Formulae 2-1 to 2-3.

[Chemical Formula 2-1]

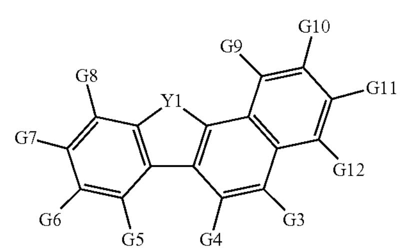

In Chemical Formula 2-1,

Y1 has the same definition as in Chemical Formula 2, any one of G3 to G12 is a site bonding to Chemical Formula 1, and the rest are the same as or different from each other and each independently hydrogen; deuterium; halogen; a nitrile group; a nitro group; a hydroxyl group; a carboxyl group (—COOH); an ether group; an ester group;

an imide group; an amide group; a substituted or unsubstituted alkyl group; a substituted or unsubstituted cycloalkyl group; a substituted or unsubstituted alkoxy group; a substituted or unsubstituted aryloxy group; a substituted or unsubstituted alkylthioxy group; a substituted or unsubstituted arylthioxy group; a substituted or unsubstituted alkylsulfoxy group; a substituted or unsubstituted arylsulfoxy group; a substituted or unsubstituted alkenyl group; a substituted or unsubstituted silyl group; a substituted or unsubstituted boron group; a substituted or unsubstituted amine group; a substituted or unsubstituted arylphosphine group; a substituted or unsubstituted phosphine oxide group; a substituted or unsubstituted aryl group; or a substituted or unsubstituted heteroaryl group,

[Chemical Formula 2-2]

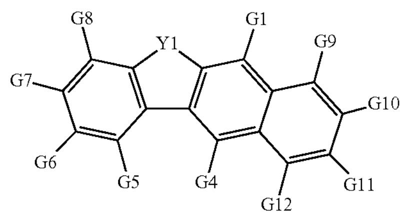

in Chemical Formula 2-2,

Y1 has the same definition as in Chemical Formula 2, any one of G1 and G4 to G12 is a site bonding to Chemical Formula 1, and the rest are the same as or different from each other and each independently hydrogen; deuterium; halogen; a nitrile group; a nitro group; a hydroxyl group; a carboxyl group (—COOH); an ether group; an ester group; an imide group; an amide group; a substituted or unsubstituted alkyl group; a substituted or unsubstituted cycloalkyl group; a substituted or unsubstituted alkoxy group; a substituted or unsubstituted aryloxy group; a substituted or unsubstituted alkylthioxy group; a substituted or unsubstituted arylthioxy group; a substituted or unsubstituted alkylsulfoxy group; a substituted or unsubstituted arylsulfoxy group; a substituted or unsubstituted alkenyl group; a substituted or unsubstituted silyl group; a substituted or unsubstituted boron group; a substituted or unsubstituted amine group; a substituted or unsubstituted arylphosphine group; a substituted or unsubstituted phosphine oxide group; a substituted or unsubstituted aryl group; or a substituted or unsubstituted heteroaryl group,

[Chemical Formula 2-3]

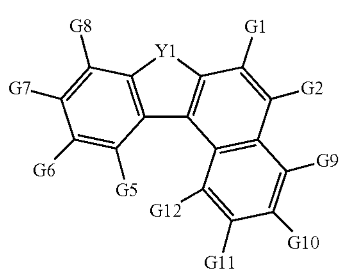

in Chemical Formula 2-3,

Y1 has the same definition as in Chemical Formula 2, and any one of G1, G2 and G5 to G12 is a site bonding to Chemical Formula 1, and the rest are the same as or different from each other and each independently hydrogen; deuterium; halogen; a nitrile group; a nitro group; a hydroxyl group; a carboxyl group (—COOH); an ether group; an ester group; an imide group; an amide group; a substituted or unsubstituted alkyl group; a substituted or unsubstituted cycloalkyl group; a substituted or unsubstituted alkoxy group; a substituted or unsubstituted aryloxy group; a substituted or unsubstituted alkylthioxy group; a substituted or unsubstituted arylthioxy group; a substituted or unsubstituted alkylsulfoxy group; a substituted or unsubstituted arylsulfoxy group; a substituted or unsubstituted alkenyl group; a substituted or unsubstituted silyl group; a substituted or unsubstituted boron group; a substituted or unsubstituted amine group; a substituted or unsubstituted arylphosphine group; a substituted or unsubstituted phosphine oxide group; a substituted or unsubstituted aryl group; or a substituted or unsubstituted heteroaryl group.

According to one embodiment of the present specification, Chemical Formula 2 is represented by any one of the following Chemical Formulae 2-4 to 2-6.

[Chemical Formula 2-4]

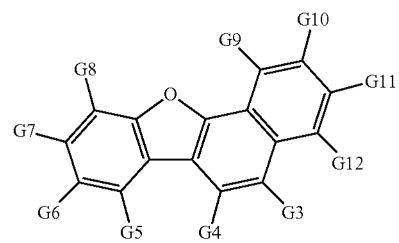

In Chemical Formula 2-4, any one of G3 to G12 is a site bonding to Chemical Formula 1, and the rest are the same as or different from each other and each independently hydrogen; deuterium; halogen; a nitrile group; a nitro group; a hydroxyl group; a carboxyl group (—COOH); an ether group; an ester group; an imide group; an amide group; a substituted or unsubstituted alkyl group; a substituted or unsubstituted cycloalkyl group; a substituted or unsubstituted alkoxy group; a substituted or unsubstituted aryloxy group; a substituted or unsubstituted alkylthioxy group; a substituted or unsubstituted arylthioxy group; a substituted or unsubstituted alkylsulfoxy group; a substituted or unsubstituted arylsulfoxy group; a substituted or unsubstituted alkenyl group; a substituted or unsubstituted silyl group; a substituted or unsubstituted boron group; a substituted or unsubstituted amine group; a substituted or unsubstituted arylphosphine group; a substituted or unsubstituted phosphine oxide group; a substituted or unsubstituted aryl group; or a substituted or unsubstituted heteroaryl group,

[Chemical Formula 2-5]

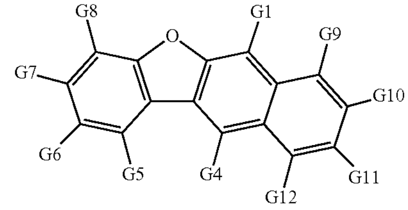

in Chemical Formula 2-5, any one of G1 and G4 to G12 is a site bonding to Chemical Formula 1, and the rest are the same as or different from each other and each independently hydrogen; deuterium; halogen; a nitrile group; a nitro group; a hydroxyl group; a carboxyl group (—COOH); an ether group; an ester group; an imide group; an amide group; a substituted or unsubstituted alkyl group; a substituted or unsubstituted cycloalkyl group; a substituted or unsubstituted alkoxy group; a substituted or unsubstituted aryloxy group; a substituted or unsubstituted alkylthioxy group; a substituted or unsubstituted arylthioxy group; a substituted or unsubstituted alkylsulfoxy group; a substituted or unsubstituted arylsulfoxy group; a substituted or unsubstituted alkenyl group; a substituted or unsubstituted silyl group; a substituted or unsubstituted boron group; a substituted or unsubstituted amine group; a substituted or unsubstituted arylphosphine group; a substituted or unsubstituted phosphine oxide group; a substituted or unsubstituted aryl group; or a substituted or unsubstituted heteroaryl group,

[Chemical Formula 2-6]

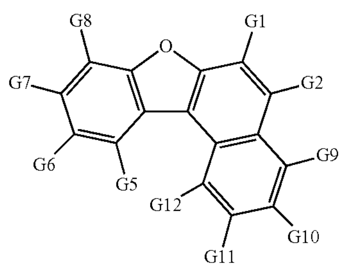

in Chemical Formula 2-6, any one of G1, G2 and G5 to G12 is a site bonding to Chemical Formula 1, and the rest are the same as or different from each other and each independently hydrogen; deuterium; halogen; a nitrile group; a nitro group; a hydroxyl group; a carboxyl group (—COOH); an ether group; an ester group; an imide group; an amide group; a substituted or unsubstituted alkyl group; a substituted or unsubstituted cycloalkyl group; a substituted or unsubstituted alkoxy group; a substituted or unsubstituted aryloxy group; a substituted or unsubstituted alkylthioxy group; a substituted or unsubstituted arylthioxy group; a substituted or unsubstituted alkylsulfoxy group; a substituted or unsubstituted arylsulfoxy group; a substituted or unsubstituted alkenyl group; a substituted or unsubstituted silyl group; a substituted or unsubstituted boron group; a substituted or unsubstituted amine group; a substituted or unsubstituted arylphosphine group; a substituted or unsubstituted phosphine oxide group; a substituted or unsubstituted aryl group; or a substituted or unsubstituted heteroaryl group.

According to one embodiment of the present specification, Chemical Formula 2 is represented by any one of the following Chemical Formulae 2-7 to 2-9.

[Chemical Formula 2-7]

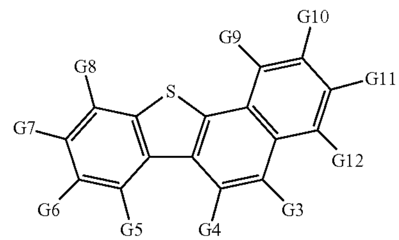

In Chemical Formula 2-7, any one of G3 to G12 is a site bonding to Chemical Formula 1, and the rest are the same as or different from each other and each independently hydrogen; deuterium; halogen; a nitrile group; a nitro group; a hydroxyl group; a carboxyl group (—COOH); an ether group; an ester group; an imide group; an amide group; a substituted or unsubstituted alkyl group; a substituted or unsubstituted cycloalkyl group; a substituted or unsubstituted alkoxy group; a substituted or unsubstituted aryloxy group; a substituted or unsubstituted alkylthioxy group; a substituted or unsubstituted arylthioxy group; a substituted or unsubstituted alkylsulfoxy group; a substituted or unsubstituted arylsulfoxy group; a substituted or unsubstituted alkenyl group; a substituted or unsubstituted silyl group; a substituted or unsubstituted boron group; a substituted or unsubstituted amine group; a substituted or unsubstituted arylphosphine group; a substituted or unsubstituted phosphine oxide group; a substituted or unsubstituted aryl group; or a substituted or unsubstituted heteroaryl group,

[Chemical Formula 2-8]

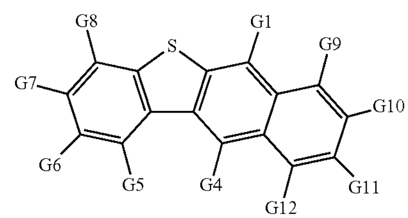

in Chemical Formula 2-8, any one of G1 and G4 to G12 is a site bonding to Chemical Formula 1, and the rest are the same as or different from each other and each independently hydrogen; deuterium; halogen; a nitrile group; a nitro group; a hydroxyl group; a carboxyl group (—COOH); an ether group; an ester group; an imide group; an amide group; a substituted or unsubstituted alkyl group; a substituted or unsubstituted cycloalkyl group; a substituted or unsubstituted alkoxy group; a substituted or unsubstituted aryloxy group; a substituted or unsubstituted alkylthioxy group; a substituted or unsubstituted arylthioxy group; a substituted or unsubstituted alkylsulfoxy group; a substituted or unsubstituted arylsulfoxy group; a substituted or unsubstituted alkenyl group; a substituted or unsubstituted silyl group; a substituted or unsubstituted boron group; a substituted or unsubstituted amine group; a substituted or unsubstituted arylphosphine group; a substituted or unsubstituted phosphine oxide group; a substituted or unsubstituted aryl group; or a substituted or unsubstituted heteroaryl group,

[Chemical Formula 2-9]

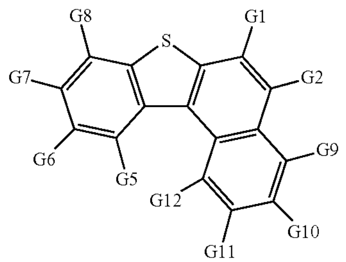

in Chemical Formula 2-9, any one of G1, G2 and G5 to G12 is a site bonding to Chemical Formula 1, and the rest are the same as or different from each other and each independently hydrogen; deuterium; halogen; a nitrile group; a nitro group; a hydroxyl group; a carboxyl group (—COOH); an ether group; an ester group; an imide group; an amide group; a substituted or unsubstituted alkyl group; a substituted or unsubstituted cycloalkyl group; a substituted or unsubstituted alkoxy group; a substituted or unsubstituted aryloxy group; a substituted or unsubstituted alkylthioxy group; a substituted or unsubstituted arylthioxy group; a substituted or unsubstituted alkylsulfoxy group; a substituted or unsubstituted arylsulfoxy group; a substituted or unsubstituted alkenyl group; a substituted or unsubstituted silyl group; a substituted or unsubstituted boron group; a substituted or unsubstituted amine group; a substituted or unsubstituted arylphosphine group; a substituted or unsubstituted phosphine oxide group; a substituted or unsubstituted aryl group; or a substituted or unsubstituted heteroaryl group.

According to one embodiment of the present specification, Chemical Formula 1 is represented by any one of the following Chemical Formulae 1-1 to 1-4.

[Chemical Formula 1-1]

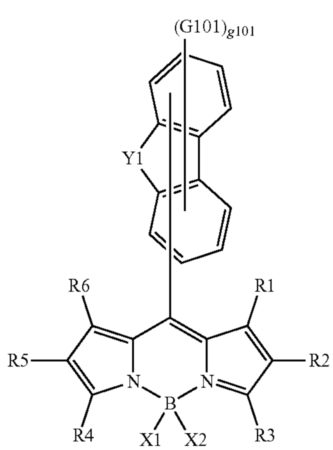

-continued

[Chemical Formula 1-2]

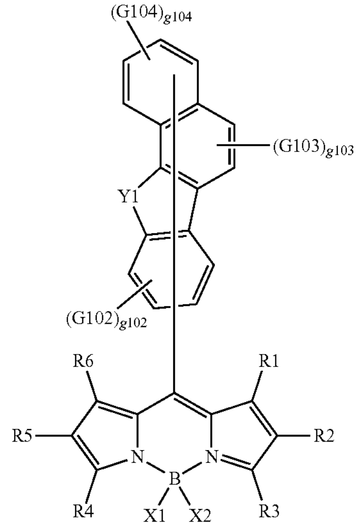

[Chemical Formula 1-3]

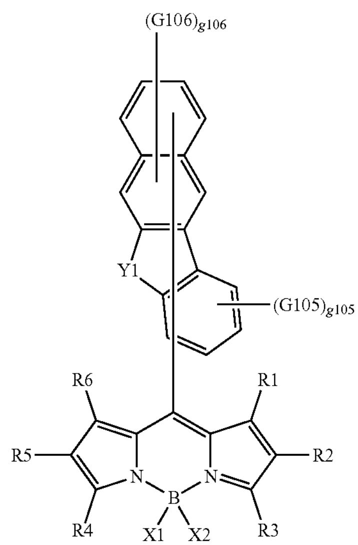

[Chemical Formula 1-4]

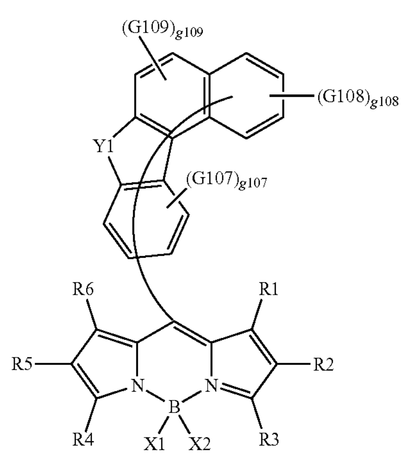

In Chemical Formulae 1-1 to 1-4,

R1 to R6, and X1 and X2 have the same definitions as in Chemical Formula 1,

Y1 has the same definition as in Chemical Formula 2,

G101 to G109 are the same as or different from each other, and each independently hydrogen; deuterium; halogen; a nitrile group; a nitro group; a hydroxyl group; a carboxyl group (—COOH); an ether group; an ester group; an imide group; an amide group; a substituted or unsubstituted alkyl group; a substituted or unsubstituted cycloalkyl group; a substituted or unsubstituted alkoxy group; a substituted or unsubstituted aryloxy group; a substituted or unsubstituted alkylthioxy group; a substituted or unsubstituted arylthioxy group; a substituted or unsubstituted alkylsulfoxy group; a substituted or unsubstituted arylsulfoxy group; a substituted or unsubstituted alkenyl group; a substituted or unsubstituted silyl group; a substituted or unsubstituted boron group; a substituted or unsubstituted amine group; a substituted or unsubstituted arylphosphine group; a substituted or unsubstituted phosphine oxide group; a substituted or unsubstituted aryl group; or a substituted or unsubstituted heteroaryl group, g101 is an integer of 1 to 7, g102, g104, g105, g107 and g108 are each an integer of 1 to 4, g103 and g109 are each 1 or 2, g106 is an integer of 1 to 6, $$3 \leq g102+g103+g104 \leq 9,$$

$$2 \leq g105+g106 \leq 9,$$

$$3 \leq g107+g108+g109 \leq 9, \text{ and}$$

when g101 to g109 are each a multiple number, structures in the parentheses are the same as or different from each other.

According to one embodiment of the present specification, Chemical Formula 1 is represented by any one of the following Chemical Formulae 1-5 to 1-8.

[Chemical Formula 1-5]

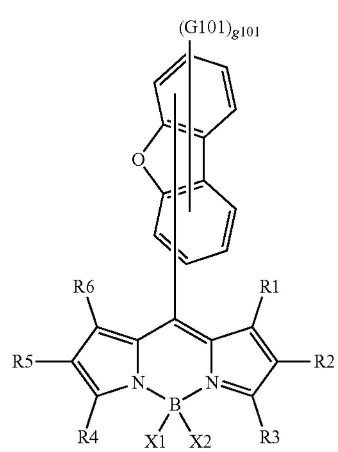

-continued

[Chemical Formula 1-6]

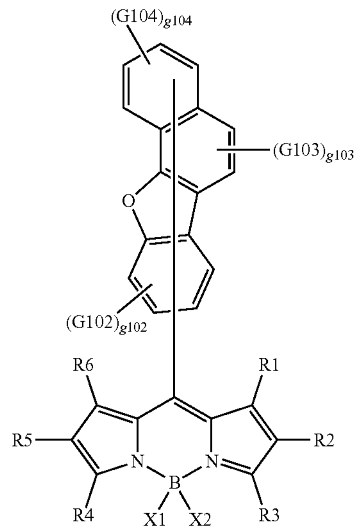

[Chemical Formula 1-7]

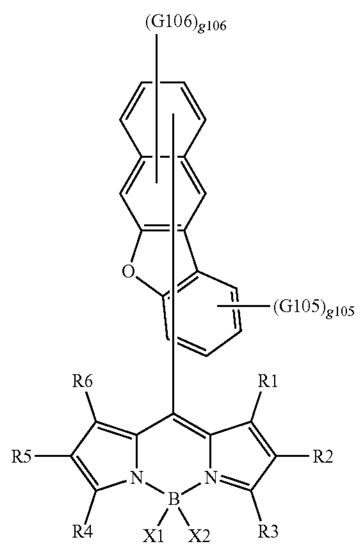

[Chemical Formula 1-8]

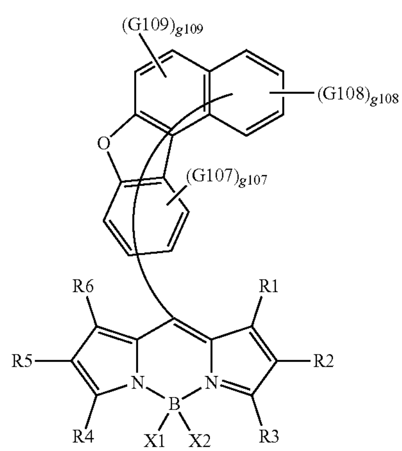

In Chemical Formulae 1-5 to 1-8,

R1 to R6, and X1 and X2 have the same definitions as in Chemical Formula 1,

G101 to G109 are the same as or different from each other, and each independently hydrogen; deuterium; halogen; a nitrile group; a nitro group; a hydroxyl group; a carboxyl group (—COOH); an ether group; an ester group; an imide group; an amide group; a substituted or unsubstituted alkyl group; a substituted or unsubstituted cycloalkyl group; a substituted or unsubstituted alkoxy group; a substituted or unsubstituted aryloxy group; a substituted or unsubstituted alkylthioxy group; a substituted or unsubstituted arylthioxy group; a substituted or unsubstituted alkylsulfoxy group; a substituted or unsubstituted arylsulfoxy group; a substituted or unsubstituted alkenyl group; a substituted or unsubstituted silyl group; a substituted or unsubstituted boron group; a substituted or unsubstituted amine group; a substituted or unsubstituted arylphosphine group; a substituted or unsubstituted phosphine oxide group; a substituted or unsubstituted aryl group; or a substituted or unsubstituted heteroaryl group, g101 is an integer of 1 to 7, g102, g104, g105, g107 and g108 are each an integer of 1 to 4, g103 and g109 are each 1 or 2, g106 is an integer of 1 to 6, $$3 \leq g102+g103+g104 \leq 9,$$

$$2 \leq g105+g106 \leq 9,$$

$$3 \leq g107+g108+g109 \leq 9, \text{ and}$$

when g101 to g109 are each a multiple number, structures in the parentheses are the same as or different from each other.

According to one embodiment of the present specification, Chemical Formula 1 is represented by any one of the following Chemical Formulae 1-9 to 1-12.

[Chemical Formula 1-9]

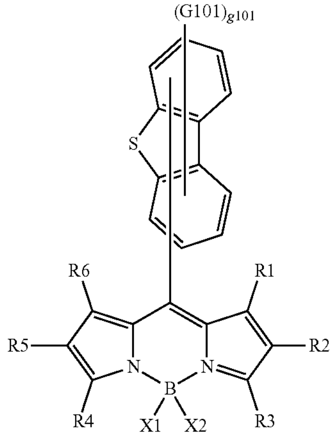

-continued

[Chemical Formula 1-10]

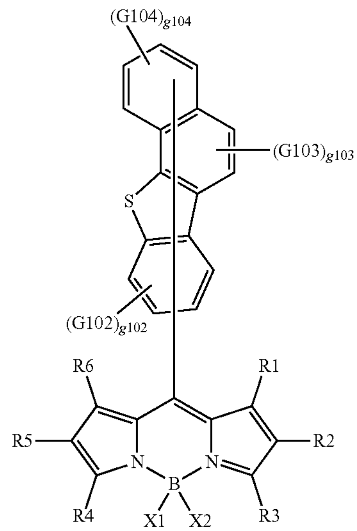

[Chemical Formula 1-11]

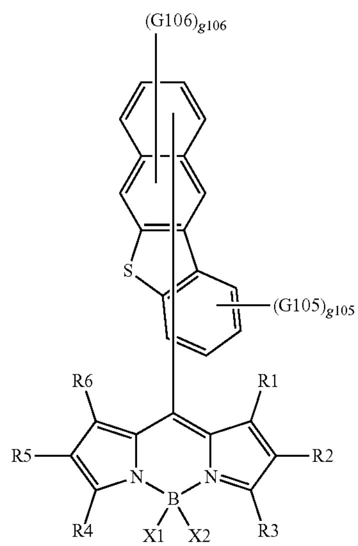

[Chemical Formula 1-12]

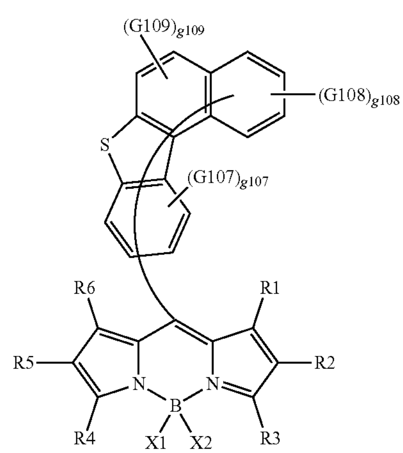

In Chemical Formulae 1-9 to 1-12,

R1 to R6, and X1 and X2 have the same definitions as in Chemical Formula 1,

G101 to G109 are the same as or different from each other, and each independently hydrogen; deuterium; halogen; a nitrile group; a nitro group; a hydroxyl group; a carboxyl group (—COOH); an ether group; an ester group; an imide group; an amide group; a substituted or unsubstituted alkyl group; a substituted or unsubstituted cycloalkyl group; a substituted or unsubstituted alkoxy group; a substituted or unsubstituted aryloxy group; a substituted or unsubstituted alkylthioxy group; a substituted or unsubstituted arylthioxy group; a substituted or unsubstituted alkylsulfoxy group; a substituted or unsubstituted arylsulfoxy group; a substituted or unsubstituted alkenyl group; a substituted or unsubstituted silyl group; a substituted or unsubstituted boron group; a substituted or unsubstituted amine group; a substituted or unsubstituted arylphosphine group; a substituted or unsubstituted phosphine oxide group; a substituted or unsubstituted aryl group; or a substituted or unsubstituted heteroaryl group, g101 is an integer of 1 to 7, g102, g104, g105, g107 and g108 are each an integer of 1 to 4, g103 and g109 are each 1 or 2, g106 is an integer of 1 to 6, $$3 \leq g102+g103+g104 \leq 9,$$

$$2 \leq g105+g106 \leq 9,$$

$$3 \leq g107+g108+g109 \leq 9, \text{ and}$$

when g101 to g109 are each a multiple number, structures in the parentheses are the same as or different from each other.

According to one embodiment of the present specification, in Chemical Formula 1, X1 and X2 are the same as or different from each other, and each independently a halogen group; a nitrile group; or an alkoxy group.

According to one embodiment of the present specification, in Chemical Formula 1, X1 and X2 are the same as or different from each other, and each independently a fluoro group; a nitrile group; or a methoxy group.

According to one embodiment of the present specification, in Chemical Formula 1, R1, R3, R4 and R6 are the same as or different from each other, and each independently an aryl group unsubstituted or substituted with a nitrile group, a halogen group, an alkyl group unsubstituted or substituted with a halogen group, an arylamine group or an alkoxy group; or a heteroaryl group unsubstituted or substituted with an alkyl group.

According to one embodiment of the present specification, in Chemical Formula 1, R1, R3, R4 and R6 are the same as or different from each other, and each independently a phenyl group unsubstituted or substituted with a nitrile group, a halogen group, an alkyl group unsubstituted or substituted with a halogen group, an arylamine group or an alkoxy group; a pyridyl group unsubstituted or substituted with an alkyl group; or a dibenzofuranyl group.

According to one embodiment of the present specification, in Chemical Formula 1, R1, R3, R4 and R6 are the same as or different from each other, and each independently a phenyl group unsubstituted or substituted with a nitrile group, a fluoro group, a trifluoromethyl group, a t-butyl group, a diphenylamine group or a methoxy group; a pyridyl group unsubstituted or substituted with a methyl group; or a dibenzofuranyl group.

According to one embodiment of the present specification, in Chemical Formula 1, R2 and R5 are the same as or different from each other, and each independently hydrogen; a halogen group; a nitrile group; an ester group; an alkylsulfoxy group; a substituted or unsubstituted alkyl group; a substituted or unsubstituted coumarin group; a substituted or unsubstituted monocyclic or dicyclic aryl group; a substituted or unsubstituted phenanthrenyl group; a substituted or unsubstituted tetracyclic or more aryl group; or a substituted or unsubstituted monocyclic or dicyclic heteroaryl group.

According to one embodiment of the present specification, in Chemical Formula 1, R2 and R5 are the same as or different from each other, and each independently hydrogen; a halogen group; a nitrile group; an alkylester group; an arylester group; an alkylsulfoxy group; an alkyl group unsubstituted or substituted with an aryl group substituted with a nitro group; a coumarin group; a monocyclic aryl group unsubstituted or substituted with a halogen group, an alkyl group unsubstituted or substituted with a halogen group, an aryl group, or a heteroaryl group substituted with an aryl group; a dicyclic aryl group; a phenanthrenyl group; a tetracyclic or more aryl group; a monocyclic heteroaryl group; or a dicyclic heteroaryl group.

According to one embodiment of the present specification, in Chemical Formula 1, R2 and R5 are the same as or different from each other, and each independently hydrogen; a fluoro group; a nitrile group; a methylester group; a phenylester group; a methylsulfoxy group; a methyl group substituted with a phenyl group substituted with a nitro group; an ethyl group; an n-propyl group; a coumarin group; a phenyl group unsubstituted or substituted with a fluoro group, a trifluoromethyl group, a phenyl group, a biphenyl group, or a triazinyl group substituted with a phenyl group; a biphenyl group substituted with a phenyl group; a terphenyl group; a pyrimidyl group; a furanyl group; a naphthyl group; a quinolyl group; a benzothiadiazolyl group; a phenanthrenyl group; a pyrenyl group; a triphenylenyl group; a spirobifluorenyl group; or a fluoranthenyl group.

According to one embodiment of the present specification, the compound represented by Chemical Formula 1 has a maximum light emission peak present in 520 nm to 550 nm in a film state. Such a compound emits green light.

According to one embodiment of the present specification, the compound represented by Chemical Formula 1 has a maximum light emission peak present in 520 nm to 550 nm in a film state, and the light emission peak has a full width at half maximum of 50 nm or less. Having such a small full width at half maximum may further increase color gamut. Herein, it is preferable that the compound represented by Chemical Formula 1 have a light emission peak with a smaller full width at half maximum.

According to one embodiment of the present specification, the compound represented by Chemical Formula 1 has a maximum light emission peak present in 610 nm to 660 nm in a film state, and preferably present in 630 nm to 660 nm. Such a compound emits red light.

According to one embodiment of the present specification, the compound represented by Chemical Formula 1 has a maximum light emission peak present in 610 nm to 660 nm in a film state, and the light emission peak has a full width at half maximum of 60 nm or less. Having such a small full width at half maximum may further increase color gamut. Herein, the compound represented by Chemical Formula 1 may have a light emission peak with a full width at half maximum of 5 nm or greater.

According to one embodiment of the present specification, the compound represented by Chemical Formula 1 has a maximum light emission peak present in 630 nm to 660 nm in a film state, and the light emission peak has a full width at half maximum of 60 nm or less.

According to one embodiment of the present specification, the compound represented by Chemical Formula 1 has quantum efficiency of 0.76 or greater.

In the present specification, the "film state" means, instead of a solution state, a state prepared to a film form with the compound represented by Chemical Formula 1 alone or by mixing the compound represented by Chemical Formula 1 with other components that do not affect full width at half maximum and quantum efficiency measurements.

In the present specification, the full width at half maximum means a width of a light emission peak at a half of the maximum height in a maximum light emission peak of the light emitting from the compound represented by Chemical Formula 1.

In the present specification, the quantum efficiency may be measured using methods known in the art, and for example, may be measured using an integrating sphere.

According to one embodiment of the present specification, Chemical Formula 1 is selected from among the following compounds.

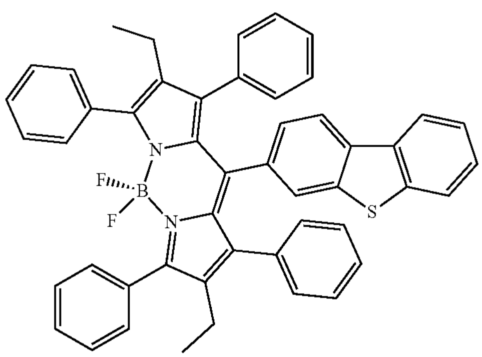

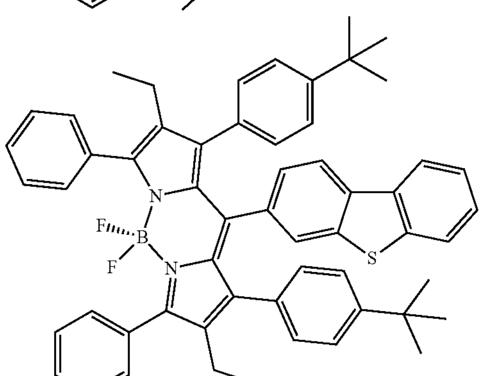

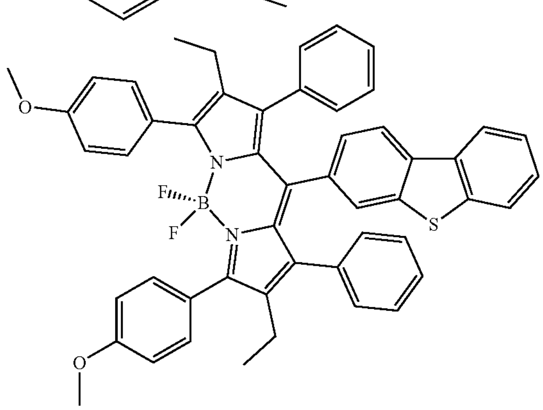

-continued

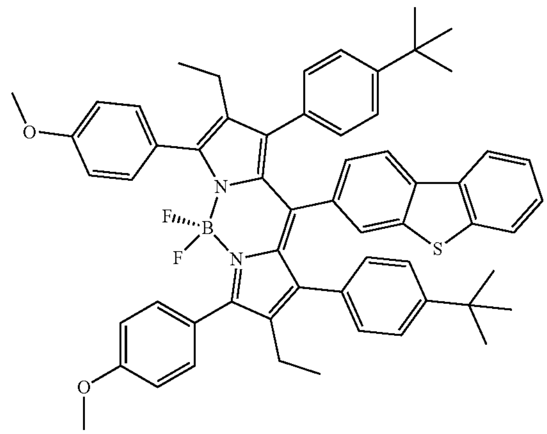

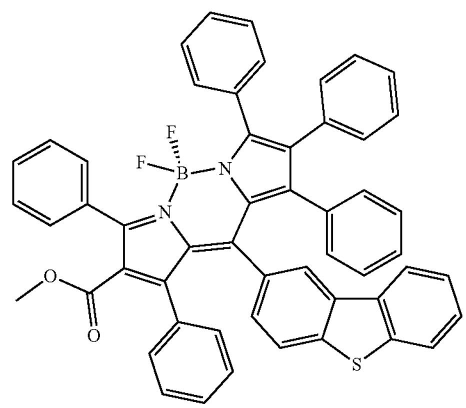

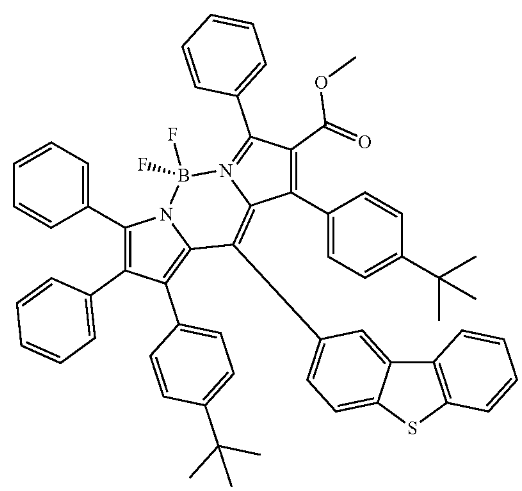

-continued
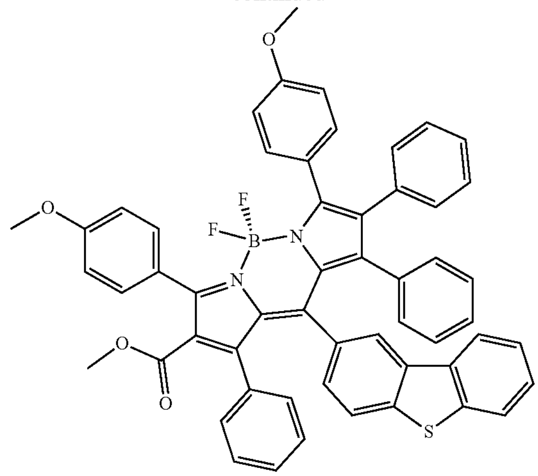
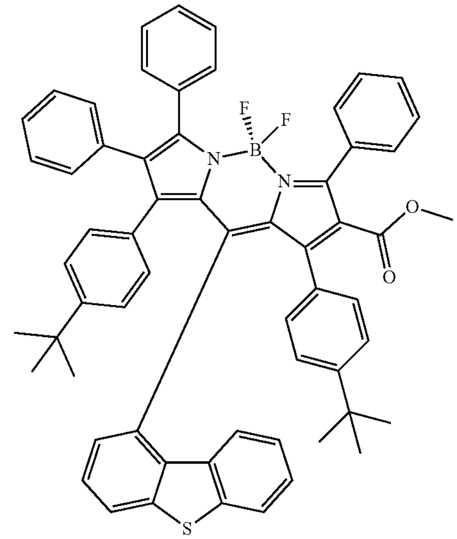
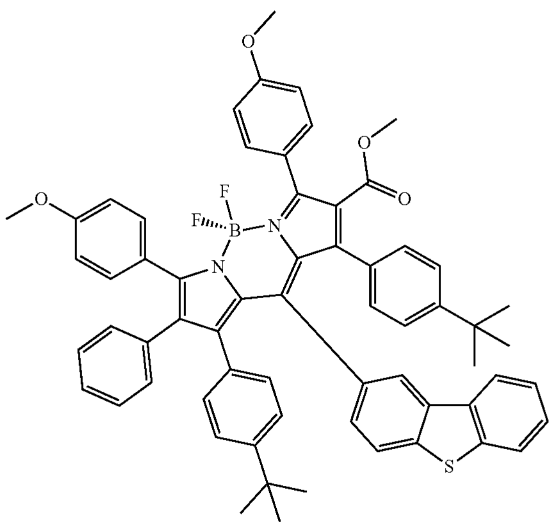
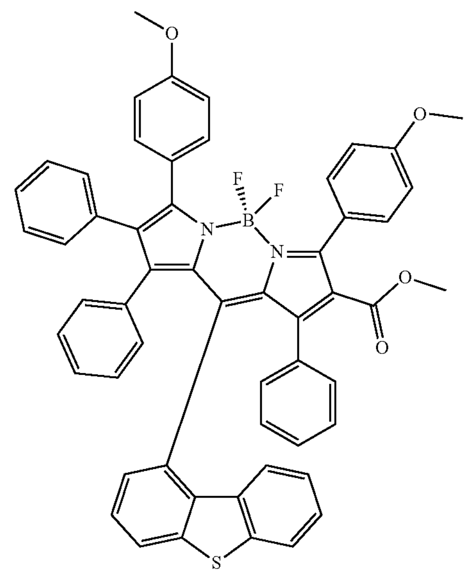
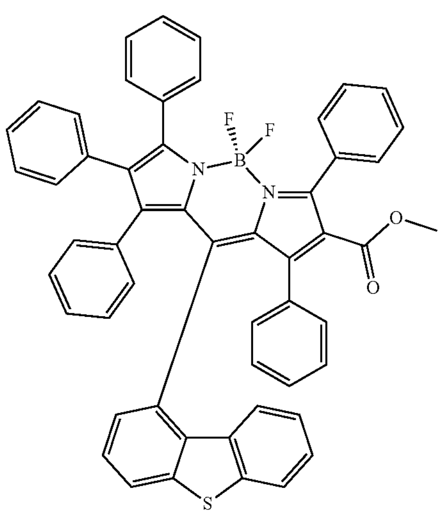
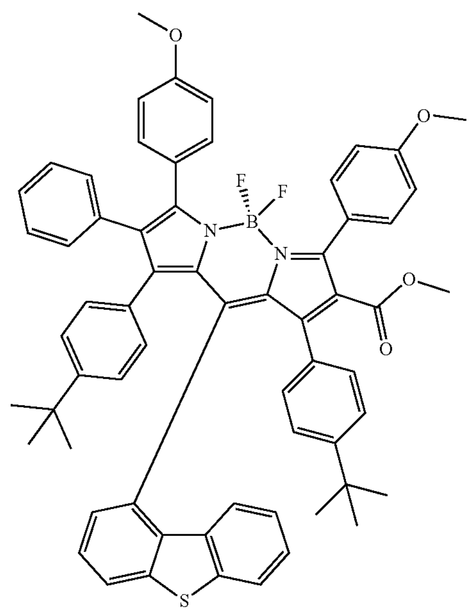

-continued
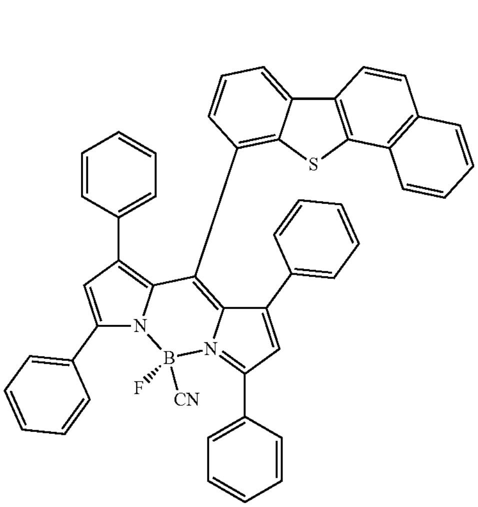
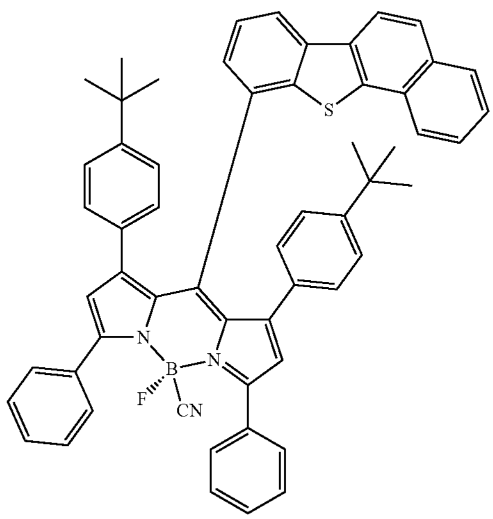
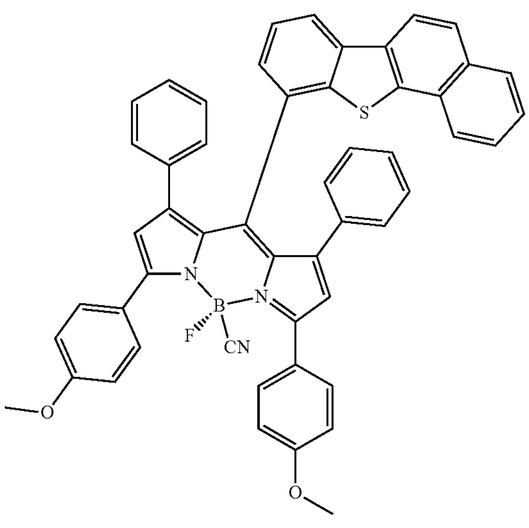
-continued
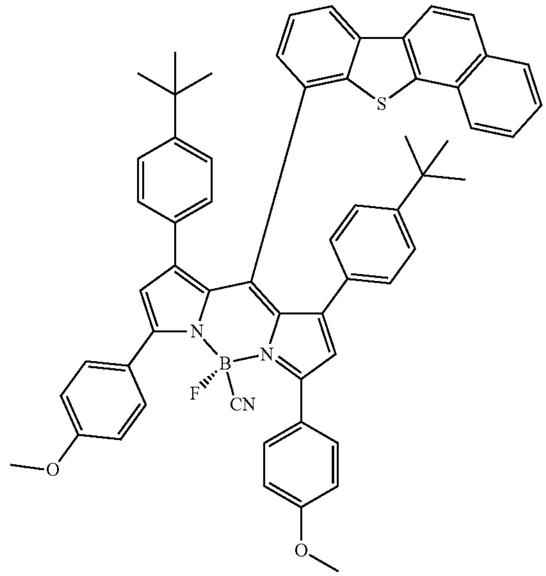
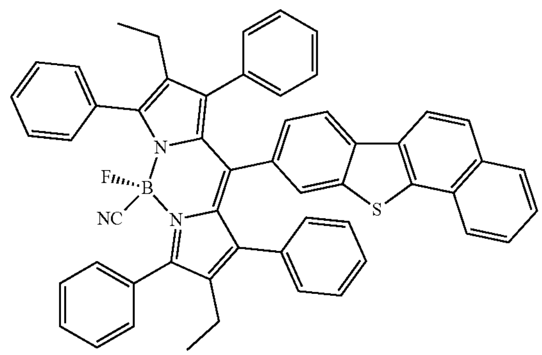
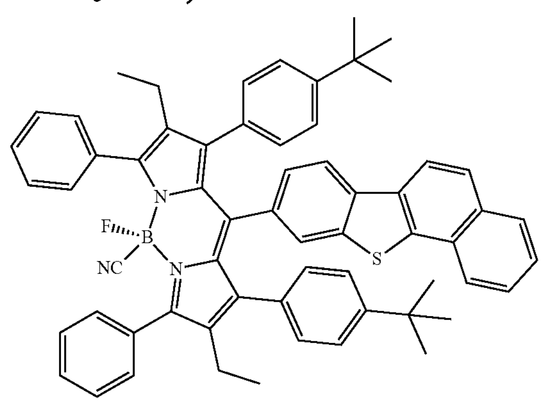
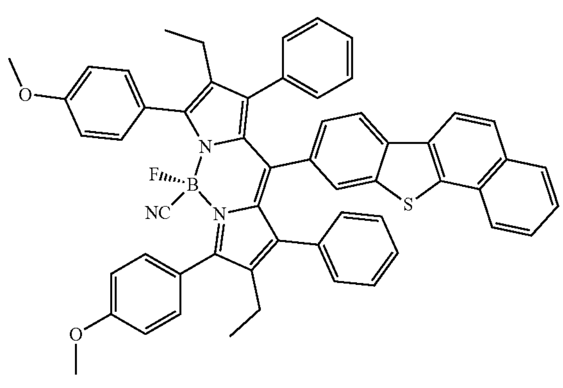

-continued
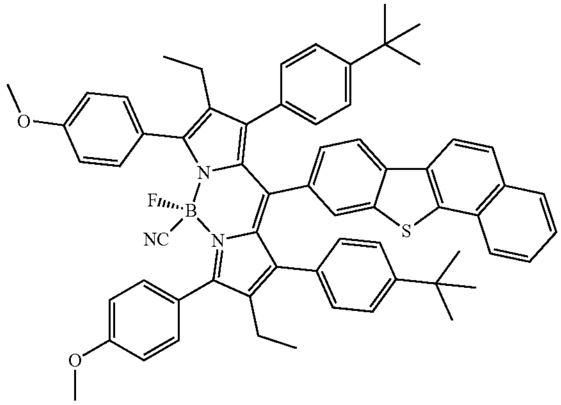
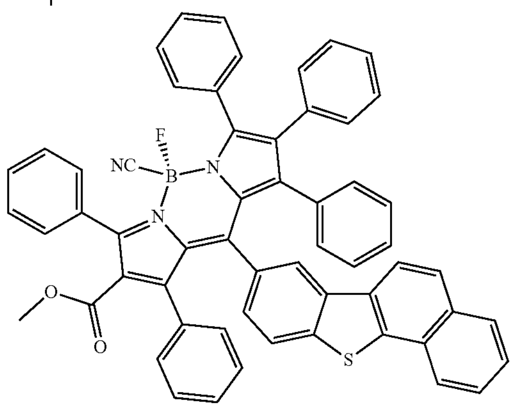
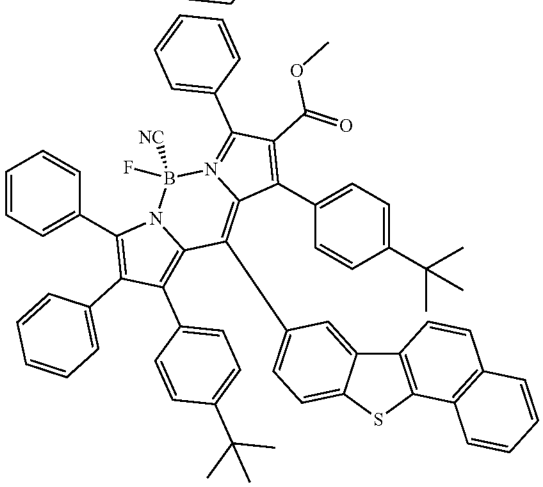
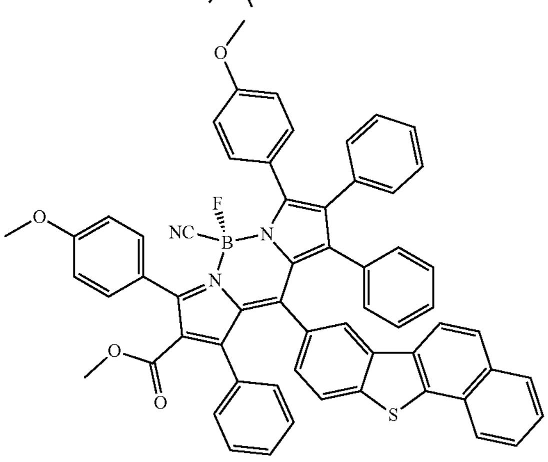
-continued
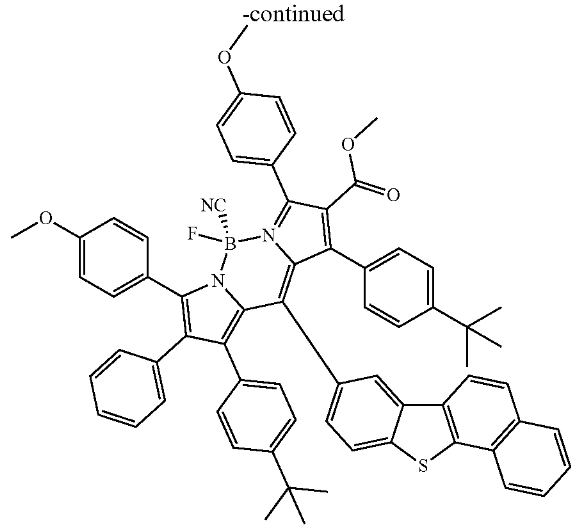
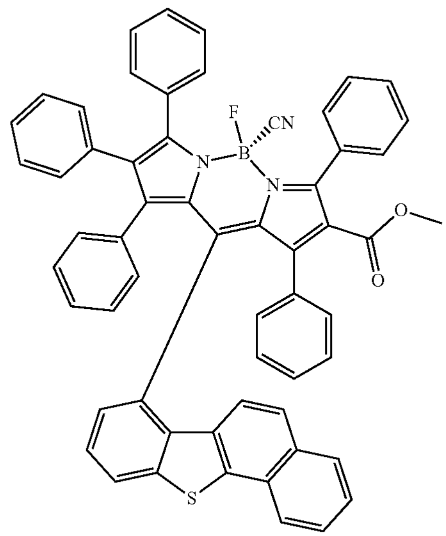
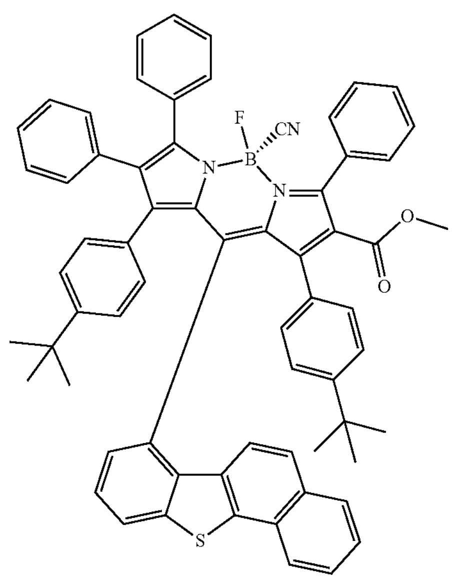

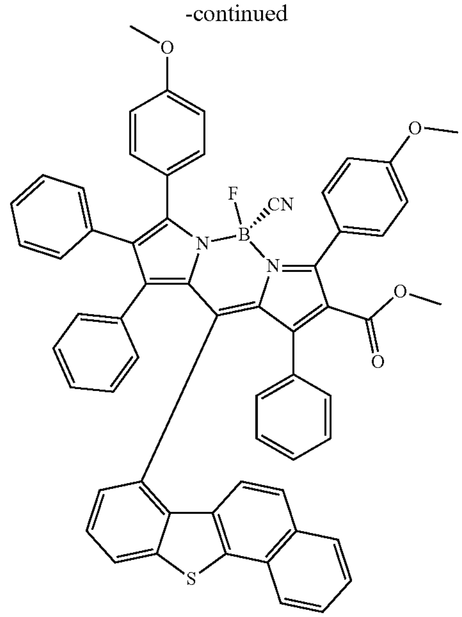
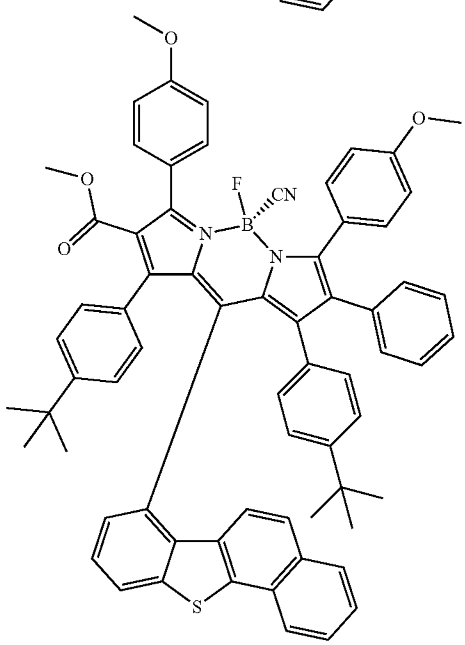
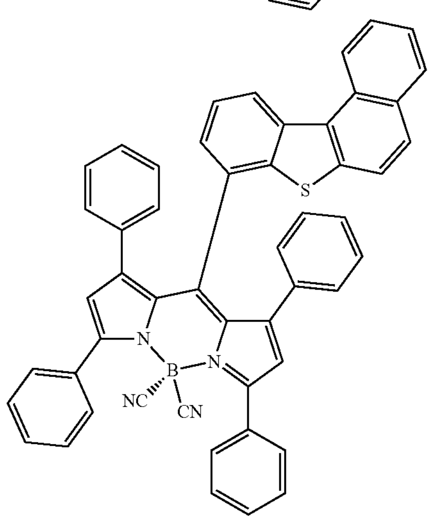
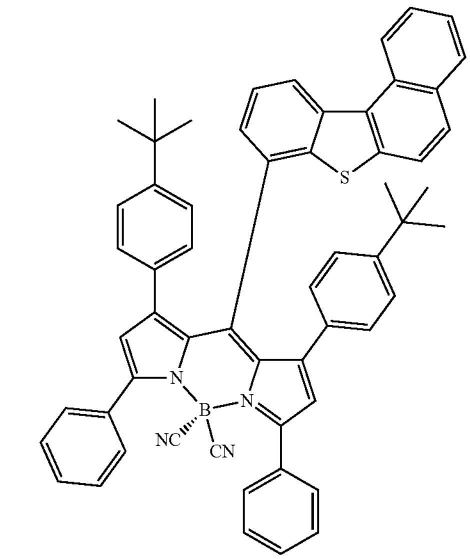
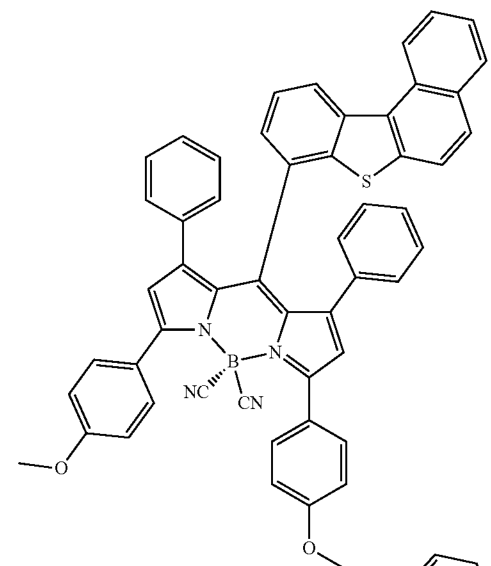
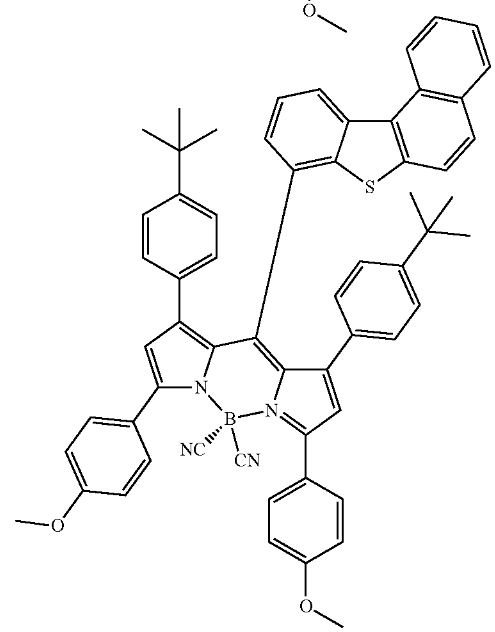

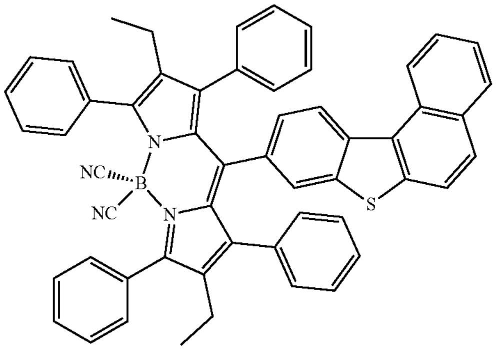
NC
NC
N
B
N
S
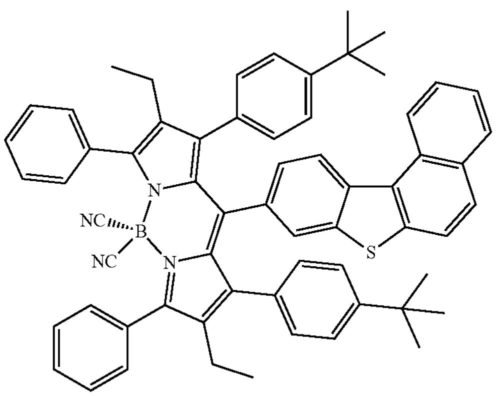
NC
NC
N
B
N
S
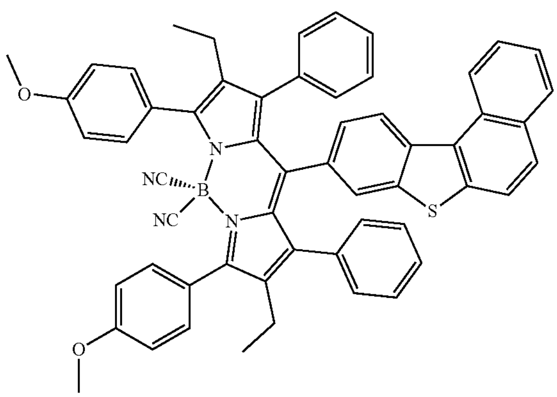
O
NC
NC
N
B
N
S
O
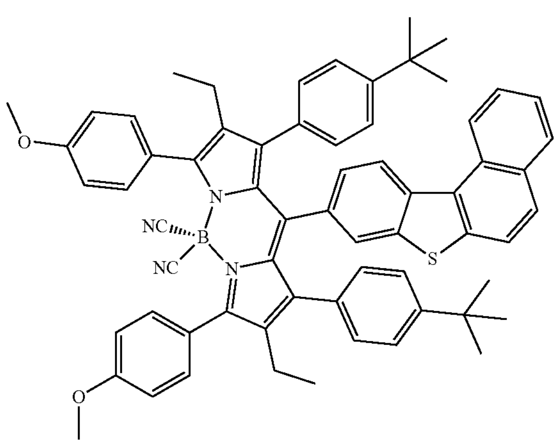
O
NC
NC
N
B
N
S
O
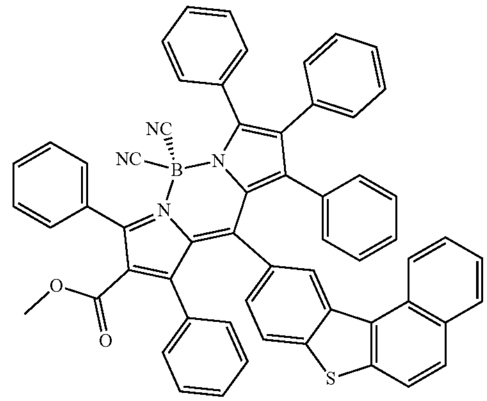
NC
NC
B
N
N
O
O
S
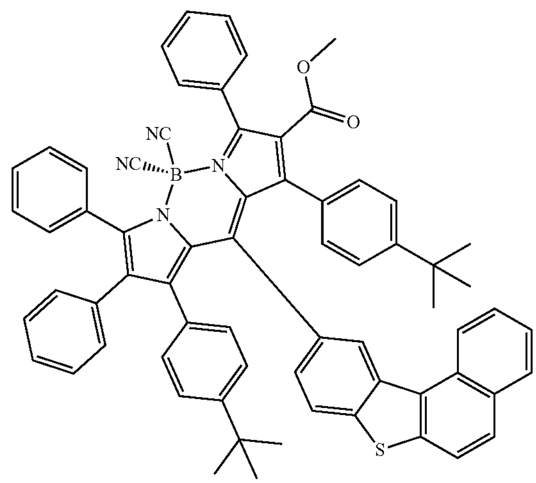
O
O
NC
NC
B
N
N
S
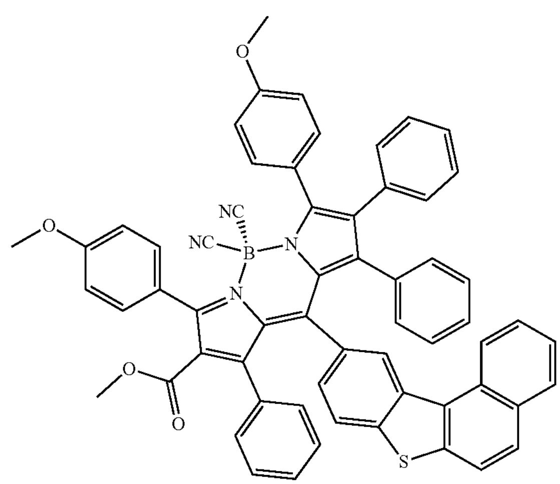
O
O
NC
NC
B
N
N
O
O
S -continued
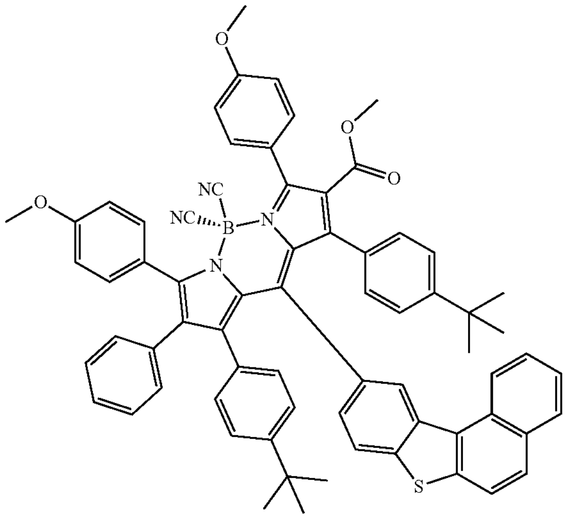
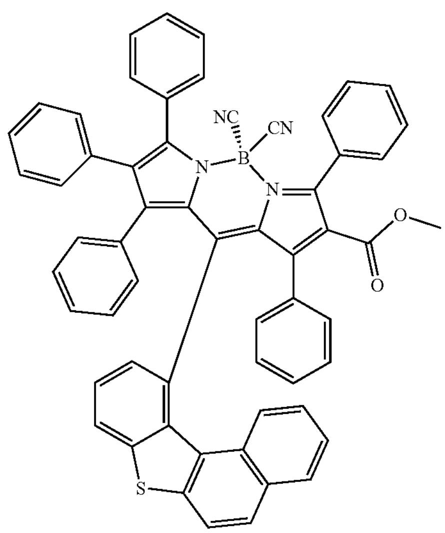
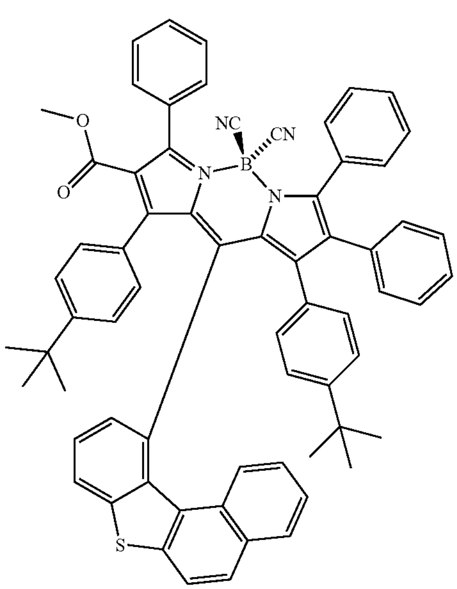
-continued
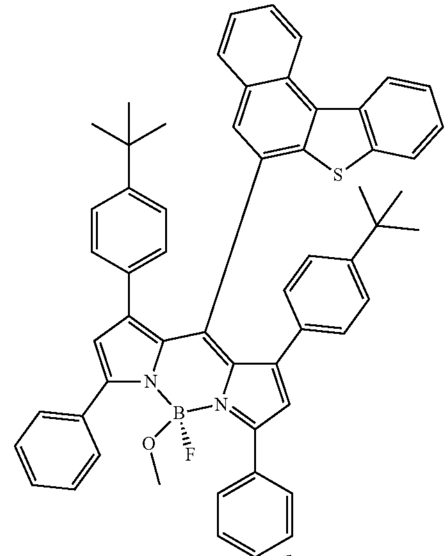
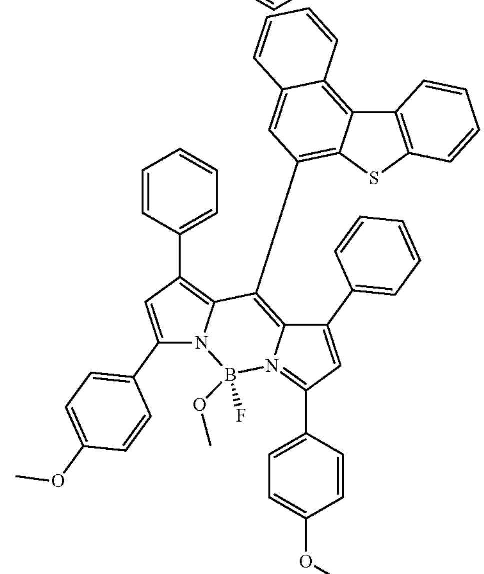
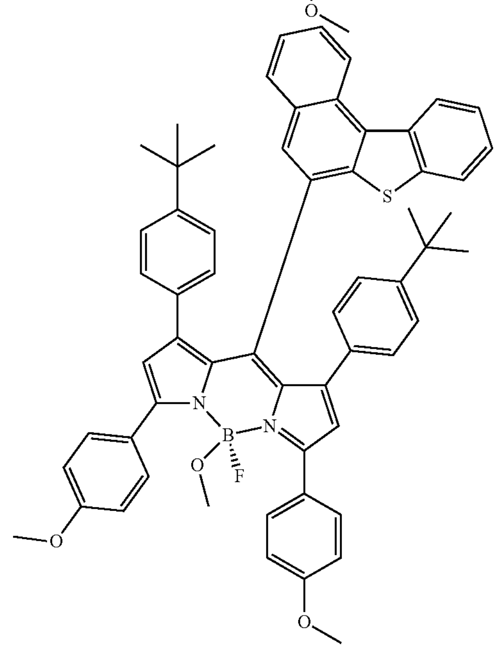

-continued
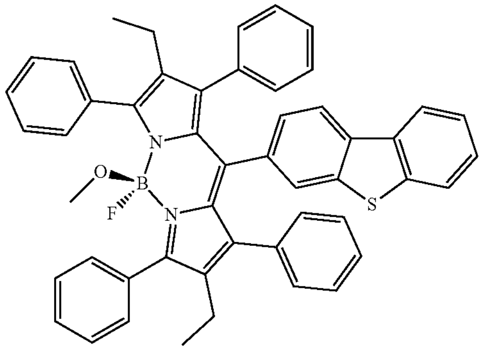
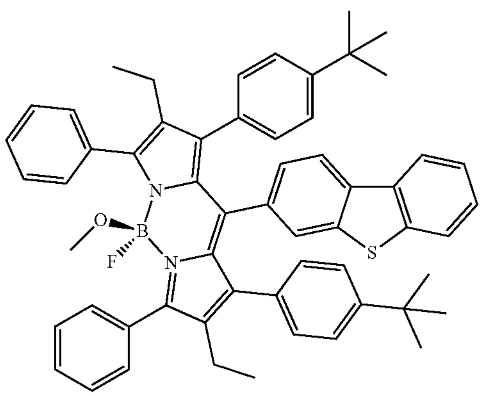
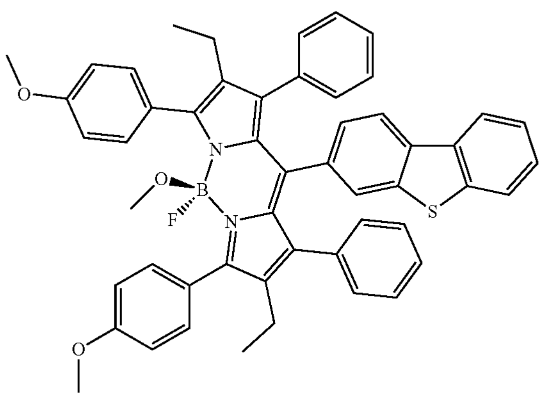
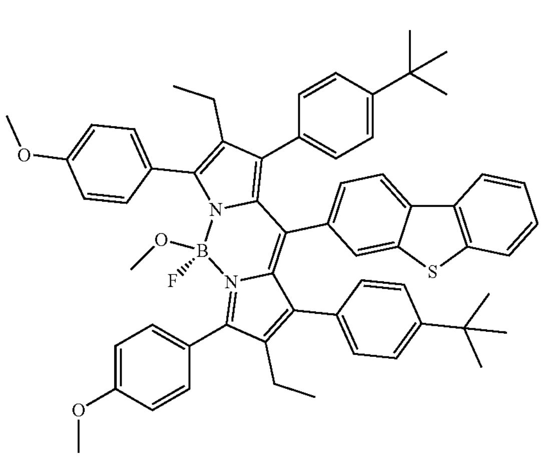
-continued
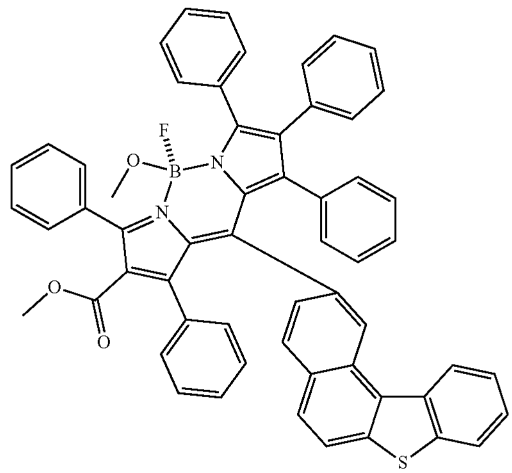
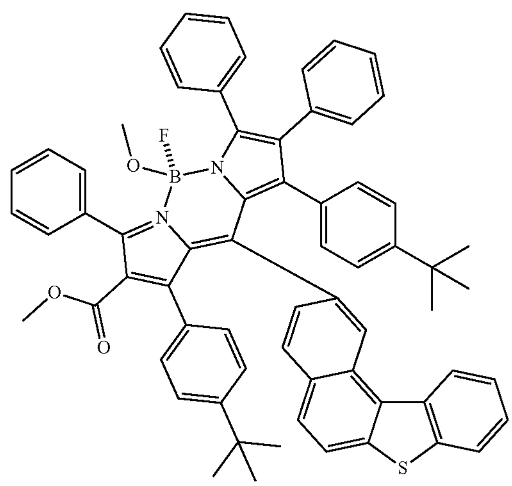
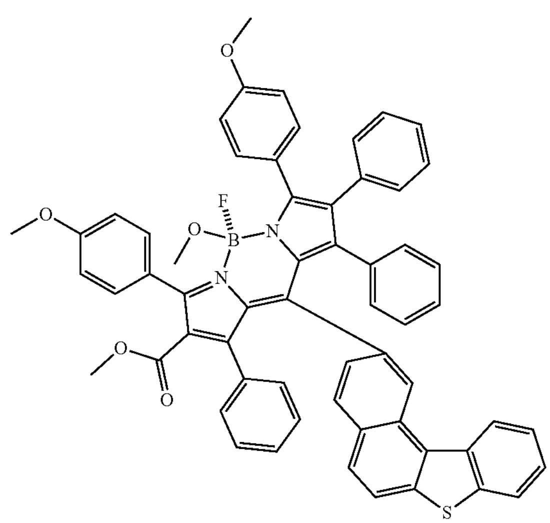

-continued
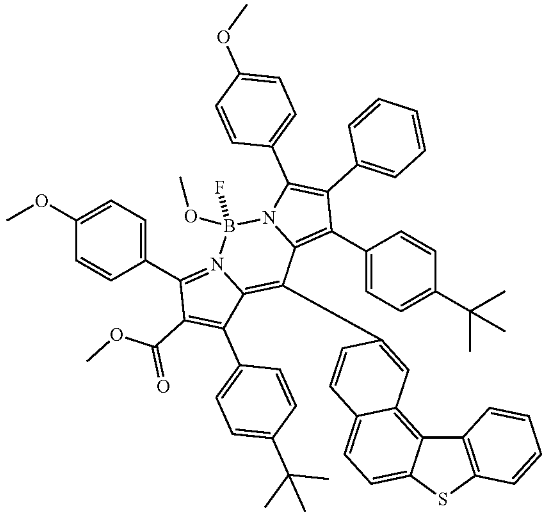
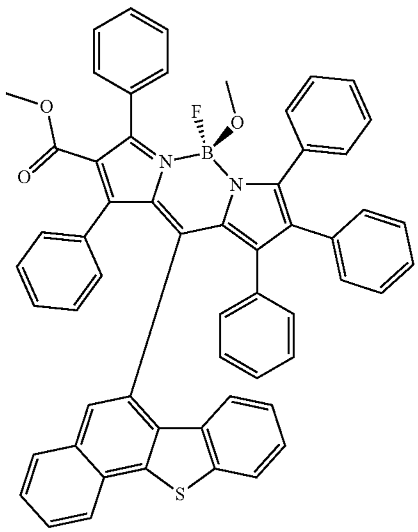
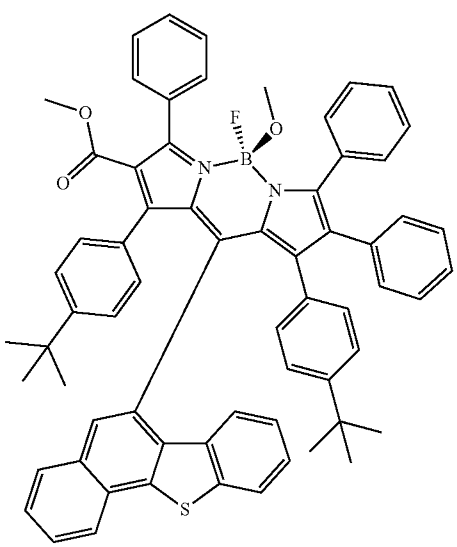
-continued
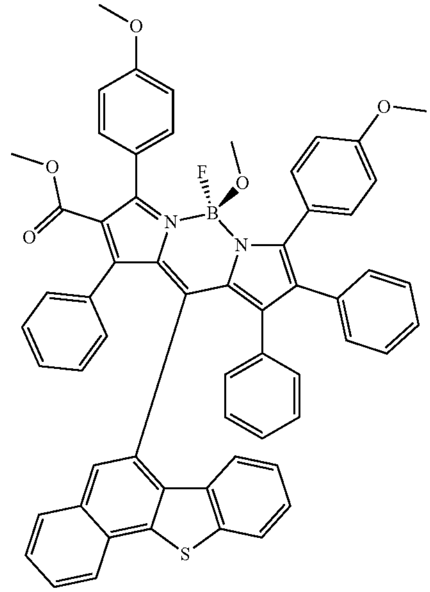
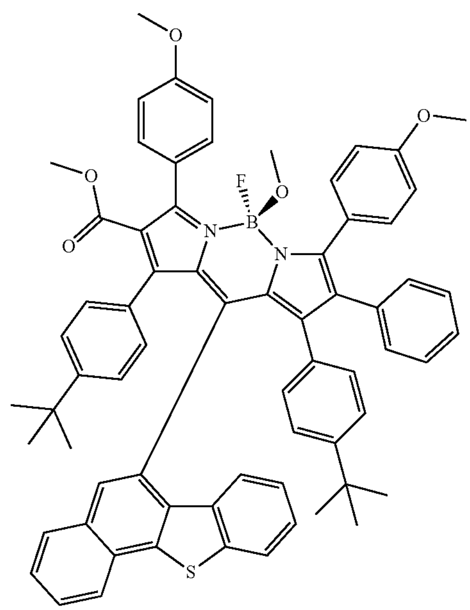
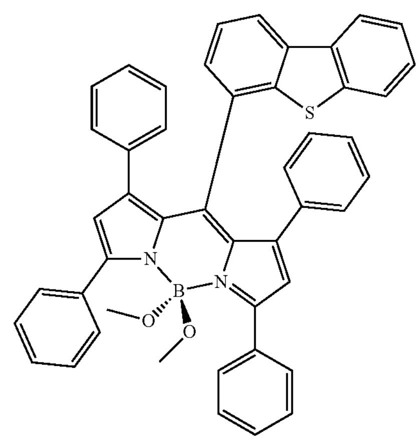

-continued
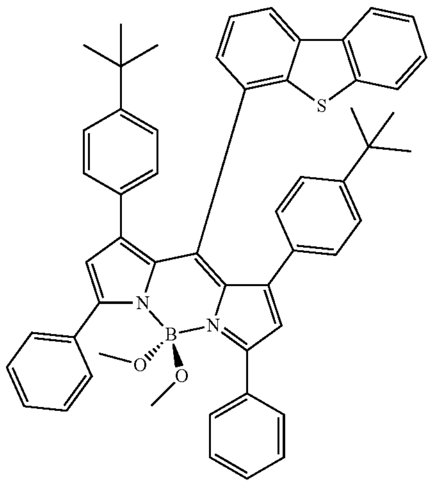
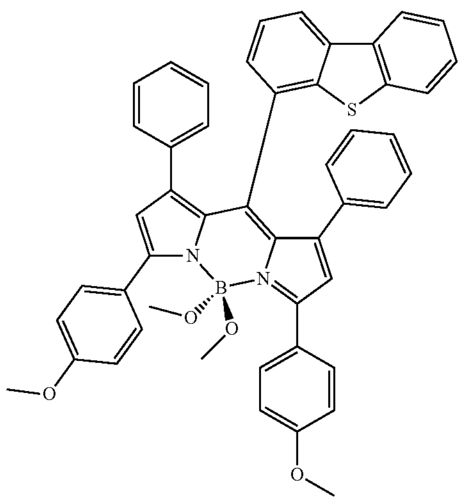
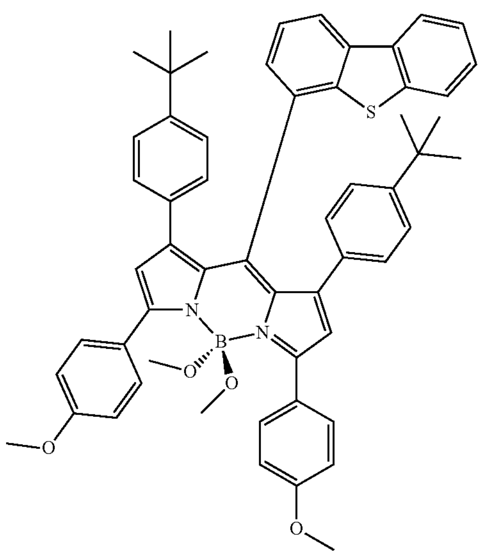
-continued
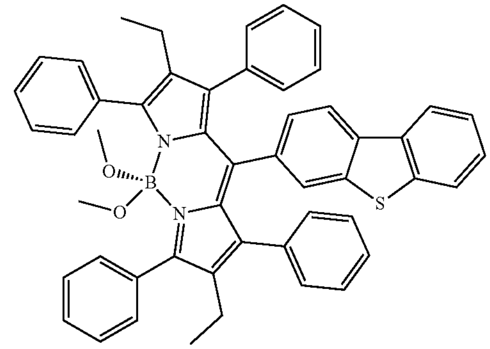
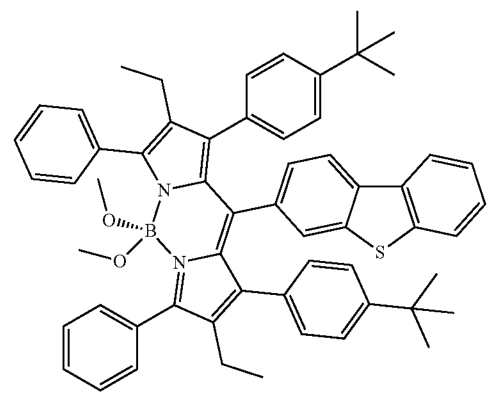
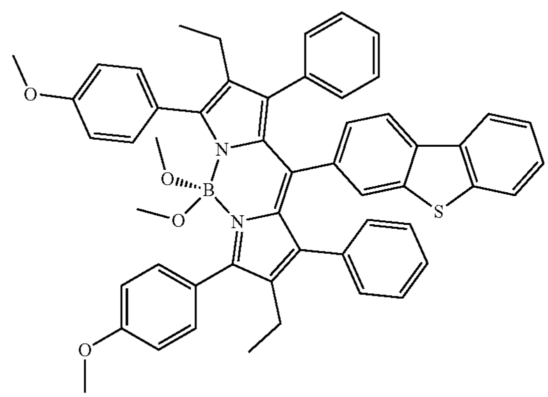
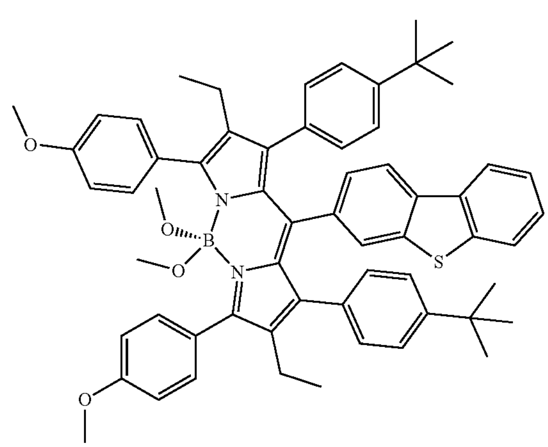

-continued
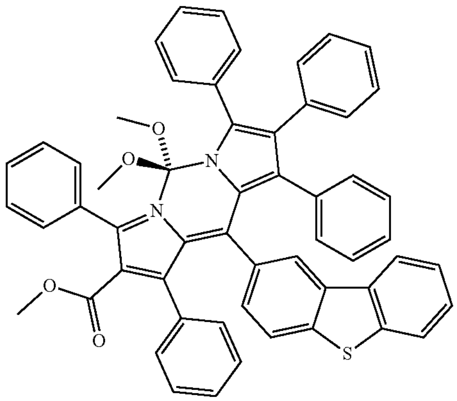
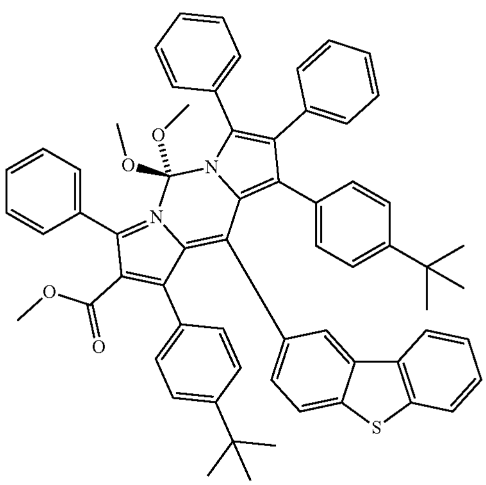
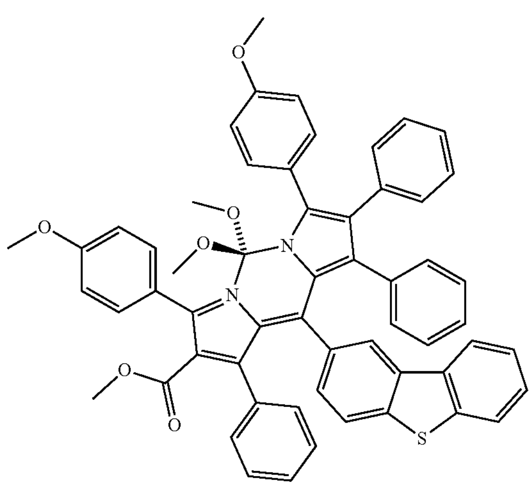
-continued
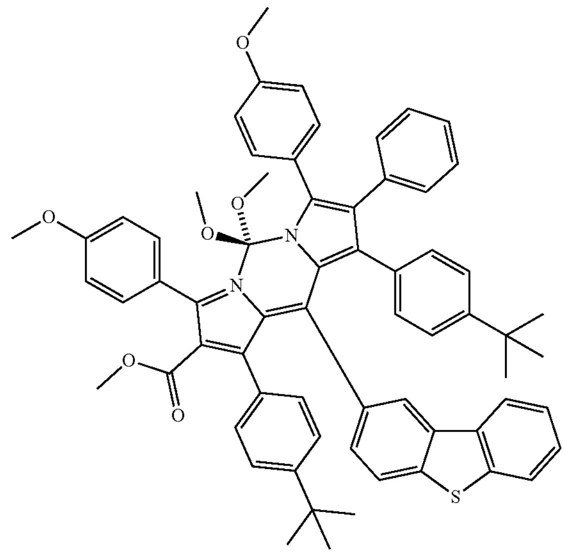
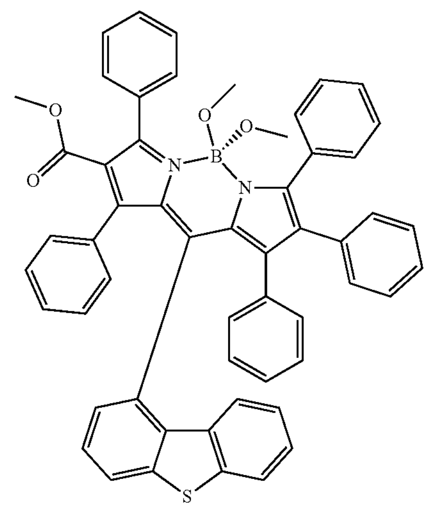
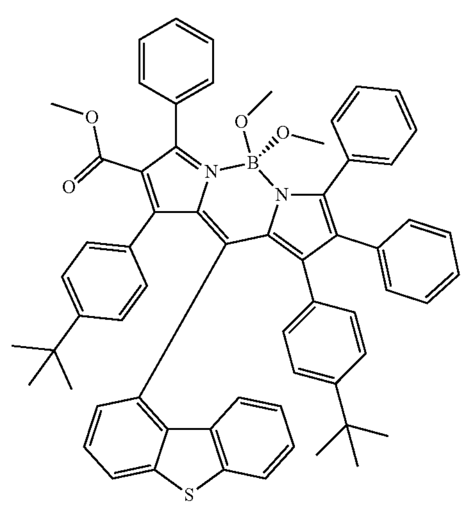

-continued
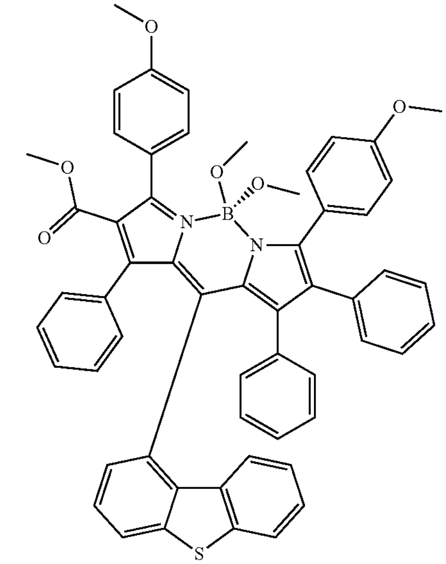
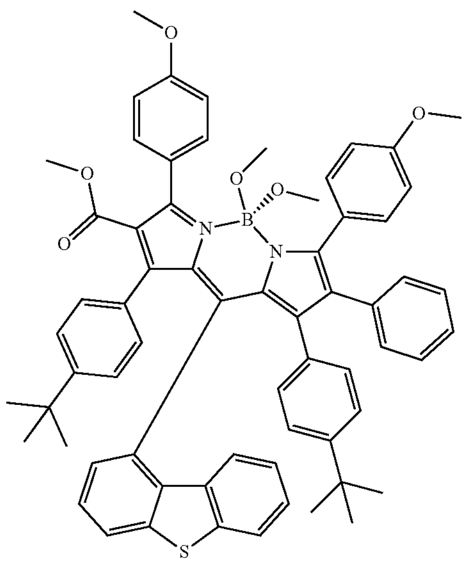
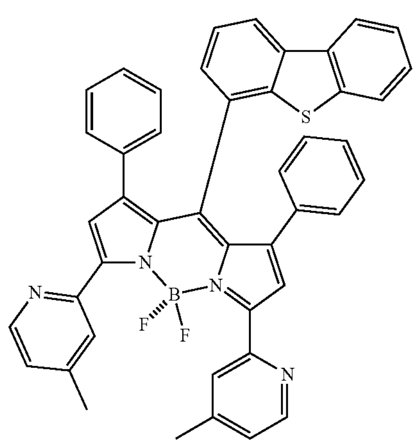
-continued
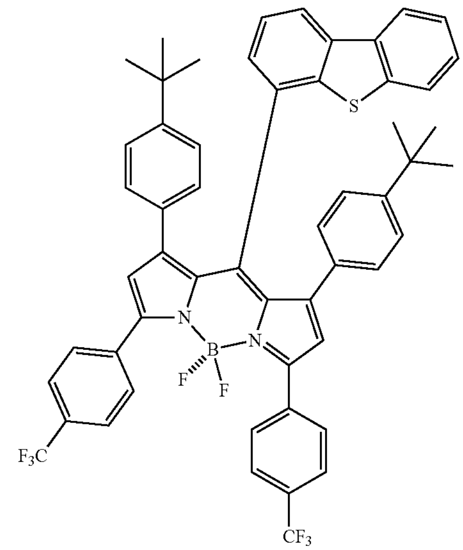
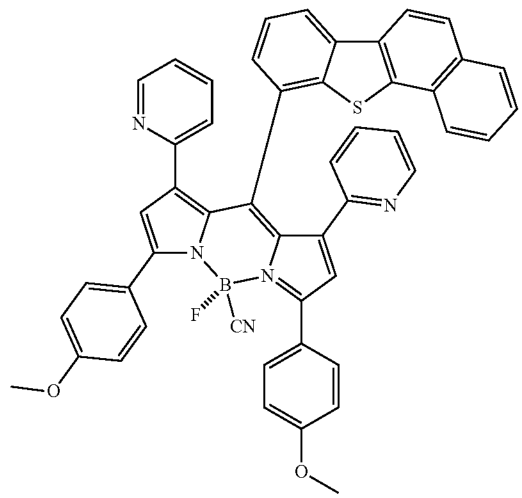
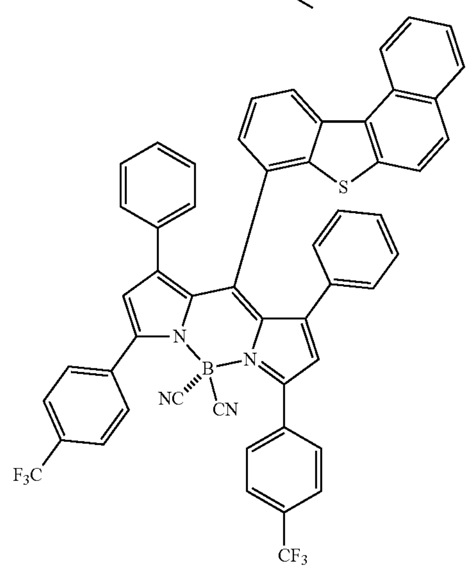

-continued
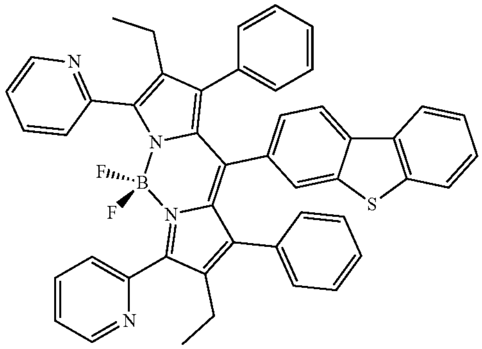
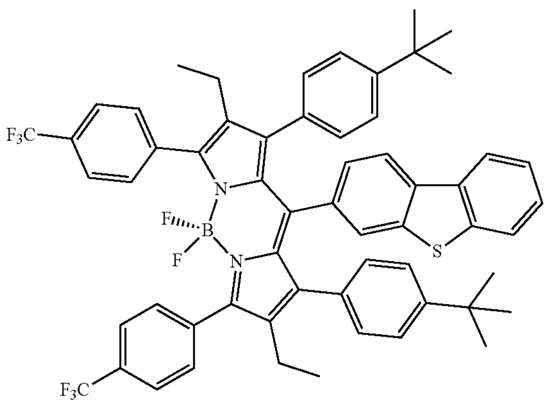
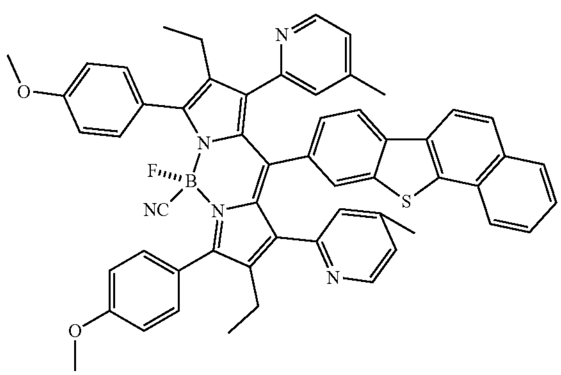
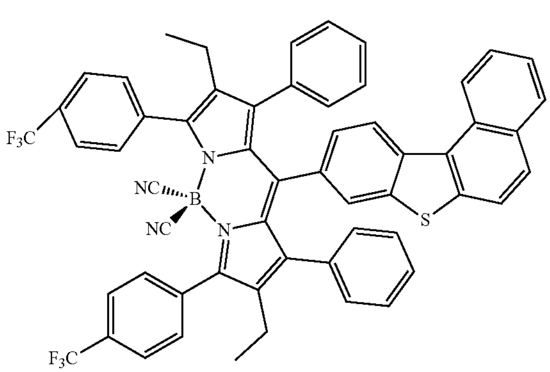
-continued
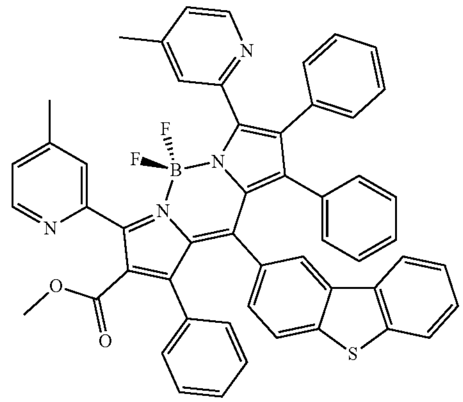
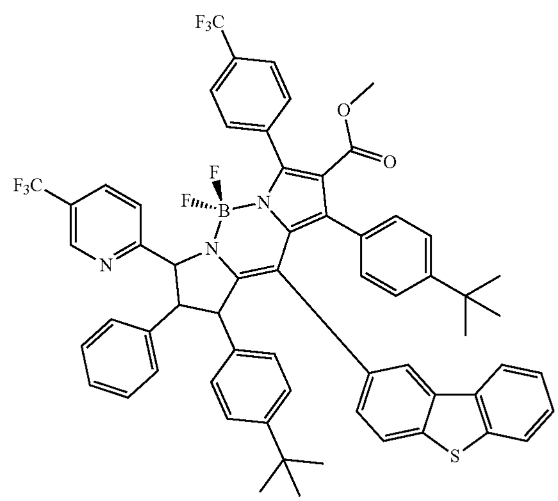
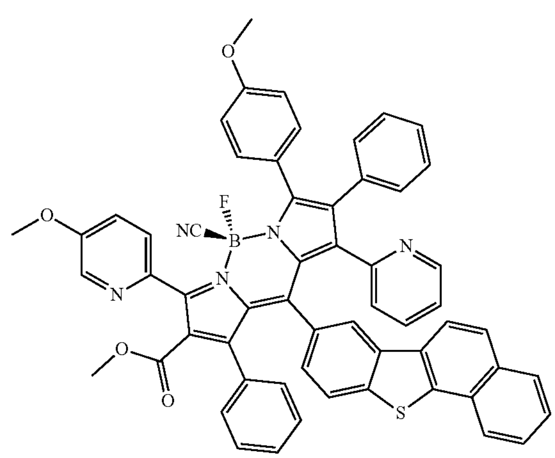

-continued
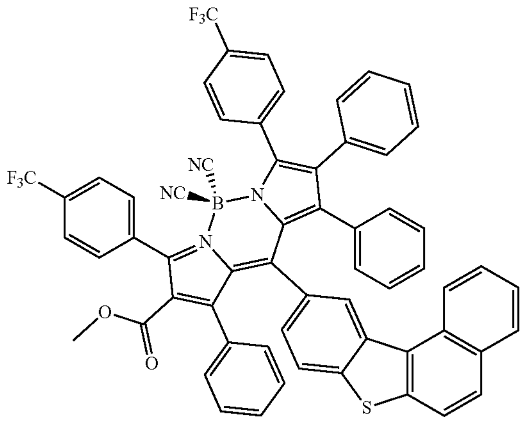
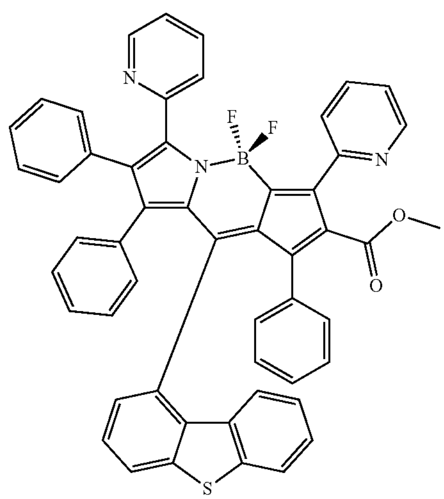
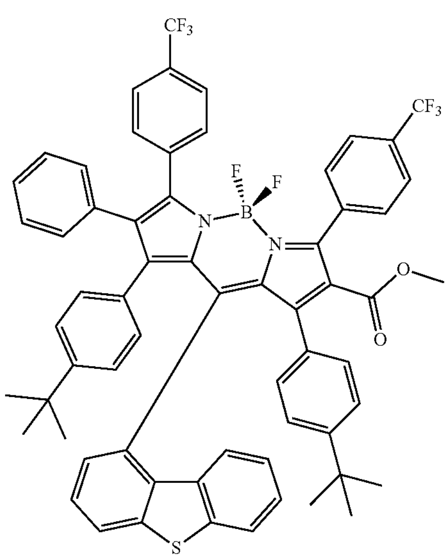
-continued
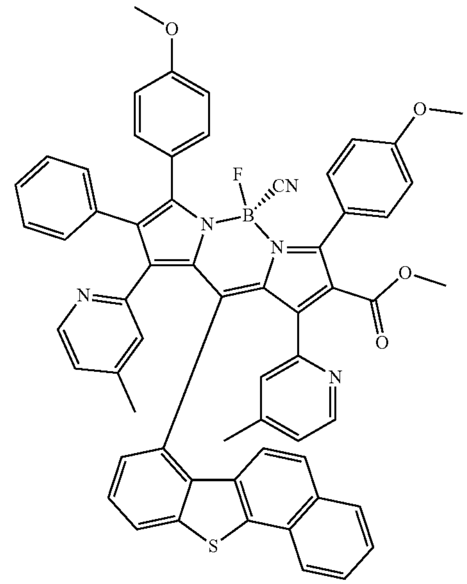
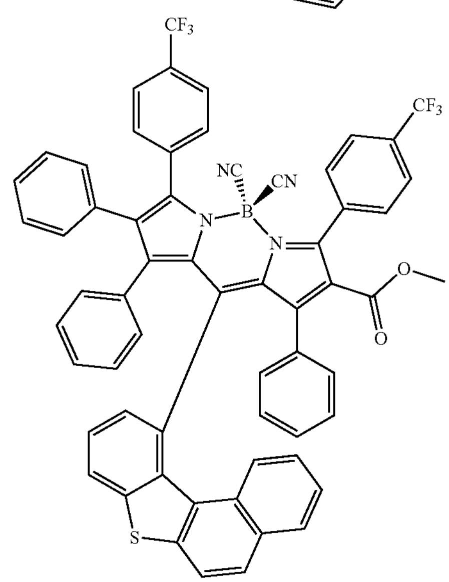
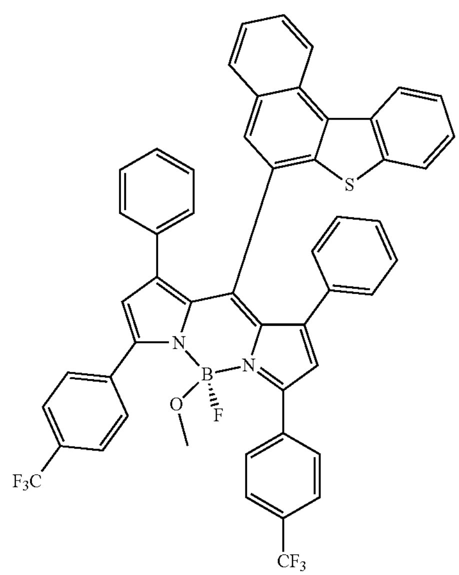

-continued
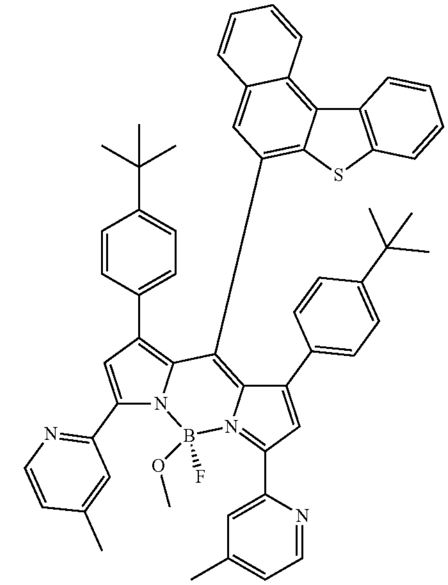
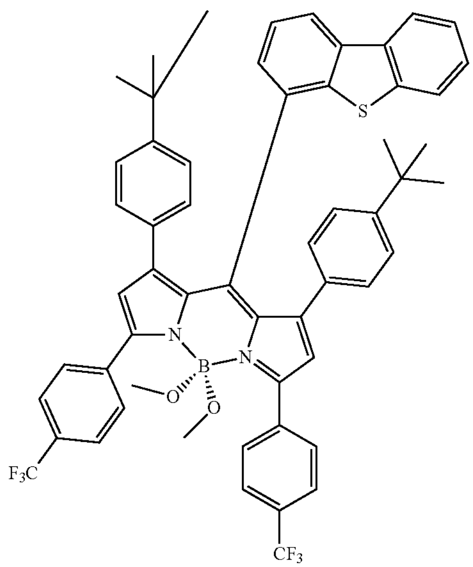
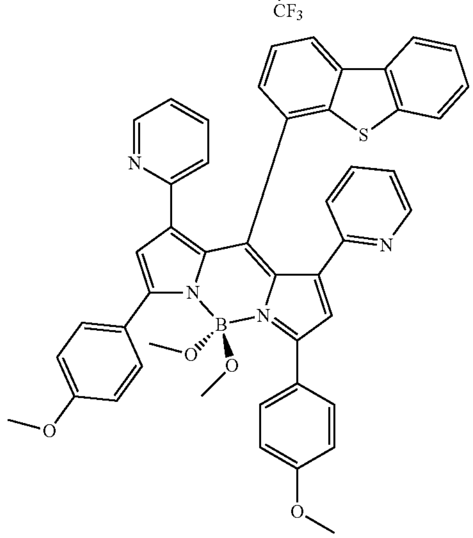
-continued
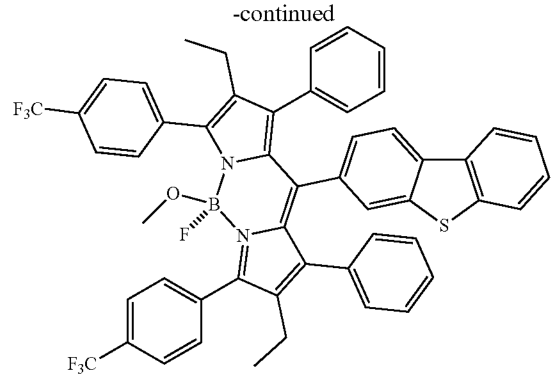
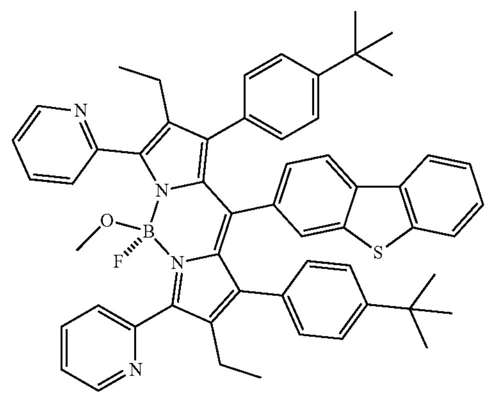
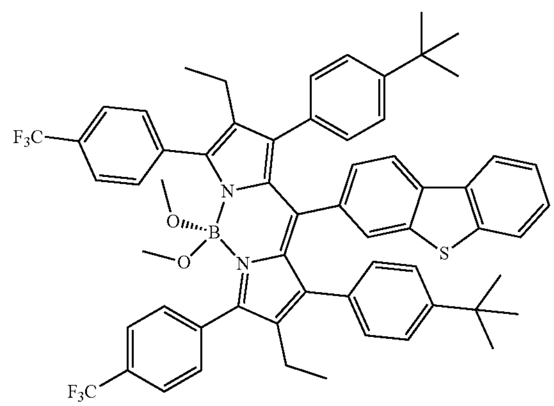
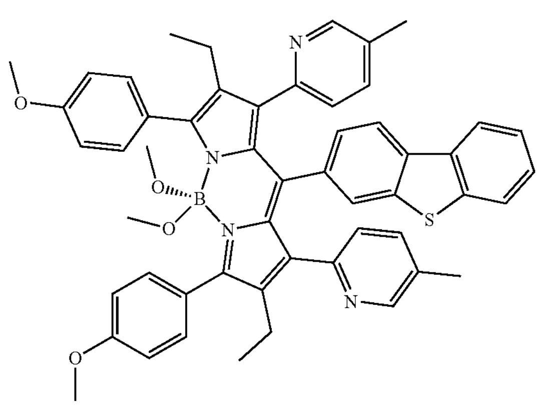

-continued
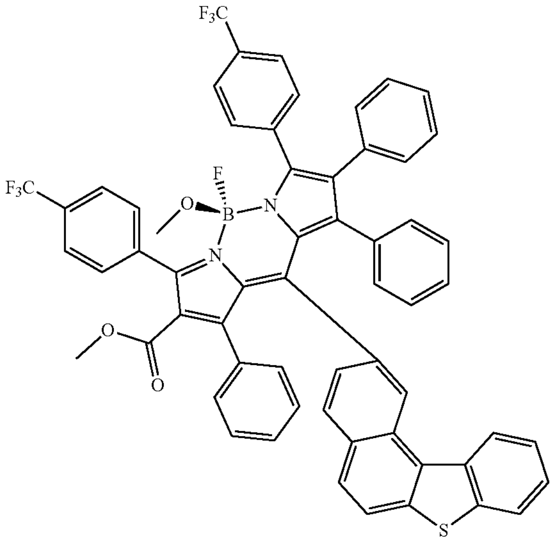
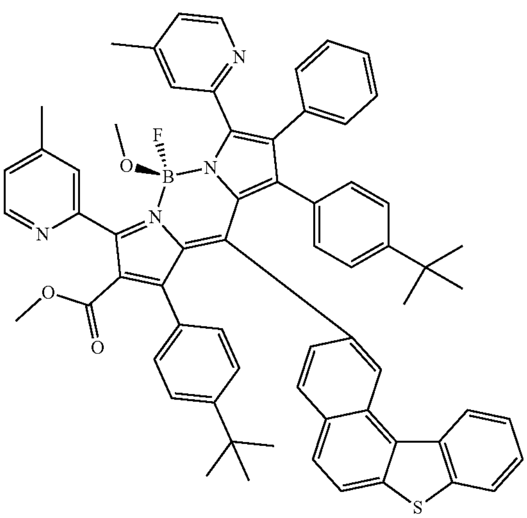
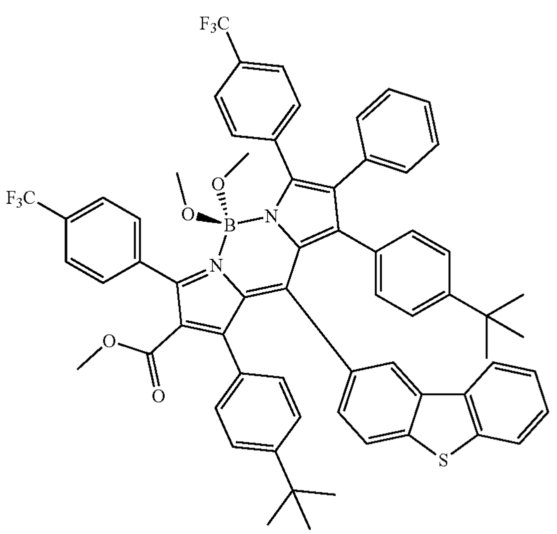
-continued
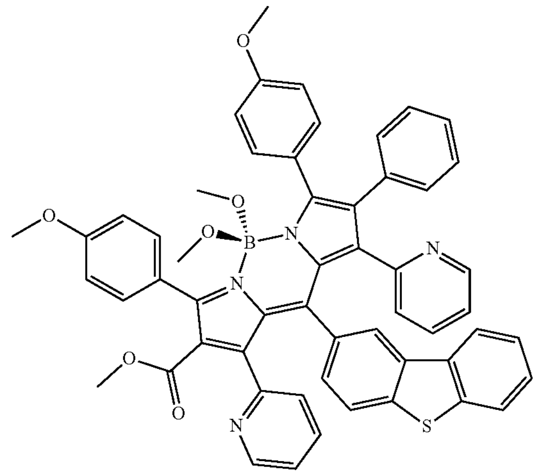
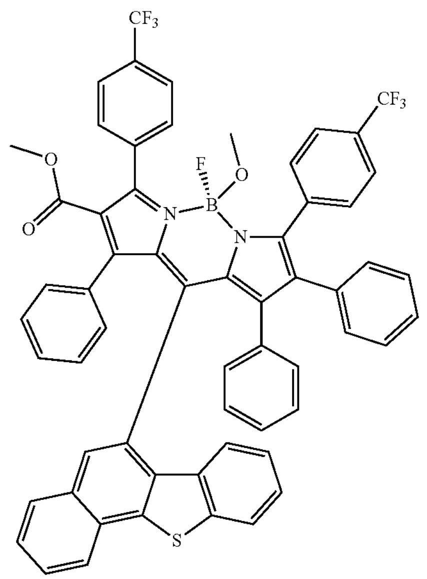
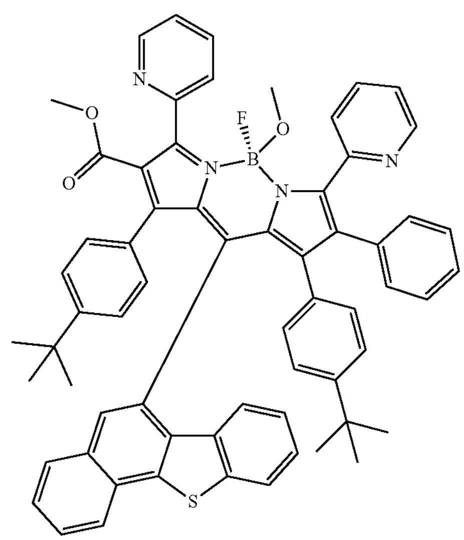

-continued
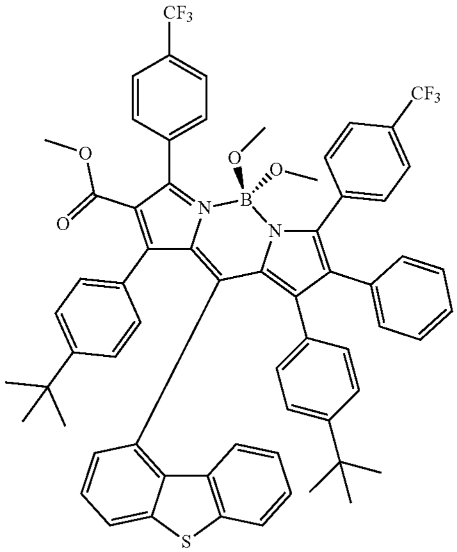
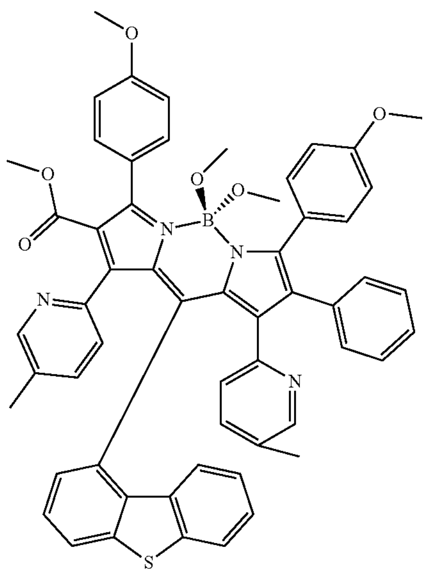
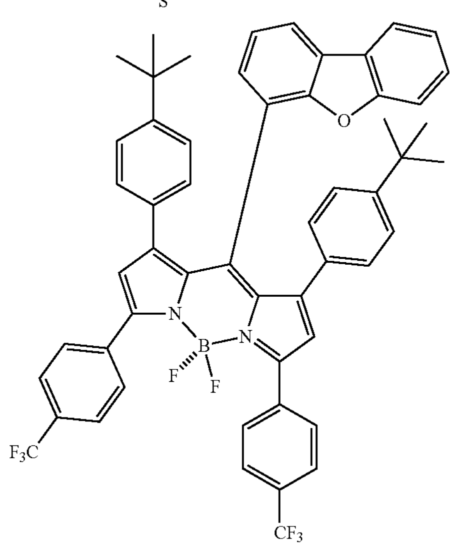
-continued
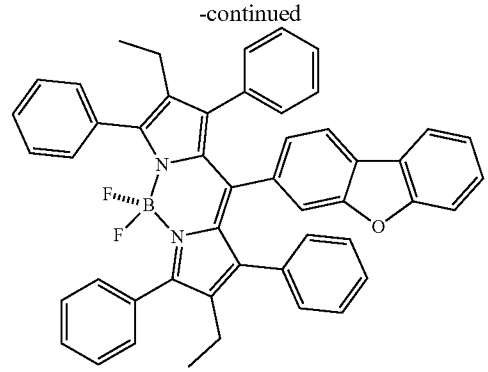
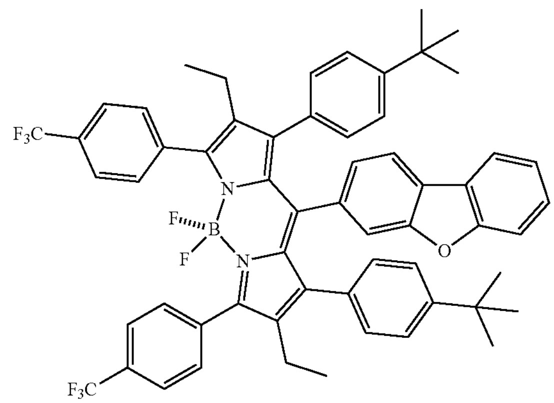
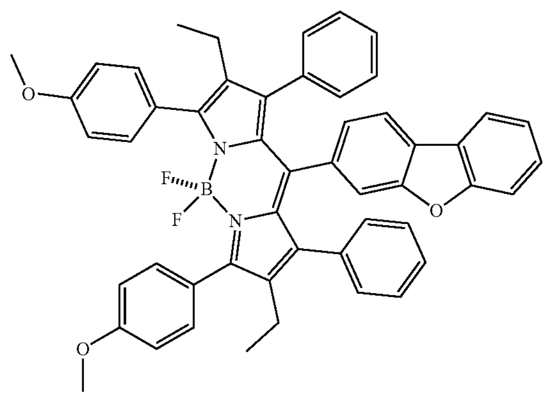
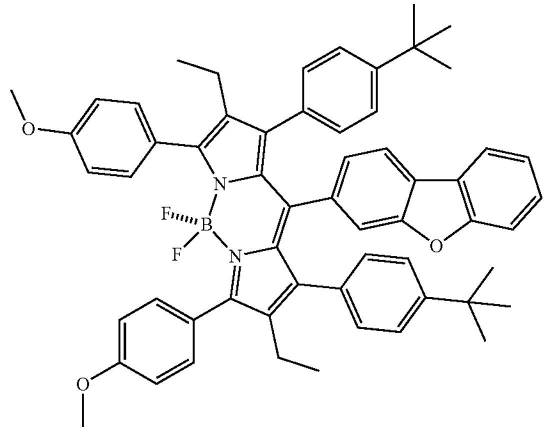

-continued
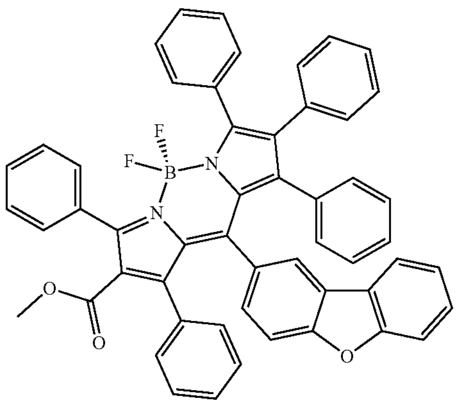
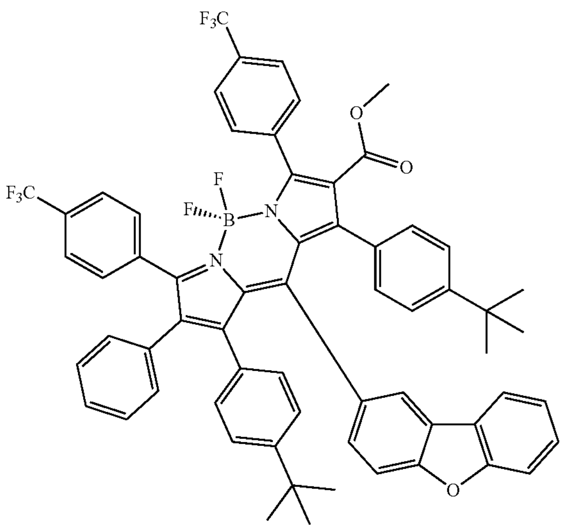
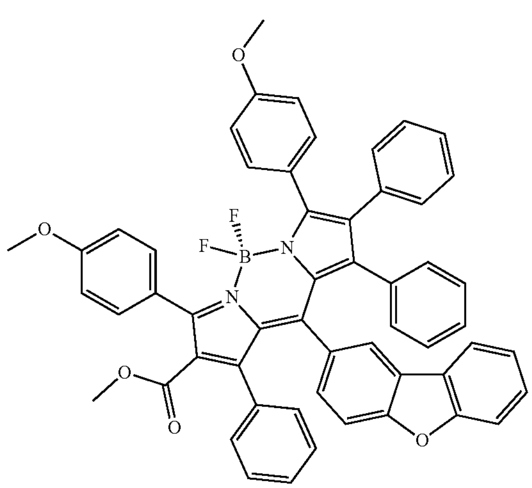
-continued
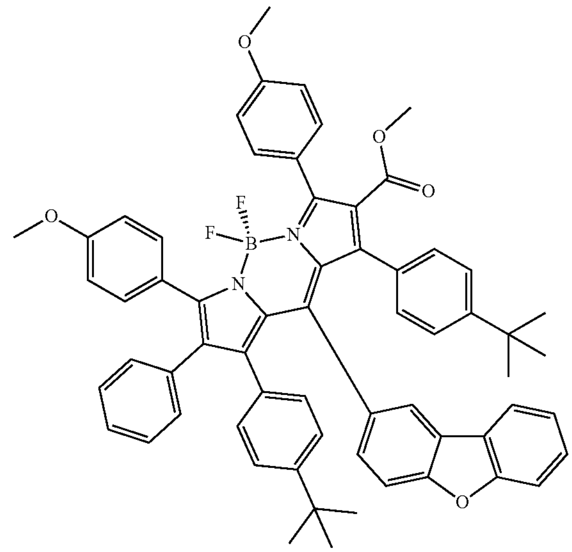
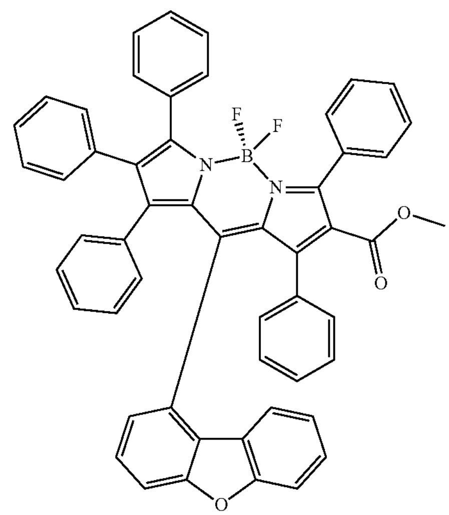
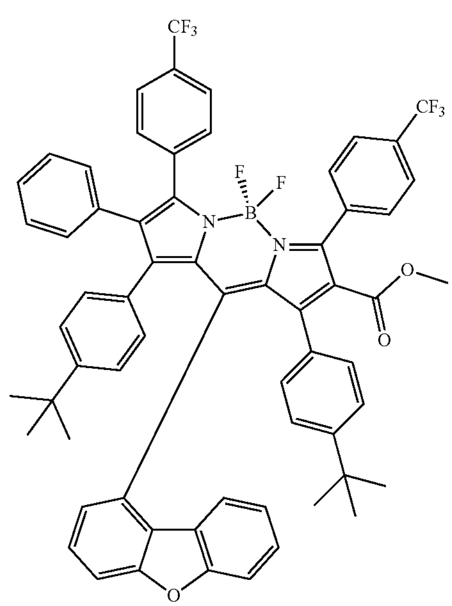

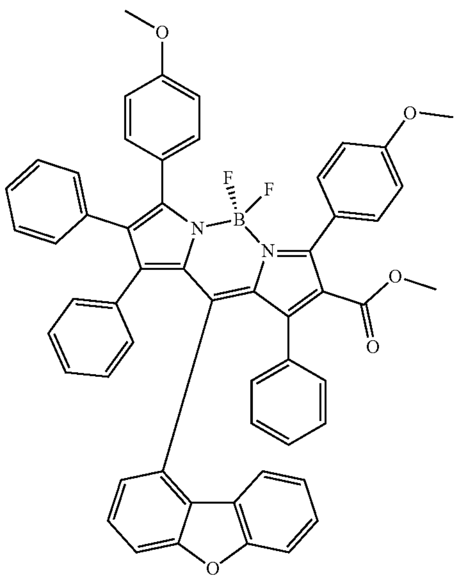
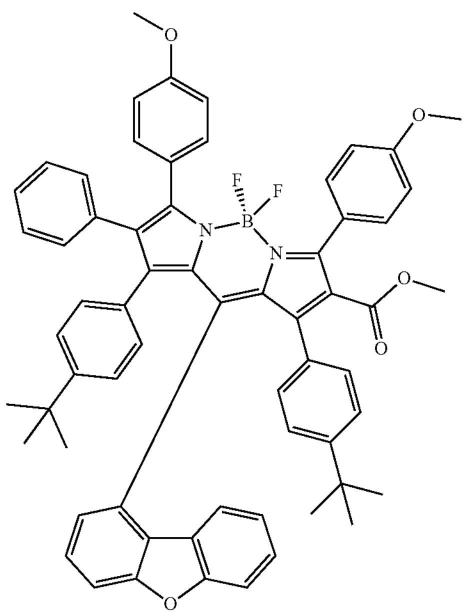
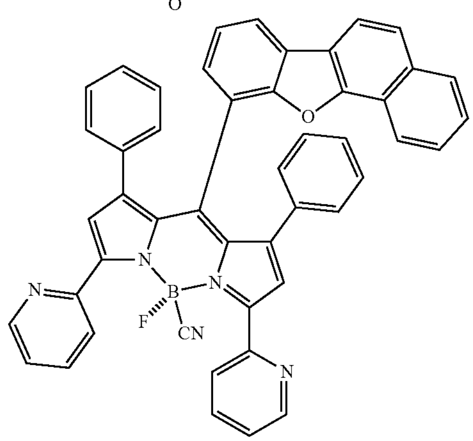
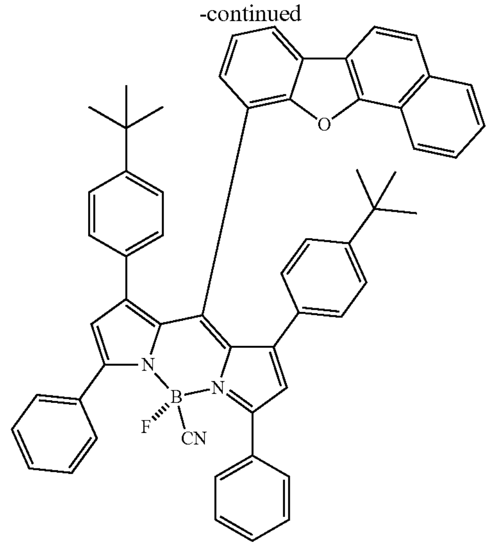
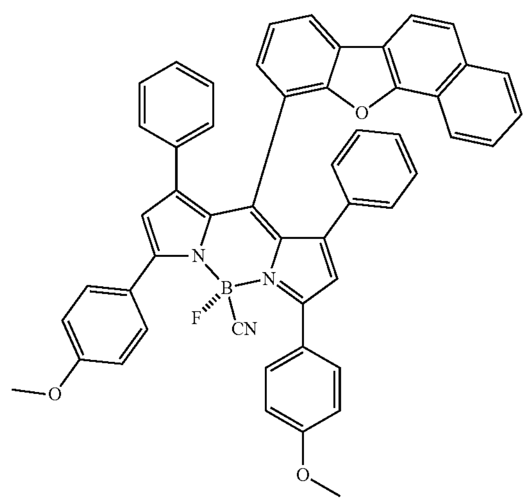
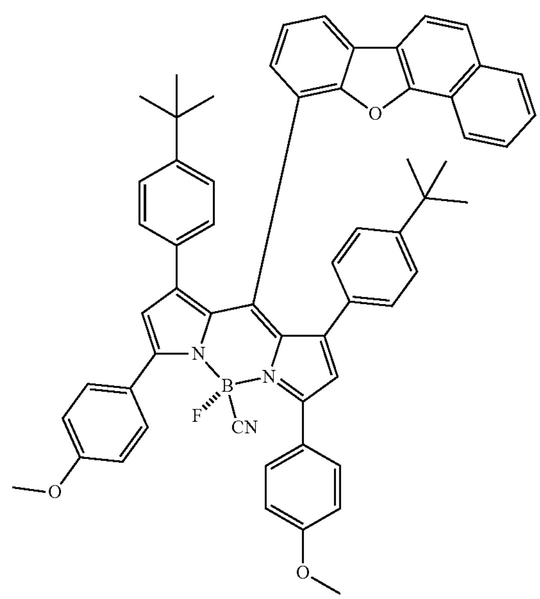

-continued
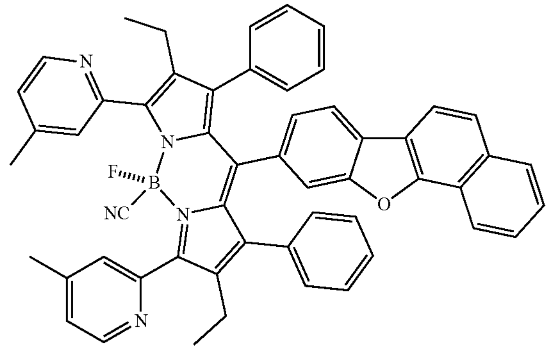
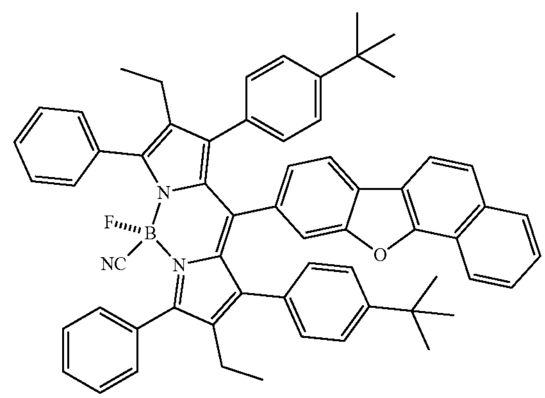
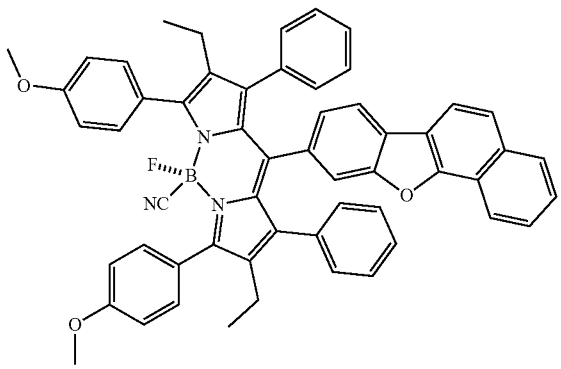
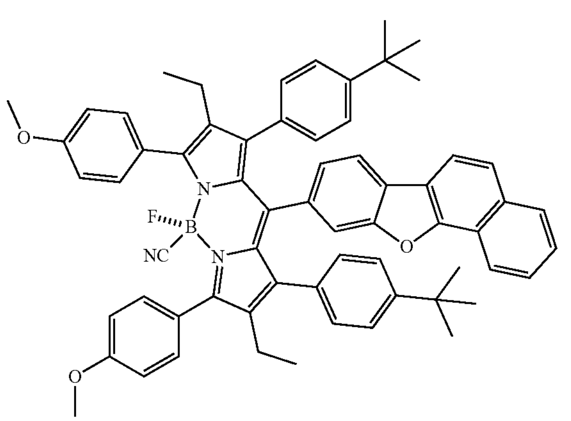
-continued
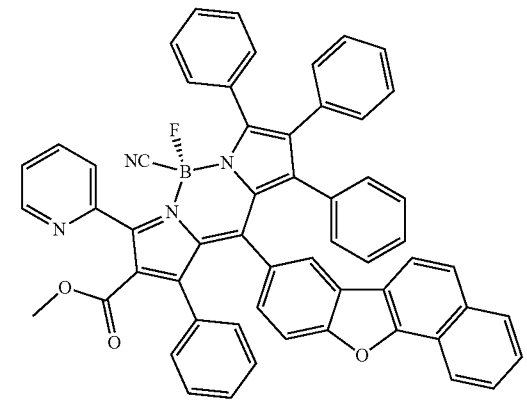
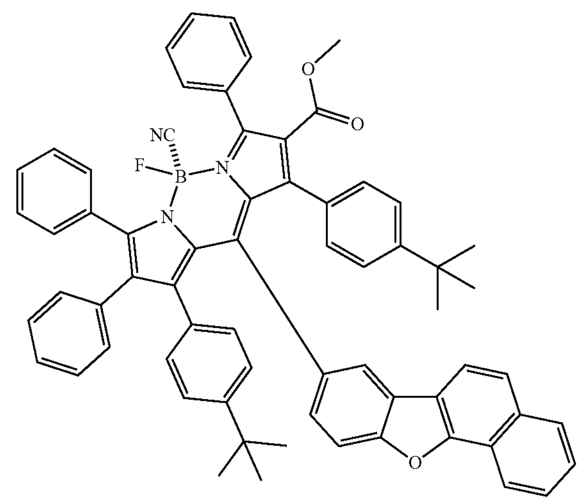
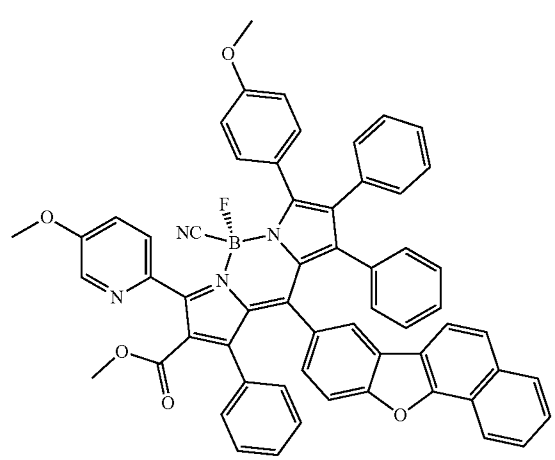

-continued
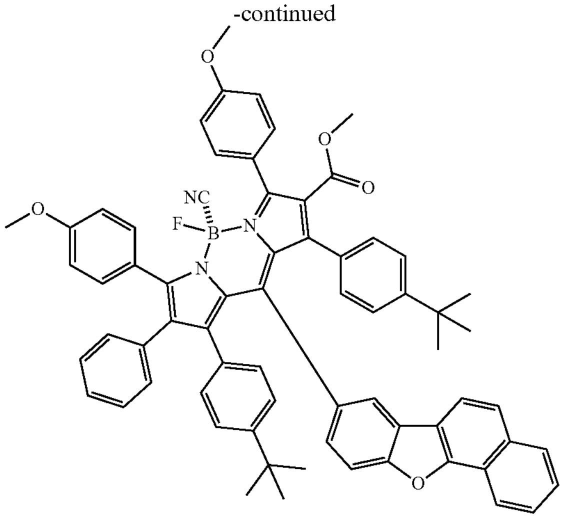
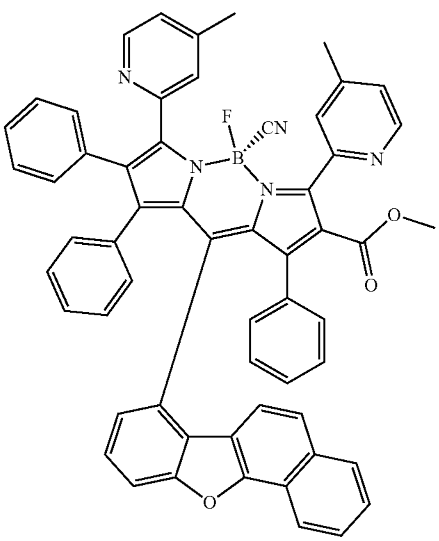
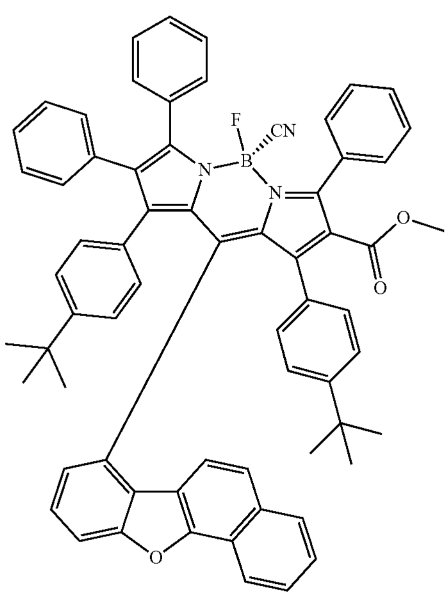
-continued
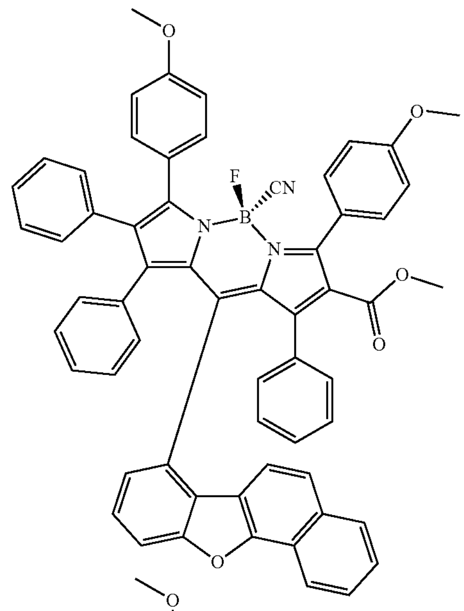
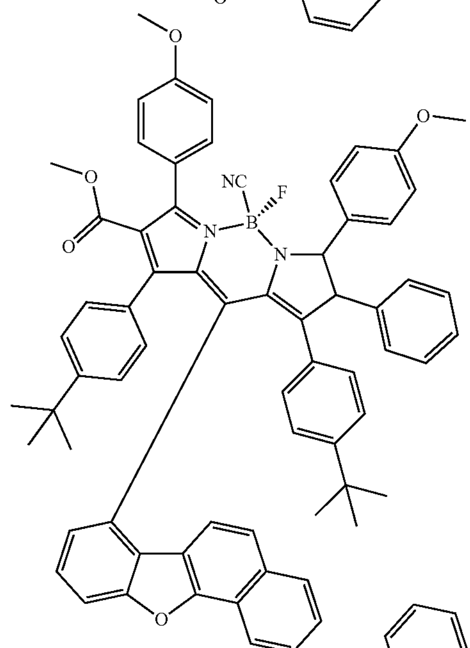
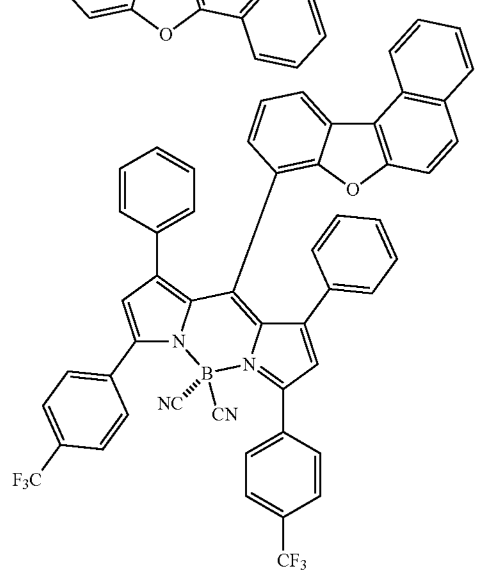

-continued
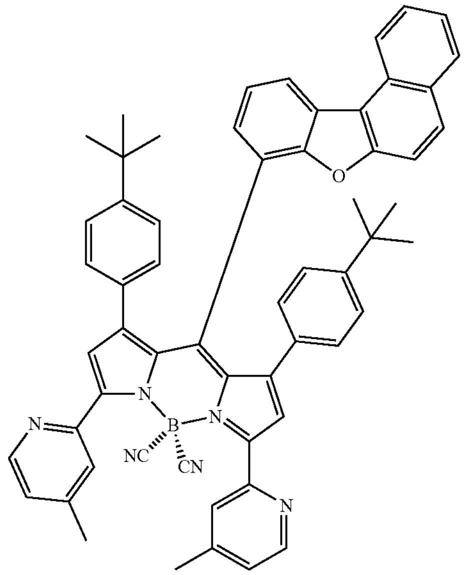
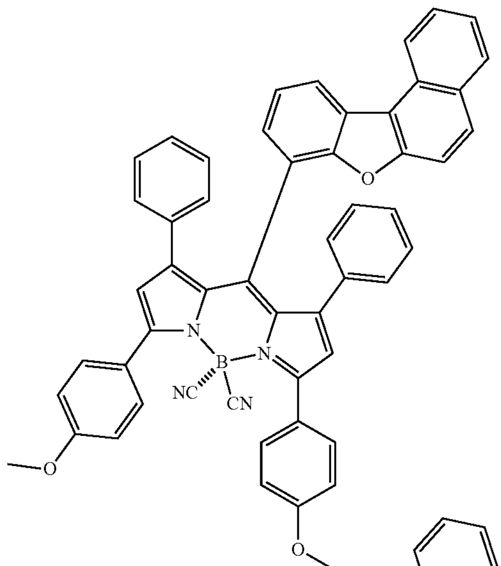
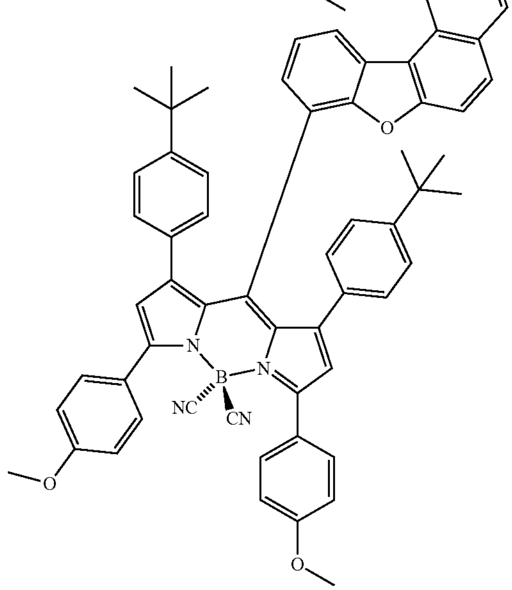
-continued
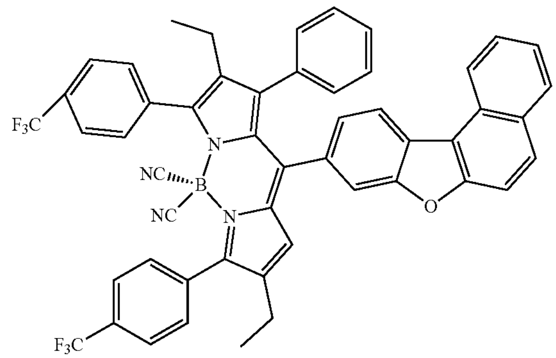
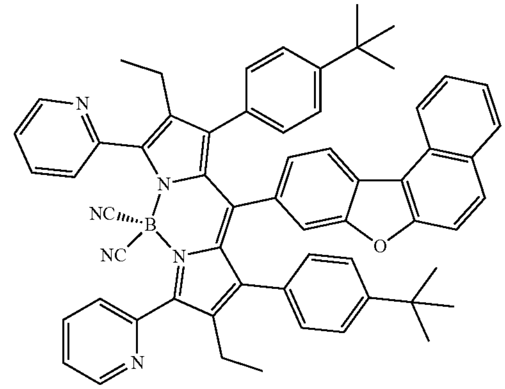
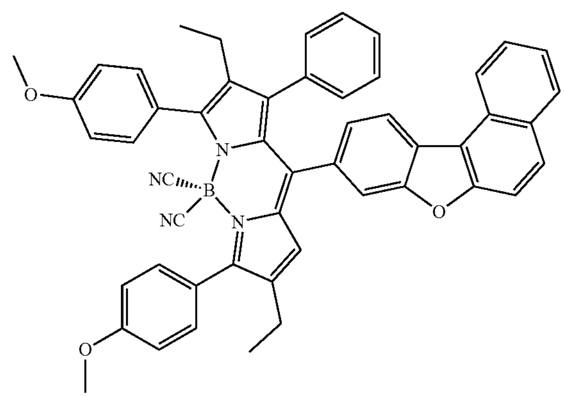
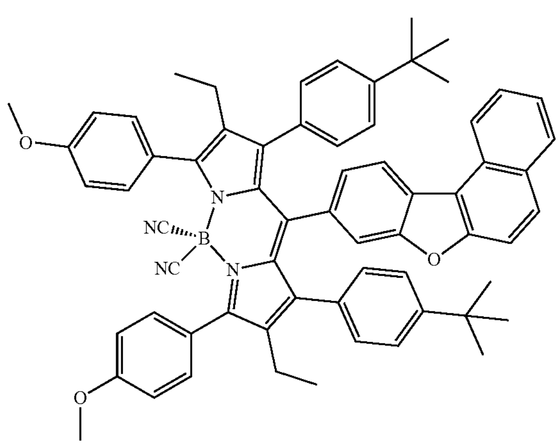

-continued
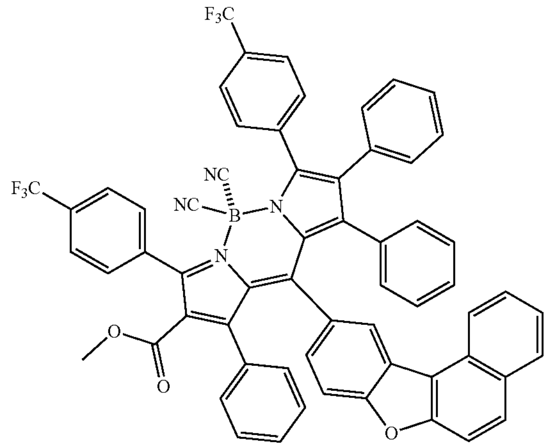
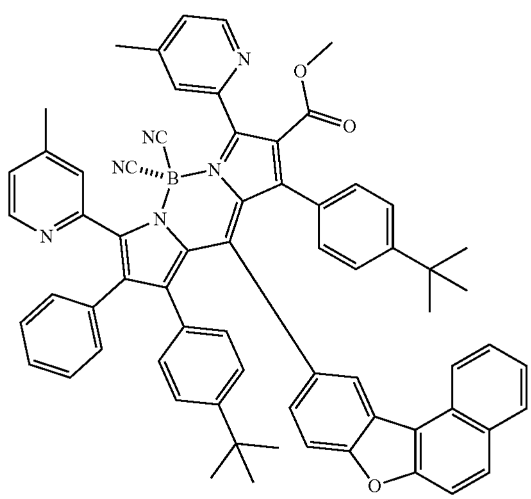
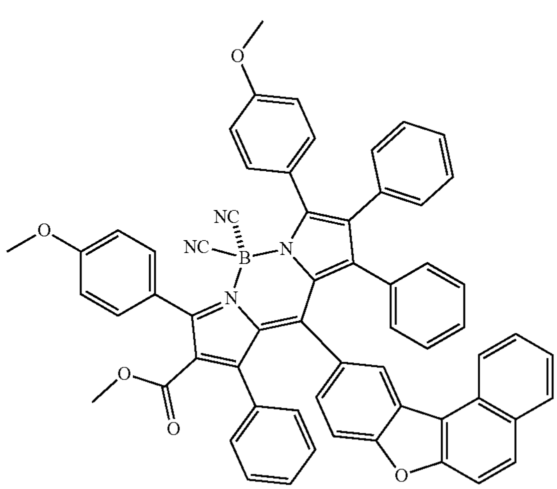
-continued
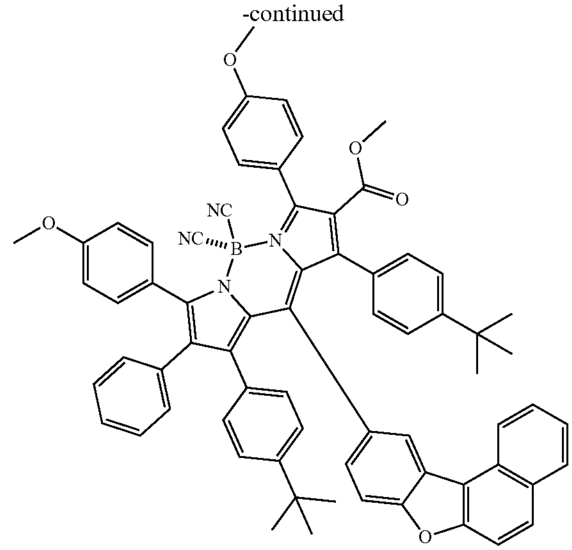
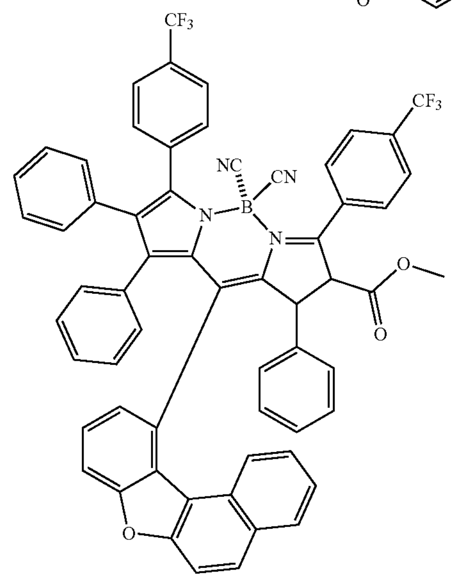
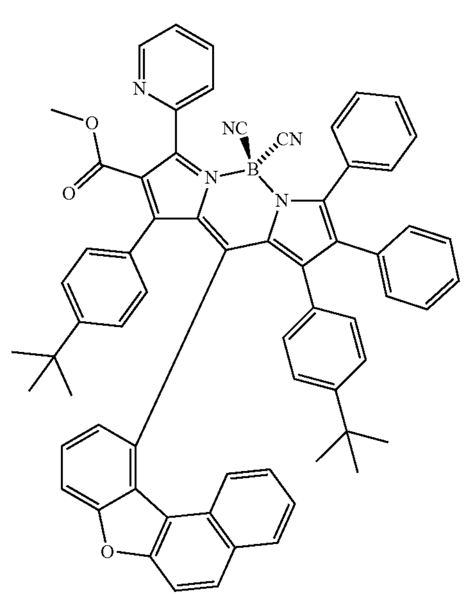

-continued
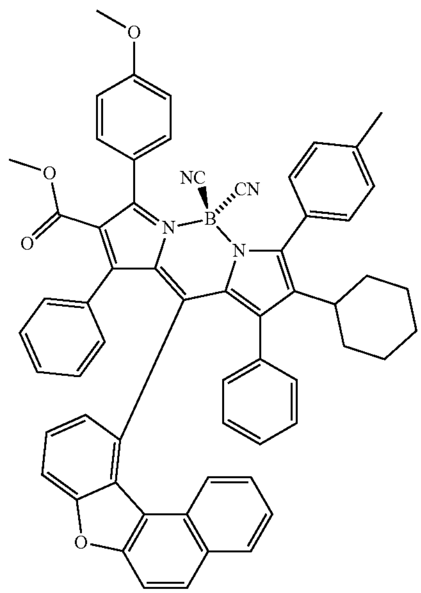
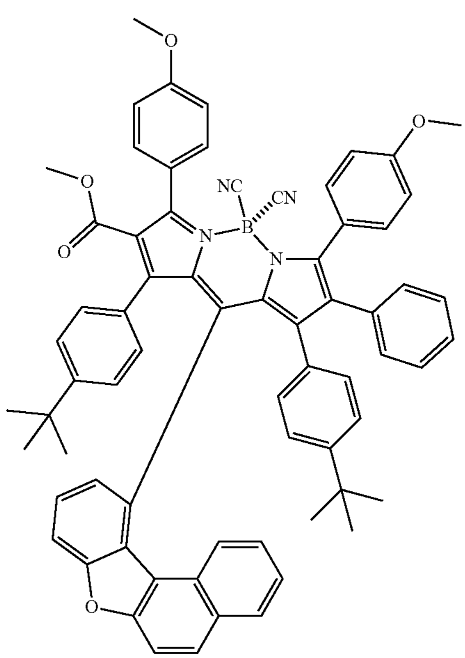
-continued
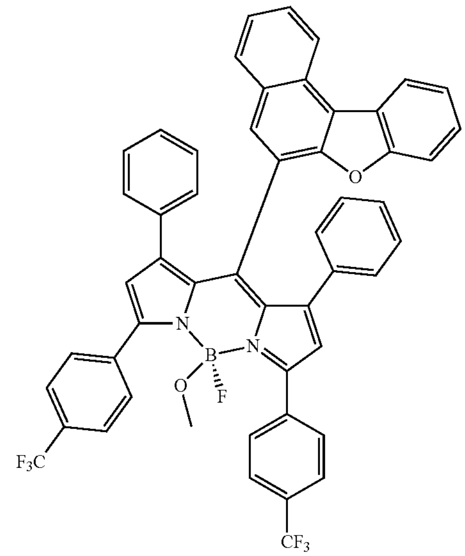
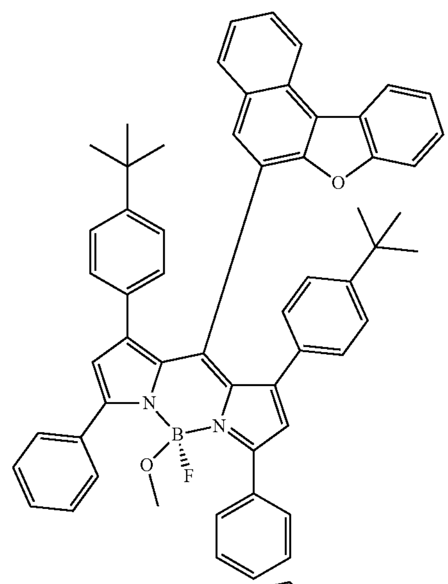
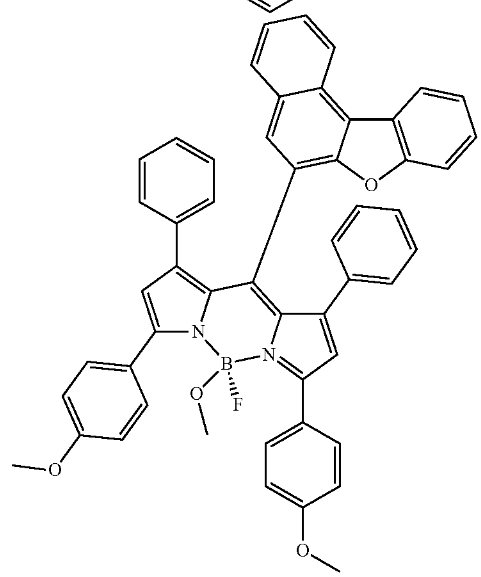

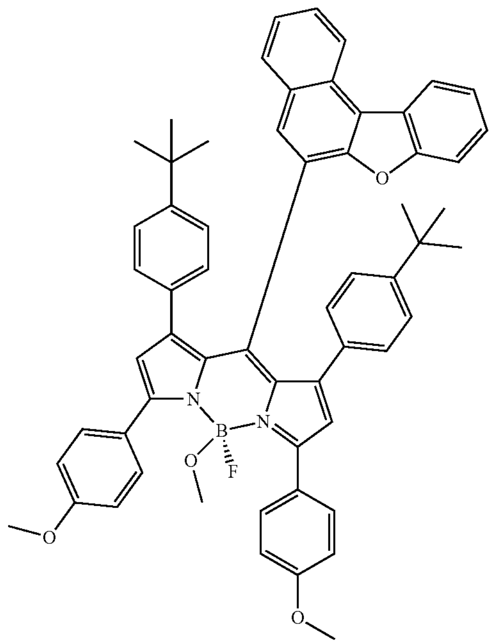
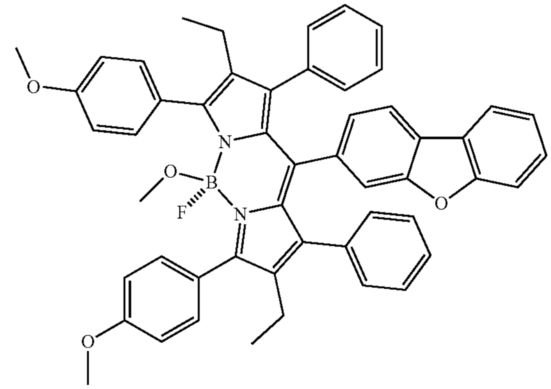
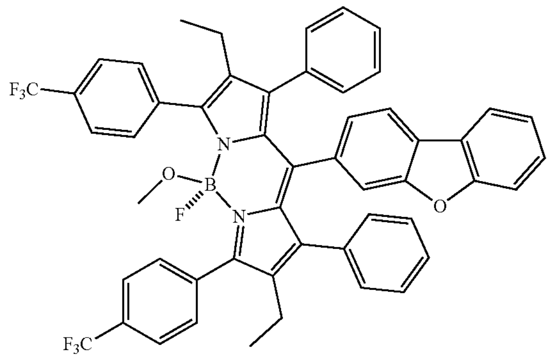
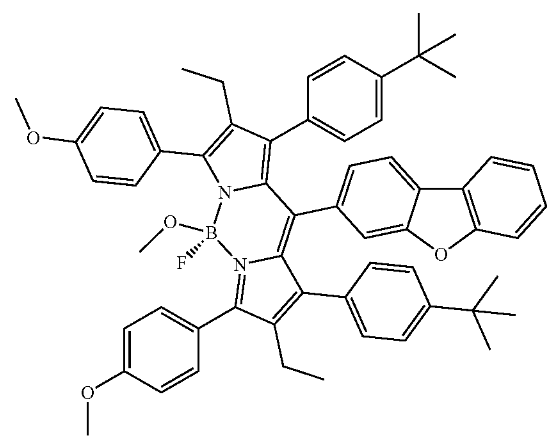
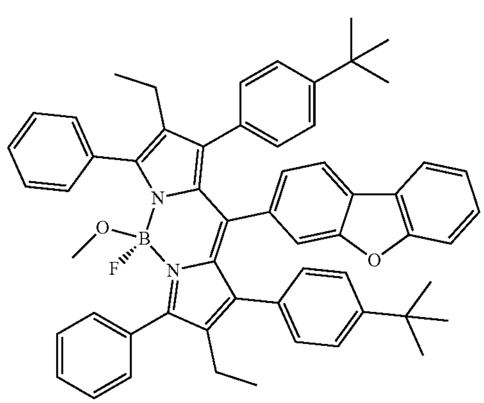
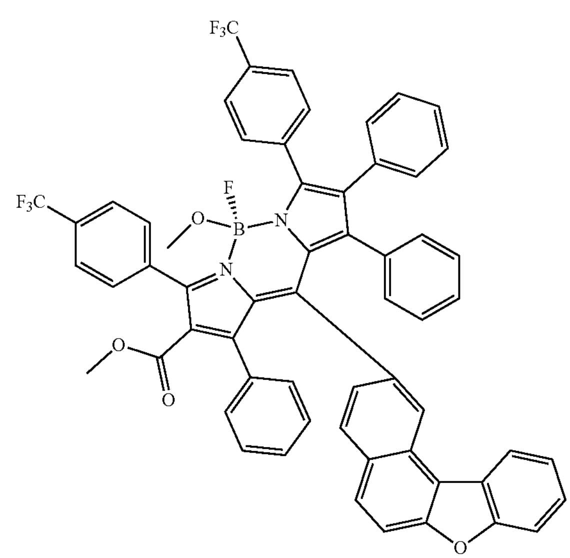
F₃C
F₃C
O
B
F
N -continued
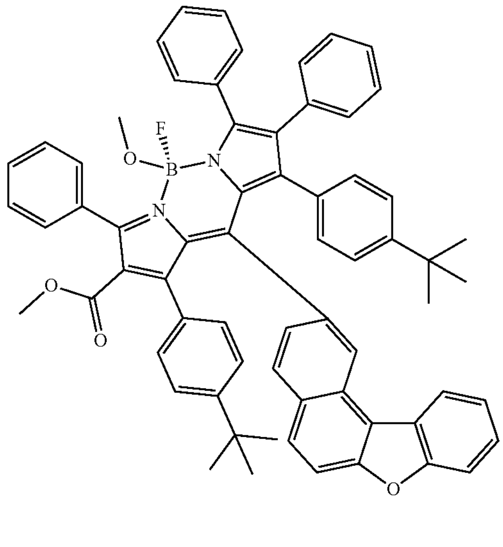
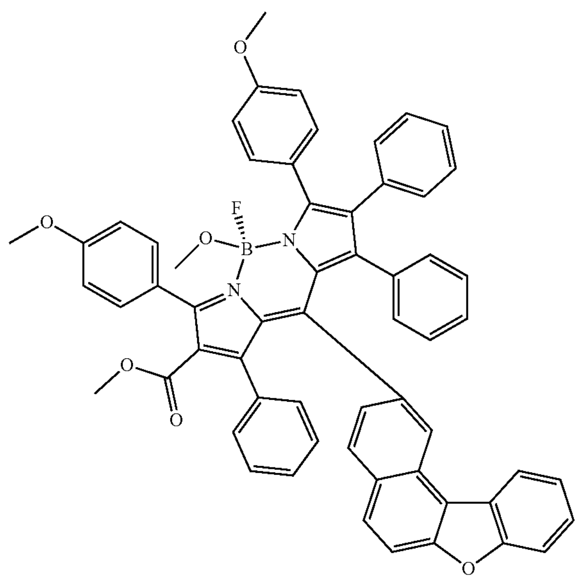
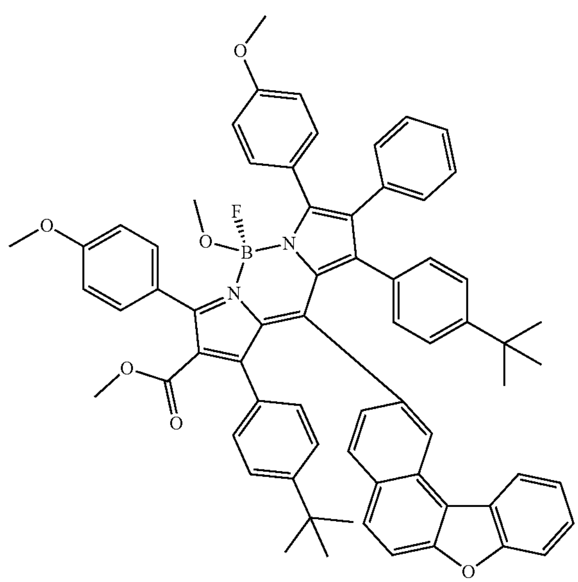
-continued
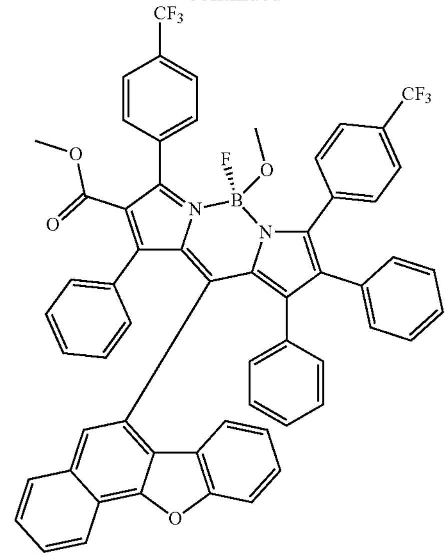
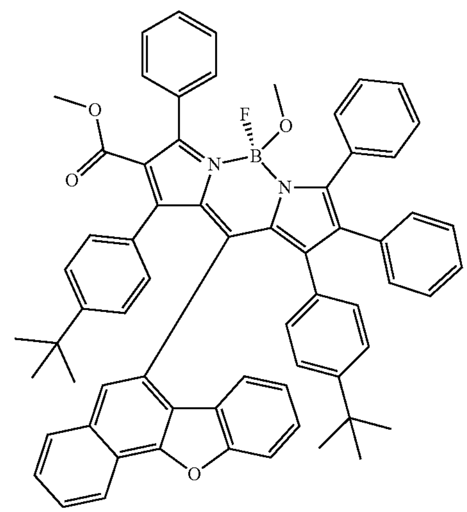
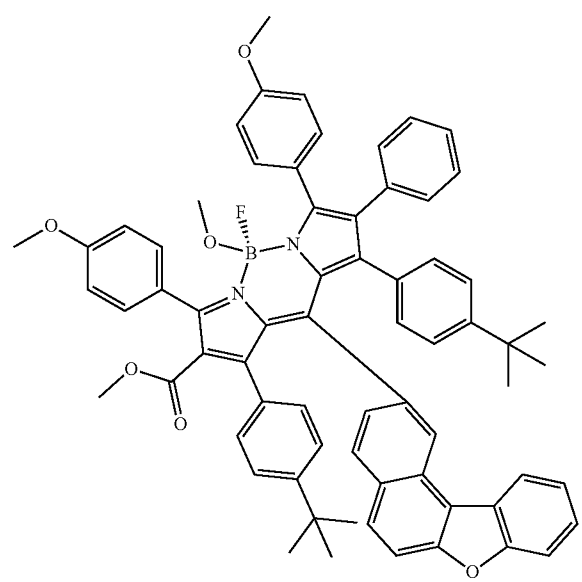

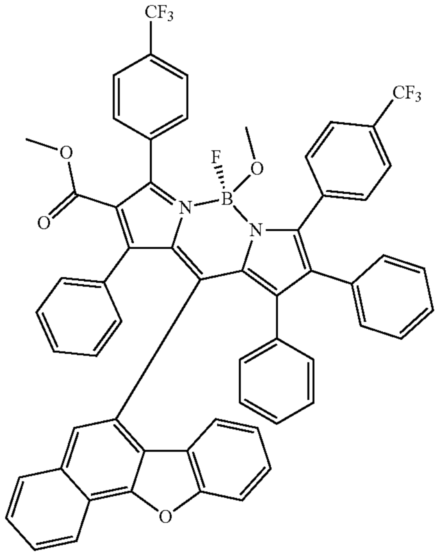
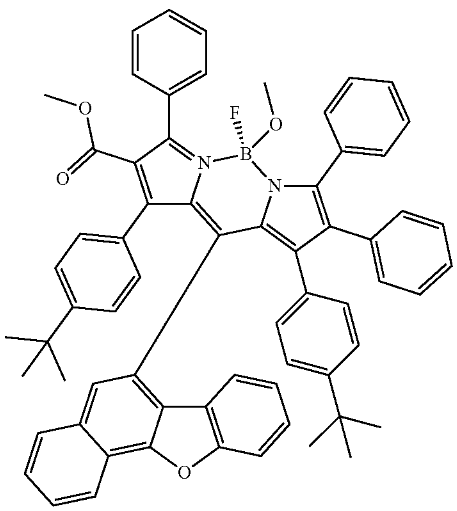
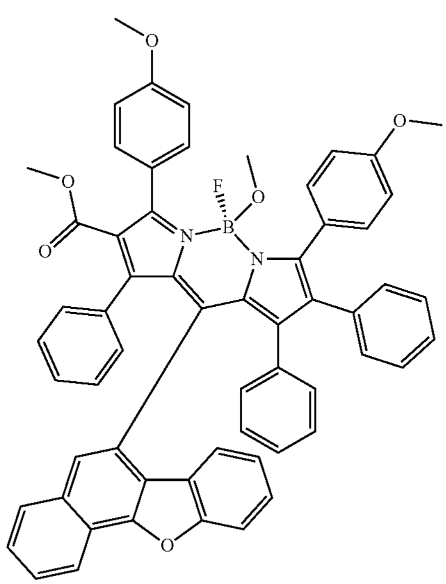
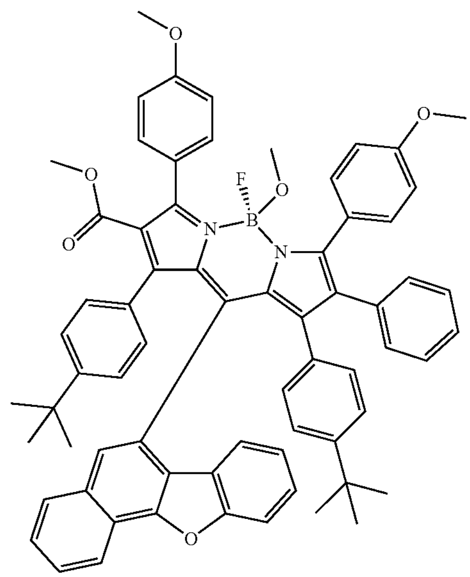
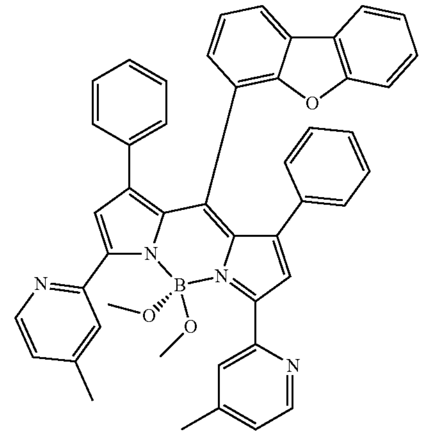
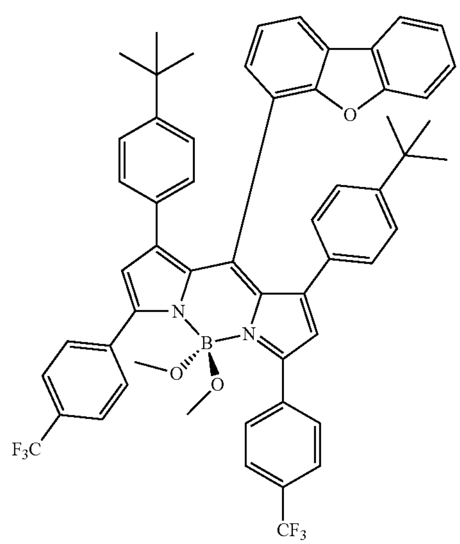

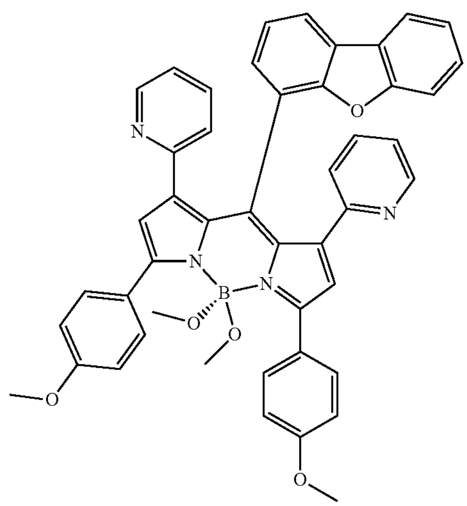
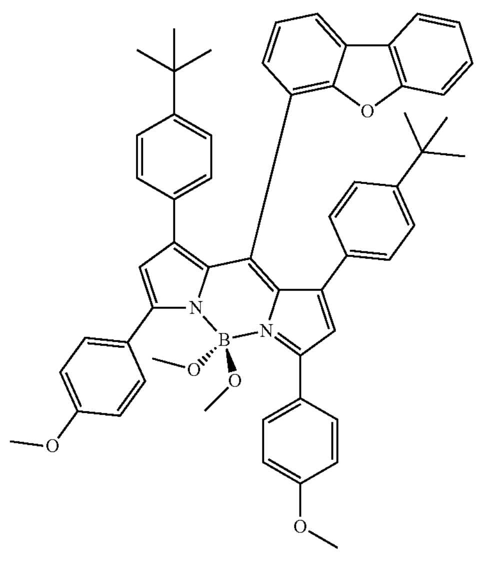
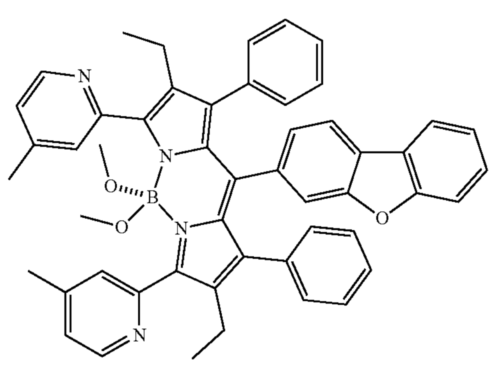
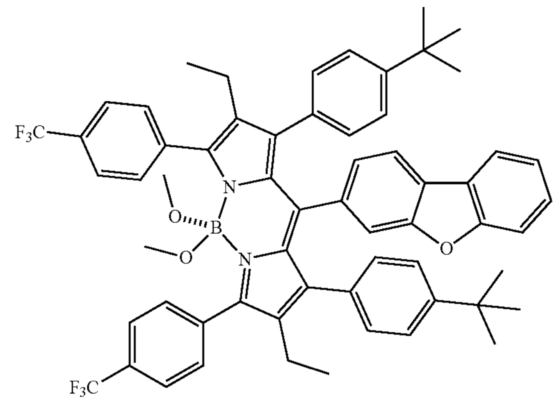
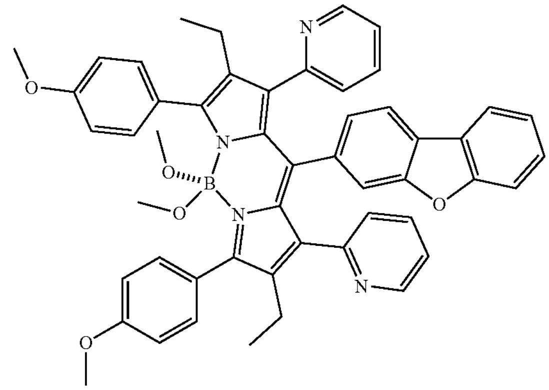
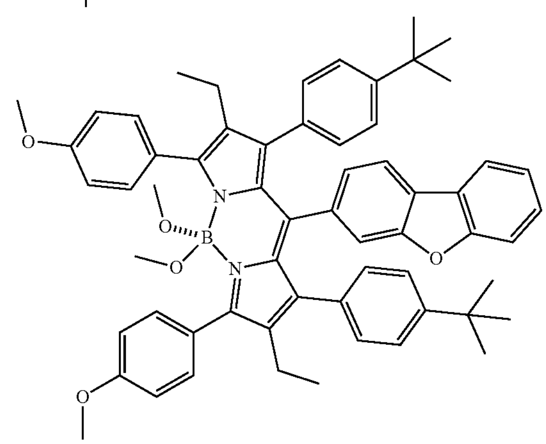
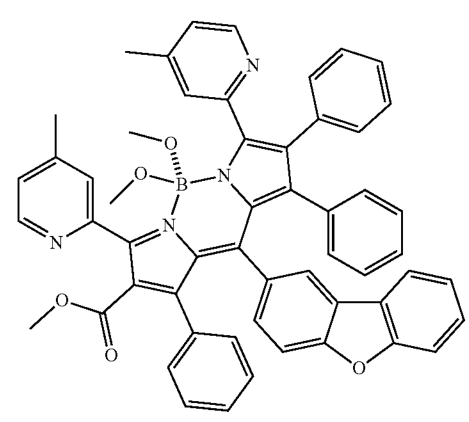

-continued
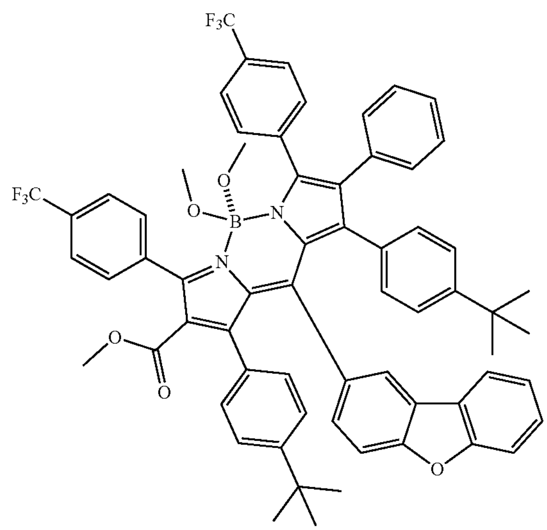
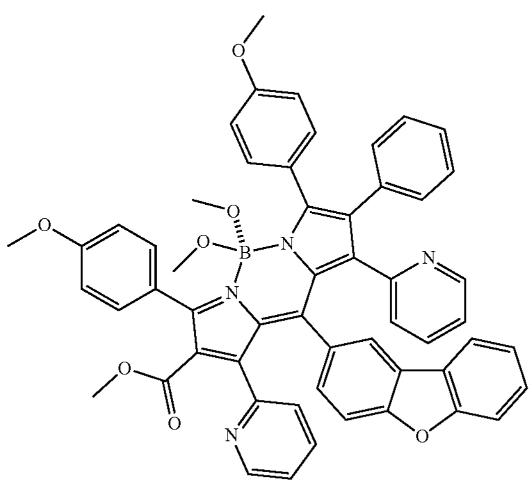
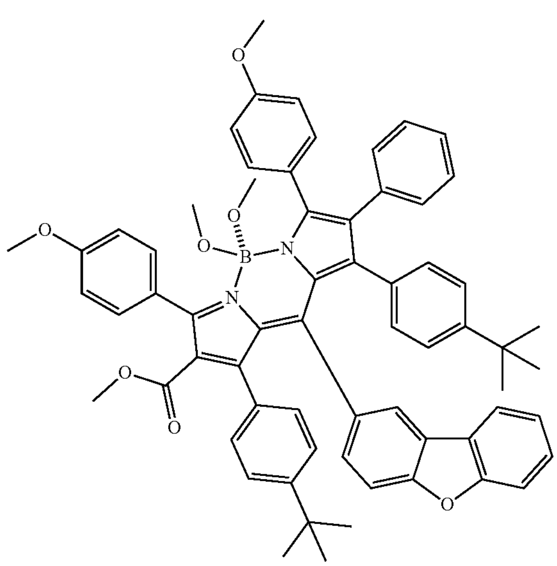
-continued
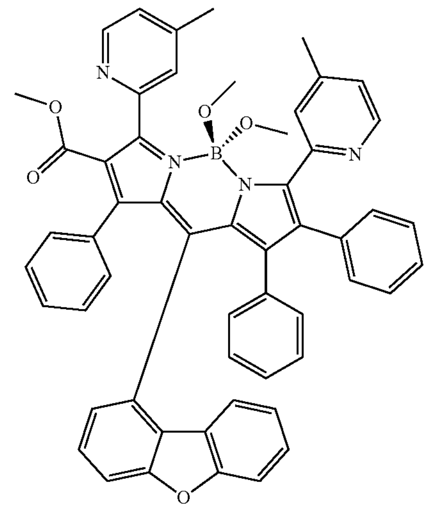
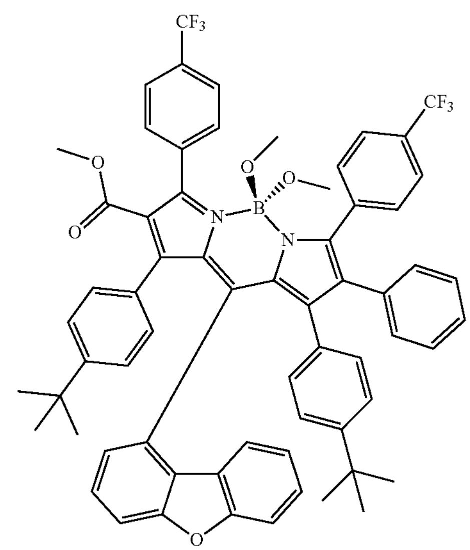
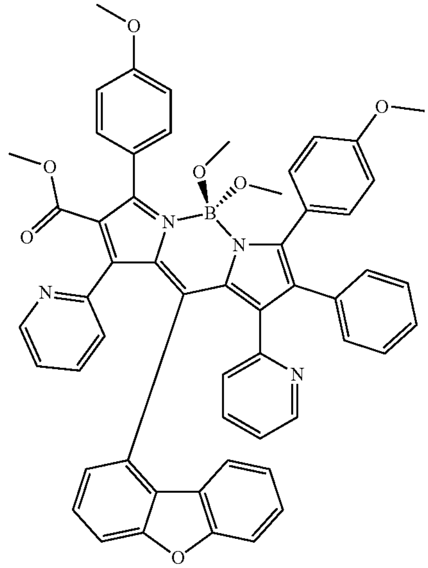

-continued
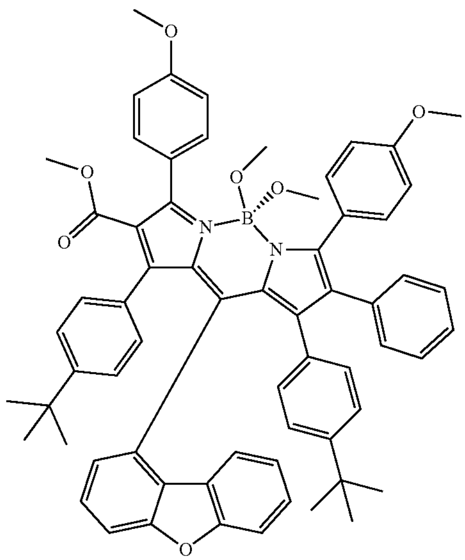
According to one embodiment of the present specification, Chemical Formula 1 is selected from among the following compounds.
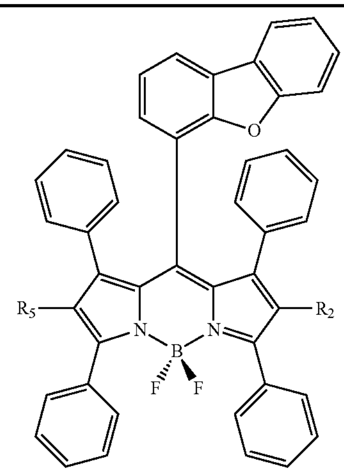
| R2, R5 | compound |
|---|---|
| —H | compound 1-1 |
| 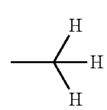 | compound 1-2 |
| —F | compound 1-3 |
| 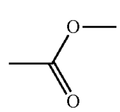 | compound 1-4 |
| 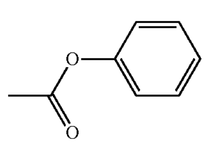 | compound 1-5 |

-continued
—CN
compound 1-6
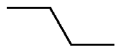
compound 1-7
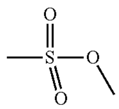
compound 1-8
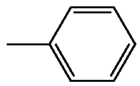
compound 1-9
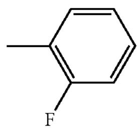
compound 1-10
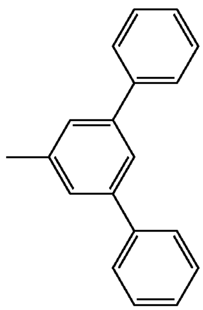 [SMILES: Cc1cc(-c2ccccc2)cc(-c2ccccc2)c1]
compound 1-11
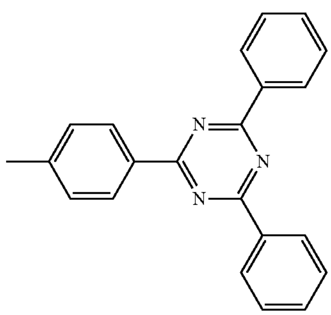 [SMILES: Cc1ccc(-c2nc(-c3ccccc3)nc(-c3ccccc3)n2)cc1]
compound 1-12
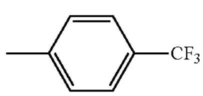
compound 1-13
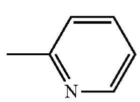
compound 1-14
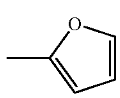
compound 1-15
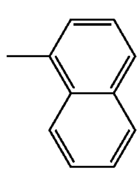
compound 1-16

-continued
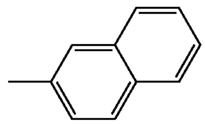
compound 1-17
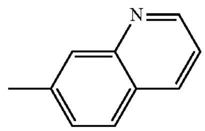
compound 1-18
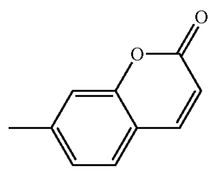
compound 1-19
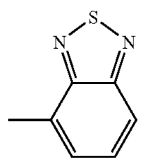
compound 1-20
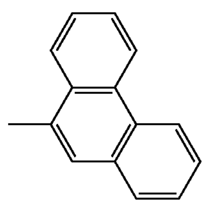
compound 1-21
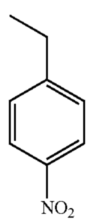
compound 1-22
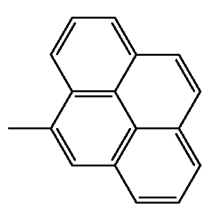 [SMILES: Cc1cc2cccc3ccc4cccc1c4c32]
compound 1-23
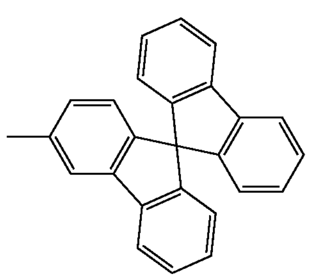 [SMILES: Cc1ccc2c(c1)-c1ccccc1C21c2ccccc2-c2ccccc21]
compound 1-24

-continued
| | |
|---|---|
| 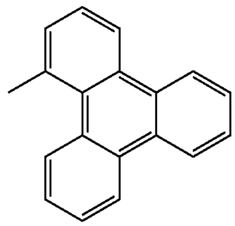 | compound 1-25 |
| 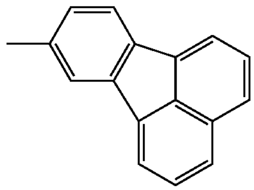 | compound 1-26 |
| R2 | R5 | compound |
|---|---|---|
| —H | 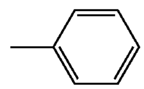 | compound 1-27 |
| 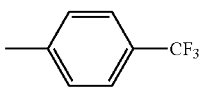  | 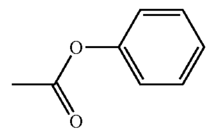  | compound 1-28 |
| —F | 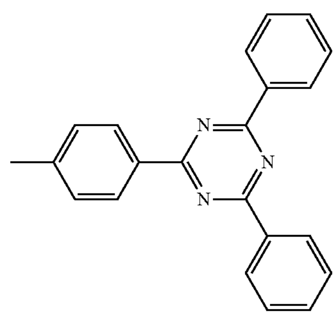  | compound 1-29 |
| —CN | 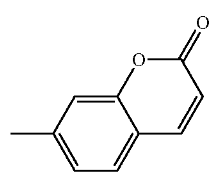  | compound 1-30 |
| 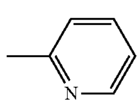  | 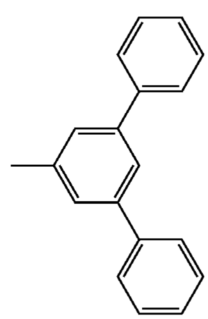 | compound 1-31 |

-continued
| | | |
|---|---|---|
| 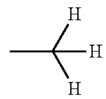 | 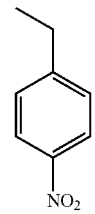 | compound 1-32 |
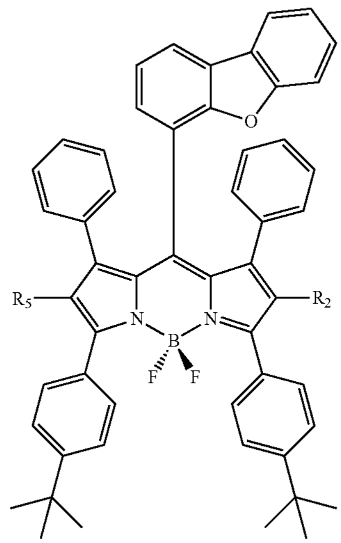
| R2, R5 | compound |
|---|---|
| —H | compound 2-1 |
| 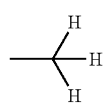 | compound 2-2 |
| —F | compound 2-3 |
| 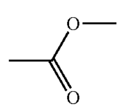 | compound 2-4 |
| 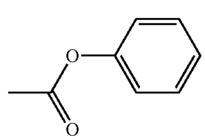 | compound 2-5 |
| —CN | compound 2-6 |
| 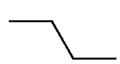 | compound 2-7 |
| 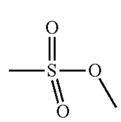 | compound 2-8 |
| 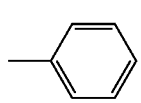 | compound 2-9 |

-continued
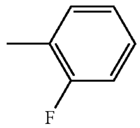
compound 2-10
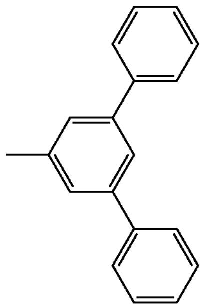 [SMILES: Cc1cc(-c2ccccc2)cc(-c2ccccc2)c1]
compound 2-11
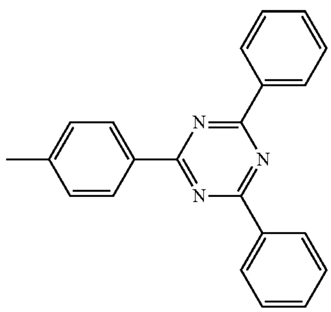 [SMILES: Cc1ccc(-c2nc(-c3ccccc3)nc(-c3ccccc3)n2)cc1]
compound 2-12
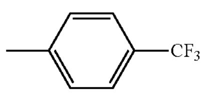
compound 2-13
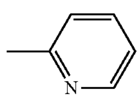
compound 2-14
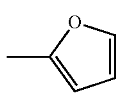
compound 2-15
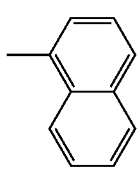
compound 2-16
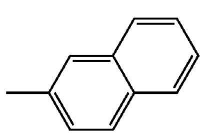
compound 2-17
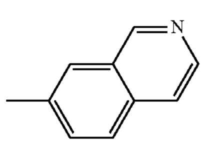
compound 2-18

-continued
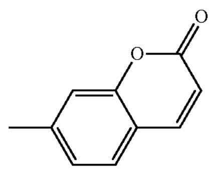
compound 2-19
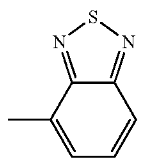
compound 2-20
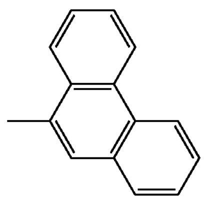
compound 2-21
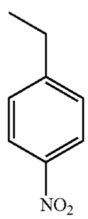
compound 2-22
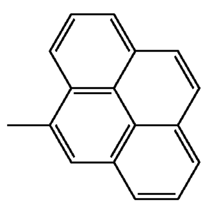 [SMILES: Cc1cc2cccc3ccc4cccc1c4c32]
compound 2-23
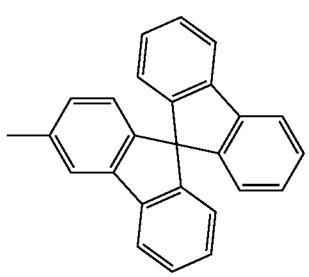 [SMILES: Cc1ccc2c(c1)-c1ccccc1C21c2ccccc2-c2ccccc21]
compound 2-24
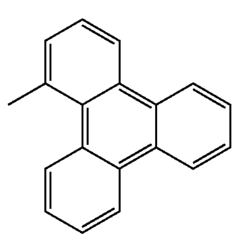 [SMILES: Cc1cccc2c3ccccc3c3ccccc3c12]
compound 2-25

-continued
| | |
|---|---|
| 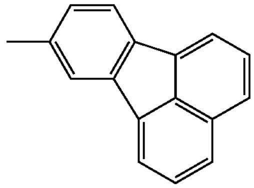 | compound 2-26 |
| R2 | R5 | compound |
|---|---|---|
| —H | 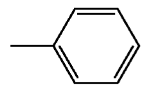 | compound 2-27 |
| 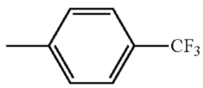 | 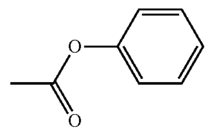 | compound 2-28 |
| —F | 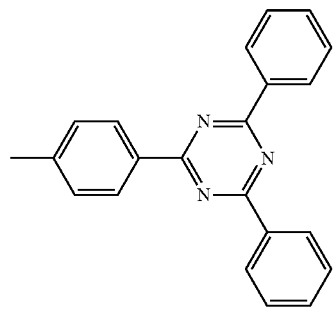 | compound 2-29 |
| —CN | 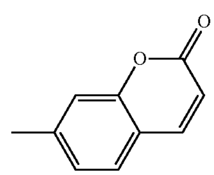 | compound 2-30 |
| 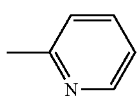 | 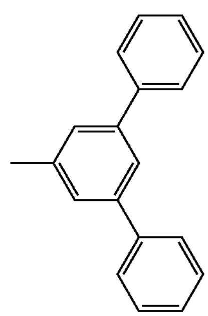 | compound 2-31 |
| 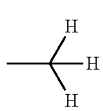 | 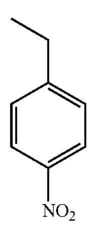 | compound 2-32 |

-continued
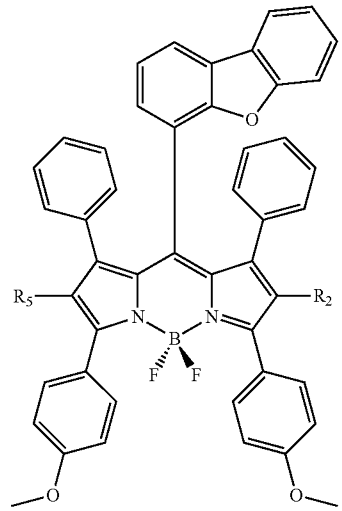
| R2, R5 | compound |
|---|---|
| —H | compound 3-1 |
| 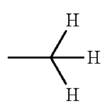 | compound 3-2 |
| —F | compound 3-3 |
| 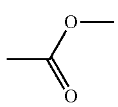 | compound 3-4 |
| 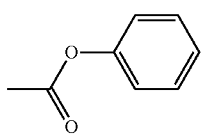 | compound 3-5 |
| —CN | compound 3-6 |
| 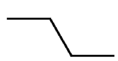 | compound 3-7 |
| 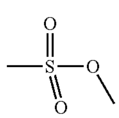 | compound 3-8 |
| 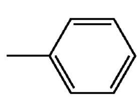 | compound 3-9 |
| 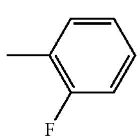 | compound 3-10 |

-continued
compound 3-11
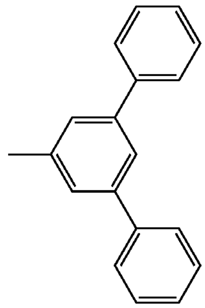 [SMILES: Cc1cc(-c2ccccc2)cc(-c2ccccc2)c1]
compound 3-12
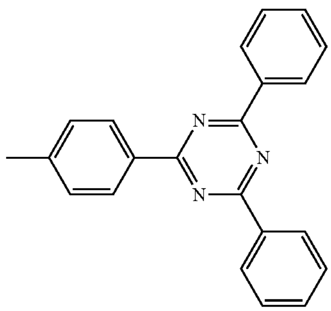 [SMILES: Cc1ccc(-c2nc(-c3ccccc3)nc(-c3ccccc3)n2)cc1]
compound 3-13
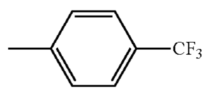
compound 3-14
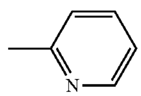
compound 3-15
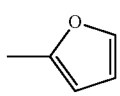
compound 3-16
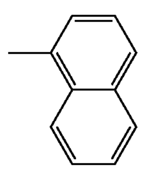
compound 3-17
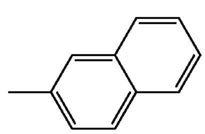
compound 3-18
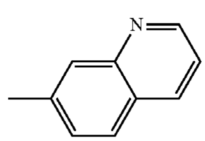
compound 3-19
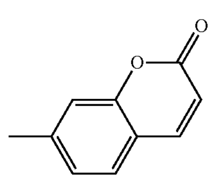

-continued
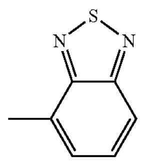
compound 3-20
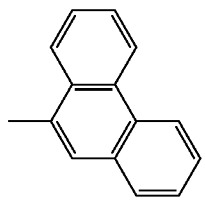
compound 3-21
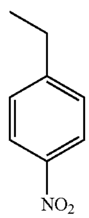
compound 3-22
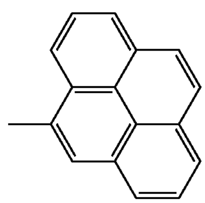 [SMILES: Cc1cc2cccc3ccc4cccc1c4c32]
compound 3-23
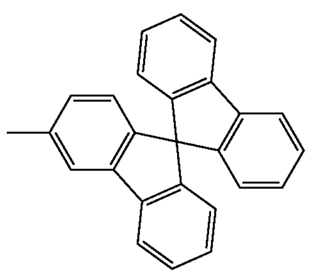 [SMILES: Cc1ccc2c(c1)-c1ccccc1C21c2ccccc2-c2ccccc21]
compound 3-24
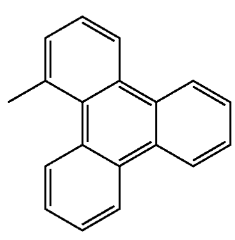 [SMILES: Cc1cccc2c3ccccc3c3ccccc3c12]
compound 3-25
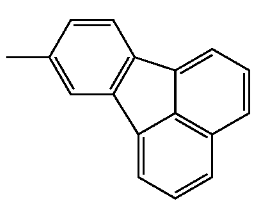 [SMILES: Cc1ccc2c(c1)-c1cccc3cccc-2c13]
compound 3-26

-continued
| R2 | R5 | compound |
|---|---|---|
| —H | 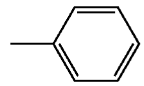 | compound 3-27 |
| 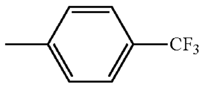 | 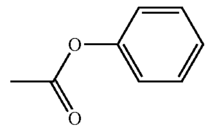 | compound 3-28 |
| —F | 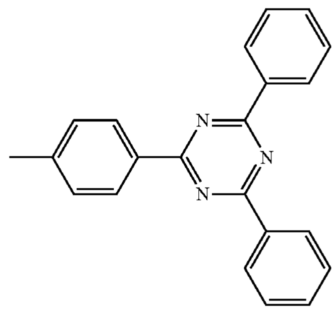 | compound 3-29 |
| —CN | 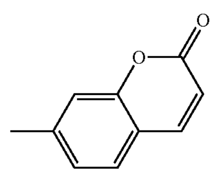 | compound 3-30 |
| 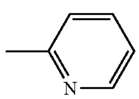 | 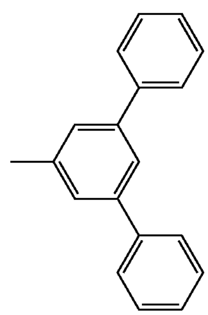 | compound 3-31 |
| 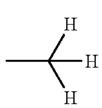 | 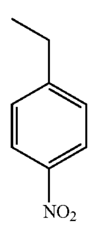 | compound 3-32 |

-continued
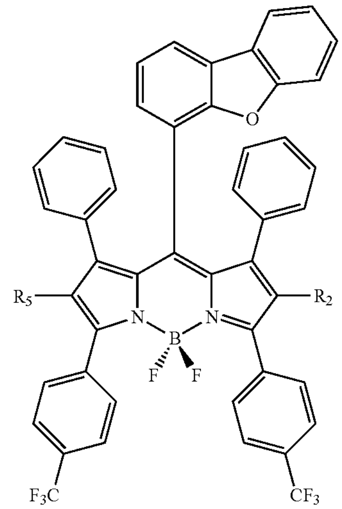
| R2, R5 | compound |
| --- | --- |
| —H | compound 4-1 |
| 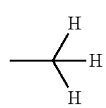 | compound 4-2 |
| —F | compound 4-3 |
| 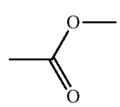 | compound 4-4 |
| 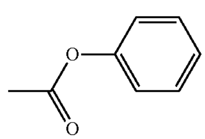 | compound 4-5 |
| —CN | compound 4-6 |
| 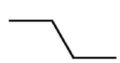 | compound 4-7 |
| 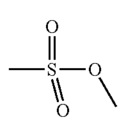 | compund 4-8 |
| 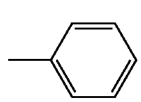 | compound 4-9 |
| 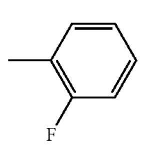 | compound 4-10 |

-continued
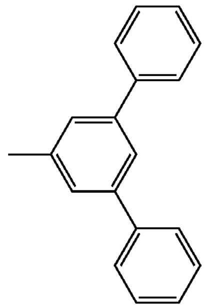 [SMILES: Cc1cc(-c2ccccc2)cc(-c2ccccc2)c1]
compound 4-11
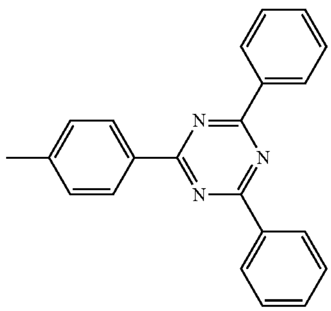 [SMILES: Cc1ccc(-c2nc(-c3ccccc3)nc(-c3ccccc3)n2)cc1]
compound 4-12
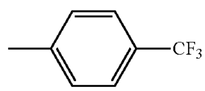
compound 4-13
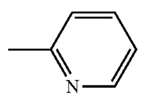
compound 4-14
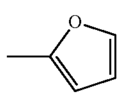
compound 4-15
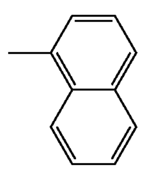
compound 4-16
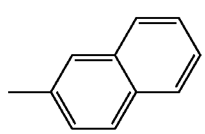
compound 4-17
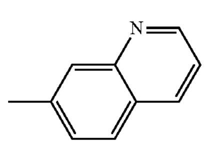
compound 4-18
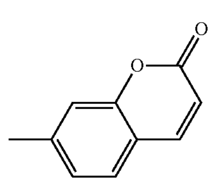
compound 4-19

-continued
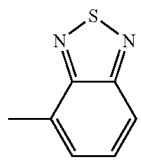
compound 4-20
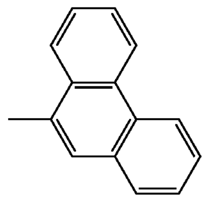
compound 4-21
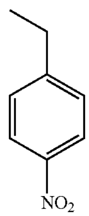
compound 4-22
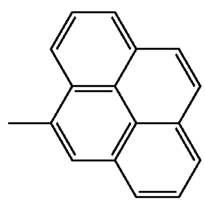 [SMILES: Cc1cc2cccc3ccc4cccc1c4c32]
compound 4-23
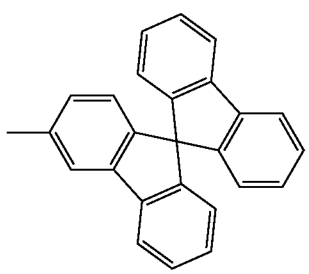 [SMILES: Cc1ccc2c(c1)-c1ccccc1C21c2ccccc2-c2ccccc21]
compound 4-24
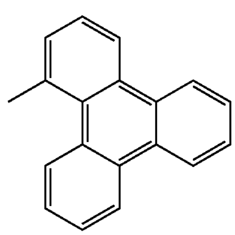 [SMILES: Cc1cccc2c3ccccc3c3ccccc3c12]
compound 4-25
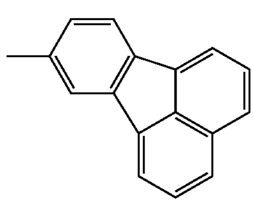 [SMILES: Cc1ccc2c(c1)-c1cccc3cccc-2c13]
compound 4-26

-continued
| R2 | R5 | compound |
| --- | --- | --- |
| —H | 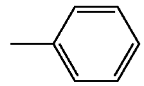 | compound 4-27 |
| 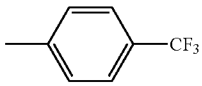 | 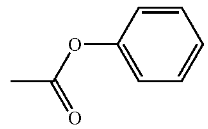 | compound 4-28 |
| —F | 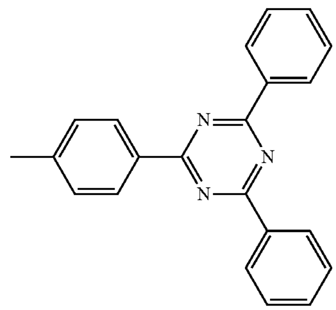 | compound 4-29 |
| —CN | 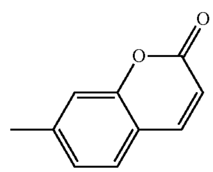 | compound 4-30 |
| 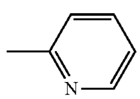 | 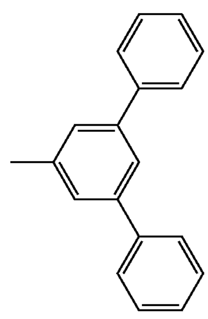 | compound 4-31 |
| 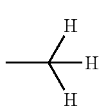 | 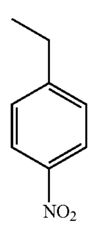 | compound 4-32 |

-continued
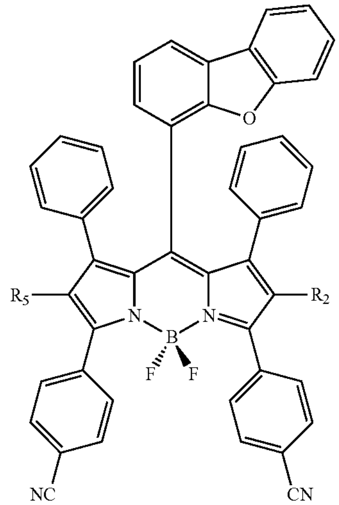
| R2, R5 | compound |
|---|---|
| —H | compound 5-1 |
| 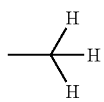 | compound 5-2 |
| —F | compound 5-3 |
| 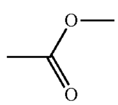 | compound 5-4 |
| 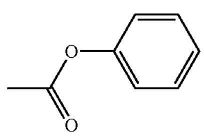 | compound 5-5 |
| —CN | compound 5-6 |
| 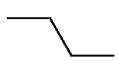 | compound 5-7 |
| 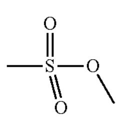 | compound 5-8 |
| 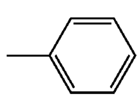 | compound 5-9 |
| 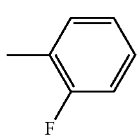 | compound 5-10 |

-continued
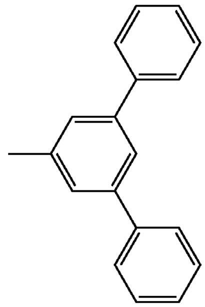 [SMILES: Cc1cc(-c2ccccc2)cc(-c2ccccc2)c1]
compound 5-11
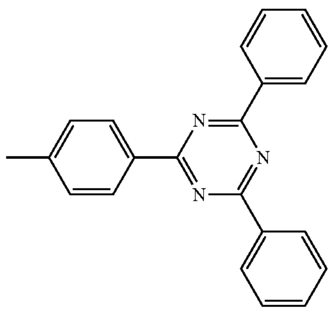 [SMILES: Cc1ccc(-c2nc(-c3ccccc3)nc(-c3ccccc3)n2)cc1]
compound 5-12
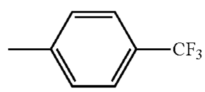
compound 5-13
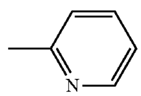
compound 5-14
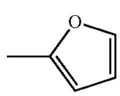
compound 5-15
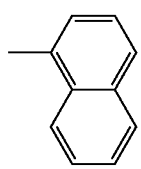
compound 5-16
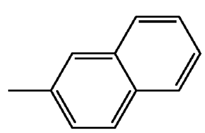
compound 5-17
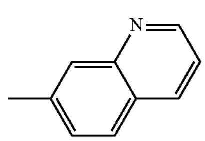
compound 5-18
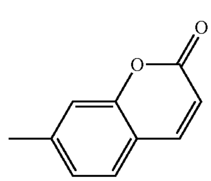
compound 5-19

-continued
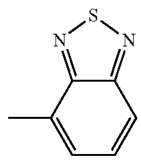
compound 5-20
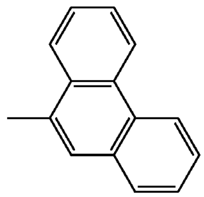
compound 5-21
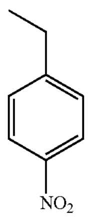
compound 5-22
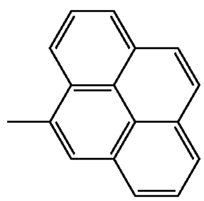 [SMILES: Cc1cc2cccc3ccc4cccc1c4c32]
compound 5-23
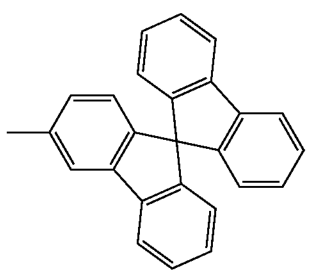 [SMILES: Cc1ccc2c(c1)-c1ccccc1C21c2ccccc2-c2ccccc21]
compound 5-24
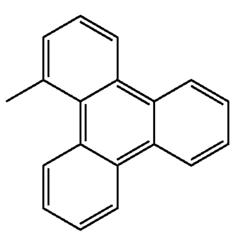 [SMILES: Cc1cccc2c3ccccc3c3ccccc3c12]
compound 5-25
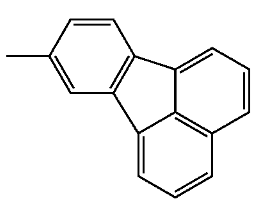 [SMILES: Cc1ccc2c(c1)-c1cccc3cccc-2c13]
compound 5-26

-continued
| R2 | R5 | compound |
|---|---|---|
| —H | 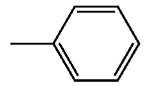 | compound 5-27 |
| 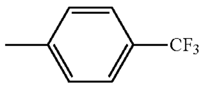 | 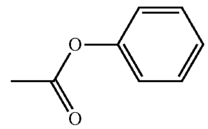 | compound 5-28 |
| —F | 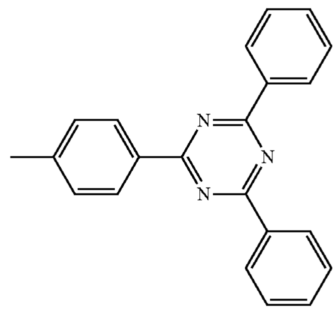 | compound 5-29 |
| —CN | 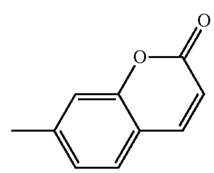 | compound 5-30 |
| 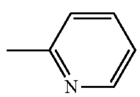 | 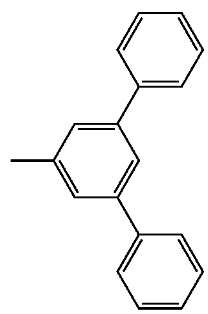 | compound 5-31 |
| 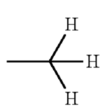 | 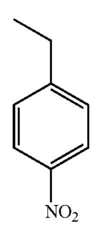 | compound 5-32 |

-continued
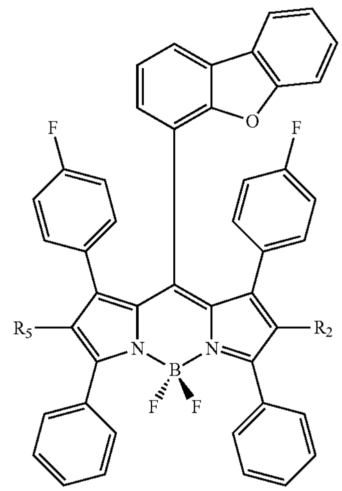
| R2, R5 | compound |
| --- | --- |
| —H | compound 6-1 |
| 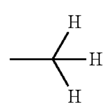 | compound 6-2 |
| —F | compound 6-3 |
| 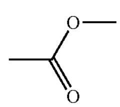 | compound 6-4 |
| 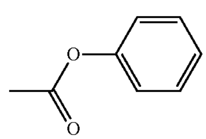 | compound 6-5 |
| —CN | compound 6-6 |
| 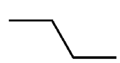 | compound 6-7 |
| 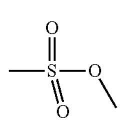 | compound 6-8 |
| 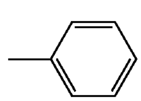 | compound 6-9 |
| 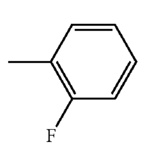 | compound 6-10 |

-continued
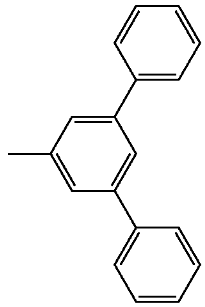 [SMILES: Cc1cc(-c2ccccc2)cc(-c2ccccc2)c1]
compound 6-11
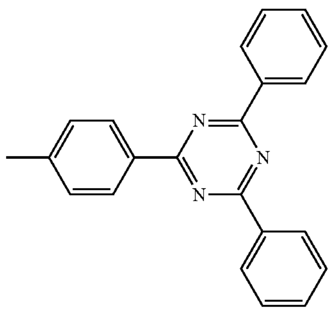 [SMILES: Cc1ccc(-c2nc(-c3ccccc3)nc(-c3ccccc3)n2)cc1]
compound 6-12
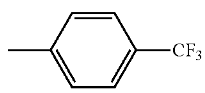
compound 6-13
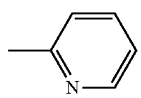
compound 6-14
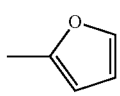
compound 6-15
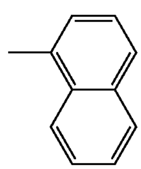
compound 6-16
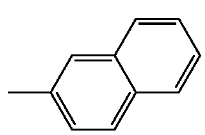
compound 6-17
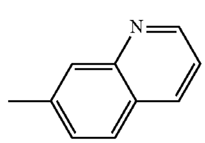
compound 6-18
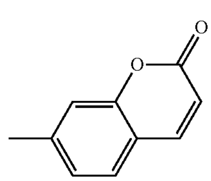
compound 6-19

-continued
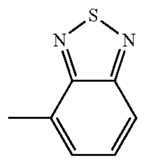
compound 6-20
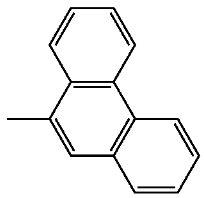
compound 6-21
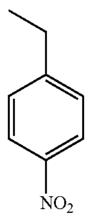
compound 6-22
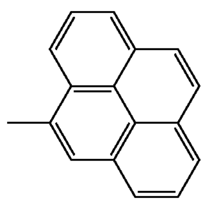 [SMILES: Cc1cc2cccc3ccc4cccc1c4c32]
compound 6-23
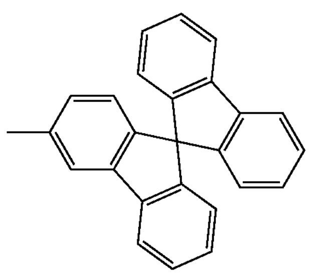 [SMILES: Cc1ccc2c(c1)-c1ccccc1C21c2ccccc2-c2ccccc21]
compound 6-24
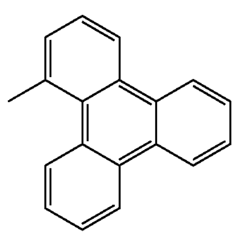 [SMILES: Cc1cccc2c3ccccc3c3ccccc3c12]
compound 6-25
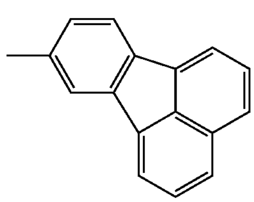 [SMILES: Cc1ccc2c(c1)-c1cccc3cccc-2c13]
compound 6-26

-continued
| R2 | R5 | compound |
| --- | --- | --- |
| —H | 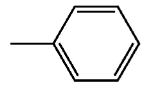 | compound 6-27 |
| 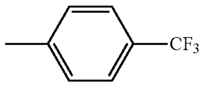 | 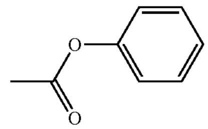 | compound 6-28 |
| —F | 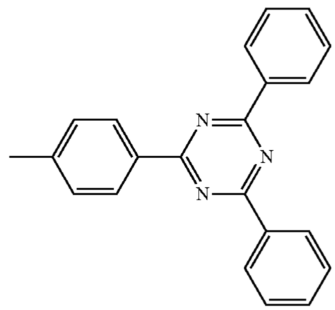 | compound 6-29 |
| —CN | 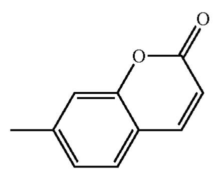 | compound 6-30 |
| 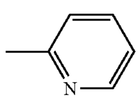 | 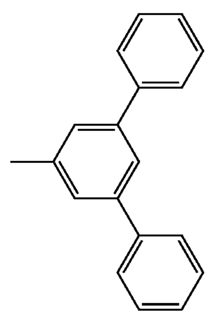 | compound 6-31 |
| 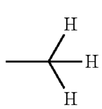 | 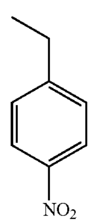 | compound 6-32 |

-continued
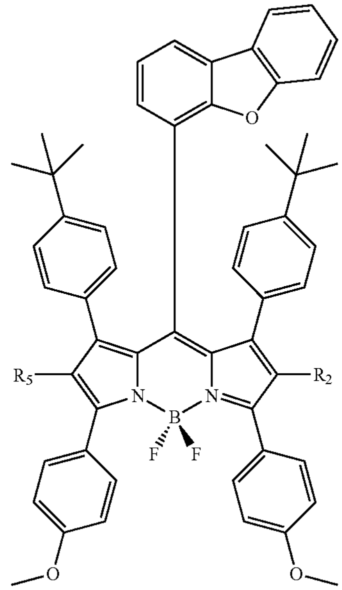
| R2, R5 | compound |
|---|---|
| —H | compound 7-1 |
| 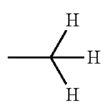 | compound 7-2 |
| —F | compound 7-3 |
| 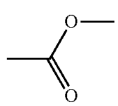 | compound 7-4 |
| 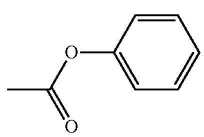 | compound 7-5 |
| —CN | compound 7-6 |
| 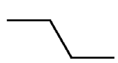 | compound 7-7 |
| 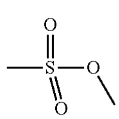 | compound 7-8 |
| 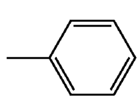 | compound 7-9 |
| 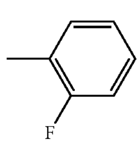 | compound 7-10 |

-continued
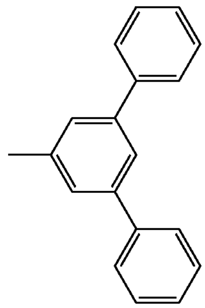 [SMILES: Cc1cc(-c2ccccc2)cc(-c2ccccc2)c1]
compound 7-11
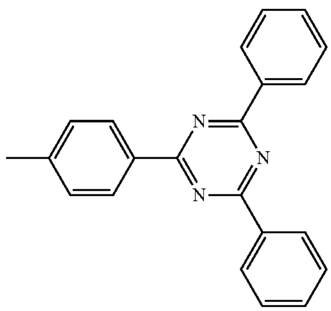 [SMILES: Cc1ccc(-c2nc(-c3ccccc3)nc(-c3ccccc3)n2)cc1]
compound 7-12
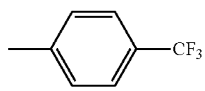
compound 7-13
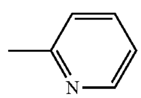
compound 7-14
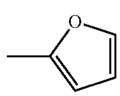
compound 7-15
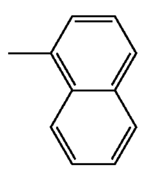
compound 7-16
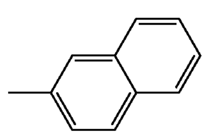
compound 7-17
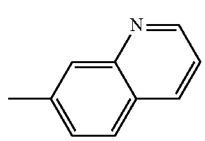
compound 7-18
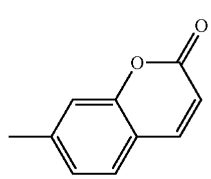
compound 7-19

-continued
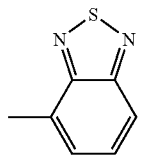
compound 7-20
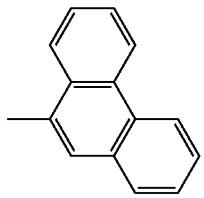
compound 7-21
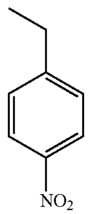
compound 7-22
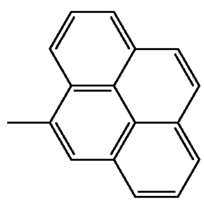 [SMILES: Cc1cc2cccc3ccc4cccc1c4c32]
compound 7-23
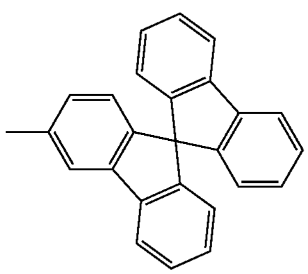 [SMILES: Cc1ccc2c(c1)-c1ccccc1C21c2ccccc2-c2ccccc21]
compound 7-24
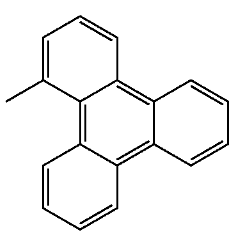 [SMILES: Cc1cccc2c3ccccc3c3ccccc3c12]
compound 7-25
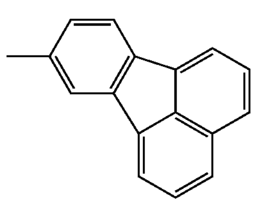 [SMILES: Cc1ccc2c(c1)-c1cccc3cccc-2c13]
compound 7-26

-continued
| R2 | R5 | compound |
|---|---|---|
| —H | 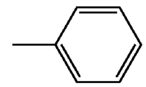 | compound 7-27 |
| 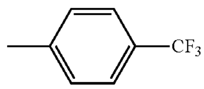 | 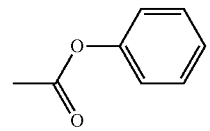 | compound 7-28 |
| —F | 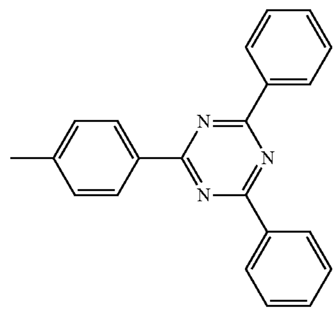 | compound 7-29 |
| —CN | 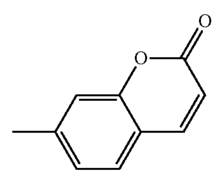 | compound 7-30 |
| 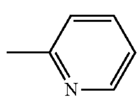 | 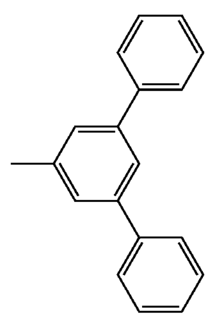 | compound 7-31 |
| 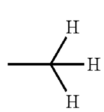 | 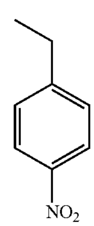 | compound 7-32 |

-continued
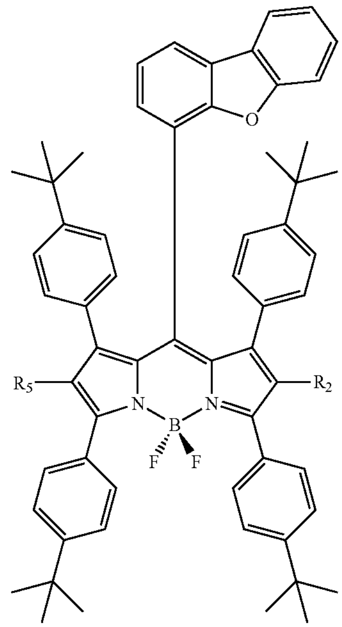
| R2, R5 | compound |
|---|---|
| —H | compound 8-1 |
| 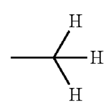 | compound 8-2 |
| —F | compound 8-3 |
| 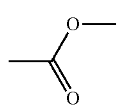 | compound 8-4 |
| 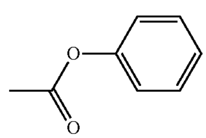 | compound 8-5 |
| —CN | compound 8-6 |
| 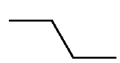 | compound 8-7 |
| 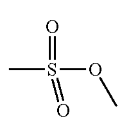 | compound 8-8 |
| 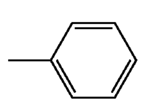 | compound 8-9 |
| 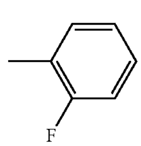 | compound 8-10 |

-continued
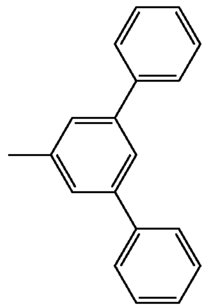 [SMILES: Cc1cc(-c2ccccc2)cc(-c2ccccc2)c1]
compound 8-11
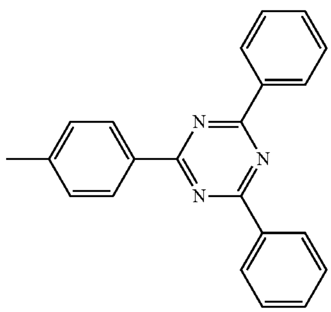 [SMILES: Cc1ccc(-c2nc(-c3ccccc3)nc(-c3ccccc3)n2)cc1]
compound 8-12
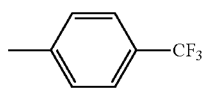
compound 8-13
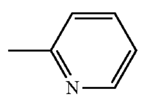
compound 8-14
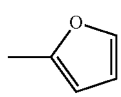
compound 8-15
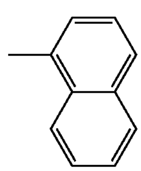
compound 8-16
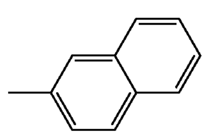
compound 8-17
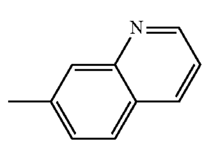
compound 8-18
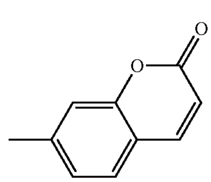
compound 8-19

-continued
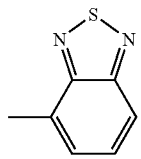
compound 8-20
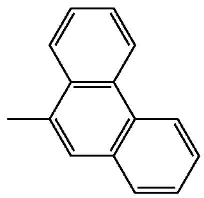
compound 8-21
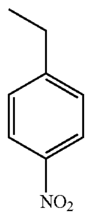
compound 8-22
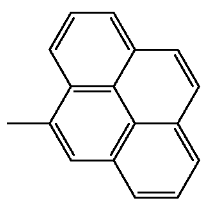 [SMILES: Cc1cc2cccc3ccc4cccc1c4c32]
compound 8-23
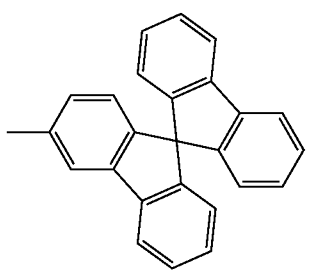 [SMILES: Cc1ccc2c(c1)-c1ccccc1C21c2ccccc2-c2ccccc21]
compound 8-24
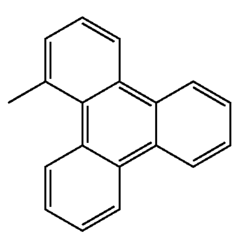 [SMILES: Cc1cccc2c3ccccc3c3ccccc3c12]
compound 8-25
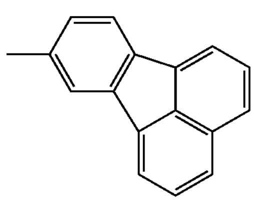 [SMILES: Cc1ccc2c(c1)-c1cccc3cccc-2c13]
compound 8-26

-continued
| R2 | R5 | compound |
|---|---|---|
| —H | 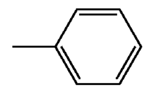 | compound 8-27 |
| 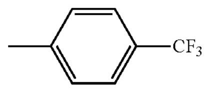 | 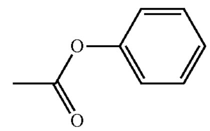 | compound 8-28 |
| —F | 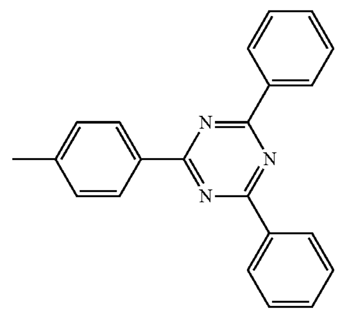 | compound 8-29 |
| —CN | 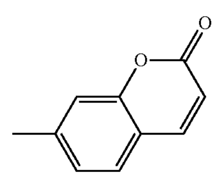 | compound 8-30 |
| 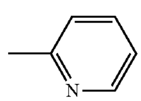 | 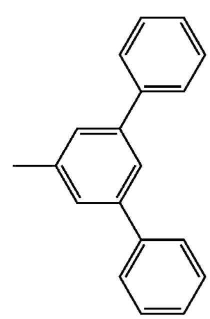 | compound 8-31 |
| 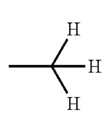 | 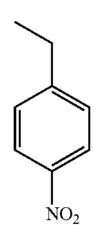 | compound 8-32 |

-continued
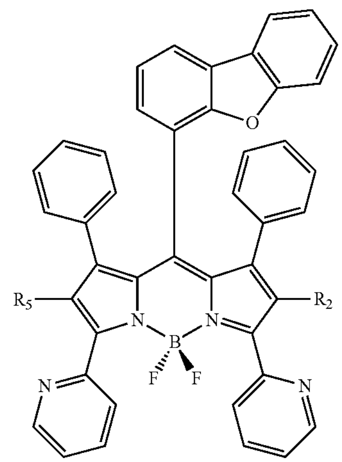
| R2, R5 | compound |
|---|---|
| —H | compound 9-1 |
| 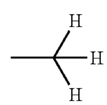 | compound 9-2 |
| —F | compound 9-3 |
| 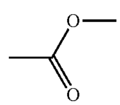 | compound 9-4 |
| 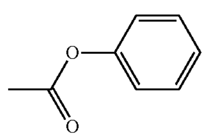 | compound 9-5 |
| —CN | compound 9-6 |
| 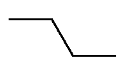 | compound 9-7 |
| 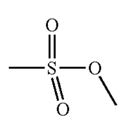 | compound 9-8 |
| 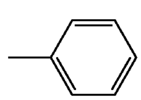 | compound 9-9 |
| 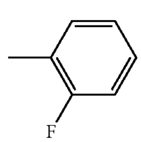 | compound 9-10 |

-continued
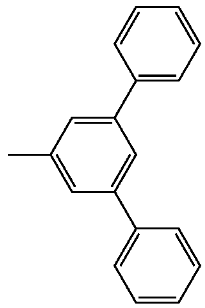 [SMILES: Cc1cc(-c2ccccc2)cc(-c2ccccc2)c1]
compound 9-11
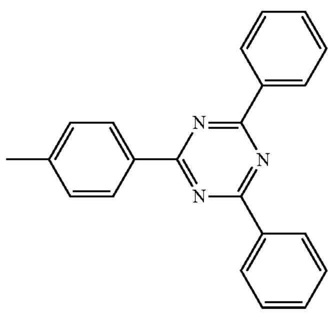 [SMILES: Cc1ccc(-c2nc(-c3ccccc3)nc(-c3ccccc3)n2)cc1]
compound 9-12
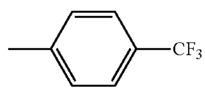
compound 9-13
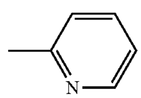
compound 9-14
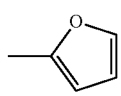
compound 9-15
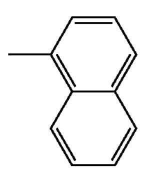
compound 9-16
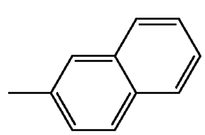
compound 9-17
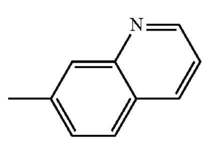
compound 9-18
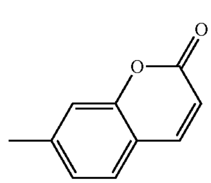
compound 9-19

-continued
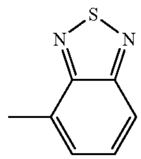
compound 9-20
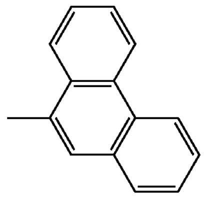
compound 9-21
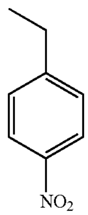
compound 9-22
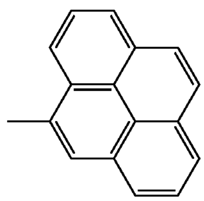 [SMILES: Cc1cc2cccc3ccc4cccc1c4c32]
compound 9-23
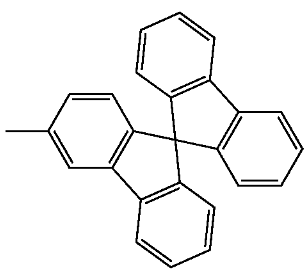 [SMILES: Cc1ccc2c(c1)-c1ccccc1C21c2ccccc2-c2ccccc21]
compound 9-24
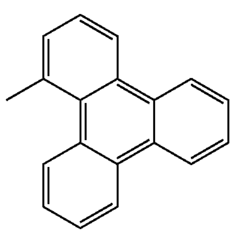 [SMILES: Cc1cccc2c3ccccc3c3ccccc3c12]
compound 9-25
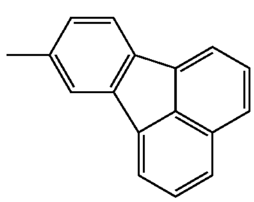 [SMILES: Cc1ccc2c(c1)-c1cccc3cccc-2c13]
compound 9-26

-continued
| R2 | R5 | compound |
| --- | --- | --- |
| —H | 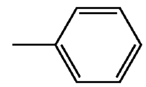 | compound 9-27 |
| 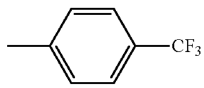 | 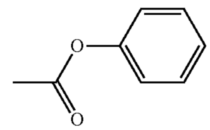 | compound 9-28 |
| —F | 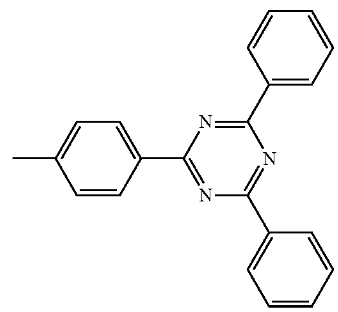 | compound 9-29 |
| —CN | 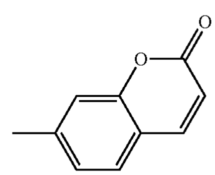 | compound 9-30 |
| 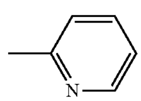 | 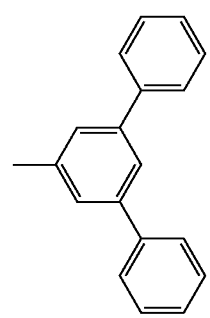 | compound 9-31 |
| 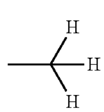 | 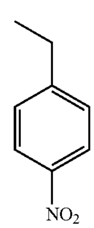 | compound 9-32 |

-continued
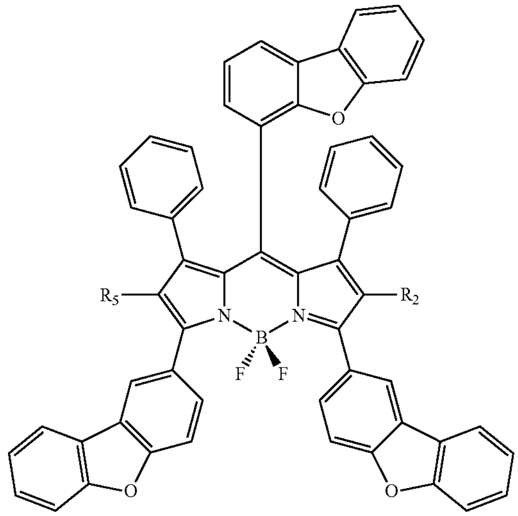
| R2, R5 | compound |
| --- | --- |
| —H | compound 10-1 |
| 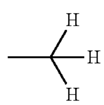 | compound 10-2 |
| —F | compound 10-3 |
| 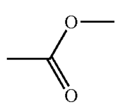 | compound 10-4 |
| 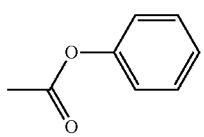 | compound 10-5 |
| —CN | compound 10-6 |
| 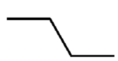 | compound 10-7 |
| 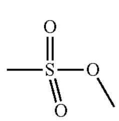 | compound 10-8 |
| 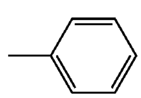 | compound 10-9 |
| 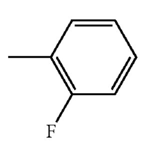 | compound 10-10 |

-continued
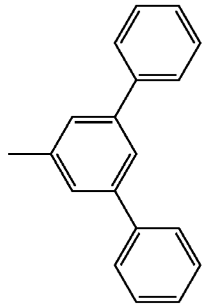 [SMILES: Cc1cc(-c2ccccc2)cc(-c2ccccc2)c1]
compound 10-11
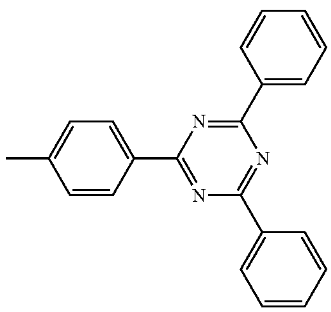 [SMILES: Cc1ccc(-c2nc(-c3ccccc3)nc(-c3ccccc3)n2)cc1]
compound 10-12
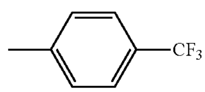
compound 10-13
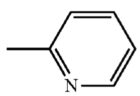
compound 10-14
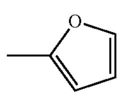
compound 10-15
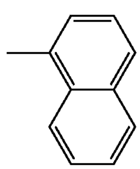
compound 10-16
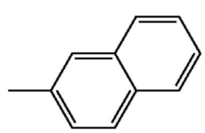
compound 10-17
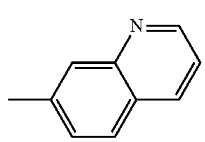
compound 10-18
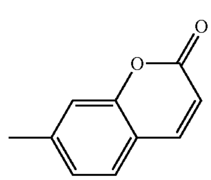
compound 10-19

-continued
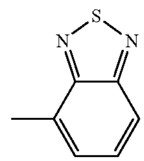
compound 10-20
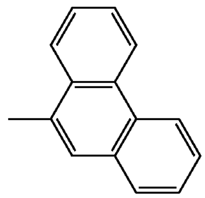
compound 10-21
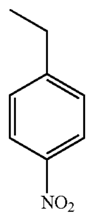
compound 10-22
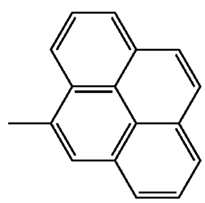 [SMILES: Cc1cc2cccc3ccc4cccc1c4c32]
compound 10-23
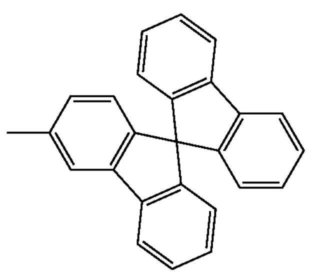 [SMILES: Cc1ccc2c(c1)-c1ccccc1C21c2ccccc2-c2ccccc21]
compound 10-24
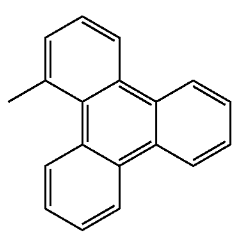 [SMILES: Cc1cccc2c3ccccc3c3ccccc3c12]
compound 10-25
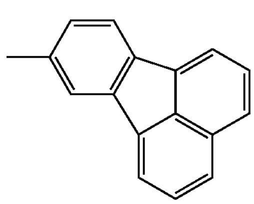 [SMILES: Cc1ccc2c(c1)-c1cccc3cccc-2c13]
compound 10-26

-continued
| R2 | R5 | compound |
| --- | --- | --- |
| —H | 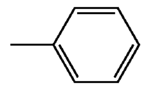 | compound 10-27 |
| 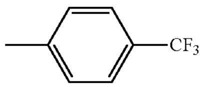 | 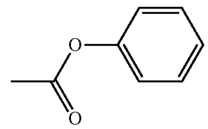 | compound 10-28 |
| —F | 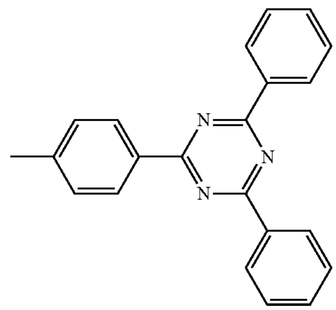 | compound 10-29 |
| —CN | 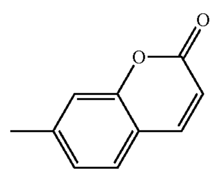 | compound 10-30 |
| 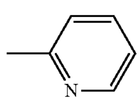 | 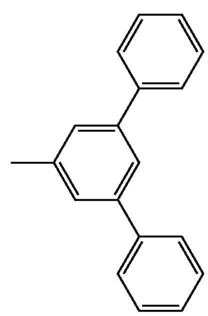 | compound 10-31 |
| 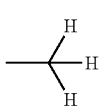 | 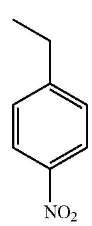 | compound 10-32 |

-continued
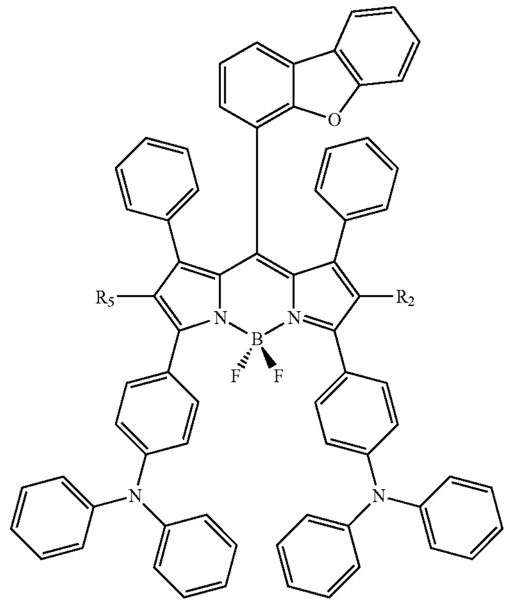
| R2, R5 | compound |
| --- | --- |
| —H | compound 11-1 |
| 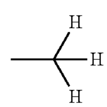 | compound 11-2 |
| —F | compound 11-3 |
| 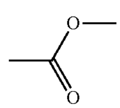 | compound 11-4 |
| 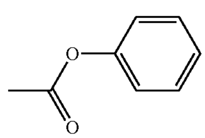 | compound 11-5 |
| —CN | compound 11-6 |
| 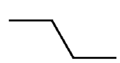 | compound 11-7 |
| 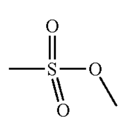 | compound 11-8 |
| 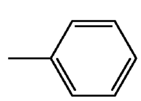 | compound 11-9 |
| 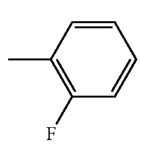 | compound 11-10 |

-continued
compound 11-11
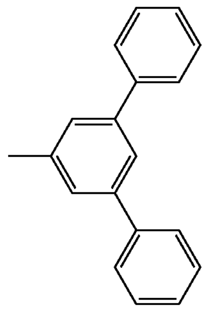 [SMILES: Cc1cc(-c2ccccc2)cc(-c2ccccc2)c1]
compound 11-12
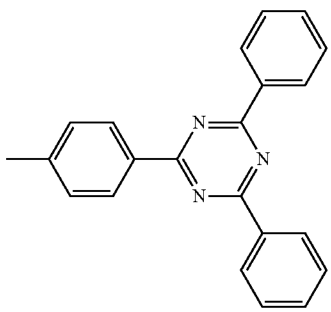 [SMILES: Cc1ccc(-c2nc(-c3ccccc3)nc(-c3ccccc3)n2)cc1]
compound 11-13
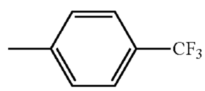
compound 11-14
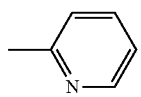
compound 11-15
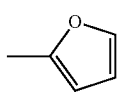
compound 11-16
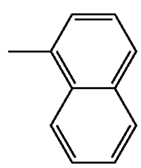
compound 11-17
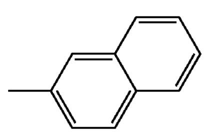
compound 11-18
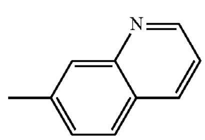
compound 11-19
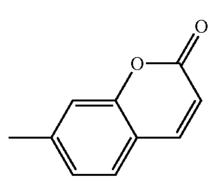

-continued
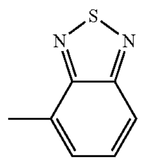
compound 11-20
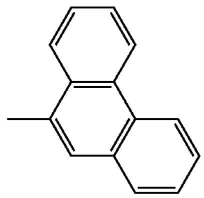
compound 11-21
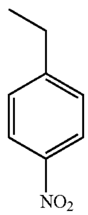
compound 11-22
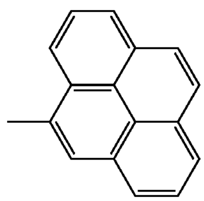 [SMILES: Cc1cc2cccc3ccc4cccc1c4c32]
compound 11-23
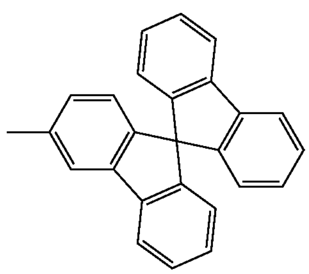 [SMILES: Cc1ccc2c(c1)-c1ccccc1C21c2ccccc2-c2ccccc21]
compound 11-24
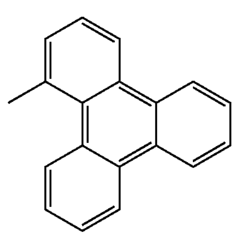 [SMILES: Cc1cccc2c3ccccc3c3ccccc3c12]
compound 11-25
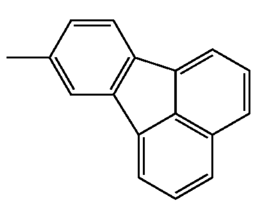 [SMILES: Cc1ccc2c(c1)-c1cccc3cccc-2c13]
compound 11-26

-continued
| R2 | R5 | compound |
|---|---|---|
| —H | 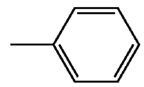 | compound 11-27 |
| 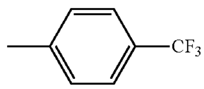 | 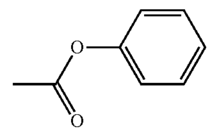 | compound 11-28 |
| —F | 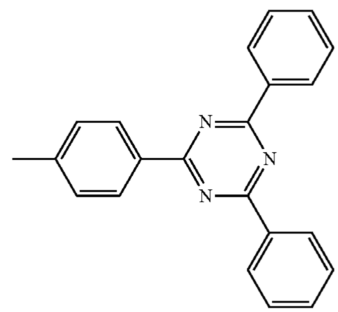 | compound 11-29 |
| —CN | 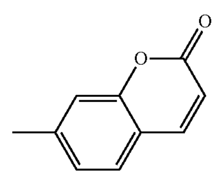 | compound 11-30 |
| 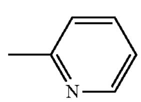 | 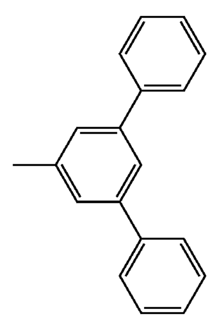 | compound 11-31 |
| 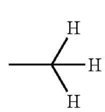 | 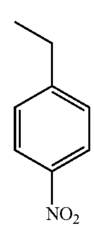 | compound 11-32 |

-continued
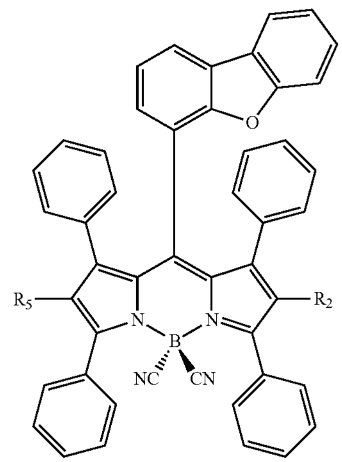
| R2, R5 | compound |
| --- | --- |
| —H | compound 12-1 |
| 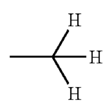 | compound 12-2 |
| —F | compound 12-3 |
| 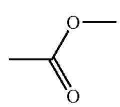 | compound 12-4 |
| 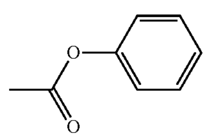 | compound 12-5 |
| —CN | compound 12-6 |
| 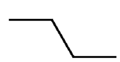 | compound 12-7 |
| 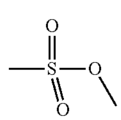 | compound 12-8 |
| 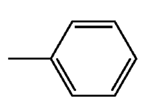 | compound 12-9 |
| 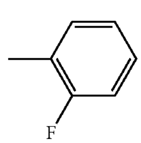 | compound 12-10 |

-continued
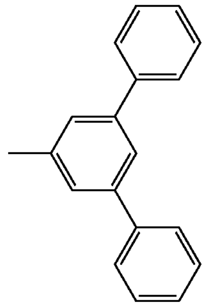 [SMILES: Cc1cc(-c2ccccc2)cc(-c2ccccc2)c1]
compound 12-11
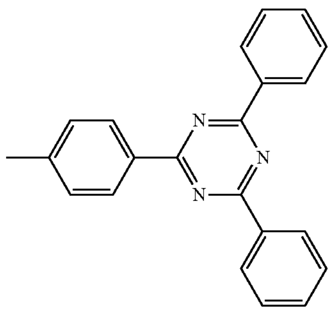 [SMILES: Cc1ccc(-c2nc(-c3ccccc3)nc(-c3ccccc3)n2)cc1]
compound 12-12
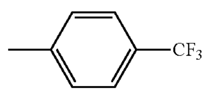
compound 12-13
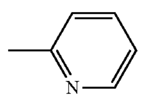
compound 12-14
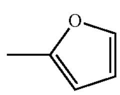
compound 12-15
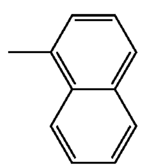
compound 12-16
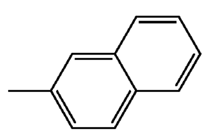
compound 12-17
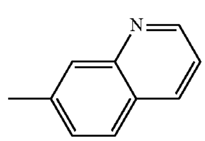
compound 12-18
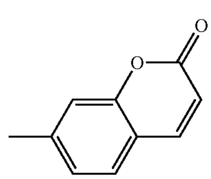
compound 12-19

-continued
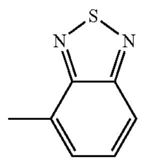
compound 12-20
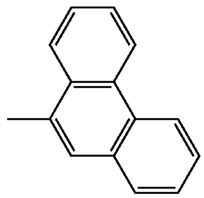
compound 12-21
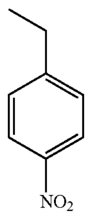
compound 12-22
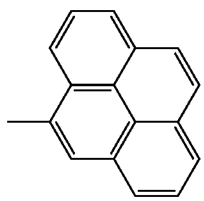 [SMILES: Cc1cc2cccc3ccc4cccc1c4c32]
compound 12-23
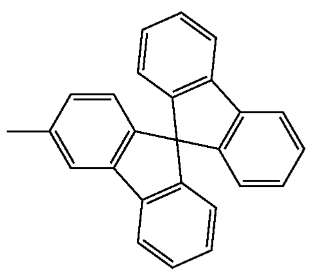 [SMILES: Cc1ccc2c(c1)-c1ccccc1C21c2ccccc2-c2ccccc21]
compound 12-24
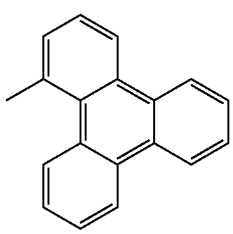 [SMILES: Cc1cccc2c3ccccc3c3ccccc3c12]
compound 12-25
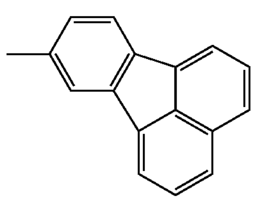 [SMILES: Cc1ccc2c(c1)-c1cccc3cccc-2c13]
compound 12-26

-continued
| R2 | R5 | compound |
| --- | --- | --- |
| —H | 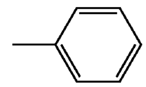 | compound 12-27 |
| 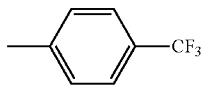 | 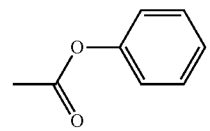 | compound 12-28 |
| —F | 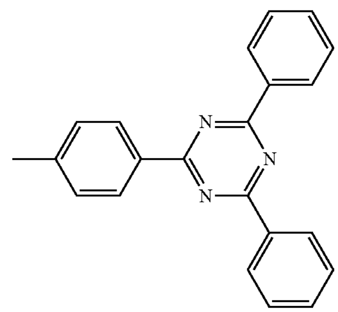 | compound 12-29 |
| —CN | 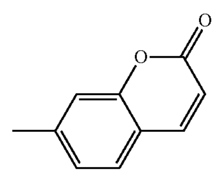 | compound 12-30 |
| 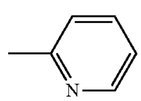 | 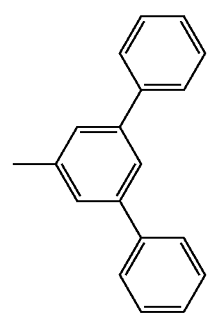 | compound 12-31 |
| 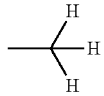 | 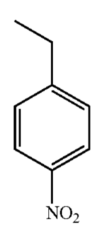 | compound 12-32 |

-continued
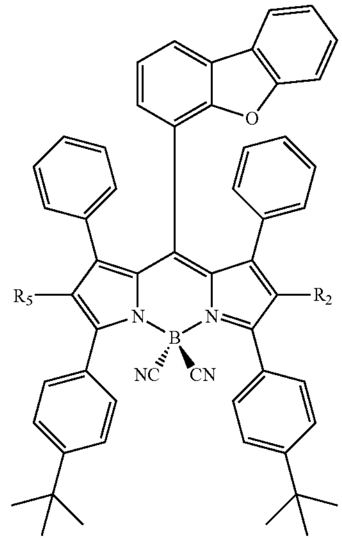
| R2, R5 | compound |
|---|---|
| —H | compound 13-1 |
| 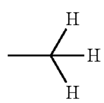 | compound 13-2 |
| —F | compound 13-3 |
| 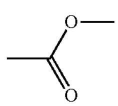 | compound 13-4 |
| 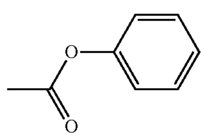 | compound 13-5 |
| —CN | compound 13-6 |
| 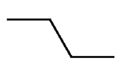 | compound 13-7 |
| 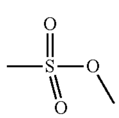 | compound 13-8 |
| 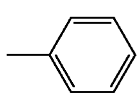 | compound 13-9 |
| 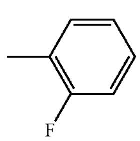 | compound 13-10 |

-continued
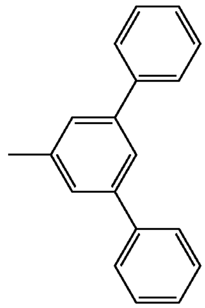 [SMILES: Cc1cc(-c2ccccc2)cc(-c2ccccc2)c1]
compound 13-11
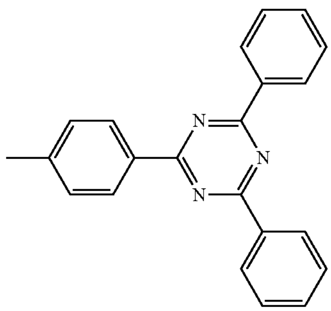 [SMILES: Cc1ccc(-c2nc(-c3ccccc3)nc(-c3ccccc3)n2)cc1]
compound 13-12
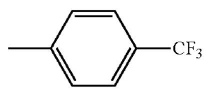
compound 13-13
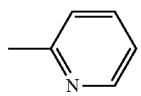
compound 13-14
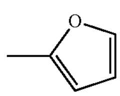
compound 13-15
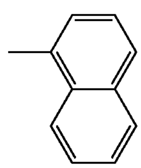
compound 13-16
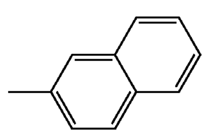
compound 13-17
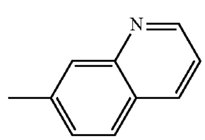
compound 13-18
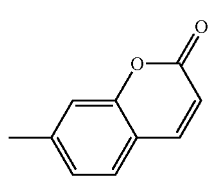
compound 13-19

-continued
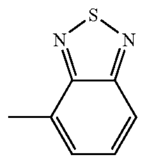
compound 13-20
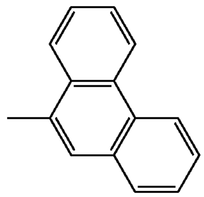
compound 13-21
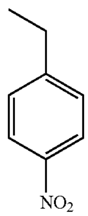
compound 13-22
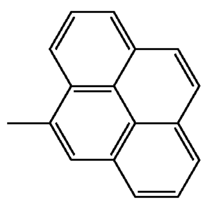 [SMILES: Cc1cc2cccc3ccc4cccc1c4c32]
compound 13-23
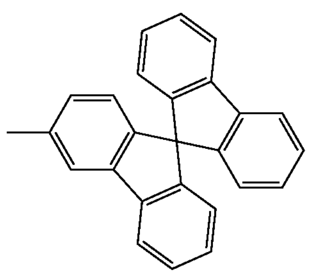 [SMILES: Cc1ccc2c(c1)-c1ccccc1C21c2ccccc2-c2ccccc21]
compound 13-24
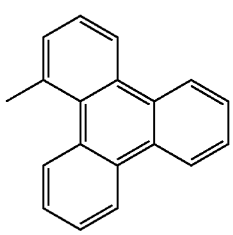 [SMILES: Cc1cccc2c3ccccc3c3ccccc3c12]
compound 13-25
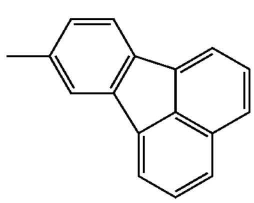 [SMILES: Cc1ccc2c(c1)-c1cccc3cccc-2c13]
compound 13-26

-continued
| R2 | R5 | compound |
|---|---|---|
| —H | 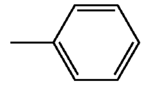 | compound 13-27 |
| 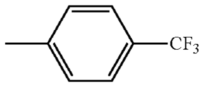 | 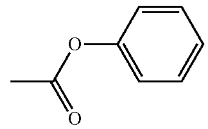 | compound 13-28 |
| —F | 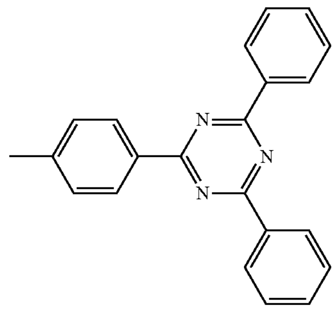 | compound 13-29 |
| —CN | 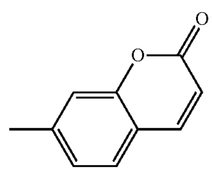 | compound 13-30 |
| 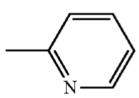 | 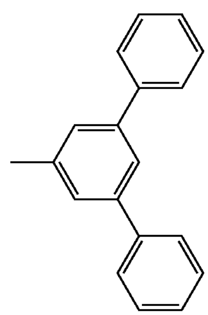 | compound 13-31 |
| 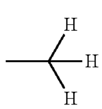 | 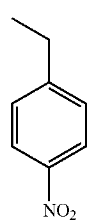 | compound 13-32 |

-continued
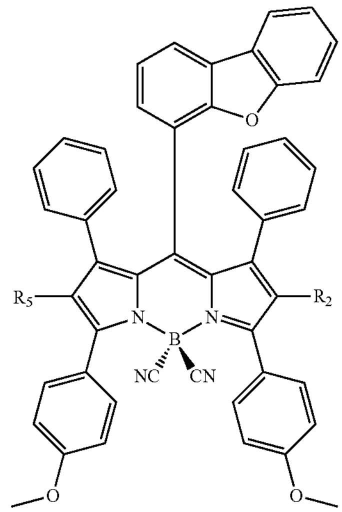
| R2, R5 | compound |
|---|---|
| —H | compound 14-1 |
| 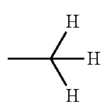 | compound 14-2 |
| —F | compound 14-3 |
| 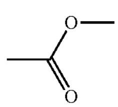 | compound 14-4 |
| 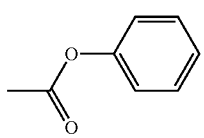 | compound 14-5 |
| —CN | compound 14-6 |
| 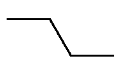 | compound 14-7 |
| 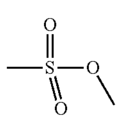 | compound 14-8 |
| 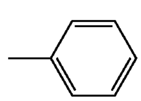 | compound 14-9 |
| 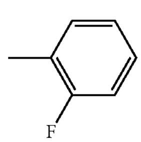 | compound 14-10 |

-continued
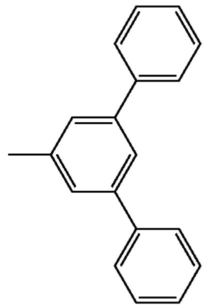 [SMILES: Cc1cc(-c2ccccc2)cc(-c2ccccc2)c1]
compound 14-11
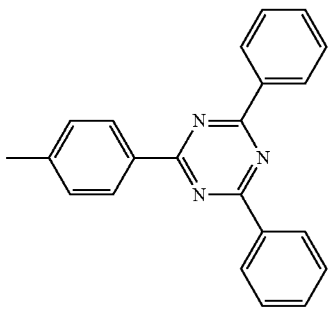 [SMILES: Cc1ccc(-c2nc(-c3ccccc3)nc(-c3ccccc3)n2)cc1]
compound 14-12
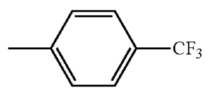
compound 14-13
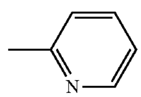
compound 14-14
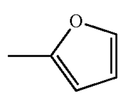
compound 14-15
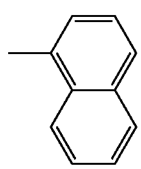
compound 14-16
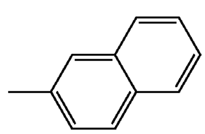
compound 14-17
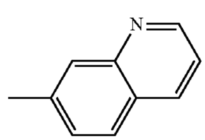
compound 14-18
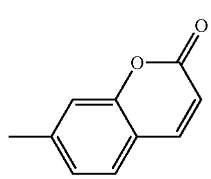
compound 14-19

-continued
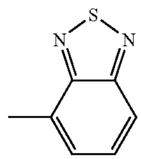
compound 14-20
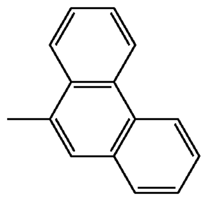
compound 14-21
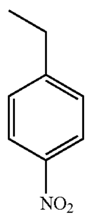
compound 14-22
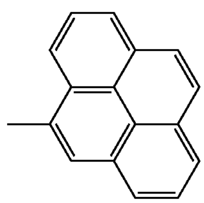 [SMILES: Cc1cc2cccc3ccc4cccc1c4c32]
compound 14-23
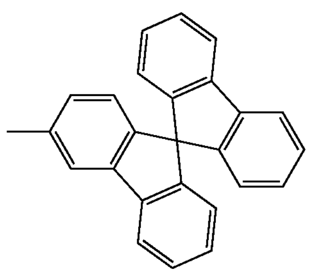 [SMILES: Cc1ccc2c(c1)-c1ccccc1C21c2ccccc2-c2ccccc21]
compound 14-24
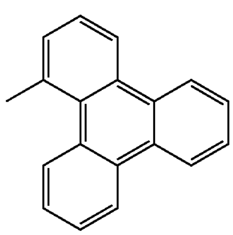 [SMILES: Cc1cccc2c3ccccc3c3ccccc3c12]
compound 14-25
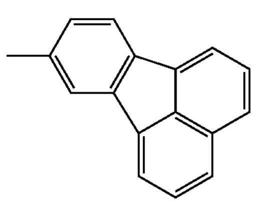 [SMILES: Cc1ccc2c(c1)-c1cccc3cccc-2c13]
compound 14-26

-continued
| R2 | R5 | compound |
| --- | --- | --- |
| —H | 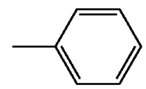 | compound 14-27 |
| 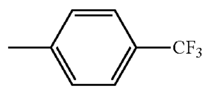 | 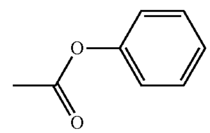 | compound 14-28 |
| —F | 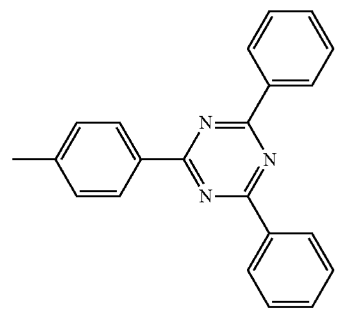 | compound 14-29 |
| —CN | 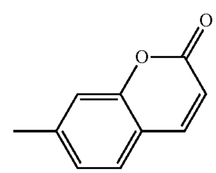 | compound 14-30 |
| 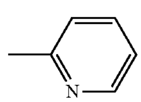 | 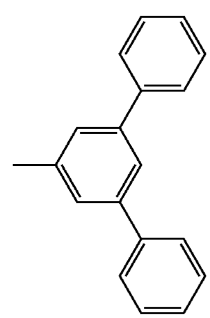 | compound 14-31 |
| 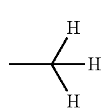 | 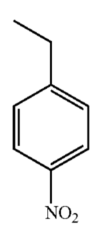 | compound 14-32 |

-continued
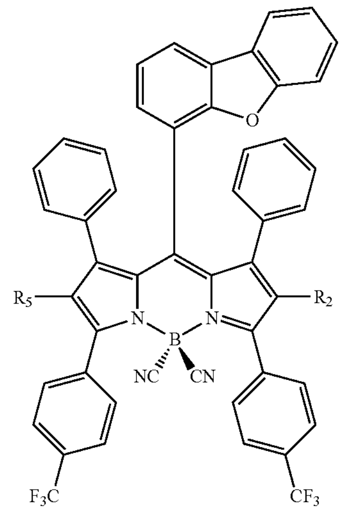
| R2, R5 | compound |
|---|---|
| —H | compound 15-1 |
| 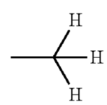 | compound 15-2 |
| —F | compound 15-3 |
| 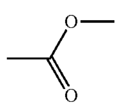 | compound 15-4 |
| 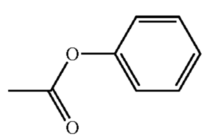 | compound 15-5 |
| —CN | compound 15-6 |
| 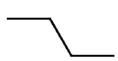 | compound 15-7 |
| 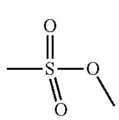 | compound 15-8 |
| 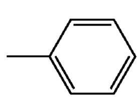 | compound 15-9 |
| 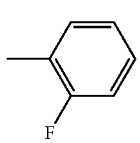 | compound 15-10 |

-continued
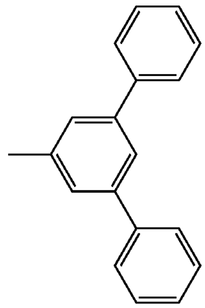 [SMILES: Cc1cc(-c2ccccc2)cc(-c2ccccc2)c1]
compound 15-11
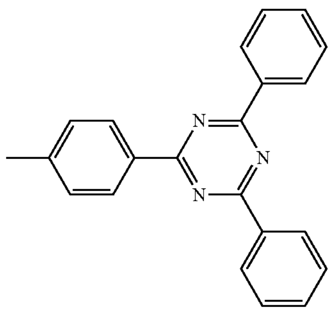 [SMILES: Cc1ccc(-c2nc(-c3ccccc3)nc(-c3ccccc3)n2)cc1]
compound 15-12
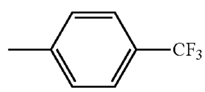
compound 15-13
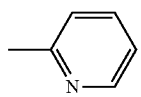
compound 15-14
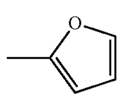
compound 15-15
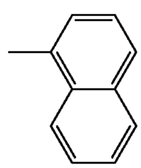
compound 15-16
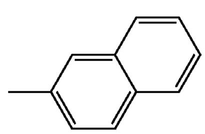
compound 15-17
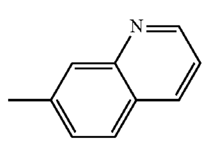
compound 15-18
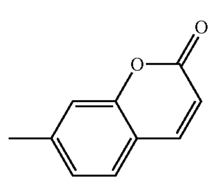
compound 15-19

-continued
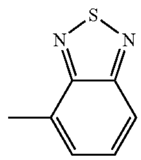
compound 15-20
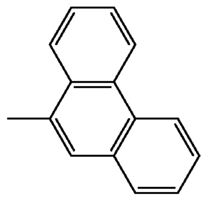
compound 15-21
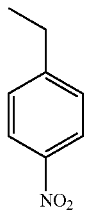
compound 15-22
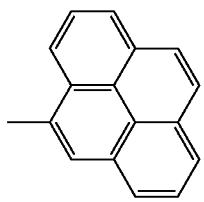 [SMILES: Cc1cc2cccc3ccc4cccc1c4c32]
compound 15-23
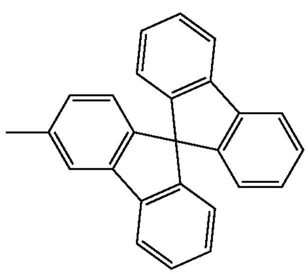 [SMILES: Cc1ccc2c(c1)-c1ccccc1C21c2ccccc2-c2ccccc21]
compound 15-24
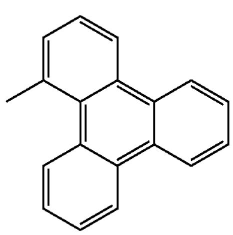 [SMILES: Cc1cccc2c3ccccc3c3ccccc3c12]
compound 15-25
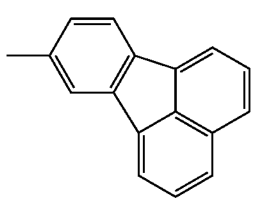 [SMILES: Cc1ccc2c(c1)-c1cccc3cccc-2c13]
compound 15-26

-continued
| R2 | R5 | compound |
|---|---|---|
| —H | 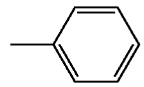 | compound 15-27 |
| 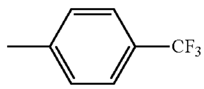 | 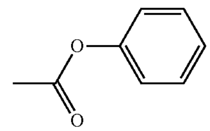 | compound 15-28 |
| —F | 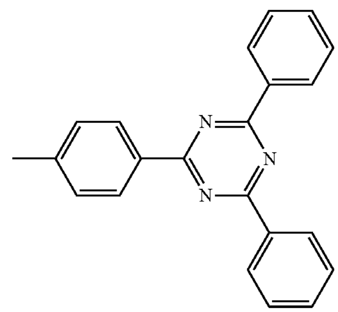 | compound 15-29 |
| —CN | 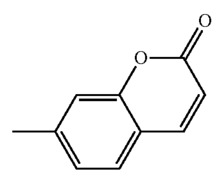 | compound 15-30 |
| 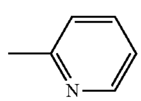 | 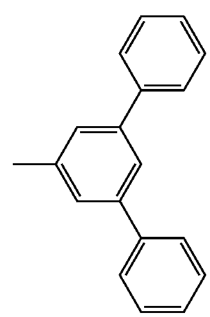 | compound 15-31 |
| 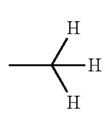 | 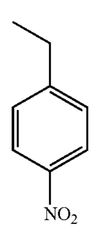 | compound 15-32 |

-continued
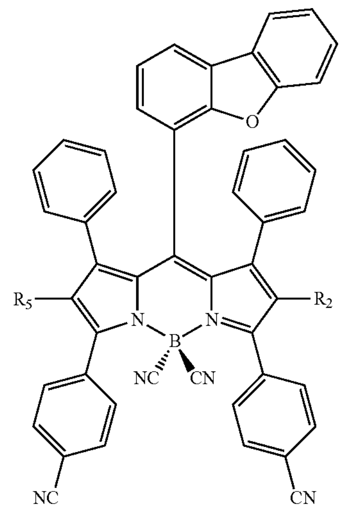
| R2, R5 | compound |
|---|---|
| —H | compound 16-1 |
| 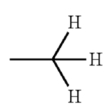 | compound 16-2 |
| —F | compound 16-3 |
| 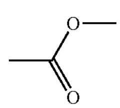 | compound 16-4 |
| 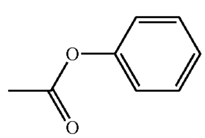 | compound 16-5 |
| —CN | compound 16-6 |
| 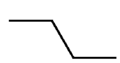 | compound 16-7 |
| 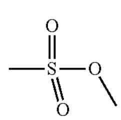 | compound 16-8 |
| 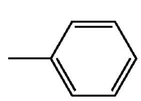 | compound 16-9 |
| 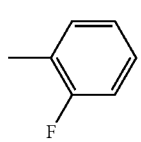 | compound 16-10 |

-continued
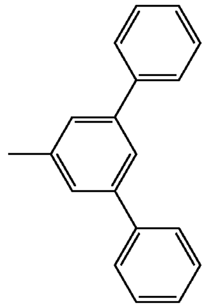 [SMILES: Cc1cc(-c2ccccc2)cc(-c2ccccc2)c1]
compound 16-11
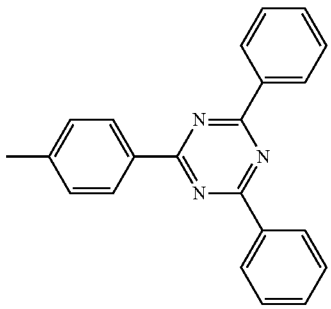 [SMILES: Cc1ccc(-c2nc(-c3ccccc3)nc(-c3ccccc3)n2)cc1]
compound 16-12
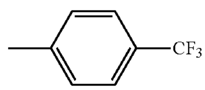
compound 16-13
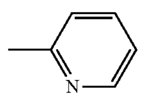
compound 16-14
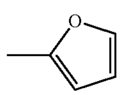
compound 16-15
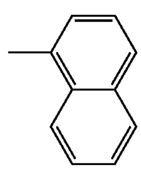
compound 16-16
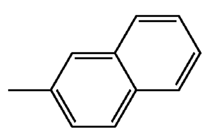
compound 16-17
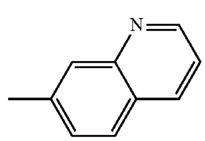
compound 16-18
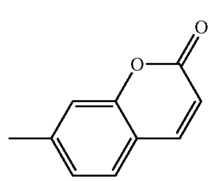
compound 16-19

-continued
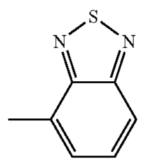
compound 16-20
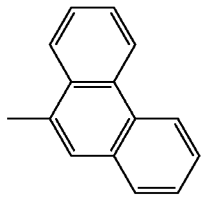
compound 16-21
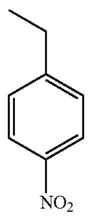
compound 16-22
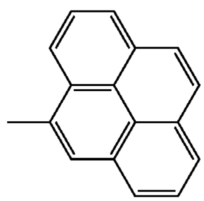 [SMILES: Cc1cc2cccc3ccc4cccc1c4c32]
compound 16-23
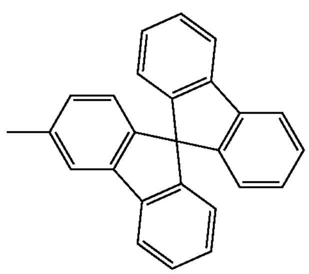 [SMILES: Cc1ccc2c(c1)-c1ccccc1C21c2ccccc2-c2ccccc21]
compound 16-24
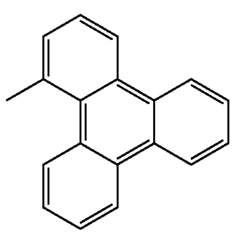 [SMILES: Cc1cccc2c3ccccc3c3ccccc3c12]
compound 16-25
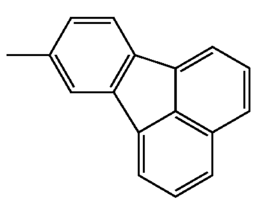 [SMILES: Cc1ccc2c(c1)-c1cccc3cccc-2c13]
compound 16-26

-continued
| R2 | R5 | compound |
|---|---|---|
| —H | 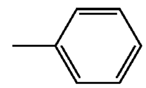 | compound 16-27 |
| 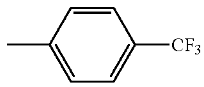 | 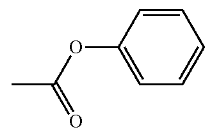 | compound 16-28 |
| —F | 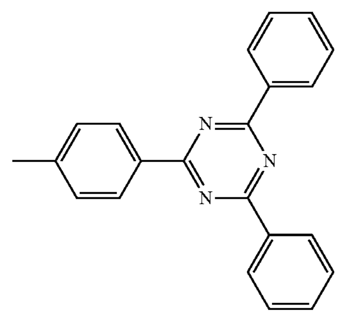 | compound 16-29 |
| —CN | 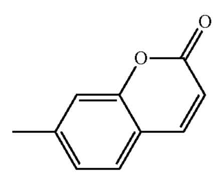 | compound 16-30 |
| 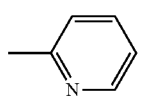 | 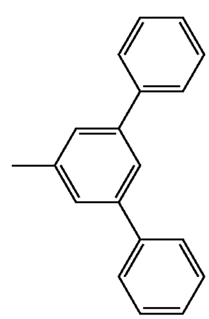 | compound 16-31 |
| 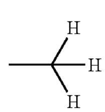 | 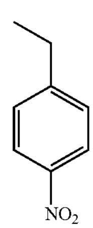 | compound 16-32 |

-continued
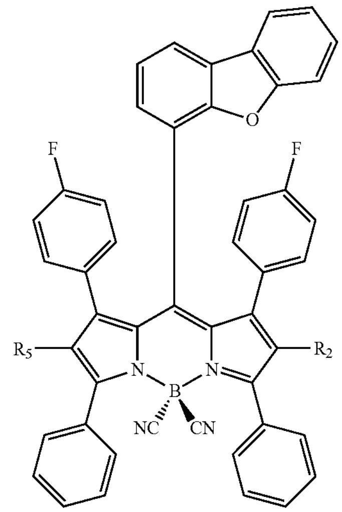
| R2, R5 | compound |
| --- | --- |
| —H | compound 17-1 |
| 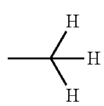  | compound 17-2 |
| —F | compound 17-3 |
| 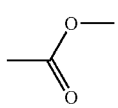  | compound 17-4 |
| 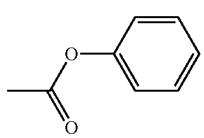  | compound 17-5 |
| —CN | compound 17-6 |
| 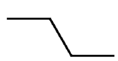 | compound 17-7 |
| 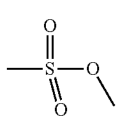  | compound 17-8 |
| 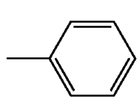 | compound 17-9 |
| 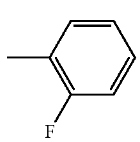  | compound 17-10 |

-continued
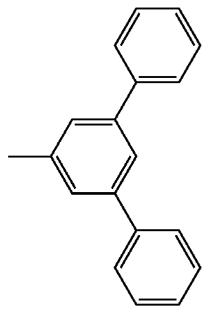 [SMILES: Cc1cc(-c2ccccc2)cc(-c2ccccc2)c1]
compound 17-11
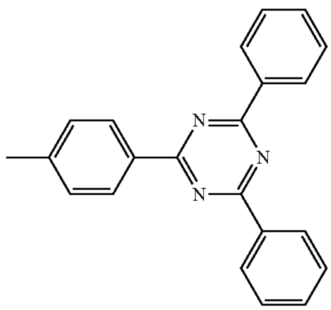 [SMILES: Cc1ccc(-c2nc(-c3ccccc3)nc(-c3ccccc3)n2)cc1]
compound 17-12
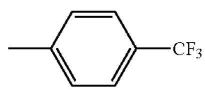
compound 17-13
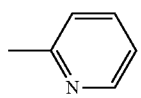
compound 17-14
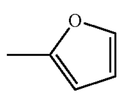
compound 17-15
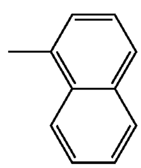
compound 17-16
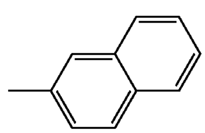
compound 17-17
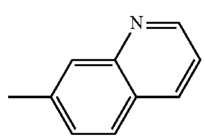
compound 17-18
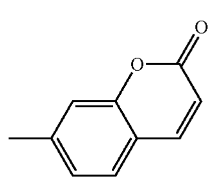
compound 17-19

-continued
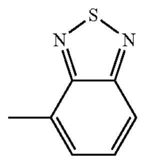
compound 17-20
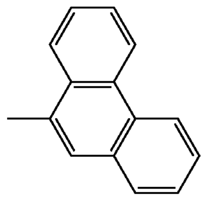
compound 17-21
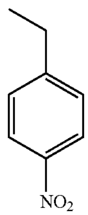
compound 17-22
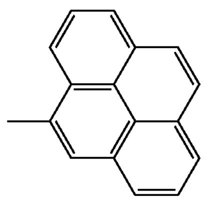 [SMILES: Cc1cc2cccc3ccc4cccc1c4c32]
compound 17-23
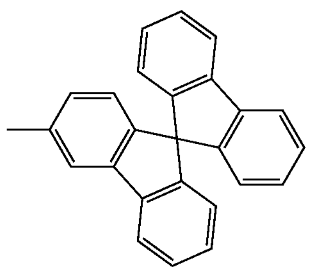 [SMILES: Cc1ccc2c(c1)-c1ccccc1C21c2ccccc2-c2ccccc21]
compound 17-24
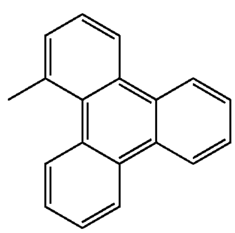 [SMILES: Cc1cccc2c3ccccc3c3ccccc3c12]
compound 17-25
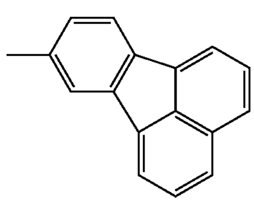 [SMILES: Cc1ccc2c(c1)-c1cccc3cccc-2c13]
compound 17-26

-continued
| R2 | R5 | compound |
|---|---|---|
| —H | 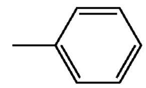 | compound 17-27 |
| 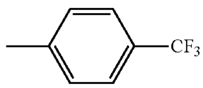 | 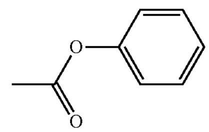 | compound 17-28 |
| —F | 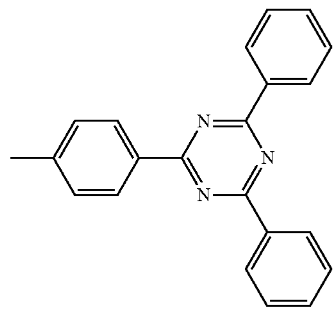 | compound 17-29 |
| —CN | 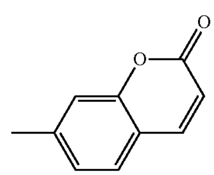 | compound 17-30 |
| 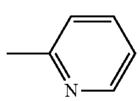 | 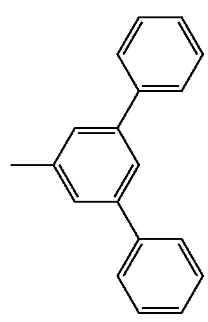 | compound 17-31 |
| 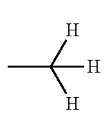 | 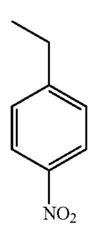 | compound 17-32 |

-continued
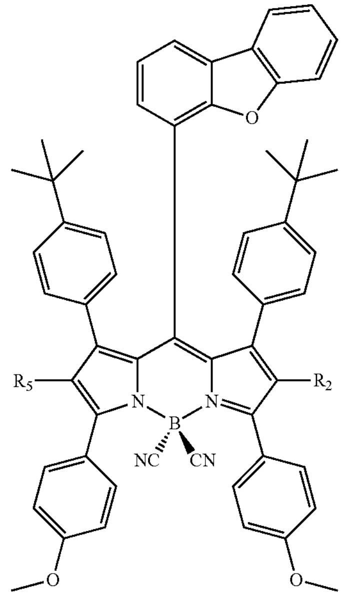
| R2, R5 | compound |
|---|---|
| —H | compound 18-1 |
| 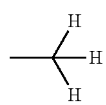 | compound 18-2 |
| —F | compound 18-3 |
| 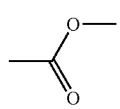 | compound 18-4 |
| 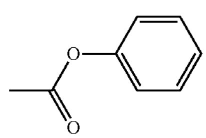 | compound 18-5 |
| —CN | compound 18-6 |
| 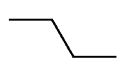 | compound 18-7 |
| 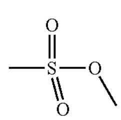 | compound 18-8 |
| 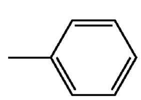 | compound 18-9 |
| 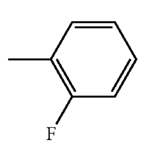 | compound 18-10 |

-continued
compound 18-11
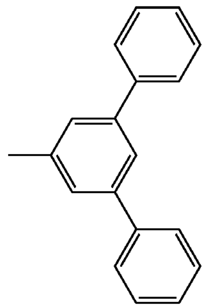 [SMILES: Cc1cc(-c2ccccc2)cc(-c2ccccc2)c1]
compound 18-12
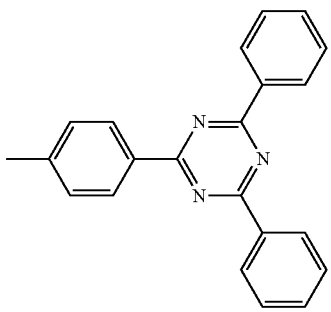 [SMILES: Cc1ccc(-c2nc(-c3ccccc3)nc(-c3ccccc3)n2)cc1]
compound 18-13
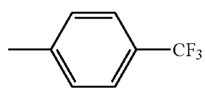
compound 18-14
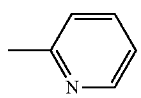
compound 18-15
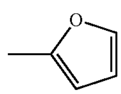
compound 18-16
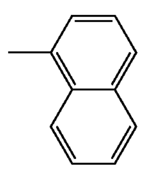
compound 18-17
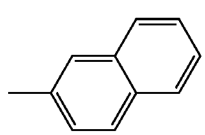
compound 18-18
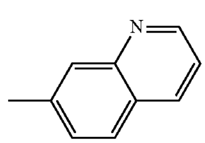
compound 18-19
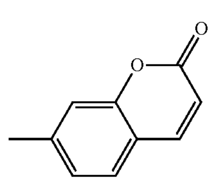

-continued
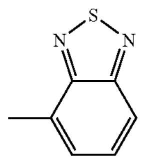
compound 18-20
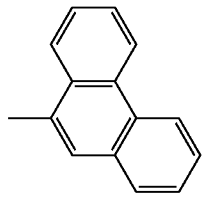
compound 18-21
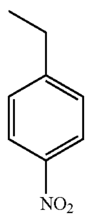
compound 18-22
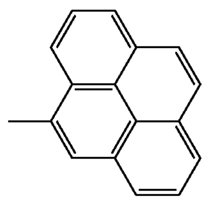 [SMILES: Cc1cc2cccc3ccc4cccc1c4c32]
compound 18-23
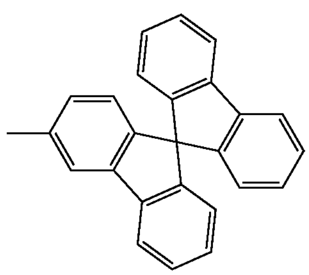 [SMILES: Cc1ccc2c(c1)-c1ccccc1C21c2ccccc2-c2ccccc21]
compound 18-24
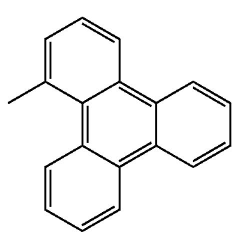 [SMILES: Cc1cccc2c3ccccc3c3ccccc3c12]
compound 18-25
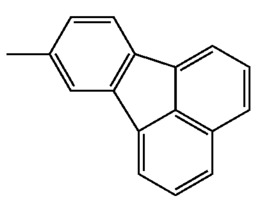 [SMILES: Cc1ccc2c(c1)-c1cccc3cccc-2c13]
compound 18-26

-continued
| R2 | R5 | compound |
|---|---|---|
| —H | 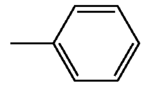 | compound 18-27 |
| 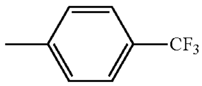 | 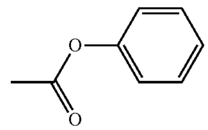 | compound 18-28 |
| —F | 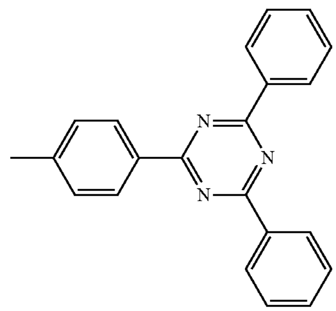 | compound 18-29 |
| —CN | 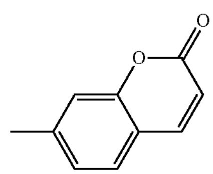 | compound 18-30 |
| 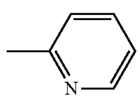 | 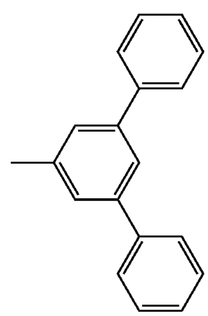 | compound 18-31 |
| 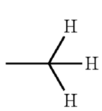 | 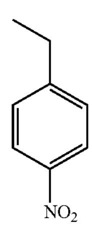 | compound 18-32 |

-continued
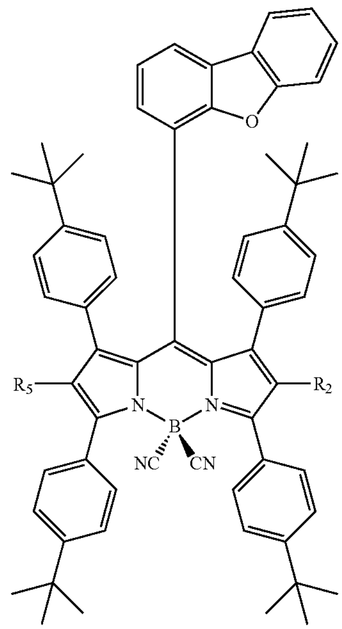
| R2, R5 | compound |
| --- | --- |
| —H | compound 19-1 |
| 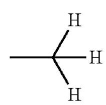 | compound 19-2 |
| —F | compound 19-3 |
| 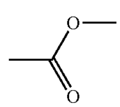 | compound 19-4 |
| 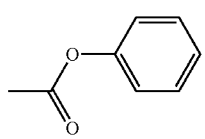 | compound 19-5 |
| —CN | compound 19-6 |
| 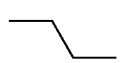 | compound 19-7 |
| 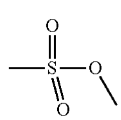 | compound 19-8 |
| 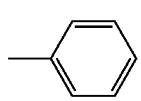 | compound 19-9 |
| 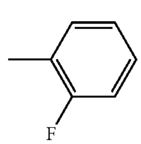 | compound 19-10 |

-continued
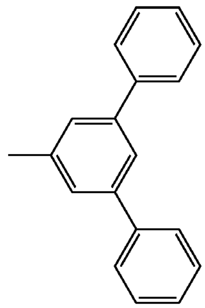 [SMILES: Cc1cc(-c2ccccc2)cc(-c2ccccc2)c1]
compound 19-11
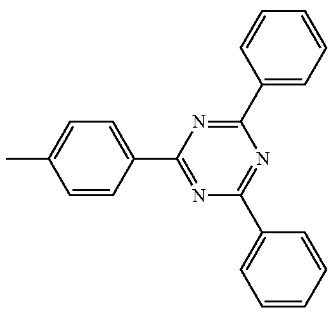 [SMILES: Cc1ccc(-c2nc(-c3ccccc3)nc(-c3ccccc3)n2)cc1]
compound 19-12
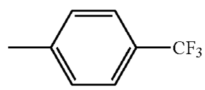
compound 19-13
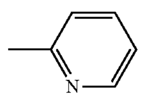
compound 19-14
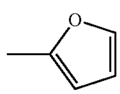
compound 19-15
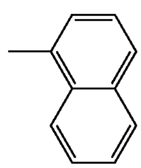
compound 19-16
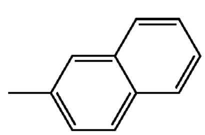
compound 19-17
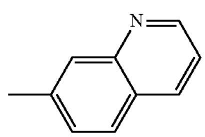
compound 19-18
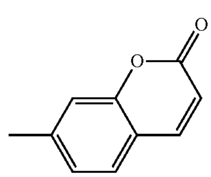
compound 19-19

-continued
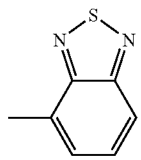
compound 19-20
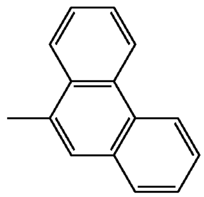
compound 19-21
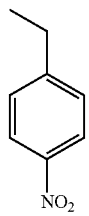
compound 19-22
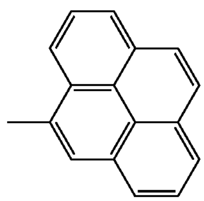 [SMILES: Cc1cc2cccc3ccc4cccc1c4c32]
compound 19-23
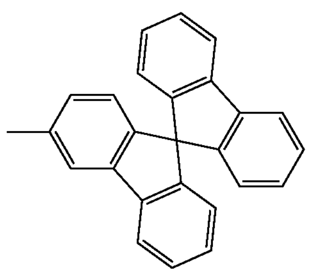 [SMILES: Cc1ccc2c(c1)-c1ccccc1C21c2ccccc2-c2ccccc21]
compound 19-24
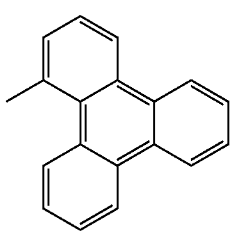 [SMILES: Cc1cccc2c3ccccc3c3ccccc3c12]
compound 19-25
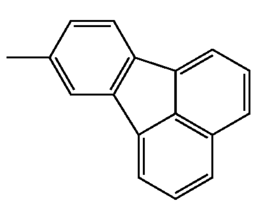 [SMILES: Cc1ccc2c(c1)-c1cccc3cccc-2c13]
compound 19-26

-continued
| R2 | R5 | compound |
| --- | --- | --- |
| —H | 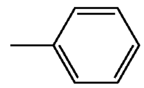 | compound 19-27 |
| 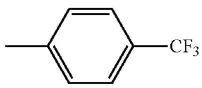 | 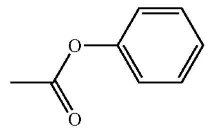 | compound 19-28 |
| —F | 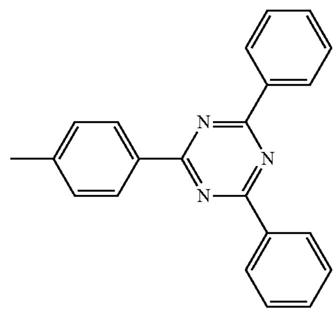 | compound 19-29 |
| —CN | 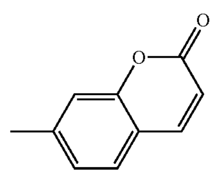 | compound 19-30 |
| 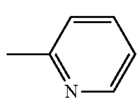 | 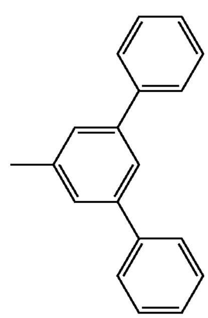 | compound 19-31 |
| 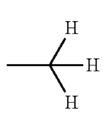 | 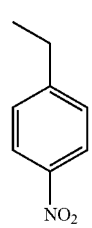 | compound 19-32 |

-continued
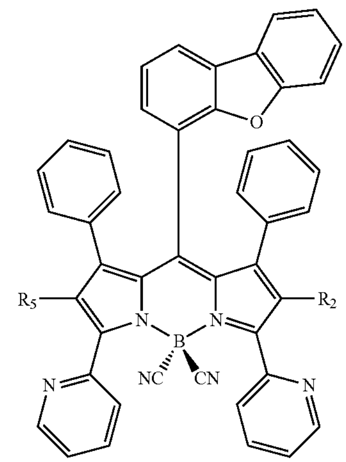
| R2, R5 | compound |
|---|---|
| —H | compound 20-1 |
| 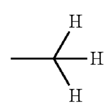 | compound 20-2 |
| —F | compound 20-3 |
| 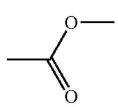 | compound 20-4 |
| 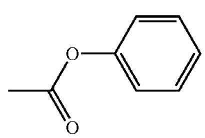 | compound 20-5 |
| —CN | compound 20-6 |
| 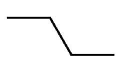 | compound 20-7 |
| 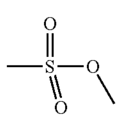 | compound 20-8 |
| 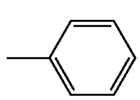 | compound 20-9 |
| 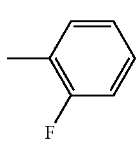 | compound 20-10 |

-continued
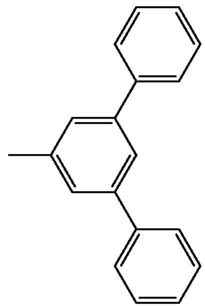 [SMILES: Cc1cc(-c2ccccc2)cc(-c2ccccc2)c1]
compound 20-11
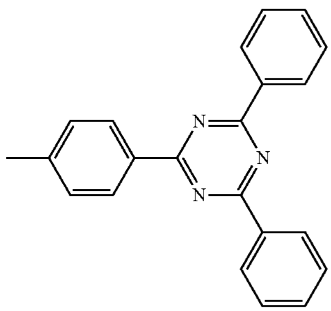 [SMILES: Cc1ccc(-c2nc(-c3ccccc3)nc(-c3ccccc3)n2)cc1]
compound 20-12
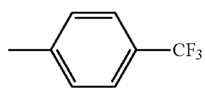
compound 20-13
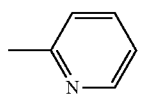
compound 20-14
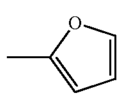
compound 20-15
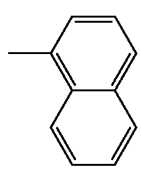
compound 20-16
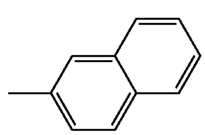
compound 20-17
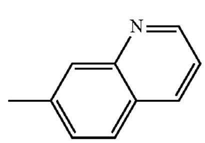
compound 20-18
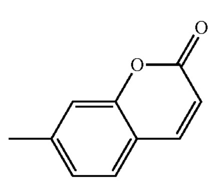
compound 20-19

-continued
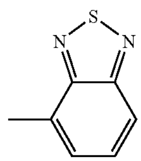
compound 20-20
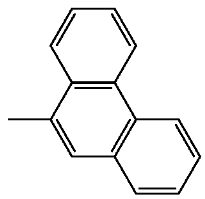
compound 20-21
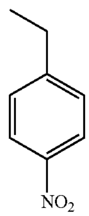
compound 20-22
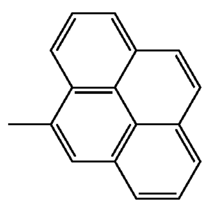 [SMILES: Cc1cc2cccc3ccc4cccc1c4c32]
compound 20-23
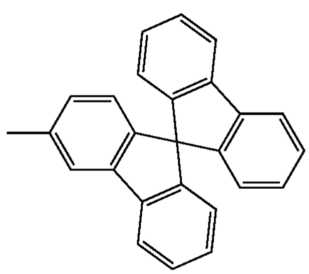 [SMILES: Cc1ccc2c(c1)-c1ccccc1C21c2ccccc2-c2ccccc21]
compound 20-24
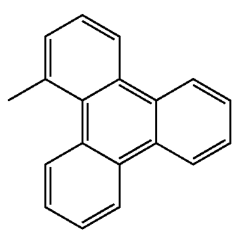 [SMILES: Cc1cccc2c3ccccc3c3ccccc3c12]
compound 20-25
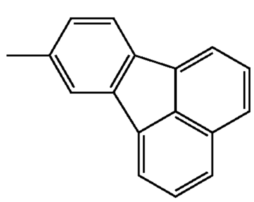 [SMILES: Cc1ccc2c(c1)-c1cccc3cccc-2c13]
compound 20-26

-continued
| R2 | R5 | compound |
|---|---|---|
| —H | 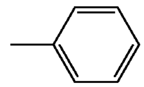 | compound 20-27 |
| 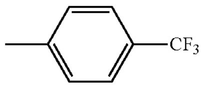 | 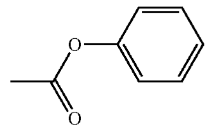 | compound 20-28 |
| —F | 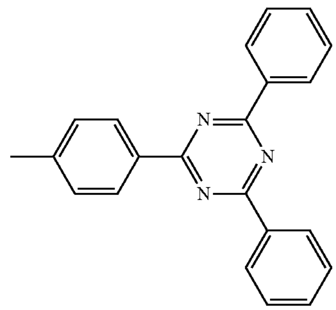 | compound 20-29 |
| —CN | 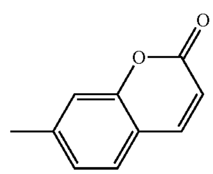 | compound 20-30 |
| 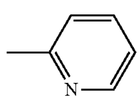 | 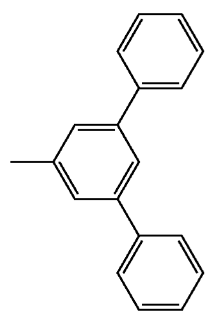 | compound 20-31 |
| 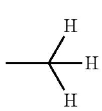 | 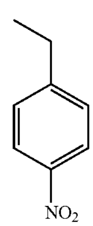 | compound 20-32 |

-continued
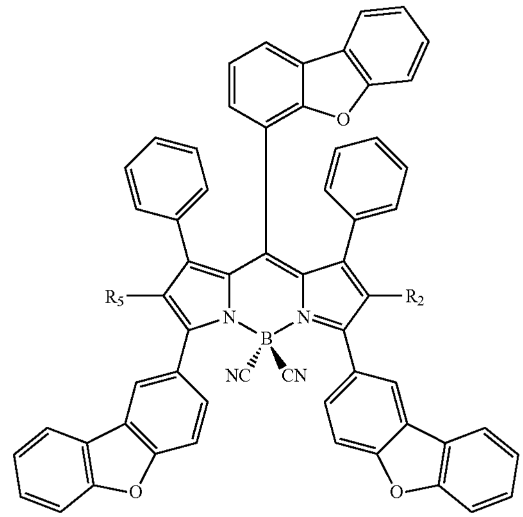
| R2, R5 | compound |
| --- | --- |
| —H | compound 21-1 |
| 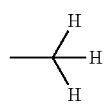 | compound 21-2 |
| —F | compound 21-3 |
| 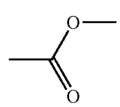 | compound 21-4 |
| 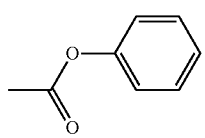 | compound 21-5 |
| —CN | compound 21-6 |
| 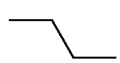 | compound 21-7 |
| 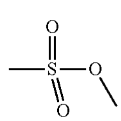 | compound 21-8 |
| 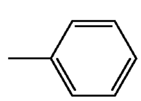 | compound 21-9 |
| 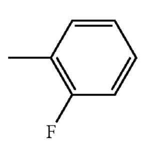 | compound 21-10 |

-continued
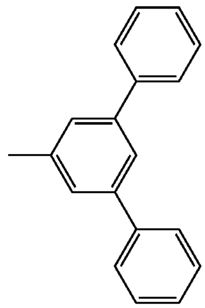 [SMILES: Cc1cc(-c2ccccc2)cc(-c2ccccc2)c1]
compound 21-11
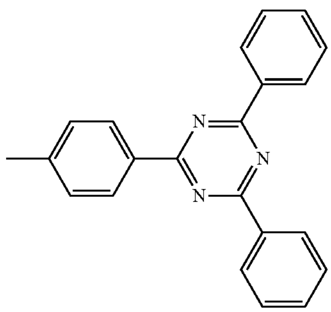 [SMILES: Cc1ccc(-c2nc(-c3ccccc3)nc(-c3ccccc3)n2)cc1]
compound 21-12
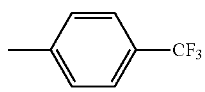
compound 21-13
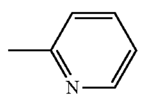
compound 21-14
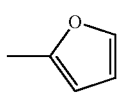
compound 21-15
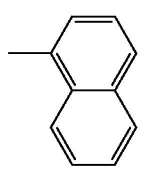
compound 21-16
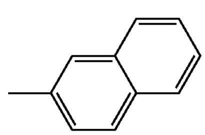
compound 21-17
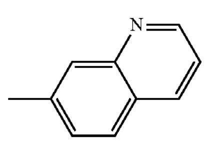
compound 21-18
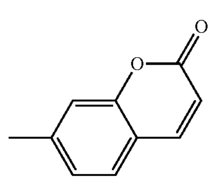
compound 21-19

-continued
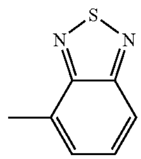
compound 21-20
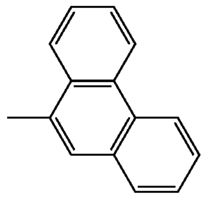
compound 21-21
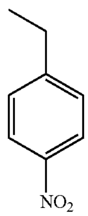
compound 21-22
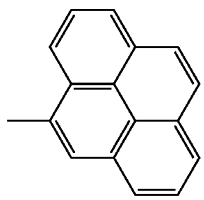 [SMILES: Cc1cc2cccc3ccc4cccc1c4c32]
compound 21-23
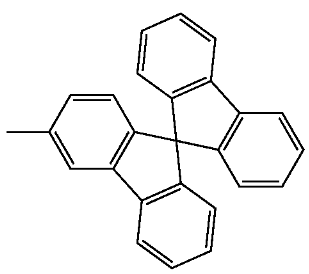 [SMILES: Cc1ccc2c(c1)-c1ccccc1C21c2ccccc2-c2ccccc21]
compound 21-24
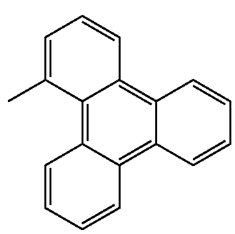 [SMILES: Cc1cccc2c3ccccc3c3ccccc3c12]
compound 21-25
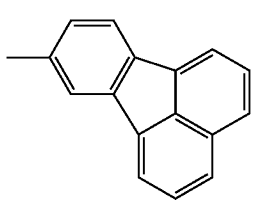 [SMILES: Cc1ccc2c(c1)-c1cccc3cccc-2c13]
compound 21-26

-continued
| R2 | R5 | compound |
| --- | --- | --- |
| —H | 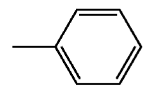 | compound 21-27 |
| 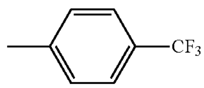 | 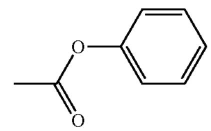 | compound 21-28 |
| —F | 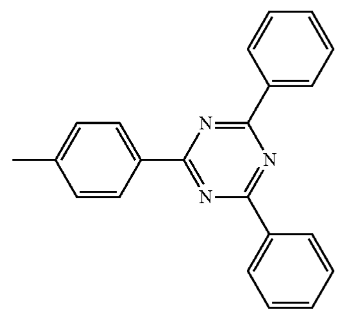 | compound 21-29 |
| —CN | 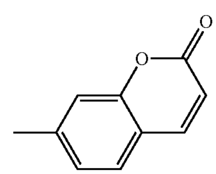 | compound 21-30 |
| 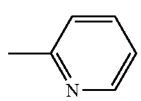 | 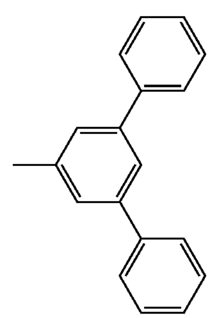 | compound 21-31 |
| 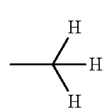 | 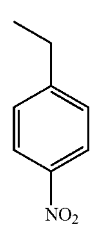 | compound 21-32 |

-continued
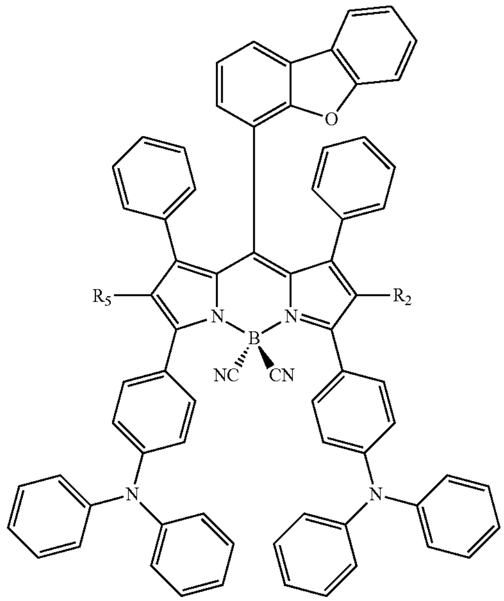
| R2, R5 | compound |
| --- | --- |
| —H | compound 22-1 |
| 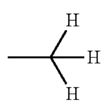 | compound 22-2 |
| —F | compound 22-3 |
| 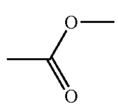 | compound 22-4 |
| 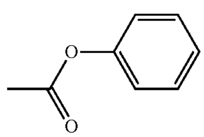 | compound 22-5 |
| —CN | compound 22-6 |
| 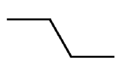 | compound 22-7 |
| 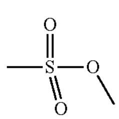 | compound 22-8 |
| 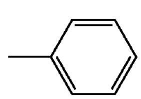 | compound 22-9 |
| 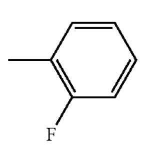 | compound 22-10 |

-continued
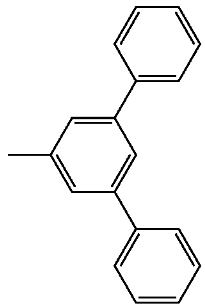 [SMILES: Cc1cc(-c2ccccc2)cc(-c2ccccc2)c1]
compound 22-11
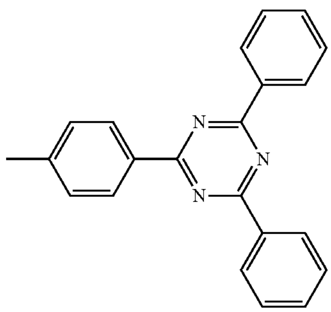 [SMILES: Cc1ccc(-c2nc(-c3ccccc3)nc(-c3ccccc3)n2)cc1]
compound 22-12
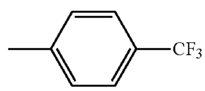
compound 22-13
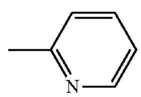
compound 22-14
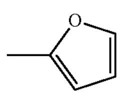
compound 22-15
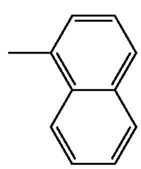
compound 22-16
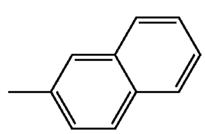
compound 22-17
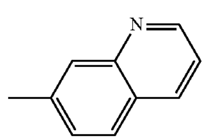
compound 22-18
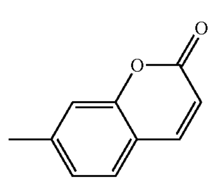
compound 22-19

-continued
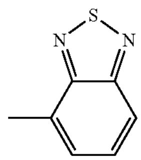
compound 22-20
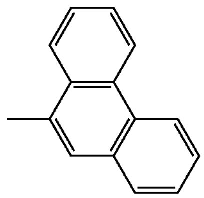
compound 22-21
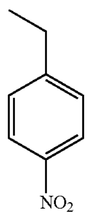
compound 22-22
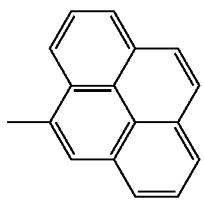 [SMILES: Cc1cc2cccc3ccc4cccc1c4c32]
compound 22-23
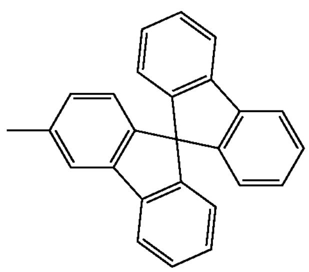 [SMILES: Cc1ccc2c(c1)-c1ccccc1C21c2ccccc2-c2ccccc21]
compound 22-24
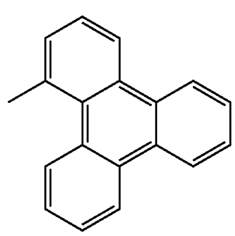 [SMILES: Cc1cccc2c3ccccc3c3ccccc3c12]
compound 22-25
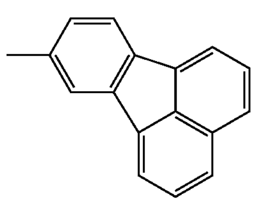 [SMILES: Cc1ccc2c(c1)-c1cccc3cccc-2c13]
compound 22-26

-continued
| R2 | R5 | compound |
| --- | --- | --- |
| —H | 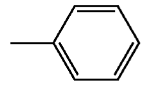 | compound 22-27 |
| 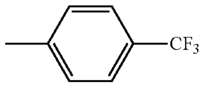 | 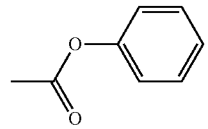 | compound 22-28 |
| —F | 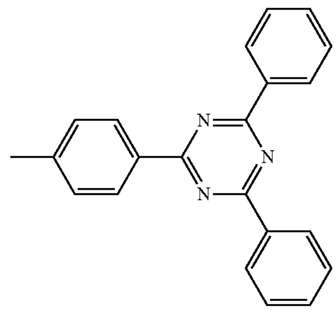 | compound 22-29 |
| —CN | 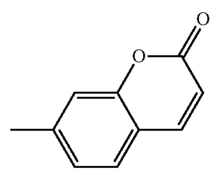 | compound 22-30 |
| 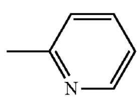 | 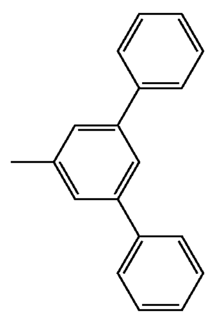 | compound 22-31 |
| 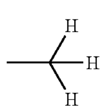 | 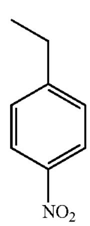 | compound 22-32 |

-continued
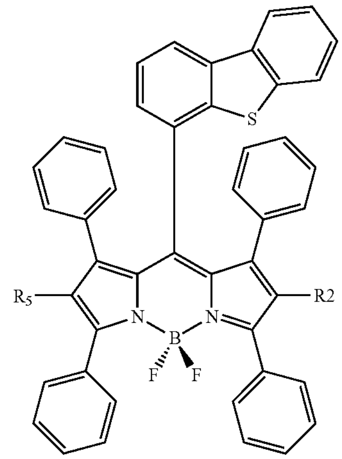
| R2, R5 | compound |
| --- | --- |
| —H | compound 23-1 |
| 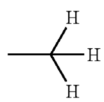 | compound 23-2 |
| —F | compound 23-3 |
| 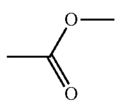 | compound 23-4 |
| 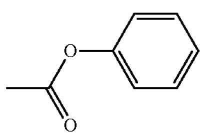 | compound 23-5 |
| —CN | compound 23-6 |
| 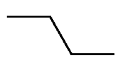 | compound 23-7 |
| 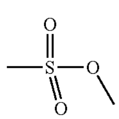 | compound 23-8 |
| 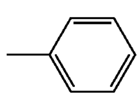 | compound 23-9 |
| 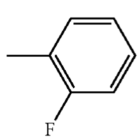 | compound 23-10 |

-continued
compound 23-11
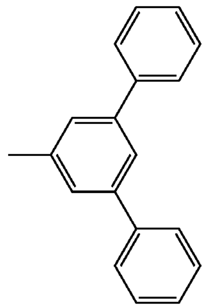 [SMILES: Cc1cc(-c2ccccc2)cc(-c2ccccc2)c1]
compound 23-12
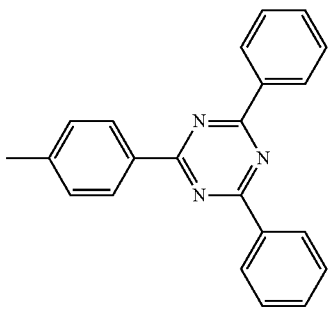 [SMILES: Cc1ccc(-c2nc(-c3ccccc3)nc(-c3ccccc3)n2)cc1]
compound 23-13
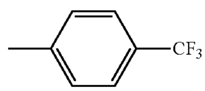
compound 23-14
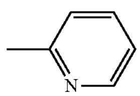
compound 23-15
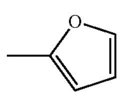
compound 23-16
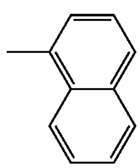
compound 23-17
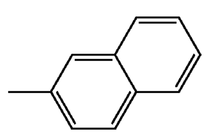
compound 23-18
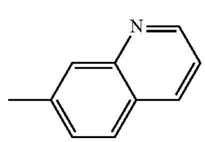
compound 23-19
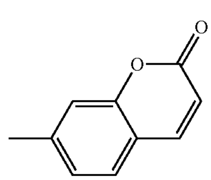

-continued
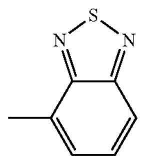
compound 23-20
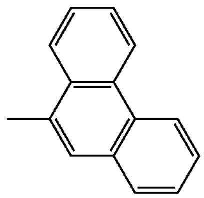
compound 23-21
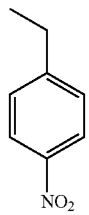
compound 23-22
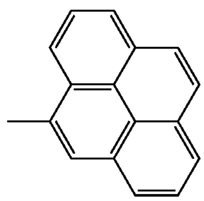 [SMILES: Cc1cc2cccc3ccc4cccc1c4c32]
compound 23-23
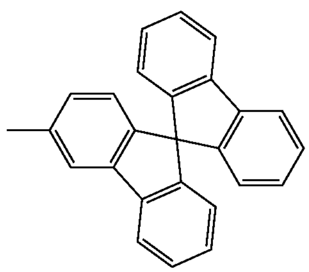 [SMILES: Cc1ccc2c(c1)-c1ccccc1C21c2ccccc2-c2ccccc21]
compound 23-24
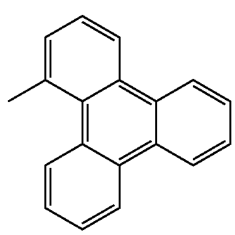 [SMILES: Cc1cccc2c3ccccc3c3ccccc3c12]
compound 23-25
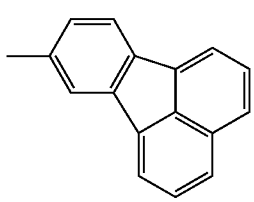 [SMILES: Cc1ccc2c(c1)-c1cccc3cccc-2c13]
compound 23-26

-continued
| R2 | R5 | compound |
|---|---|---|
| —H | 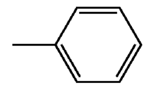 | compound 23-27 |
| 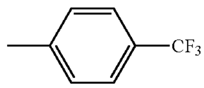 | 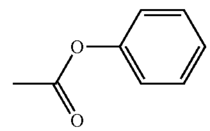 | compound 23-28 |
| —F | 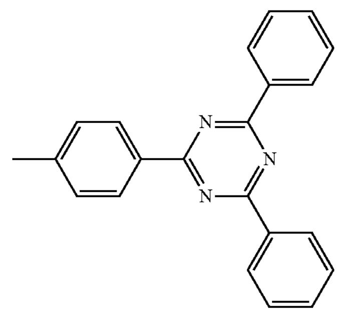 | compound 23-29 |
| —CN | 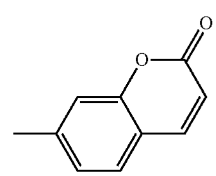 | compound 23-30 |
| 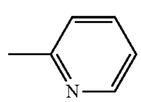 | 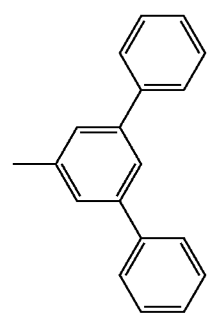 | compound 23-31 |
| 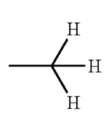 | 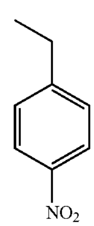 | compound 23-32 |

-continued
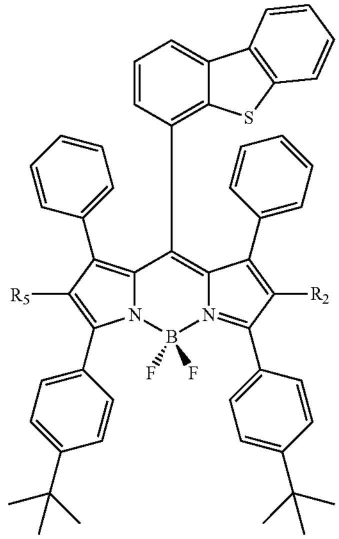
| R2, R5 | compound |
|---|---|
| —H | compound 24-1 |
| 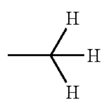 | compound 24-2 |
| —F | compound 24-3 |
| 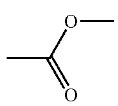 | compound 24-4 |
| 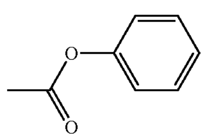 | compound 24-5 |
| —CN | compound 24-6 |
| 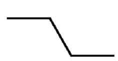 | compound 24-7 |
| 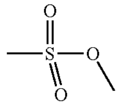 | compound 24-8 |
| 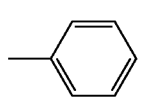 | compound 24-9 |
| 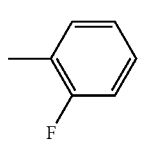 | compound 24-10 |

-continued
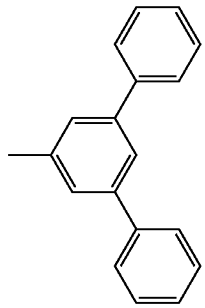 [SMILES: Cc1cc(-c2ccccc2)cc(-c2ccccc2)c1]
compound 24-11
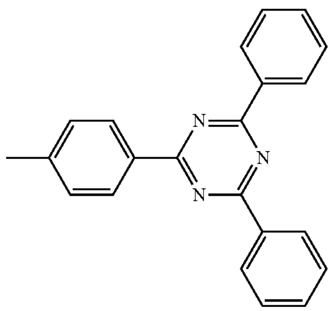 [SMILES: Cc1ccc(-c2nc(-c3ccccc3)nc(-c3ccccc3)n2)cc1]
compound 24-12
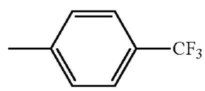
compound 24-13
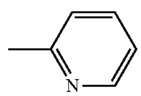
compound 24-14
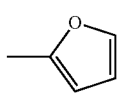
compound 24-15
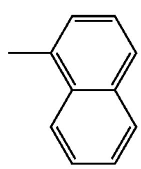
compound 24-16
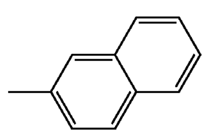
compound 24-17
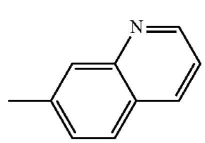
compound 24-18
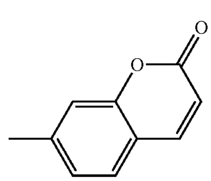
compound 24-19

-continued
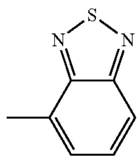
compound 24-20
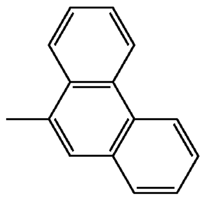
compound 24-21
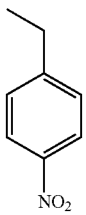
compound 24-22
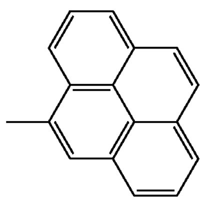 [SMILES: Cc1cc2cccc3ccc4cccc1c4c32]
compound 24-23
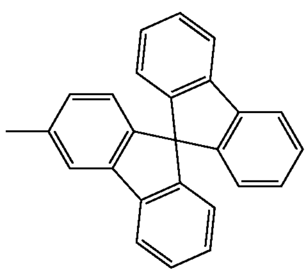 [SMILES: Cc1ccc2c(c1)-c1ccccc1C21c2ccccc2-c2ccccc21]
compound 24-24
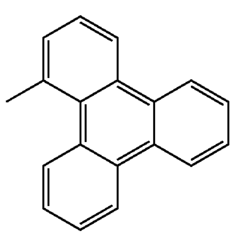 [SMILES: Cc1cccc2c3ccccc3c3ccccc3c12]
compound 24-25
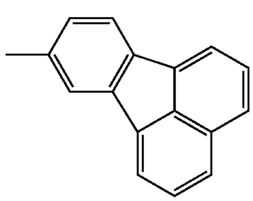 [SMILES: Cc1ccc2c(c1)-c1cccc3cccc-2c13]
compound 24-26

-continued
| R2 | R5 | compound |
|---|---|---|
| —H | 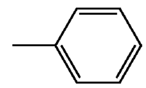 | compound 24-27 |
| 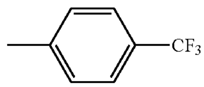 | 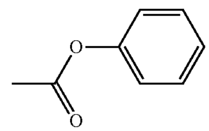 | compound 24-28 |
| —F | 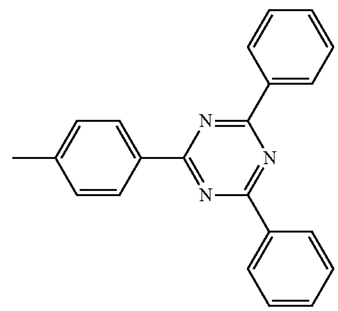 | compound 24-29 |
| —CN | 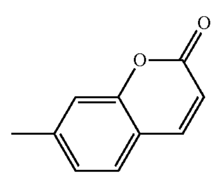 | compound 24-30 |
| 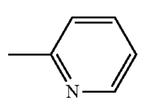 | 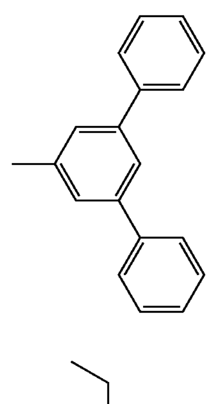 | compound 24-31 |
| 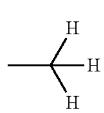 | 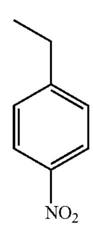 | compound 24-32 |

-continued
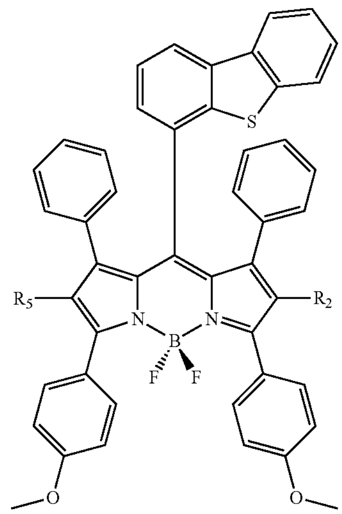
| R2, R5 | compound |
| --- | --- |
| —H | compound 25-1 |
| 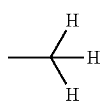 | compound 25-2 |
| —F | compound 25-3 |
| 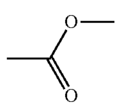 | compound 25-4 |
| 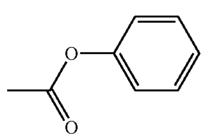 | compound 25-5 |
| —CN | compound 25-6 |
| 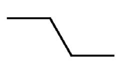 | compound 25-7 |
| 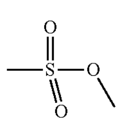 | compound 25-8 |
| 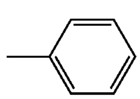 | compound 25-9 |
| 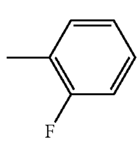 | compound 25-10 |

-continued
compound 25-11
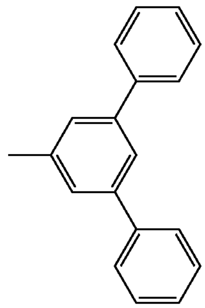 [SMILES: Cc1cc(-c2ccccc2)cc(-c2ccccc2)c1]
compound 25-12
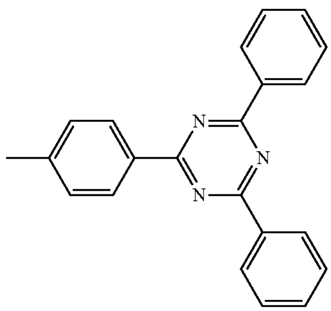 [SMILES: Cc1ccc(-c2nc(-c3ccccc3)nc(-c3ccccc3)n2)cc1]
compound 25-13
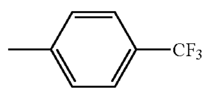
compound 25-14
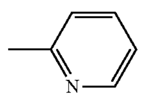
compound 25-15
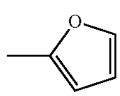
compound 25-16
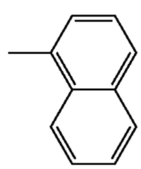
compound 25-17
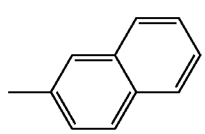
compound 25-18
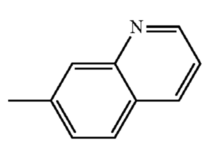
compound 25-19
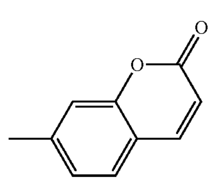

-continued
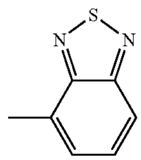
compound 25-20
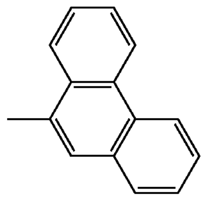
compound 25-21
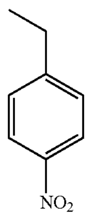
compound 25-22
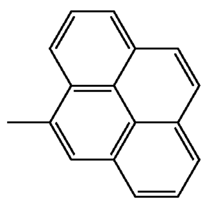 [SMILES: Cc1cc2cccc3ccc4cccc1c4c32]
compound 25-23
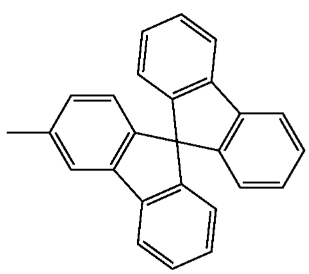 [SMILES: Cc1ccc2c(c1)-c1ccccc1C21c2ccccc2-c2ccccc21]
compound 25-24
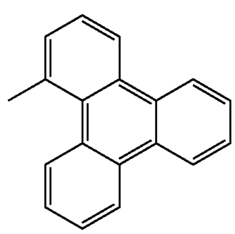 [SMILES: Cc1cccc2c3ccccc3c3ccccc3c12]
compound 25-25
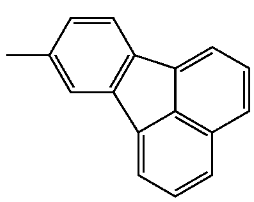 [SMILES: Cc1ccc2c(c1)-c1cccc3cccc-2c13]
compound 25-26

-continued
| R2 | R5 | compound |
|---|---|---|
| —H | 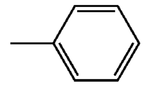 | compound 25-27 |
| 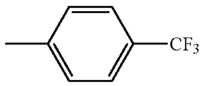 | 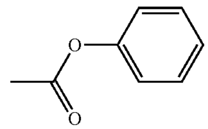 | compound 25-28 |
| —F | 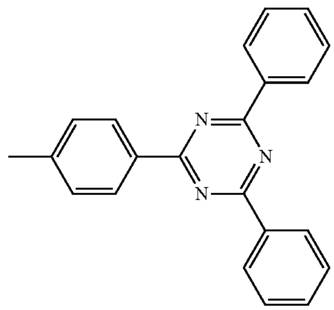 | compound 25-29 |
| —CN | 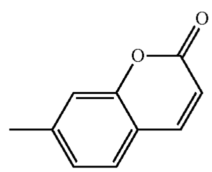 | compound 25-30 |
| 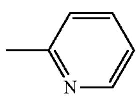 | 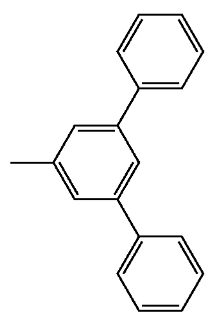 | compound 25-31 |
| 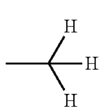 | 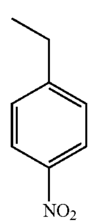 | compound 25-32 |

-continued
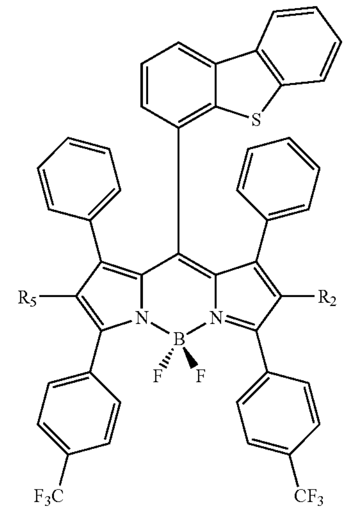
| R2, R5 | compound |
| --- | --- |
| —H | compound 26-1 |
| 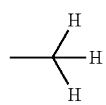 | compound 26-2 |
| —F | compound 26-3 |
| 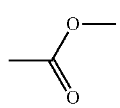 | compound 26-4 |
| 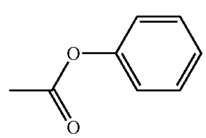 | compound 26-5 |
| —CN | compound 26-6 |
| 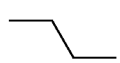 | compound 26-7 |
| 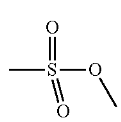 | compound 26-8 |
| 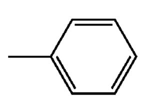 | compound 26-9 |
| 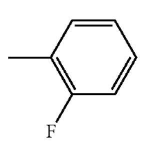 | compound 26-10 |

-continued
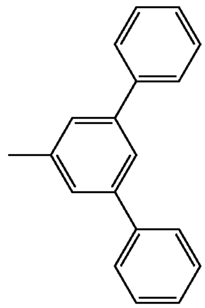 [SMILES: Cc1cc(-c2ccccc2)cc(-c2ccccc2)c1]
compound 26-11
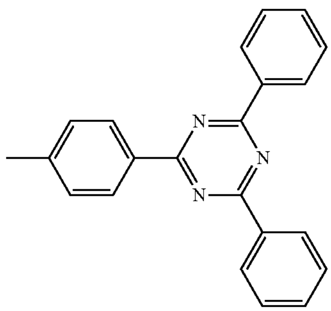 [SMILES: Cc1ccc(-c2nc(-c3ccccc3)nc(-c3ccccc3)n2)cc1]
compound 26-12
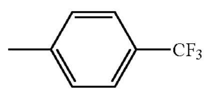
compound 26-13
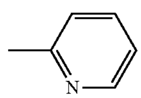
compound 26-14
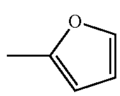
compound 26-15
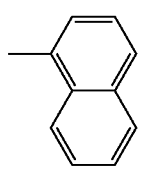
compound 26-16
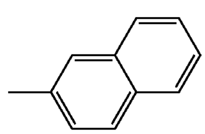
compound 26-17
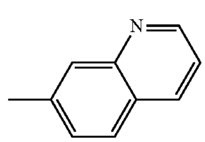
compound 26-18
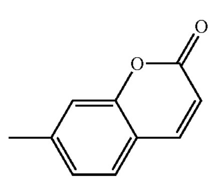
compound 26-19

-continued
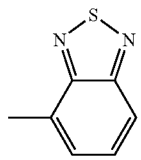
compound 26-20
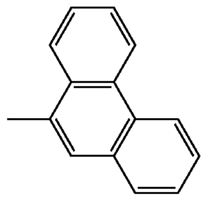
compound 26-21
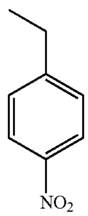
compound 26-22
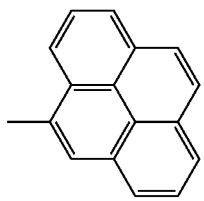 [SMILES: Cc1cc2cccc3ccc4cccc1c4c32]
compound 26-23
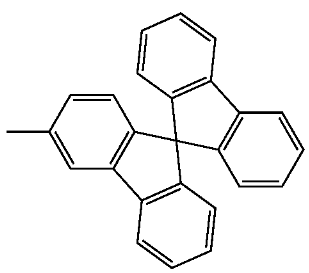 [SMILES: Cc1ccc2c(c1)-c1ccccc1C21c2ccccc2-c2ccccc21]
compound 26-24
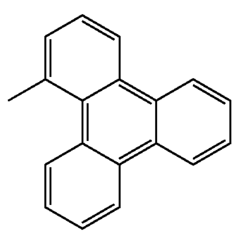 [SMILES: Cc1cccc2c3ccccc3c3ccccc3c12]
compound 26-25
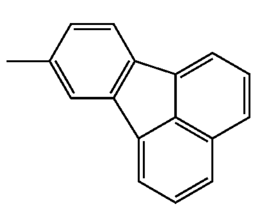 [SMILES: Cc1ccc2c(c1)-c1cccc3cccc-2c13]
compound 26-26

-continued
| R2 | R5 | compound |
|---|---|---|
| —H | 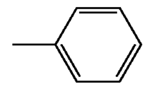 | compound 26-27 |
| 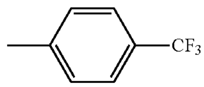 | 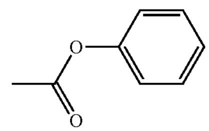 | compound 26-28 |
| —F | 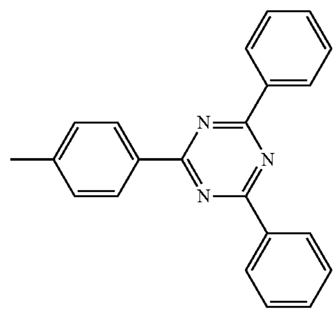 | compound 26-29 |
| —CN | 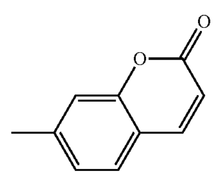 | compound 26-30 |
| 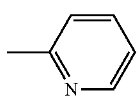 | 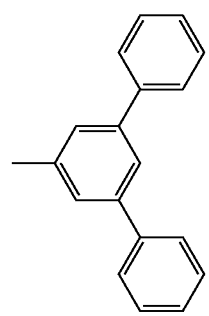 | compound 26-31 |
| 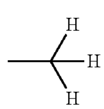 | 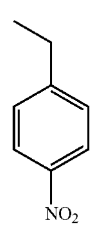 | compound 26-32 |

-continued
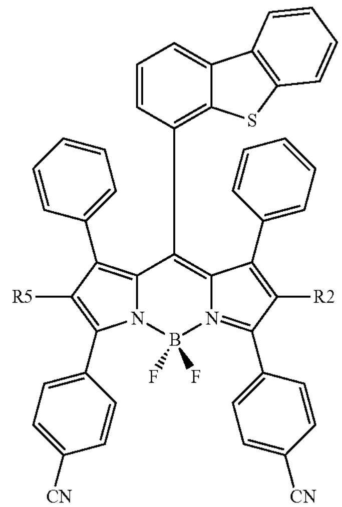
| R2, R5 | compound |
|---|---|
| —H | compound 27-1 |
| 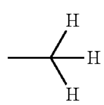 | compound 27-2 |
| —F | compound 27-3 |
| 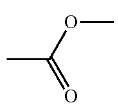 | compound 27-4 |
| 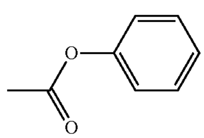 | compound 27-5 |
| —CN | compound 27-6 |
| 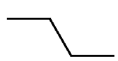 | compound 27-7 |
| 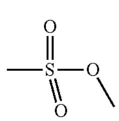 | compound 27-8 |
| 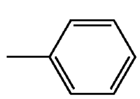 | compound 27-9 |
| 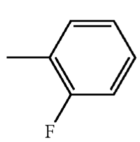 | compound 27-10 |

-continued
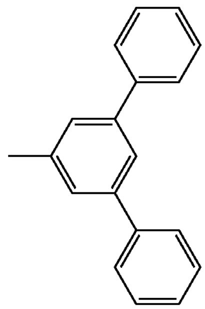 [SMILES: Cc1cc(-c2ccccc2)cc(-c2ccccc2)c1]
compound 27-11
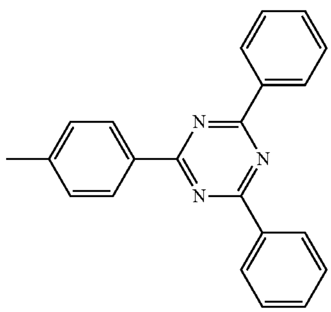 [SMILES: Cc1ccc(-c2nc(-c3ccccc3)nc(-c3ccccc3)n2)cc1]
compound 27-12
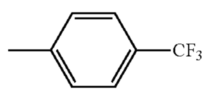
compound 27-13
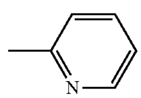
compound 27-14
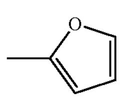
compound 27-15
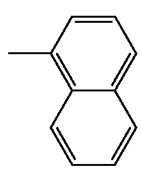
compound 27-16
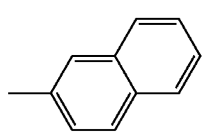
compound 27-17
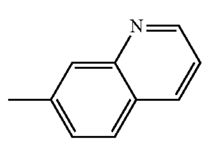
compound 27-18
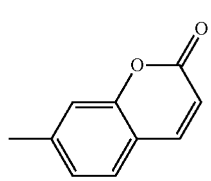
compound 27-19

-continued
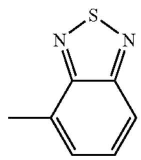
compound 27-20
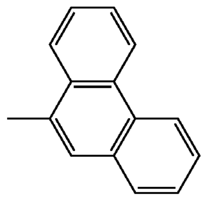
compound 27-21
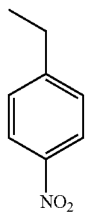
compound 27-22
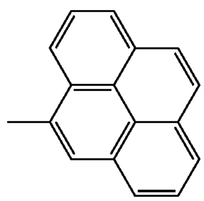 [SMILES: Cc1cc2cccc3ccc4cccc1c4c32]
compound 27-23
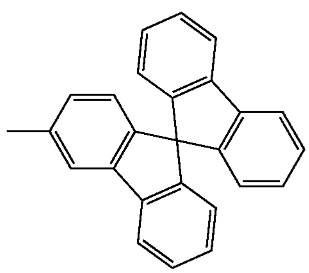 [SMILES: Cc1ccc2c(c1)-c1ccccc1C21c2ccccc2-c2ccccc21]
compound 27-24
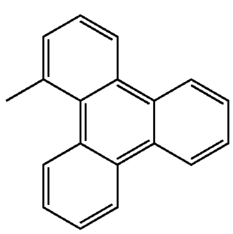 [SMILES: Cc1cccc2c3ccccc3c3ccccc3c12]
compound 27-25
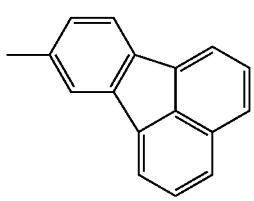 [SMILES: Cc1ccc2c(c1)-c1cccc3cccc-2c13]
compound 27-26

-continued
| R2 | R5 | compound |
| --- | --- | --- |
| —H | 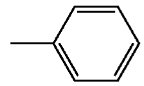 | compound 27-27 |
| 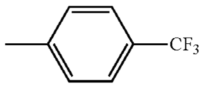 | 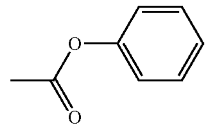 | compound 27-28 |
| —F | 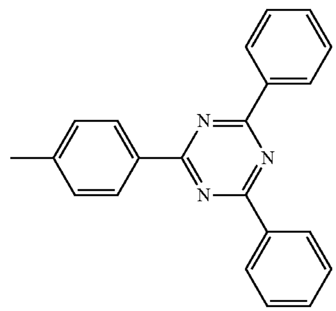 | compound 27-29 |
| —CN | 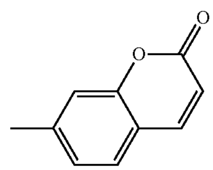 | compound 27-30 |
| 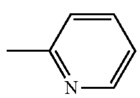 | 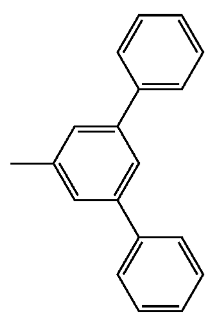 | compound 27-31 |
| 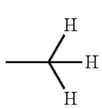 | 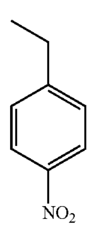 | compound 27-32 |

-continued
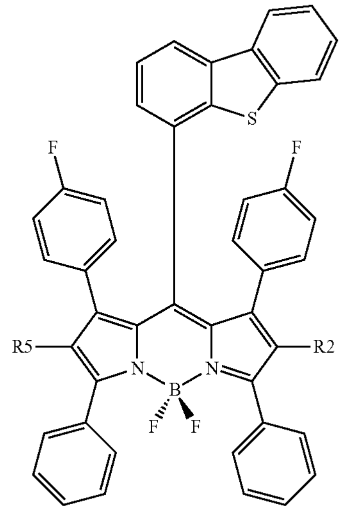
| R2, R5 | compound |
|---|---|
| —H | compound 28-1 |
| 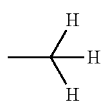 | compound 28-2 |
| —F | compound 28-3 |
| 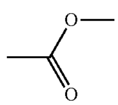 | compound 28-4 |
| 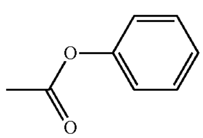 | compound 28-5 |
| —CN | compound 28-6 |
| 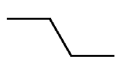 | compound 28-7 |
| 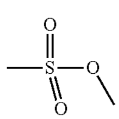 | compound 28-8 |
| 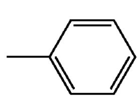 | compound 28-9 |
| 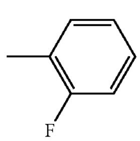 | compound 28-10 |

-continued
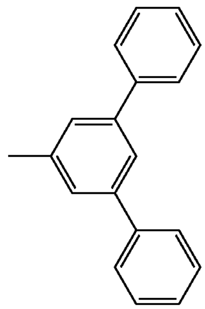 [SMILES: Cc1cc(-c2ccccc2)cc(-c2ccccc2)c1]
compound 28-11
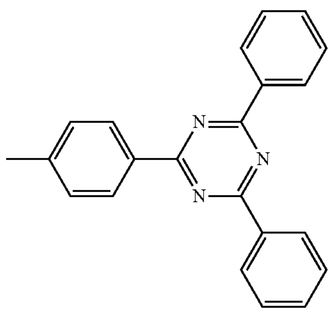 [SMILES: Cc1ccc(-c2nc(-c3ccccc3)nc(-c3ccccc3)n2)cc1]
compound 28-12
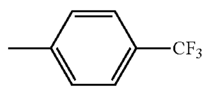
compound 28-13
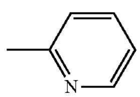
compound 28-14
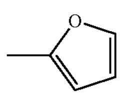
compound 28-15
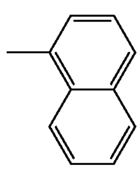
compound 18-16
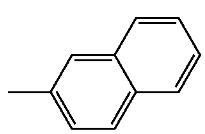
compound 28-17
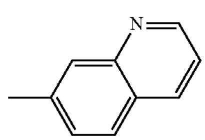
compound 28-18
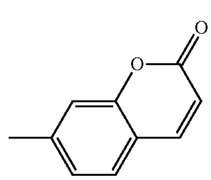
compound 28-19

-continued
compound 28-20
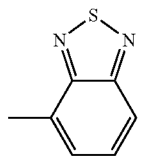
compound 28-21
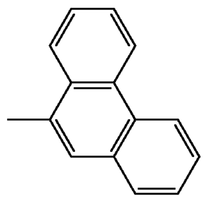
compound 28-22
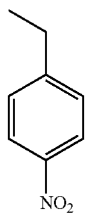
compound 28-23
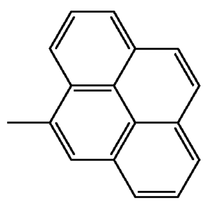 [SMILES: Cc1cc2cccc3ccc4cccc1c4c32]
compound 28-24
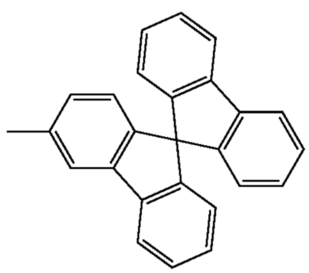 [SMILES: Cc1ccc2c(c1)-c1ccccc1C21c2ccccc2-c2ccccc21]
compound 28-25
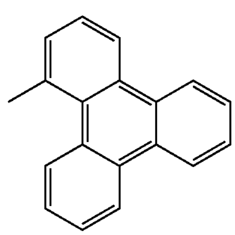 [SMILES: Cc1cccc2c3ccccc3c3ccccc3c12]
compound 28-26
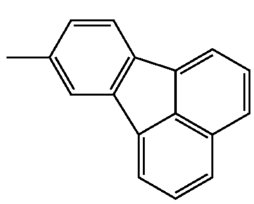 [SMILES: Cc1ccc2c(c1)-c1cccc3cccc-2c13]

-continued
| R2 | R5 | compound |
|---|---|---|
| —H | 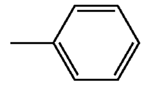 | compound 28-27 |
| 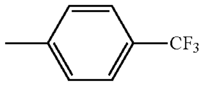 | 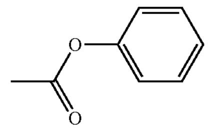 | compound 28-28 |
| —F | 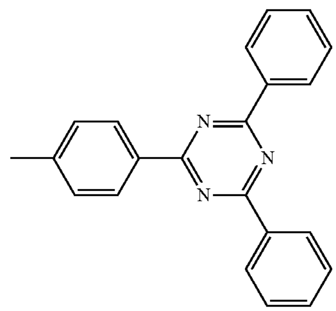 | compound 28-29 |
| —CN | 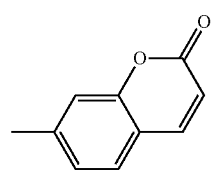 | compound 28-30 |
| 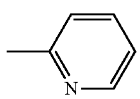 | 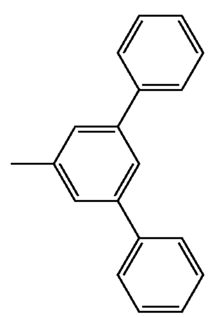 | compound 28-31 |
| 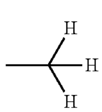 | 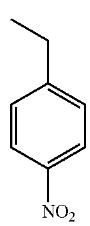 | compound 28-32 |

-continued
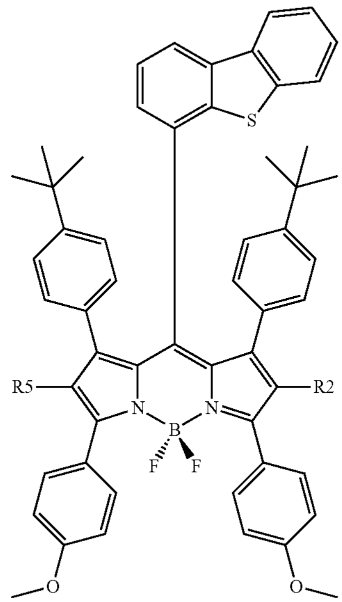
| R2, R5 | compound |
|---|---|
| —H | compound 29-1 |
| 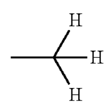 | compound 29-2 |
| —F | compound 29-3 |
| 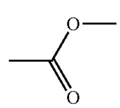 | compound 29-4 |
| 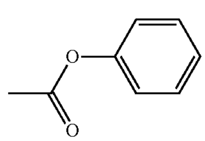 | compound 29-5 |
| —CN | compound 29-6 |
| 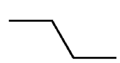 | compound 29-7 |
| 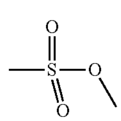 | compound 29-8 |
| 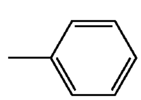 | compound 29-9 |
| 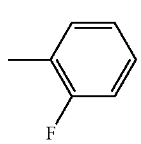 | compound 29-10 |

-continued
compound 29-11
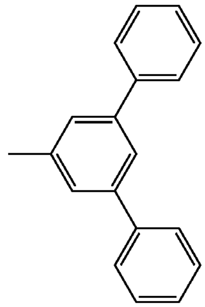 [SMILES: Cc1cc(-c2ccccc2)cc(-c2ccccc2)c1]
compound 29-12
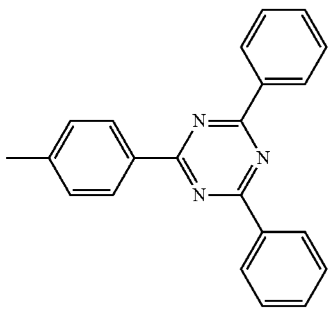 [SMILES: Cc1ccc(-c2nc(-c3ccccc3)nc(-c3ccccc3)n2)cc1]
compound 29-13
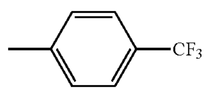
compound 29-14
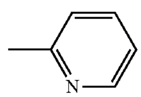
compound 29-15
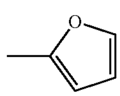
compound 29-16
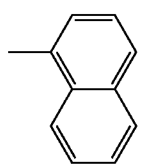
compound 29-17
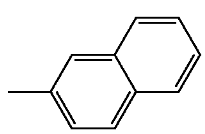
compound 29-18
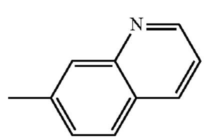
compound 29-19
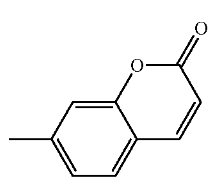

-continued
compound 29-20
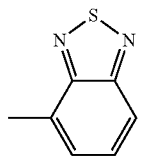
compound 29-21
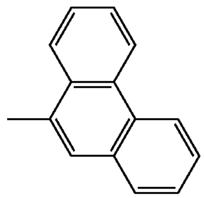
compound 29-22
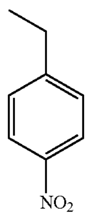
compound 29-23
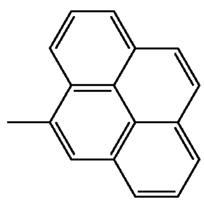 [SMILES: Cc1cc2cccc3ccc4cccc1c4c32]
compound 29-24
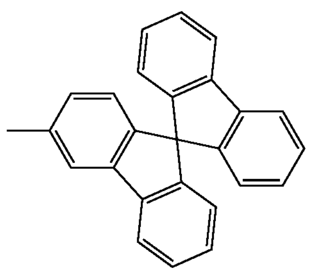 [SMILES: Cc1ccc2c(c1)-c1ccccc1C21c2ccccc2-c2ccccc21]
compound 29-25
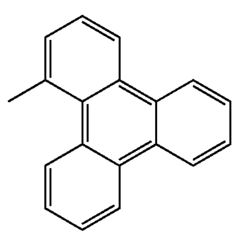 [SMILES: Cc1cccc2c3ccccc3c3ccccc3c12]
compound 29-26
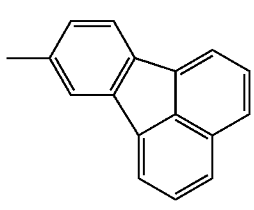 [SMILES: Cc1ccc2c(c1)-c1cccc3cccc-2c13]

-continued
| R2 | R5 | compound |
| --- | --- | --- |
| —H | 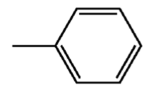 | compound 29-27 |
| 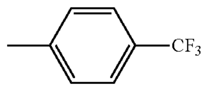 | 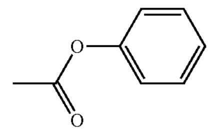 | compound 29-28 |
| —F | 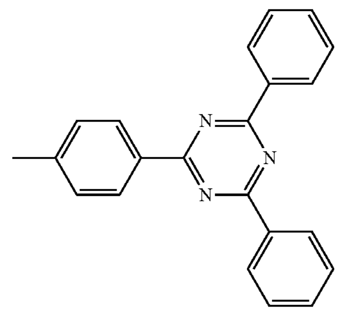 | compound 29-29 |
| —CN | 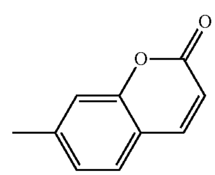 | compound 29-30 |
| 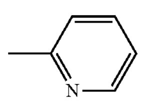 | 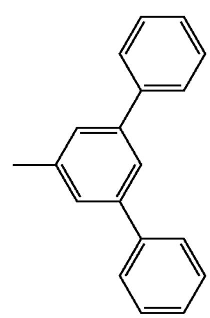 | compound 29-31 |
| 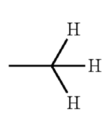 | 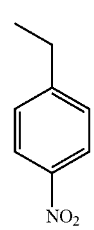 | compound 29-32 |

-continued
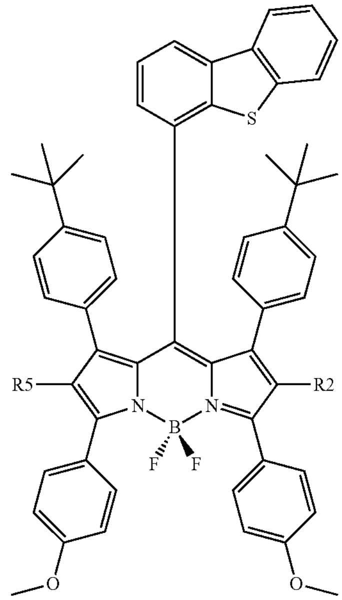
| R2, R5 | compound |
|---|---|
| —H | compound 30-1 |
| 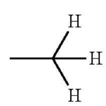 | compound 30-2 |
| —F | compound 30-3 |
| 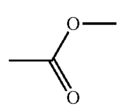 | compound 30-4 |
| 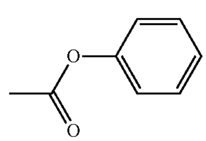 | compound 30-5 |
| —CN | compound 30-6 |
| 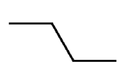 | compound 30-7 |
| 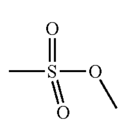 | compound 30-8 |
| 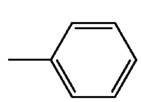 | compound 30-9 |
| 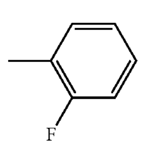 | compound 30-10 |

-continued
compound 30-11
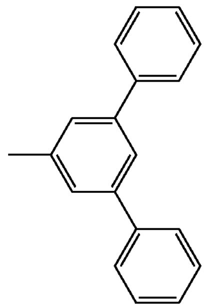 [SMILES: Cc1cc(-c2ccccc2)cc(-c2ccccc2)c1]
compound 30-12
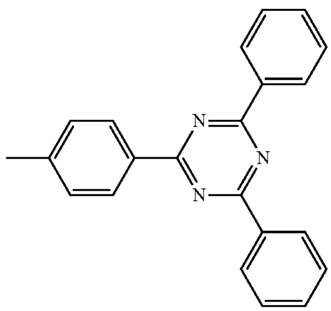 [SMILES: Cc1ccc(-c2nc(-c3ccccc3)nc(-c3ccccc3)n2)cc1]
compound 30-13
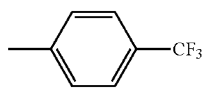
compound 30-14
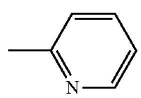
compound 30-15
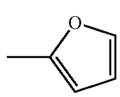
compound 30-16
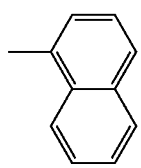
compound 30-17
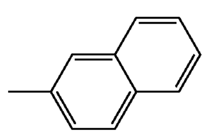
compound 30-18
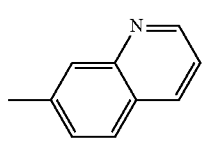
compound 30-19
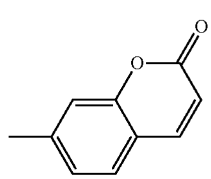

-continued
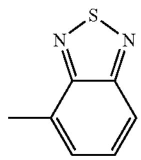
compound 30-20
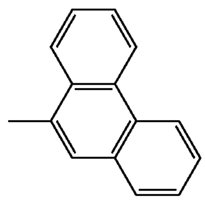
compound 30-21
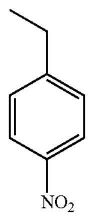
compound 30-22
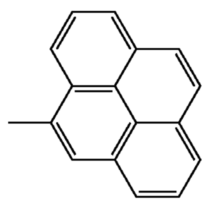 [SMILES: Cc1cc2cccc3ccc4cccc1c4c32]
compound 30-23
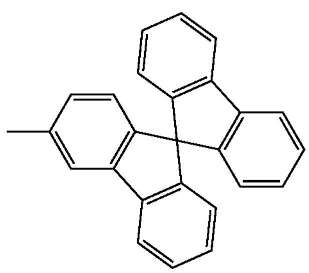 [SMILES: Cc1ccc2c(c1)-c1ccccc1C21c2ccccc2-c2ccccc21]
compound 30-24
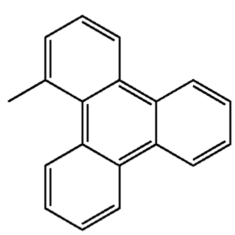 [SMILES: Cc1cccc2c3ccccc3c3ccccc3c12]
compound 30-25
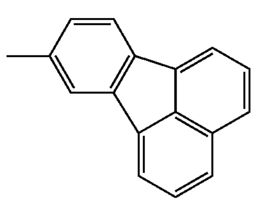 [SMILES: Cc1ccc2c(c1)-c1cccc3cccc-2c13]
compound 30-26

-continued
| R2 | R5 | compound |
|---|---|---|
| —H | 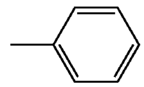 | compound 30-27 |
| 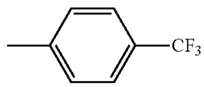 | 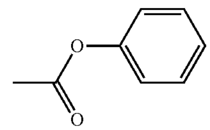 | compound 30-28 |
| —F | 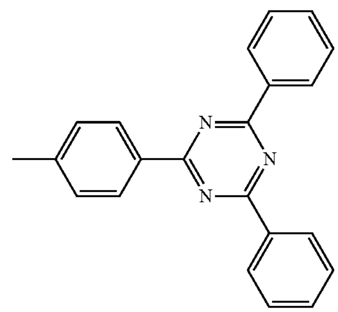 | compound 30-29 |
| —CN | 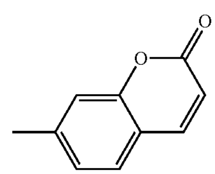 | compound 30-30 |
| 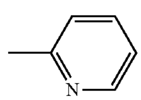 | 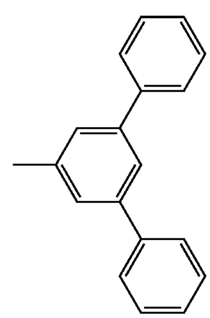 | compound 30-31 |
| 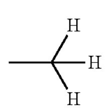 | 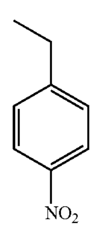 | compound 30-32 |

-continued
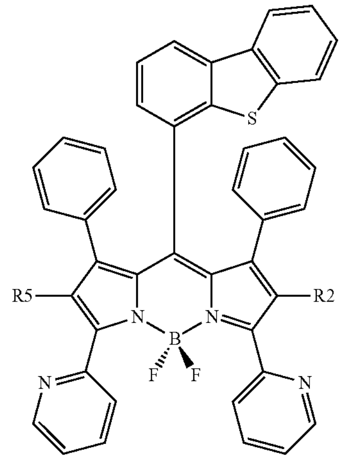
| R2, R5 | compound |
| --- | --- |
| —H | compound 31-1 |
| 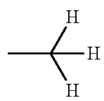 | compound 31-2 |
| —F | compound 31-3 |
| 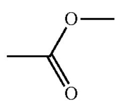 | compound 31-4 |
| 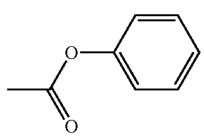 | compound 31-5 |
| —CN | compound 31-6 |
| 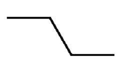 | compound 31-7 |
| 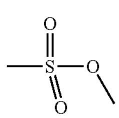 | compound 31-8 |
| 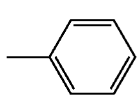 | compound 31-9 |
| 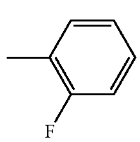 | compound 31-10 |

-continued
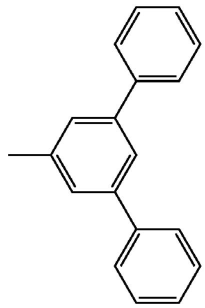 [SMILES: Cc1cc(-c2ccccc2)cc(-c2ccccc2)c1]
compound 31-11
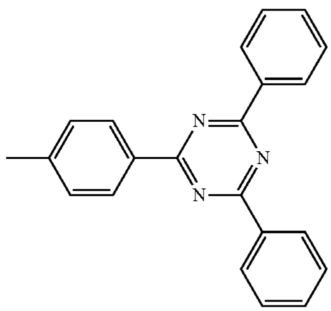 [SMILES: Cc1ccc(-c2nc(-c3ccccc3)nc(-c3ccccc3)n2)cc1]
compound 31-12
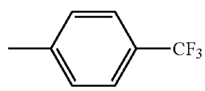
compound 31-13
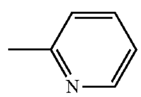
compound 31-14
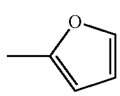
compound 31-15
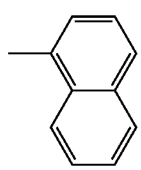
compound 31-16
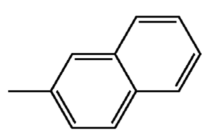
compound 31-17
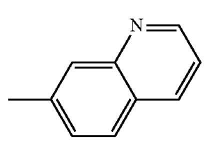
compound 31-18
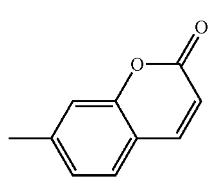
compound 31-19

-continued
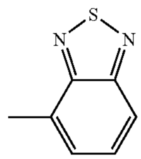
compound 31-20
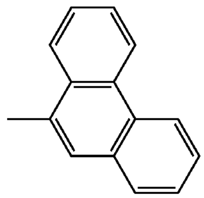
compound 31-21
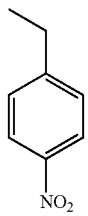
compound 31-22
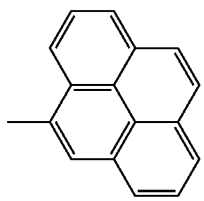 [SMILES: Cc1cc2cccc3ccc4cccc1c4c32]
compound 31-23
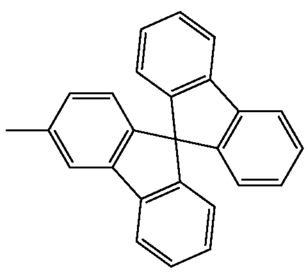 [SMILES: Cc1ccc2c(c1)-c1ccccc1C21c2ccccc2-c2ccccc21]
compound 31-24
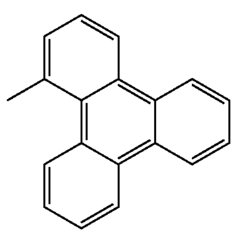 [SMILES: Cc1cccc2c3ccccc3c3ccccc3c12]
compound 31-25
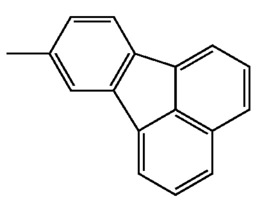 [SMILES: Cc1ccc2c(c1)-c1cccc3cccc-2c13]
compound 31-26

-continued
| R2 | R5 | compound |
| --- | --- | --- |
| —H | 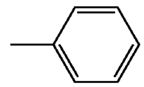 | compound 31-27 |
| 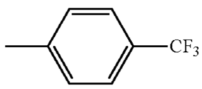 | 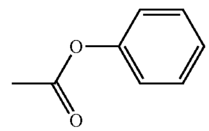 | compound 31-28 |
| —F | 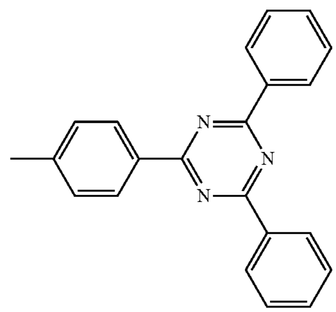 | compound 31-29 |
| —CN | 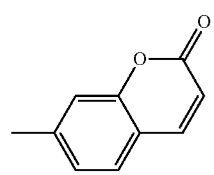 | compound 31-30 |
| 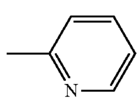 | 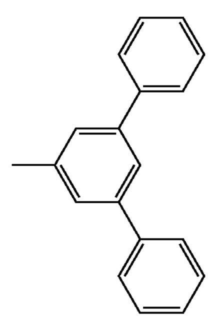 | compound 31-31 |
| 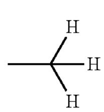 | 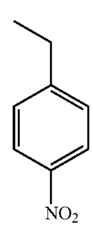 | compound 31-32 |

-continued
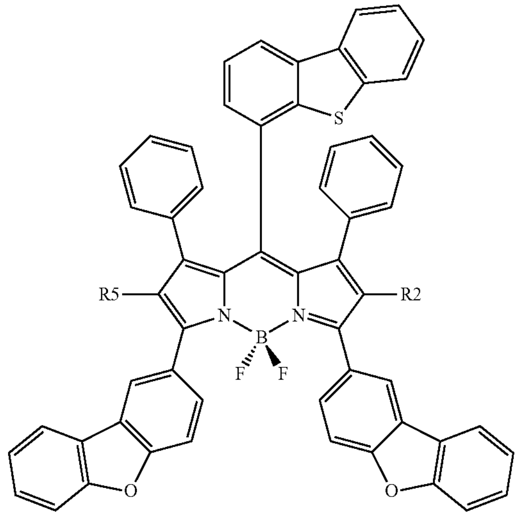
| R2, R5 | compound |
| --- | --- |
| —H | compound 32-1 |
| 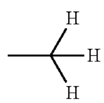 | compound 32-2 |
| —F | compound 32-3 |
| 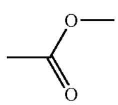 | compound 32-4 |
| 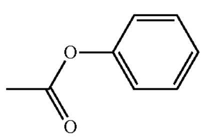 | compound 32-5 |
| —CN | compound 32-6 |
| 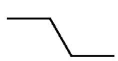 | compound 32-7 |
| 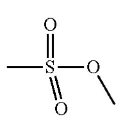 | compound 32-8 |
| 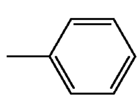 | compound 32-9 |
| 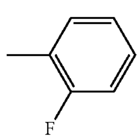 | compound 32-10 |

-continued
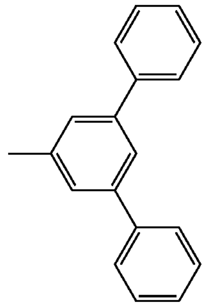 [SMILES: Cc1cc(-c2ccccc2)cc(-c2ccccc2)c1]
compound 32-11
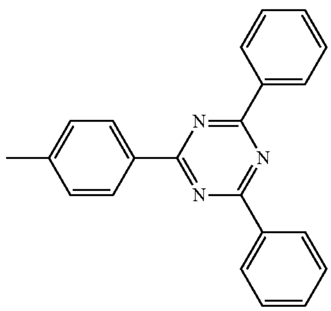 [SMILES: Cc1ccc(-c2nc(-c3ccccc3)nc(-c3ccccc3)n2)cc1]
compound 32-12
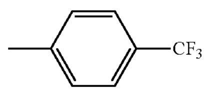
compound 32-13
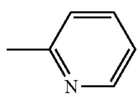
compound 32-14
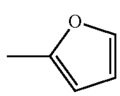
compound 32-15
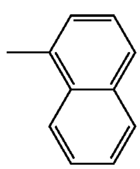
compound 32-16
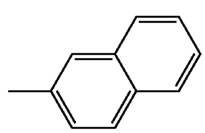
compound 32-17
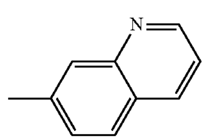
compound 32-18
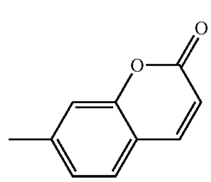
compound 32-19

-continued
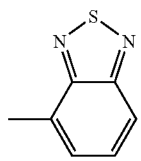
compound 32-20
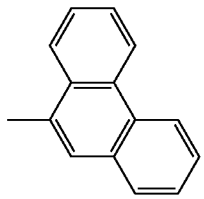
compound 32-21
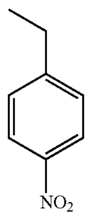
compound 32-22
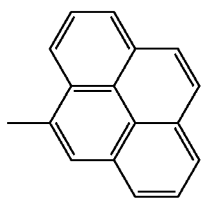 [SMILES: Cc1cc2cccc3ccc4cccc1c4c32]
compound 32-23
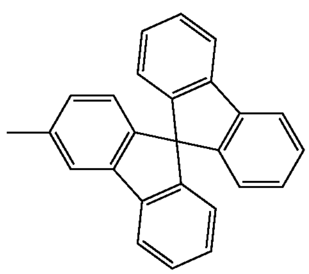 [SMILES: Cc1ccc2c(c1)-c1ccccc1C21c2ccccc2-c2ccccc21]
compound 32-24
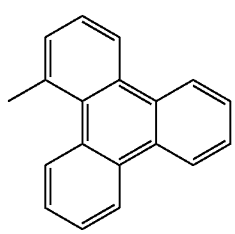 [SMILES: Cc1cccc2c3ccccc3c3ccccc3c12]
compound 32-25
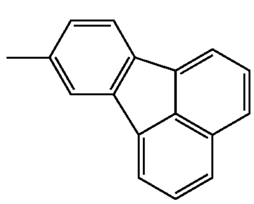 [SMILES: Cc1ccc2c(c1)-c1cccc3cccc-2c13]
compound 32-26

-continued
| R2 | R5 | compound |
| --- | --- | --- |
| —H | 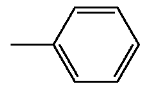 | compound 32-27 |
| 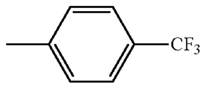  | 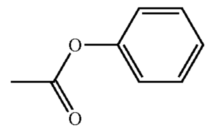  | compound 32-28 |
| —F | 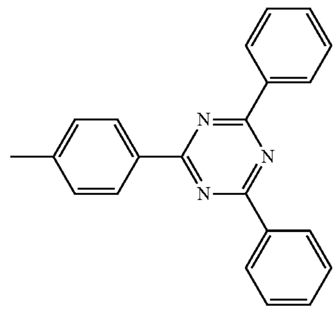  | compound 32-29 |
| —CN | 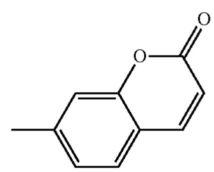  | compound 32-30 |
| 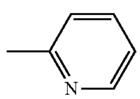  | 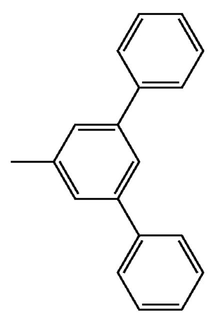 | compound 32-31 |
| 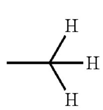  | 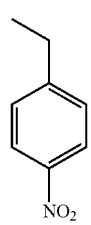  | compound 32-32 |

-continued
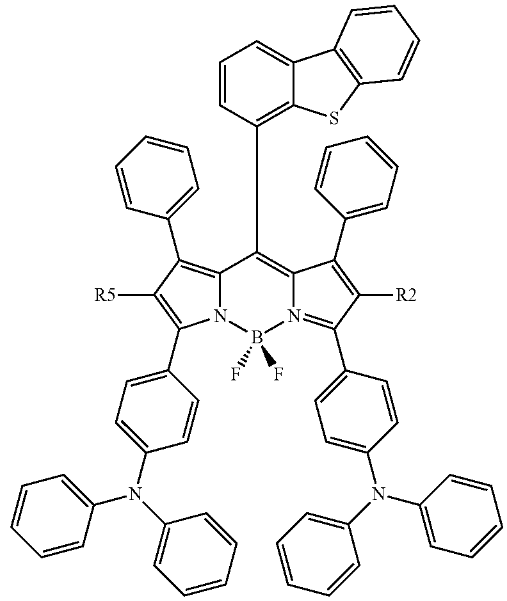
| R2, R5 | compound |
|---|---|
| —H | compound 33-1 |
| 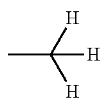 | compound 33-2 |
| —F | compound 33-3 |
| 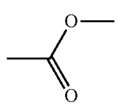 | compound 33-4 |
| 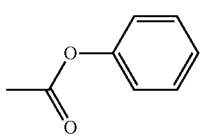 | compound 33-5 |
| —CN | compound 33-6 |
| 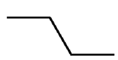 | compound 33-7 |
| 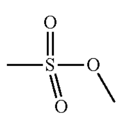 | compound 33-8 |
| 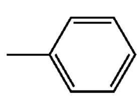 | compound 33-9 |
| 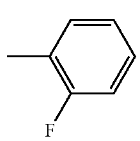 | compound 33-10 |

-continued
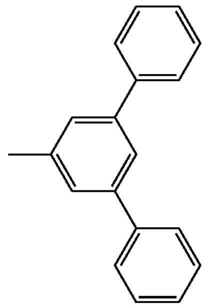 [SMILES: Cc1cc(-c2ccccc2)cc(-c2ccccc2)c1]
compound 33-11
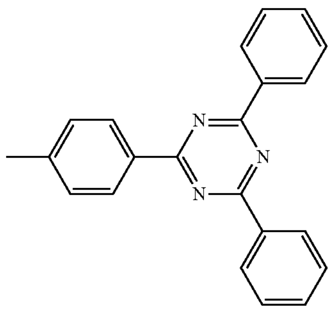 [SMILES: Cc1ccc(-c2nc(-c3ccccc3)nc(-c3ccccc3)n2)cc1]
compound 33-12
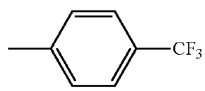
compound 33-13
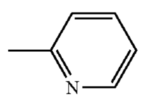
compound 33-14
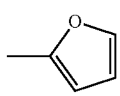
compound 33-15
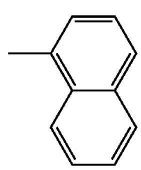
compound 33-16
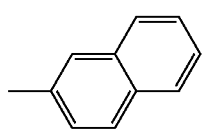
compound 33-17
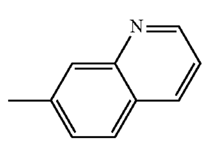
compound 33-18
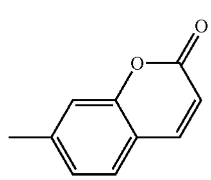
compound 33-19

-continued
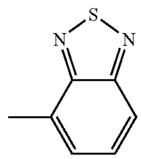
compound 33-20
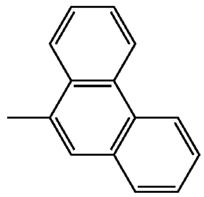
compound 33-21
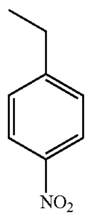
compound 33-22
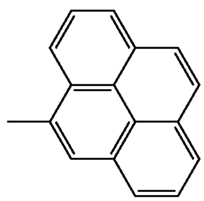 [SMILES: Cc1cc2cccc3ccc4cccc1c4c32]
compound 33-23
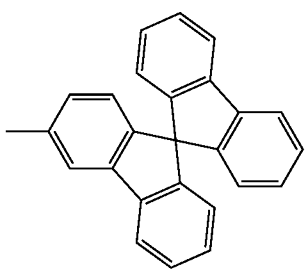 [SMILES: Cc1ccc2c(c1)-c1ccccc1C21c2ccccc2-c2ccccc21]
compound 33-24
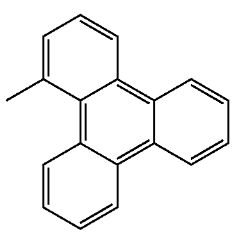 [SMILES: Cc1cccc2c3ccccc3c3ccccc3c12]
compound 33-25
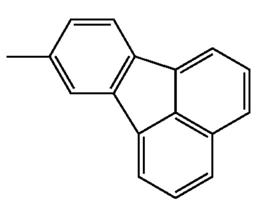 [SMILES: Cc1ccc2c(c1)-c1cccc3cccc-2c13]
compound 33-26

-continued
| R2 | R5 | compound |
| --- | --- | --- |
| —H | 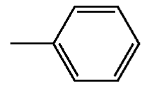 | compound 33-27 |
| 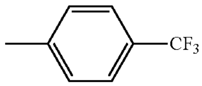 | 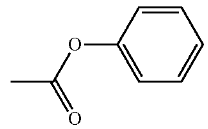 | compound 33-28 |
| —F | 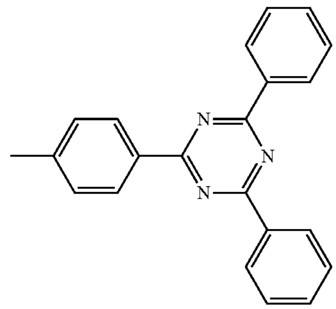 | compound 33-29 |
| —CN | 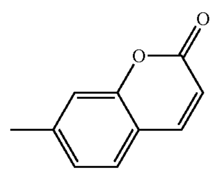 | compound 33-30 |
| 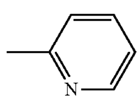 | 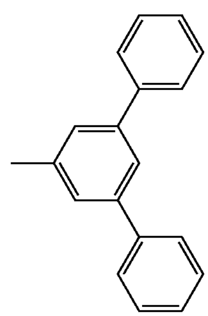 | compound 33-31 |
| 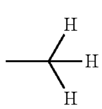 | 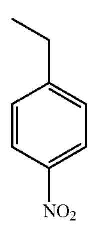 | compound 33-32 |

-continued
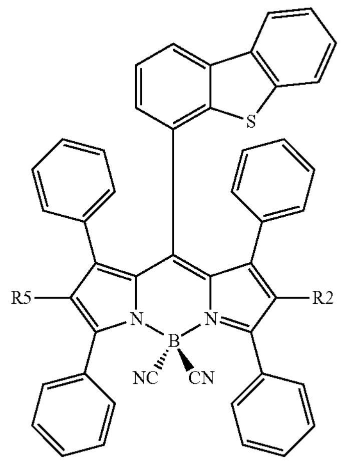
| R2, R5 | compound |
|---|---|
| —H | compound 34-1 |
| 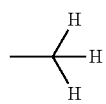 | compound 34-2 |
| —F | compound 34-3 |
| 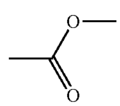 | compound 34-4 |
| 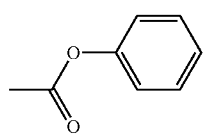 | compound 34-5 |
| —CN | compound 34-6 |
| 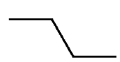 | compound 34-7 |
| 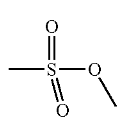 | compound 34-8 |
| 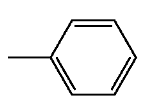 | compound 34-9 |
| 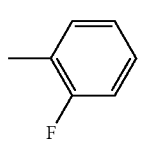 | compound 34-10 |

-continued
compound 34-11
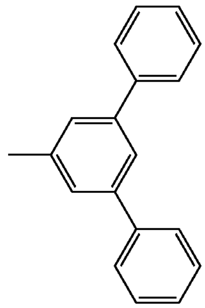 [SMILES: Cc1cc(-c2ccccc2)cc(-c2ccccc2)c1]
compound 34-12
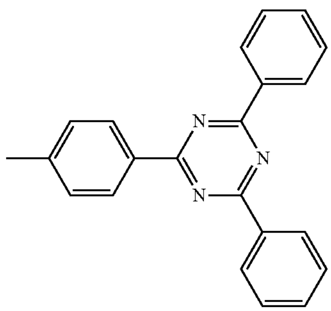 [SMILES: Cc1ccc(-c2nc(-c3ccccc3)nc(-c3ccccc3)n2)cc1]
compound 34-13
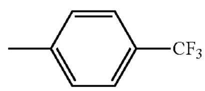
compound 34-14
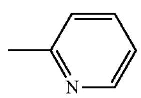
compound 34-15
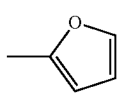
compound 34-16
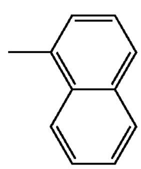
compound 34-17
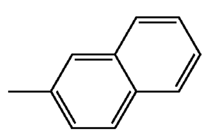
compound 34-18
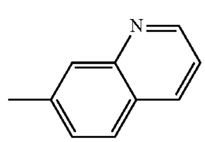
compound 34-19
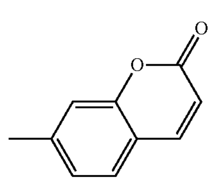

-continued
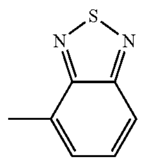
compound 34-20
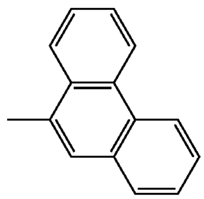
compound 34-21
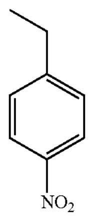
compound 34-22
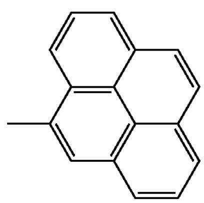 [SMILES: Cc1cc2cccc3ccc4cccc1c4c32]
compound 34-23
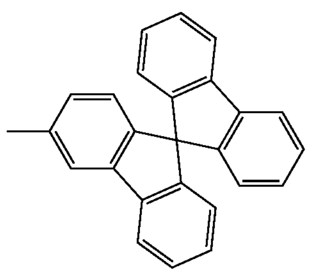 [SMILES: Cc1ccc2c(c1)-c1ccccc1C21c2ccccc2-c2ccccc21]
compound 34-24
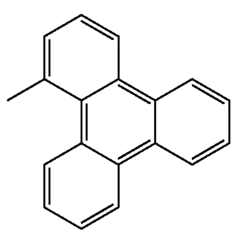 [SMILES: Cc1cccc2c3ccccc3c3ccccc3c12]
compound 34-25
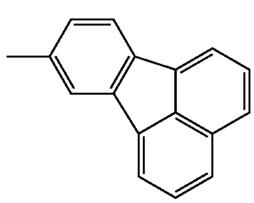 [SMILES: Cc1ccc2c(c1)-c1cccc3cccc-2c13]
compound 34-26

-continued
| R2 | R5 | compound |
|---|---|---|
| —H | 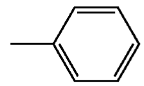 | compound 34-27 |
| 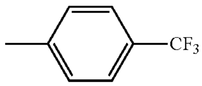 | 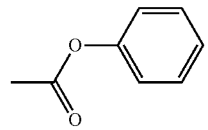 | compound 34-28 |
| —F | 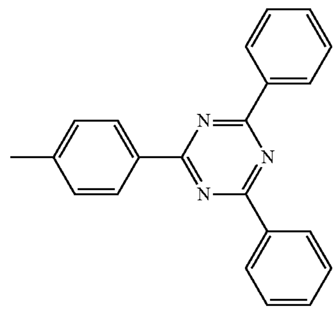 | compound 34-29 |
| —CN | 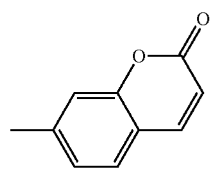 | compound 34-30 |
| 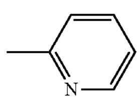 | 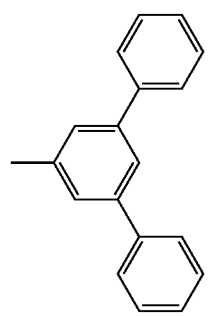 | compound 34-31 |
| 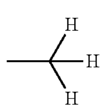 | 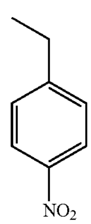 | compound 34-32 |

-continued
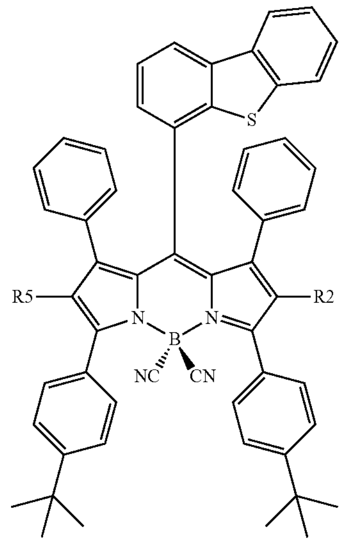
| R2, R5 | compound |
|---|---|
| —H | compound 35-1 |
| 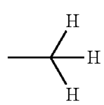 | compound 35-2 |
| —F | compound 35-3 |
| 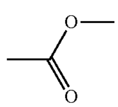 | compound 35-4 |
| 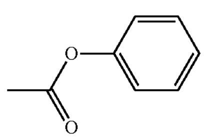 | compound 35-5 |
| —CN | compound 35-6 |
| 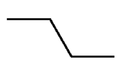 | compound 35-7 |
| 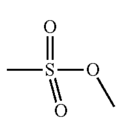 | compound 35-8 |
| 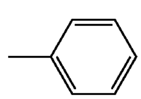 | compound 35-9 |
| 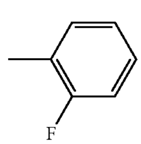 | compound 35-10 |

-continued
compound 35-11
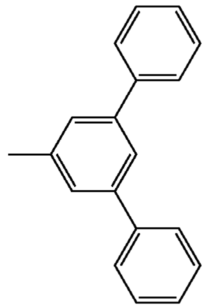 [SMILES: Cc1cc(-c2ccccc2)cc(-c2ccccc2)c1]
compound 35-12
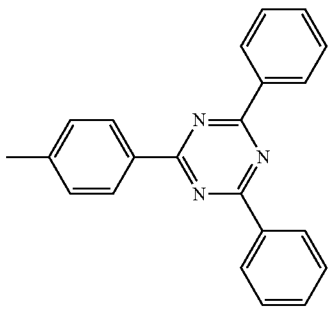 [SMILES: Cc1ccc(-c2nc(-c3ccccc3)nc(-c3ccccc3)n2)cc1]
compound 35-13
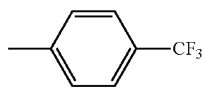
compound 35-14
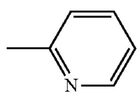
compound 35-15
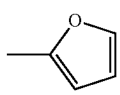
compound 35-16
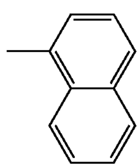
compound 35-17
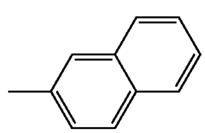
compound 35-18
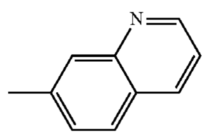
compound 35-19
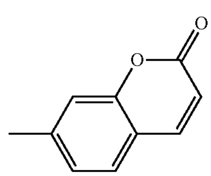

-continued
compound 35-20
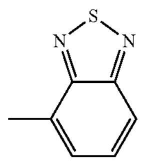
compound 35-21
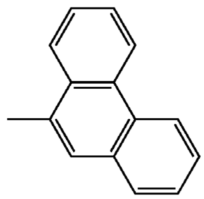
compound 35-22
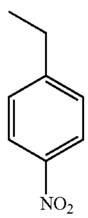
compound 35-23
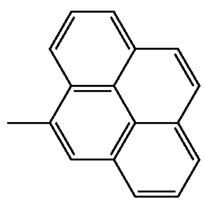 [SMILES: Cc1cc2cccc3ccc4cccc1c4c32]
compound 35-24
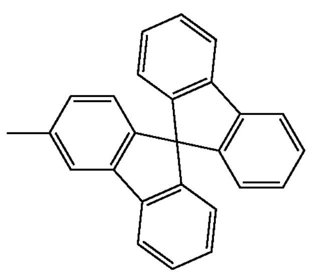 [SMILES: Cc1ccc2c(c1)-c1ccccc1C21c2ccccc2-c2ccccc21]
compound 35-25
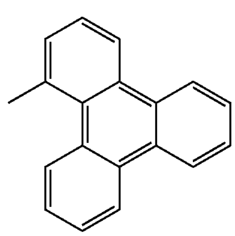 [SMILES: Cc1cccc2c3ccccc3c3ccccc3c12]
compound 35-26
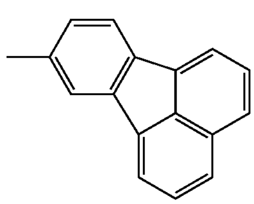 [SMILES: Cc1ccc2c(c1)-c1cccc3cccc-2c13]

-continued
| R2 | R5 | compound |
| --- | --- | --- |
| —H | 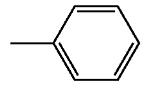 | compound 35-27 |
| 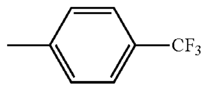 | 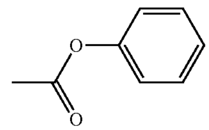 | compound 35-28 |
| —F | 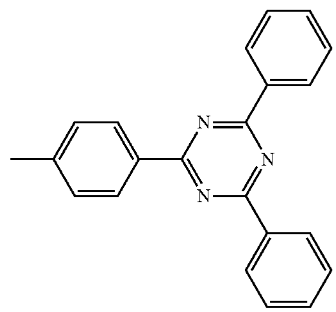 | compound 35-29 |
| —CN | 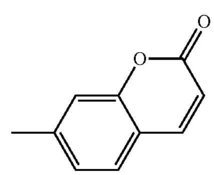 | compound 35-30 |
| 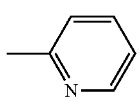 | 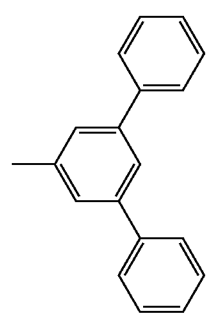 | compound 35-31 |
| 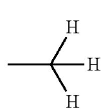 | 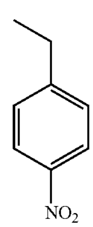 | compound 35-32 |

-continued
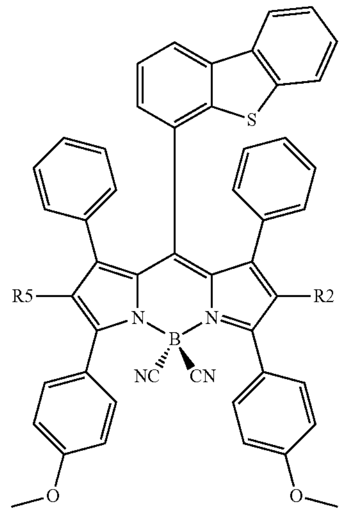
| R2, R5 | compound |
| --- | --- |
| —H | compound 36-1 |
| 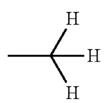 | compound 36-2 |
| —F | compound 36-3 |
| 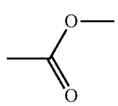 | compound 36-4 |
| 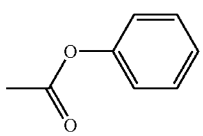 | compound 36-5 |
| —CN | compound 36-6 |
| 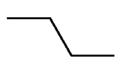 | compound 36-7 |
| 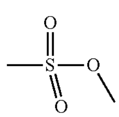 | compound 36-8 |
| 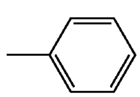 | compound 36-9 |
| 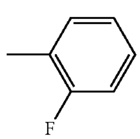 | compound 36-10 |

-continued
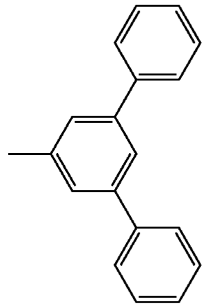 [SMILES: Cc1cc(-c2ccccc2)cc(-c2ccccc2)c1]
compound 36-11
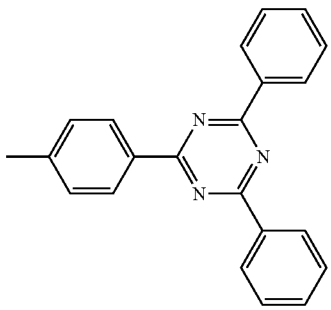 [SMILES: Cc1ccc(-c2nc(-c3ccccc3)nc(-c3ccccc3)n2)cc1]
compound 36-12
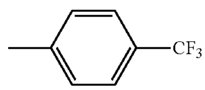
compound 36-13
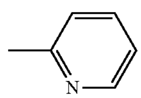
compound 36-14
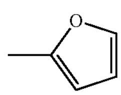
compound 36-15
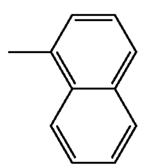
compound 36-16
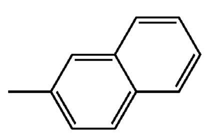
compound 36-17
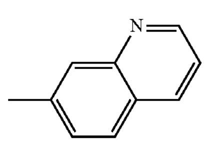
compound 36-18
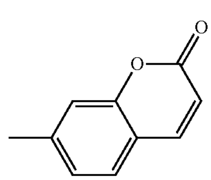
compound 36-19

-continued
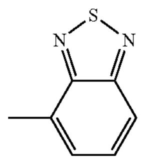
compound 36-20
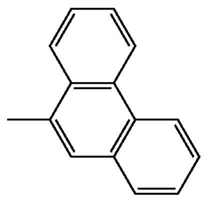
compound 36-21
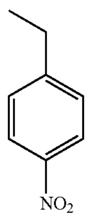
compound 36-22
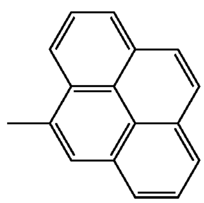 [SMILES: Cc1cc2cccc3ccc4cccc1c4c32]
compound 36-23
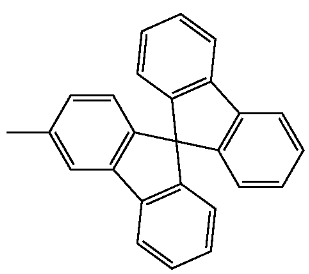 [SMILES: Cc1ccc2c(c1)-c1ccccc1C21c2ccccc2-c2ccccc21]
compound 36-24
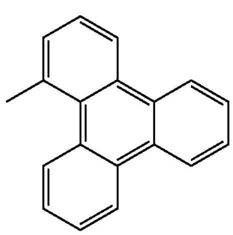 [SMILES: Cc1cccc2c3ccccc3c3ccccc3c12]
compound 36-25
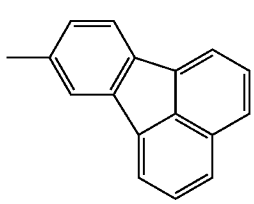 [SMILES: Cc1ccc2c(c1)-c1cccc3cccc-2c13]
compound 36-26

-continued
| R2 | R5 | compound |
|---|---|---|
| —H | 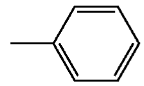 | compound 36-27 |
| 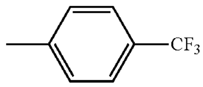 | 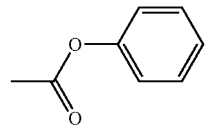 | compound 36-28 |
| —F | 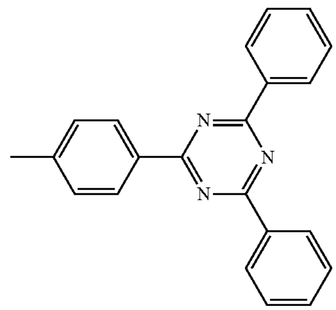 | compound 36-29 |
| —CN | 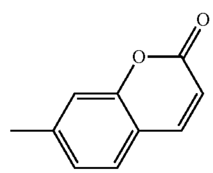 | compound 36-30 |
| 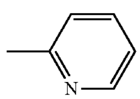 | 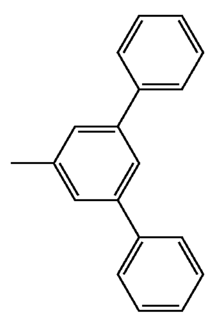 | compound 36-31 |
| 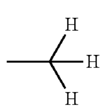 | 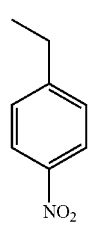 | compound 36-32 |

-continued
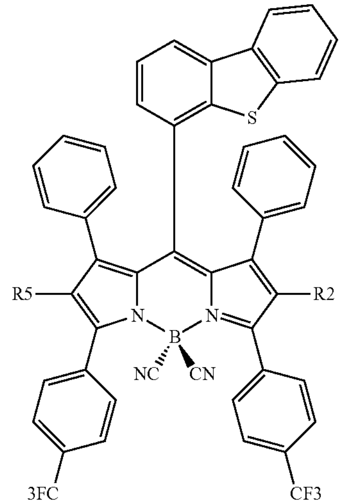
| R2, R5 | compound |
| --- | --- |
| —H | compound 37-1 |
| 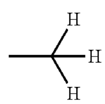 | compound 37-2 |
| —F | compound 37-3 |
| 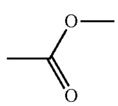 | compound 37-4 |
| 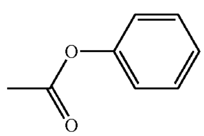 | compound 37-5 |
| —CN | compound 37-6 |
| 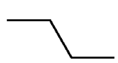 | compound 37-7 |
| 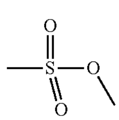 | compound 37-8 |
| 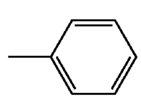 | compound 37-9 |
| 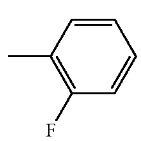 | compound 37-10 |

-continued
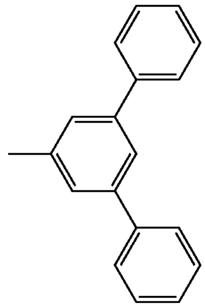 [SMILES: Cc1cc(-c2ccccc2)cc(-c2ccccc2)c1]
compound 37-11
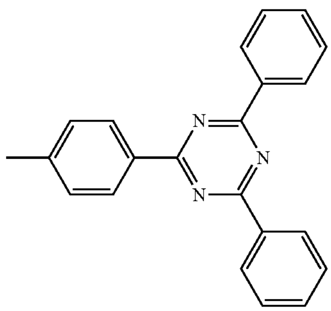 [SMILES: Cc1ccc(-c2nc(-c3ccccc3)nc(-c3ccccc3)n2)cc1]
compound 37-12
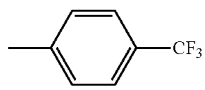
compound 37-13
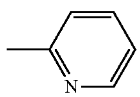
compound 37-14
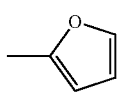
compound 37-15
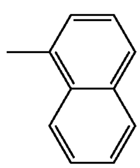
compound 37-16
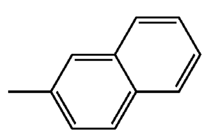
compound 37-17
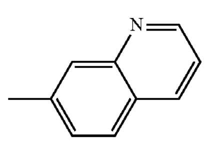
compound 37-18
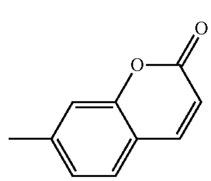
compound 37-19

-continued
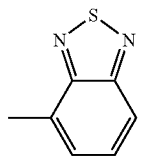
compound 37-20
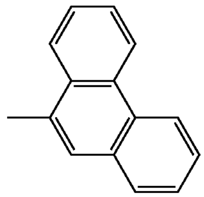
compound 37-21
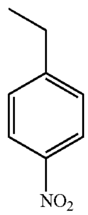
compound 37-22
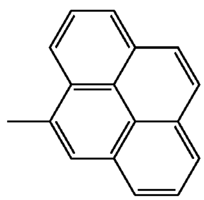 [SMILES: Cc1cc2cccc3ccc4cccc1c4c32]
compound 37-23
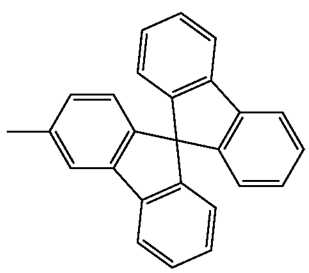 [SMILES: Cc1ccc2c(c1)-c1ccccc1C21c2ccccc2-c2ccccc21]
compound 37-24
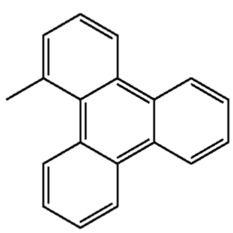 [SMILES: Cc1cccc2c3ccccc3c3ccccc3c12]
compound 37-25
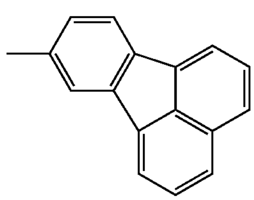 [SMILES: Cc1ccc2c(c1)-c1cccc3cccc-2c13]
compound 37-26

-continued
| R2 | R5 | compound |
| --- | --- | --- |
| —H | 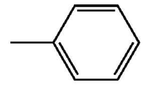 | compound 37-27 |
| 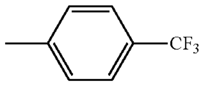 | 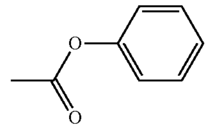 | compound 37-28 |
| —F | 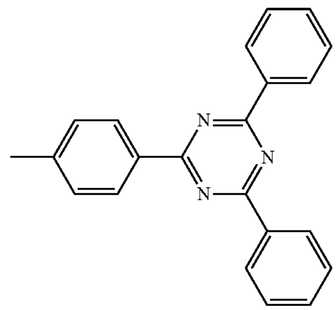 | compound 37-29 |
| —CN | 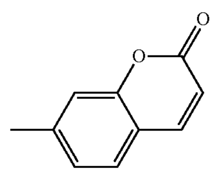 | compound 37-30 |
| 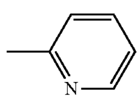 | 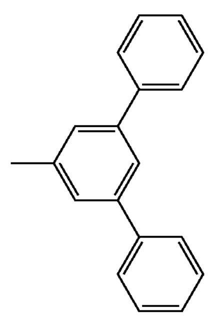 | compound 37-31 |
| 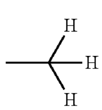 | 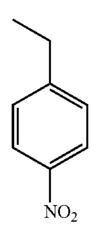 | compound 37-32 |

-continued
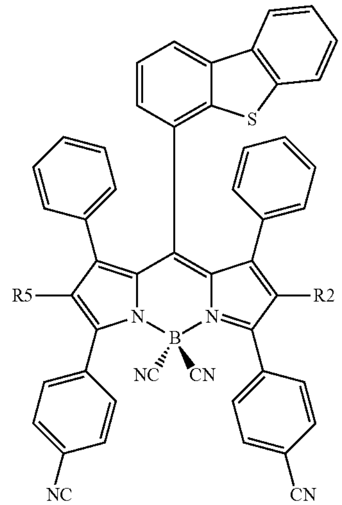
| R2, R5 | compound |
|---|---|
| —H | compound 38-1 |
| 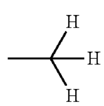 | compound 38-2 |
| —F | compound 38-3 |
| 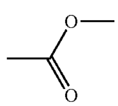 | compound 38-4 |
| 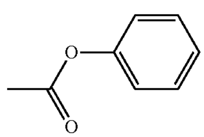 | compound 38-5 |
| —CN | compound 38-6 |
| 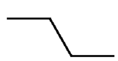 | compound 38-7 |
| 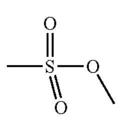 | compound 38-8 |
| 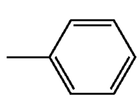 | compound 38-9 |
| 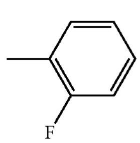 | compound 38-10 |

-continued
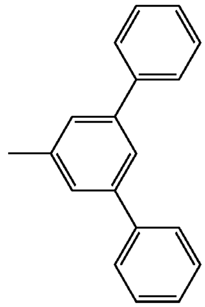 [SMILES: Cc1cc(-c2ccccc2)cc(-c2ccccc2)c1]
compound 38-11
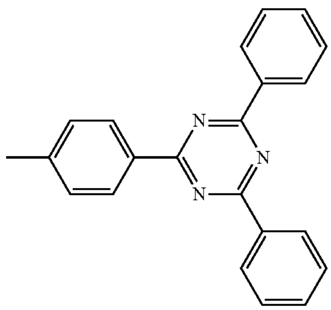 [SMILES: Cc1ccc(-c2nc(-c3ccccc3)nc(-c3ccccc3)n2)cc1]
compound 38-12
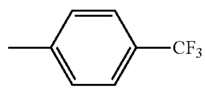
compound 38-13
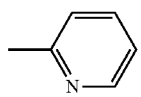
compound 38-14
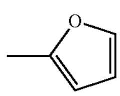
compound 38-15
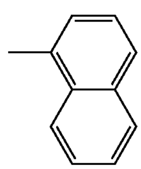
compound 38-16
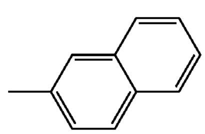
compound 38-17
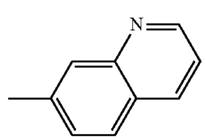
compound 38-18
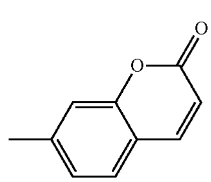
compound 38-19

-continued
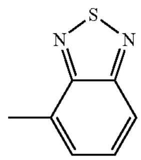
compound 38-20
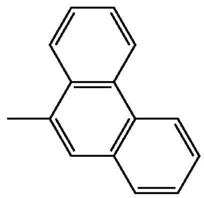
compound 38-21
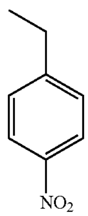
compound 38-22
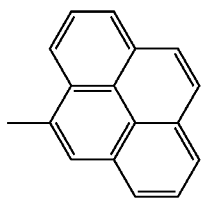 [SMILES: Cc1cc2cccc3ccc4cccc1c4c32]
compound 38-23
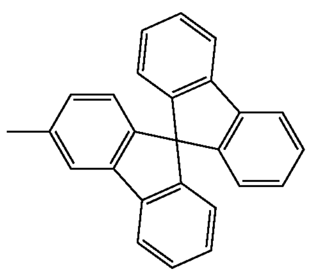 [SMILES: Cc1ccc2c(c1)-c1ccccc1C21c2ccccc2-c2ccccc21]
compound 38-24
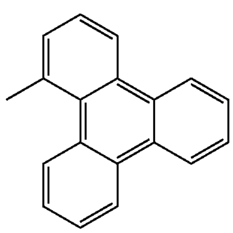 [SMILES: Cc1cccc2c3ccccc3c3ccccc3c12]
compound 38-25
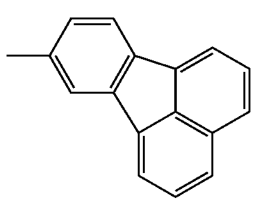 [SMILES: Cc1ccc2c(c1)-c1cccc3cccc-2c13]
compound 38-26

-continued
| R2 | R5 | compound |
|---|---|---|
| —H | 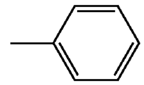 | compound 38-27 |
| 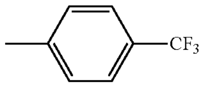 | 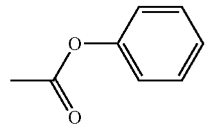 | compound 38-28 |
| —F | 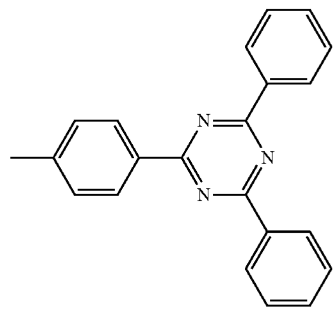 | compound 38-29 |
| —CN | 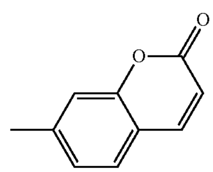 | compound 38-30 |
| 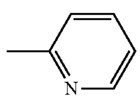 | 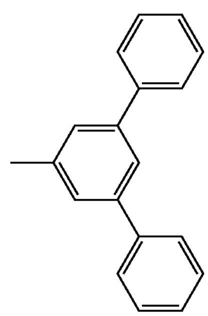 | compound 38-31 |
| 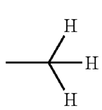 | 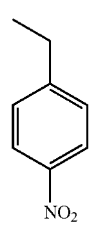 | compound 38-32 |

-continued
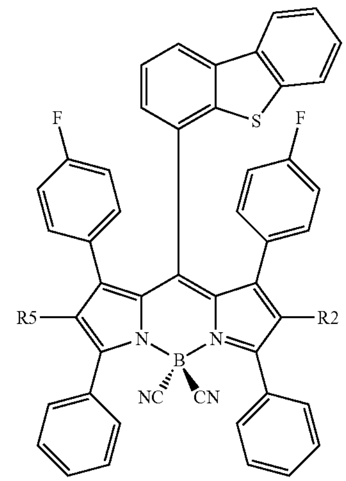
| R2, R5 | compound |
| --- | --- |
| —H | compound 39-1 |
| 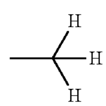 | compound 39-2 |
| —F | compound 39-3 |
| 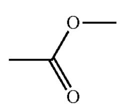 | compound 39-4 |
| 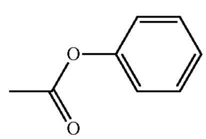 | compound 39-5 |
| —CN | compound 39-6 |
| 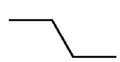 | compound 39-7 |
| 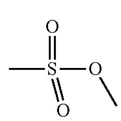 | compound 39-8 |
| 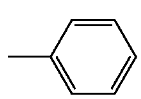 | compound 39-9 |
| 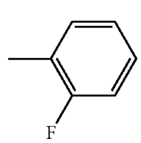 | compound 39-10 |

-continued
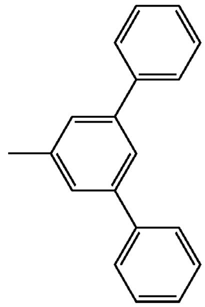 [SMILES: Cc1cc(-c2ccccc2)cc(-c2ccccc2)c1]
compound 39-11
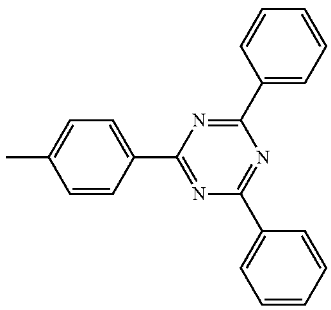 [SMILES: Cc1ccc(-c2nc(-c3ccccc3)nc(-c3ccccc3)n2)cc1]
compound 39-12
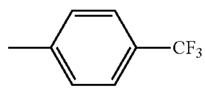
compound 39-13
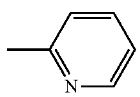
compound 39-14
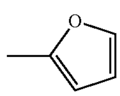
compound 39-15
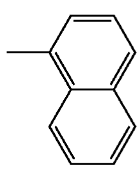
compound 39-16
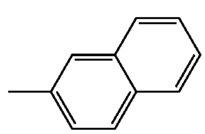
compound 39-17
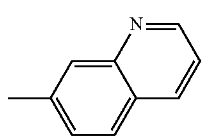
compound 39-18
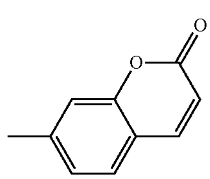
compound 39-19

-continued
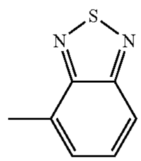
compound 39-20
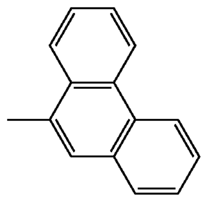
compound 39-21
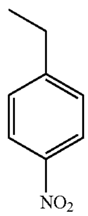
compound 39-22
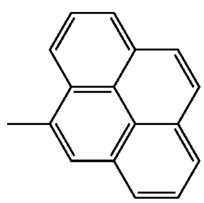 [SMILES: Cc1cc2cccc3ccc4cccc1c4c32]
compound 39-23
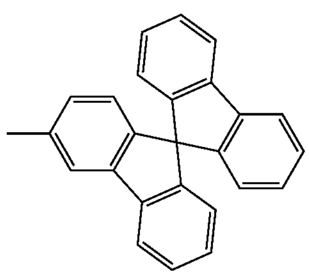 [SMILES: Cc1ccc2c(c1)-c1ccccc1C21c2ccccc2-c2ccccc21]
compound 39-24
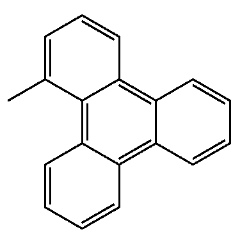 [SMILES: Cc1cccc2c3ccccc3c3ccccc3c12]
compound 39-25
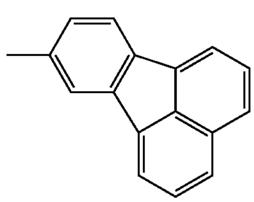 [SMILES: Cc1ccc2c(c1)-c1cccc3cccc-2c13]
compound 39-26

-continued
| R2 | R5 | compound |
| --- | --- | --- |
| —H | 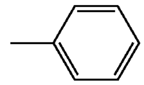 | compound 39-27 |
| 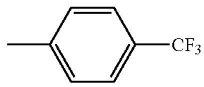 | 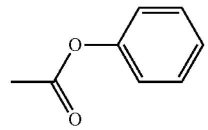 | compound 39-28 |
| —F | 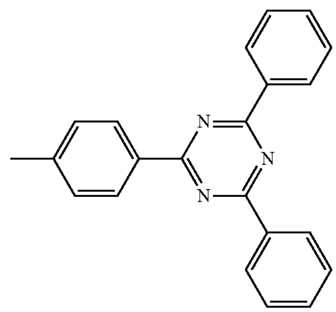 | compound 39-29 |
| —CN | 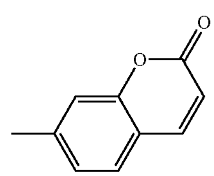 | compound 39-30 |
| 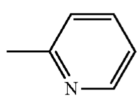 | 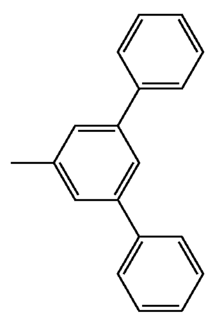 | compound 39-31 |
| 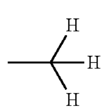 | 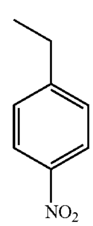 | compound 39-32 |

-continued
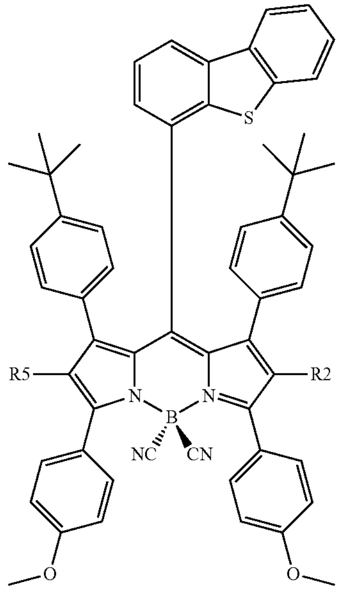
| R2, R5 | compound |
| --- | --- |
| —H | compound 40-1 |
| 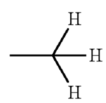 | compound 40-2 |
| —F | compound 40-3 |
| 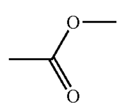 | compound 40-4 |
| 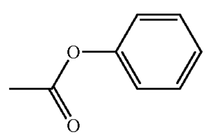 | compound 40-5 |
| —CN | compound 40-6 |
| 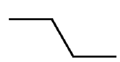 | compound 40-7 |
| 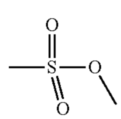 | compound 40-8 |
| 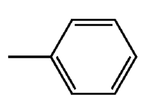 | compound 40-9 |
| 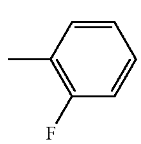 | compound 40-10 |

-continued
compound 40-11
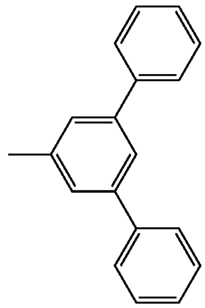 [SMILES: Cc1cc(-c2ccccc2)cc(-c2ccccc2)c1]
compound 40-12
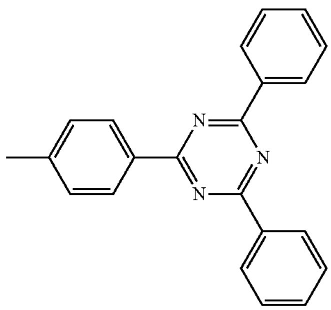 [SMILES: Cc1ccc(-c2nc(-c3ccccc3)nc(-c3ccccc3)n2)cc1]
compound 40-13
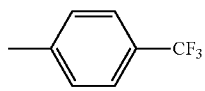
compound 40-14
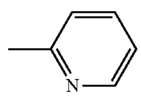
compound 40-15
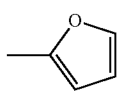
compound 40-16
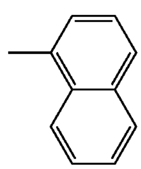
compound 40-17
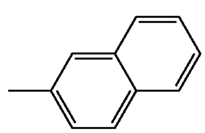
compound 40-18
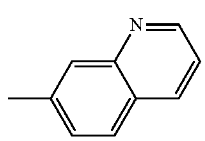
compound 40-19
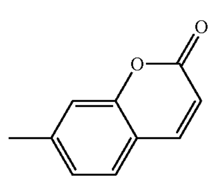

-continued
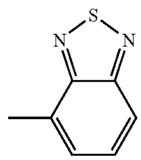
compound 40-20
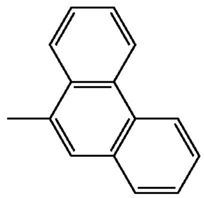
compound 40-21
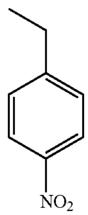
compound 40-22
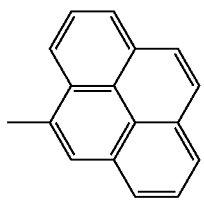 [SMILES: Cc1cc2cccc3ccc4cccc1c4c32]
compound 40-23
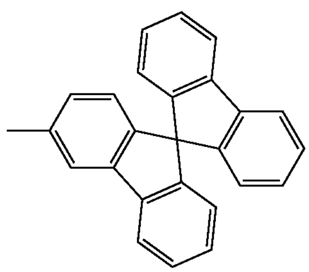 [SMILES: Cc1ccc2c(c1)-c1ccccc1C21c2ccccc2-c2ccccc21]
compound 40-24
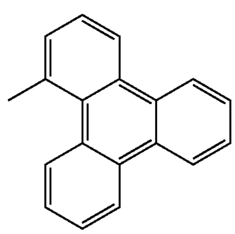 [SMILES: Cc1cccc2c3ccccc3c3ccccc3c12]
compound 40-25
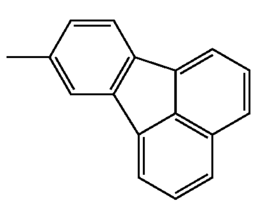 [SMILES: Cc1ccc2c(c1)-c1cccc3cccc-2c13]
compound 40-26

-continued
| R2 | R5 | compound |
|---|---|---|
| —H | 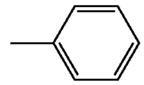 | compound 40-27 |
| 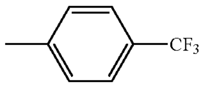 | 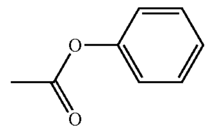 | compound 40-28 |
| —F | 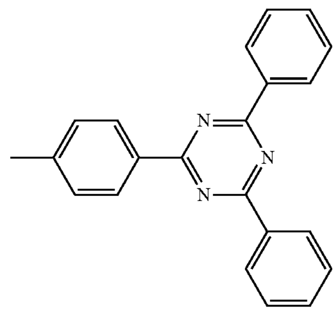 | compound 40-29 |
| —CN | 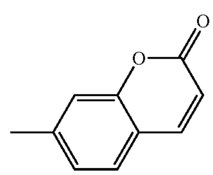 | compound 40-30 |
| 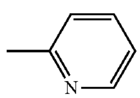 | 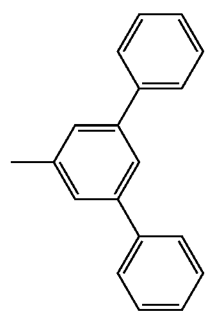 | compound 40-31 |
| 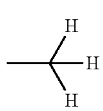 | 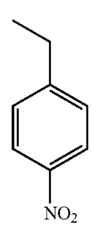 | compound 40-32 |

-continued
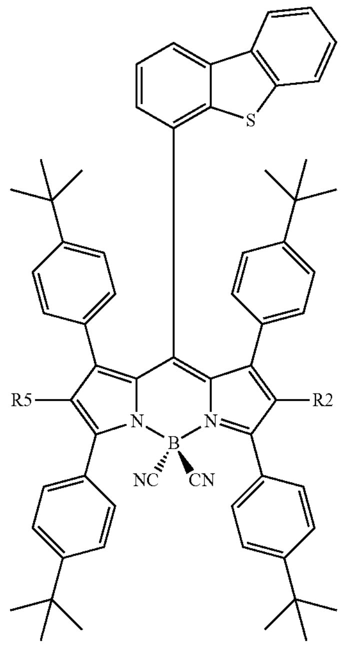
| R2, R5 | compound |
|---|---|
| —H | compound 41-1 |
| 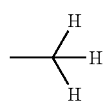 | compound 41-2 |
| —F | compound 41-3 |
| 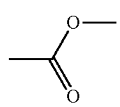 | compound 41-4 |
| 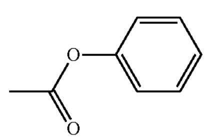 | compound 41-5 |
| —CN | compound 41-6 |
| 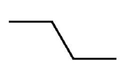 | compound 41-7 |
| 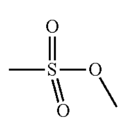 | compound 41-8 |
| 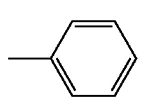 | compound 41-9 |
| 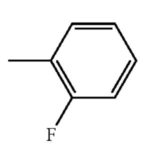 | compound 41-10 |

-continued
compound 41-11
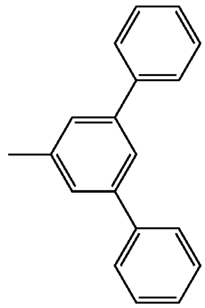 [SMILES: Cc1cc(-c2ccccc2)cc(-c2ccccc2)c1]
compound 41-12
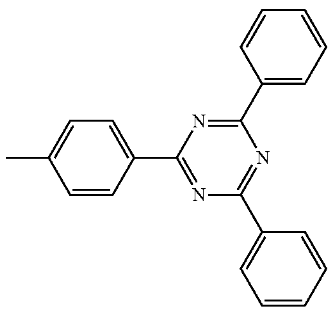 [SMILES: Cc1ccc(-c2nc(-c3ccccc3)nc(-c3ccccc3)n2)cc1]
compound 41-13
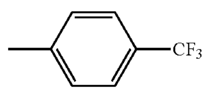
compound 41-14
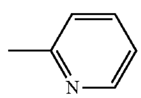
compound 41-15
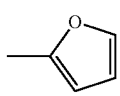
compound 41-16
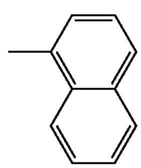
compound 41-17
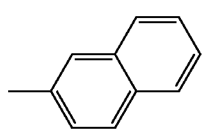
compound 41-18
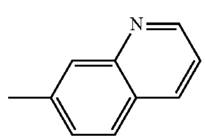
compound 41-19
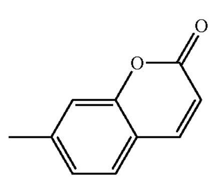

-continued
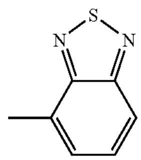
compound 41-20
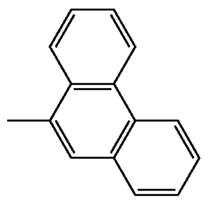
compound 41-21
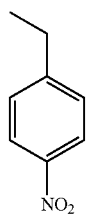
compound 41-22
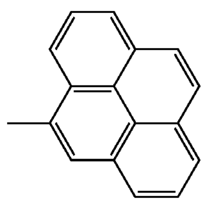 [SMILES: Cc1cc2cccc3ccc4cccc1c4c32]
compound 41-23
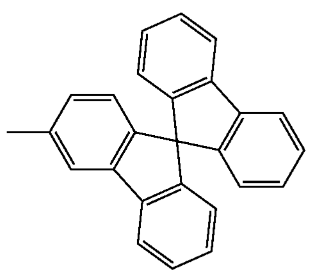 [SMILES: Cc1ccc2c(c1)-c1ccccc1C21c2ccccc2-c2ccccc21]
compound 41-24
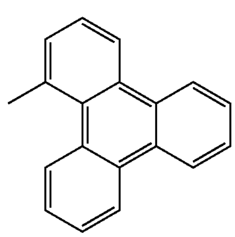 [SMILES: Cc1cccc2c3ccccc3c3ccccc3c12]
compound 41-25
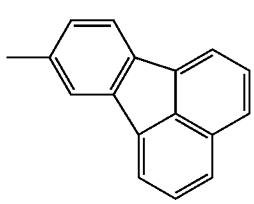 [SMILES: Cc1ccc2c(c1)-c1cccc3cccc-2c13]
compound 41-26

-continued
| R2 | R5 | compound |
|---|---|---|
| —H | 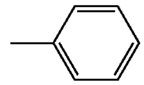 | compound 41-27 |
| 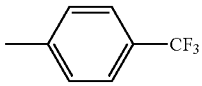 | 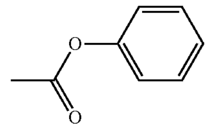 | compound 41-28 |
| —F | 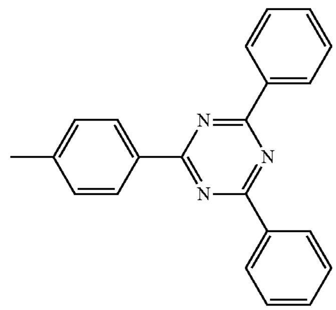 | compound 41-29 |
| —CN | 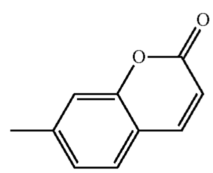 | compound 41-30 |
| 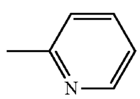 | 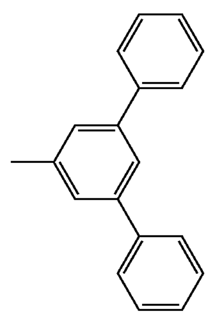 | compound 41-31 |
| 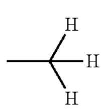 | 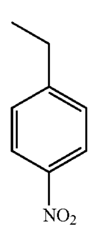 | compound 41-32 |

-continued
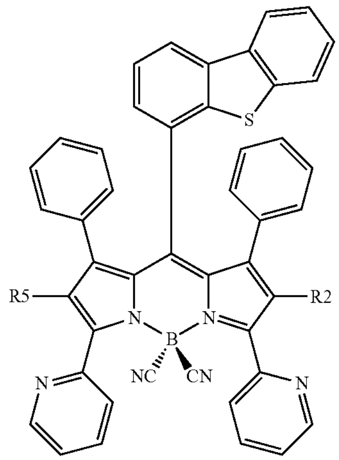
| R2, R5 | compound |
|---|---|
| —H | compound 42-1 |
| 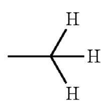 | compound 42-2 |
| —F | compound 42-3 |
| 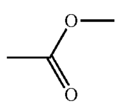 | compound 42-4 |
| 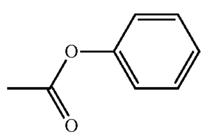 | compound 42-5 |
| —CN | compound 42-6 |
| 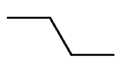 | compound 42-7 |
| 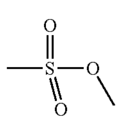 | compound 42-8 |
| 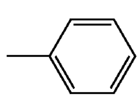 | compound 42-9 |
| 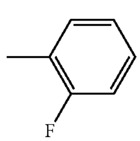 | compound 42-10 |

-continued
compound 42-11
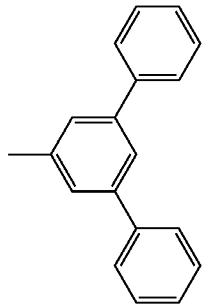 [SMILES: Cc1cc(-c2ccccc2)cc(-c2ccccc2)c1]
compound 42-12
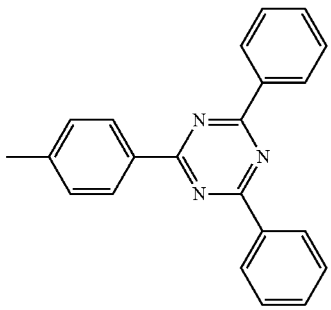 [SMILES: Cc1ccc(-c2nc(-c3ccccc3)nc(-c3ccccc3)n2)cc1]
compound 42-13
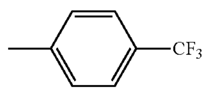
compound 42-14
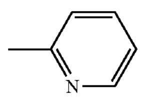
compound 42-15
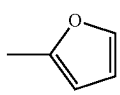
compound 42-16
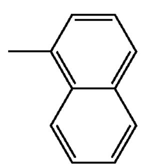
compound 42-17
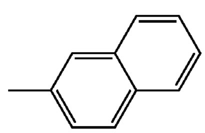
compound 42-18
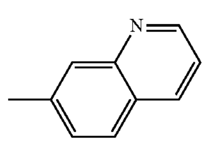
compound 42-19
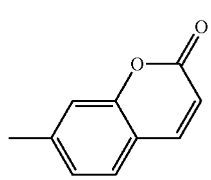

-continued
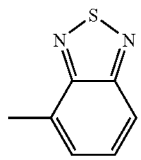
compound 42-20
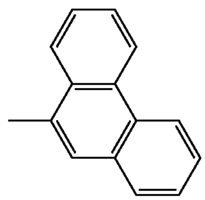
compound 42-21
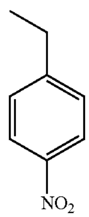
compound 42-22
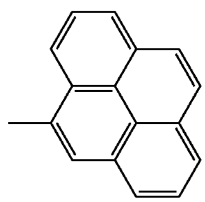 [SMILES: Cc1cc2cccc3ccc4cccc1c4c32]
compound 42-23
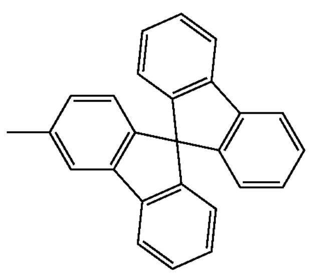 [SMILES: Cc1ccc2c(c1)-c1ccccc1C21c2ccccc2-c2ccccc21]
compound 42-24
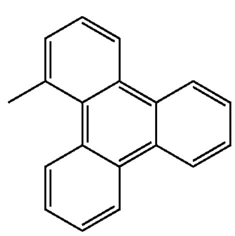 [SMILES: Cc1cccc2c3ccccc3c3ccccc3c12]
compound 42-25
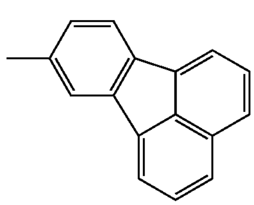 [SMILES: Cc1ccc2c(c1)-c1cccc3cccc-2c13]
compound 42-26

-continued
| R2 | R5 | compound |
|---|---|---|
| —H | 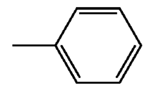 | compound 42-27 |
| 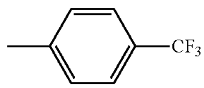 | 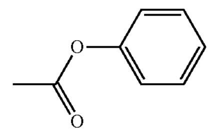 | compound 42-28 |
| —F | 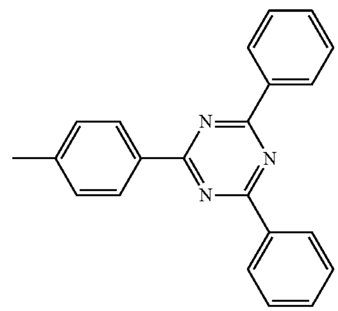 | compound 42-29 |
| —CN | 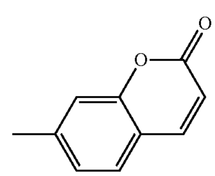 | compound 42-30 |
| 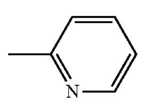 | 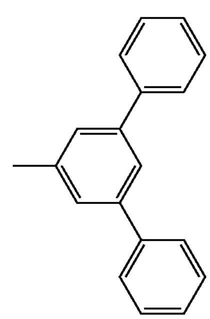 | compound 42-31 |
| 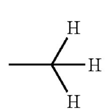 | 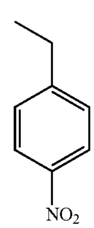 | compound 42-32 |

-continued
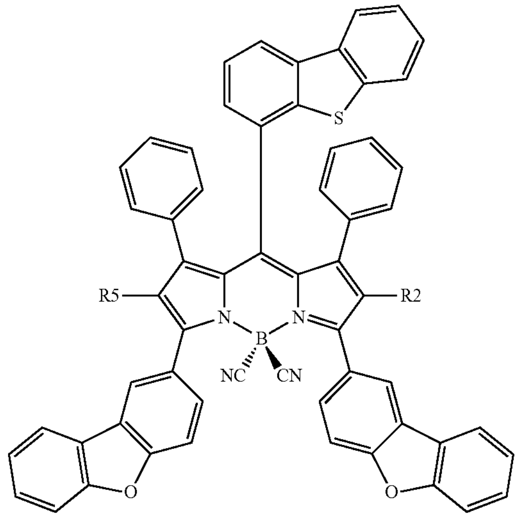
| R2, R5 | compound |
|---|---|
| —H | compound 43-1 |
| 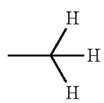 | compound 43-2 |
| —F | compound 43-3 |
| 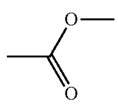 | compound 43-4 |
| 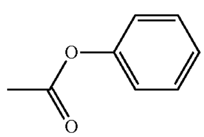 | compound 43-5 |
| —CN | compound 43-6 |
| 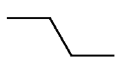 | compound 43-7 |
| 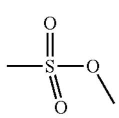 | compound 43-8 |
| 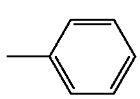 | compound 43-9 |
| 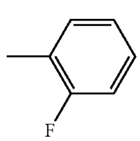 | compound 43-10 |

-continued
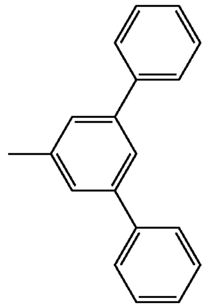 [SMILES: Cc1cc(-c2ccccc2)cc(-c2ccccc2)c1]
compound 43-11
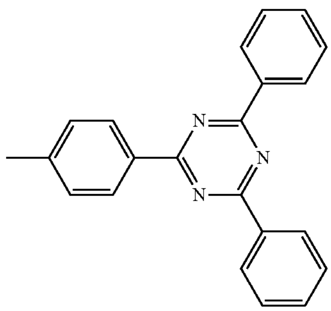 [SMILES: Cc1ccc(-c2nc(-c3ccccc3)nc(-c3ccccc3)n2)cc1]
compound 43-12
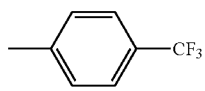
compound 43-13
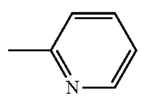
compound 43-14
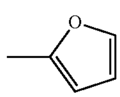
compound 43-15
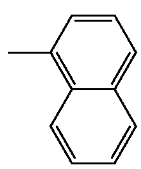
compound 43-16
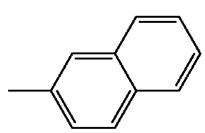
compound 43-17
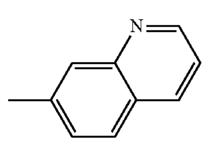
compound 43-18
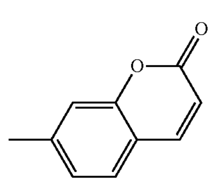
compound 43-19

-continued
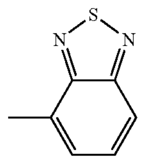
compound 43-20
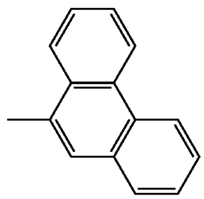
compound 43-21
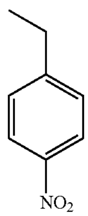
compound 43-22
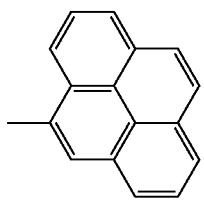 [SMILES: Cc1cc2cccc3ccc4cccc1c4c32]
compound 43-23
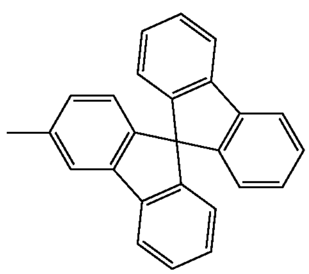 [SMILES: Cc1ccc2c(c1)-c1ccccc1C21c2ccccc2-c2ccccc21]
compound 43-24
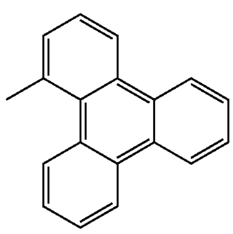 [SMILES: Cc1cccc2c3ccccc3c3ccccc3c12]
compound 43-25
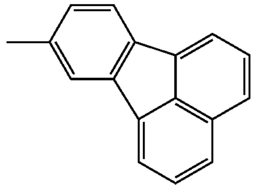 [SMILES: Cc1ccc2c(c1)-c1cccc3cccc-2c13]
compound 43-26

-continued
| R2 | R5 | compound |
|---|---|---|
| —H | 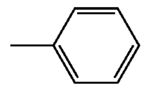 | compound 43-27 |
| 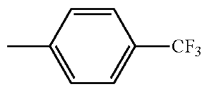 | 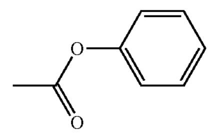 | compound 43-28 |
| —F | 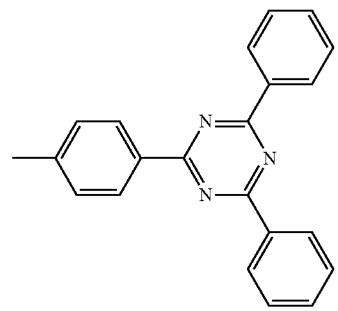 | compound 43-29 |
| —CN | 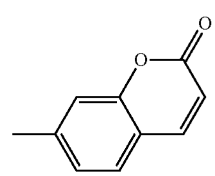 | compound 43-30 |
| 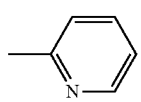 | 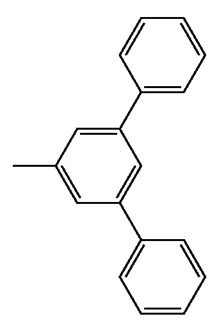 | compound 43-31 |
| 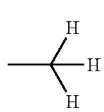 | 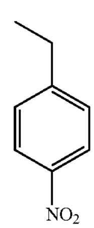 | compound 43-32 |

-continued
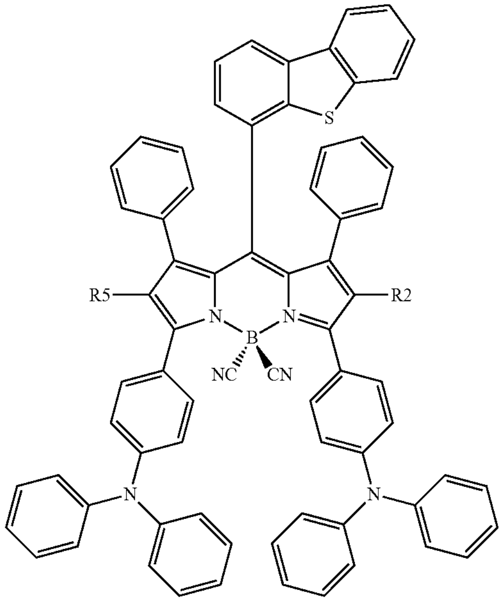
| R2, R5 | compound |
| --- | --- |
| —H | compound 44-1 |
| 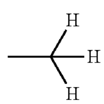 | compound 44-2 |
| —F | compound 44-3 |
| 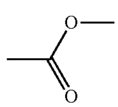 | compound 44-4 |
| 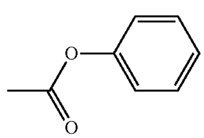 | compound 44-5 |
| —CN | compound 44-6 |
| 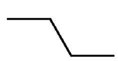 | compound 44-7 |
| 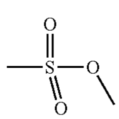 | compound 44-8 |
| 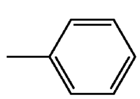 | compound 44-9 |
| 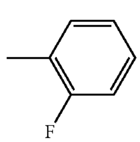 | compound 44-10 |

-continued
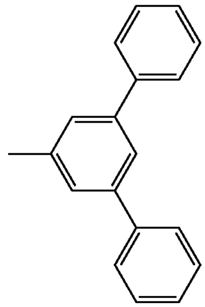 [SMILES: Cc1cc(-c2ccccc2)cc(-c2ccccc2)c1]
compound 44-11
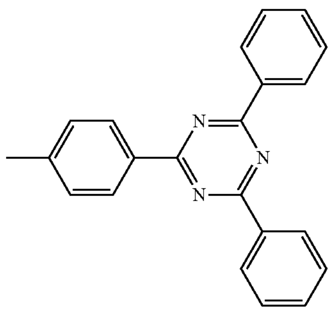 [SMILES: Cc1ccc(-c2nc(-c3ccccc3)nc(-c3ccccc3)n2)cc1]
compound 44-12
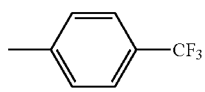
compound 44-13
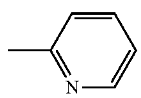
compound 44-14
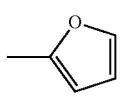
compound 44-15
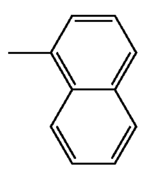
compound 44-16
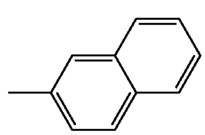
compound 44-17
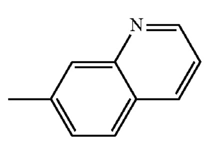
compound 44-18
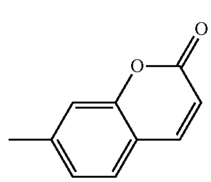
compound 44-19

-continued
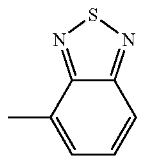
compound 44-20
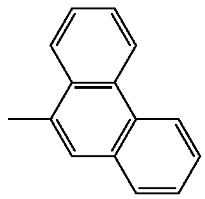
compound 44-21
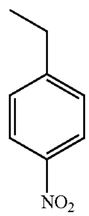
compound 44-22
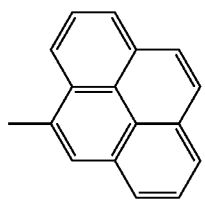 [SMILES: Cc1cc2cccc3ccc4cccc1c4c32]
compound 44-23
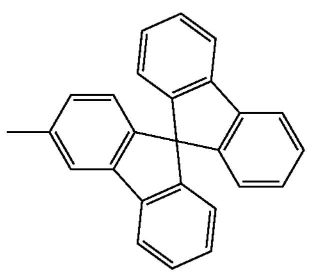 [SMILES: Cc1ccc2c(c1)-c1ccccc1C21c2ccccc2-c2ccccc21]
compound 44-24
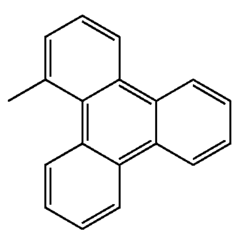 [SMILES: Cc1cccc2c3ccccc3c3ccccc3c12]
compound 44-25
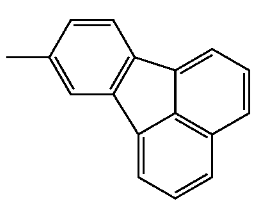 [SMILES: Cc1ccc2c(c1)-c1cccc3cccc-2c13]
compound 44-26

-continued
| R2 | R5 | compound |
|---|---|---|
| —H | 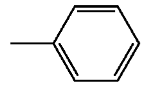 | compound 44-27 |
| 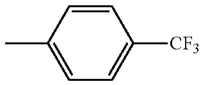 | 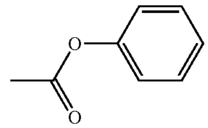 | compound 44-28 |
| —F | 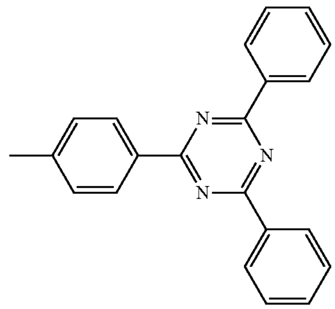 | compound 44-29 |
| —CN | 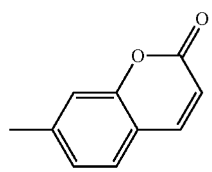 | compound 44-30 |
| 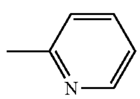 | 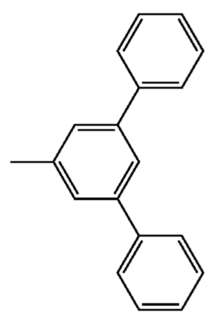 | compound 44-31 |
| 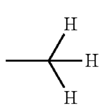 | 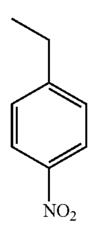 | compound 44-32 |

-continued
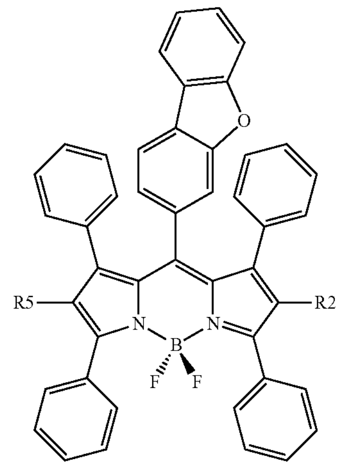
| R2, R5 | compound |
|---|---|
| —H | compound 45-1 |
| 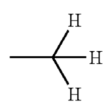 | compound 45-2 |
| —F | compound 45-3 |
| 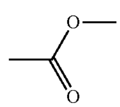 | compound 45-4 |
| 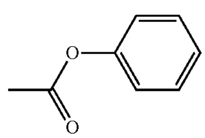 | compound 45-5 |
| —CN | compound 45-6 |
| 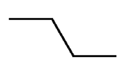 | compound 45-7 |
| 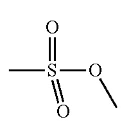 | compound 45-8 |
| 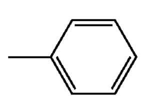 | compound 45-9 |
| 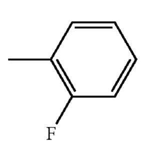 | compound 45-10 |

-continued
compound 45-11
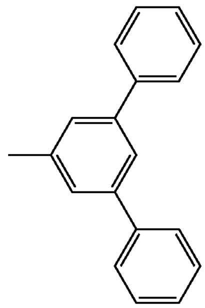 [SMILES: Cc1cc(-c2ccccc2)cc(-c2ccccc2)c1]
compound 45-12
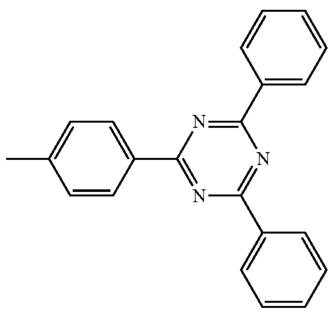 [SMILES: Cc1ccc(-c2nc(-c3ccccc3)nc(-c3ccccc3)n2)cc1]
compound 45-13
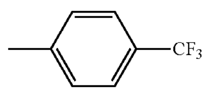
compound 45-14
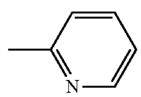
compound 45-15
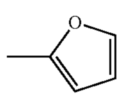
compound 45-16
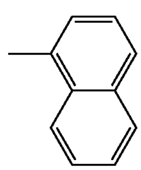
compound 45-17
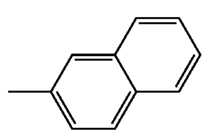
compound 45-18
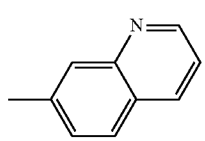
compound 45-19
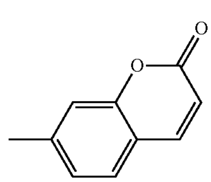

-continued
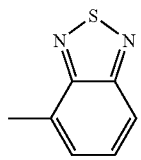
compound 45-20
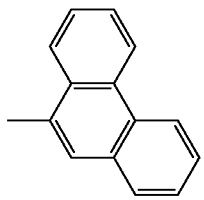
compound 45-21
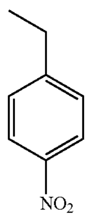
compound 45-22
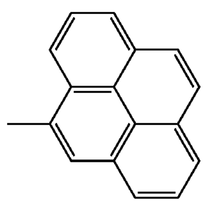 [SMILES: Cc1cc2cccc3ccc4cccc1c4c32]
compound 45-23
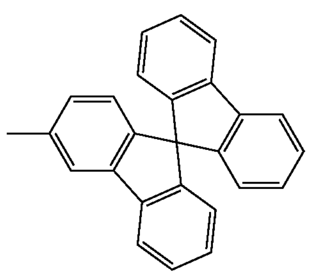 [SMILES: Cc1ccc2c(c1)-c1ccccc1C21c2ccccc2-c2ccccc21]
compound 45-24
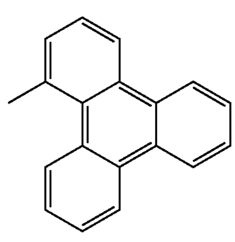 [SMILES: Cc1cccc2c3ccccc3c3ccccc3c12]
compound 45-25
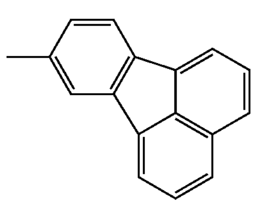 [SMILES: Cc1ccc2c(c1)-c1cccc3cccc-2c13]
compound 45-26

-continued
| R2 | R5 | compound |
|---|---|---|
| —H | 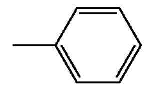 | compound 45-27 |
| 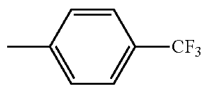 | 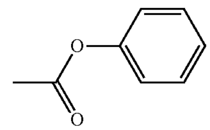 | compound 45-28 |
| —F | 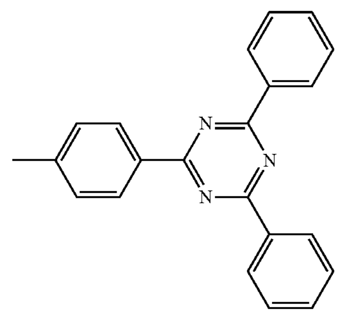 | compound 45-29 |
| —CN | 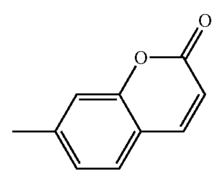 | compound 45-30 |
| 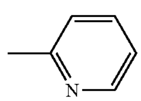 | 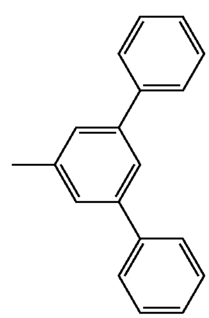 | compound 45-31 |
| 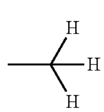 | 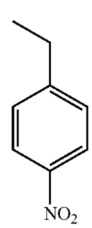 | compound 45-32 |

-continued
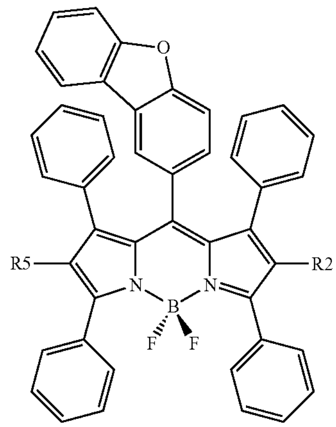
| R2, R5 | compound |
|---|---|
| —H | compound 46-1 |
| 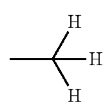 | compound 46-2 |
| —F | compound 46-3 |
| 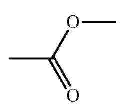 | compound 46-4 |
| 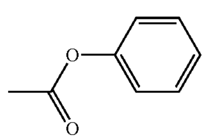 | compound 46-5 |
| —CN | compound 46-6 |
| 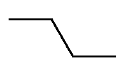 | compound 46-7 |
| 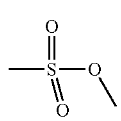 | compound 46-8 |
| 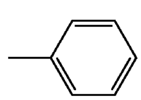 | compound 46-9 |
| 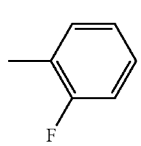 | compound 46-10 |

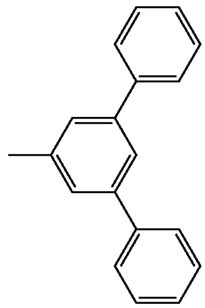 [SMILES: Cc1cc(-c2ccccc2)cc(-c2ccccc2)c1]
compound 46-11
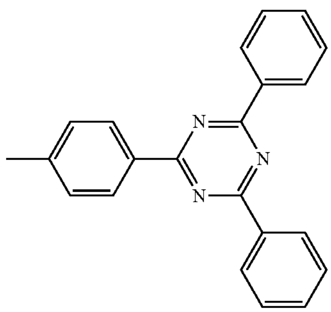 [SMILES: Cc1ccc(-c2nc(-c3ccccc3)nc(-c3ccccc3)n2)cc1]
compound 46-12
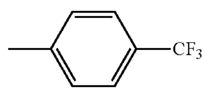
compound 46-13
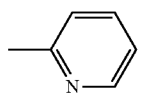
compound 46-14
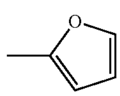
compound 46-15
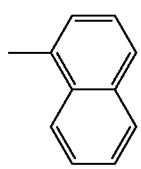
compound 46-16
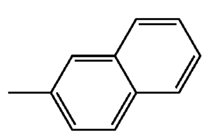
compound 46-17
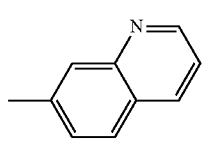
compound 46-18
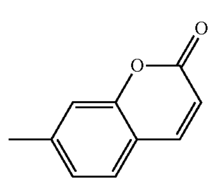
compound 46-19

-continued
compound 46-20
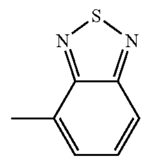
compound 46-21
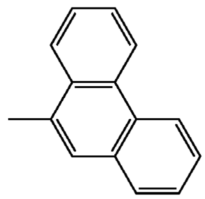
compound 46-22
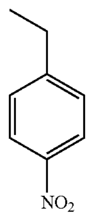
compound 46-23
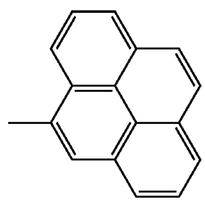 [SMILES: Cc1cc2cccc3ccc4cccc1c4c32]
compound 46-24
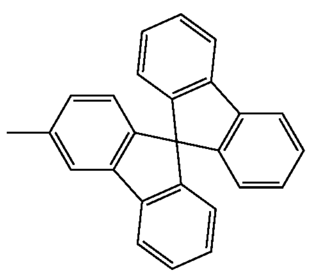 [SMILES: Cc1ccc2c(c1)-c1ccccc1C21c2ccccc2-c2ccccc21]
compound 46-25
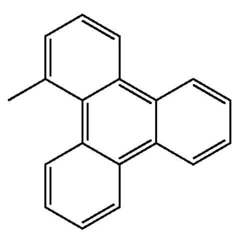 [SMILES: Cc1cccc2c3ccccc3c3ccccc3c12]
compound 46-26
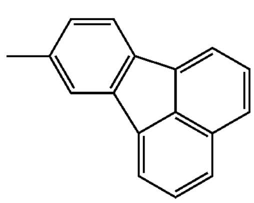 [SMILES: Cc1ccc2c(c1)-c1cccc3cccc-2c13]

-continued
| R2 | R5 | compound |
|---|---|---|
| —H | 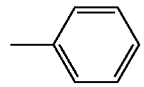 | compound 46-27 |
| 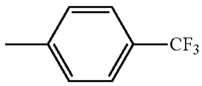 | 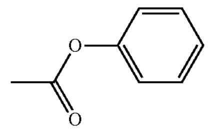 | compound 46-28 |
| —F | 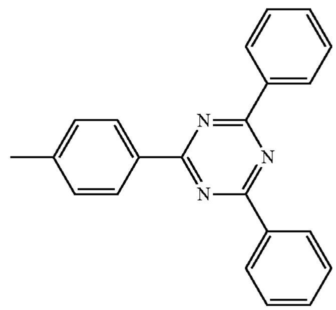 | compound 46-29 |
| —CN | 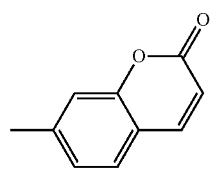 | compound 46-30 |
| 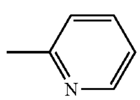 | 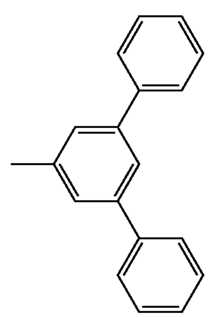 | compound 46-31 |
| 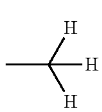 | 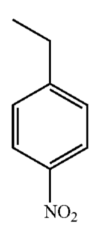 | compound 46-32 |

-continued
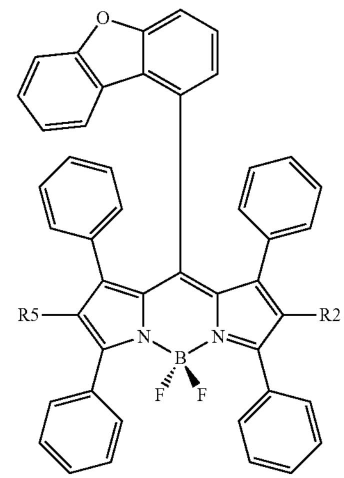
| R2, R5 | compound |
|---|---|
| —H | compound 47-1 |
| 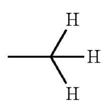 | compound 47-2 |
| —F | compound 47-3 |
| 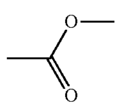 | compound 47-4 |
| 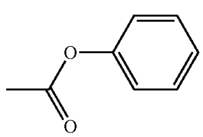 | compound 47-5 |
| —CN | compound 47-6 |
| 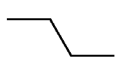 | compound 47-7 |
| 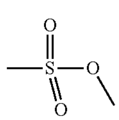 | compound 47-8 |
| 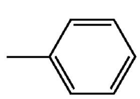 | compound 47-9 |
| 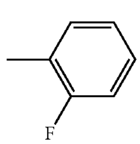 | compound 47-10 |

-continued
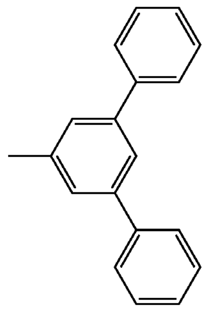 [SMILES: Cc1cc(-c2ccccc2)cc(-c2ccccc2)c1]
compound 47-11
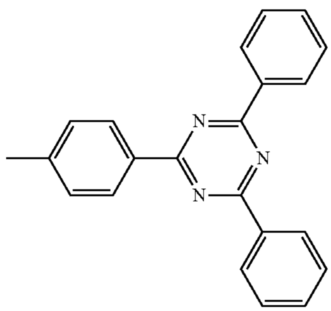 [SMILES: Cc1ccc(-c2nc(-c3ccccc3)nc(-c3ccccc3)n2)cc1]
compound 47-12
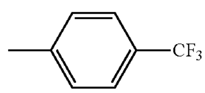
compound 47-13
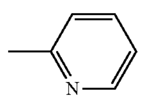
compound 47-14
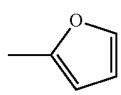
compound 47-15
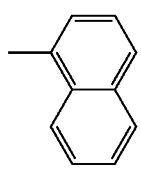
compound 47-16
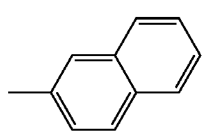
compound 47-17
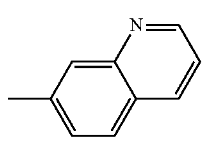
compound 47-18
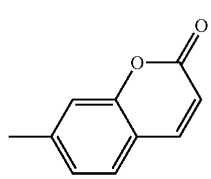
compound 47-19

-continued
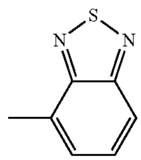
compound 47-20
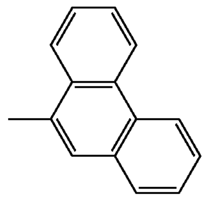
compound 47-21
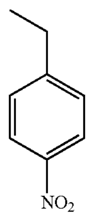
compound 47-22
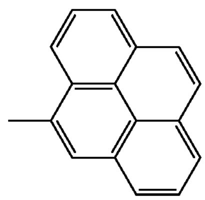 [SMILES: Cc1cc2cccc3ccc4cccc1c4c32]
compound 47-23
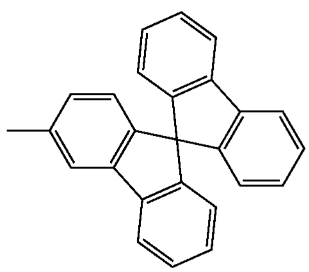 [SMILES: Cc1ccc2c(c1)-c1ccccc1C21c2ccccc2-c2ccccc21]
compound 47-24
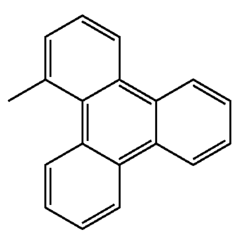 [SMILES: Cc1cccc2c3ccccc3c3ccccc3c12]
compound 47-25
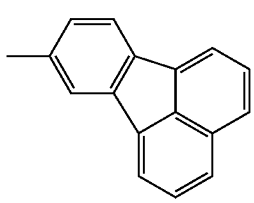 [SMILES: Cc1ccc2c(c1)-c1cccc3cccc-2c13]
compound 47-26

-continued
| R2 | R5 | compound |
|---|---|---|
| —H | 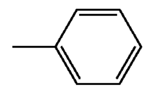 | compound 47-27 |
| 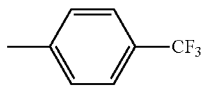 | 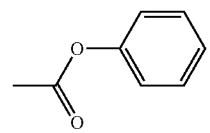 | compound 47-28 |
| —F | 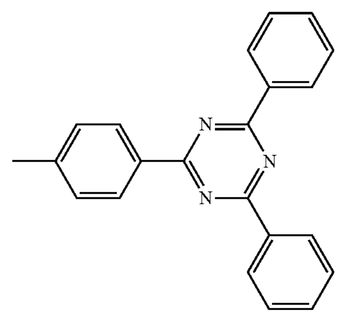 | compound 47-29 |
| —CN | 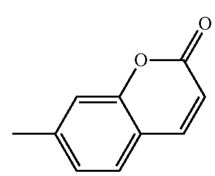 | compound 47-30 |
| 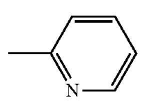 | 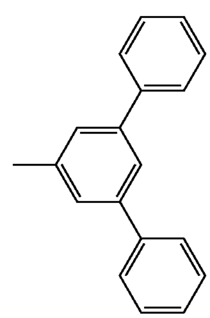 | compound 47-31 |
| 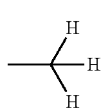 | 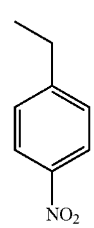 | compound 47-32 |

-continued
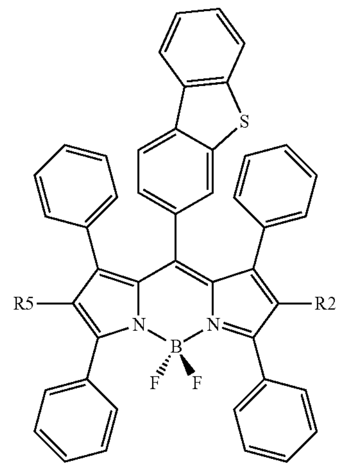
| R2, R5 | compound |
|---|---|
| —H | compound 48-1 |
| 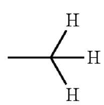 | compound 48-2 |
| —F | compound 48-3 |
| 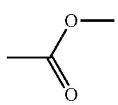 | compound 48-4 |
| 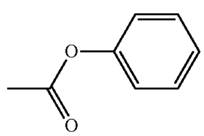 | compound 48-5 |
| —CN | compound 48-6 |
| 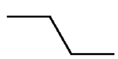 | compound 48-7 |
| 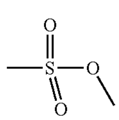 | compound 48-8 |
| 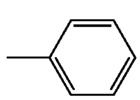 | compound 48-9 |
| 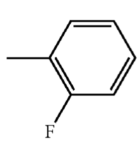 | compound 48-10 |

-continued
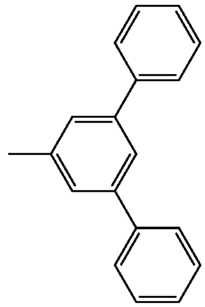 [SMILES: Cc1cc(-c2ccccc2)cc(-c2ccccc2)c1]
compound 48-11
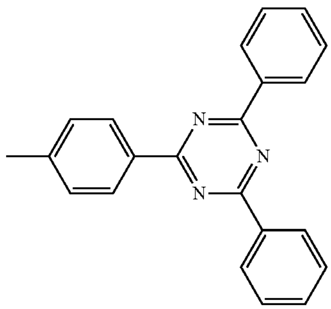 [SMILES: Cc1ccc(-c2nc(-c3ccccc3)nc(-c3ccccc3)n2)cc1]
compound 48-12
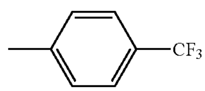
compound 48-13
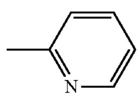
compound 48-14
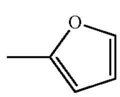
compound 48-15
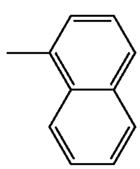
compound 48-16
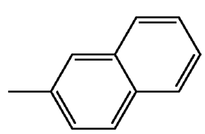
compound 48-17
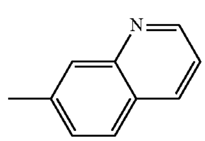
compound 48-18
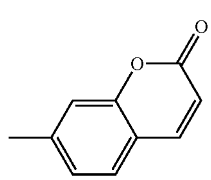
compound 48-19

-continued
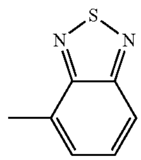
compound 48-20
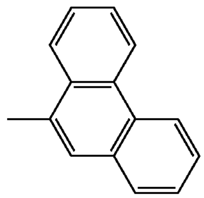
compound 48-21
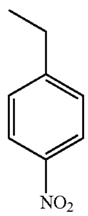
compound 48-22
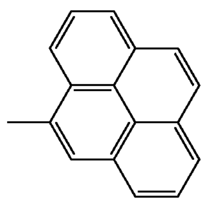 [SMILES: Cc1cc2cccc3ccc4cccc1c4c32]
compound 48-23
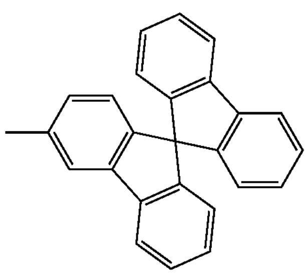 [SMILES: Cc1ccc2c(c1)-c1ccccc1C21c2ccccc2-c2ccccc21]
compound 48-24
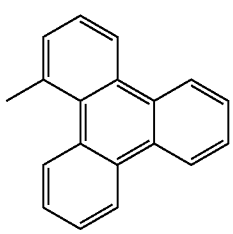 [SMILES: Cc1cccc2c3ccccc3c3ccccc3c12]
compound 48-25
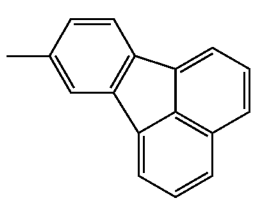 [SMILES: Cc1ccc2c(c1)-c1cccc3cccc-2c13]
compound 48-26

-continued
| R2 | R5 | compound |
|---|---|---|
| —H | 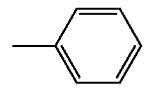 | compound 48-27 |
| 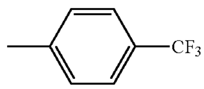 | 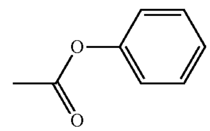 | compound 48-28 |
| —F | 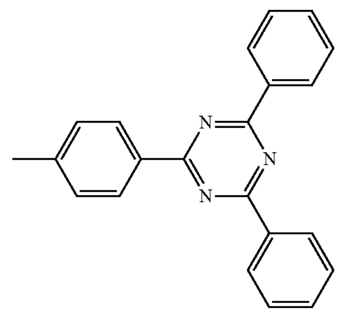 | compound 48-29 |
| —CN | 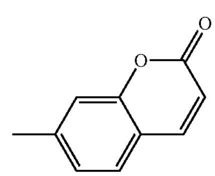 | compound 48-30 |
| 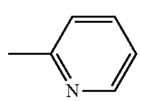 | 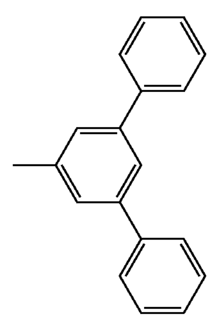 | compound 48-31 |
| 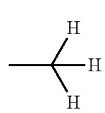 | 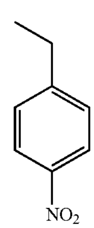 | compound 48-32 |

-continued
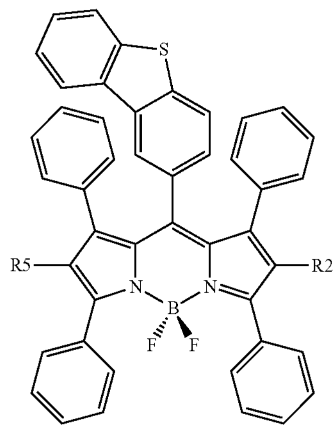
| R2, R5 | compound |
|---|---|
| —H | compound 49-1 |
| 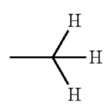 | compound 49-2 |
| —F | compound 49-3 |
| 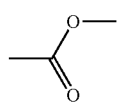 | compound 49-4 |
| 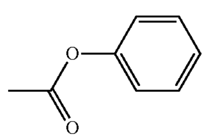 | compound 49-5 |
| —CN | compound 49-6 |
| 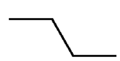 | compound 49-7 |
| 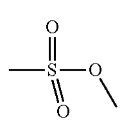 | compound 49-8 |
| 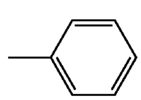 | compound 49-9 |
| 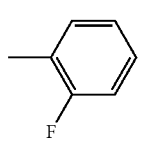 | compound 49-10 |

-continued
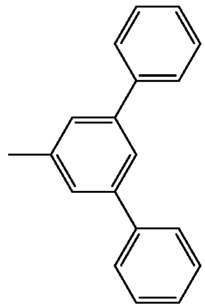 [SMILES: Cc1cc(-c2ccccc2)cc(-c2ccccc2)c1]
compound 49-11
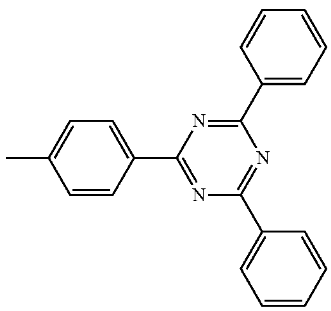 [SMILES: Cc1ccc(-c2nc(-c3ccccc3)nc(-c3ccccc3)n2)cc1]
compound 49-12
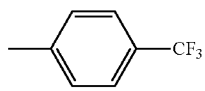
compound 49-13
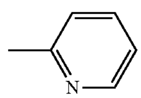
compound 49-14
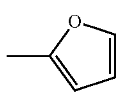
compound 49-15
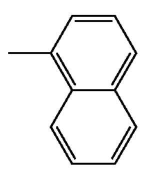
compound 49-16
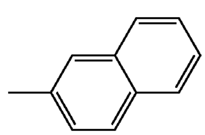
compound 49-17
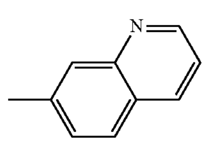
compound 49-18
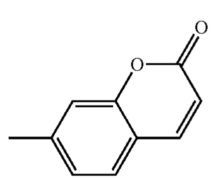
compound 49-19

-continued
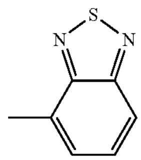
compound 49-20
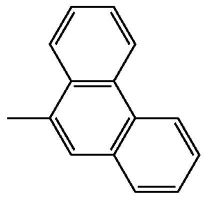
compound 49-21
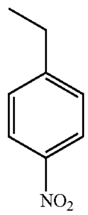
compound 49-22
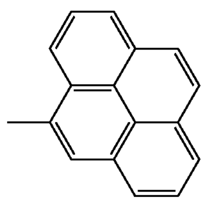 [SMILES: Cc1cc2cccc3ccc4cccc1c4c32]
compound 49-23
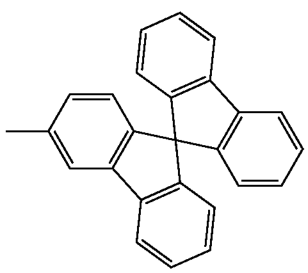 [SMILES: Cc1ccc2c(c1)-c1ccccc1C21c2ccccc2-c2ccccc21]
compound 49-24
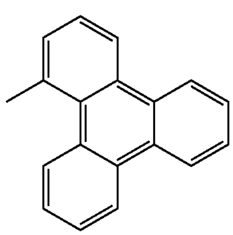 [SMILES: Cc1cccc2c3ccccc3c3ccccc3c12]
compound 49-25
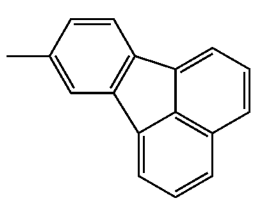 [SMILES: Cc1ccc2c(c1)-c1cccc3cccc-2c13]
compound 49-26

-continued
| R2 | R5 | compound |
| --- | --- | --- |
| —H | 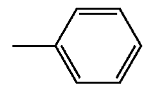 | compound 49-27 |
| 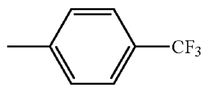 | 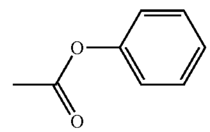 | compound 49-28 |
| —F | 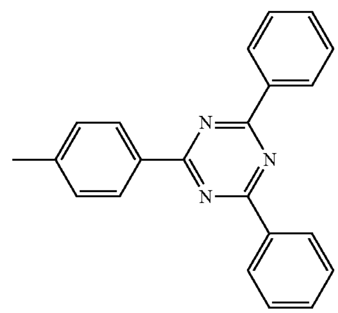 | compound 49-29 |
| —CN | 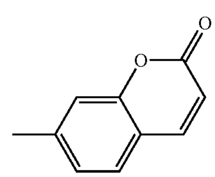 | compound 49-30 |
| 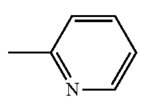 | 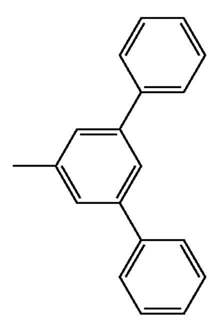 | compound 49-31 |
| 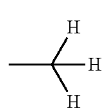 | 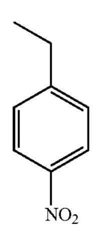 | compound 49-32 |

-continued
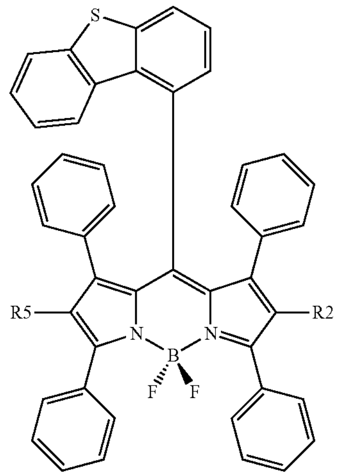
| R2, R5 | compound |
|---|---|
| —H | compound 50-1 |
| 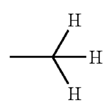 | compound 50-2 |
| —F | compound 50-3 |
| 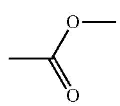 | compound 50-4 |
| 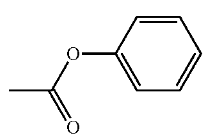 | compound 50-5 |
| —CN | compound 50-6 |
| 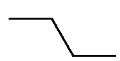 | compound 50-7 |
| 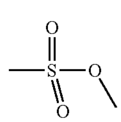 | compound 50-8 |
| 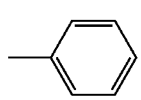 | compound 50-9 |
| 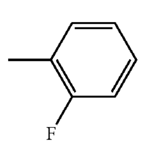 | compound 50-10 |

-continued
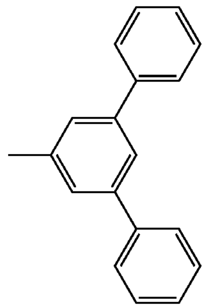 [SMILES: Cc1cc(-c2ccccc2)cc(-c2ccccc2)c1]
compound 50-11
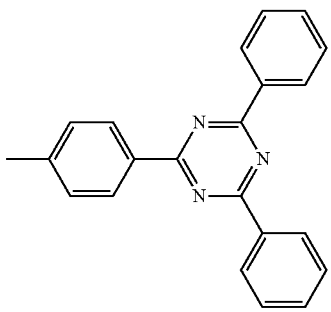 [SMILES: Cc1ccc(-c2nc(-c3ccccc3)nc(-c3ccccc3)n2)cc1]
compound 50-12
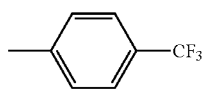
compound 50-13
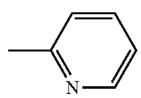
compound 50-14
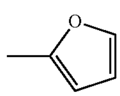
compound 50-15
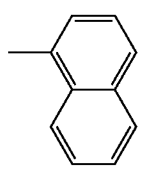
compound 50-16
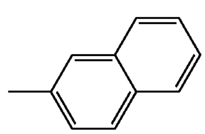
compound 50-17
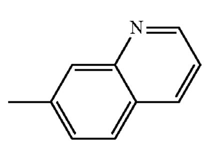
compound 50-18
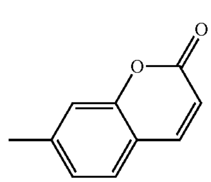
compound 50-19

-continued
compound 50-20
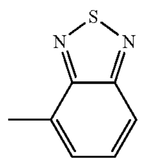
compound 50-21
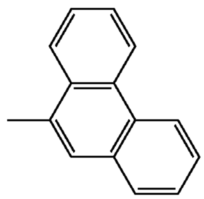
compound 50-22
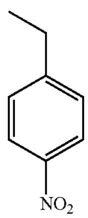
compound 50-23
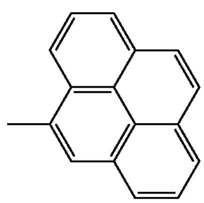 [SMILES: Cc1cc2cccc3ccc4cccc1c4c32]
compound 50-24
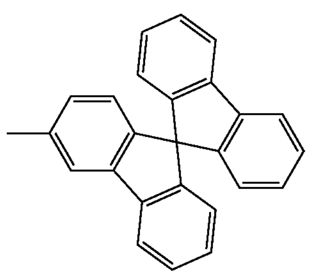 [SMILES: Cc1ccc2c(c1)-c1ccccc1C21c2ccccc2-c2ccccc21]
compound 50-25
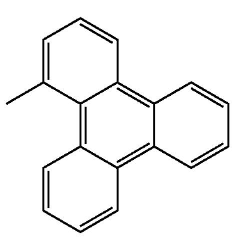 [SMILES: Cc1cccc2c3ccccc3c3ccccc3c12]
compound 50-26
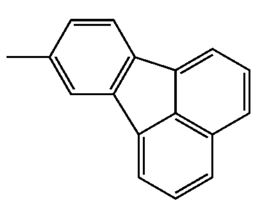 [SMILES: Cc1ccc2c(c1)-c1cccc3cccc-2c13]

-continued
| R2 | R5 | compound |
|---|---|---|
| —H | 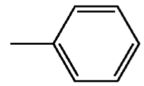 | compound 50-27 |
| 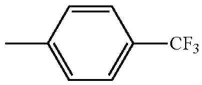 | 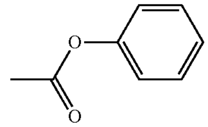 | compound 50-28 |
| —F | 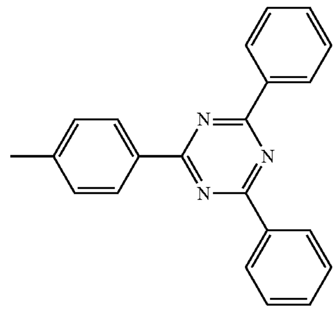 | compound 50-29 |
| —CN | 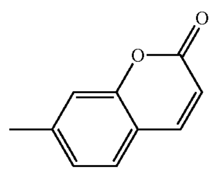 | compound 50-30 |
| 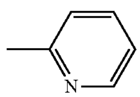 | 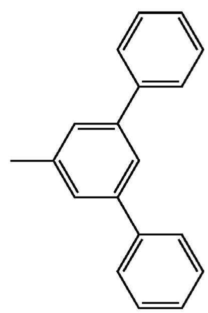 | compound 50-31 |
| 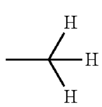 | 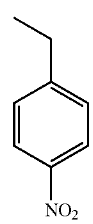 | compound 50-32 |
| 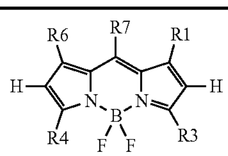 | | R7 | | |
|---|---|---|---|---|
| R1, R6 | R3, R4 | 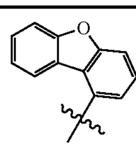 | 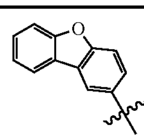 | 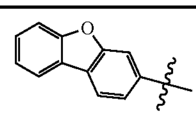 |

-continued
| | | | | |
|---|---|---|---|---|
| 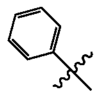 | 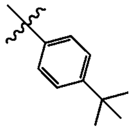 [SMILES: *c1ccc(C(C)(C)C)cc1] | compound 51-1 | compound 52-1 | compound 53-1 |
| | 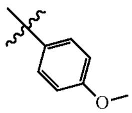 [SMILES: *c1ccc(OC)cc1] | compound 51-2 | compound 52-2 | compound 53-2 |
| | 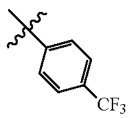 | compound 51-3 | compound 52-3 | compound 53-3 |
| | 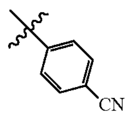 [SMILES: *c1ccc(C#N)cc1] | compound 51-4 | compound 52-4 | compound 53-4 |
| 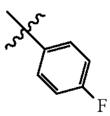 [SMILES: *c1ccc(F)cc1] | 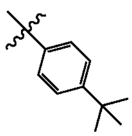 [SMILES: *c1ccc(C(C)(C)C)cc1] | compound 51-5 | compound 52-5 | compound 53-5 |
| | 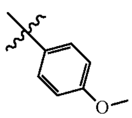 [SMILES: *c1ccc(OC)cc1] | compound 51-6 | compound 52-6 | compound 53-6 |
| | 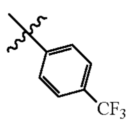 | compound 51-7 | compound 52-7 | compound 53-7 |
| | 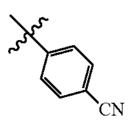 [SMILES: *c1ccc(C#N)cc1] | compound 51-8 | compound 52-8 | compound 53-8 |
| 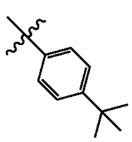 [SMILES: *c1ccc(C(C)(C)C)cc1] | 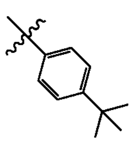 [SMILES: *c1ccc(C(C)(C)C)cc1] | compound 51-9 | compound 52-9 | compound 53-9 |
| | 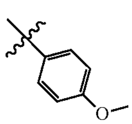 [SMILES: *c1ccc(OC)cc1] | compound 51-10 | compound 52-10 | compound 53-10 |
| | 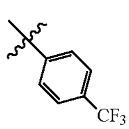 | compound 51-11 | compound 52-11 | compound 53-11 |
| | 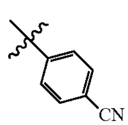 [SMILES: *c1ccc(C#N)cc1] | compound 51-12 | compound 52-12 | compound 53-12 |

-continued
| 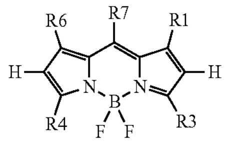 | | R7 | | |
|---|---|---|---|---|
| R1, R6 | R3, R4 | 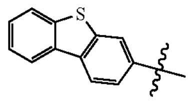 [SMILES: *c1ccc2c(c1)sc1ccccc12] | 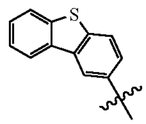 [SMILES: *c1ccc2sc3ccccc3c2c1] | 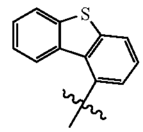 [SMILES: *c1cccc2sc3ccccc3c12] |
| 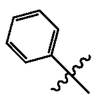 [SMILES: *c1ccccc1] | 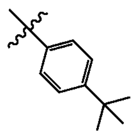 [SMILES: *c1ccc(C(C)(C)C)cc1] | compound 54-1 | compound 55-1 | compound 56-1 |
| | 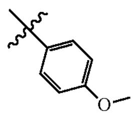 | compound 54-2 | compound 55-2 | compound 56-2 |
| | 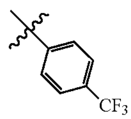 | compound 54-3 | compound 55-3 | compound 56-3 |
| | 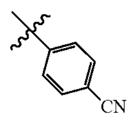 [SMILES: *c1ccc(C#N)cc1] | compound 54-4 | compound 55-4 | compound 56-4 |
| 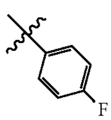 [SMILES: *c1ccc(F)cc1] | 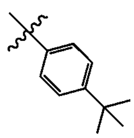 [SMILES: *c1ccc(C(C)(C)C)cc1] | compound 54-5 | compound 55-5 | compound 56-5 |
| | 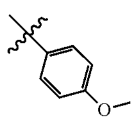 [SMILES: *c1ccc(OC)cc1] | compound 54-6 | compound 55-6 | compound 56-6 |
| | 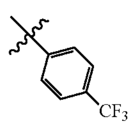 | compound 54-7 | compound 55-7 | compound 56-7 |
| | 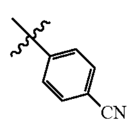 [SMILES: *c1ccc(C#N)cc1] | compound 54-8 | compound 55-8 | compound 56-8 |
| 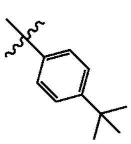 [SMILES: *c1ccc(C(C)(C)C)cc1] | 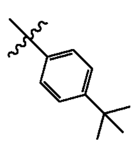 [SMILES: *c1ccc(C(C)(C)C)cc1] | compound 54-9 | compound 55-9 | compound 56-9 |
| | 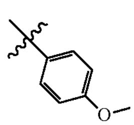 [SMILES: *c1ccc(OC)cc1] | compound 54-10 | compound 55-10 | compound 56-10 |

-continued

| | | | |
|---|---|---|---|
| 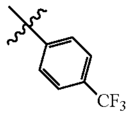 | compound 54-11 | compound 55-11 | compound 56-11 |
| 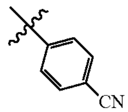 [SMILES: *c1ccc(C#N)cc1] | compound 54-12 | compound 55-12 | compound 56-12 |

According to one embodiment of the present specification, the compound represented by Chemical Formula 1 may be prepared using general preparation methods as follows.

For example, the core structure of the compound represented by Chemical Formula 1-1 among the compounds represented by Chemical Formula 1 may be prepared using a method of the following General Formula 1, however, the method is not limited thereto.

[General Formula 1]

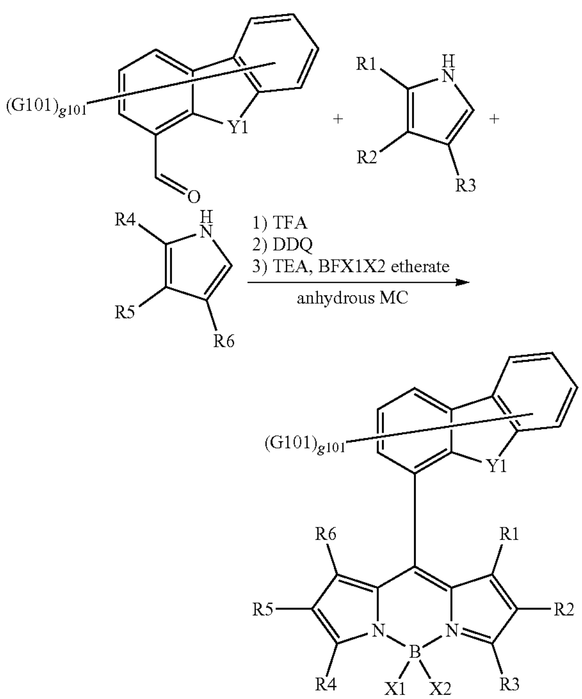

In General Formula 1,

X1, X2 and R1 to R6 have the same definitions as in Chemical Formula 1,

Y1 has the same definition as in Chemical Formula 2, and

G101 and g101 have the same definitions as in Chemical Formula 1-1.

One embodiment of the present specification provides a color conversion film including a resin matrix; and the compound represented by Chemical Formula 1 dispersed into the resin matrix.

The content of the compound represented by Chemical Formula 1 in the color conversion film may be in a range of 0.001% by weight to 10% by weight.

The color conversion film may include one type of the compound represented by Chemical Formula 1, or may include two or more types thereof. For example, the color conversion film may include one type of the compound emitting green light among the compounds represented by Chemical Formula 1. As another example, the color conversion film may include one type of the compound emitting red light among the compounds represented by Chemical Formula 1. As still another example, the color conversion film may include one type of the compound emitting green light and one type of the compound emitting red light among the compounds represented by Chemical Formula 1.

The color conversion film may further include additional fluorescent substances in addition to the compound represented by Chemical Formula 1. When using a light source emitting blue light, the color conversion film preferably includes both a green light emitting fluorescent substance and a red light emitting fluorescent substance. In addition, when using a light source emitting blue light and green light, the color conversion film may only include a red light emitting fluorescent substance. However, the color conversion film is not limited thereto, and even when using a light source emitting blue light, the color conversion film may only include a red light emitting compound when a separate film including a green light emitting fluorescent substance is laminated. On the other hand, even when using a light source emitting blue light, the color conversion film may only include a green light emitting compound when a separate film including a red light emitting fluorescent substance is laminated.

The color conversion film may further include a resin matrix; and an additional layer including a compound dispersed into the resin matrix and emitting light in a wavelength different from the wavelength of the compound represented by Chemical Formula 1. The compound emitting light in a wavelength different from the wavelength of the compound represented by Chemical Formula 1 may also be the compound represented by Chemical Formula 1, or may be other known fluorescent materials.

The resin matrix material is preferably a thermoplastic polymer or a thermocurable polymer. Specifically, a poly(meth)acryl-based such as polymethyl methacrylate (PMMA), a polycarbonate (PC)-based, a polystyrene (PS)-based, a polyarylene (PAR)-based, a polyurethane (TPU)-based, a styrene-acrylonitrile (SAN)-based, a polyvinylidene fluoride (PVDF)-based, a modified polyvinylidene fluoride (modified-PVDF)-based and the like may be used as the resin matrix material.

According to one embodiment of the present specification, the color conversion film according to the embodiments described above additionally includes light diffusing particles. By dispersing light diffusing particles into the color conversion film instead of a light diffusing film used in the art for enhancing luminance, higher luminance may be exhibited compared to using a separate light diffusing film, and an adhering process may be skipped as well.

As the light diffusing particles, particles having a high refractive index with the resin matrix may be used, and examples thereof may include $TiO_2$, silica, borosilicate, alumina, sapphire, air or other gases, air- or gas-filled hollow beads or particles (for example, air/gas-filled glass or polymers); polystyrene, polycarbonate, polymethyl methacrylate, acryl, methyl methacrylate, styrene, melamine resin, formaldehyde resin, or polymer particles including melamine and formaldehyde resins, or any suitable combination thereof.

The light diffusing particles may have particle diameters in a range of 0.1 micrometers to 5 micrometers, for example, in a range of 0.3 micrometers to 1 micrometer. The content of the light diffusing particles may be determined as necessary, and for example, may be in a range of approximately 1 part by weight to 30 parts by weight based on 100 parts by weight of the resin matrix.

The color conversion film according to the embodiments described above may have a thickness of 2 micrometers to 200 micrometers. Particularly, the color conversion film may exhibit high luminance even with a small thickness of 2 micrometers to 20 micrometers. This is due to the fact that the content of the fluorescent substance molecules included in the unit volume is higher compared to quantum dots.

The color conversion film according to the embodiments described above may have a substrate provided on one surface. This substrate may function as a support when preparing the color conversion film. Types of the substrate are not particularly limited, and the material or thickness is not limited as long as it is transparent and is capable of functioning as the support. Herein, being transparent means having visible light transmittance of 70% or more. For example, a PET film may be used as the substrate.

The color conversion film described above may be prepared by coating a resin solution in which the compound represented by Chemical Formula 1 described above is dissolved on a substrate and drying the result, or by extruding and filming the compound represented by Chemical Formula 1 described above together with a resin.

The compound represented by Chemical Formula 1 is dissolved in the resin solution, and therefore, the compound represented by Chemical Formula 1 is uniformly distributed in the solution. This is different from a quantum dot film preparation process that requires a separate dispersion process.

As for the resin solution in which the compound represented by Chemical Formula 1 is dissolved, the preparation method is not particularly limited as long as the compound represented by Chemical Formula 1 and the resin described above are dissolved in the solution.

According to one example, the resin solution in which the compound represented by Chemical Formula 1 is dissolved may be prepared using a method of preparing a first solution by dissolving the compound represented by Chemical Formula 1 in a solvent, preparing a second solution by dissolving a resin in a solvent, and mixing the first solution and the second solution. When mixing the first solution and the second solution, it is preferable that these be uniformly mixed. However, the method is not limited thereto, and a method of simultaneously adding and dissolving the compound represented by Chemical Formula 1 and a resin in a solvent, a method of dissolving the compound represented by Chemical Formula 1 in a solvent and subsequently adding and dissolving a resin, a method of dissolving a resin in a solvent and then subsequently adding and dissolving the compound represented by Chemical Formula 1, and the like, may be used.

As the resin included in the solution, the resin matrix material described above, a monomer curable to this resin matrix resin, or a mixture thereof, may be used. For example, the monomer curable to the resin matrix resin includes a (meth)acryl-based monomer, and this may be formed to a resin matrix material by UV curing. When using such a curable monomer, an initiator required for curing may be further added as necessary.

The solvent is not particularly limited as long as it is capable of being removed by drying afterword while having no adverse effects on the coating process. Non-limiting examples of the solvent may include toluene, xylene, acetone, chloroform, various alcohol-based solvents, methylethyl ketone (MEK), methylisobutyl ketone (MIBK), ethyl acetate (EA), butyl acetate, dimethylformamide (DMF), dimethylacetamide (DMAc), dimethyl sulfoxide (DMSO), N-methyl-pyrrolidone (NMP) and the like, and one type or a mixture of two or more types may be used. When the first solution and the second solution are used, solvents included in each of the solutions may be the same as or different from each other. Even when different types of solvents are used in the first solution and the second solution, these solvents preferably have compatibility so as to be mixed with each other.

The process of coating the resin solution in which the compound represented by Chemical Formula 1 is dissolved on a substrate may use a roll-to-roll process. For example, a process of unwinding a substrate from a substrate-wound roll, coating the resin solution in which the compound represented by Chemical Formula 1 is dissolved on one surface of the substrate, drying the result, and then winding the result again on the roll may be used. When a roll-to-roll process is used, viscosity of the resin solution is preferably determined in a range capable of carrying out the process, and for example, may be determined in a range of 200 cps to 2,000 cps.

As the coating method, various known methods may be used, and for example, a die coater may be used, or various bar coating methods such as a comma coater and a reverse comma coater may be used.

After the coating, a drying process is carried out. The drying process may be carried out under a condition required to remove a solvent. For example, a color conversion film including a fluorescent substance including the compound represented by Chemical Formula 1 having target thickness and concentration may be obtained on a substrate by carrying out the drying in an oven located close to a coater under a condition to sufficiently evaporate a solvent, in a direction of the substrate progressing during the coating process.

When a monomer curable to the resin matrix resin is used as the resin included in the solution, curing, for example, UV curing, may be carried out prior to or at the same time as the drying.

When the compound represented by Chemical Formula 1 is filmed by being extruded with a resin, extrusion methods known in the art may be used, and for example, the color conversion film may be prepared by extruding the compound represented by Chemical Formula 1 with a resin such as a polycarbonate (PC)-based, a poly(meth)acryl-based and a styrene-acrylonitrile (SAN)-based.

According to one embodiment of the present specification, the color conversion film may have a protective film or a barrier film provided on at least one surface. As the protective film or the barrier film, those known in the art may be used.

One embodiment of the present specification provides a backlight unit including the color conversion film described above. The backlight unit may have backlight unit constitutions known in the art except for including the color conversion film. FIG. 1 is a mimetic diagram of a backlight unit structure according to one embodiment. The backlight unit according to FIG. 1 includes a side chain-type light source (101), a reflecting plate (102) surrounding the light source, a light guide plate (103) either directly emitting light from the light source or inducing light reflected from the reflecting plate, a reflective layer (104) provided on one surface of the light guide plate, and a color conversion film (105) provided on a surface of the light guide plate opposite to a surface facing the reflecting plate. A part marked in grey in FIG. 1 is a light dispersion pattern (106) of the light guide plate. Light entering into the light guide plate has non-uniform light distribution due to the repetition of optical processes such as reflection, total-reflection, refraction and transmission, and in order to induce this non-uniform light distribution to uniform brightness, a two-dimensional light dispersion pattern may be used. However, the scope of the present disclosure is not limited to FIG. 1, and a direct type as well as a side chain type may be used as the light source, and the reflecting plate or the reflective layer may not be included or may be replaced with other constituents as necessary, and when necessary, additional films such as a light diffusing film, a light concentrating film and a luminance enhancing film may be further provided.

One embodiment of the present specification provides a display apparatus including the backlight unit. The display apparatus is not particularly limited as long as it includes the backlight unit, and may be included in TVs, computer monitors, laptops, mobile phones and the like.

Hereinafter, the present specification will be described in detail with reference to examples. However, the examples according to the present specification may be modified to various other forms, and the scope of the present specification is not construed to be limited to the examples described below. The examples of the present specification are provided for more completely describing the present specification to those having average knowledge in the art.

<General Synthesis of Pyrrole>

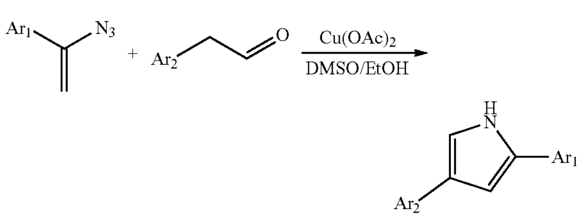

1 equivalent of aldehyde and 1.5 equivalents of azide were introduced to a solvent, approximately 2% to 5% of a catalyst was added thereto, and the result was heated and stirred at 110° C. under argon. After the reaction was terminated, the result was extracted using water and ethyl acetate, and water was removed using anhydrous magnesium sulfate. The result was concentrated through vacuum distillation, and then purified through a column.

The synthesis referred to [Org. Lett., 2012, 14 (18), pp 4926-4929].

Preparation Example 1. Preparation of Compound 2-1

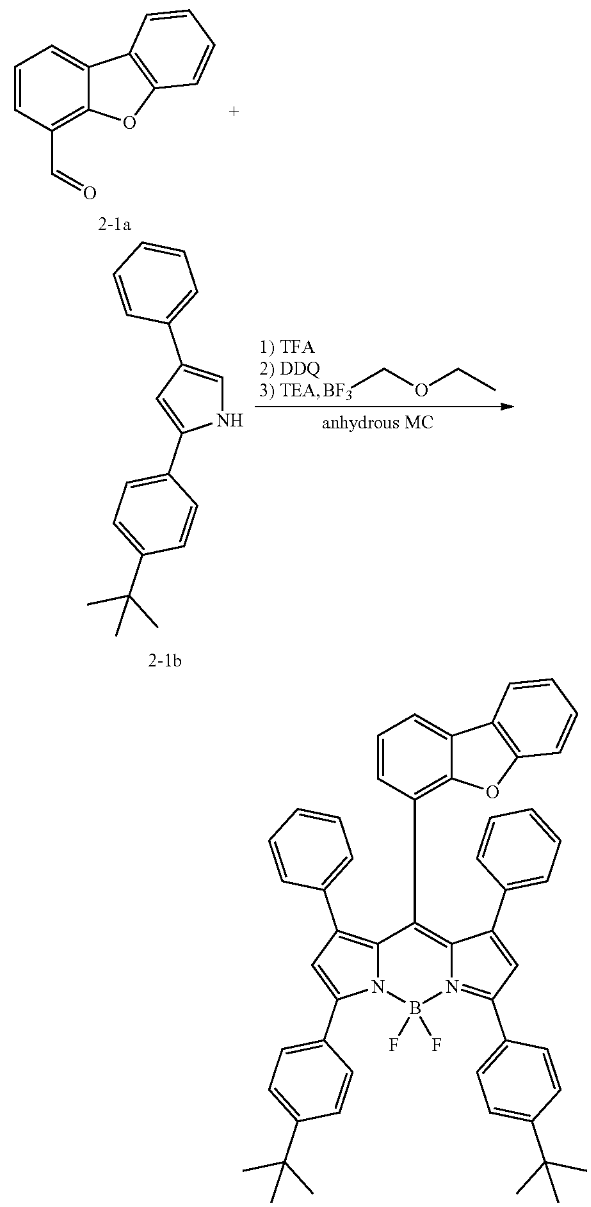

1 g (5.09 mmol, 1 equivalent) of Compound 2-1a and 2.2 equivalents of Compound 2-1b were introduced to an anhydrous methylene chloride solvent, and a catalyst amount of trifluoroacetic acid was added thereto while stirring. The reaction procedure was checked through thin layer chromatography (TLC) and after identifying the disappearance of 2-1a, the temperature was lowered to 0° C., and 1.1 equivalents of 2,3-dichloro-5,6-dicyanobenzoquinone (DDQ) was slowly added thereto. After the reaction was completed, DDQ was removed using a 0.1 M solution of sodium hydroxide. The solvent was removed through vacuum distillation, and then 4 equivalents of triethylamine and 6 equivalents of boron trifluoride diethyl ether were introduced thereto at 0° C. under an anhydrous methylene chloride solvent again. After the reaction was terminated, the result was extracted using water and a methylene chloride solvent, water was removed using anhydrous magnesium sulfate, and then the result was filtered using celite. The solvent was vacuum distilled and the result was recrystallized with a methanol solvent to obtain 2.5 g (yield 63%) of Compound 2-1.

HR LC/MS/MS m/z calculated for $C_{53}H_{45}BF_2N_2O$(M+): 774.3593; found: 774.3597.

Preparation Example 2. Preparation of Compound 4-9

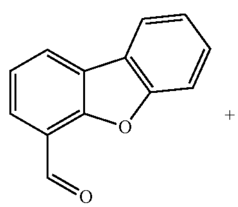

2-1a

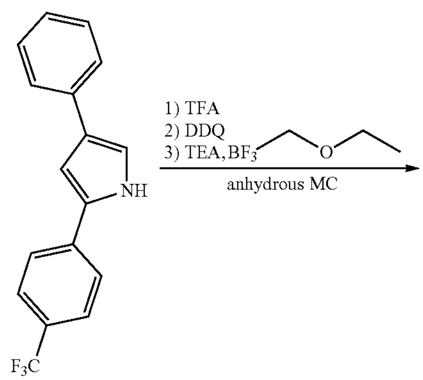

4-9a

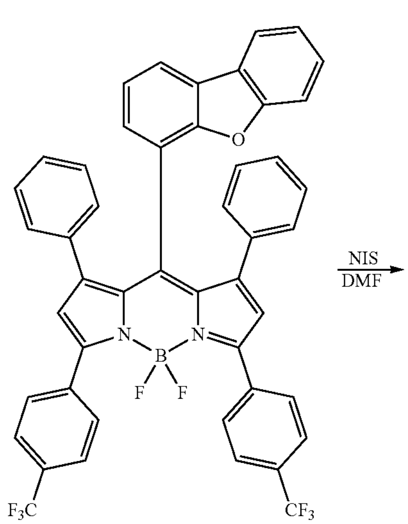

4-9b

-continued

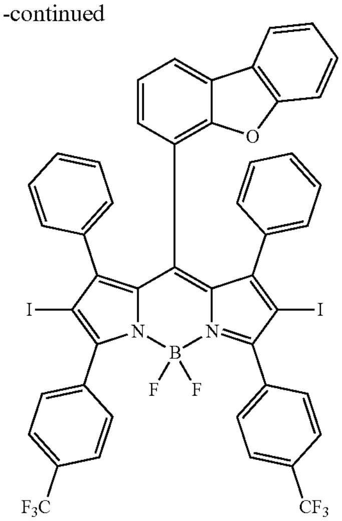

4-9c

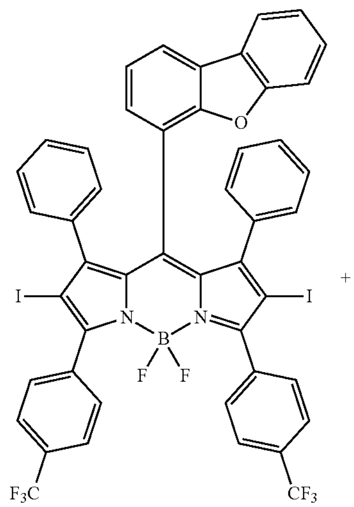

4-9c

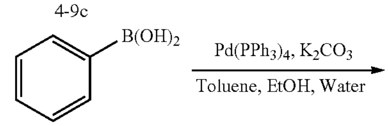

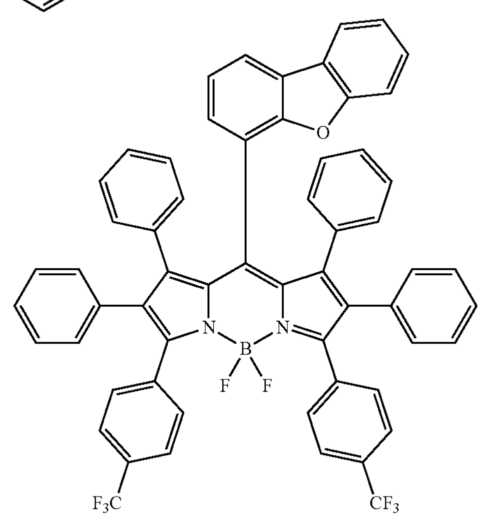

4-9

1) Preparation of Compound 4-9b

Preparation was carried out in the same manner as in Preparation Example 1 except that Compound 4-9 was used instead of Compound 2-1b.

2.4 g (60% yield) of Compound 4-9b was obtained.

2) Preparation of Compound 4-9c 2.4 g (3.00 mmol, 1 equivalent) of Compound 4-9b was introduced to a dimethylformamide solvent, and 3 equivalents of N-iodosuccinimide (NIS) was slowly added thereto while stirring, and the result was heated and stirred. After the reaction was terminated, the result was extracted with a sodium thiosulfate solution and a sodium bicarbonate solution, and water was removed using anhydrous magnesium sulfate. The result was filtered using silica gel, the solvent was removed through vacuum distillation, and the result was recrystallized using methanol to obtain 2.7 g (yield 87%) of Compound 4-9c.

3) Preparation of Compound 4-9

2.7 g (2.57 mmol, 1 equivalent) of Compound 4-9c and 2.2 equivalents of phenylboronic acid were stirred under toluene and ethanol solvents, and 3 equivalents of potassium carbonate dissolved in water was added thereto. The reaction was progressed using 0.03 equivalents of tetrakistriphenylphosphine as a catalyst. After the reaction was terminated, the result was cooled to room temperature, and the water layer and the organic layer were separated. The organic layer was extracted using water and chloroform, water was removed using anhydrous magnesium sulfate, and the result was filtered using celite. The solvent was removed through vacuum distillation, and the result was purified through a column. After the column purification, 2.2 g (yield 91%) of Compound 4-9 was obtained.

HR LC/MS/MS m/z calculated for $C_{59}H_{35}BF_8N_2O$ (M+): 950.2715; found: 950.2719.

Preparation Example 3. Preparation of Compound 7-1

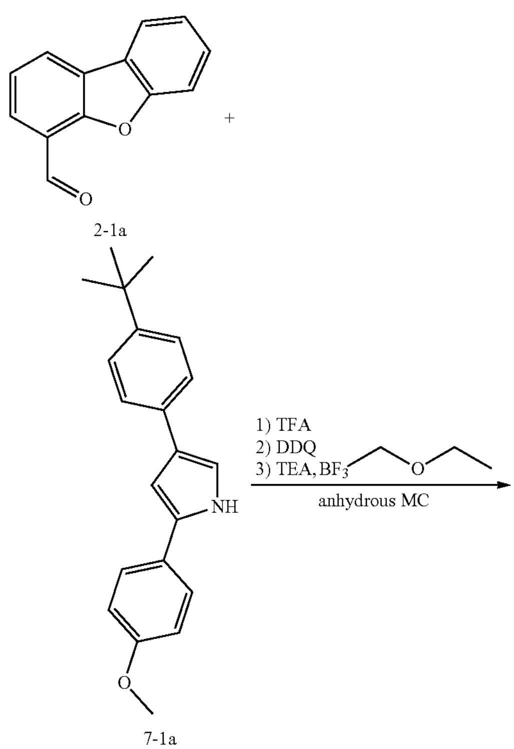

-continued

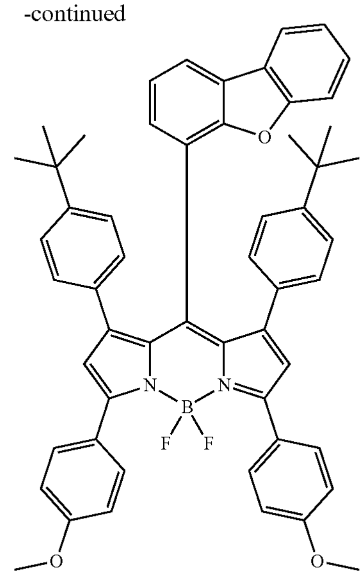

7-1

Preparation was carried out in the same manner as in Preparation Example 1 except that Compound 7-1a was used instead of Compound 2-1b. 2.5 g (yield 59%) of Compound 7-1 was obtained.

HR LC/MS/MS m/z calculated for $C_{55}H_{49}BF_2N_2O_3$ (M+): 834.3804; found: 834.3807.

Preparation Example 4. Preparation of Compound 8-1

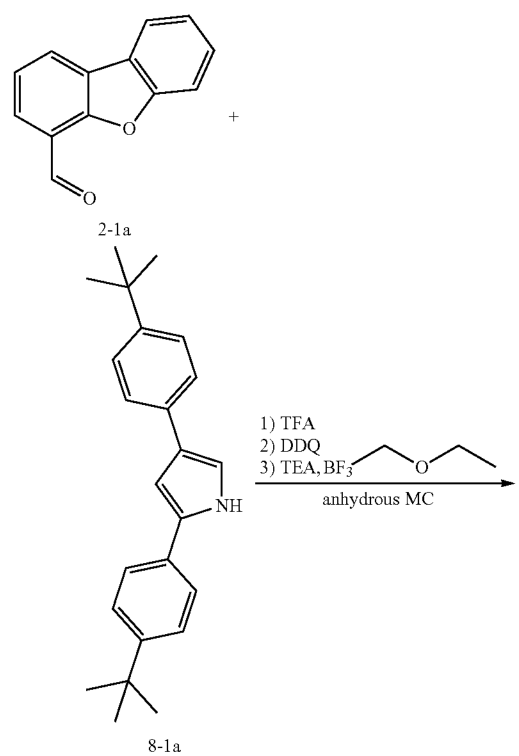

-continued
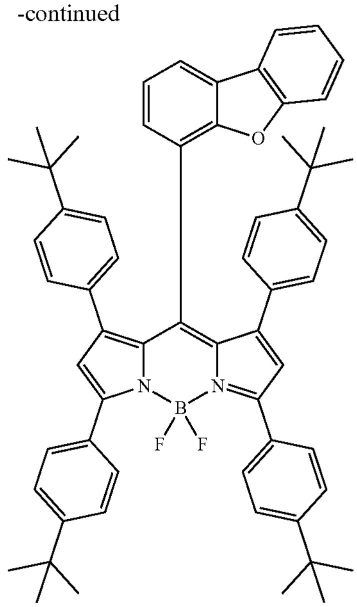
8-1
Preparation was carried out in the same manner as in Preparation Example 1 except that Compound 8-1a was used instead of Compound 2-1b. 2.9 g (yield 65%) of Compound 8-1 was obtained.
HR LC/MS/MS m/z calculated for $C_{61}H_{61}BF_2N_2O$ (M+): 886.4845; found: 886.4851.
Preparation Example 5. Preparation of Compound 9-19
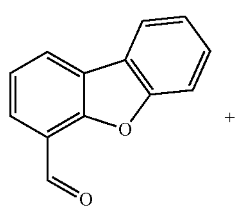
2-1a
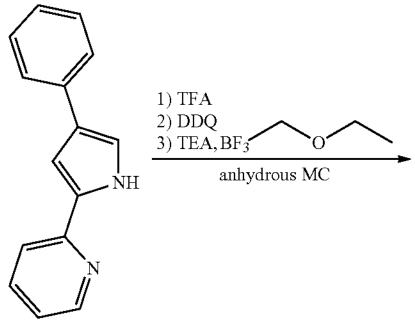
9-19a
-continued
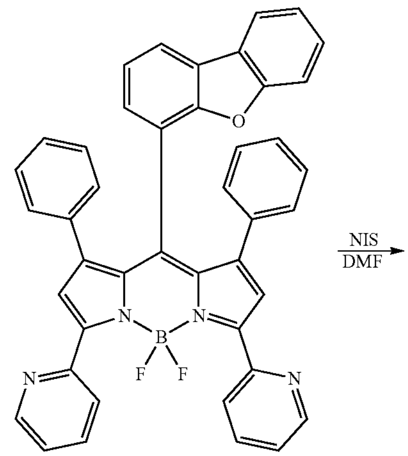
9-19b
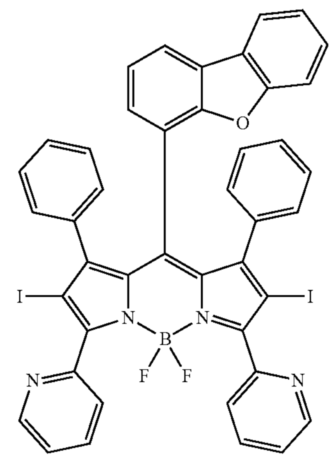
9-19c
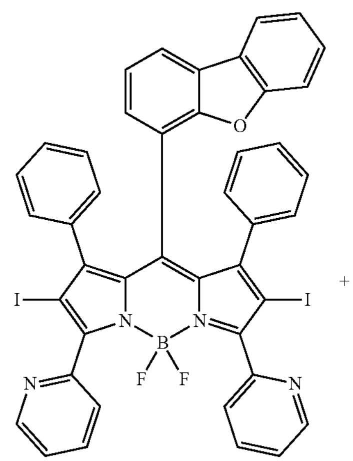
9-19c
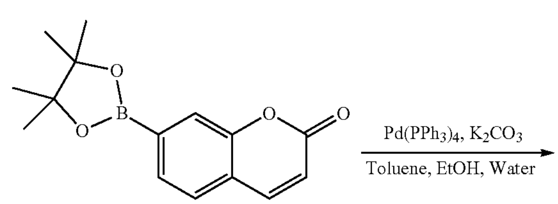
9-19d -continued

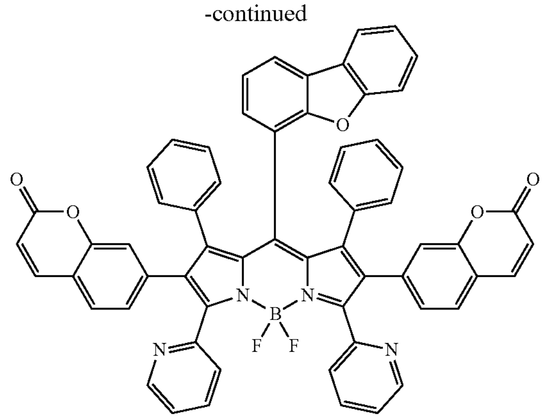

9-19

1) Preparation of Compound 9-19b

Preparation was carried out in the same manner as in Preparation Example 1 except that Compound 9-19a was used instead of Compound 2-1b. 2.9 g (yield 65%) of Compound 9-19b was obtained.

2) Preparation of Compound 9-19c

Preparation was carried out in the same manner as in 2) Preparation of Compound 4-9c of Preparation Example 2 except that Compound 9-19b was used instead of Compound 4-9b. 2.5 g (yield 85%) of Compound 9-19c was obtained.

3) Preparation of Compound 9-19

Preparation was carried out in the same manner as in 3) Preparation of Compound 4-9 of Preparation Example 2 except that Compound 9-19c was used instead of Compound 4-9c. 2.3 g (yield 89%) of Compound 9-19 was obtained.

HR LC/MS/MS m/z calculated for $C_{61}H_{35}BF_2N_4O_5$ (M+): 952.2669; found: 952.2680.

Preparation Example 6. Preparation of Compound 1-5

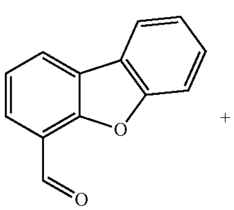

2-1a

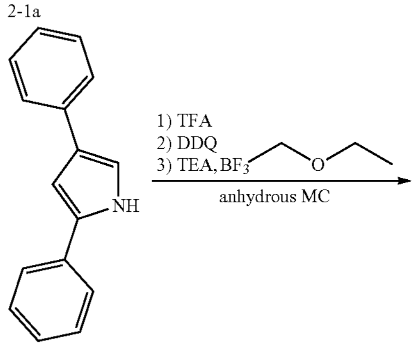

1-5a

-continued

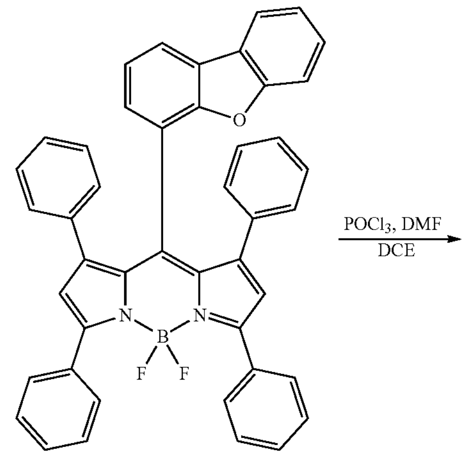

1-5b

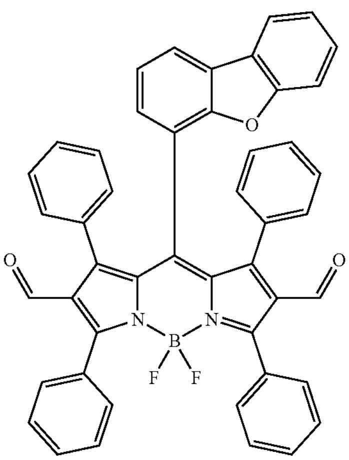

1-5c

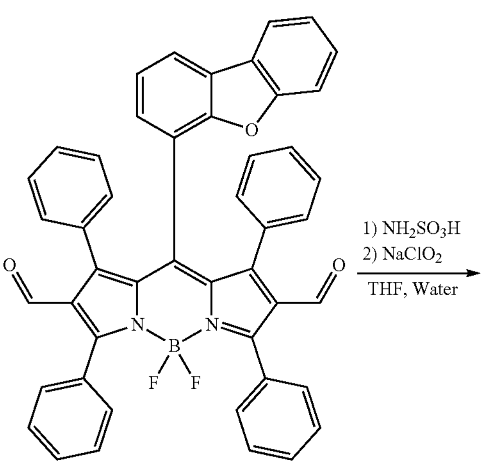

1-5c

-continued

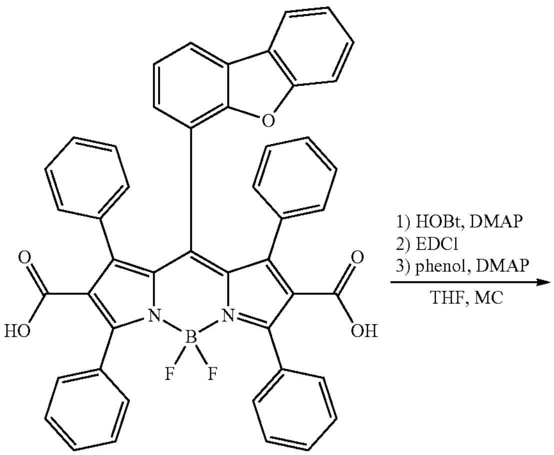

1-5d

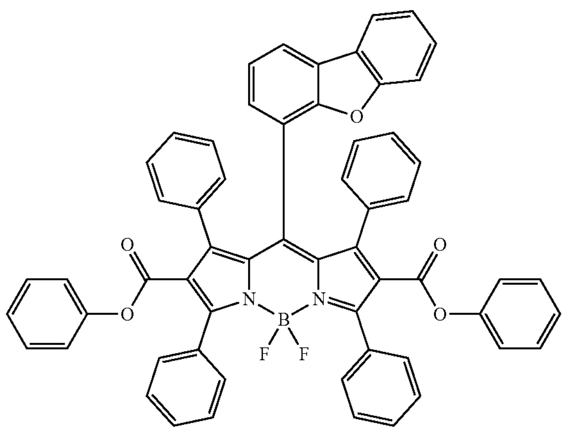

1-5

1) Preparation of Compound 1-5b

Preparation was carried out in the same manner as in Preparation Example 1, except that 3 g (1 equivalent) of Compound 2-1a was used and Compound 1-5a was used instead of Compound 2-1b. 6.5 g (yield 64%) of Compound 1-5b was obtained.

2) Preparation of Compound 1-5c 5 equivalents of $POCl_3$ and 5 equivalents of dimethylformamide (DMF) were introduced to a dichloroethane solvent under $N_2$ at 0° C., and the result was stirred for approximately 1 hour at room temperature. 6.5 g (1 equivalent) of Compound 1-5b was slowly added thereto, and the mixture was heated to approximately 70° C. and stirred. TLC was checked with the mixture washed with a sodium bicarbonate solution. After the reaction was terminated, the result was cooled to room temperature, and a sodium bicarbonate solution was added thereto until the pH indicated basic from neutral. After adjusting the pH, the result was extracted using water a chloroform solvent, water was removed from the organic layer using anhydrous magnesium sulfate, and the solvent was removed through vacuum distillation. After removing the solvent, the result was recrystallized using a small amount of methyl tertiary butyl ether solvent. 5.7 g (yield 82%) of Compound 1-5c was obtained.

3) Preparation of Compound 1-5d

After dissolving 5.7 g (1 equivalent) of Compound 1-5c in a tetrahydrofuran (THF) solvent and water with 3 equivalents of $NH_2SO_3H$, the result was stirred at room temperature. After approximately 30 minutes, 1.2 equivalents of sodium chloride was dissolved in water, and the result was added to the mixture at 0° C. The reaction was checked with TLC, and after the reaction was terminated, the result was washed with a sodium thiosulfate solvent and then extracted using chloroform. Water was removed from the organic layer using anhydrous magnesium sulfate, and the solvent was removed through vacuum distillation. The result was recrystallized using a hexane solvent to obtain 4.2 g (yield 72%) of Compound 1-5d.

4) Preparation of Compound 1-5

4.2 g (1 equivalent) of Compound 1-5d, 1.2 equivalents of HOBt and 2 equivalents of 4-dimethylaminopyridine (DMAP) were introduced to tetrahydrofuran (THF) and stirred, and 1.2 equivalents of 1-ethyl-3-(3-dimethylaminopropyl)carbodiimide (EDCI) dissolved in methylene chloride was added thereto. After identifying the disappearance of Compound 1-5d through TLC, 2 equivalents of phenol and 3 equivalents of DMAP were added thereto, and the result was heated and stirred. After the reaction was terminated, the result was washed using an ammonium chloride solution, and extracted using water and chloroform. Water was removed from the organic layer using anhydrous magnesium sulfate, and the solvent was removed through vacuum distillation. 3.5 g (yield 70%) of Compound 1-5 was obtained through column purification.

HR LC/MS/MS m/z calculated for $C_{57}H_{35}BF_2N_4O_5$ (M+): 904.2669; found: 904.2648.

Preparation Example 7. Preparation of Compound 13-1

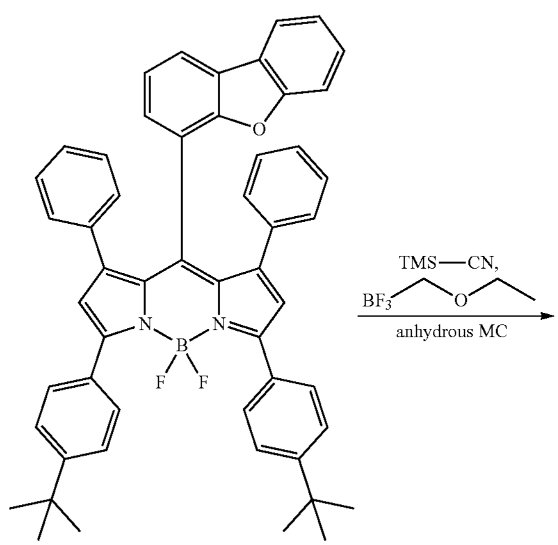

2-1

-continued

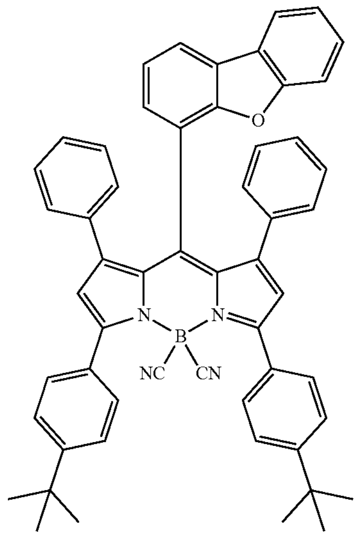

13-1

After dissolving 2 g (2.5 mmol, 1 equivalent) of Compound 2-1 in anhydrous methylene chloride, 10 equivalents of trimethylsilyl cyanide was added thereto under $N_2$ atmosphere, and then 2 equivalents of trifluoroboron ethyl ether was slowly added thereto. The reaction was checked through high-performance liquid chromatography (HPLC), and after the reaction was terminated, the result was washed with a sodium bicarbonate solution. The result was extracted with chloroform and water, and water was removed from the organic layer using anhydrous magnesium sulfate. The solvent was removed through vacuum distillation, and the result was recrystallized using a small amount of methanol solvent. 1.7 g (yield 84%) of Compound 13-1 was obtained.

HR LC/MS/MS m/z calculated for $C_{55}H_{45}BN_4O$ (M+): 788.3686; found: 788.3701.

Preparation Example 8. Preparation of Compound 23-1

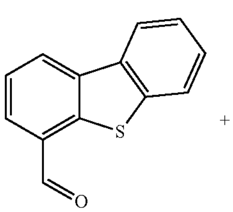

23-1a

-continued

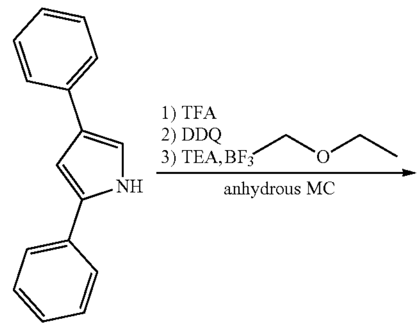

1-5a

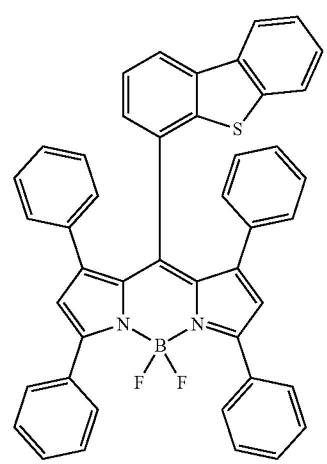

23-1

Preparation was carried out in the same manner as in Preparation Example 1, except that Compound 23-1a was used instead of Compound 2-1a and Compound 1-5a was used instead of Compound 2-1b. 1.9 g (yield 58%) of Compound 23-1 was obtained.

HR LC/MS/MS m/z calculated for $C_{47}H_{29}BN_4S$ (M+): 692.2206; found: 692.2224.

Preparation Example 9. Preparation of Compound 38-24
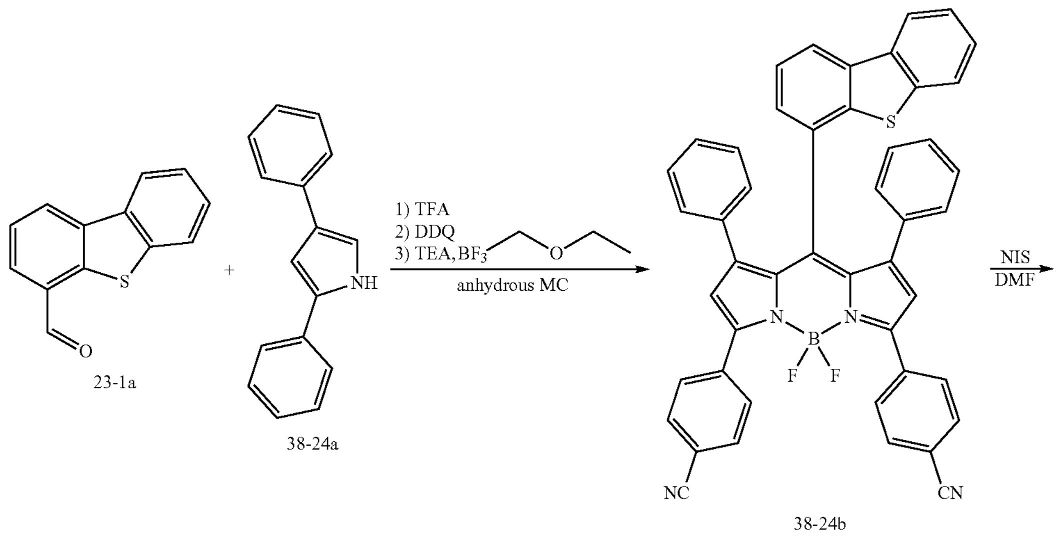
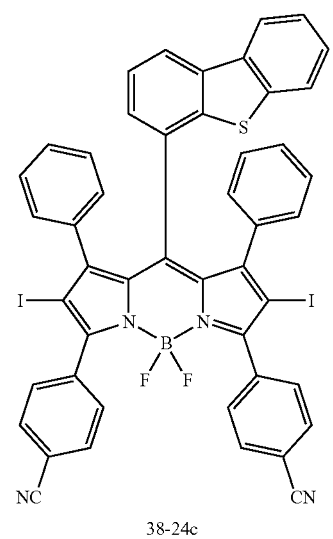
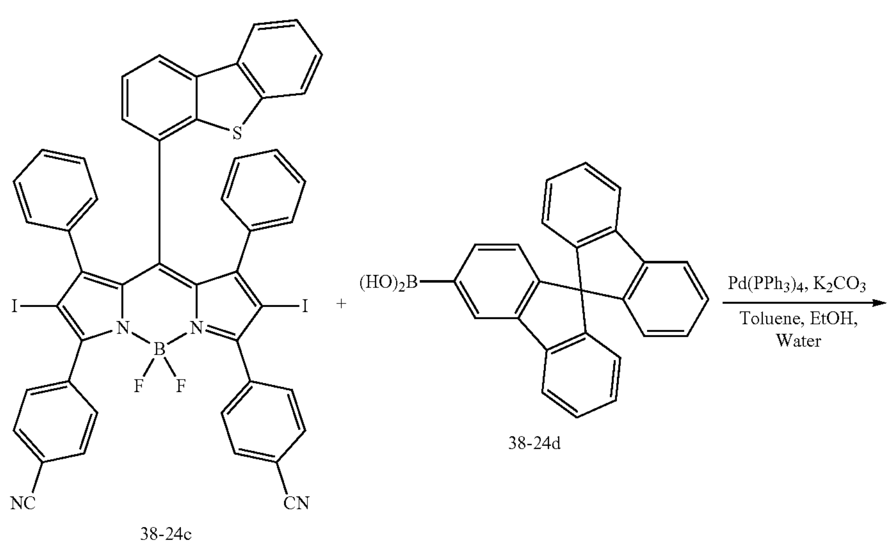

-continued
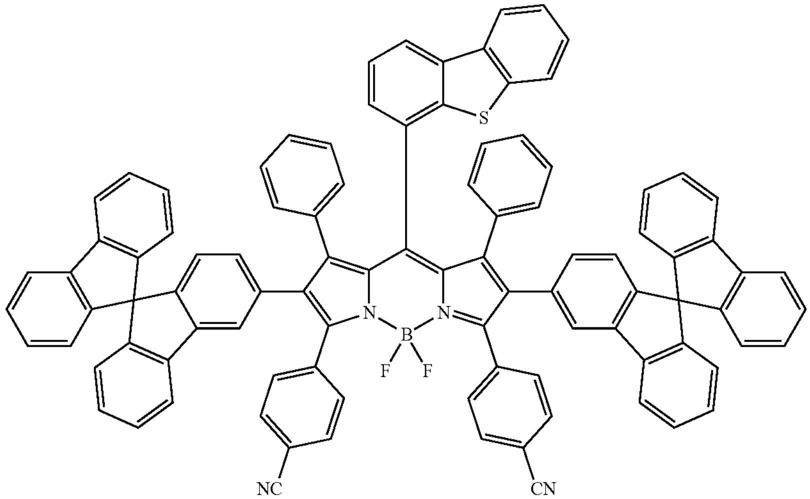
27-24
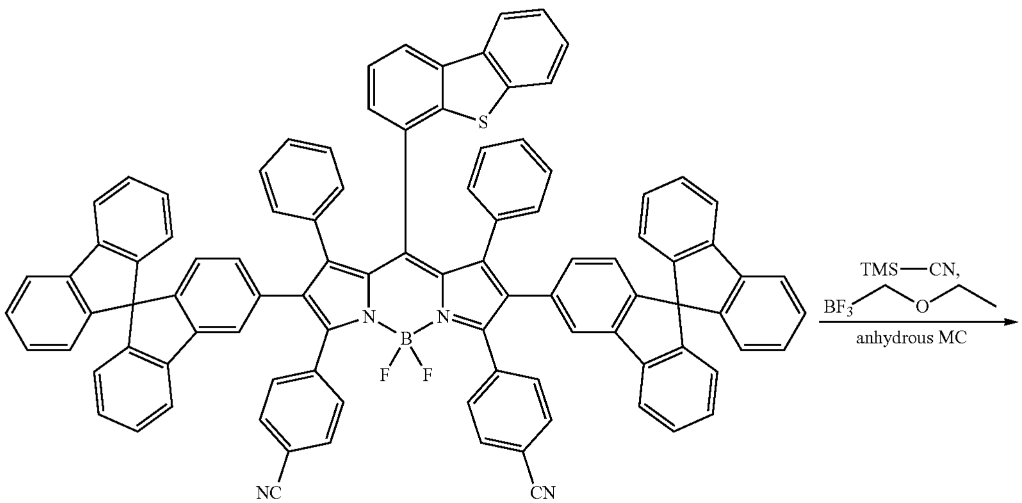
27-24
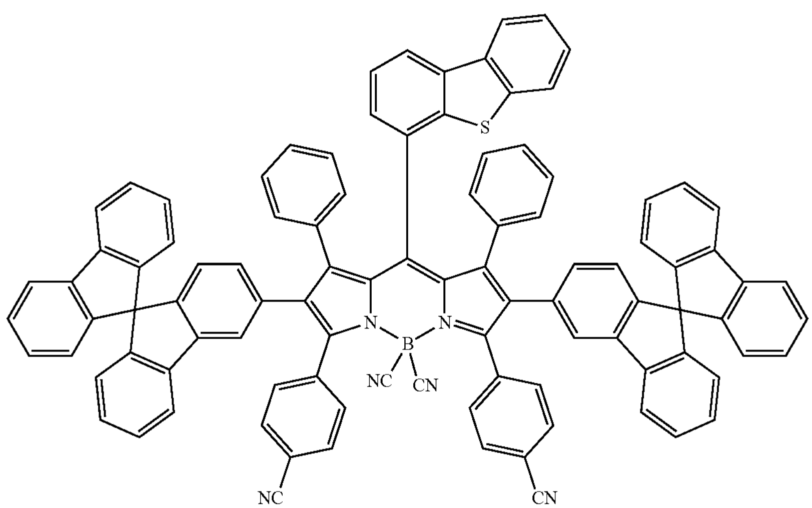
38-24

1) Preparation of Compound 38-24b

Preparation was carried out in the same manner as in Preparation Example 1, except that Compound 23-1a was used instead of Compound 2-1a and Compound 38-24a was used instead of Compound 2-1b. 2.1 g (yield 61%) of Compound 38-24b was obtained.

2) Preparation of Compound 38-24c

Preparation was carried out in the same manner as in 2) Preparation of Compound 4-9c of Preparation Example 2 except that Compound 38-24b was used instead of Compound 4-9b. 2 g (yield 75%) of Compound 38-24c was obtained.

3) Preparation of Compound 27-24

Preparation was carried out in the same manner as in 3) Preparation of Compound 4-9 of Preparation Example 2, except that Compound 38-24c was used instead of Compound 4-9c and Compound 38-24d was used instead of phenylboronic acid. 2.2 g (yield 81%) of Compound 27-24 was obtained.

4) Synthesis of Compound 38-24

Preparation was carried out in the same manner as in Preparation Example 7 except that Compound 27-24 was used instead of Compound 2-1. 1.7 g (yield 79%) of Compound 38-24 was obtained.

HR LC/MS/MS m/z calculated for $C_{99}H_{55}BN_6S$ (M+): 1370.4302; found: 1370.4318.

Preparation Example 10. Preparation of Compound 50-13

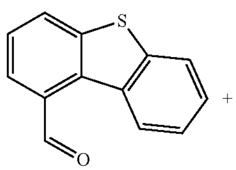

50-13a

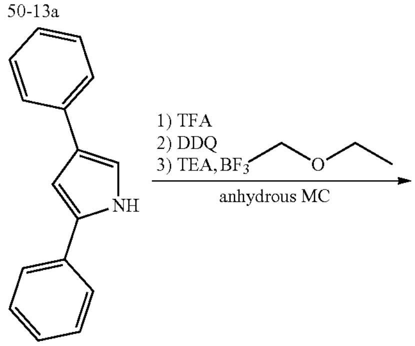

38-24a

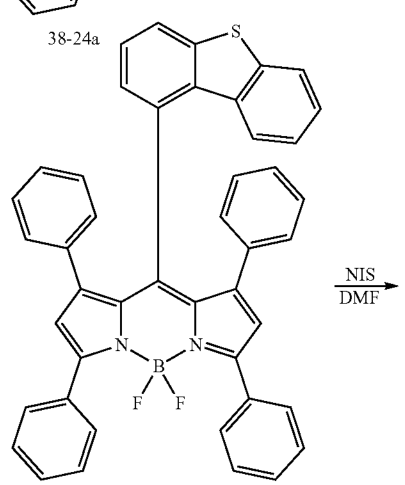

50-13b

-continued

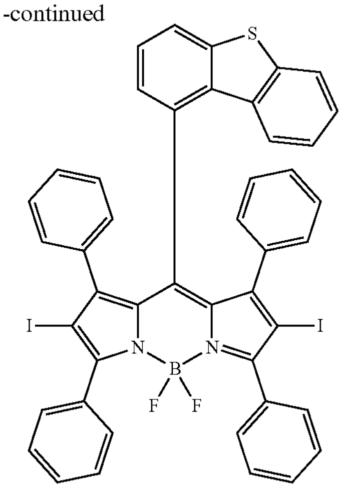

50-13c

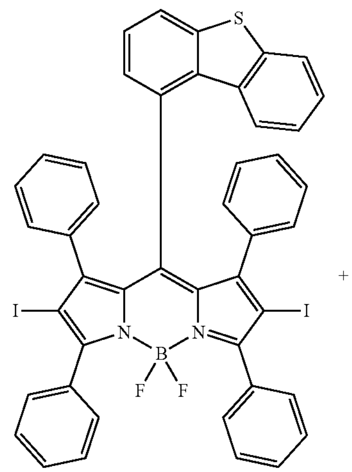

50-13c

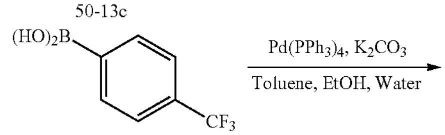

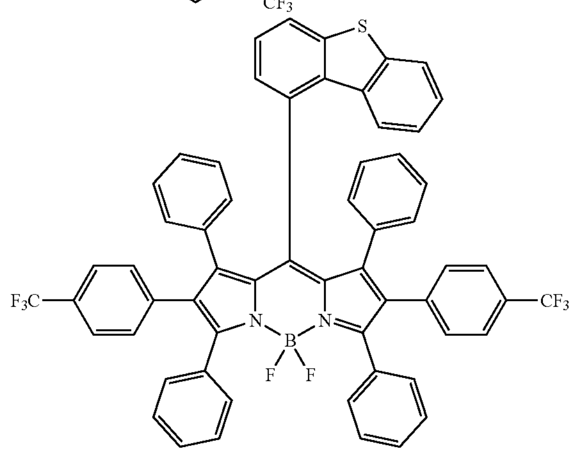

50-13

1) Preparation of Compound 50-13b

Preparation was carried out in the same manner as in Preparation Example 1, except that Compound 50-13a was used instead of Compound 2-1a and Compound 38-24a was used instead of Compound 2-1b. 2.0 g (yield 64%) of Compound 50-13b was obtained.

2) Preparation of Compound 50-13c

Preparation was carried out in the same manner as in 2) Preparation of Compound 4-9c of Preparation Example 2 except that Compound 50-13b was used instead of Compound 4-9b. 2.2 g (yield 83%) of Compound 50-13c was obtained.

3) Preparation of Compound 50-13

Preparation was carried out in the same manner as in 3) Preparation of Compound 4-9 of Preparation Example 2, except that Compound 50-13c was used instead of Compound 4-9c and 4-trifluoromethyl phenylboronic acid was used instead of phenylboronic acid. 2 g (yield 91%) of Compound 50-13 was obtained.

HR LC/MS/MS m/z calculated for $C_{53}H_{35}BF_8N_2S$ (M+): 966.2486; found: 966.2503.

Preparation Example 11. Preparation of Compound 51-2

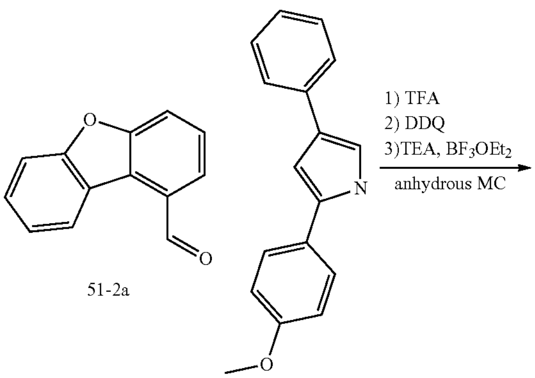

51-2a 51-2b

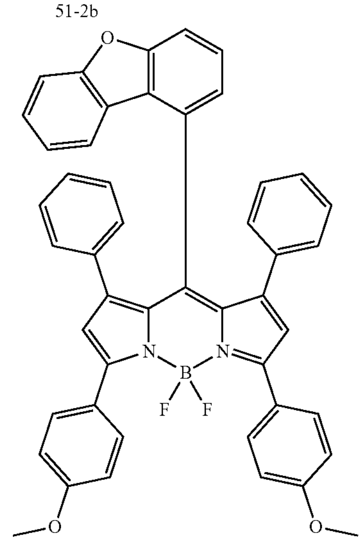

51-2

Preparation was carried out in the same manner as in Preparation Example 1, except that Compound 51-2a was used instead of Compound 2-1a and Compound 51-2b was used instead of Compound 2-1b. 5.1 g (yield 69%) of Compound 51-2 was obtained.

HR LC/MS/MS m/z calculated for $C_{47}H_{33}BF_2N_2O_3$ (M+): 722.5988; found: 722.5985.

Preparation Example 12. Preparation of Compound 52-1

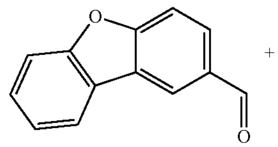

52-1a

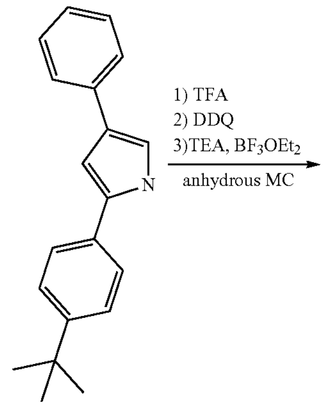

2-1b

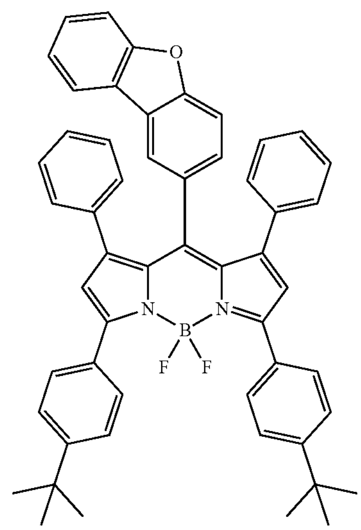

52-1

Preparation was carried out in the same manner as in Preparation Example 1 except that Compound 51-2a was used instead of Compound 2-1a. 5.7 g (yield 72%) of Compound 52-1 was obtained.

HR LC/MS/MS m/z calculated for $C_{53}H_{45}BF_2N_2O$ (M+): 774.7628; found: 774.7632.

Example 1

A first solution was prepared by dissolving Compound 2-1 prepared in Preparation Example 1 (maximum absorption wavelength 581 nm, maximum light emission wavelength 617 nm and full width at half maximum 36 nm in toluene solution) in a xylene solvent.

A second solution was prepared by dissolving a thermoplastic resin SAN (styrene-acrylonitrile-based) in a xylene solvent. The first solution and the second solution were mixed so that the amount of the organic fluorescent substance was 0.5 parts by weight based on 100 parts by weight of the SAN, and the result was uniformly mixed. The solid content in the mixed solution was 20% by weight and viscosity was 200 cps. This solution was coated on a PET substrate, and the result was dried to prepare a color conversion film.

A luminance spectrum of the prepared color conversion film was measured using a spectroradiometer (SR series of TOPCON Corporation). Specifically, the prepared color conversion film was laminated on one surface of a light guide plate of a backlight unit including a LED blue backlight (maximum light emission wavelength 450 nm) and the light guide plate, and after laminating a prism sheet and a DBEF film on the color conversion film, a luminance spectrum of the film was measured. When measuring the luminance spectrum, an initial value was set so that the brightness of the blue LED light was 600 nit based on without the color conversion film.

Example 2

An experiment was carried out in the same manner as in Example 1 except that Compound 4-9 (maximum absorption wavelength 574 nm, maximum light emission wavelength 607 nm and full width at half maximum 41 nm in toluene solution) was used instead of Compound 2-1.

Example 3

An experiment was carried out in the same manner as in Example 1 except that Compound 7-1 (maximum absorption wavelength 595 nm, maximum light emission wavelength 630 nm and full width at half maximum 39 nm in toluene solution) was used instead of Compound 2-1.

Example 4

An experiment was carried out in the same manner as in Example 1 except that Compound 8-1 (maximum absorption wavelength 587 nm, maximum light emission wavelength 623 nm and full width at half maximum 39 nm in toluene solution) was used instead of Compound 2-1.

Example 5

An experiment was carried out in the same manner as in Example 1 except that Compound 9-19 (maximum absorption wavelength 589 nm, maximum light emission wavelength 625 nm and full width at half maximum 40 nm in toluene solution) was used instead of Compound 2-1.

Example 6

An experiment was carried out in the same manner as in Example 1 except that Compound 1-5 (maximum absorption wavelength 578 nm, maximum light emission wavelength 611 nm and full width at half maximum 41 nm in toluene solution) was used instead of Compound 2-1.

Example 7

An experiment was carried out in the same manner as in Example 1 except that Compound 13-1 (maximum absorption wavelength 580 nm, maximum light emission wavelength 615 nm and full width at half maximum 37 nm in toluene solution) was used instead of Compound 2-1.

Example 8

An experiment was carried out in the same manner as in Example 1 except that Compound 23-1 (maximum absorption wavelength 579 nm, maximum light emission wavelength 620 nm and full width at half maximum 37 nm in toluene solution) was used instead of Compound 2-1.

Example 9

An experiment was carried out in the same manner as in Example 1 except that Compound 38-24 (maximum absorption wavelength 597 nm, maximum light emission wavelength 639 nm and full width at half maximum 42 nm in toluene solution) was used instead of Compound 2-1.

Example 10

An experiment was carried out in the same manner as in Example 1 except that Compound 50-13 (maximum absorption wavelength 584 nm, maximum light emission wavelength 624 nm and full width at half maximum 40 nm in toluene solution) was used instead of Compound 2-1.

Example 11

An experiment was carried out in the same manner as in Example 1 except that Compound 51-2 (maximum absorption wavelength 586 nm, maximum light emission wavelength 623 nm and full width at half maximum 37 nm in toluene solution) was used instead of Compound 2-1.

Example 12

An experiment was carried out in the same manner as in Example 1 except that Compound 52-1 (maximum absorption wavelength 574 nm, maximum light emission wavelength 610 nm and full width at half maximum 34 nm in toluene solution) was used instead of Compound 2-1.

Comparative Example 1

An experiment was carried out in the same manner as in Example 1 except that pPhBODIPY having the following structural formula (maximum absorption wavelength 570 nm, maximum light emission wavelength 613 nm and full width at half maximum 42 nm in toluene solution) was used instead of Compound 2-1.

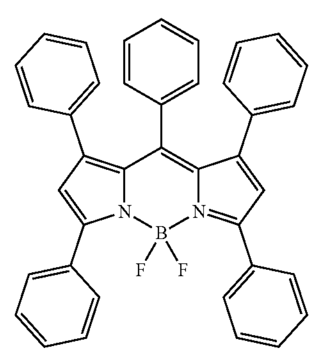

pPhBODIPY

Properties of light emission obtained from irradiating light having a light emission peak at 450 nm, a full width at half maximum of 40 nm or less, and having monomodal light emission intensity distribution on the color conversion films obtained in Examples 1 to 12 and Comparative Example 1 are shown in the following Table 1. As shown in the following Table 1, Comparative Example 1 had lower quantum efficiency (QY) compared to Examples 1 to 12, and absorption intensity (Abs intensity) measured after 1000 hours greatly decreased in Comparative Example 1.

Accordingly, Examples 1 to 12 had high light emission efficiency and superior stability compared to Comparative Example 1.

TABLE 1

| | | Film Light Emission Wavelength | | | |
|---|---|---|---|---|---|
| | Compound | □$\lambda_{max}$ (nm) | Full Width at Falf Maximum (nm) | Quantum Efficiency (QY) (%) | Abs Intensity (1000 hr, %) |
| Example 1 | 2-1 | 635 | 43 | 81 | 97.3 |
| Example 2 | 4-9 | 630 | 50 | 80 | 96.2 |
| Example 3 | 7-1 | 653 | 48 | 81 | 99.4 |
| Example 4 | 8-1 | 645 | 48 | 81 | 98.9 |
| Example 5 | 9-19 | 648 | 53 | 78 | 98.2 |
| Example 6 | 1-5 | 632 | 56 | 79 | 97.5 |
| Example 7 | 13-1 | 637 | 45 | 79 | 98.5 |
| Example 8 | 23-1 | 643 | 47 | 78 | 96.4 |
| Example 9 | 38-24 | 660 | 59 | 80 | 97.6 |
| Example 10 | 50-13 | 646 | 56 | 78 | 96.7 |
| Example 11 | 51-2 | 642 | 43 | 80 | 98.9 |
| Example 12 | 52-1 | 627 | 42 | 81 | 99.5 |
| Comparative Example 1 | pPhBODIPY | 605 | 58 | 75 | 93.0 |

The invention claimed is:

1. A compound represented by the following Chemical Formula 1:

[Chemical Formula 1]

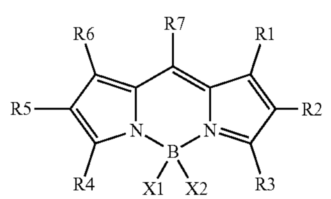

wherein, in Chemical Formula 1,

X1 and X2 are the same as or different from each other, and each independently a halogen group; a nitrile group; a substituted or unsubstituted alkyl group; or a substituted or unsubstituted alkoxy group;

R1, R3, R4 and R6 are the same as or different from each other, and each independently a substituted or unsubstituted aryl group; or a substituted or unsubstituted heteroaryl group;

R2 and R5 are the same as or different from each other, and each independently hydrogen; deuterium; halogen; a nitrile group; a nitro group; a hydroxyl group; a carboxyl group (—COOH); an ether group; an ester group; an imide group; an amide group; a substituted or unsubstituted alkyl group; a substituted or unsubstituted cycloalkyl group; a substituted or unsubstituted alkoxy group; a substituted or unsubstituted aryloxy group; a substituted or unsubstituted alkylthioxy group; a substituted or unsubstituted arylthioxy group; a substituted or unsubstituted alkylsulfoxy group; a substituted or unsubstituted arylsulfoxy group; a substituted or unsubstituted alkenyl group; a substituted or unsubstituted silyl group; a substituted or unsubstituted boron group; a substituted or unsubstituted amine group; a substituted or unsubstituted arylphosphine group; a substituted or unsubstituted phosphine oxide group; a substituted or unsubstituted coumarin group; a substituted or unsubstituted monocyclic or dicyclic aryl group; a substituted or unsubstituted anthracenyl group; a substituted or unsubstituted phenanthrenyl group; a substituted or unsubstituted phenalenyl group; a substituted or unsubstituted tetracyclic or more aryl group; a substituted or unsubstituted monocyclic or dicyclic heteroaryl group; or a substituted or unsubstituted tetracyclic or more heteroaryl group;

R7 is a group represented by the following Chemical Formula 2;

[Chemical Formula 2]

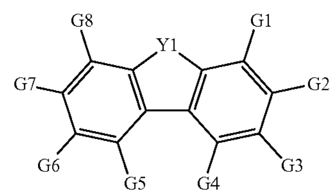

in Chemical Formula 2,

Y1 is O or S;

any one of G1 to G8 is a site bonding to Chemical Formula 1, and the rest are the same as or different from each other and each independently hydrogen; deuterium; halogen; a nitrile group; a nitro group; a hydroxyl group; a carboxyl group (—COOH); an ether group; an ester group; an imide group; an amide group; a substituted or unsubstituted alkyl group; a substituted or unsubstituted cycloalkyl group; a substituted or unsubstituted alkoxy group; a substituted or unsubstituted aryloxy group; a substituted or unsubstituted alkylthioxy group; a substituted or unsubstituted arylthioxy group; a substituted or unsubstituted alkylsulfoxy group; a substituted or unsubstituted arylsulfoxy group; a substituted or unsubstituted alkenyl group; a substituted or unsubstituted silyl group; a substituted or unsubstituted boron group; a substituted or unsubstituted amine group; a substituted or unsubstituted arylphosphine group; a substituted or unsubstituted phosphine oxide group; a substituted or unsubstituted aryl group; or a substituted or unsubstituted heteroaryl group, or adjacent groups bond to each other to form a ring substituted with R';

when adjacent groups among G1 to G8 bond to each other to form a ring substituted with R', any one of groups among G1 to G8 not forming the ring by the adjacent groups bonding to each other and R' is a site bonding to Chemical Formula 1; and R' is hydrogen; deuterium; halogen; a nitrile group; a nitro group; a hydroxyl group; a carboxyl group (—COOH); an ether group; an ester group; an imide group; an amide group; a substituted or unsubstituted alkyl group; a substituted or unsubstituted cycloalkyl group;

a substituted or unsubstituted alkoxy group; a substituted or unsubstituted aryloxy group; a substituted or unsubstituted alkylthioxy group; a substituted or unsubstituted arylthioxy group; a substituted or unsubstituted alkylsulfoxy group; a substituted or unsubstituted arylsulfoxy group; a substituted or unsubstituted alkenyl group; a substituted or unsubstituted silyl group; a substituted or unsubstituted boron group; a substituted or unsubstituted amine group; a substituted or unsubstituted arylphosphine group; a substituted or unsubstituted phosphine oxide group; a substituted or unsubstituted aryl group; or a substituted or unsubstituted heteroaryl group.

2. The compound of claim 1, wherein Chemical Formula 2 is represented by any one of the following Chemical Formulae 2-1 to 2-3:

[Chemical Formula 2-1]

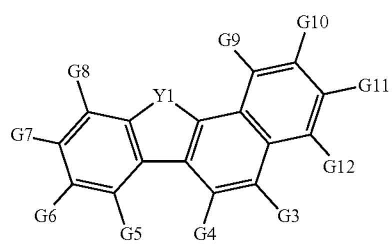

wherein, in Chemical Formula 2-1,

Y1 has the same definition as in Chemical Formula 2;

any one of G3 to G12 is a site bonding to Chemical Formula 1, and the rest are the same as or different from each other and each independently hydrogen; deuterium; halogen; a nitrile group; a nitro group; a hydroxyl group; a carboxyl group (—COOH); an ether group; an ester group; an imide group; an amide group; a substituted or unsubstituted alkyl group; a substituted or unsubstituted cycloalkyl group; a substituted or unsubstituted alkoxy group; a substituted or unsubstituted aryloxy group; a substituted or unsubstituted alkylthioxy group; a substituted or unsubstituted arylthioxy group; a substituted or unsubstituted alkylsulfoxy group; a substituted or unsubstituted arylsulfoxy group; a substituted or unsubstituted alkenyl group; a substituted or unsubstituted silyl group; a substituted or unsubstituted boron group; a substituted or unsubstituted amine group; a substituted or unsubstituted arylphosphine group; a substituted or unsubstituted phosphine oxide group; a substituted or unsubstituted aryl group; or a substituted or unsubstituted heteroaryl group;

[Chemical Formula 2-2]

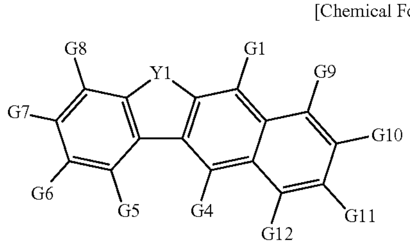

in Chemical Formula 2-2,

Y1 has the same definition as in Chemical Formula 2;

any one of G1 and G4 to G12 is a site bonding to Chemical Formula 1, and the rest are the same as or different from each other and each independently hydrogen; deuterium; halogen; a nitrile group; a nitro group; a hydroxyl group; a carboxyl group (—COOH); an ether group; an ester group; an imide group; an amide group; a substituted or unsubstituted alkyl group; a substituted or unsubstituted cycloalkyl group; a substituted or unsubstituted alkoxy group; a substituted or unsubstituted aryloxy group; a substituted or unsubstituted alkylthioxy group; a substituted or unsubstituted arylthioxy group; a substituted or unsubstituted alkylsulfoxy group; a substituted or unsubstituted arylsulfoxy group; a substituted or unsubstituted alkenyl group; a substituted or unsubstituted silyl group; a substituted or unsubstituted boron group; a substituted or unsubstituted amine group; a substituted or unsubstituted arylphosphine group; a substituted or unsubstituted phosphine oxide group; a substituted or unsubstituted aryl group; or a substituted or unsubstituted heteroaryl group;

[Chemical Formula 2-3]

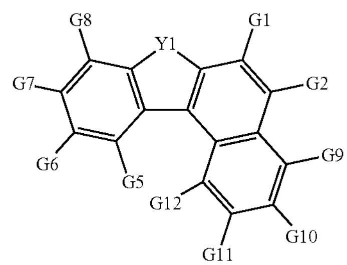

in Chemical Formula 2-3,

Y1 has the same definition as in Chemical Formula 2; and any one of G1, G2 and G5 to G12 is a site bonding to Chemical Formula 1, and the rest are the same as or different from each other and each independently hydrogen; deuterium; halogen; a nitrile group; a nitro group; a hydroxyl group; a carboxyl group (—COOH); an ether group; an ester group; an imide group; an amide group; a substituted or unsubstituted alkyl group; a substituted or unsubstituted cycloalkyl group; a substituted or unsubstituted alkoxy group; a substituted or unsubstituted aryloxy group; a substituted or unsubstituted alkylthioxy group; a substituted or unsubstituted arylthioxy group; a substituted or unsubstituted alkylsulfoxy group; a substituted or unsubstituted arylsulfoxy group; a substituted or unsubstituted alkenyl group; a substituted or unsubstituted silyl group; a substituted or unsubstituted boron group; a substituted or unsubstituted amine group; a substituted or unsubstituted arylphosphine group; a substituted or unsubstituted phosphine oxide group; a substituted or unsubstituted aryl group; or a substituted or unsubstituted heteroaryl group.

3. The compound of claim 1, wherein Chemical Formula 1 is represented by any one of the following Chemical Formulae 1-1 to 1-4:

[Chemical Formula 1-1]

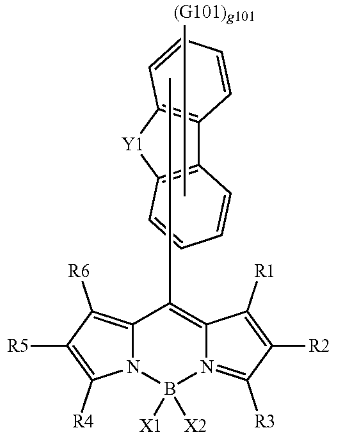

[Chemical Formula 1-2]

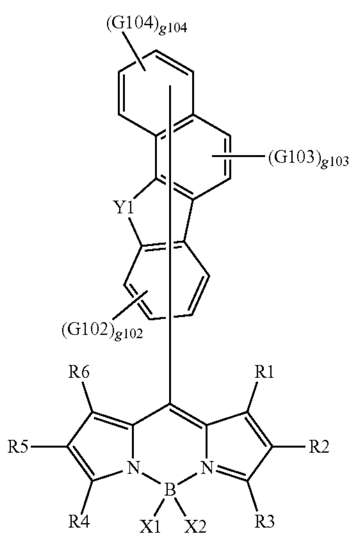

[Chemical Formula 1-3]

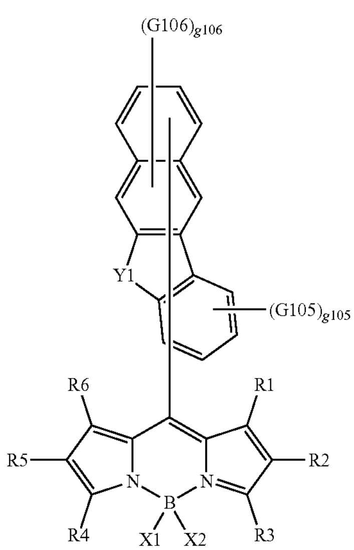

-continued

[Chemical Formula 1-4]

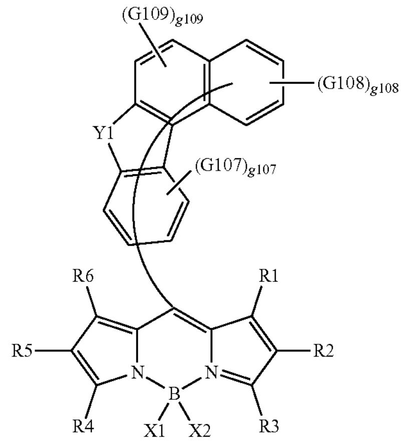

wherein, in Chemical Formulae 1-1 to 1-4,

R1 to R6, and X1 and X2 have the same definitions as in Chemical Formula 1;

Y1 has the same definition as in Chemical Formula 2;

G101 to G109 are the same as or different from each other, and each independently hydrogen; deuterium; halogen; a nitrile group; a nitro group; a hydroxyl group; a carboxyl group (—COOH); an ether group; an ester group; an imide group; an amide group; a substituted or unsubstituted alkyl group; a substituted or unsubstituted cycloalkyl group; a substituted or unsubstituted alkoxy group; a substituted or unsubstituted aryloxy group; a substituted or unsubstituted alkylthioxy group; a substituted or unsubstituted arylthioxy group; a substituted or unsubstituted alkylsulfoxy group; a substituted or unsubstituted arylsulfoxy group; a substituted or unsubstituted alkenyl group; a substituted or unsubstituted silyl group; a substituted or unsubstituted boron group; a substituted or unsubstituted amine group; a substituted or unsubstituted arylphosphine group; a substituted or unsubstituted phosphine oxide group; a substituted or unsubstituted aryl group; or a substituted or unsubstituted heteroaryl group;

g101 is an integer of 1 to 7;

g102, g104, g105, g107 and g108 are each an integer of 1 to 4;

g103 and g109 are each 1 or 2;

g106 is an integer of 1 to 6;

$$3 \leq g102+g103+g104 \leq 9;$$

$$2 \leq g105+g106 \leq 9;$$

$$3 \leq g107+g108+g109 \leq 9; \text{ and}$$

when g101 to g109 are each a multiple number, structures in the parentheses are the same as or different from each other.

4. The compound of claim 1, wherein R2 and R5 are the same as or different from each other, and each independently hydrogen; a halogen group; a nitrile group; an ester group; an alkylsulfoxy group; a substituted or unsubstituted alkyl group; a substituted or unsubstituted coumarin group; a substituted or unsubstituted monocyclic or dicyclic aryl group; a substituted or unsubstituted phenanthrenyl group; a substituted or unsubstituted tetracyclic or more aryl group; or a substituted or unsubstituted monocyclic or dicyclic heteroaryl group.

5. The compound of claim 1, which has a maximum light emission peak present in 610 nm to 660 nm in a film state.

6. The compound of claim 1, which has a maximum light emission peak present in 610 nm to 660 nm in a film state, and the light emission peak has a full width at half maximum of 60 nm or less.

7. The compound of claim 1, which has quantum efficiency of 0.76 or greater.

8. The compound of claim 1, wherein Chemical Formula 1 is selected from among the following compounds:

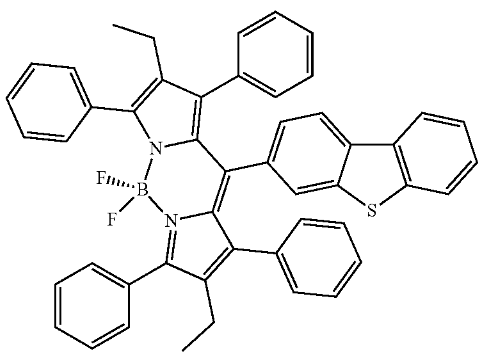

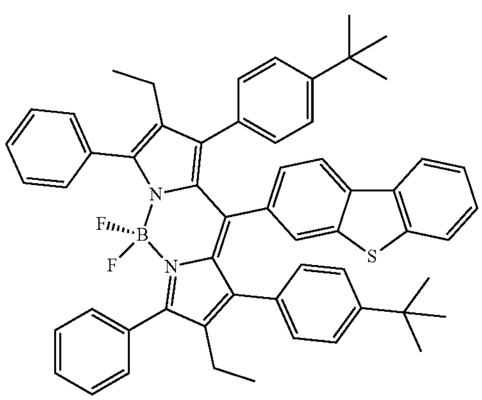

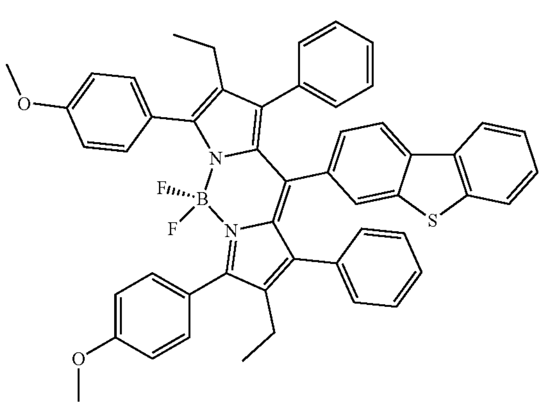

-continued

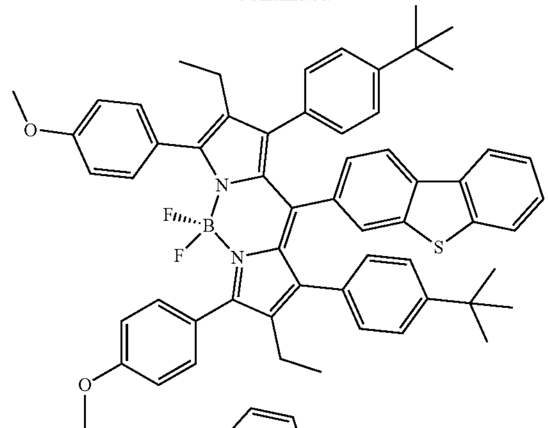

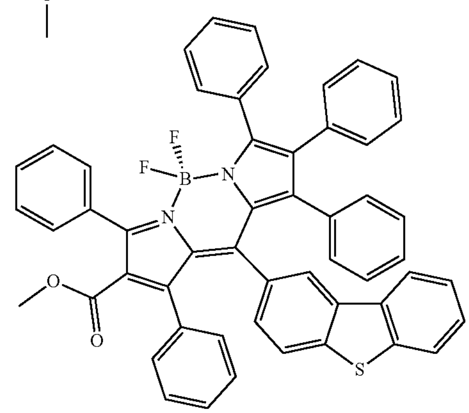

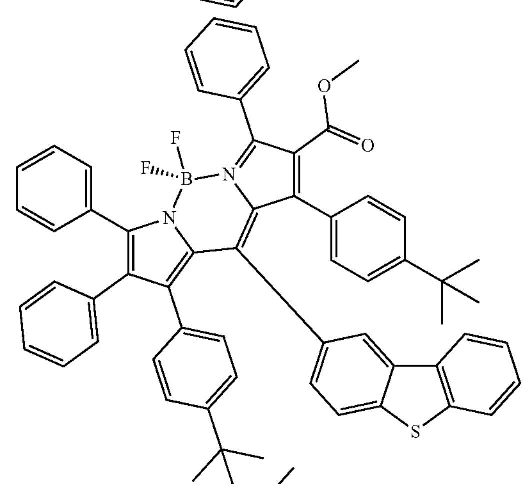

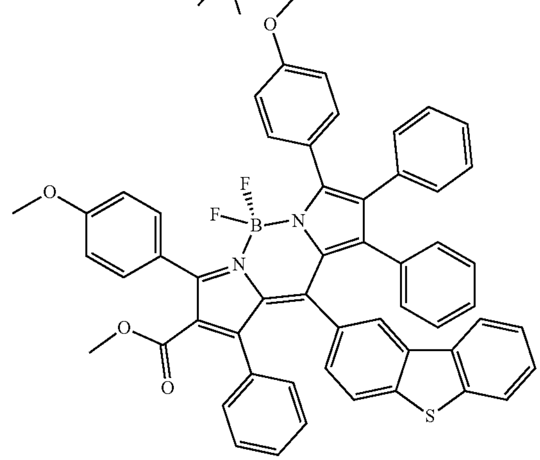

-continued
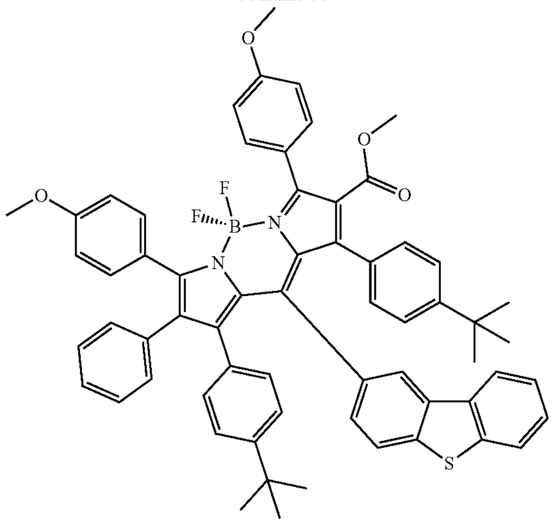
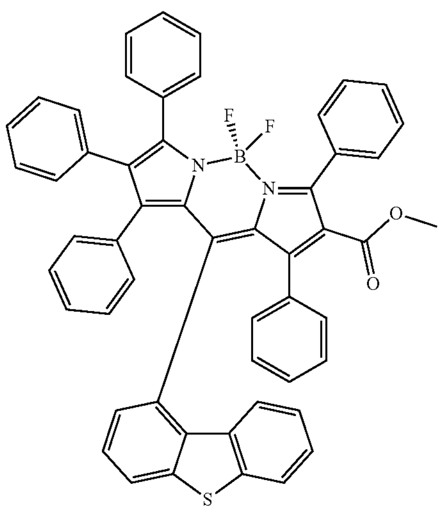
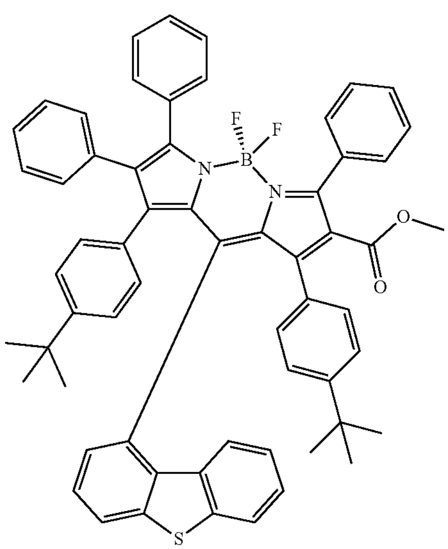
-continued
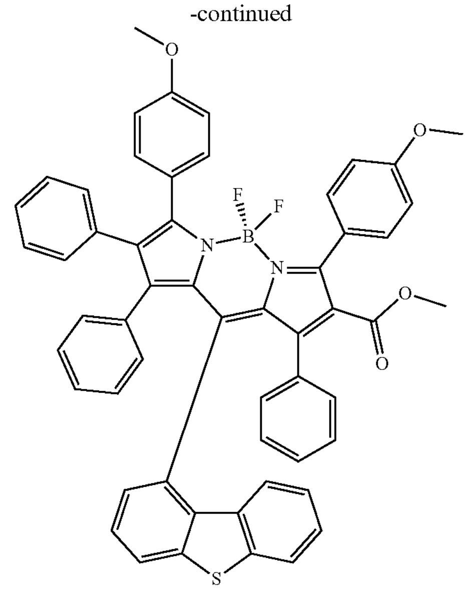
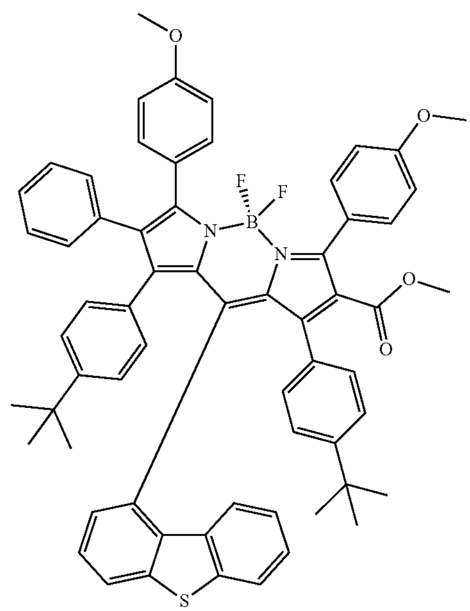
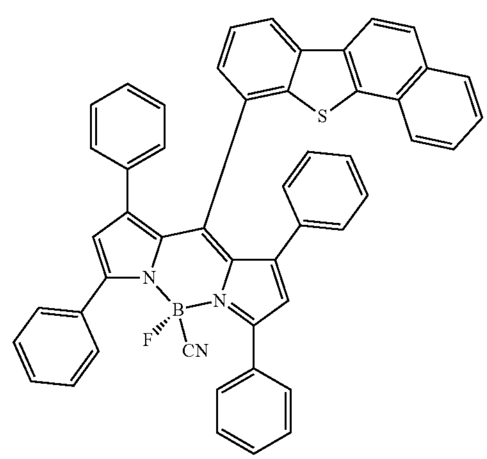

-continued
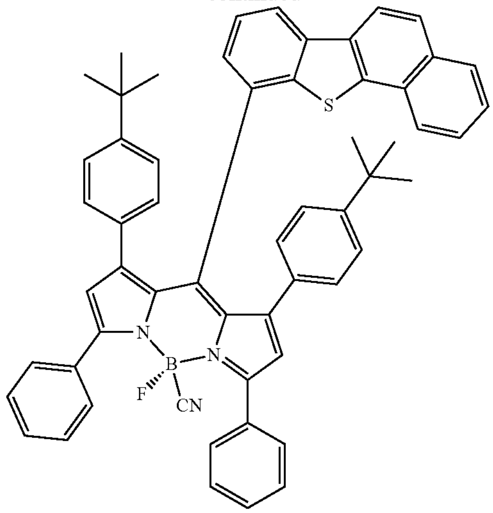
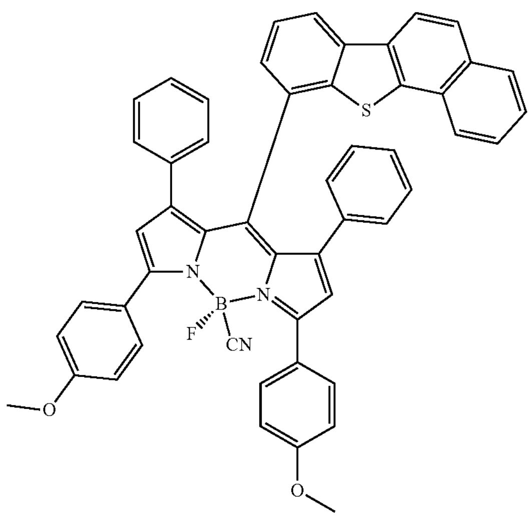
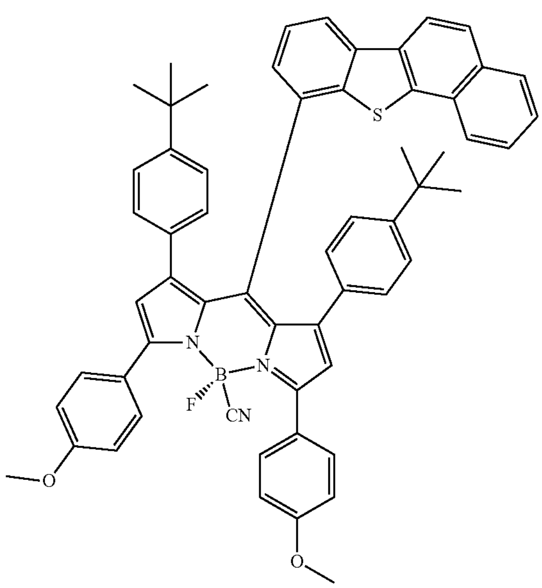
-continued
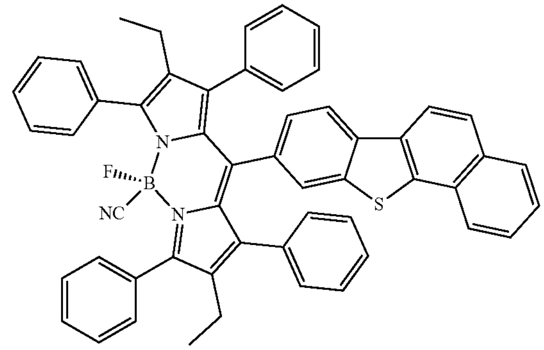
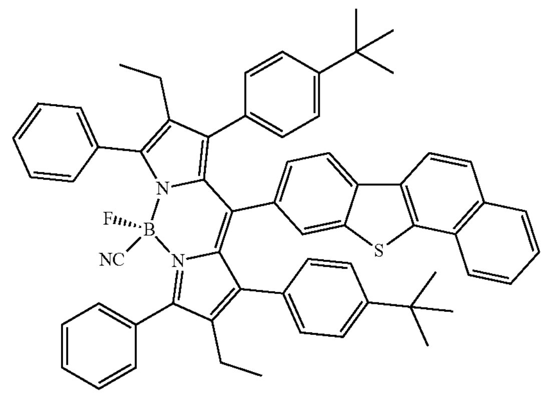
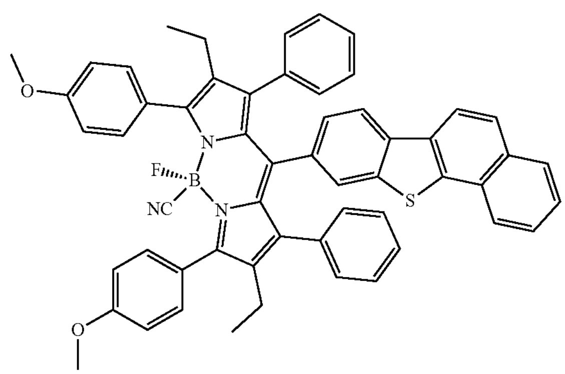
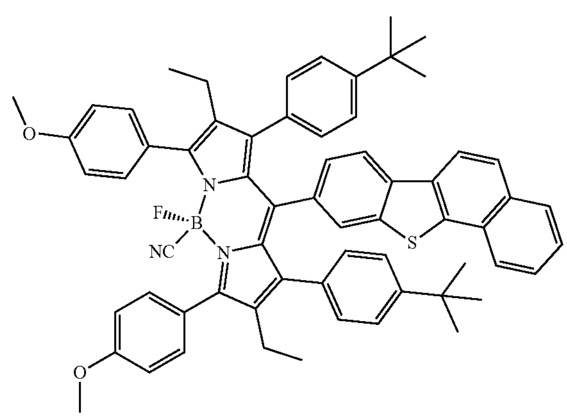

-continued
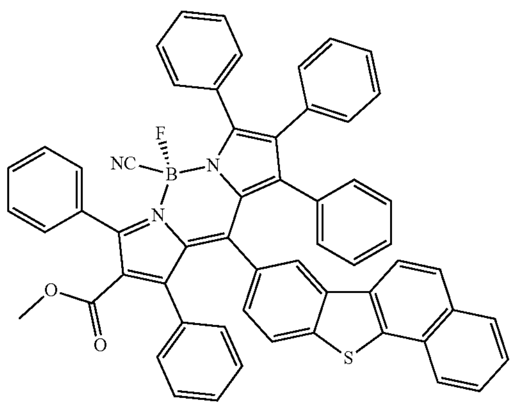
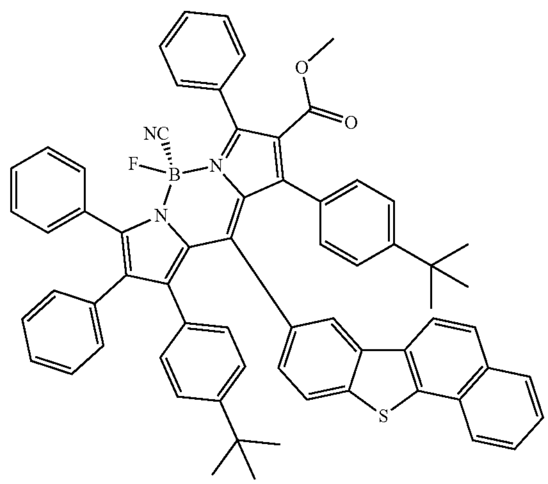
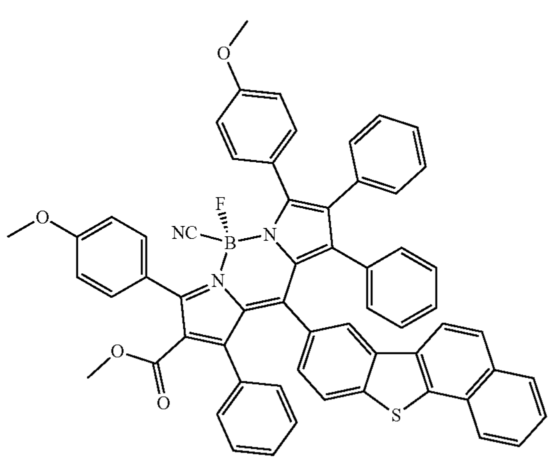
-continued
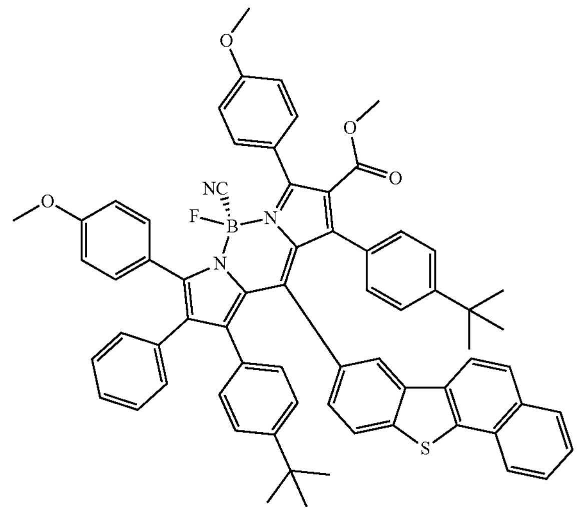
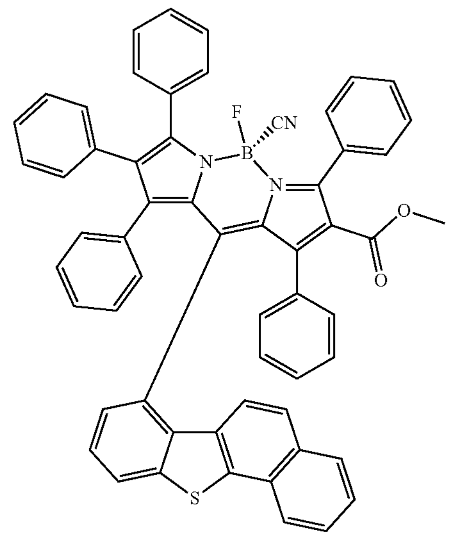
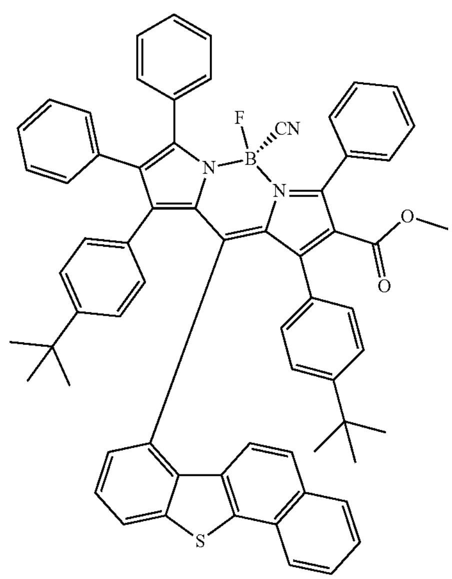

-continued
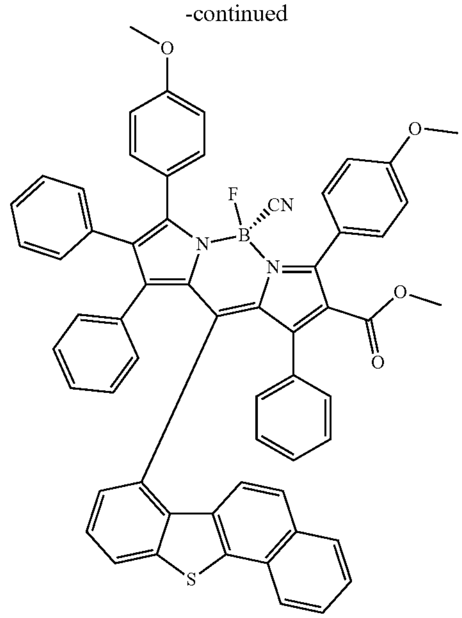
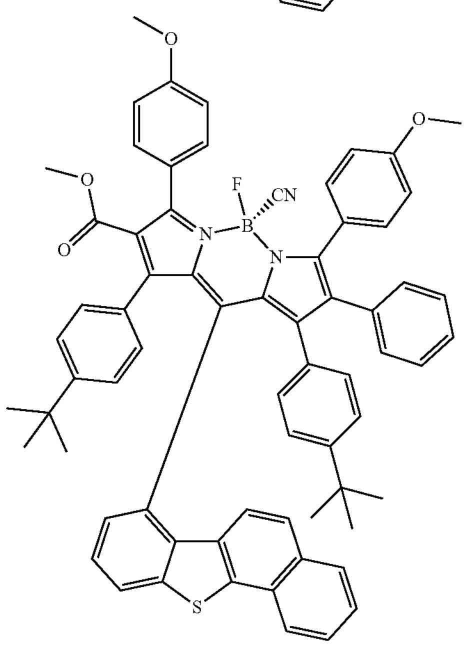
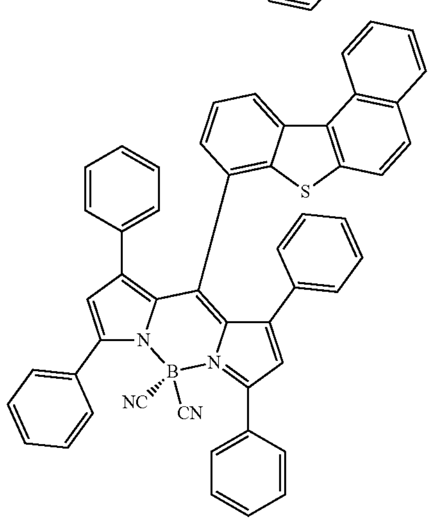
-continued
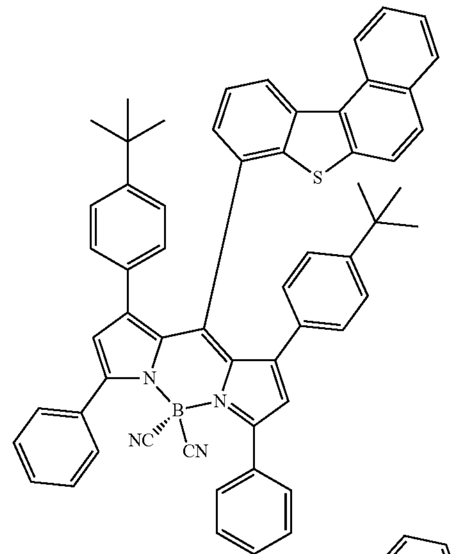
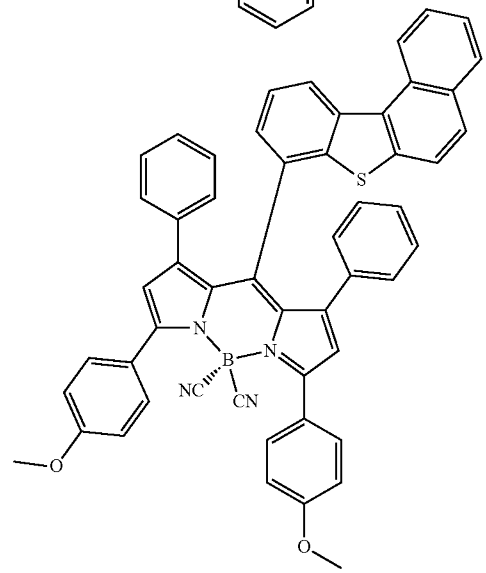
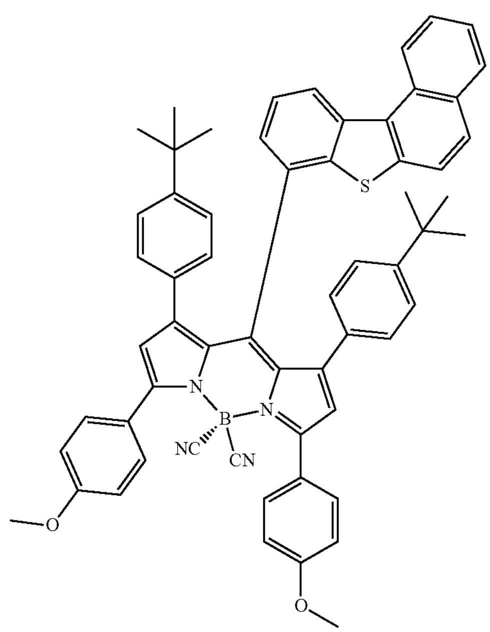

-continued
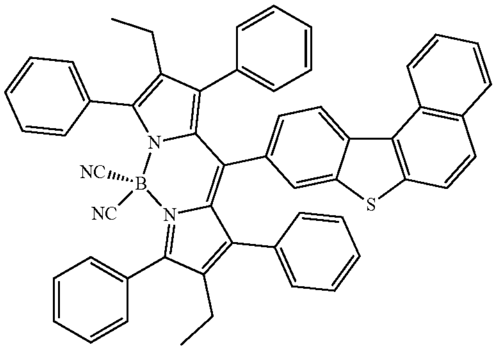
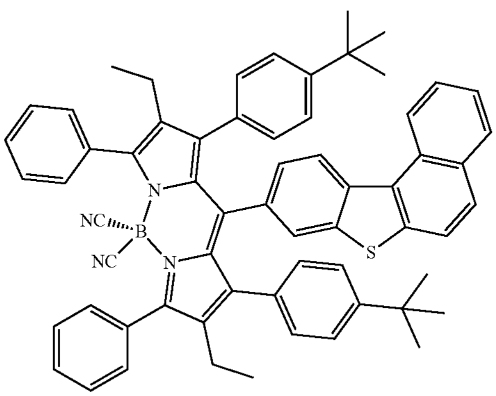
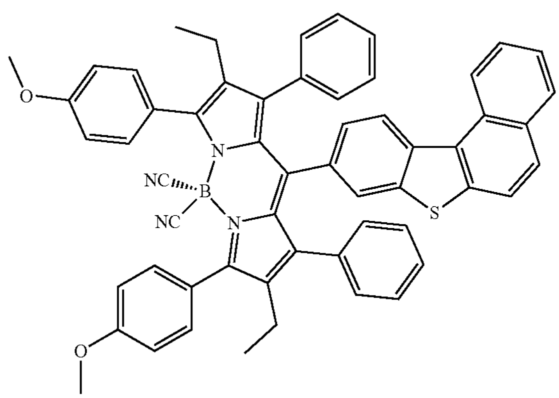
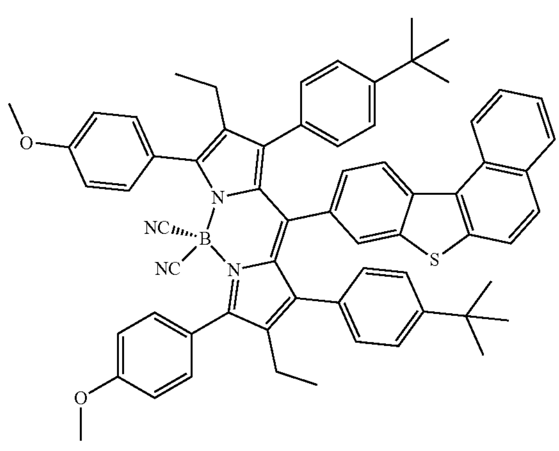
-continued
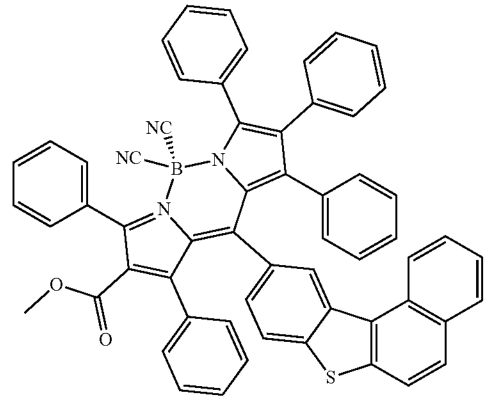
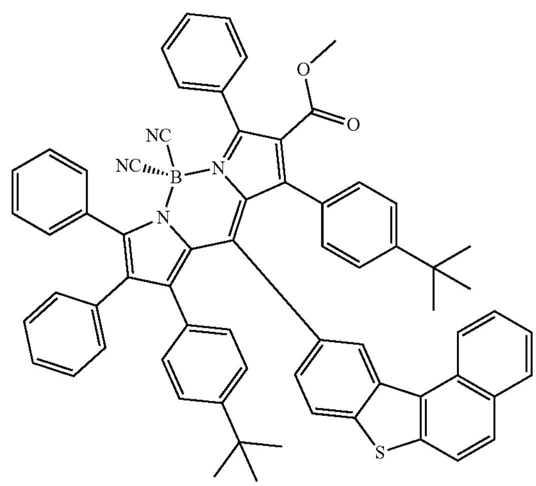
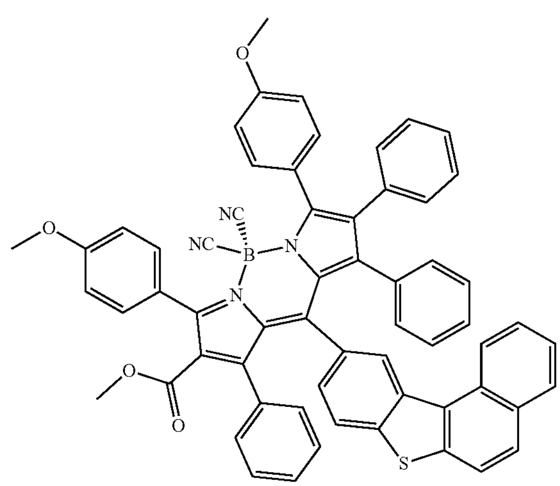

-continued
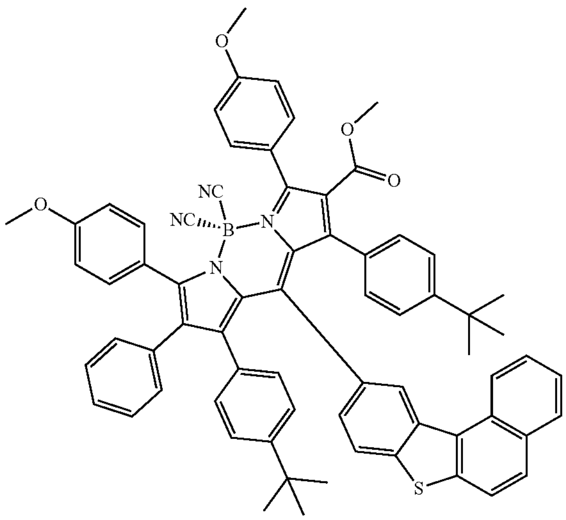
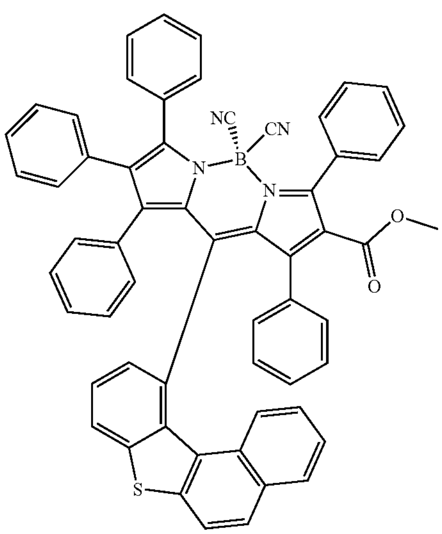
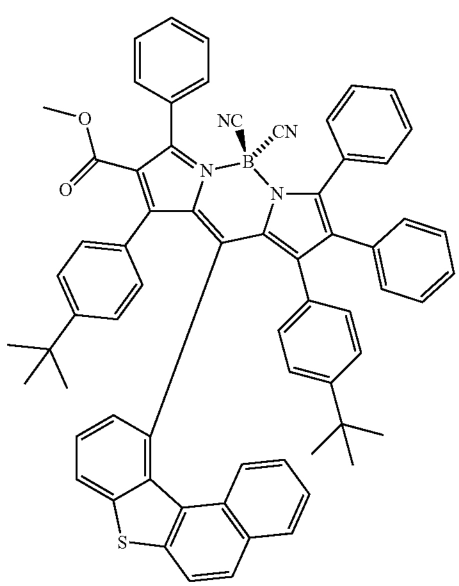
-continued
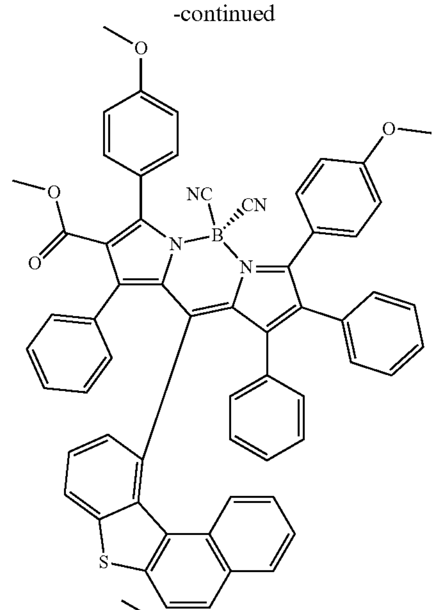
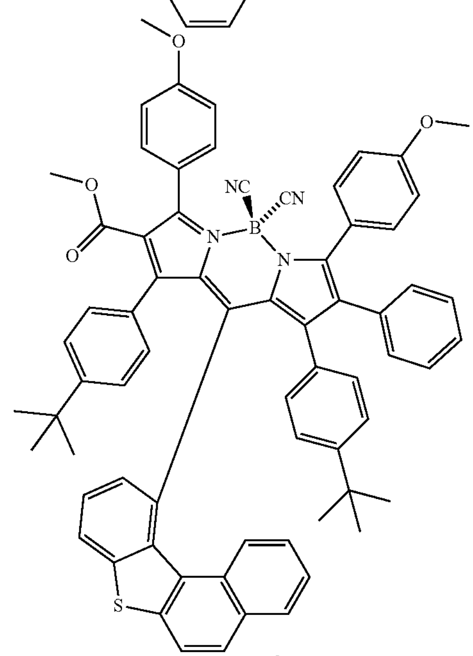
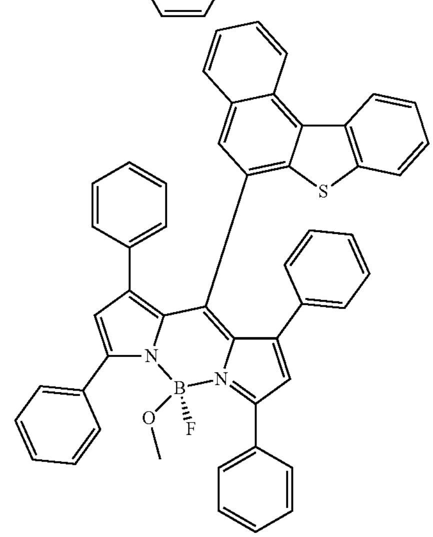

-continued
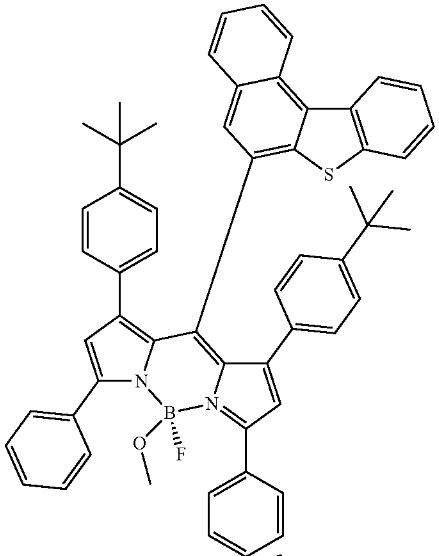
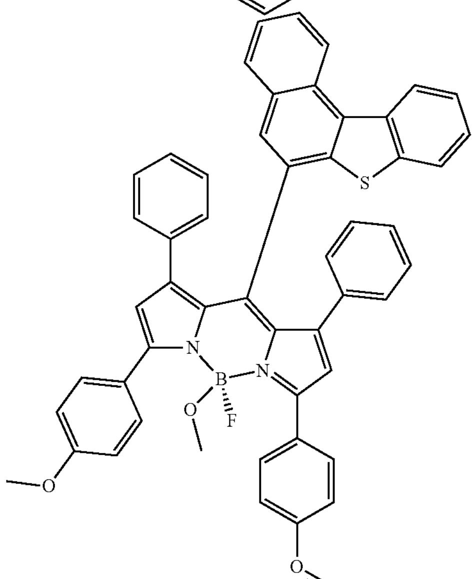
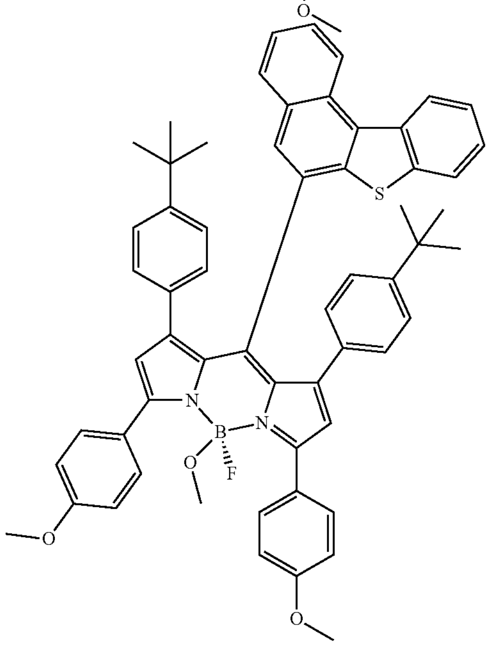
-continued
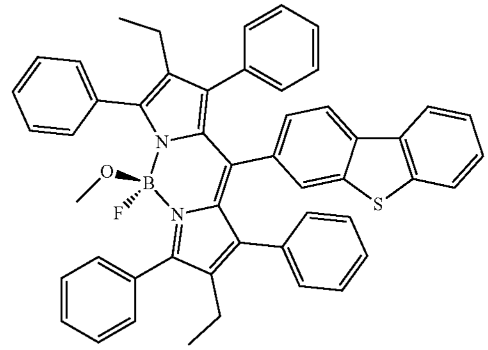
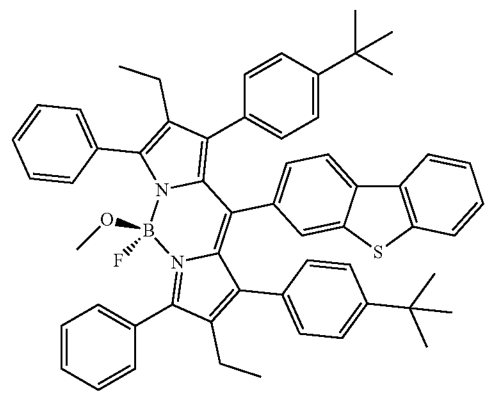
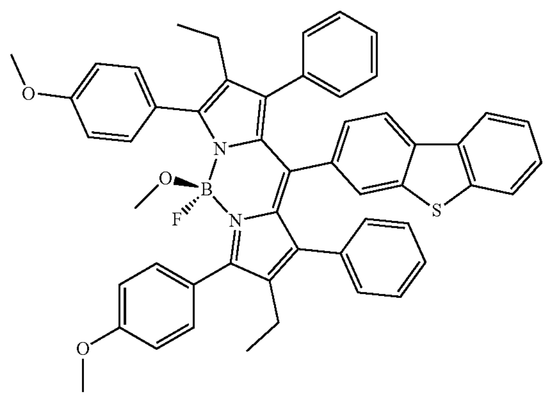
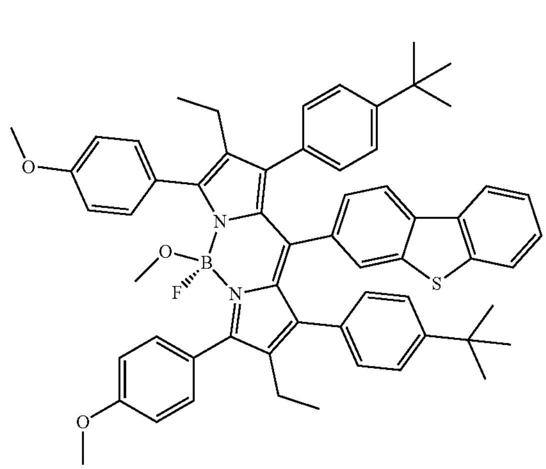

-continued
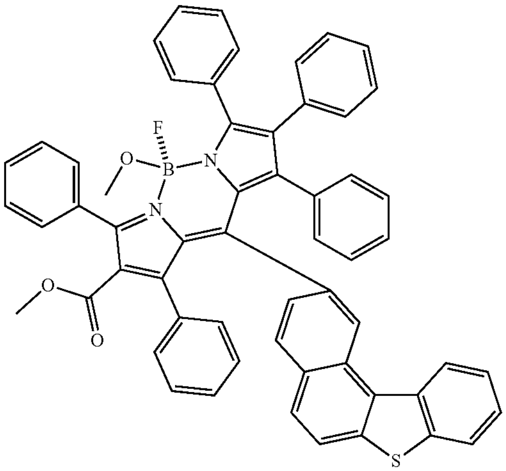
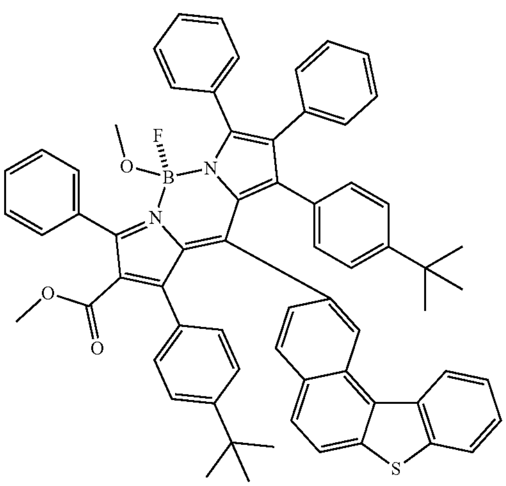
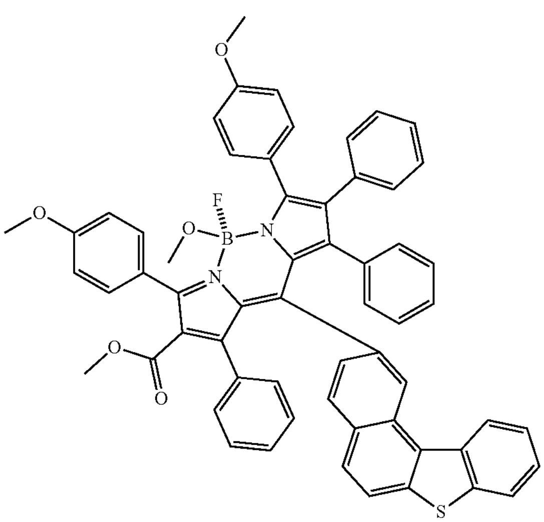
-continued
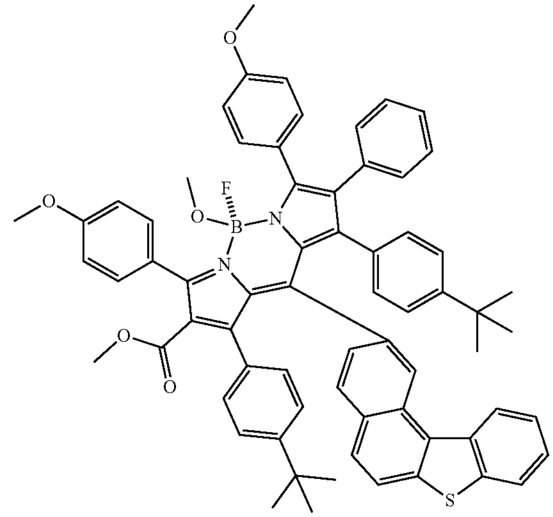
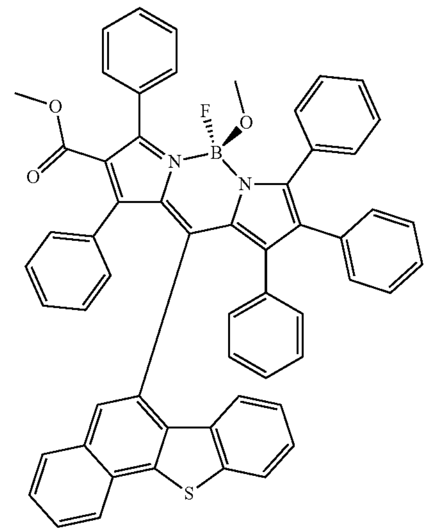
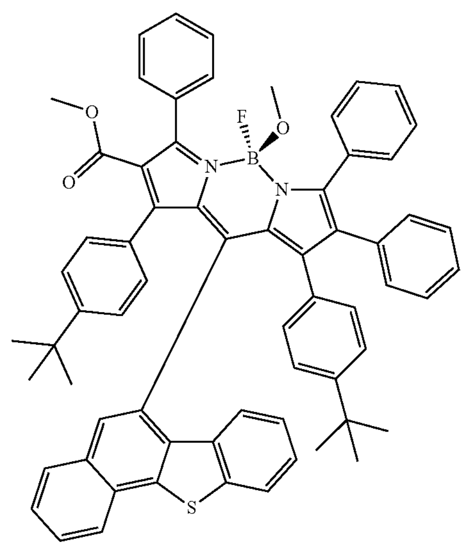

-continued
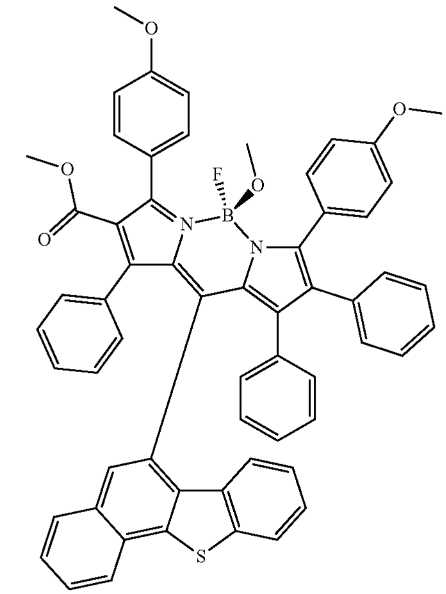
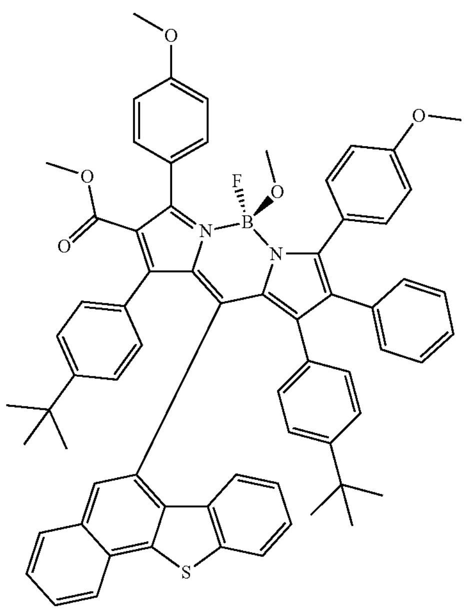
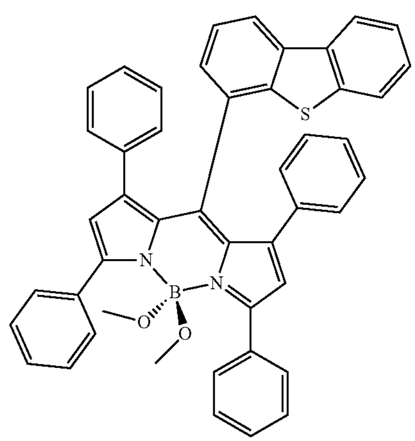
-continued
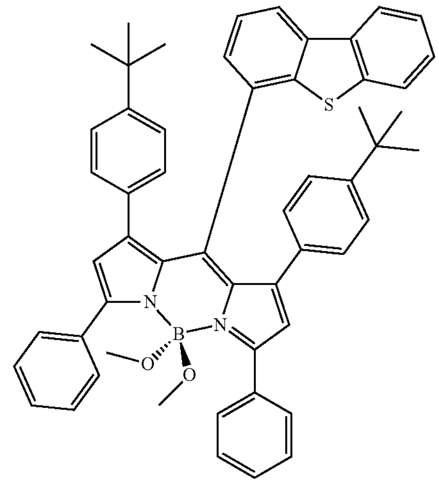
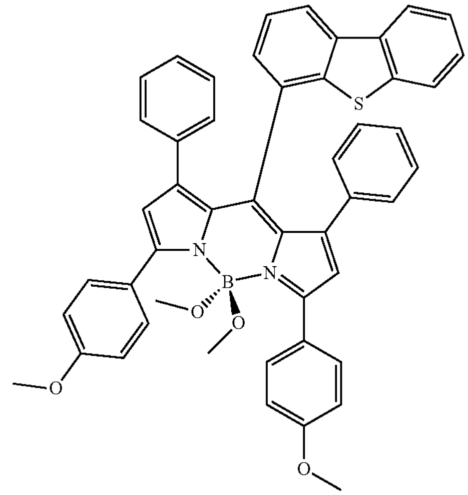
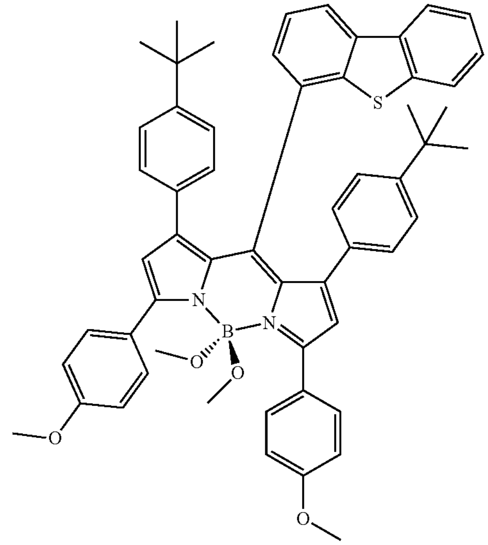

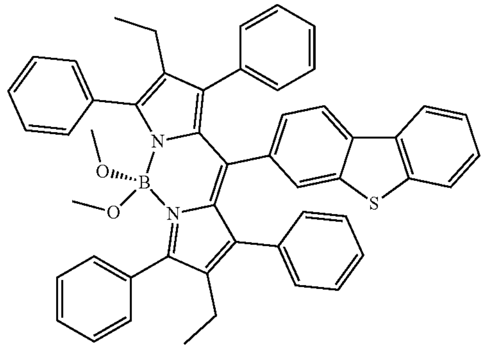
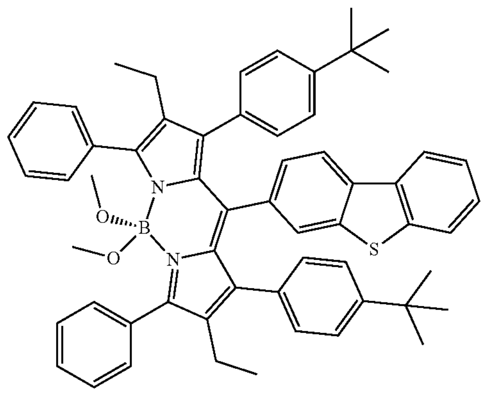
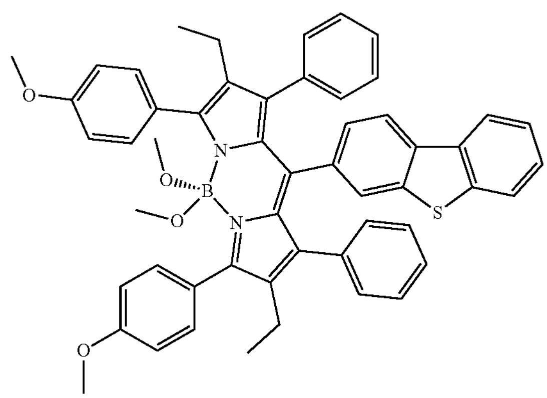
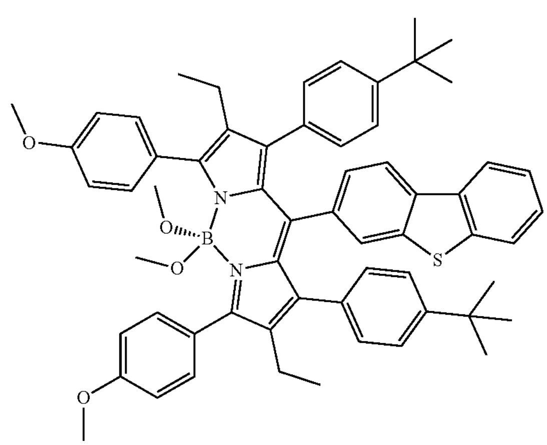
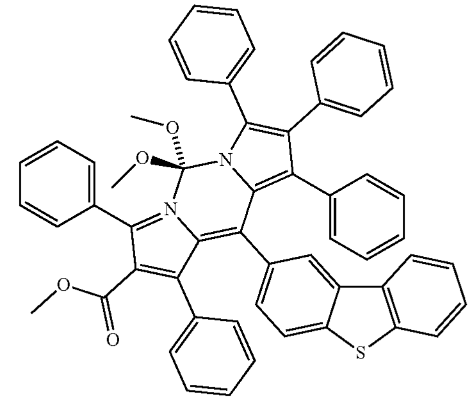
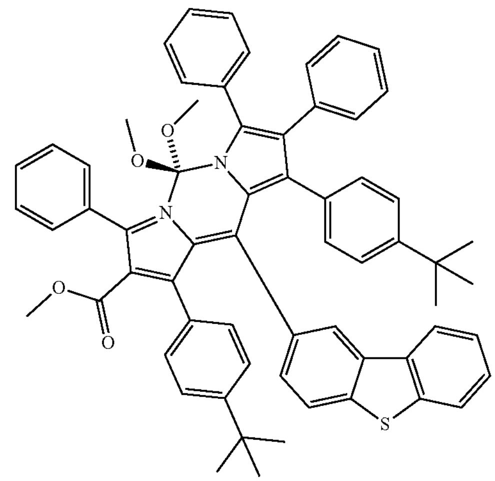
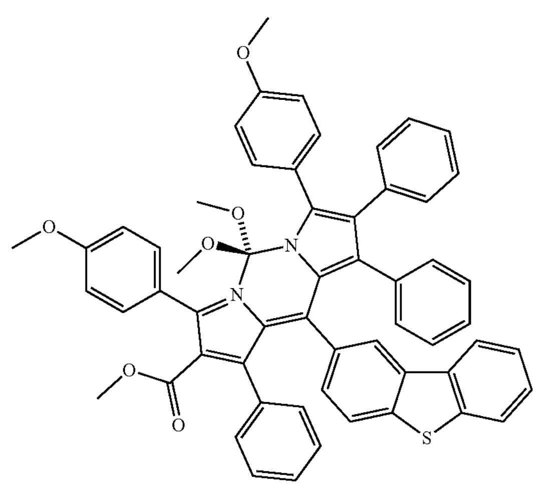
N
N
O
O
O
O
O
S

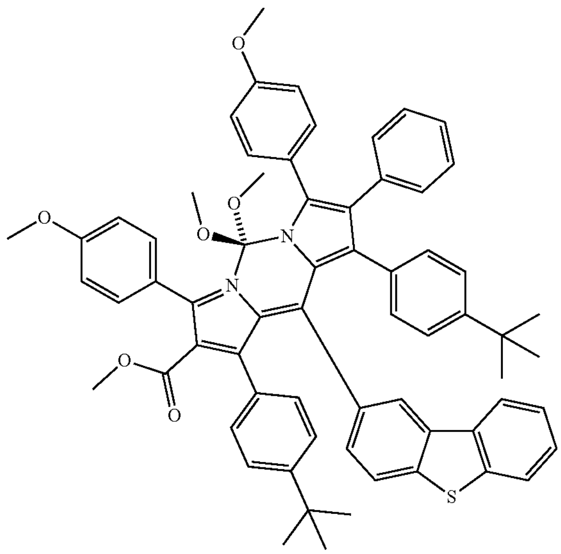
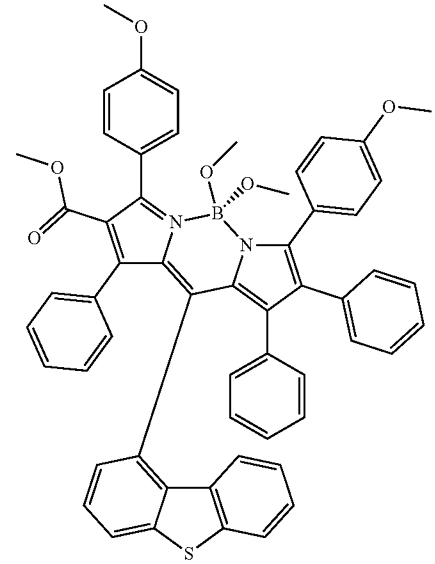
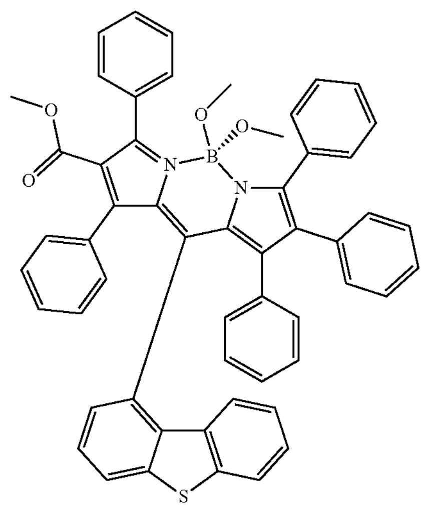
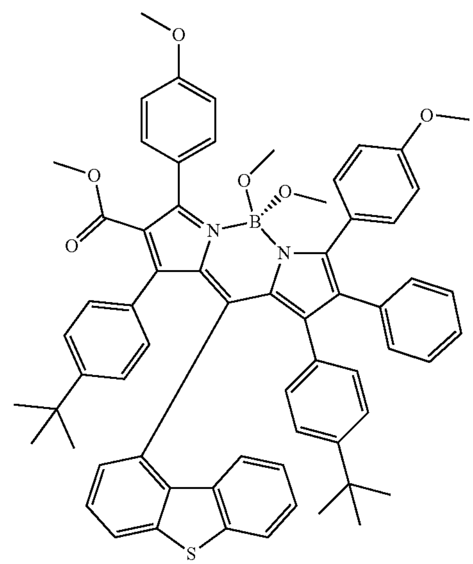
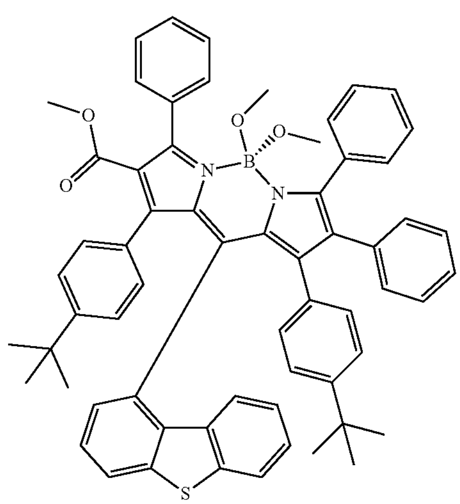
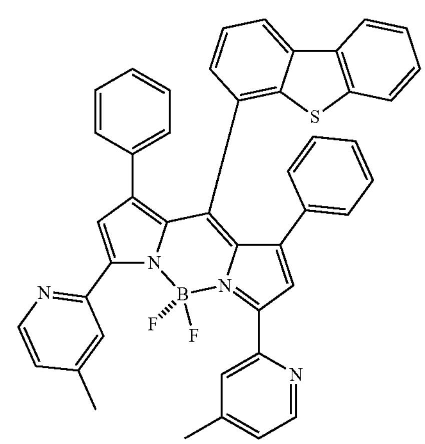

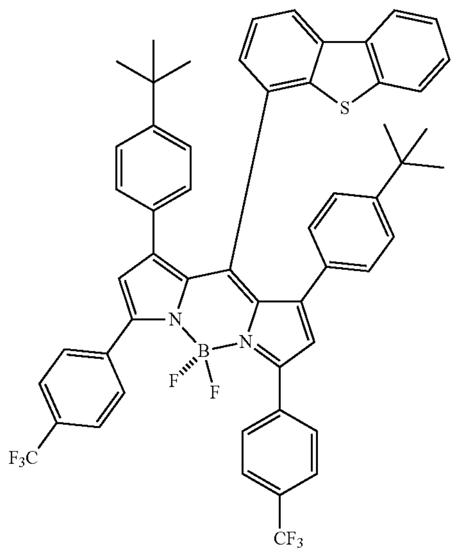
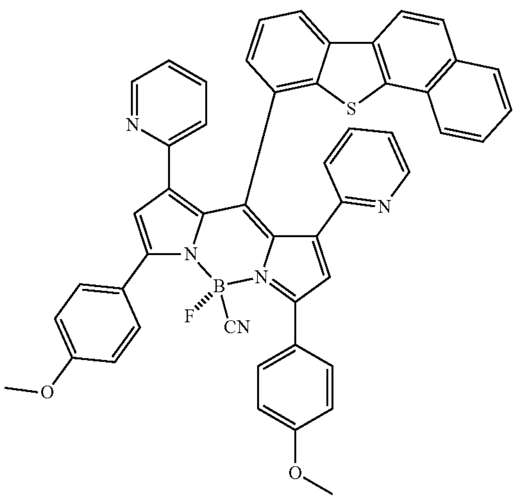
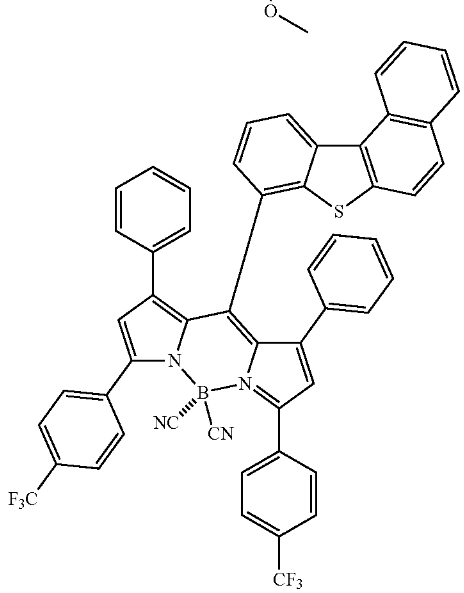
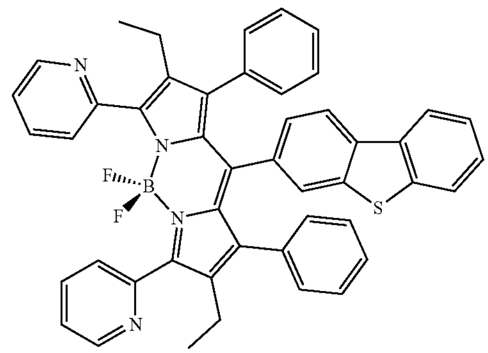
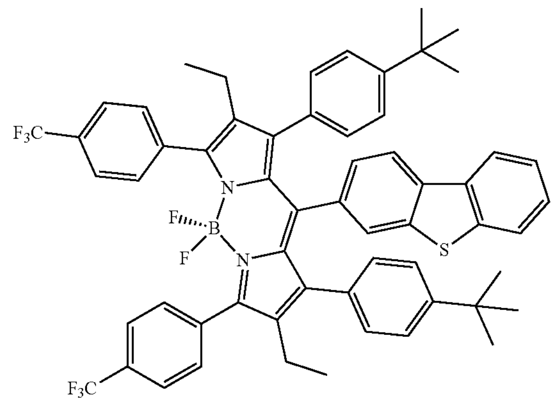
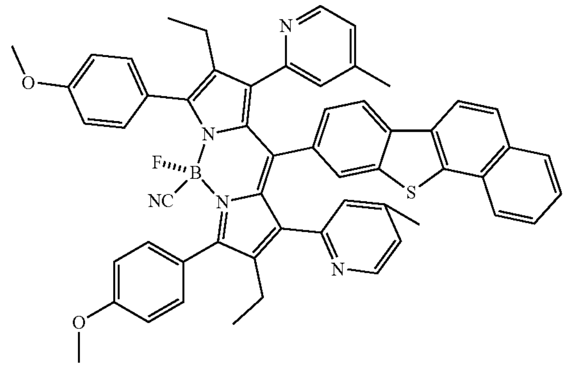
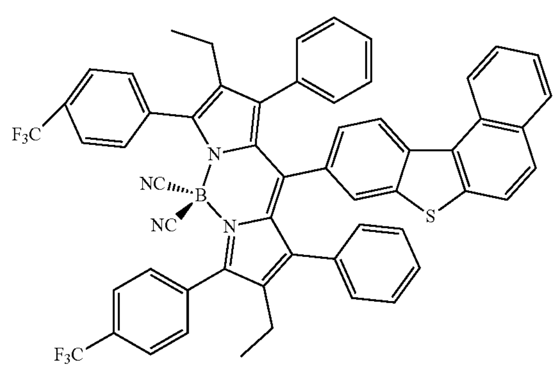

-continued
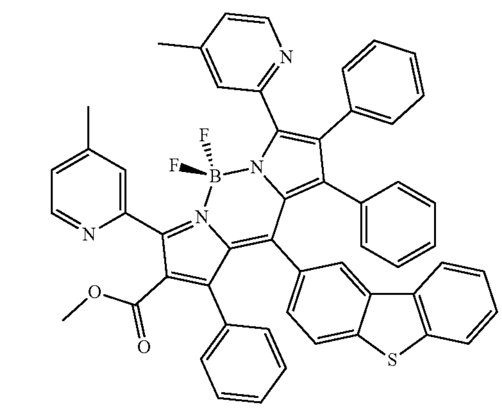
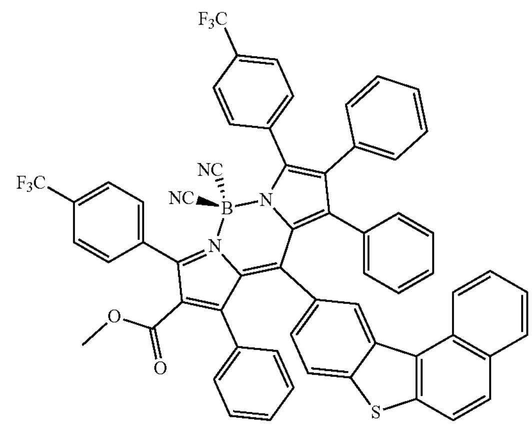
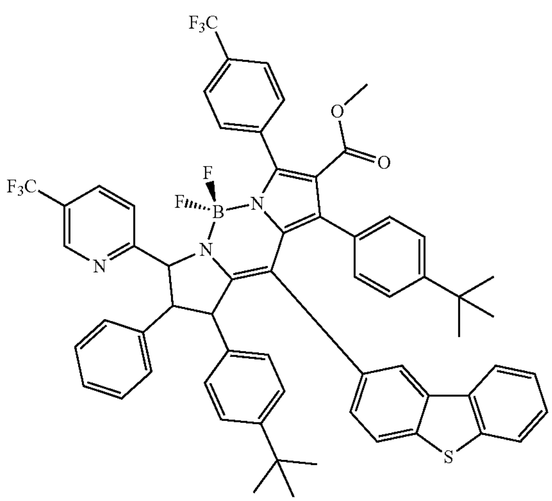
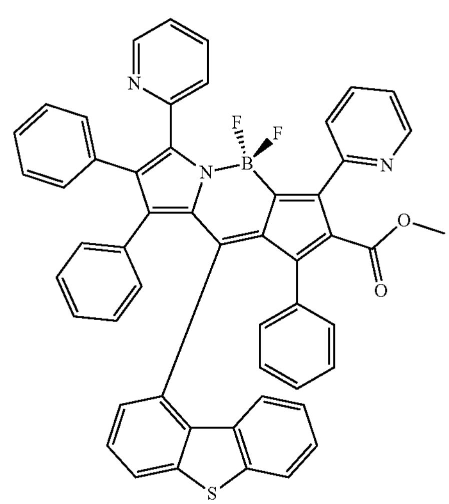
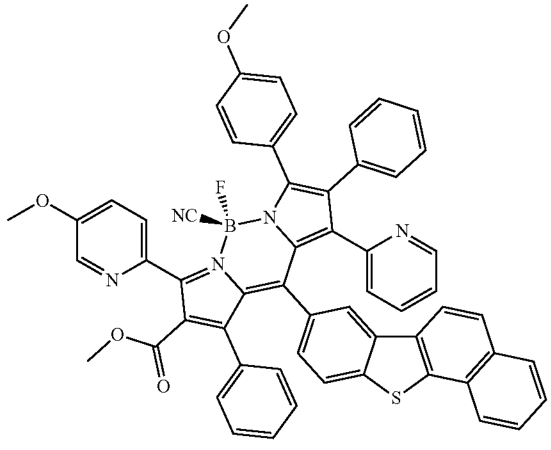
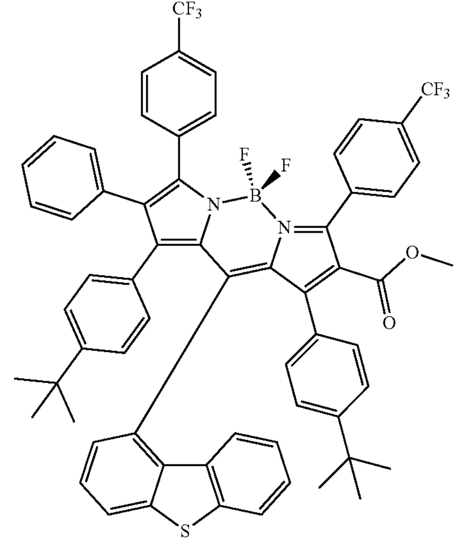

-continued
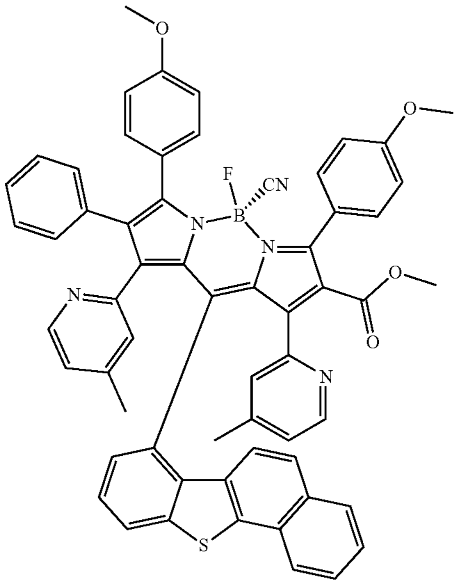
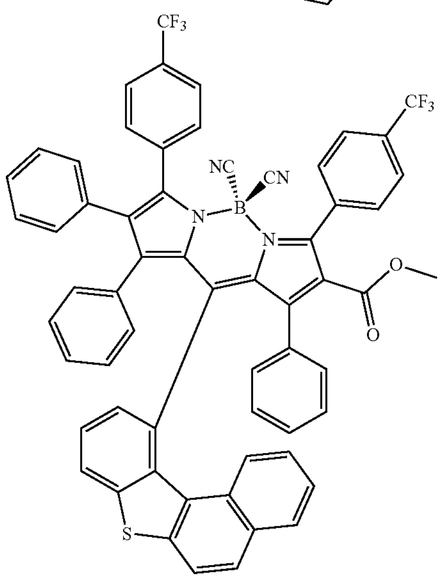
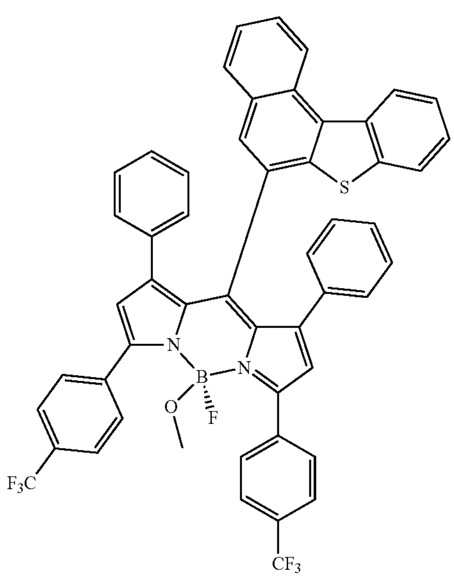
-continued
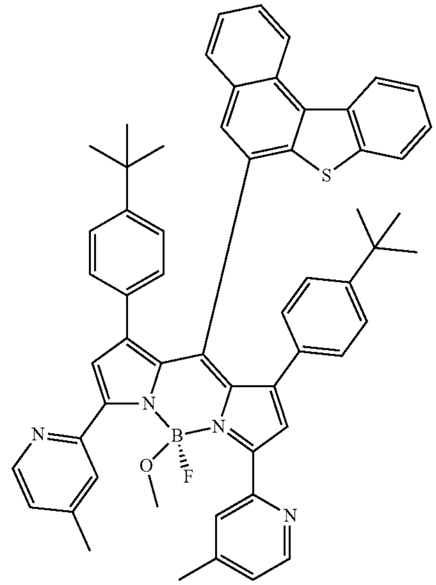
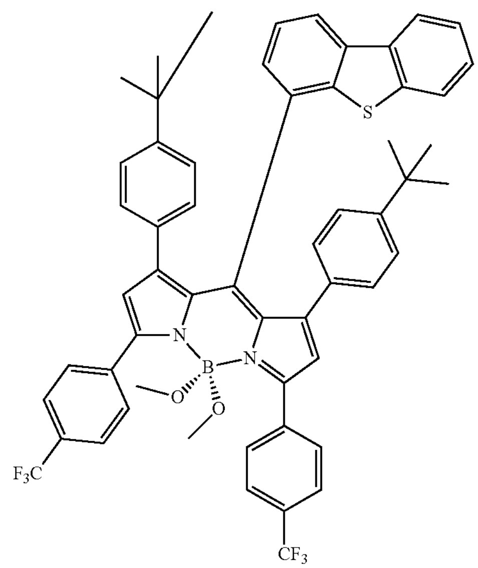
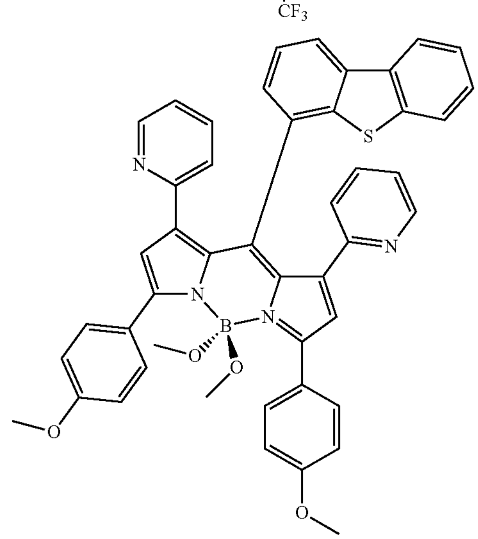

-continued
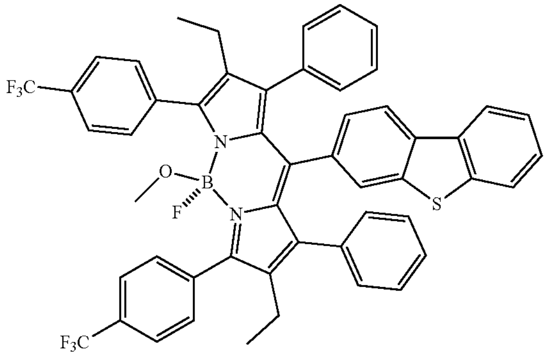
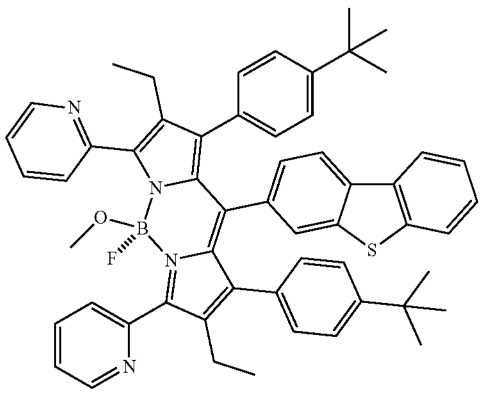
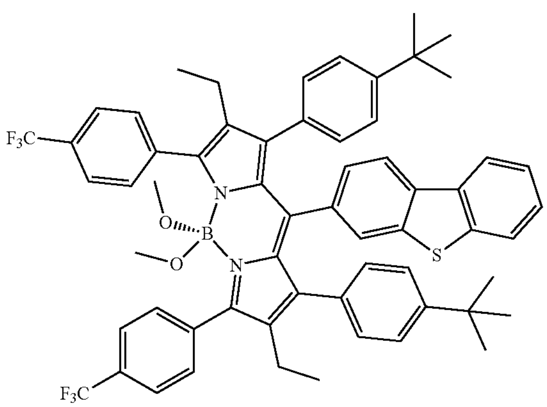
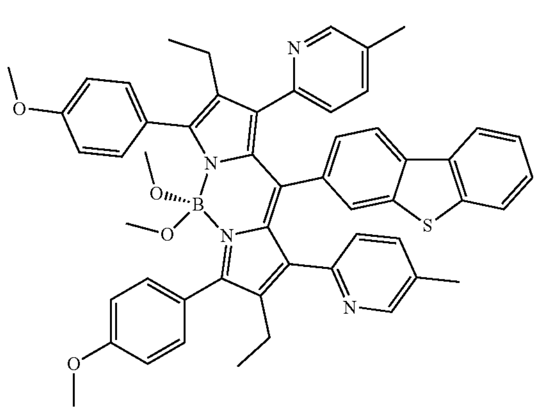
-continued
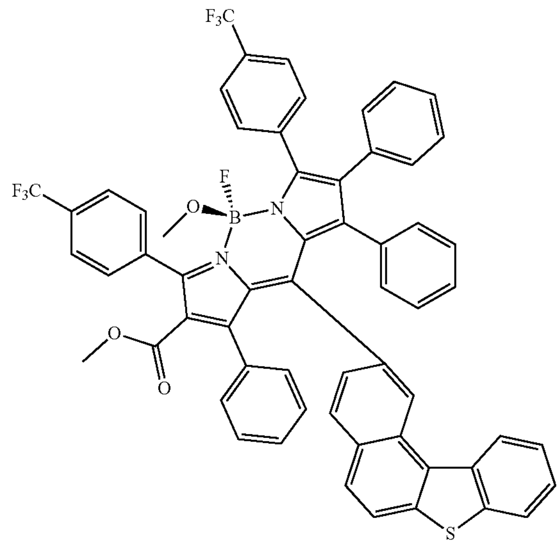
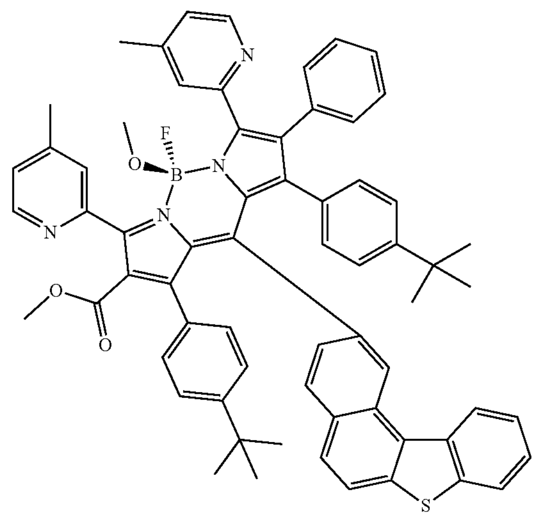
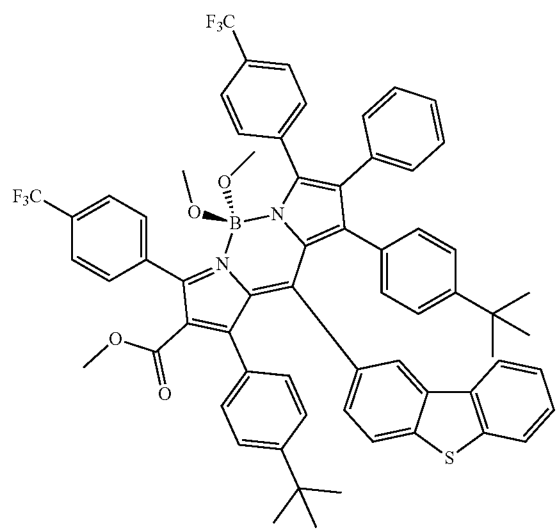

-continued
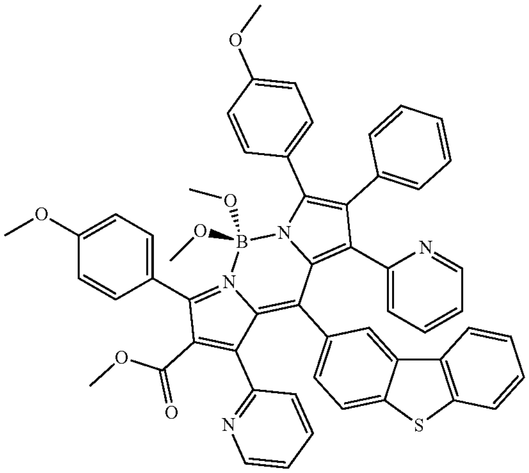
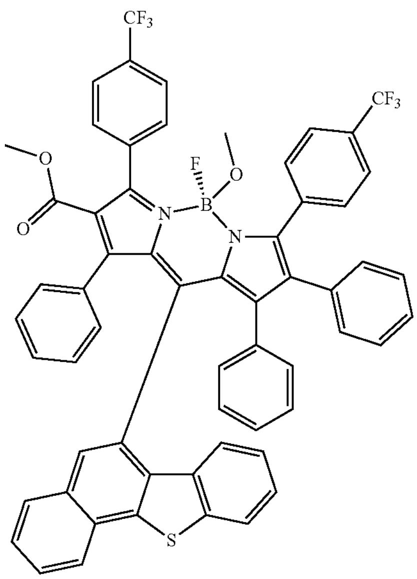
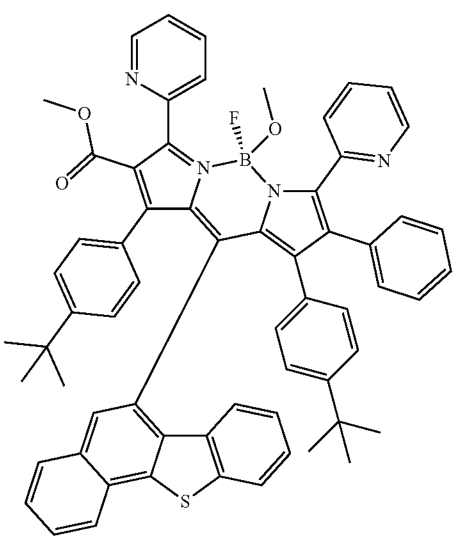
-continued
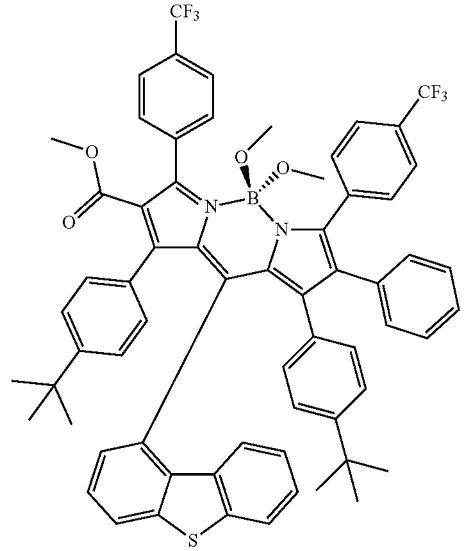
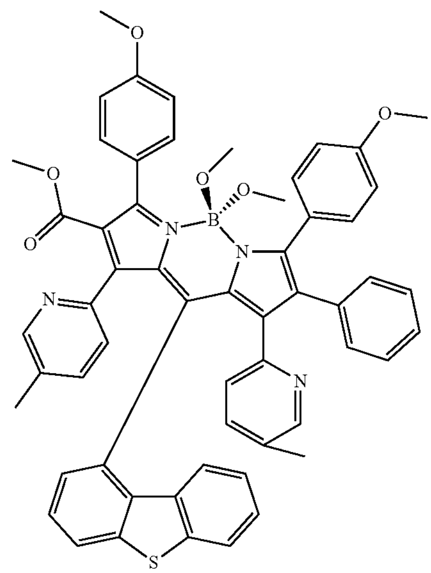
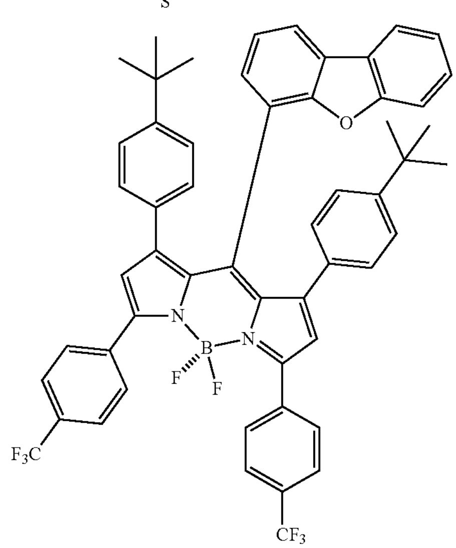

-continued
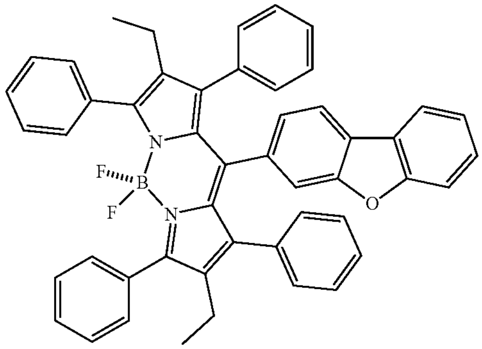
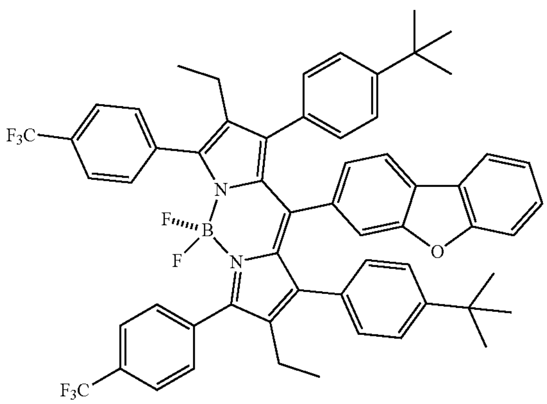
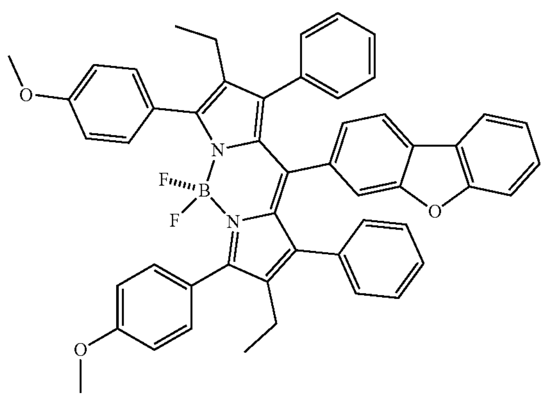
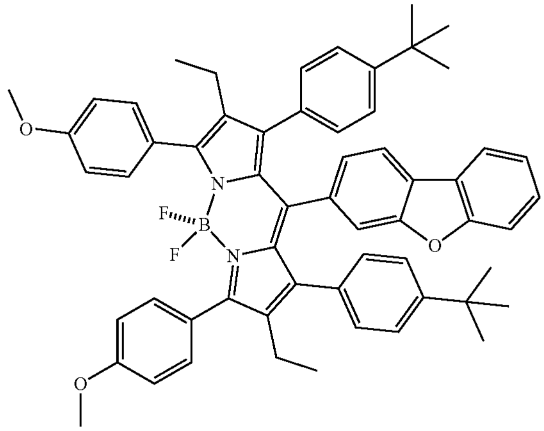
-continued
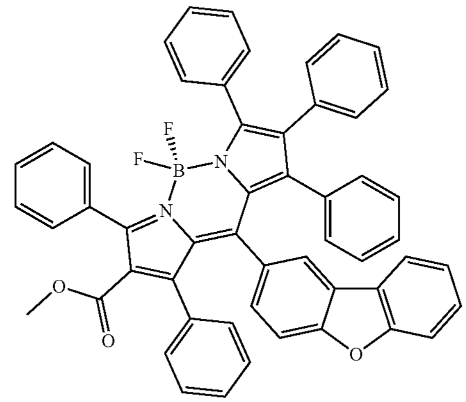
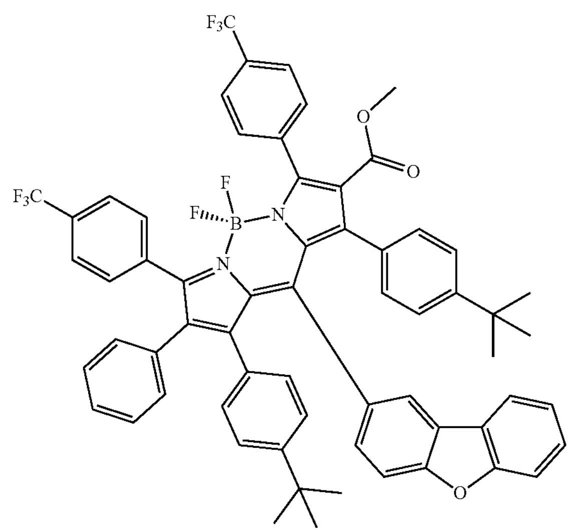
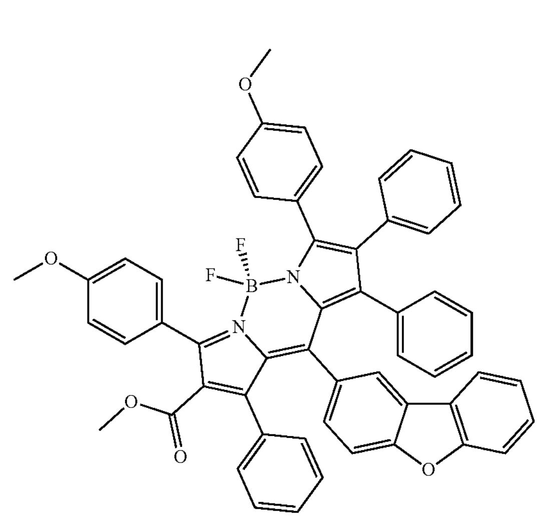

-continued
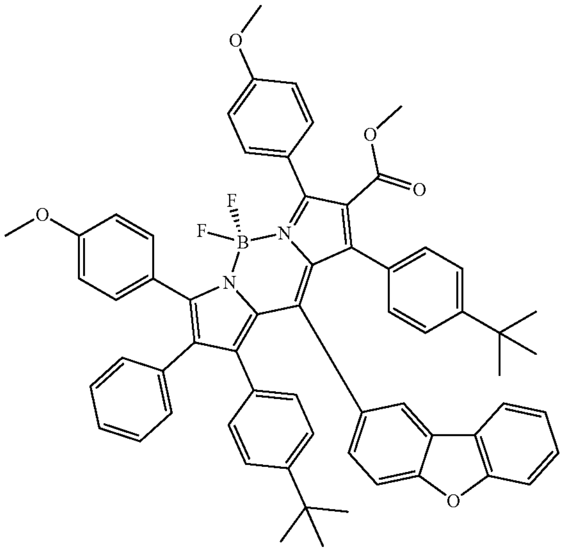
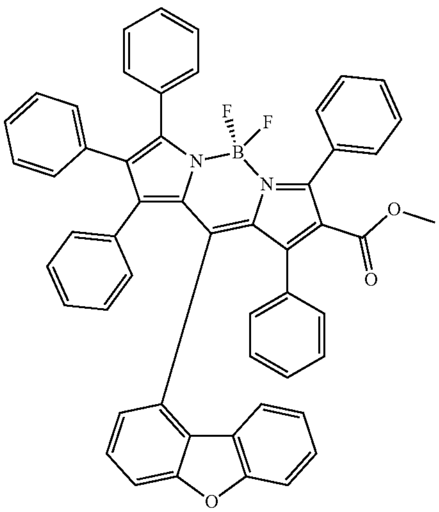
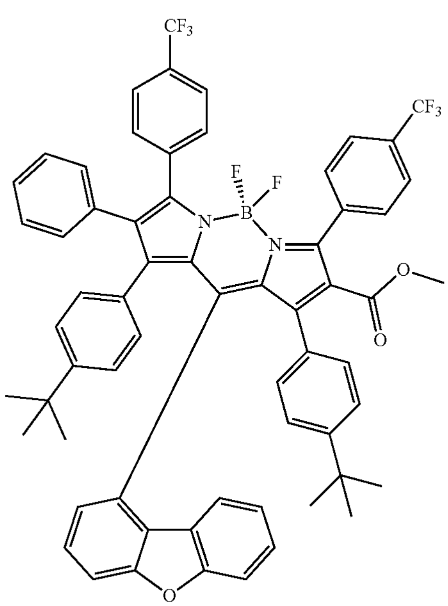
-continued
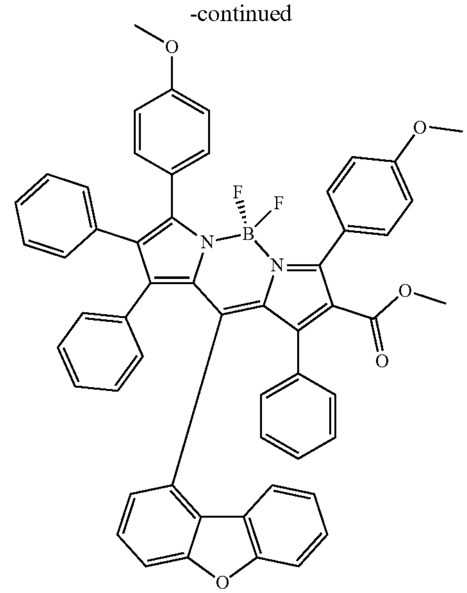
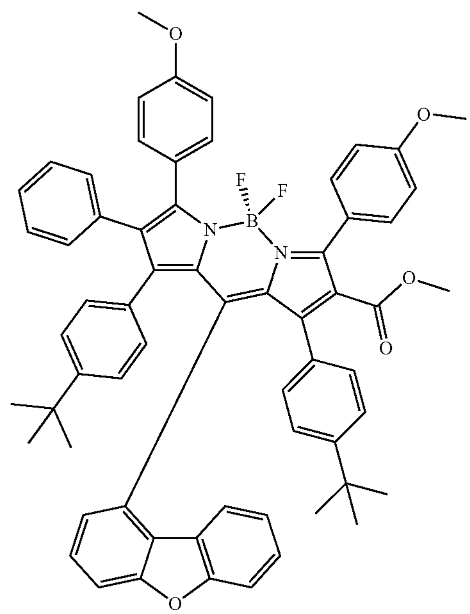
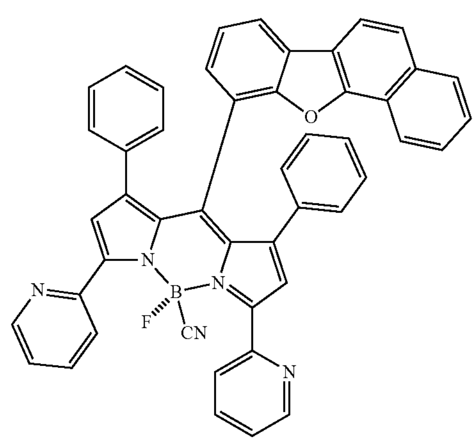

-continued
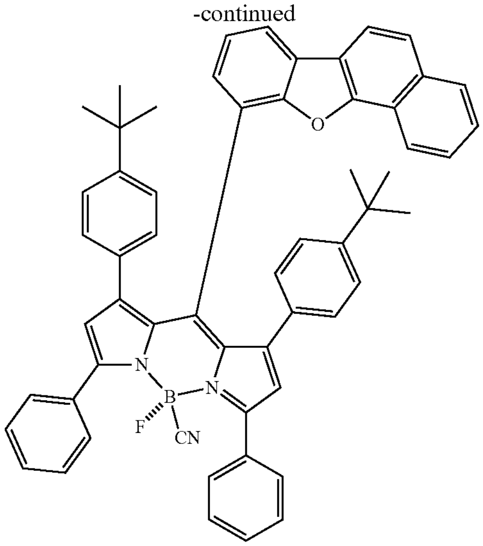
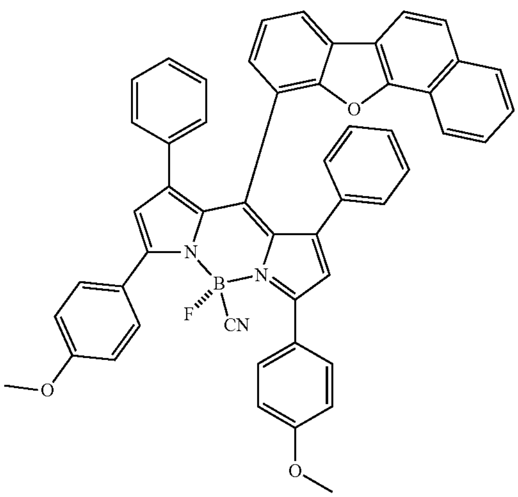
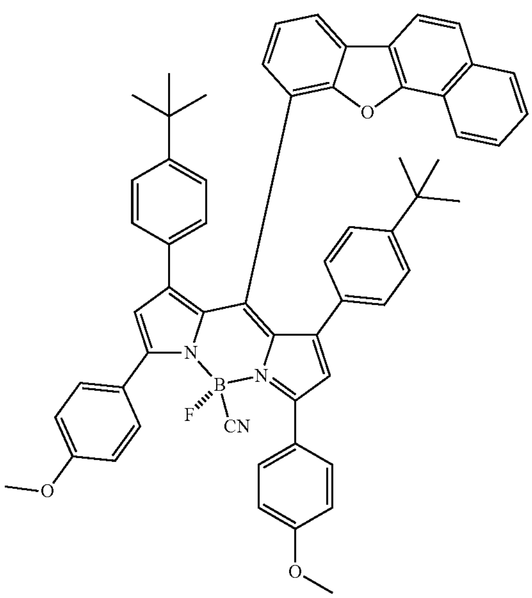
-continued
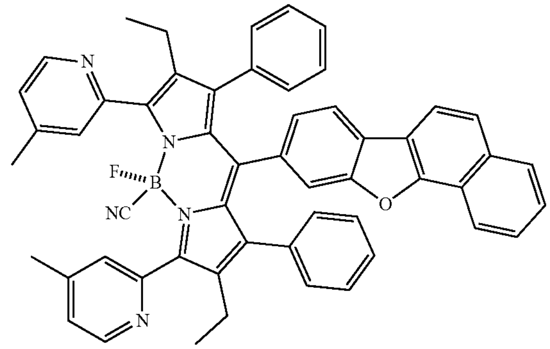
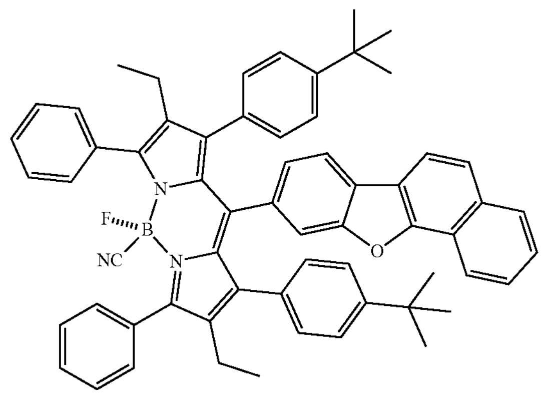
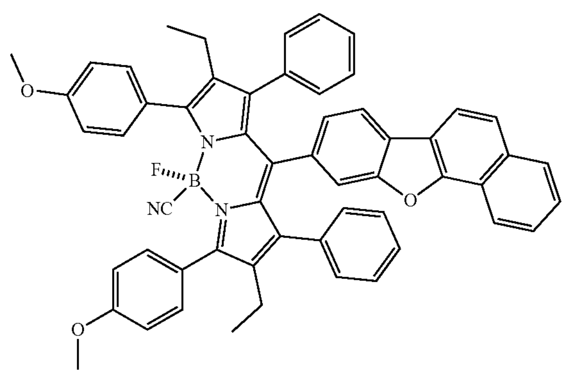
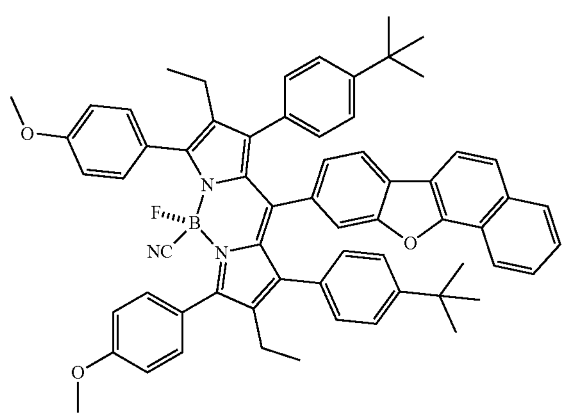

-continued
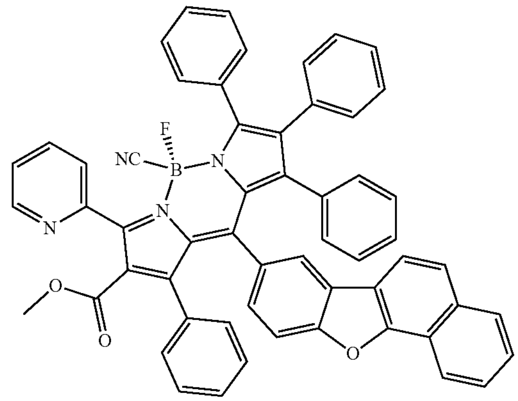
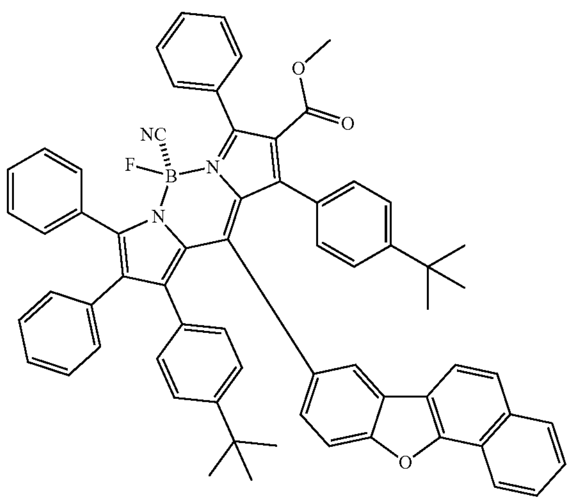
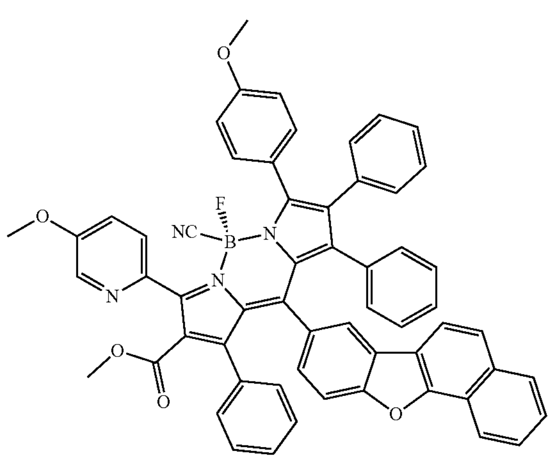
-continued
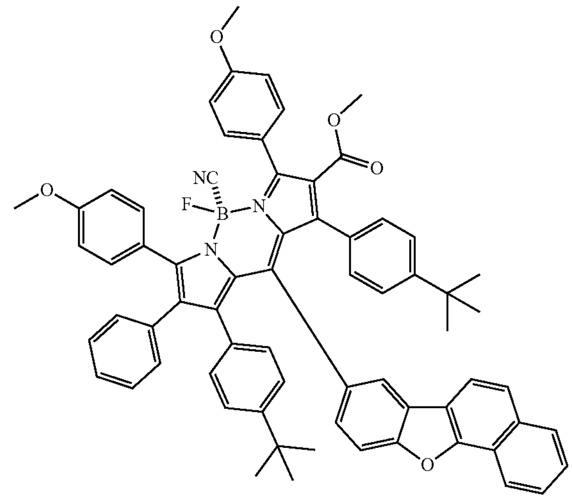
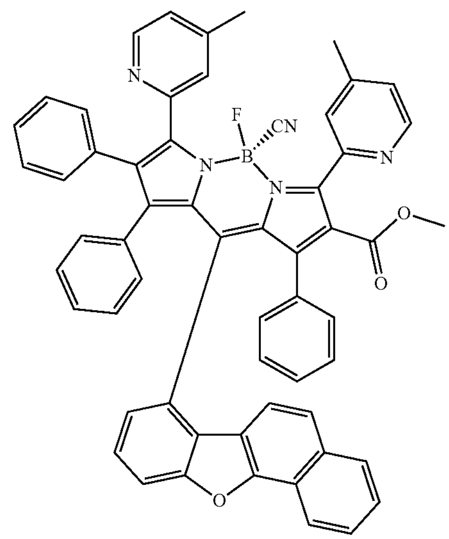
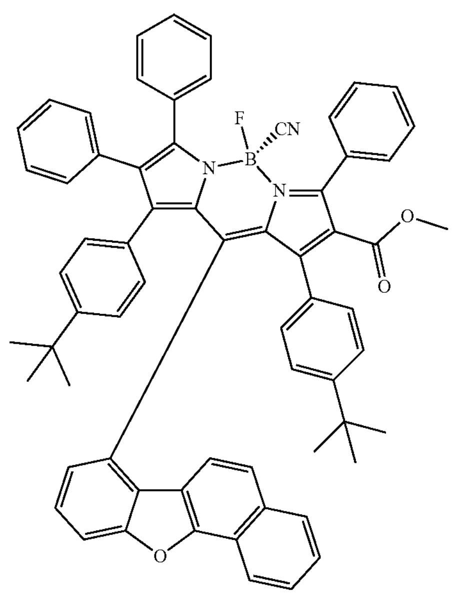

-continued
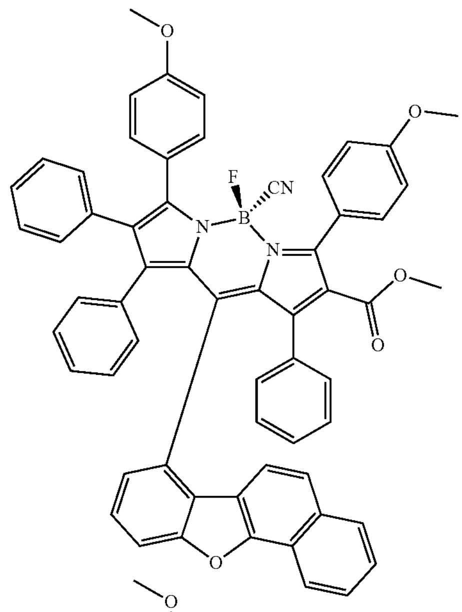
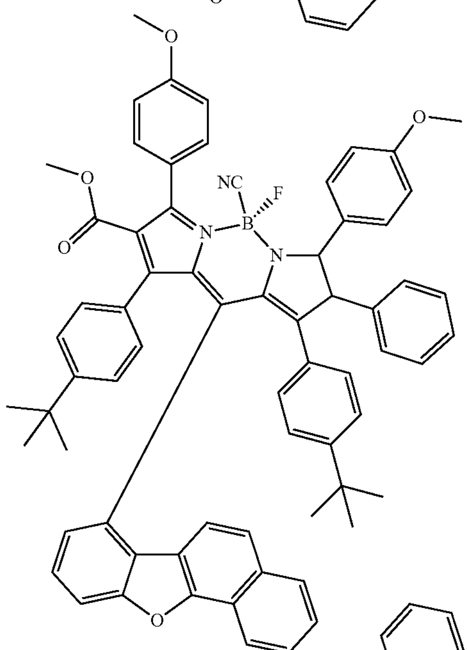
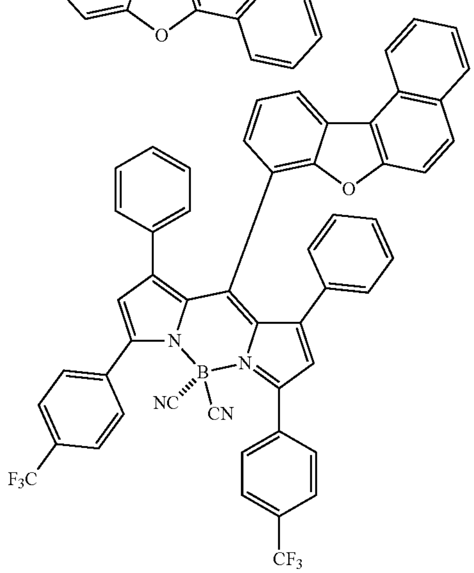
-continued
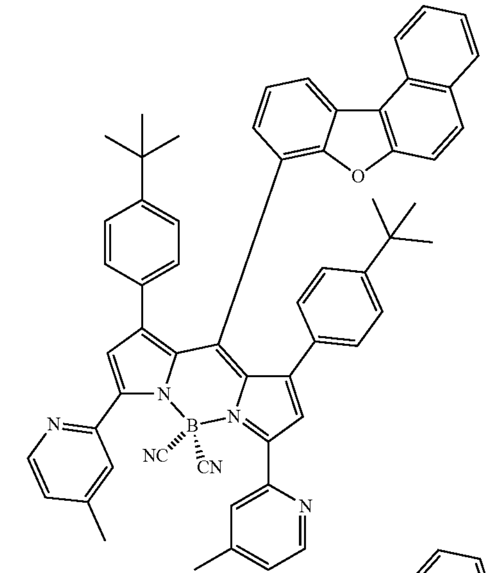
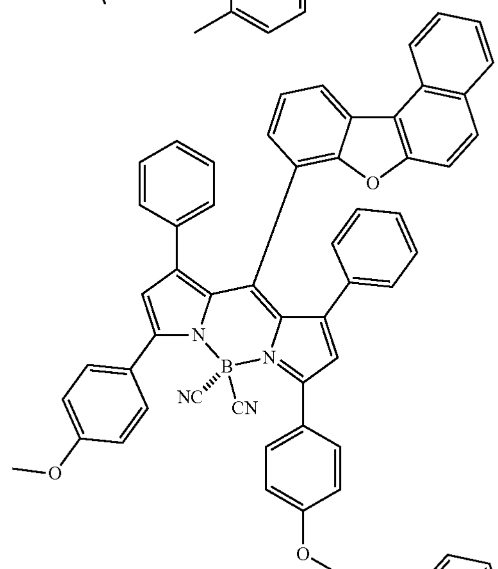
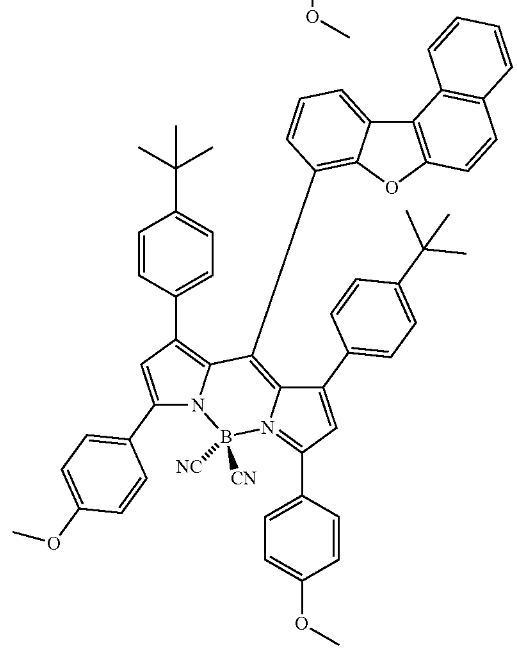

-continued
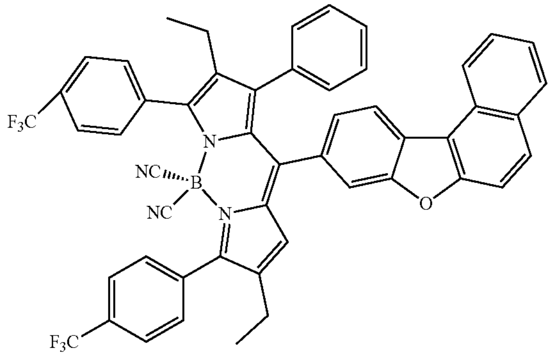
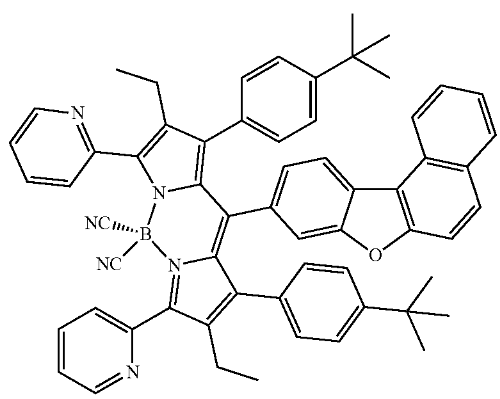
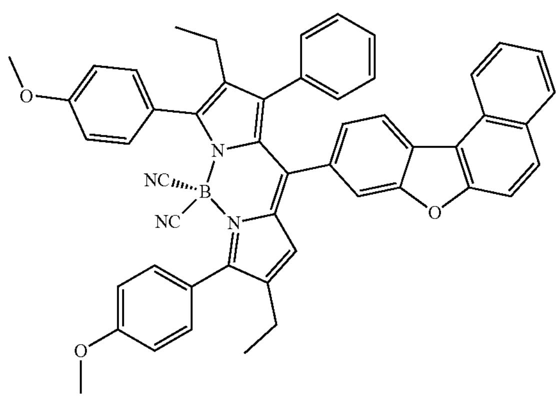
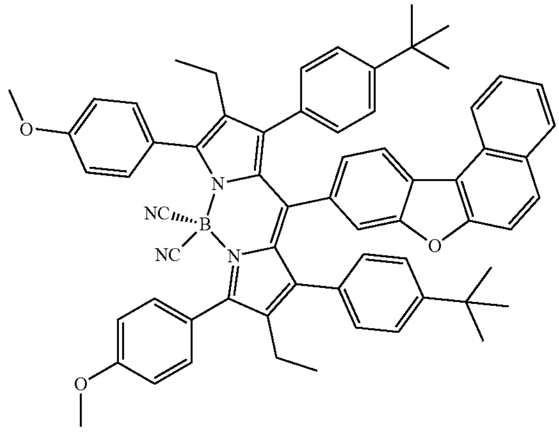
-continued
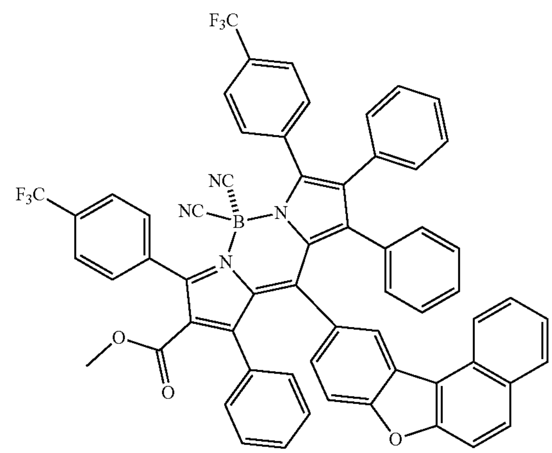
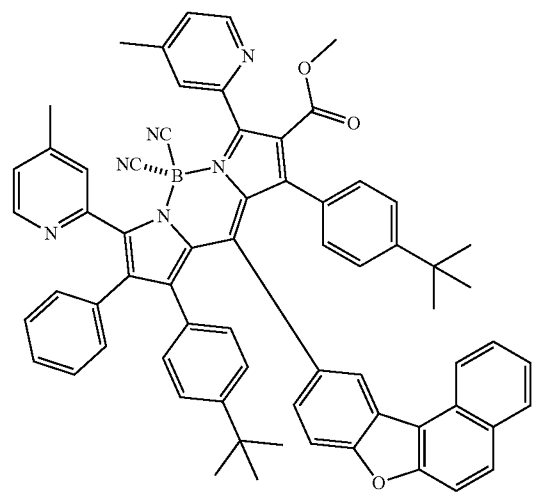
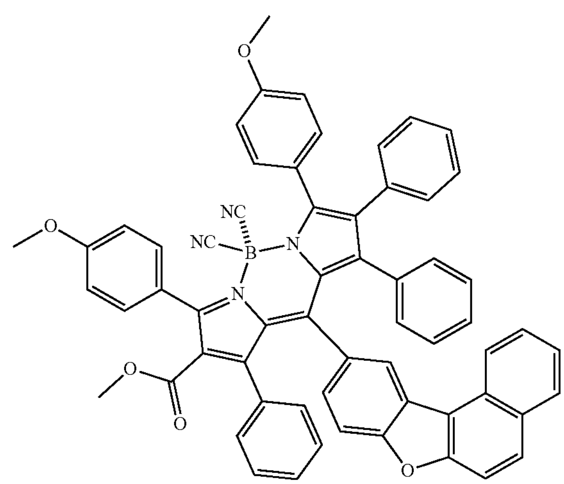

-continued
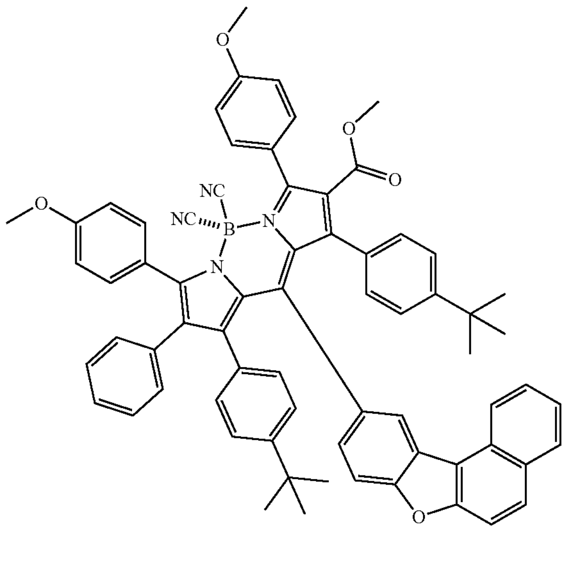
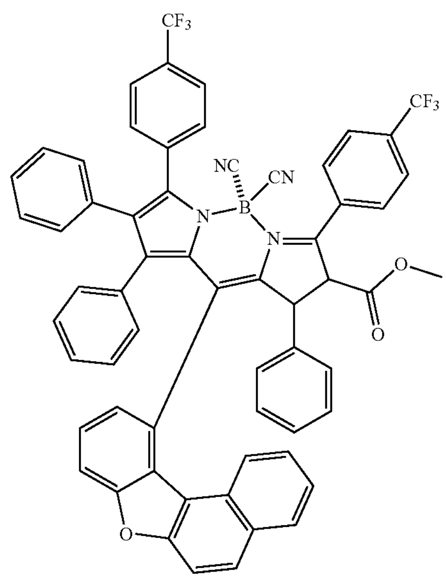
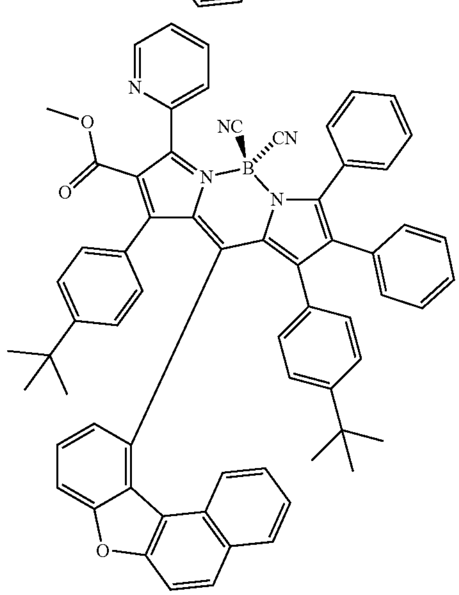
-continued
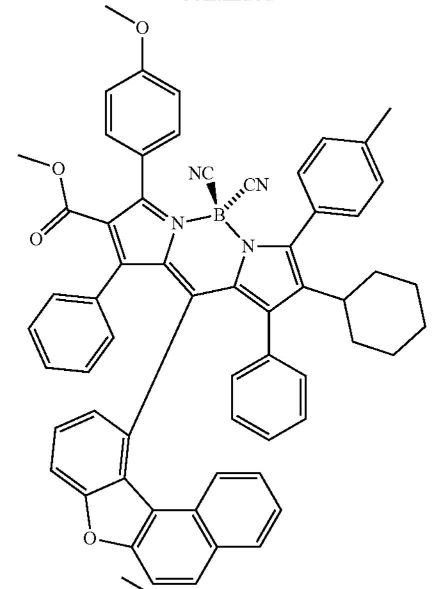
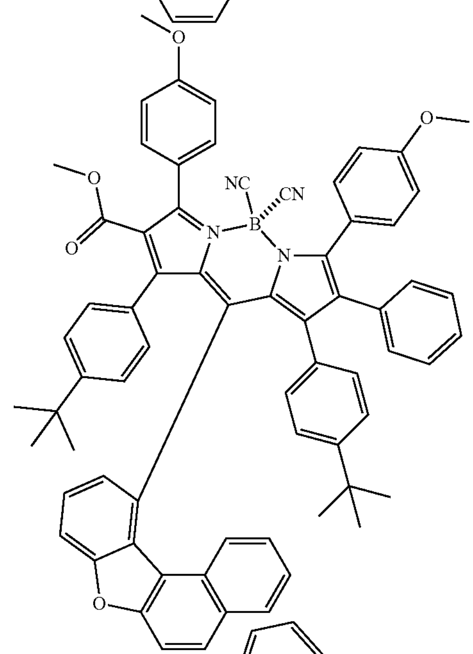
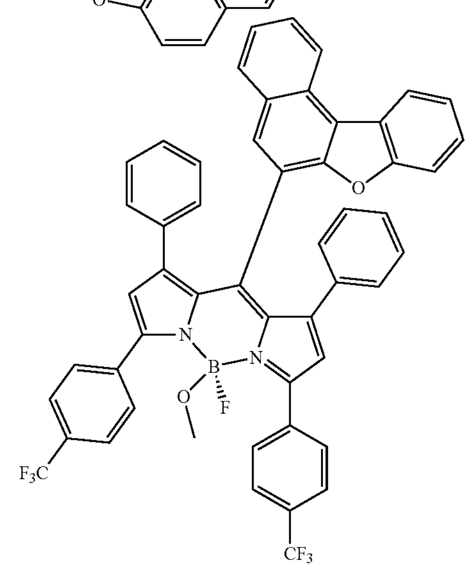

-continued
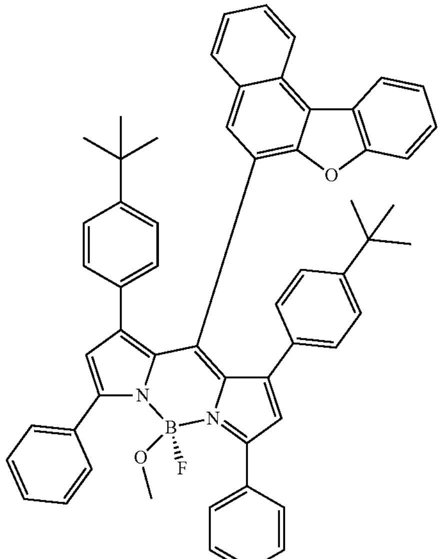
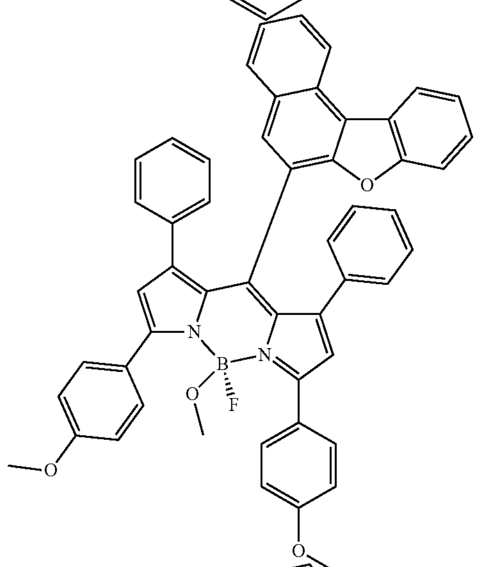
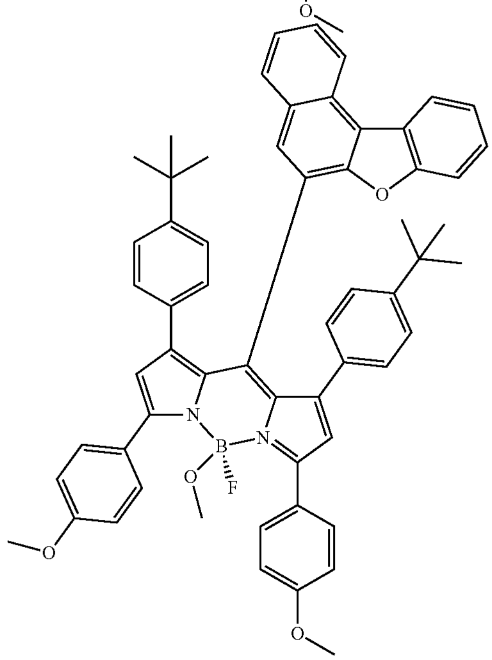
-continued
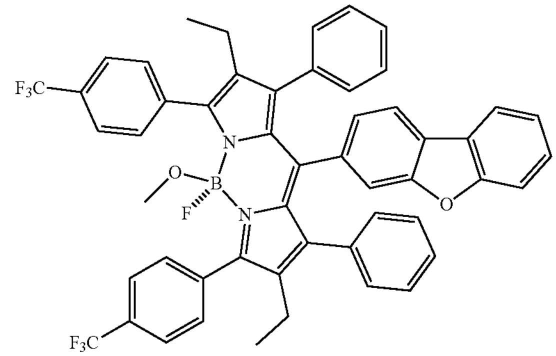
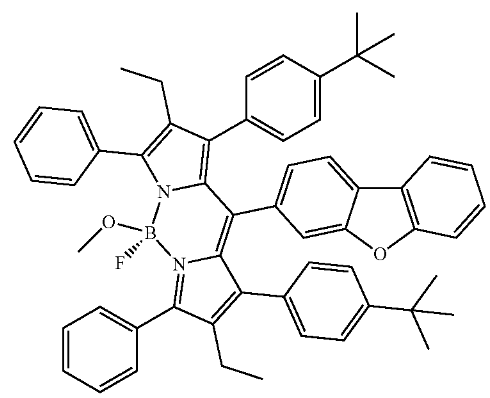
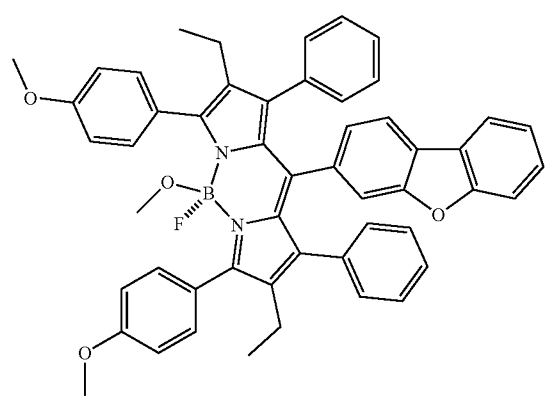
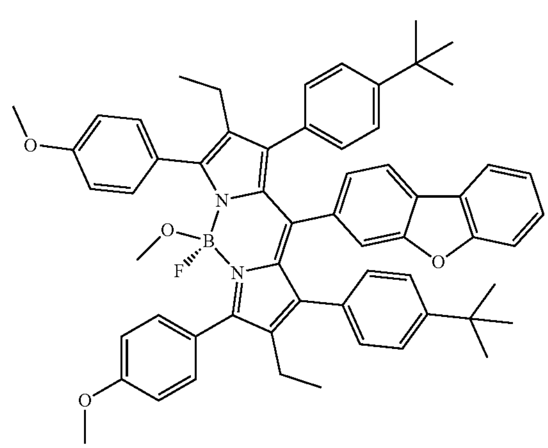

-continued
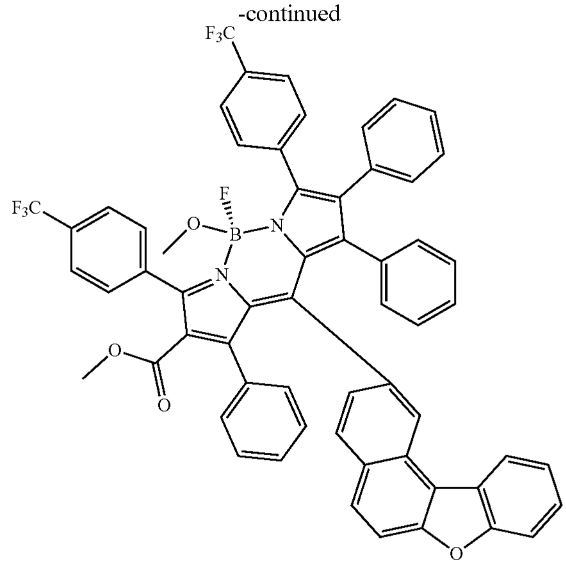
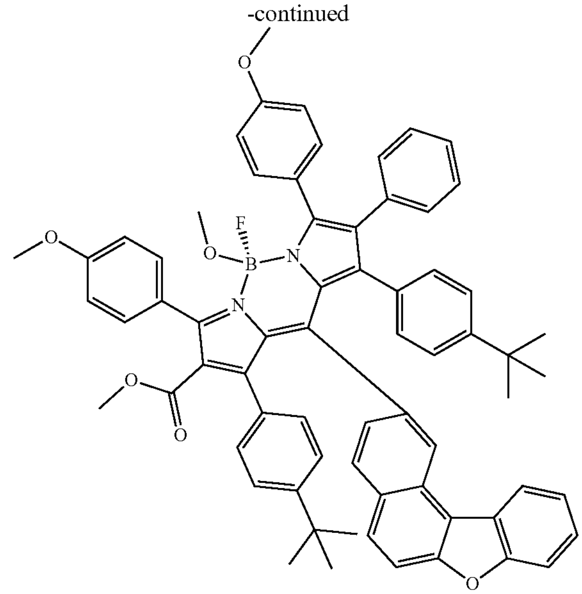
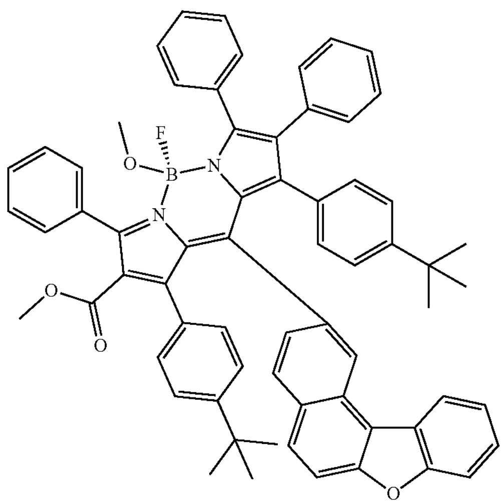
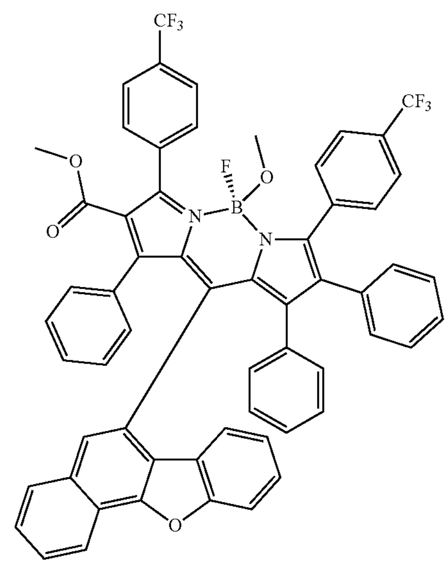
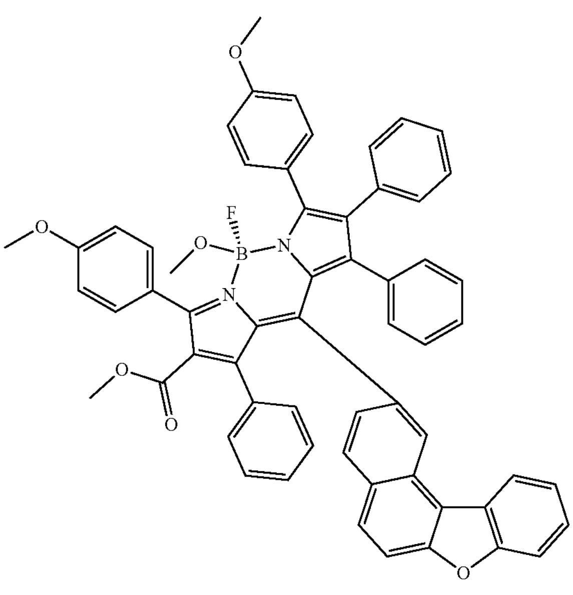
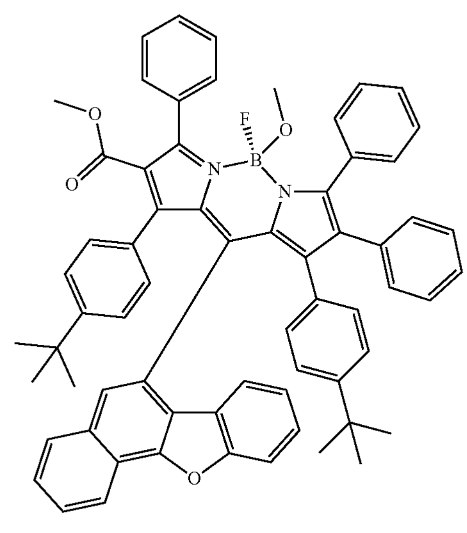

-continued
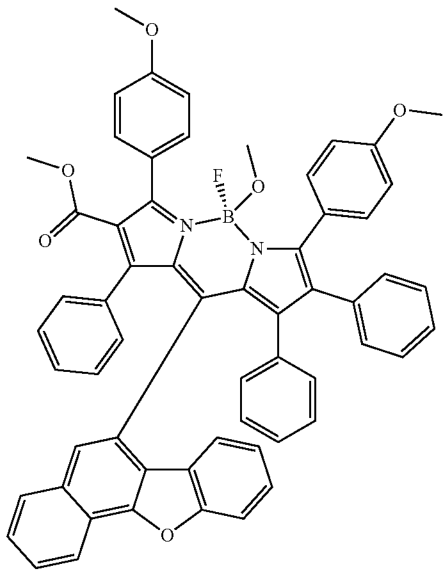
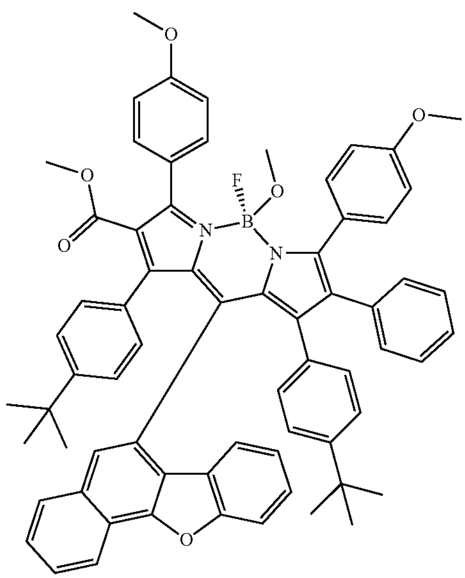
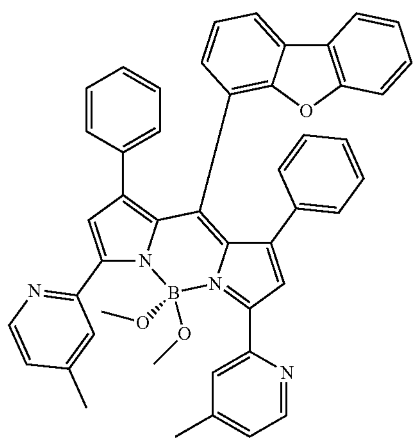
-continued
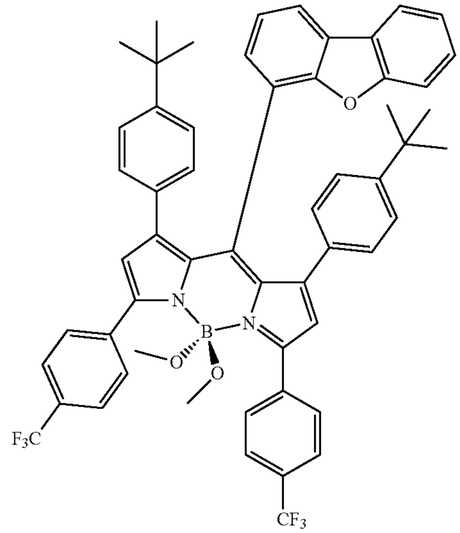
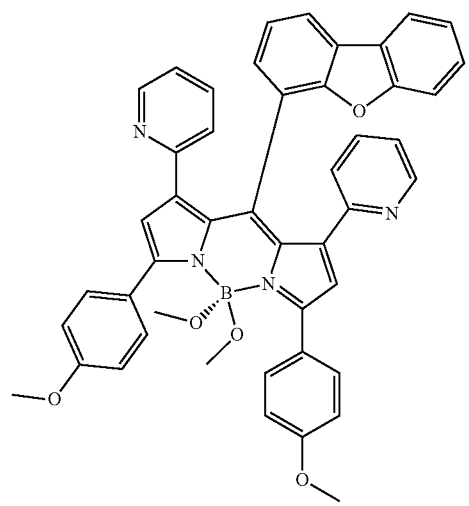
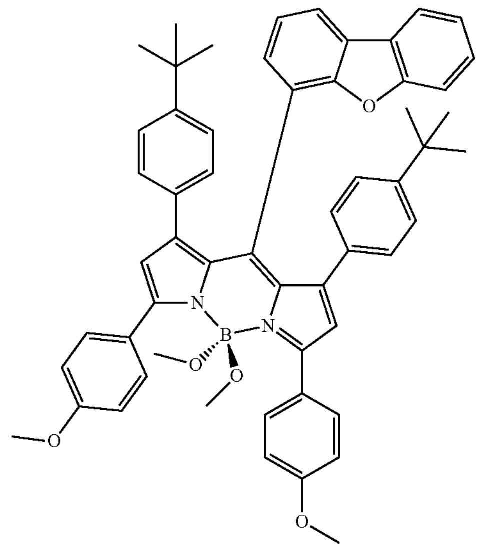

-continued
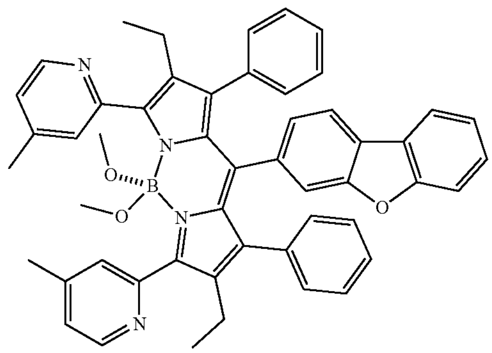
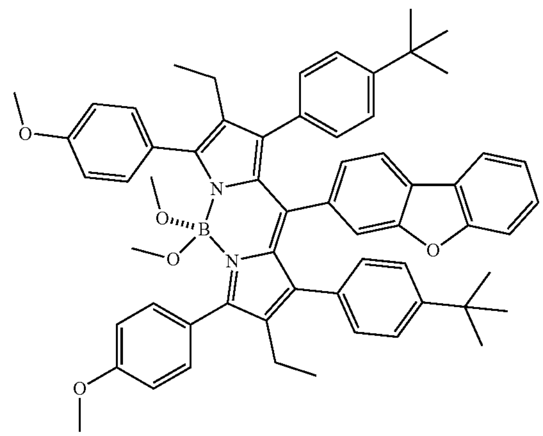
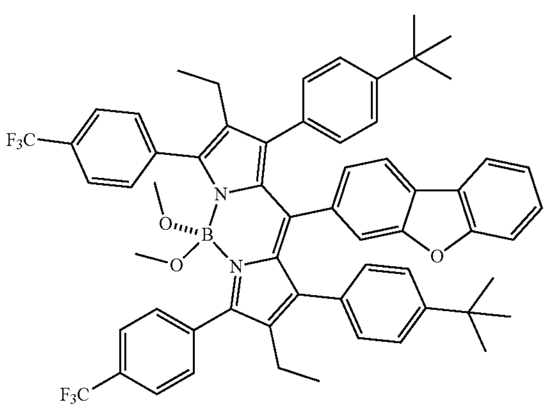
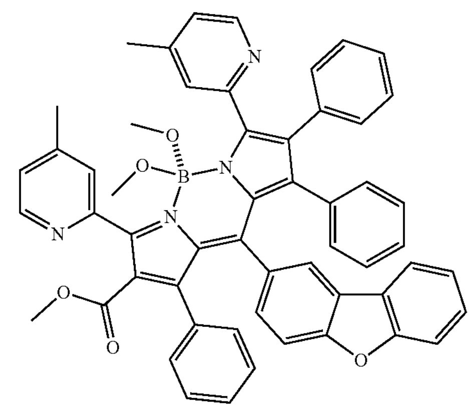
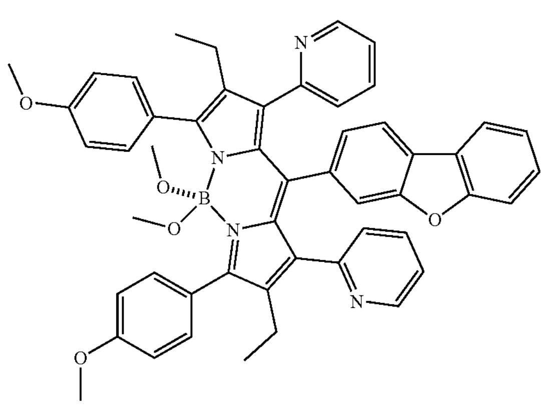
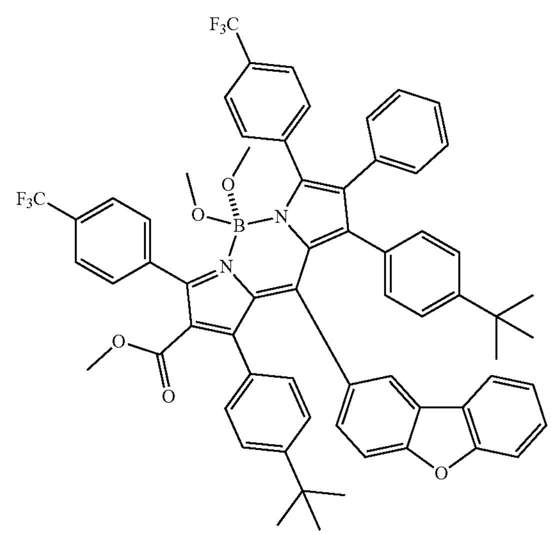
-continued -continued
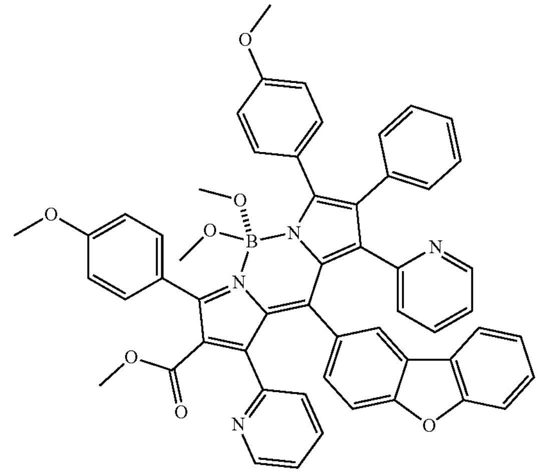
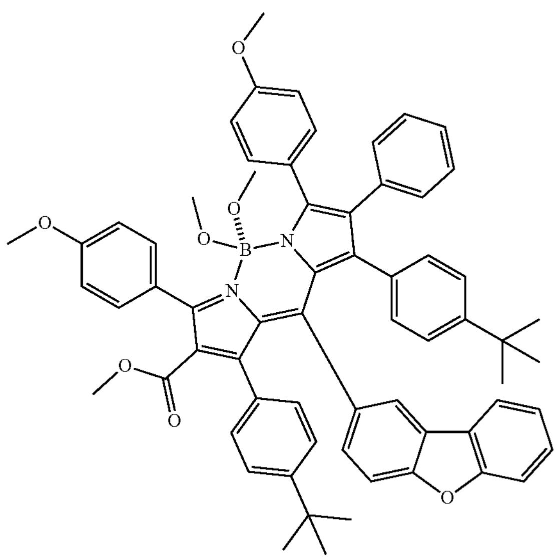
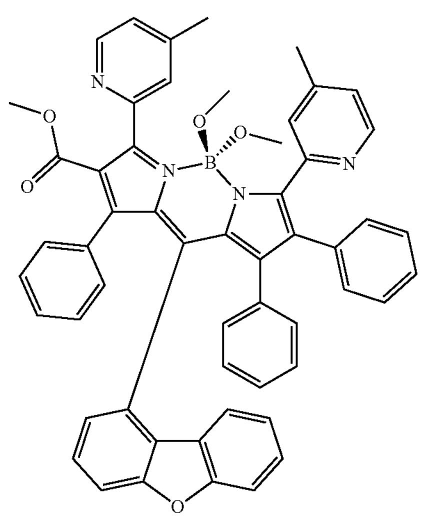
-continued
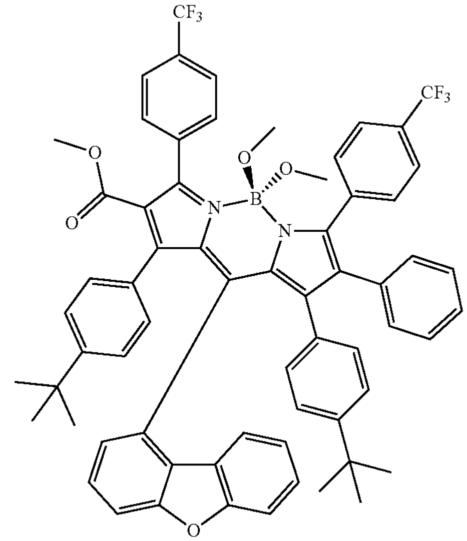
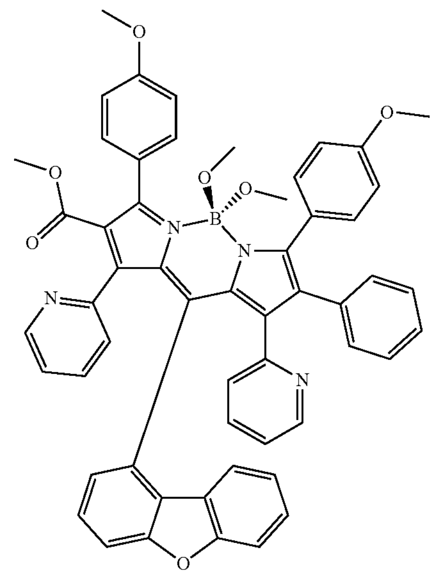
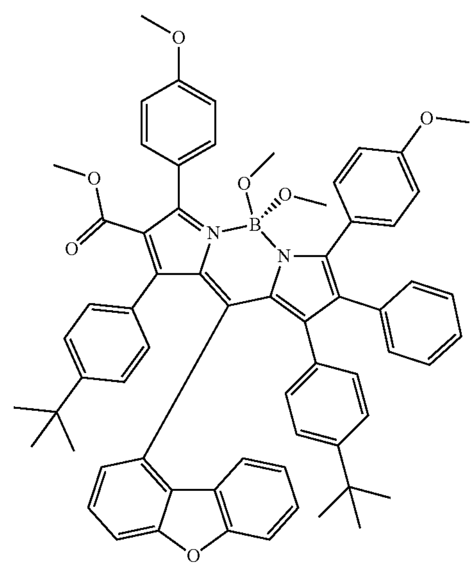

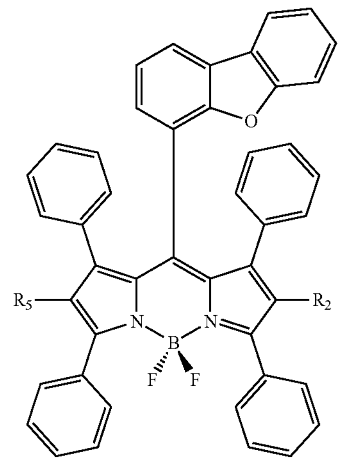
| R2, R5 | compound |
|---|---|
| —H | compound 1-1 |
| 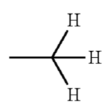 | compound 1-2 |
| —F | compound 1-3 |
| 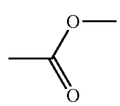 | compound 1-4 |
| 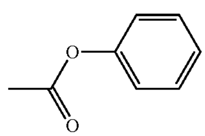 | compound 1-5 |
| —CN | compound 1-6 |
| 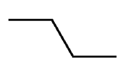 | compound 1-7 |
| 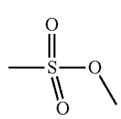 | compound 1-8 |
| 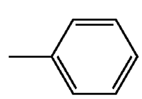 | compound 1-9 |
| 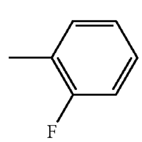 | compound 1-10 |

-continued
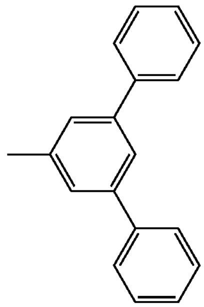 [SMILES: Cc1cc(-c2ccccc2)cc(-c2ccccc2)c1]
compound 1-11
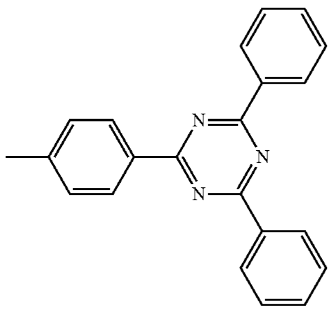 [SMILES: Cc1ccc(-c2nc(-c3ccccc3)nc(-c3ccccc3)n2)cc1]
compound 1-12
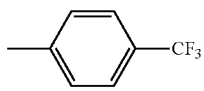
compound 1-13
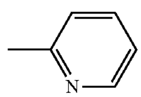
compound 1-14
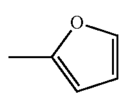
compound 1-15
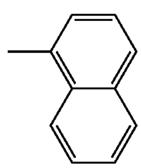
compound 1-16
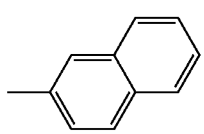
compound 1-17
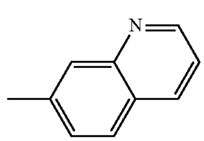
compound 1-18
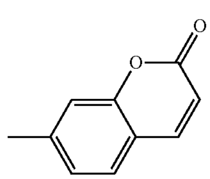
compound 1-19

-continued
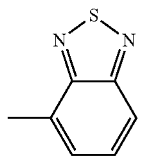
compound 1-20
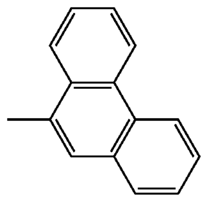
compound 1-21
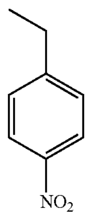
compound 1-22
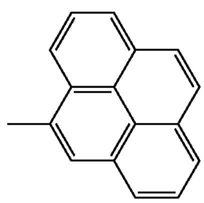 [SMILES: Cc1cc2cccc3ccc4cccc1c4c32]
compound 1-23
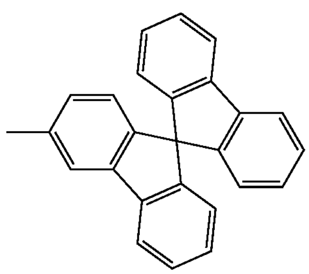 [SMILES: Cc1ccc2c(c1)-c1ccccc1C21c2ccccc2-c2ccccc21]
compound 1-24
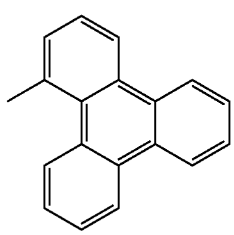 [SMILES: Cc1cccc2c3ccccc3c3ccccc3c12]
compound 1-25
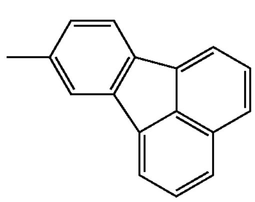 [SMILES: Cc1ccc2c(c1)-c1cccc3cccc-2c13]
compound 1-26

-continued
| R2 | R5 | compound |
|---|---|---|
| —H | 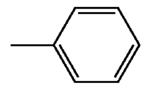 | compound 1-27 |
| 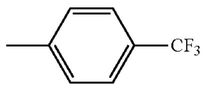 | 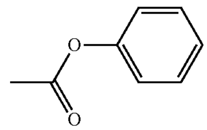 | compound 1-28 |
| —F | 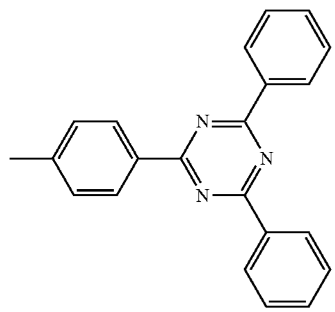 | compound 1-29 |
| —CN | 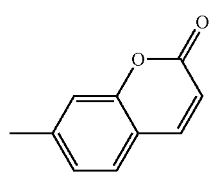 | compound 1-30 |
| 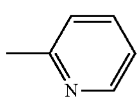 | 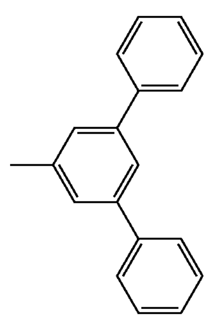 | compound 1-31 |
| 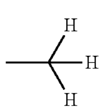 | 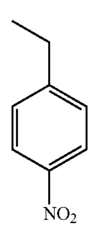 | compound 1-32 |

-continued
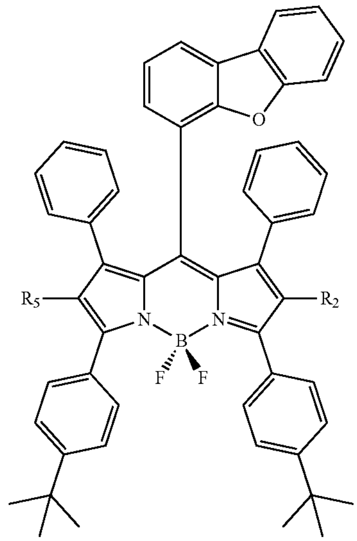
| R2, R5 | compound |
| --- | --- |
| —H | compound 2-1 |
| 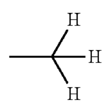 | compound 2-2 |
| —F | compound 2-3 |
| 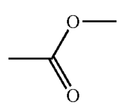 | compound 2-4 |
| 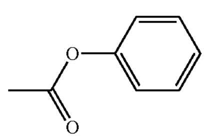 | compound 2-5 |
| —CN | compound 2-6 |
| 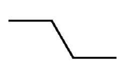 | compound 2-7 |
| 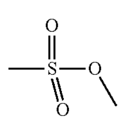 | compound 2-8 |
| 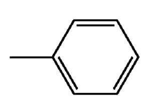 | compound 2-9 |
| 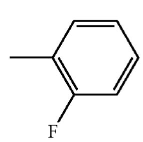 | compound 2-10 |

-continued
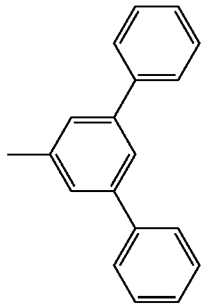 [SMILES: Cc1cc(-c2ccccc2)cc(-c2ccccc2)c1]
compound 2-11
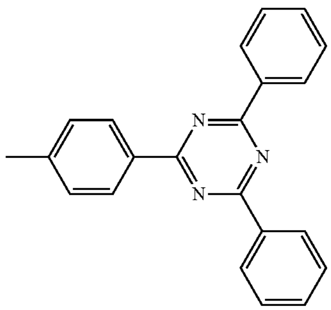 [SMILES: Cc1ccc(-c2nc(-c3ccccc3)nc(-c3ccccc3)n2)cc1]
compound 2-12
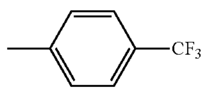
compound 2-13
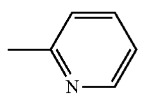
compound 2-14
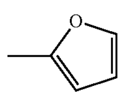
compound 2-15
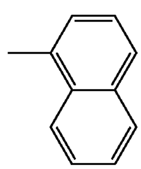
compound 2-16
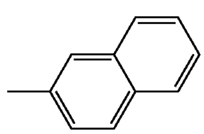
compound 2-17
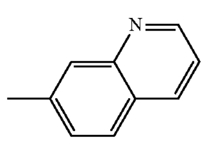
compound 2-18
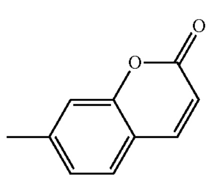
compound 2-19

-continued
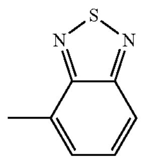
compound 2-20
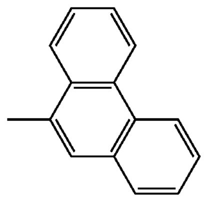
compound 2-21
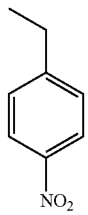
compound 2-22
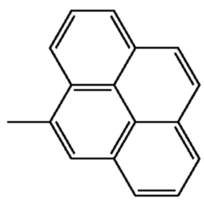 [SMILES: Cc1cc2cccc3ccc4cccc1c4c32]
compound 2-23
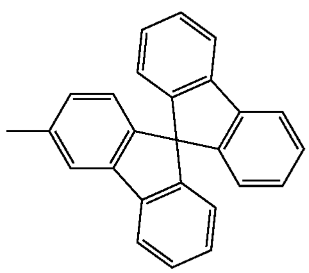 [SMILES: Cc1ccc2c(c1)-c1ccccc1C21c2ccccc2-c2ccccc21]
compound 2-24
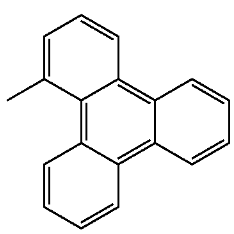 [SMILES: Cc1cccc2c3ccccc3c3ccccc3c12]
compound 2-25
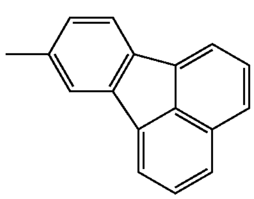 [SMILES: Cc1ccc2c(c1)-c1cccc3cccc-2c13]
compound 2-26

-continued
| R2 | R5 | compound |
|---|---|---|
| —H | 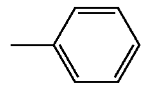 | compound 2-27 |
| 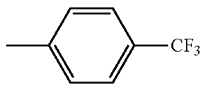 | 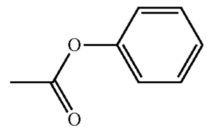 | compound 2-28 |
| —F | 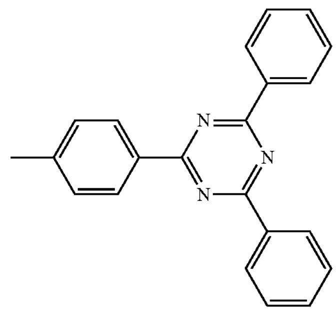 | compound 2-29 |
| —CN | 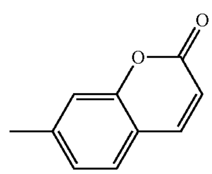 | compound 2-30 |
| 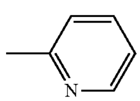 | 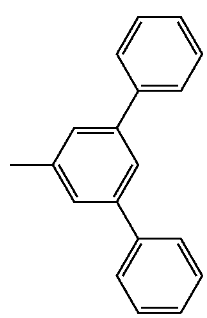 | compound 2-31 |
| 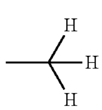 | 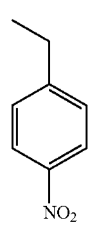 | compound 2-32 |

-continued
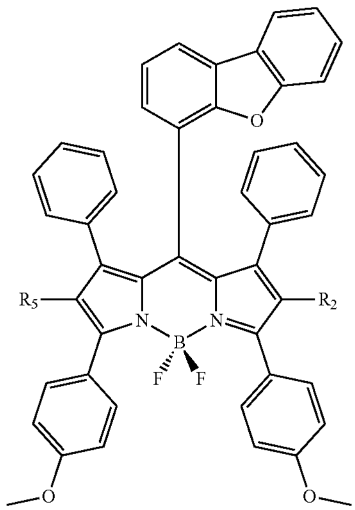
| R2, R5 | compound |
|---|---|
| —H | compound 3-1 |
| 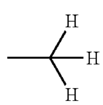 | compound 3-2 |
| —F | compound 3-3 |
| 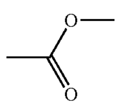 | compound 3-4 |
| 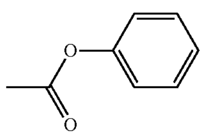 | compound 3-5 |
| —CN | compound 3-6 |
| 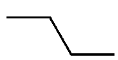 | compound 3-7 |
| 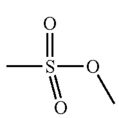 | compound 3-8 |
| 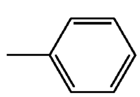 | compound 3-9 |
| 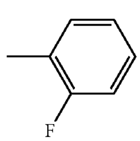 | compound 3-10 |

-continued
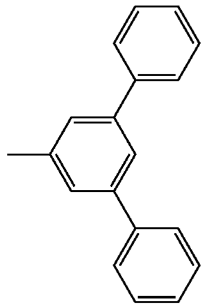 [SMILES: Cc1cc(-c2ccccc2)cc(-c2ccccc2)c1]
compound 3-11
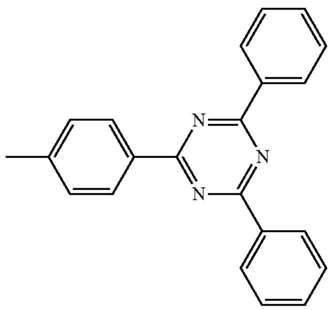 [SMILES: Cc1ccc(-c2nc(-c3ccccc3)nc(-c3ccccc3)n2)cc1]
compound 3-12
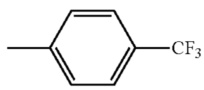
compound 3-13
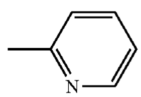
compound 3-14
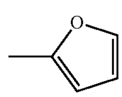
compound 3-15
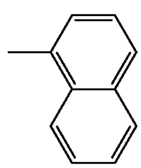
compound 3-16
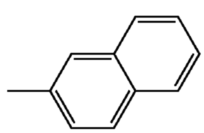
compound 3-17
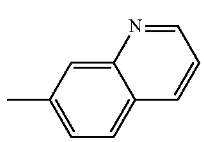
compound 3-18
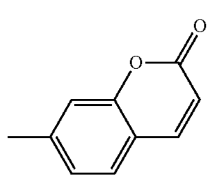
compound 3-19

-continued
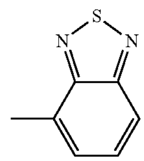
compound 3-20
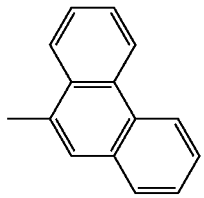
compound 3-21
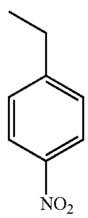
compound 3-22
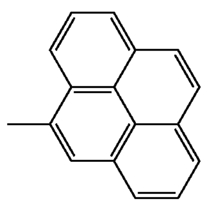 [SMILES: Cc1cc2cccc3ccc4cccc1c4c32]
compound 3-23
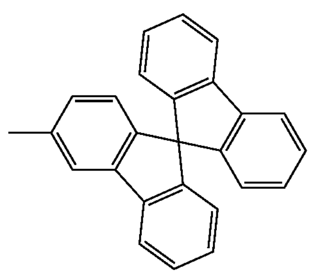 [SMILES: Cc1ccc2c(c1)-c1ccccc1C21c2ccccc2-c2ccccc21]
compound 3-24
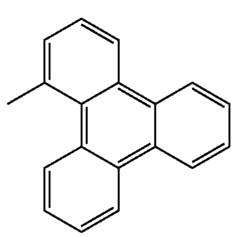 [SMILES: Cc1cccc2c3ccccc3c3ccccc3c12]
compound 3-25
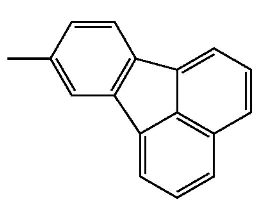 [SMILES: Cc1ccc2c(c1)-c1cccc3cccc-2c13]
compound 3-26

-continued
| R2 | R5 | compound |
|---|---|---|
| —H | 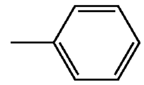 | compound 3-27 |
| 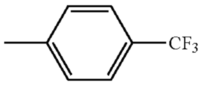 | 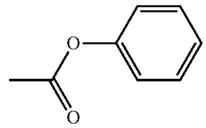 | compound 3-28 |
| —F | 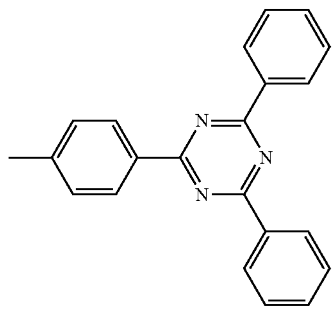 | compound 3-29 |
| —CN | 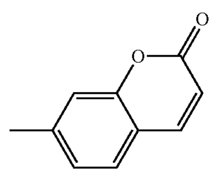 | compound 3-30 |
| 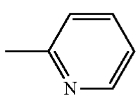 | 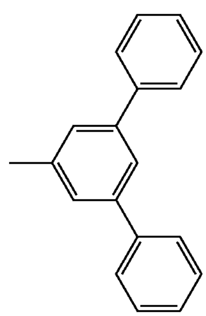 | compound 3-31 |
| 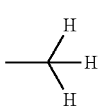 | 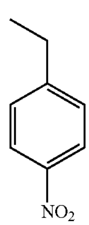 | compound 3-32 |

-continued
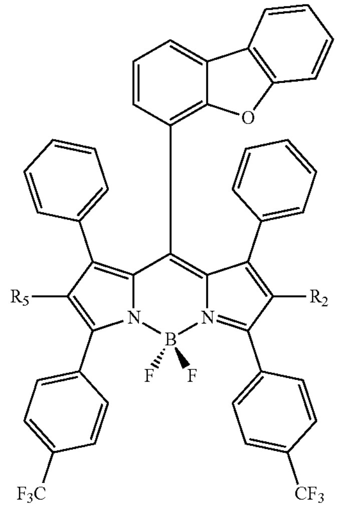
| R2, R5 | compound |
| --- | --- |
| —H | compound 4-1 |
| 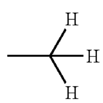 | compound 4-2 |
| —F | compound 4-3 |
| 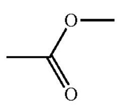 | compound 4-4 |
| 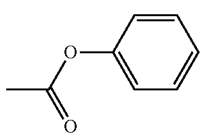 | compound 4-5 |
| —CN | compound 4-6 |
| 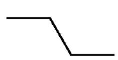 | compound 4-7 |
| 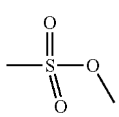 | compound 4-8 |
| 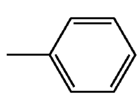 | compound 4-9 |
| 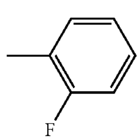 | compound 4-10 |

-continued
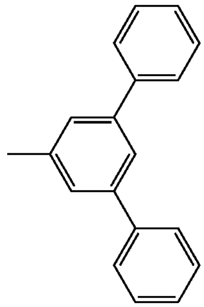 [SMILES: Cc1cc(-c2ccccc2)cc(-c2ccccc2)c1]
compound 4-11
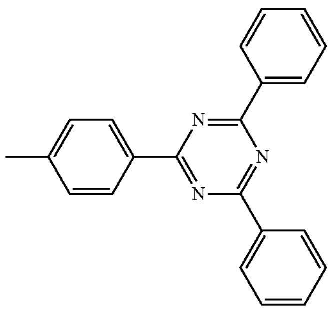 [SMILES: Cc1ccc(-c2nc(-c3ccccc3)nc(-c3ccccc3)n2)cc1]
compound 4-12
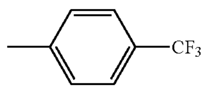
compound 4-13
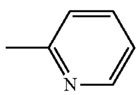
compound 4-14
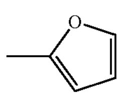
compound 4-15
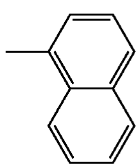
compound 4-16
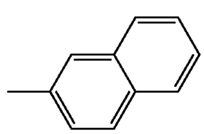
compound 4-17
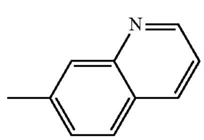
compound 4-18
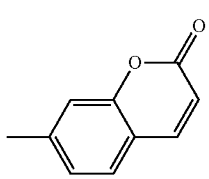
compound 4-19

-continued
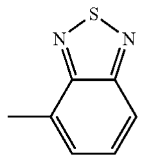
compound 4-20
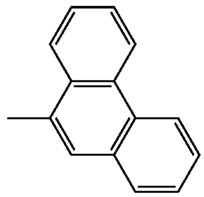
compound 4-21
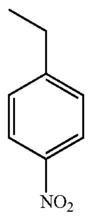
compound 4-22
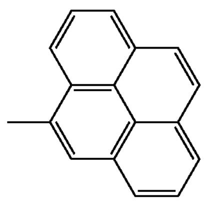 [SMILES: Cc1cc2cccc3ccc4cccc1c4c32]
compound 4-23
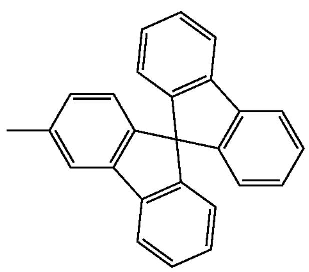 [SMILES: Cc1ccc2c(c1)-c1ccccc1C21c2ccccc2-c2ccccc21]
compound 4-24
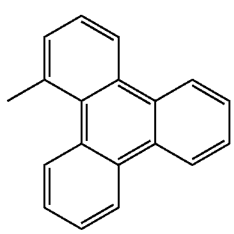 [SMILES: Cc1cccc2c3ccccc3c3ccccc3c12]
compound 4-25
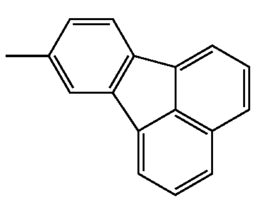 [SMILES: Cc1ccc2c(c1)-c1cccc3cccc-2c13]
compound 4-26

-continued
| R2 | R5 | compound |
|---|---|---|
| —H | 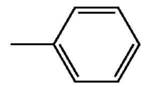 | compound 4-27 |
| 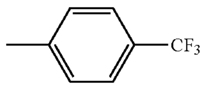 | 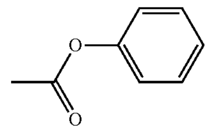 | compound 4-28 |
| —F | 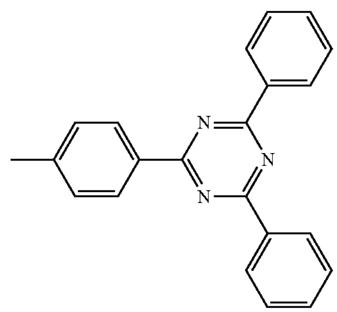 | compound 4-29 |
| —CN | 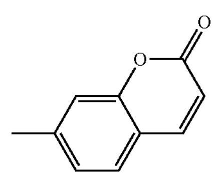 | compound 4-30 |
| 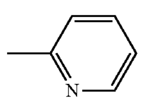 | 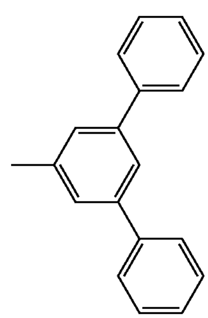 | compound 4-31 |
| 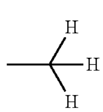 | 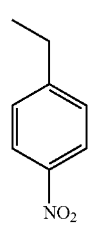 | compound 4-32 |

-continued
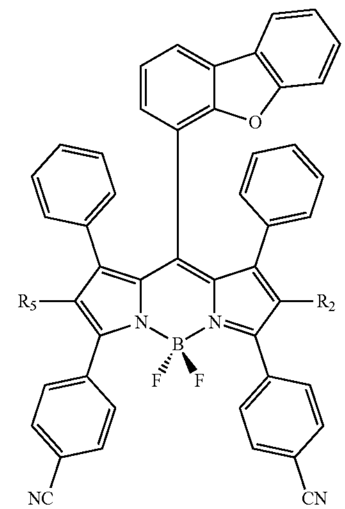
| R2, R5 | compound |
| --- | --- |
| —H | compound 5-1 |
| 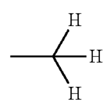 | compound 5-2 |
| —F | compound 5-3 |
| 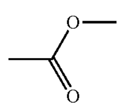 | compound 5-4 |
| 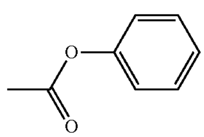 | compound 5-5 |
| —CN | compound 5-6 |
| 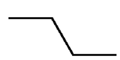 | compound 5-7 |
| 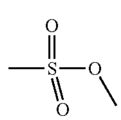 | compound 5-8 |
| 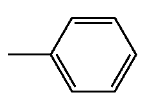 | compound 5-9 |
| 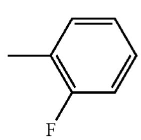 | compound 5-10 |

-continued
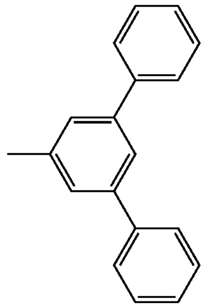 [SMILES: Cc1cc(-c2ccccc2)cc(-c2ccccc2)c1]
compound 5-11
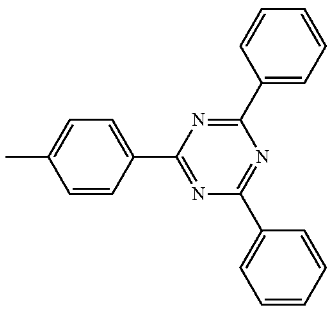 [SMILES: Cc1ccc(-c2nc(-c3ccccc3)nc(-c3ccccc3)n2)cc1]
compound 5-12
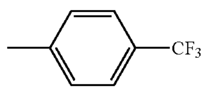
compound 5-13
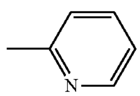
compound 5-14
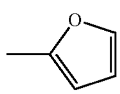
compound 5-15
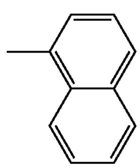
compound 5-16
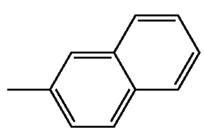
compound 5-17
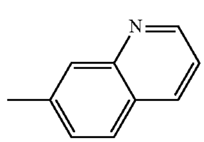
compound 5-18
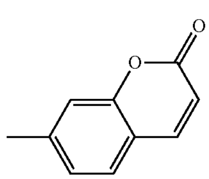
compound 5-19

-continued
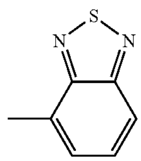
compound 5-20
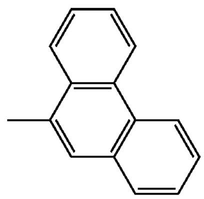
compound 5-21
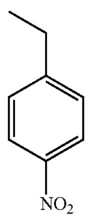
compound 5-22
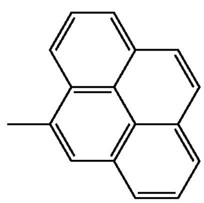 [SMILES: Cc1cc2cccc3ccc4cccc1c4c32]
compound 5-23
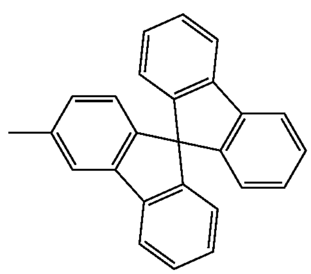 [SMILES: Cc1ccc2c(c1)-c1ccccc1C21c2ccccc2-c2ccccc21]
compound 5-24
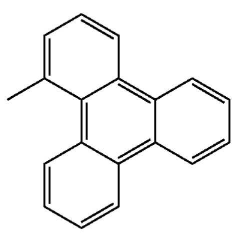 [SMILES: Cc1cccc2c3ccccc3c3ccccc3c12]
compound 5-25
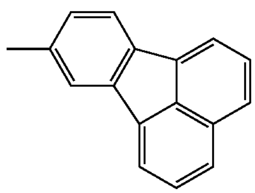 [SMILES: Cc1ccc2c(c1)-c1cccc3cccc-2c13]
compound 5-26

-continued
| R2 | R5 | compound |
|---|---|---|
| —H | 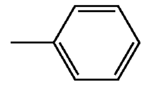 | compound 5-27 |
| 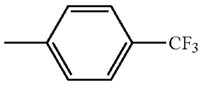 | 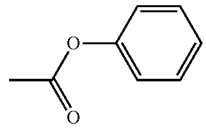 | compound 5-28 |
| —F | 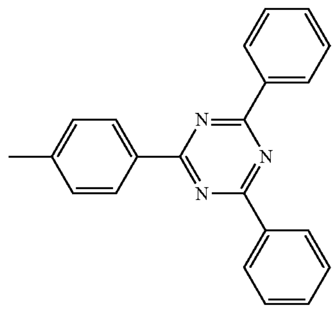 | compound 5-29 |
| —CN | 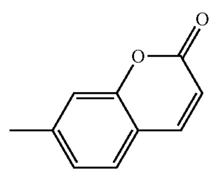 | compound 5-30 |
| 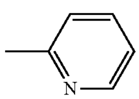 | 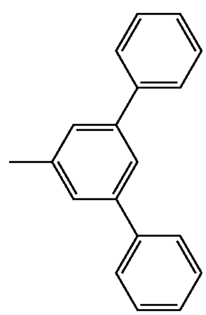 | compound 5-31 |
| 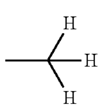 | 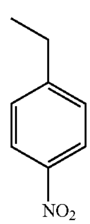 | compound 5-32 |

-continued
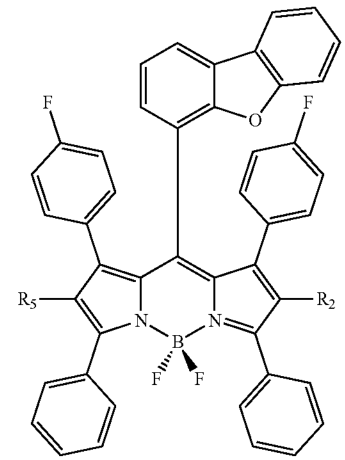
| R2, R5 | compound |
| --- | --- |
| —H | compound 6-1 |
| 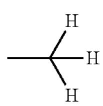 | compound 6-2 |
| —F | compound 6-3 |
| 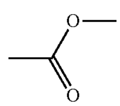 | compound 6-4 |
| 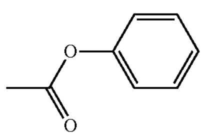 | compound 6-5 |
| —CN | compound 6-6 |
| 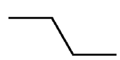 | compound 6-7 |
| 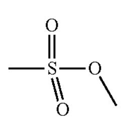 | compound 6-8 |
| 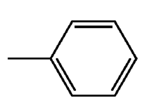 | compound 6-9 |
| 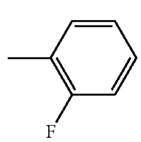 | compound 6-10 |

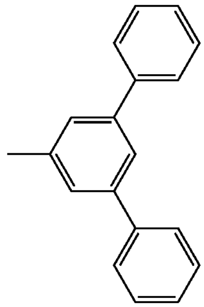 [SMILES: Cc1cc(-c2ccccc2)cc(-c2ccccc2)c1]
compound 6-11
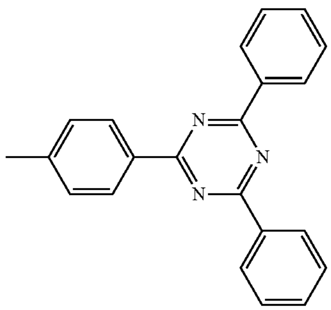 [SMILES: Cc1ccc(-c2nc(-c3ccccc3)nc(-c3ccccc3)n2)cc1]
compound 6-12
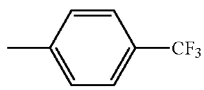
compound 6-13
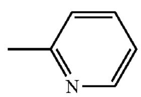
compound 6-14
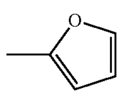
compound 6-15
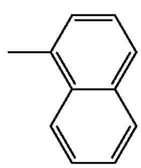
compound 6-16
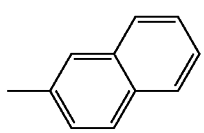
compound 6-17
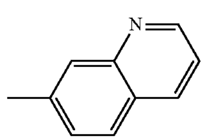
compound 6-18
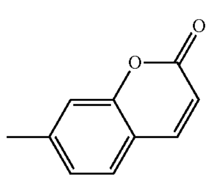
compound 6-19

-continued
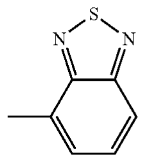
compound 6-20
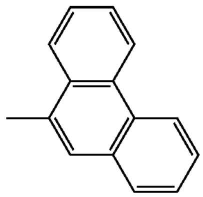
compound 6-21
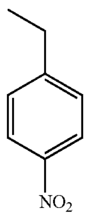
compound 6-22
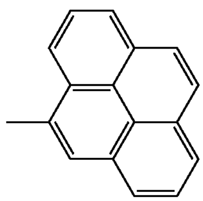 [SMILES: Cc1cc2cccc3ccc4cccc1c4c32]
compound 6-23
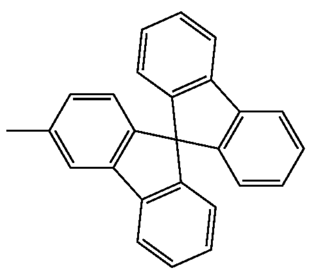 [SMILES: Cc1ccc2c(c1)-c1ccccc1C21c2ccccc2-c2ccccc21]
compound 6-24
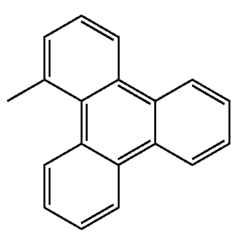 [SMILES: Cc1cccc2c3ccccc3c3ccccc3c12]
compound 6-25
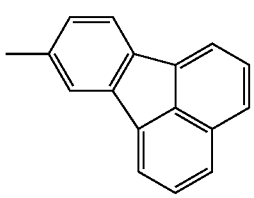 [SMILES: Cc1ccc2c(c1)-c1cccc3cccc-2c13]
compound 6-26

-continued
| R2 | R5 | compound |
|---|---|---|
| —H | 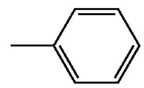 | compound 6-27 |
| 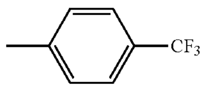 | 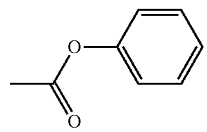 | compound 6-28 |
| —F | 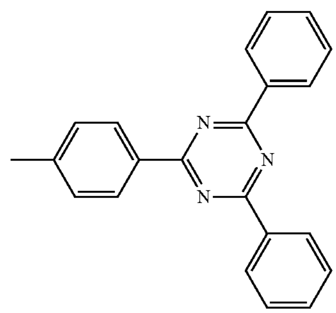 | compound 6-29 |
| —CN | 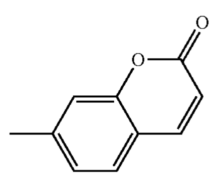 | compound 6-30 |
| 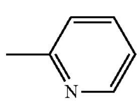 | 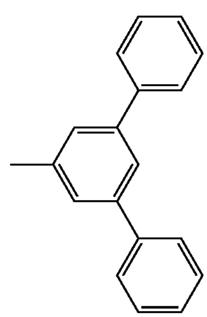 | compound 6-31 |
| 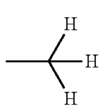 | 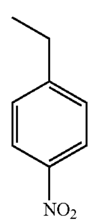 | compound 6-32 |

-continued
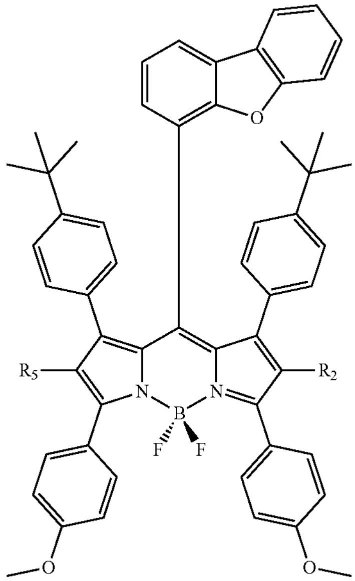
| R2, R5 | compound |
|---|---|
| —H | compound 7-1 |
| 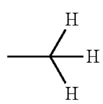 | compound 7-2 |
| —F | compound 7-3 |
| 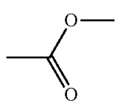 | compound 7-4 |
| 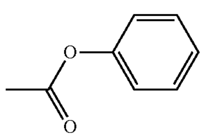 | compound 7-5 |
| —CN | compound 7-6 |
| 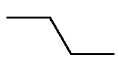 | compound 7-7 |
| 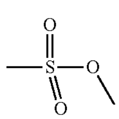 | compound 7-8 |
| 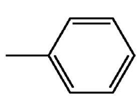 | compound 7-9 |
| 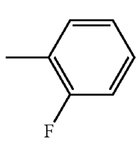 | compound 7-10 |

-continued
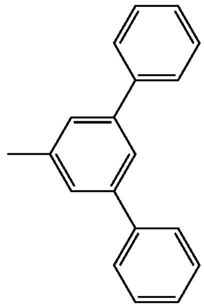 [SMILES: Cc1cc(-c2ccccc2)cc(-c2ccccc2)c1]
compound 7-11
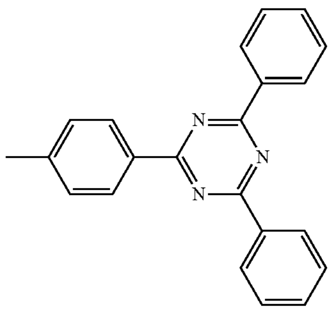 [SMILES: Cc1ccc(-c2nc(-c3ccccc3)nc(-c3ccccc3)n2)cc1]
compound 7-12
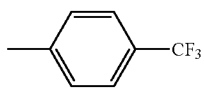
compound 7-13
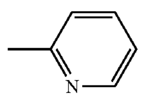
compound 7-14
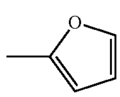
compound 7-15
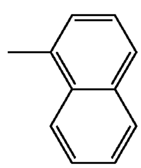
compound 7-16
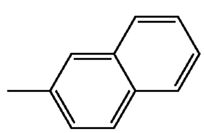
compound 7-17
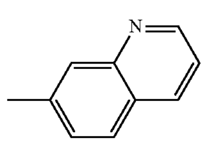
compound 7-18
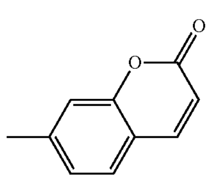
compound 7-19

-continued
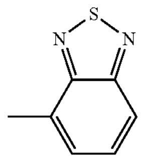
compound 7-20
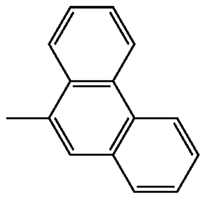
compound 7-21
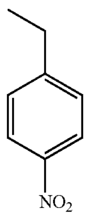
compound 7-22
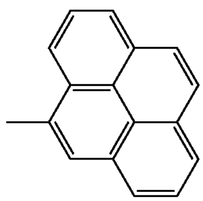 [SMILES: Cc1cc2cccc3ccc4cccc1c4c32]
compound 7-23
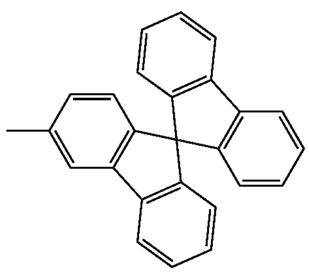 [SMILES: Cc1ccc2c(c1)-c1ccccc1C21c2ccccc2-c2ccccc21]
compound 7-24
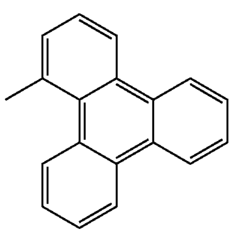 [SMILES: Cc1cccc2c3ccccc3c3ccccc3c12]
compound 7-25
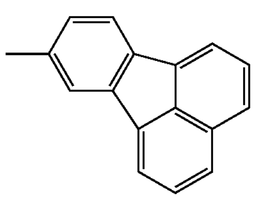 [SMILES: Cc1ccc2c(c1)-c1cccc3cccc-2c13]
compound 7-26

-continued
| R2 | R5 | compound |
| --- | --- | --- |
| —H | 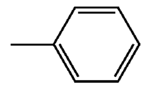 | compound 7-27 |
| 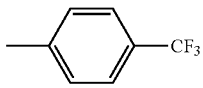 | 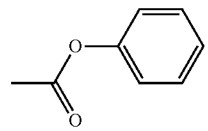 | compound 7-28 |
| —F | 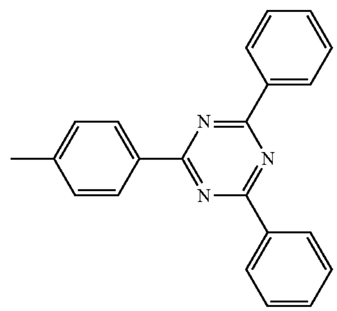 | compound 7-29 |
| —CN | 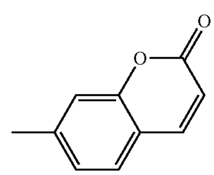 | compound 7-30 |
| 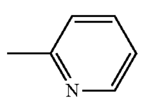 | 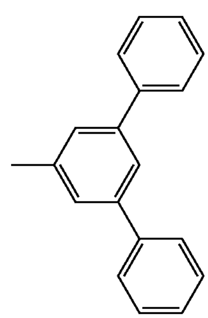 | compound 7-31 |
| 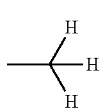 | 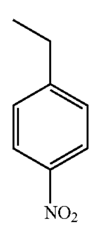 | compound 7-32 |

-continued
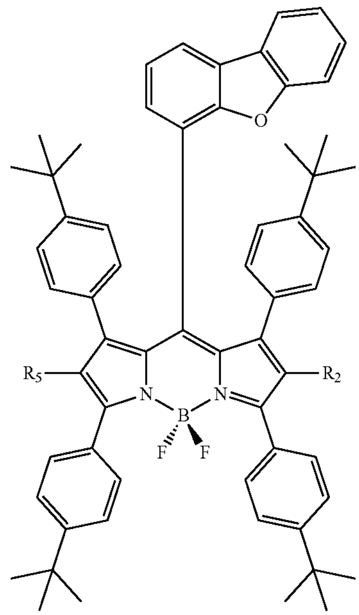
| R2, R5 | compound |
|---|---|
| —H | compound 8-1 |
| 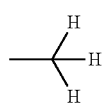 | compound 8-2 |
| —F | compound 8-3 |
| 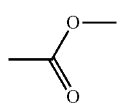 | compound 8-4 |
| 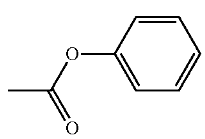 | compound 8-5 |
| —CN | compound 8-6 |
| 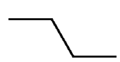 | compound 8-7 |
| 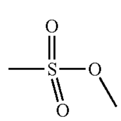 | compound 8-8 |
| 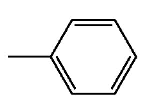 | compound 8-9 |
| 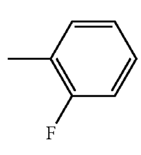 | compound 8-10 |

-continued
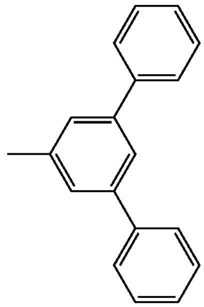 [SMILES: Cc1cc(-c2ccccc2)cc(-c2ccccc2)c1]
compound 8-11
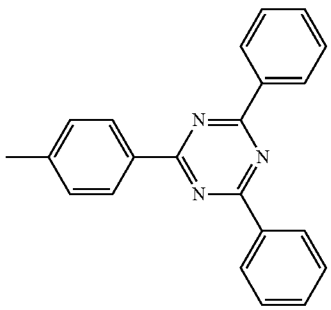 [SMILES: Cc1ccc(-c2nc(-c3ccccc3)nc(-c3ccccc3)n2)cc1]
compound 8-12
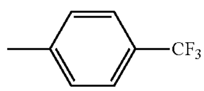
compound 8-13
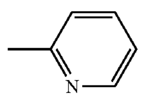
compound 8-14
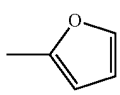
compound 8-15
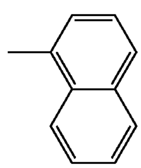
compound 8-16
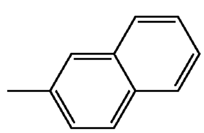
compound 8-17
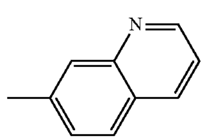
compound 8-18
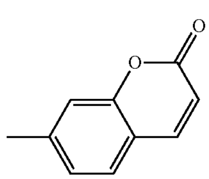
compound 8-19

-continued
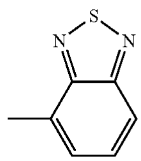
compound 8-20
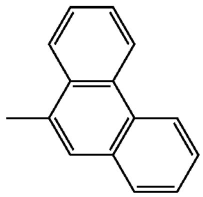
compound 8-21
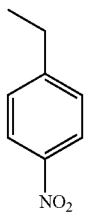
compound 8-22
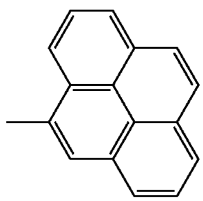 [SMILES: Cc1cc2cccc3ccc4cccc1c4c32]
compound 8-23
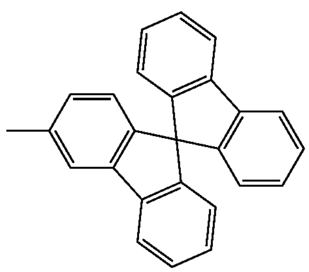 [SMILES: Cc1ccc2c(c1)-c1ccccc1C21c2ccccc2-c2ccccc21]
compound 8-24
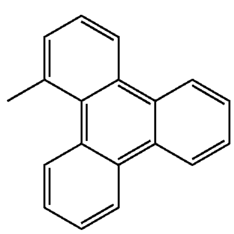 [SMILES: Cc1cccc2c3ccccc3c3ccccc3c12]
compound 8-25
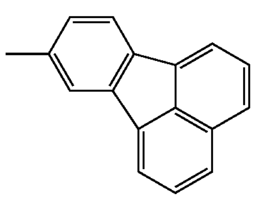 [SMILES: Cc1ccc2c(c1)-c1cccc3cccc-2c13]
compound 8-26

-continued
| R2 | R5 | compound |
|---|---|---|
| —H | 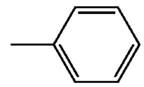 | compound 8-27 |
| 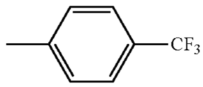 | 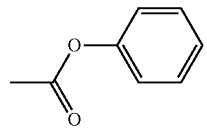 | compound 8-28 |
| —F | 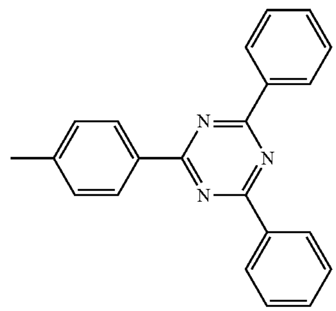 | compound 8-29 |
| —CN | 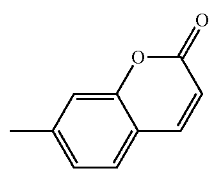 | compound 8-30 |
| 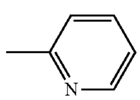 | 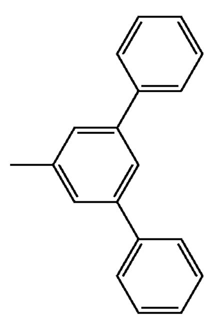 | compound 8-31 |
| 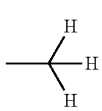 | 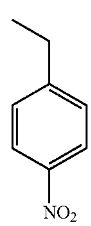 | compound 8-32 |

-continued
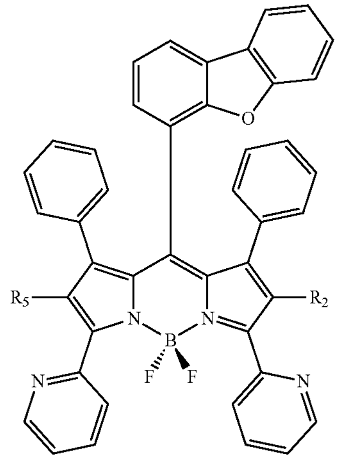
| R2, R5 | compound |
|---|---|
| —H | compound 9-1 |
| 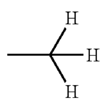  | compound 9-2 |
| —F | compound 9-3 |
| 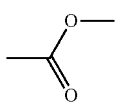  | compound 9-4 |
| 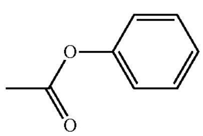  | compound 9-5 |
| —CN | compound 9-6 |
| 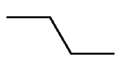 | compound 9-7 |
| 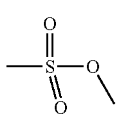  | compound 9-8 |
| 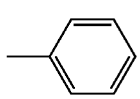 | compound 9-9 |
| 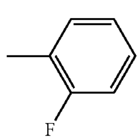  | compound 9-10 |

-continued
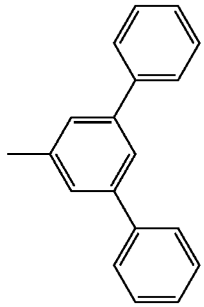 [SMILES: Cc1cc(-c2ccccc2)cc(-c2ccccc2)c1]
compound 9-11
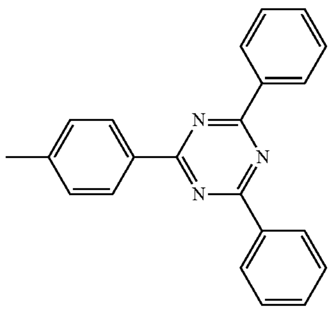 [SMILES: Cc1ccc(-c2nc(-c3ccccc3)nc(-c3ccccc3)n2)cc1]
compound 9-12
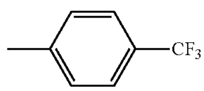
compound 9-13
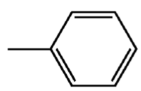
compound 9-14
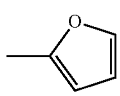
compound 9-15
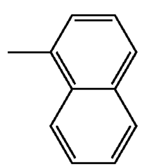
compound 9-16
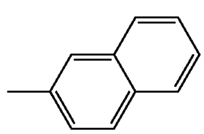
compound 9-17
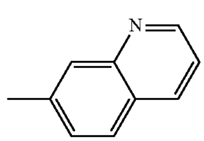
compound 9-18
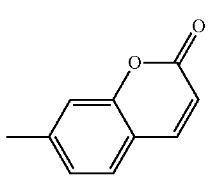
compound 9-19

-continued
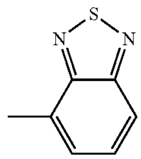
compound 9-20
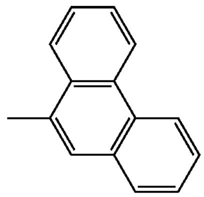
compound 9-21
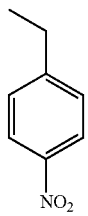
compound 9-22
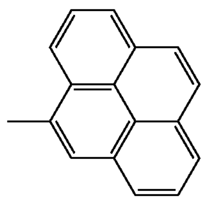 [SMILES: Cc1cc2cccc3ccc4cccc1c4c32]
compound 9-23
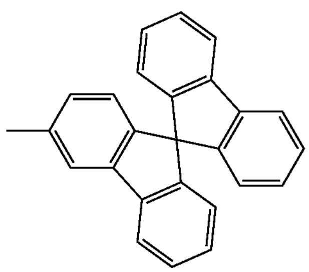 [SMILES: Cc1ccc2c(c1)-c1ccccc1C21c2ccccc2-c2ccccc21]
compound 9-24
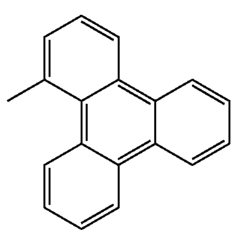 [SMILES: Cc1cccc2c3ccccc3c3ccccc3c12]
compound 9-25
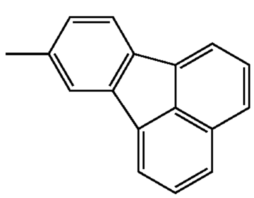 [SMILES: Cc1ccc2c(c1)-c1cccc3cccc-2c13]
compound 9-26

-continued
| R2 | R5 | compound |
|---|---|---|
| —H | 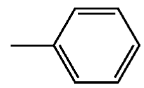 | compound 9-27 |
| 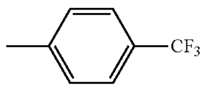 | 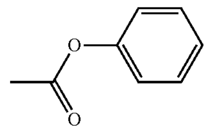 | compound 9-28 |
| —F | 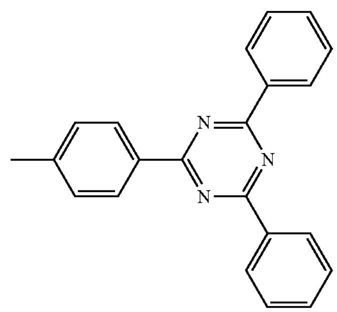 | compound 9-29 |
| —CN | 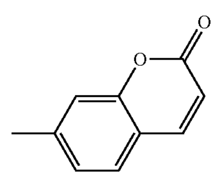 | compound 9-30 |
| 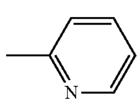 | 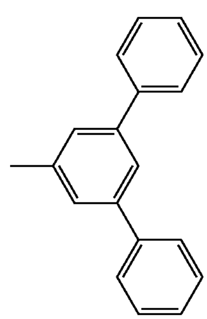 | compound 9-31 |
| 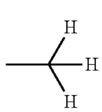 | 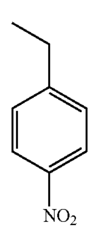 | compound 9-32 |

-continued
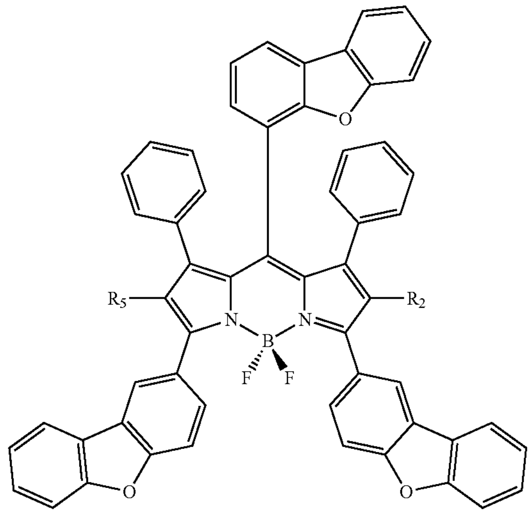
| R2, R5 | compound |
|---|---|
| —H | compound 10-1 |
| 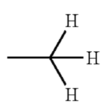 | compound 10-2 |
| —F | compound 10-3 |
| 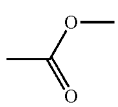 | compound 10-4 |
| 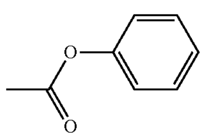 | compound 10-5 |
| —CN | compound 10-6 |
| 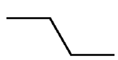 | compound 10-7 |
| 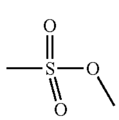 | compound 10-8 |
| 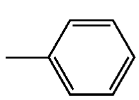 | compound 10-9 |
| 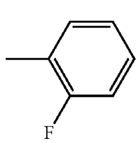 | compound 10-10 |

-continued
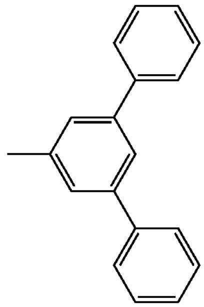 [SMILES: Cc1cc(-c2ccccc2)cc(-c2ccccc2)c1]
compound 10-11
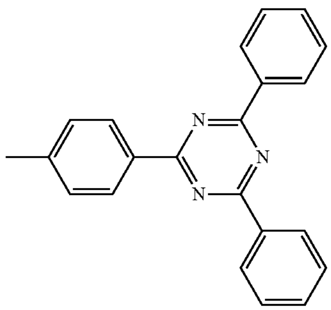 [SMILES: Cc1ccc(-c2nc(-c3ccccc3)nc(-c3ccccc3)n2)cc1]
compound 10-12
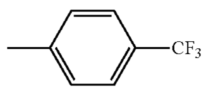
compound 10-13
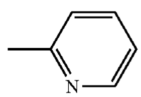
compound 10-14
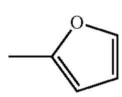
compound 10-15
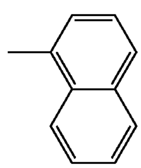
compound 10-16
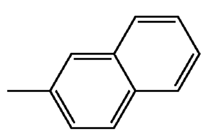
compound 10-17
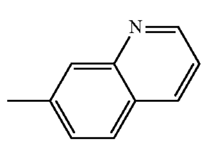
compound 10-18
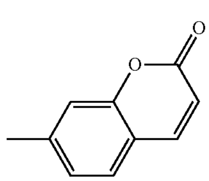
compound 10-19

-continued
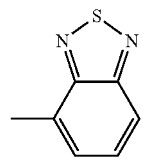
compound 10-20
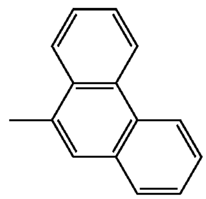
compound 10-21
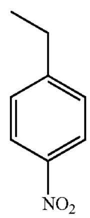
compound 10-22
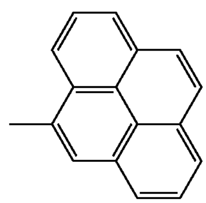 [SMILES: Cc1cc2cccc3ccc4cccc1c4c32]
compound 10-23
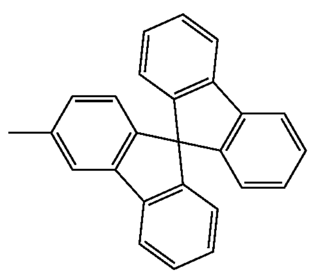 [SMILES: Cc1ccc2c(c1)-c1ccccc1C21c2ccccc2-c2ccccc21]
compound 10-24
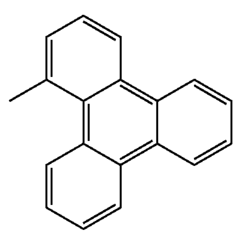 [SMILES: Cc1cccc2c3ccccc3c3ccccc3c12]
compound 10-25
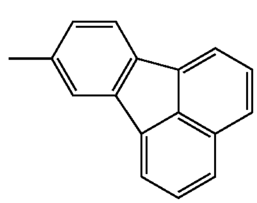 [SMILES: Cc1ccc2c(c1)-c1cccc3cccc-2c13]
compound 10-26

-continued
| R2 | R5 | compound |
| --- | --- | --- |
| —H | 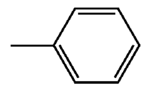 | compound 10-27 |
| 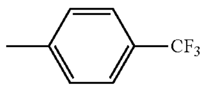 | 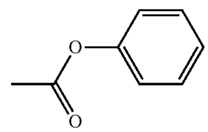 | compound 10-28 |
| —F | 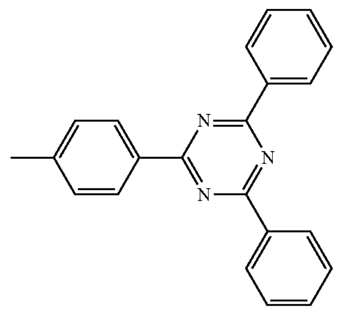 | compound 10-29 |
| —CN | 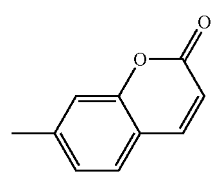 | compound 10-30 |
| 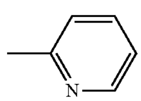 | 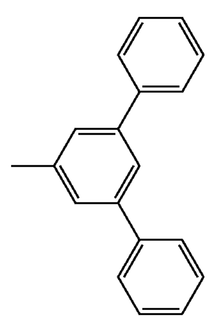 | compound 10-31 |
| 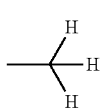 | 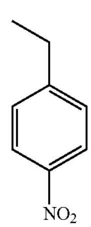 | compound 10-32 |

-continued
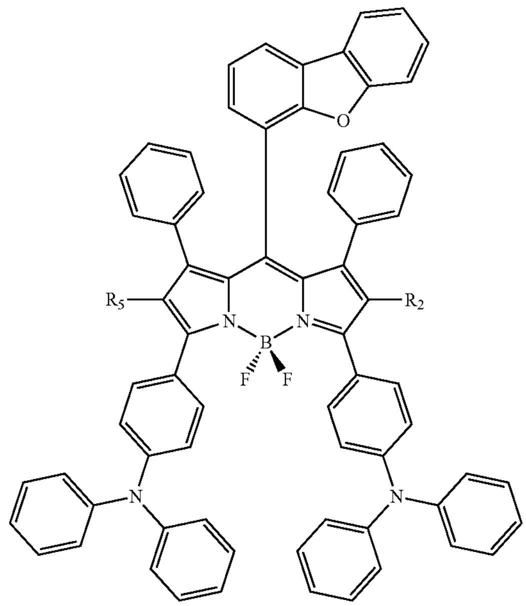
| R2, R5 | compound |
| --- | --- |
| —H | compound 11-1 |
| 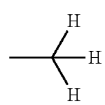 | compound 11-2 |
| —F | compound 11-3 |
| 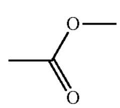 | compound 11-4 |
| 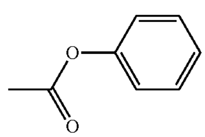 | compound 11-5 |
| —CN | compound 11-6 |
| 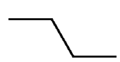 | compound 11-7 |
| 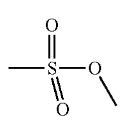 | compound 11-8 |
| 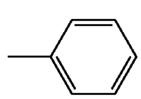 | compound 11-9 |
| 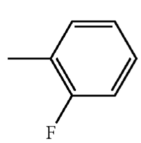 | compound 11-10 |

-continued
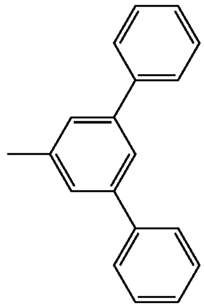 [SMILES: Cc1cc(-c2ccccc2)cc(-c2ccccc2)c1]
compound 11-11
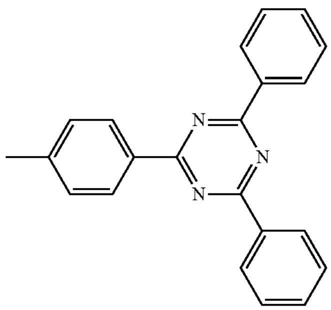 [SMILES: Cc1ccc(-c2nc(-c3ccccc3)nc(-c3ccccc3)n2)cc1]
compound 11-12
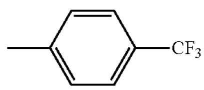
compound 11-13
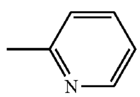
compound 11-14
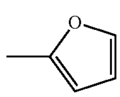
compound 11-15
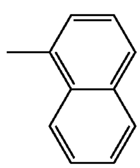
compound 11-16
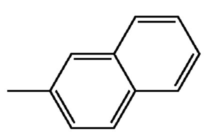
compound 11-17
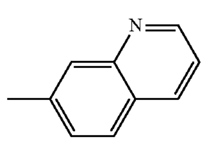
compound 11-18
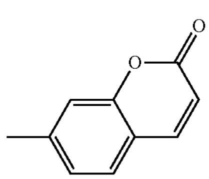
compound 11-19

-continued
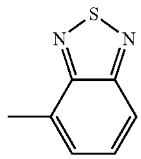
compound 11-20
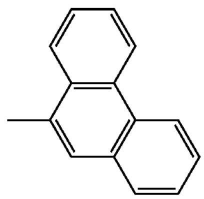
compound 11-21
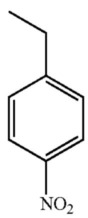
compound 11-22
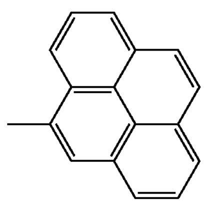 [SMILES: Cc1cc2cccc3ccc4cccc1c4c32]
compound 11-23
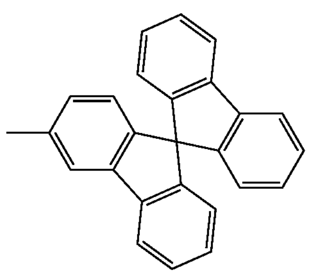 [SMILES: Cc1ccc2c(c1)-c1ccccc1C21c2ccccc2-c2ccccc21]
compound 11-24
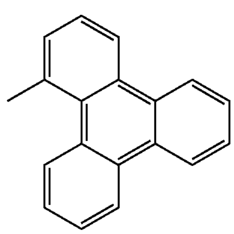 [SMILES: Cc1cccc2c3ccccc3c3ccccc3c12]
compound 11-25
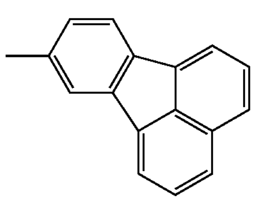 [SMILES: Cc1ccc2c(c1)-c1cccc3cccc-2c13]
compound 11-26

-continued
| R2 | R5 | compound |
|---|---|---|
| —H | 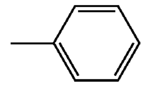 | compound 11-27 |
| 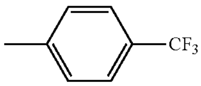 | 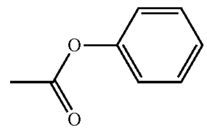 | compound 11-28 |
| —F | 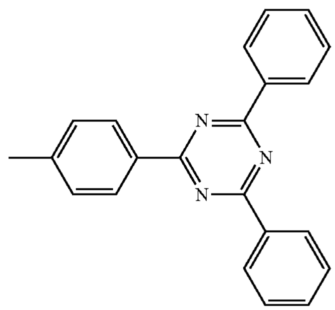 | compound 11-29 |
| —CN | 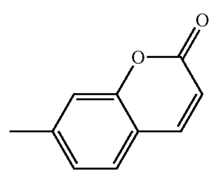 | compound 11-30 |
| 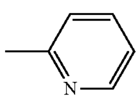 | 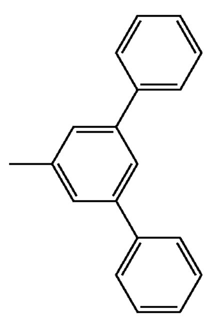 | compound 11-31 |
| 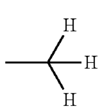 | 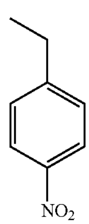 | compound 11-32 |

-continued
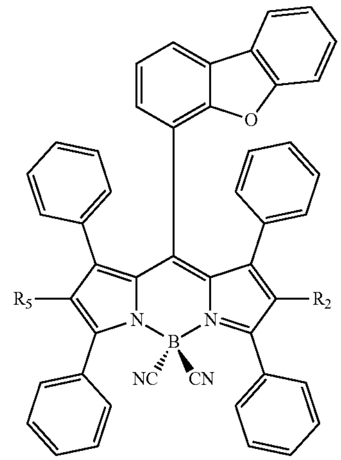
| R2, R5 | compound |
| --- | --- |
| —H | compound 12-1 |
| 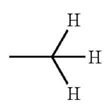 | compound 12-2 |
| —F | compound 12-3 |
| 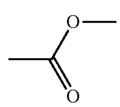 | compound 12-4 |
| 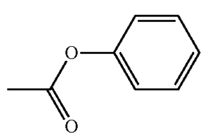 | compound 12-5 |
| —CN | compound 12-6 |
| 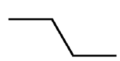 | compound 12-7 |
| 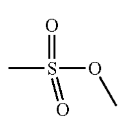 | compound 12-8 |
| 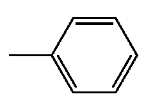 | compound 12-9 |
| 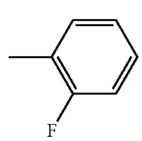 | compound 12-10 |

-continued
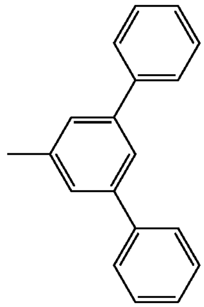 [SMILES: Cc1cc(-c2ccccc2)cc(-c2ccccc2)c1]
compound 12-11
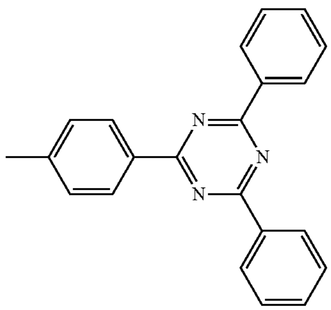 [SMILES: Cc1ccc(-c2nc(-c3ccccc3)nc(-c3ccccc3)n2)cc1]
compound 12-12
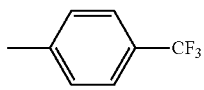
compound 12-13
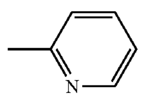
compound 12-14
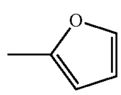
compound 12-15
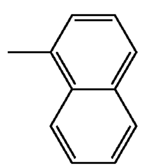
compound 12-16
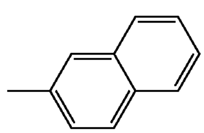
compound 12-17
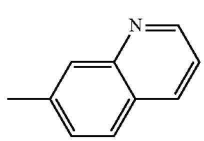
compound 12-18
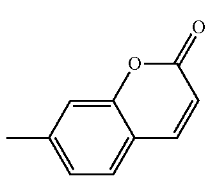
compound 12-19

-continued
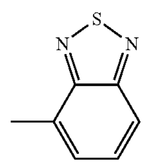
compound 12-20
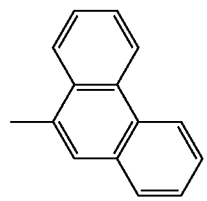
compound 12-21
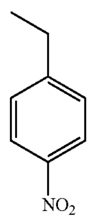
compound 12-22
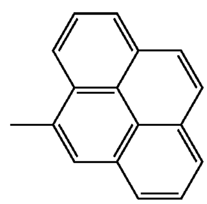 [SMILES: Cc1cc2cccc3ccc4cccc1c4c32]
compound 12-23
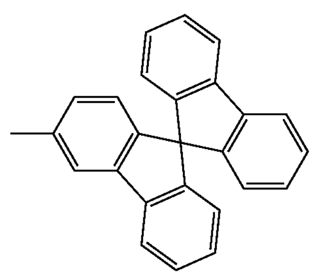 [SMILES: Cc1ccc2c(c1)-c1ccccc1C21c2ccccc2-c2ccccc21]
compound 12-24
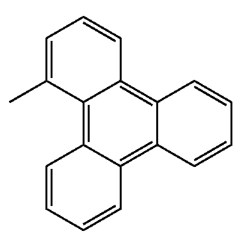 [SMILES: Cc1cccc2c3ccccc3c3ccccc3c12]
compound 12-25
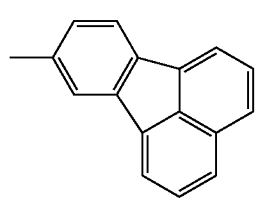 [SMILES: Cc1ccc2c(c1)-c1cccc3cccc-2c13]
compound 12-26

-continued
| R2 | R5 | compound |
|---|---|---|
| —H | 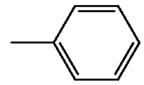 | compound 12-27 |
| 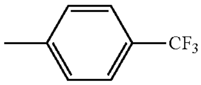 | 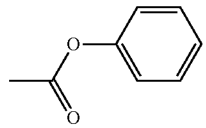 | compound 12-28 |
| —F | 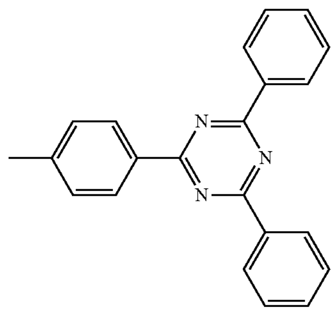 | compound 12-29 |
| —CN | 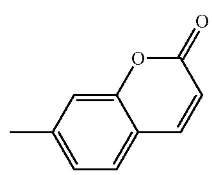 | compound 12-30 |
| 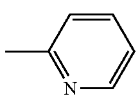 | 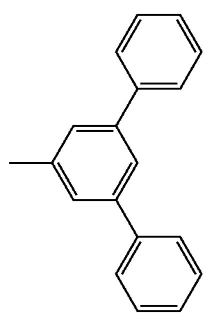 | compound 12-31 |
| 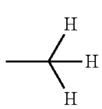 | 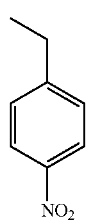 | compound 12-32 |

-continued
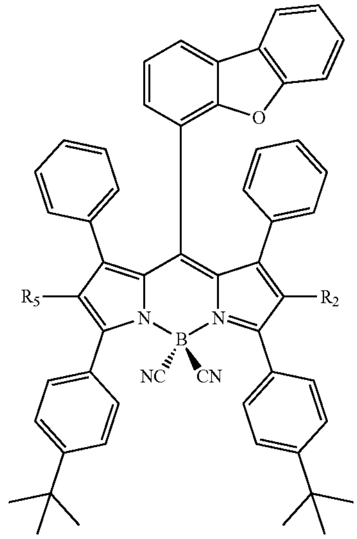
| R2, R5 | compound |
| --- | --- |
| —H | compound 13-1 |
| 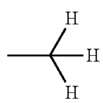 | compound 13-2 |
| —F | compound 13-3 |
| 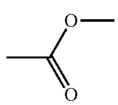 | compound 13-4 |
| 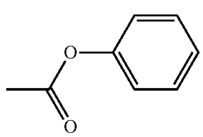 | compound 13-5 |
| —CN | compound 13-6 |
| 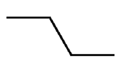 | compound 13-7 |
| 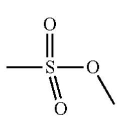 | compound 13-8 |
| 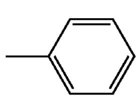 | compound 13-9 |
| 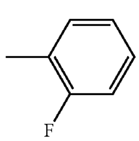 | compound 13-10 |

-continued
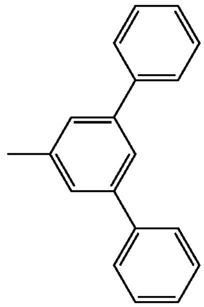 [SMILES: Cc1cc(-c2ccccc2)cc(-c2ccccc2)c1]
compound 13-11
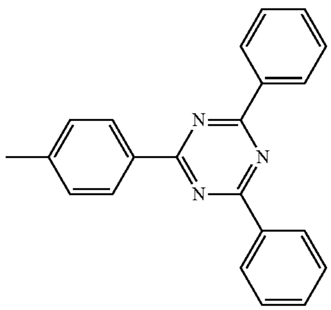 [SMILES: Cc1ccc(-c2nc(-c3ccccc3)nc(-c3ccccc3)n2)cc1]
compound 13-12
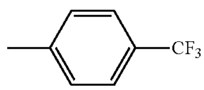
compound 13-13
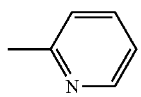
compound 13-14
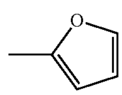
compound 13-15
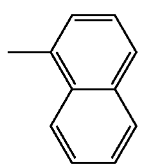
compound 13-16
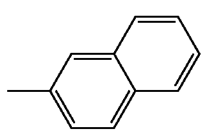
compound 13-17
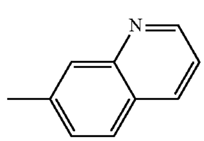
compound 13-18
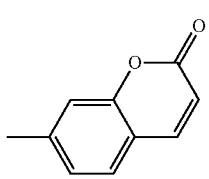
compound 13-19

-continued
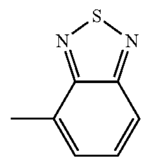
compound 13-20
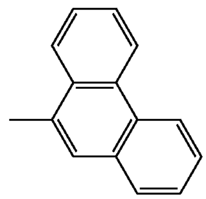
compound 13-21
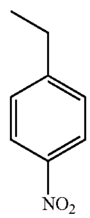
compound 13-22
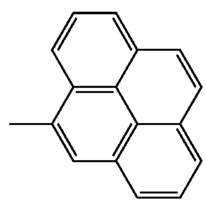 [SMILES: Cc1cc2cccc3ccc4cccc1c4c32]
compound 13-23
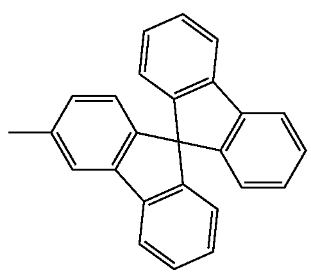 [SMILES: Cc1ccc2c(c1)-c1ccccc1C21c2ccccc2-c2ccccc21]
compound 13-24
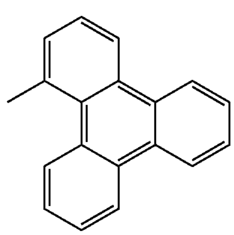 [SMILES: Cc1cccc2c3ccccc3c3ccccc3c12]
compound 13-25
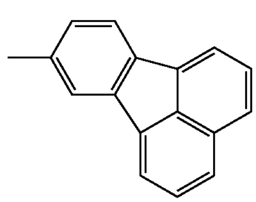 [SMILES: Cc1ccc2c(c1)-c1cccc3cccc-2c13]
compound 13-26

-continued
| R2 | R5 | compound |
| --- | --- | --- |
| —H | 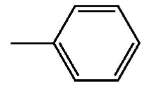 | compound 13-27 |
| 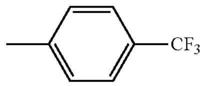 | 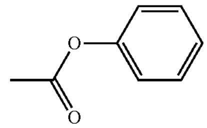 | compound 13-28 |
| —F | 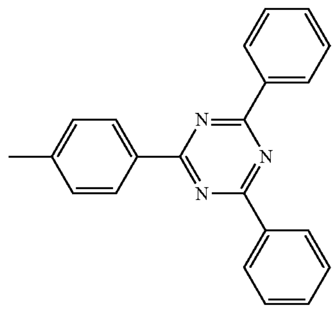 | compound 13-29 |
| —CN | 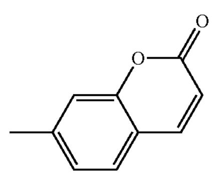 | compound 13-30 |
| 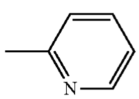 | 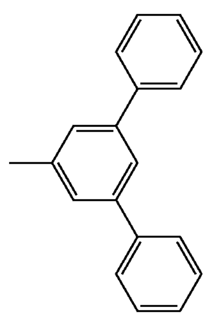 | compound 13-31 |
| 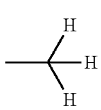 | 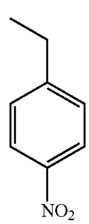 | compound 13-32 |

-continued
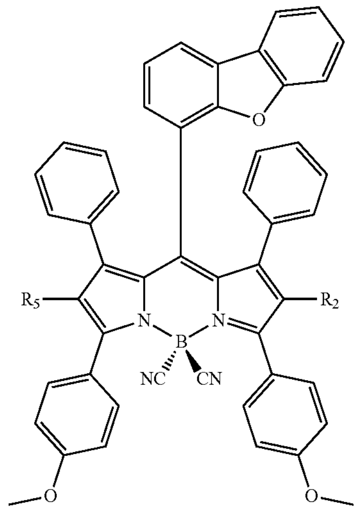
| R2, R5 | compound |
|---|---|
| —H | compound 14-1 |
| 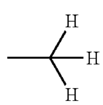 | compound 14-2 |
| —F | compound 14-3 |
| 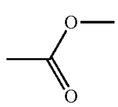 | compound 14-4 |
| 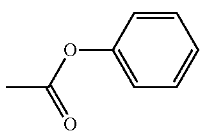 | compound 14-5 |
| —CN | compound 14-6 |
| 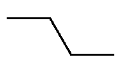 | compound 14-7 |
| 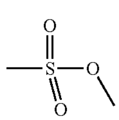 | compound 14-8 |
| 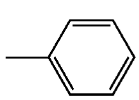 | compound 14-9 |
| 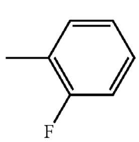 | compound 14-10 |

-continued
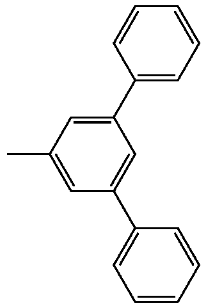 [SMILES: Cc1cc(-c2ccccc2)cc(-c2ccccc2)c1]
compound 14-11
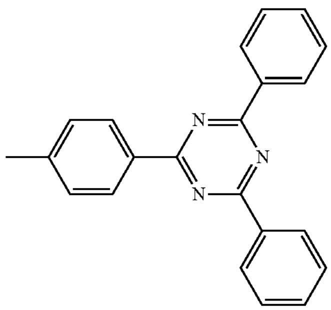 [SMILES: Cc1ccc(-c2nc(-c3ccccc3)nc(-c3ccccc3)n2)cc1]
compound 14-12
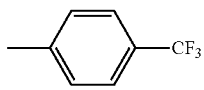
compound 14-13
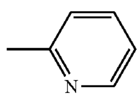
compound 14-14
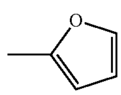
compound 14-15
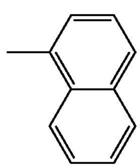
compound 14-16
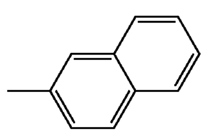
compound 14-17
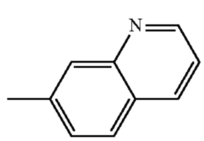
compound 14-18
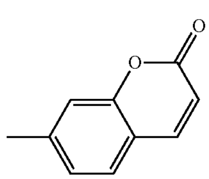
compound 14-19

-continued
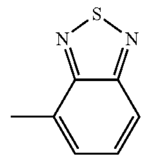
compound 14-20
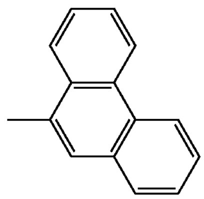
compound 14-21
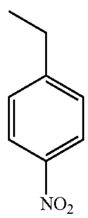
compound 14-22
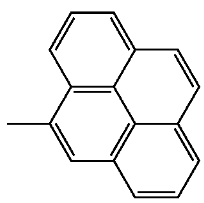 [SMILES: Cc1cc2cccc3ccc4cccc1c4c32]
compound 14-23
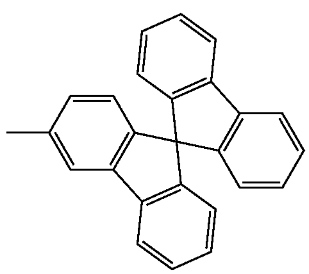 [SMILES: Cc1ccc2c(c1)-c1ccccc1C21c2ccccc2-c2ccccc21]
compound 14-24
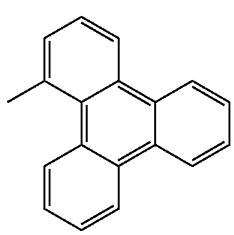 [SMILES: Cc1cccc2c3ccccc3c3ccccc3c12]
compound 14-25
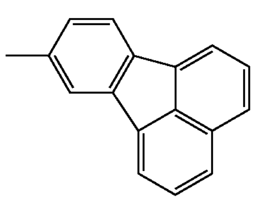 [SMILES: Cc1ccc2c(c1)-c1cccc3cccc-2c13]
compound 14-26

-continued
| R2 | R5 | compound |
|---|---|---|
| —H | 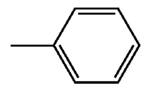 | compound 14-27 |
| 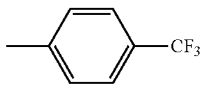 | 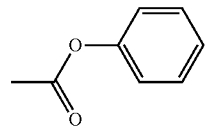 | compound 14-28 |
| —F | 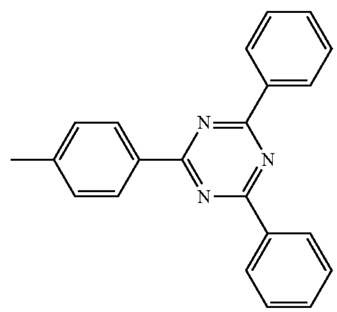 | compound 14-29 |
| —CN | 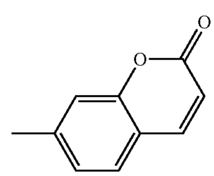 | compound 14-30 |
| 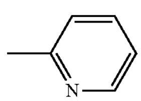 | 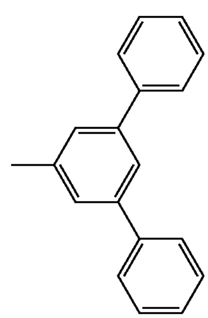 | compound 14-31 |
| 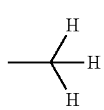 | 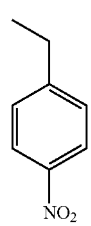 | compound 14-32 |

-continued
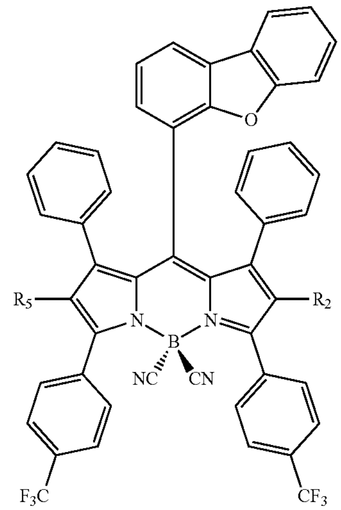
| R2, R5 | compound |
|---|---|
| —H | compound 15-1 |
| 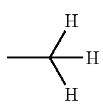 | compound 15-2 |
| —F | compound 15-3 |
| 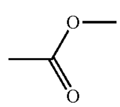 | compound 15-4 |
| 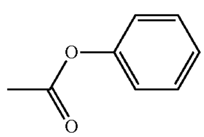 | compound 15-5 |
| —CN | compound 15-6 |
| 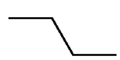 | compound 15-7 |
| 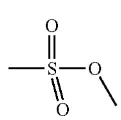 | compound 15-8 |
| 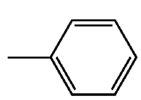 | compound 15-9 |
| 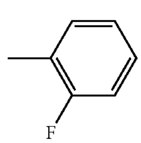 | compound 15-10 |

-continued
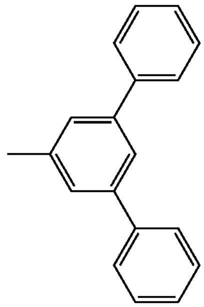 [SMILES: Cc1cc(-c2ccccc2)cc(-c2ccccc2)c1]
compound 15-11
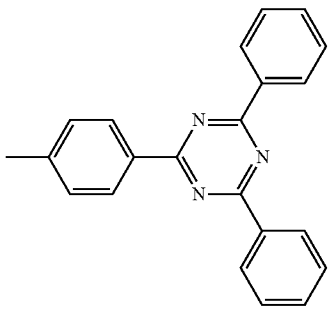 [SMILES: Cc1ccc(-c2nc(-c3ccccc3)nc(-c3ccccc3)n2)cc1]
compound 15-12
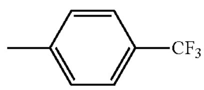
compound 15-13
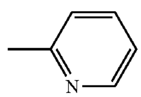
compound 15-14
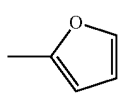
compound 15-15
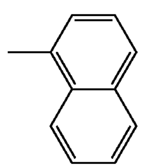
compound 15-16
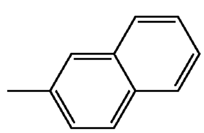
compound 15-17
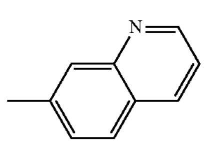
compound 15-18
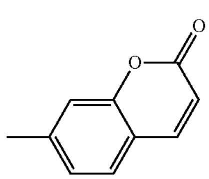
compound 15-19

-continued
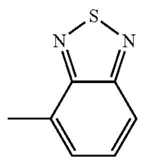
compound 15-20
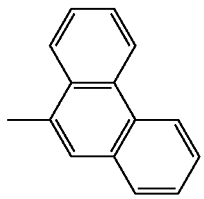
compound 15-21
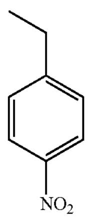
compound 15-22
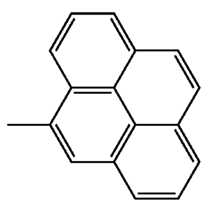 [SMILES: Cc1cc2cccc3ccc4cccc1c4c32]
compound 15-23
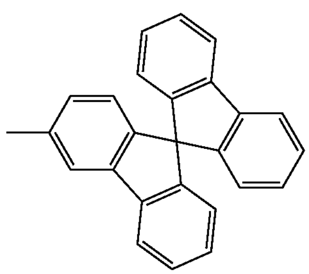 [SMILES: Cc1ccc2c(c1)-c1ccccc1C21c2ccccc2-c2ccccc21]
compound 15-24
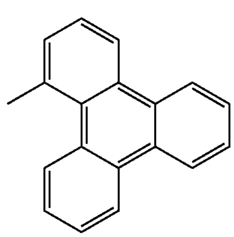 [SMILES: Cc1cccc2c3ccccc3c3ccccc3c12]
compound 15-25
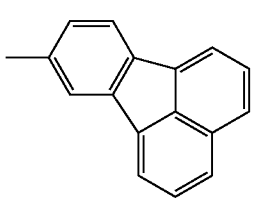 [SMILES: Cc1ccc2c(c1)-c1cccc3cccc-2c13]
compound 15-26

-continued
| R2 | R5 | compound |
|---|---|---|
| —H | 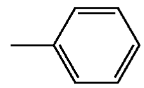 | compound 15-27 |
| 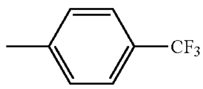 | 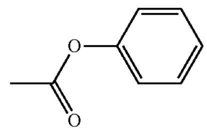 | compound 15-28 |
| —F | 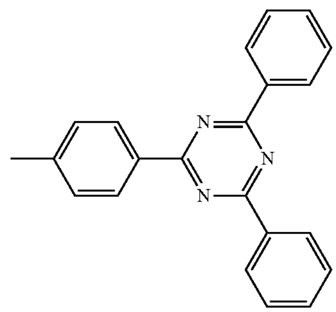 | compound 15-29 |
| —CN | 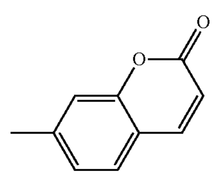 | compound 15-30 |
| 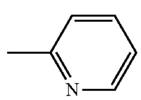 | 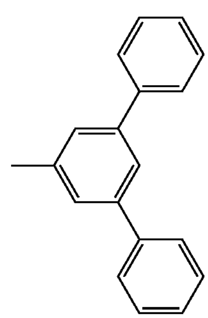 | compound 15-31 |
| 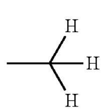 | 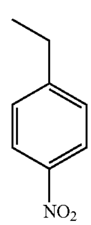 | compound 15-32 |

-continued
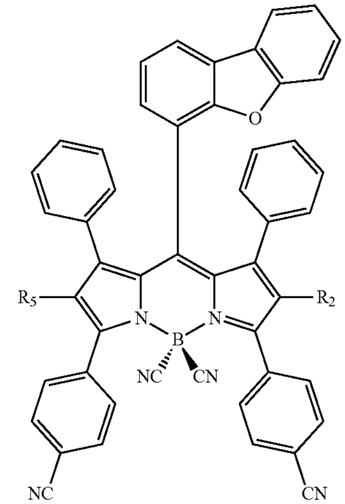
| R2, R5 | compound |
|---|---|
| —H | compound 16-1 |
| 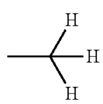 | compound 16-2 |
| —F | compound 16-3 |
| 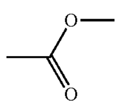 | compound 16-4 |
| 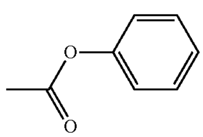 | compound 16-5 |
| —CN | compound 16-6 |
| 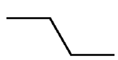 | compound 16-7 |
| 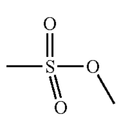 | compound 16-8 |
| 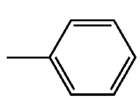 | compound 16-9 |
| 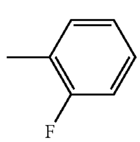 | compound 16-10 |

-continued
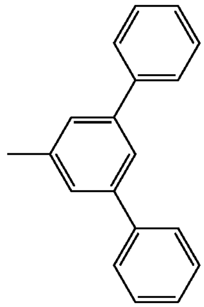 [SMILES: Cc1cc(-c2ccccc2)cc(-c2ccccc2)c1]
compound 16-11
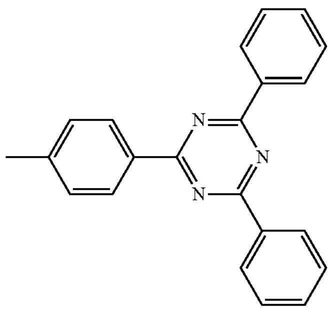 [SMILES: Cc1ccc(-c2nc(-c3ccccc3)nc(-c3ccccc3)n2)cc1]
compound 16-12
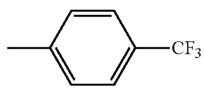
compound 16-13
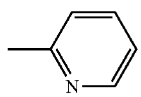
compound 16-14
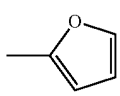
compound 16-15
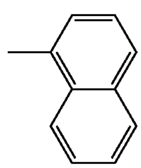
compound 16-16
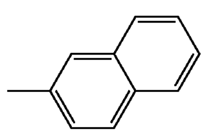
compound 16-17
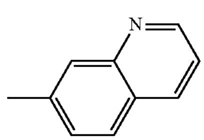
compound 16-18
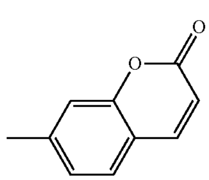
compound 16-19

-continued
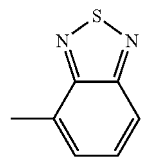
compound 16-20
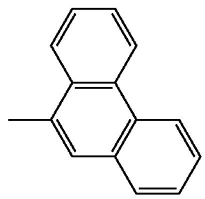
compound 16-21
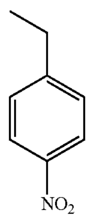
compound 16-22
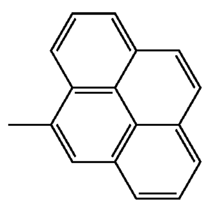 [SMILES: Cc1cc2cccc3ccc4cccc1c4c32]
compound 16-23
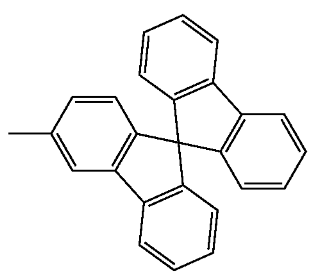 [SMILES: Cc1ccc2c(c1)-c1ccccc1C21c2ccccc2-c2ccccc21]
compound 16-24
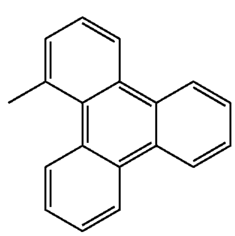 [SMILES: Cc1cccc2c3ccccc3c3ccccc3c12]
compound 16-25
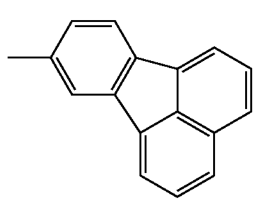 [SMILES: Cc1ccc2c(c1)-c1cccc3cccc-2c13]
compound 16-26

-continued
| R2 | R5 | compound |
|---|---|---|
| —H | 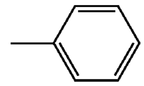 | compound 16-27 |
| 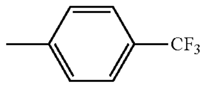 | 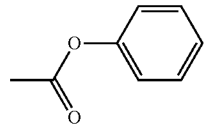 | compound 16-28 |
| —F | 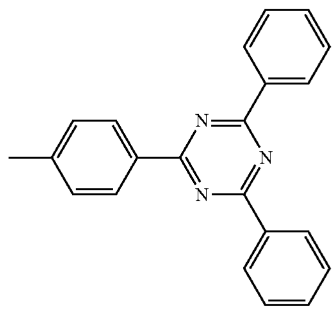 | compound 16-29 |
| —CN | 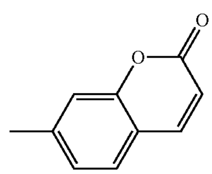 | compound 16-30 |
| 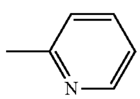 | 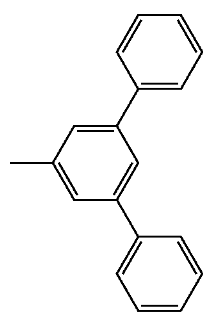 | compound 16-31 |
| 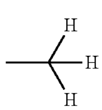 | 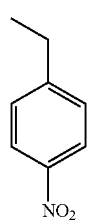 | compound 16-32 |

-continued
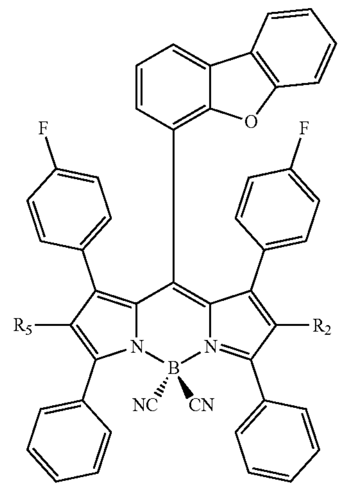
| R2, R5 | compound |
|---|---|
| —H | compound 17-1 |
| 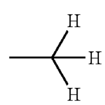 | compound 17-2 |
| —F | compound 17-3 |
| 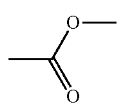 | compound 17-4 |
| 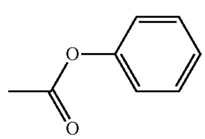 | compound 17-5 |
| —CN | compound 17-6 |
| 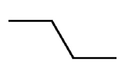 | compound 17-7 |
| 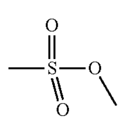 | compound 17-8 |
| 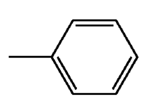 | compound 17-9 |
| 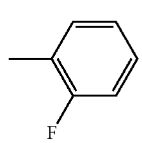 | compound 17-10 |

-continued
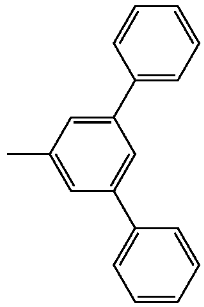 [SMILES: Cc1cc(-c2ccccc2)cc(-c2ccccc2)c1]
compound 17-11
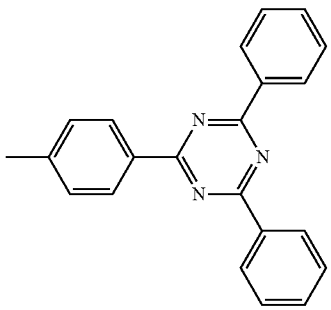 [SMILES: Cc1ccc(-c2nc(-c3ccccc3)nc(-c3ccccc3)n2)cc1]
compound 17-12
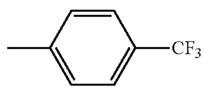
compound 17-13
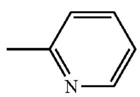
compound 17-14
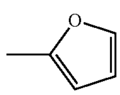
compound 17-15
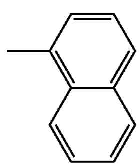
compound 17-16
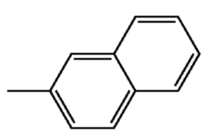
compound 17-17
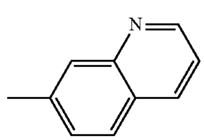
compound 17-18
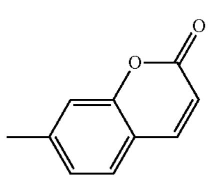
compound 17-19

-continued
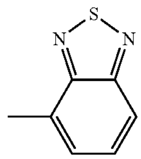
compound 17-20
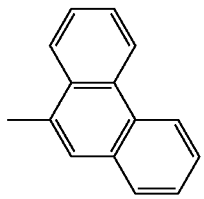
compound 17-21
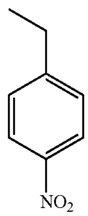
compound 17-22
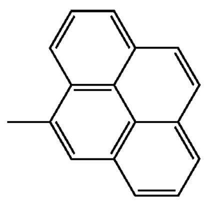 [SMILES: Cc1cc2cccc3ccc4cccc1c4c32]
compound 17-23
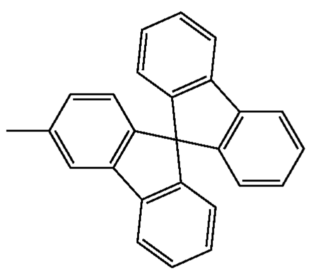 [SMILES: Cc1ccc2c(c1)-c1ccccc1C21c2ccccc2-c2ccccc21]
compound 17-24
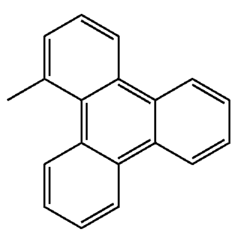 [SMILES: Cc1cccc2c3ccccc3c3ccccc3c12]
compound 17-25
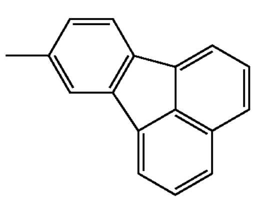 [SMILES: Cc1ccc2c(c1)-c1cccc3cccc-2c13]
compound 17-26

-continued
| R2 | R5 | compound |
|---|---|---|
| —H | 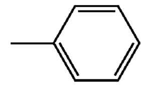 | compound 17-27 |
| 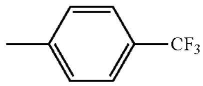 | 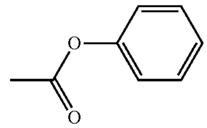 | compound 17-28 |
| —F | 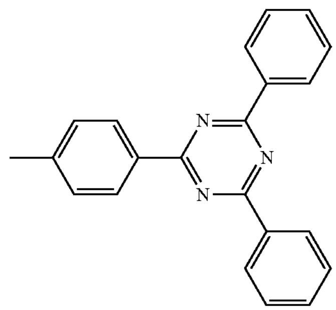 | compound 17-29 |
| —CN | 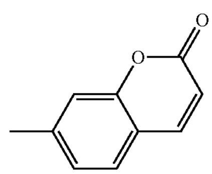 | compound 17-30 |
| 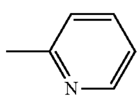 | 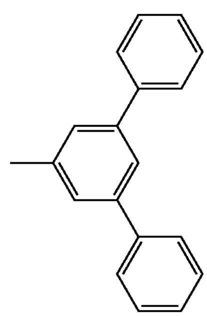 | compound 17-31 |
| 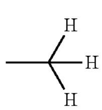 | 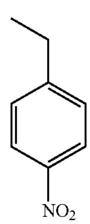 | compound 17-32 |

-continued
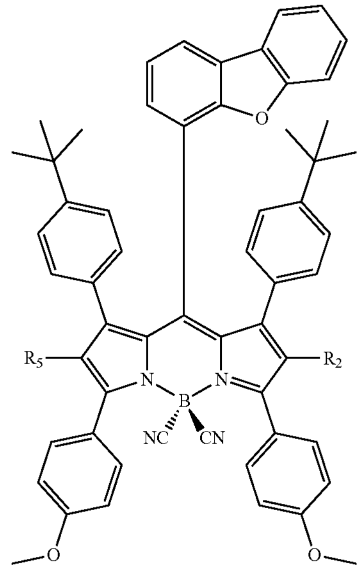
| R2, R5 | compound |
| --- | --- |
| —H | compound 18-1 |
| 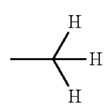 | compound 18-2 |
| —F | compound 18-3 |
| 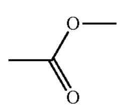 | compound 18-4 |
| 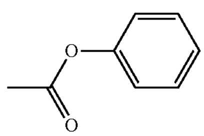 | compound 18-5 |
| —CN | compound 18-6 |
| 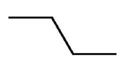 | compound 18-7 |
| 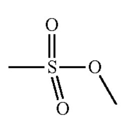 | compound 18-8 |
| 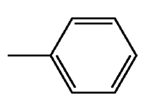 | compound 18-9 |
| 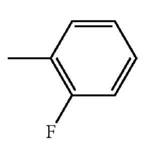 | compound 18-10 |

-continued
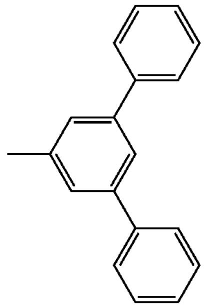 [SMILES: Cc1cc(-c2ccccc2)cc(-c2ccccc2)c1]
compound 18-11
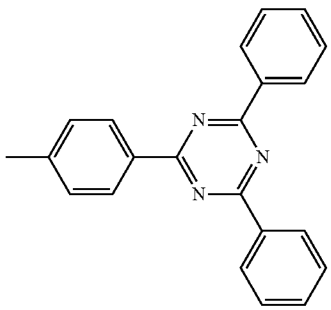 [SMILES: Cc1ccc(-c2nc(-c3ccccc3)nc(-c3ccccc3)n2)cc1]
compound 18-12
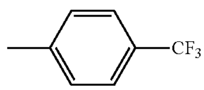
compound 18-13
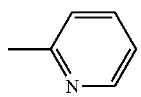
compound 18-14
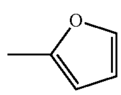
compound 18-15
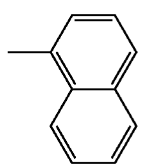
compound 18-16
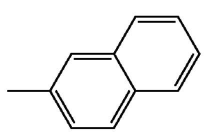
compound 18-17
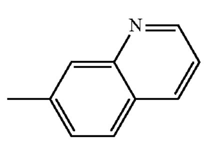
compound 18-18
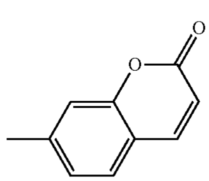
compound 18-19

-continued
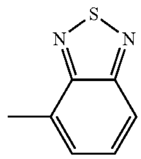
compound 18-20
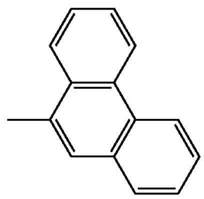
compound 18-21
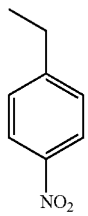
compound 18-22
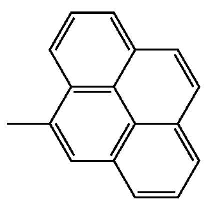 [SMILES: Cc1cc2cccc3ccc4cccc1c4c32]
compound 18-23
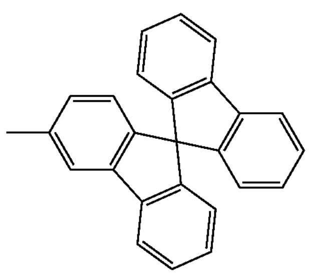 [SMILES: Cc1ccc2c(c1)-c1ccccc1C21c2ccccc2-c2ccccc21]
compound 18-24
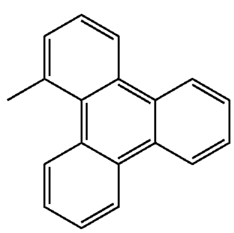 [SMILES: Cc1cccc2c3ccccc3c3ccccc3c12]
compound 18-25
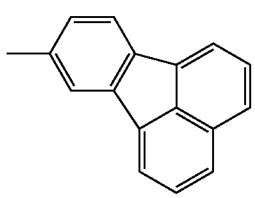 [SMILES: Cc1ccc2c(c1)-c1cccc3cccc-2c13]
compound 18-26

-continued
| R2 | R5 | compound |
| --- | --- | --- |
| —H | 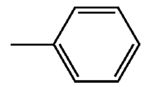 | compound 18-27 |
| 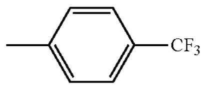 | 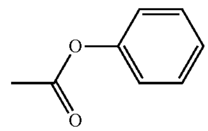 | compound 18-28 |
| —F | 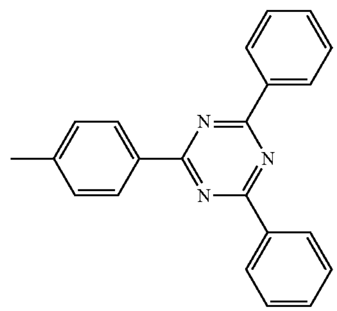 | compound 18-29 |
| —CN | 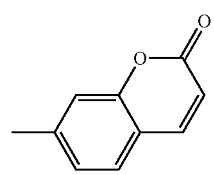 | compound 18-30 |
| 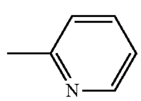 | 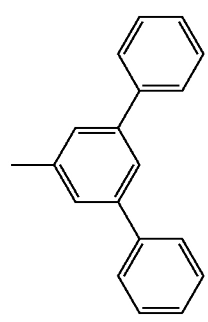 | compound 18-31 |
| 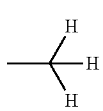 | 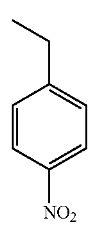 | compound 18-32 |

-continued
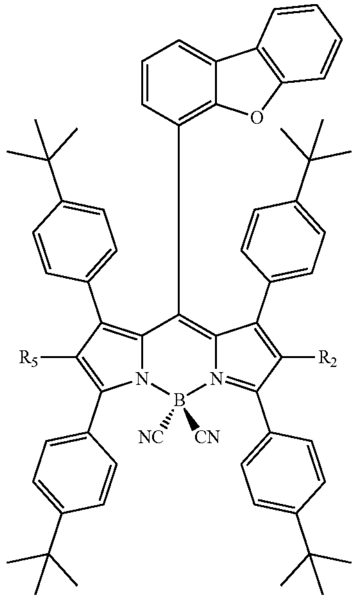
| R2, R5 | compound |
|---|---|
| —H | compound 19-1 |
| 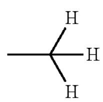 | compound 19-2 |
| —F | compound 19-3 |
| 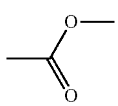 | compound 19-4 |
| 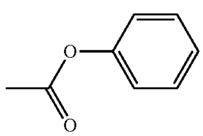 | compound 19-5 |
| —CN | compound 19-6 |
| 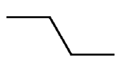 | compound 19-7 |
| 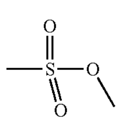 | compound 19-8 |
| 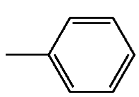 | compound 19-9 |
| 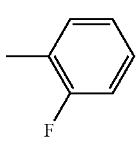 | compound 19-10 |

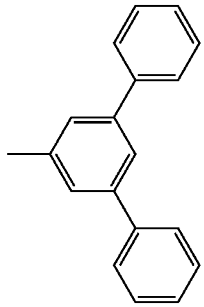 [SMILES: Cc1cc(-c2ccccc2)cc(-c2ccccc2)c1]
compound 19-11
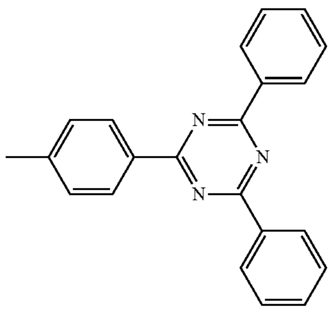 [SMILES: Cc1ccc(-c2nc(-c3ccccc3)nc(-c3ccccc3)n2)cc1]
compound 19-12
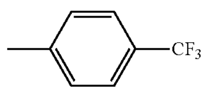
compound 19-13
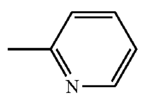
compound 19-14
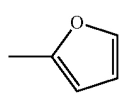
compound 19-15
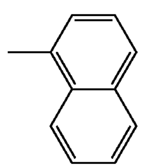
compound 19-16
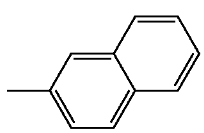
compound 19-17
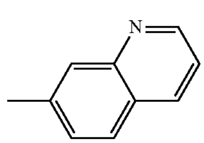
compound 19-18
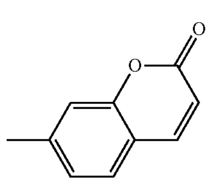
compound 19-19

-continued
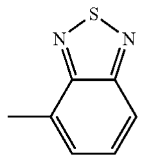
compound 19-20
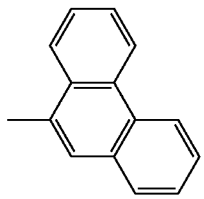
compound 19-21
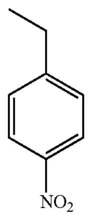
compound 19-22
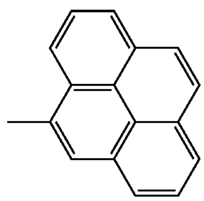 [SMILES: Cc1cc2cccc3ccc4cccc1c4c32]
compound 19-23
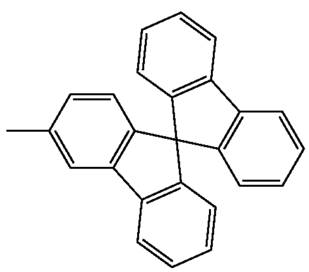 [SMILES: Cc1ccc2c(c1)-c1ccccc1C21c2ccccc2-c2ccccc21]
compound 19-24
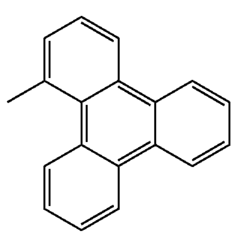 [SMILES: Cc1cccc2c3ccccc3c3ccccc3c12]
compound 19-25
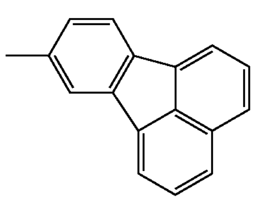 [SMILES: Cc1ccc2c(c1)-c1cccc3cccc-2c13]
compound 19-26

-continued
| R2 | R5 | compound |
| --- | --- | --- |
| —H | 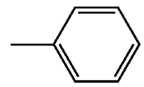 | compound 19-27 |
| 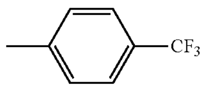 | 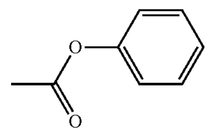 | compound 19-28 |
| —F | 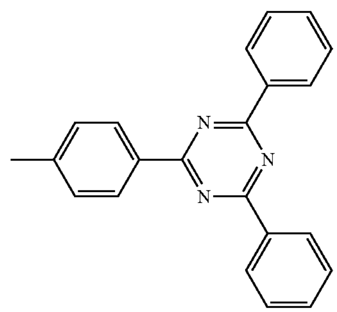 | compound 19-29 |
| —CN | 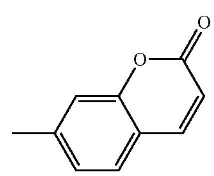 | compound 19-30 |
| 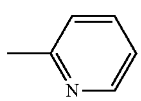 | 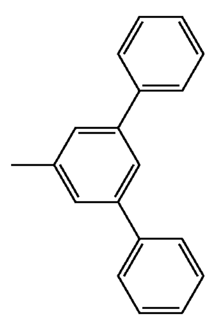 | compound 19-31 |
| 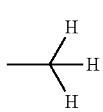 | 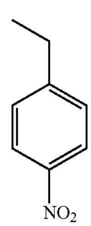 | compound 19-32 |

-continued
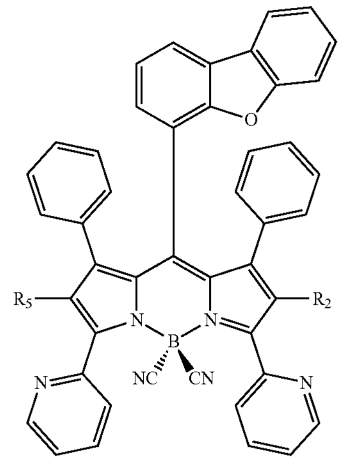
| R2, R5 | compound |
| --- | --- |
| —H | compound 20-1 |
| 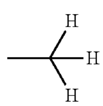 | compound 20-2 |
| —F | compound 20-3 |
| 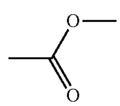 | compound 20-4 |
| 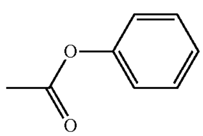 | compound 20-5 |
| —CN | compound 20-6 |
| 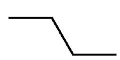 | compound 20-7 |
| 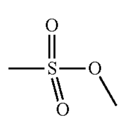 | compound 20-8 |
| 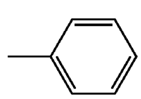 | compound 20-9 |
| 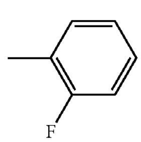 | compound 20-10 |

-continued
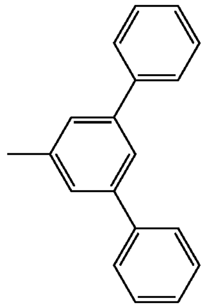 [SMILES: Cc1cc(-c2ccccc2)cc(-c2ccccc2)c1]
compound 20-11
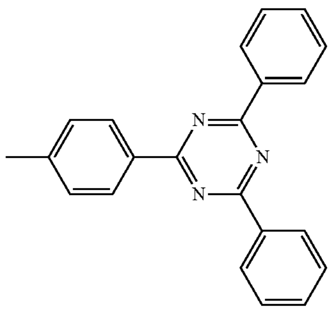 [SMILES: Cc1ccc(-c2nc(-c3ccccc3)nc(-c3ccccc3)n2)cc1]
compound 20-12
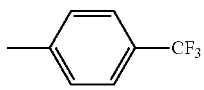
compound 20-13
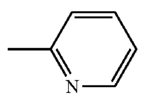
compound 20-14
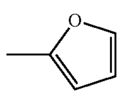
compound 20-15
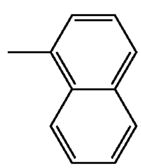
compound 20-16
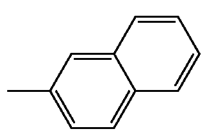
compound 20-17
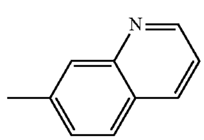
compound 20-18
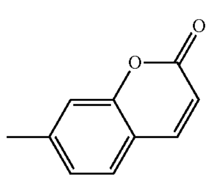
compound 20-19

-continued
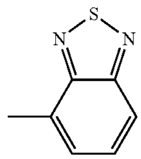
compound 20-20
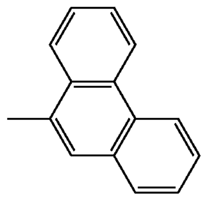
compound 20-21
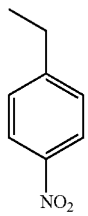
compound 20-22
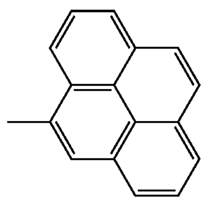 [SMILES: Cc1cc2cccc3ccc4cccc1c4c32]
compound 20-23
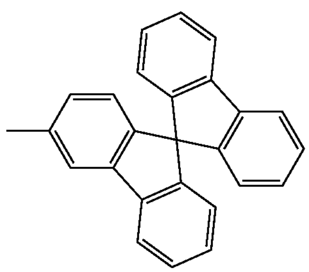 [SMILES: Cc1ccc2c(c1)-c1ccccc1C21c2ccccc2-c2ccccc21]
compound 20-24
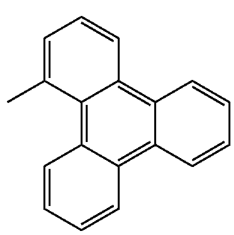 [SMILES: Cc1cccc2c3ccccc3c3ccccc3c12]
compound 20-25
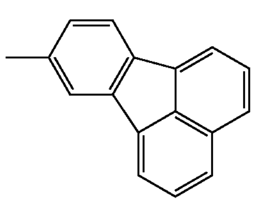 [SMILES: Cc1ccc2c(c1)-c1cccc3cccc-2c13]
compound 20-26

-continued
| R2 | R5 | compound |
| --- | --- | --- |
| —H | 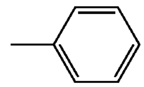 | compound 20-27 |
| 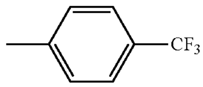 | 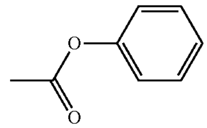 | compound 20-28 |
| —F | 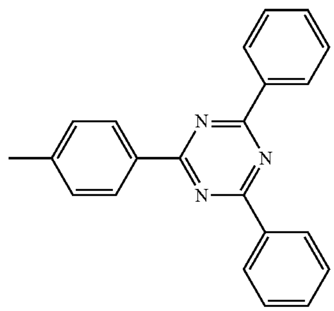 | compound 20-29 |
| —CN | 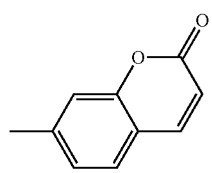 | compound 20-30 |
| 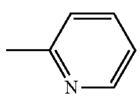 | 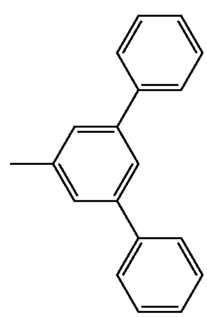 | compound 20-31 |
| 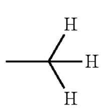 | 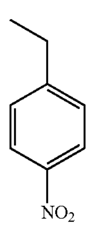 | compound 20-32 |

-continued
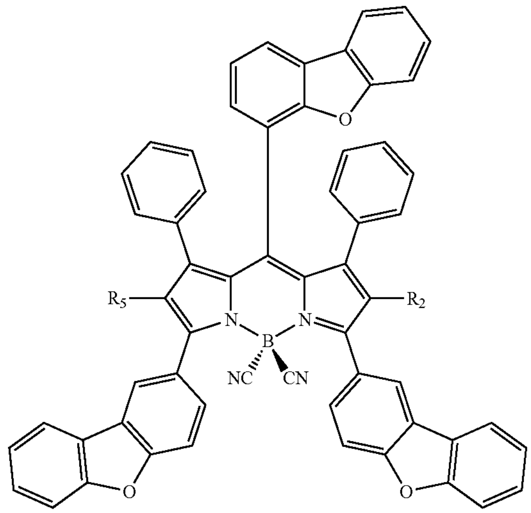
| R2, R5 | compound |
|---|---|
| —H | compound 21-1 |
| 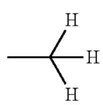 | compound 21-2 |
| —F | compound 21-3 |
| 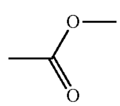 | compound 21-4 |
| 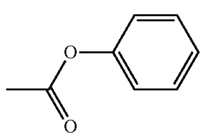 | compound 21-5 |
| —CN | compound 21-6 |
| 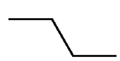 | compound 21-7 |
| 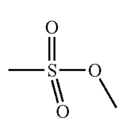 | compound 21-8 |
| 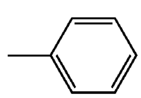 | compound 21-9 |
| 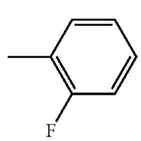 | compound 21-10 |

-continued
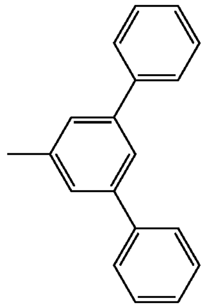 [SMILES: Cc1cc(-c2ccccc2)cc(-c2ccccc2)c1]
compound 21-11
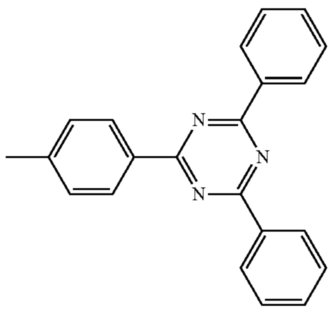 [SMILES: Cc1ccc(-c2nc(-c3ccccc3)nc(-c3ccccc3)n2)cc1]
compound 21-12
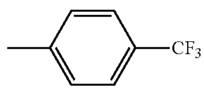
compound 21-13
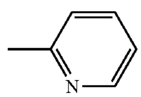
compound 21-14
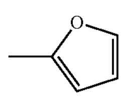
compound 21-15
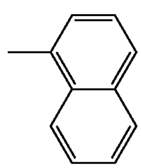
compound 21-16
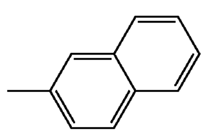
compound 21-17
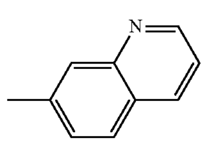
compound 21-18
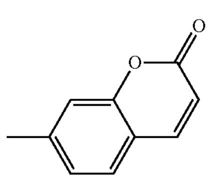
compound 21-19

-continued
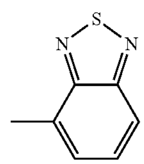
compound 21-20
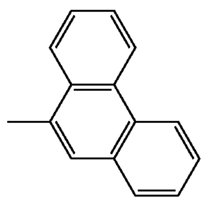
compound 21-21
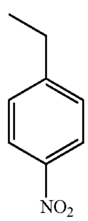
compound 21-22
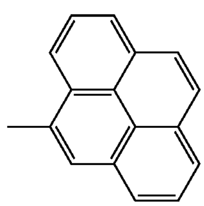 [SMILES: Cc1cc2cccc3ccc4cccc1c4c32]
compound 21-23
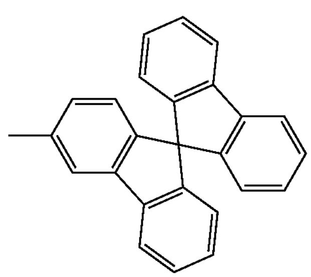 [SMILES: Cc1ccc2c(c1)-c1ccccc1C21c2ccccc2-c2ccccc21]
compound 21-24
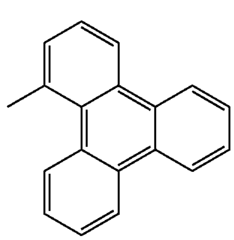 [SMILES: Cc1cccc2c3ccccc3c3ccccc3c12]
compound 21-25
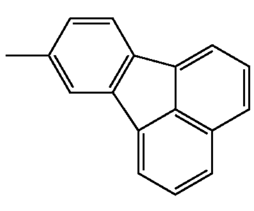 [SMILES: Cc1ccc2c(c1)-c1cccc3cccc-2c13]
compound 21-26

-continued
| R2 | R5 | compound |
|---|---|---|
| —H | 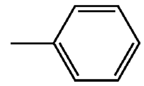 | compound 21-27 |
| 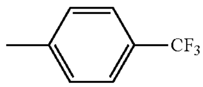 | 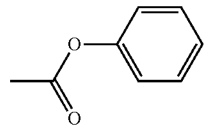 | compound 21-28 |
| —F | 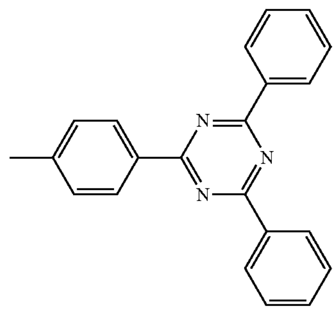 | compound 21-29 |
| —CN | 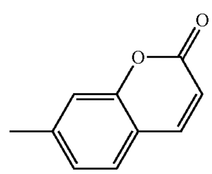 | compound 21-30 |
| 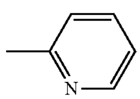 | 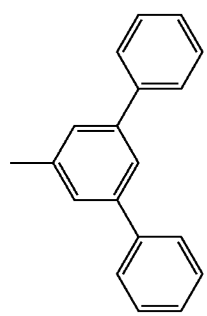 | compound 21-31 |
| 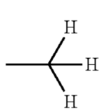 | 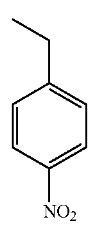 | compound 21-32 |

-continued
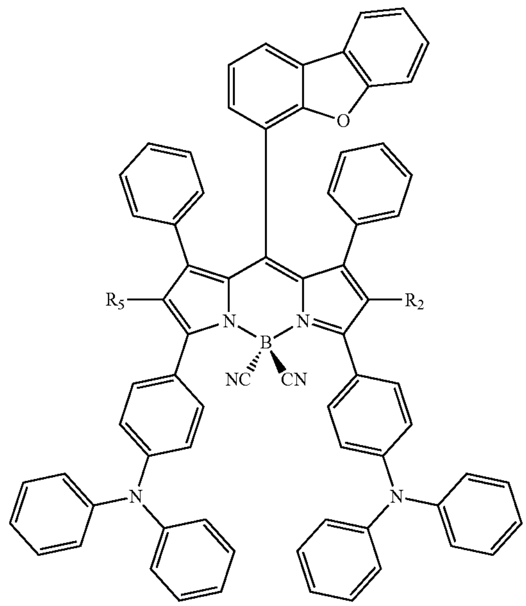
| R2, R5 | compound |
|---|---|
| —H | compound 22-1 |
| 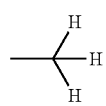 | compound 22-2 |
| —F | compound 22-3 |
| 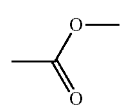 | compound 22-4 |
| 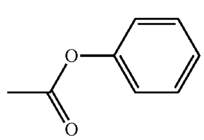 | compound 22-5 |
| —CN | compound 22-6 |
| 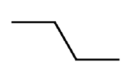 | compound 22-7 |
| 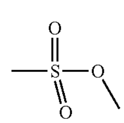 | compound 22-8 |
| 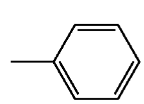 | compound 22-9 |
| 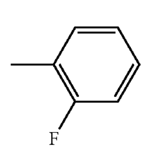 | compound 22-10 |

-continued
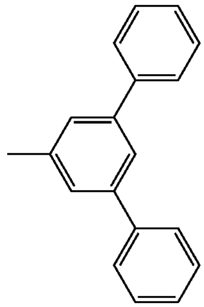 [SMILES: Cc1cc(-c2ccccc2)cc(-c2ccccc2)c1]
compound 22-11
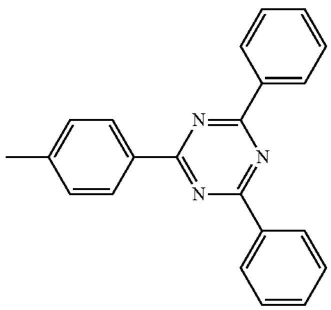 [SMILES: Cc1ccc(-c2nc(-c3ccccc3)nc(-c3ccccc3)n2)cc1]
compound 22-12
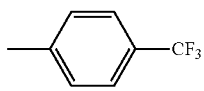
compound 22-13
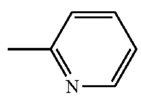
compound 22-14
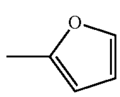
compound 22-15
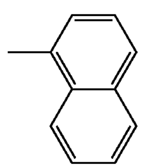
compound 22-16
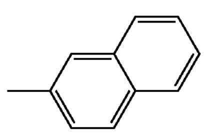
compound 22-17
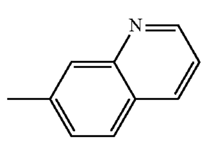
compound 22-18
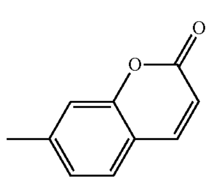
compound 22-19

-continued
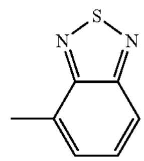
compound 22-20
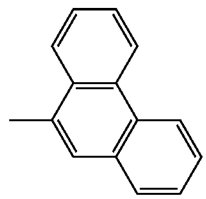
compound 22-21
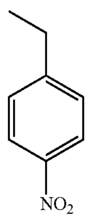
compound 22-22
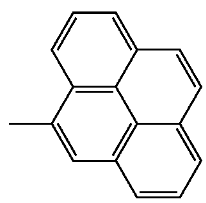 [SMILES: Cc1cc2cccc3ccc4cccc1c4c32]
compound 22-23
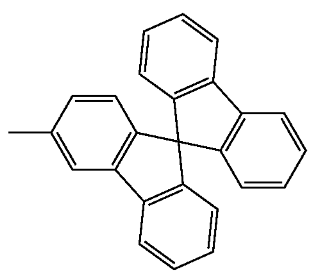 [SMILES: Cc1ccc2c(c1)-c1ccccc1C21c2ccccc2-c2ccccc21]
compound 22-24
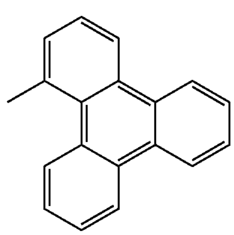 [SMILES: Cc1cccc2c3ccccc3c3ccccc3c12]
compound 22-25
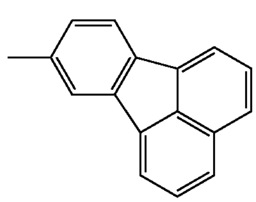 [SMILES: Cc1ccc2c(c1)-c1cccc3cccc-2c13]
compound 22-26

-continued
| R2 | R5 | compound |
|---|---|---|
| —H | 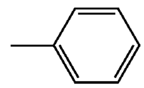 | compound 22-27 |
| 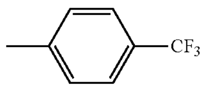 | 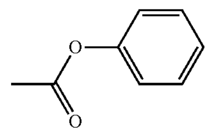 | compound 22-28 |
| —F | 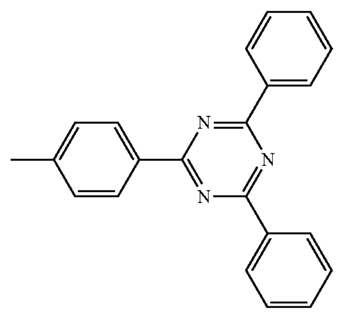 | compound 22-29 |
| —CN | 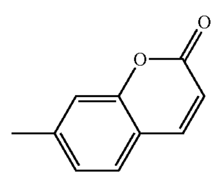 | compound 22-30 |
| 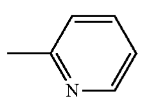 | 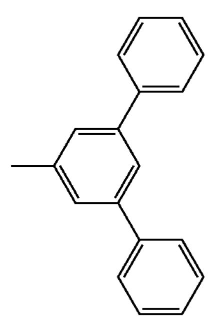 | compound 22-31 |
| 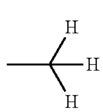 | 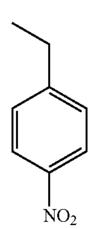 | compound 22-32 |

-continued
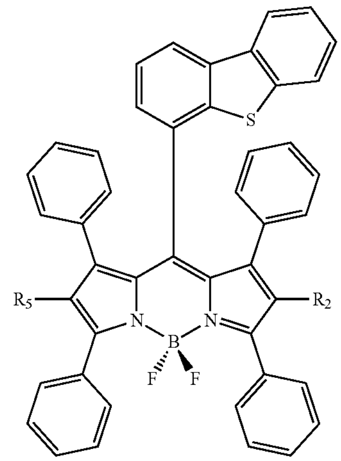
| R2, R5 | compound |
|---|---|
| —H | compound 23-1 |
| 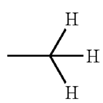 | compound 23-2 |
| —F | compound 23-3 |
| 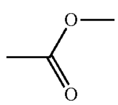 | compound 23-4 |
| 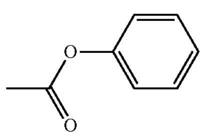 | compound 23-5 |
| —CN | compound 23-6 |
| 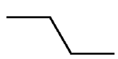 | compound 23-7 |
| 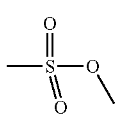 | compound 23-8 |
| 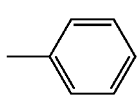 | compound 23-9 |
| 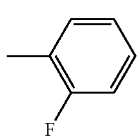 | compound 23-10 |

-continued
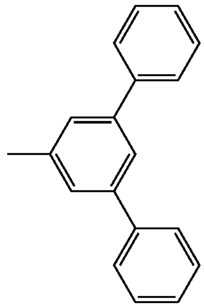 [SMILES: Cc1cc(-c2ccccc2)cc(-c2ccccc2)c1]
compound 23-11
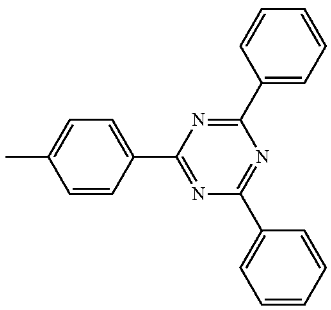 [SMILES: Cc1ccc(-c2nc(-c3ccccc3)nc(-c3ccccc3)n2)cc1]
compound 23-12
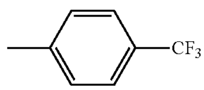
compound 23-13
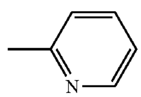
compound 23-14
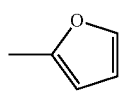
compound 23-15
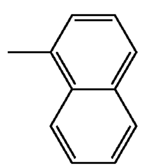
compound 23-16
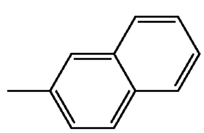
compound 23-17
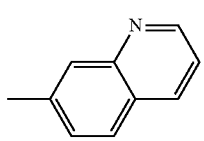
compound 23-18
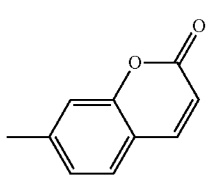
compound 23-19

-continued
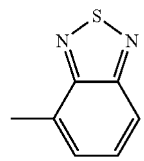
compound 23-20
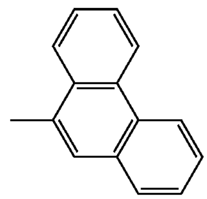
compound 23-21
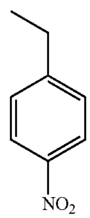
compound 23-22
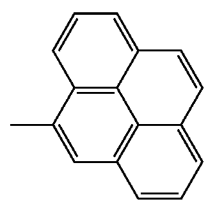 [SMILES: Cc1cc2cccc3ccc4cccc1c4c32]
compound 23-23
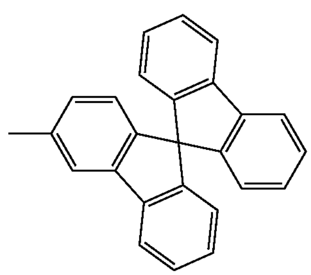 [SMILES: Cc1ccc2c(c1)-c1ccccc1C21c2ccccc2-c2ccccc21]
compound 23-24
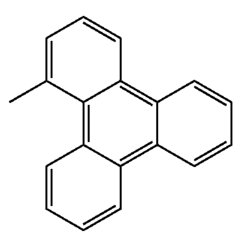 [SMILES: Cc1cccc2c3ccccc3c3ccccc3c12]
compound 23-25
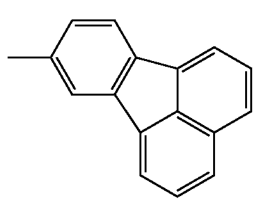 [SMILES: Cc1ccc2c(c1)-c1cccc3cccc-2c13]
compound 23-26

-continued
| R2 | R5 | compound |
|---|---|---|
| —H | 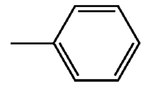 | compound 23-27 |
| 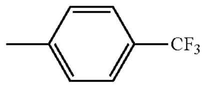 | 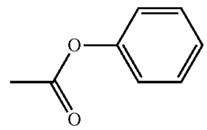 | compound 23-28 |
| —F | 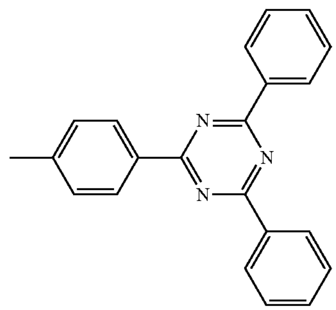 | compound 23-29 |
| —CN | 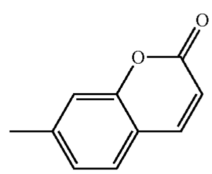 | compound 23-30 |
| 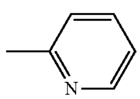 | 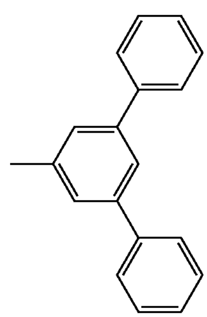 | compound 23-31 |
| 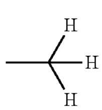 | 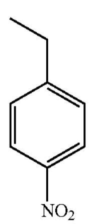 | compound 23-32 |

-continued
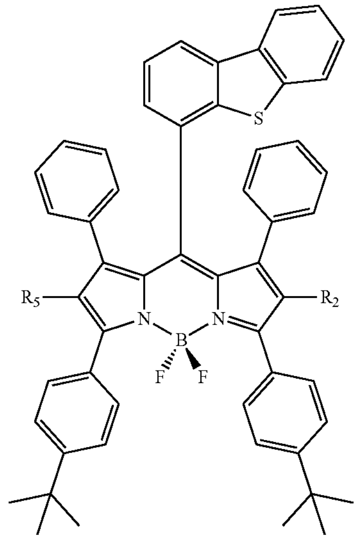
| R2, R5 | compound |
|---|---|
| —H | compound 24-1 |
| 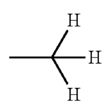 | compound 24-2 |
| —F | compound 24-3 |
| 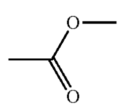 | compound 24-4 |
| 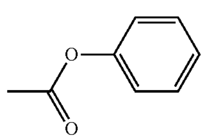 | compound 24-5 |
| —CN | compound 24-6 |
| 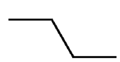 | compound 24-7 |
| 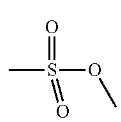 | compound 24-8 |
| 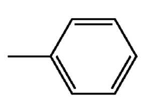 | compound 24-9 |
| 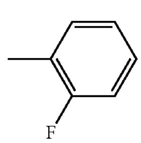 | compound 24-10 |

-continued
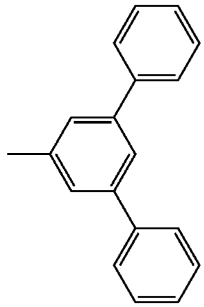 [SMILES: Cc1cc(-c2ccccc2)cc(-c2ccccc2)c1]
compound 24-11
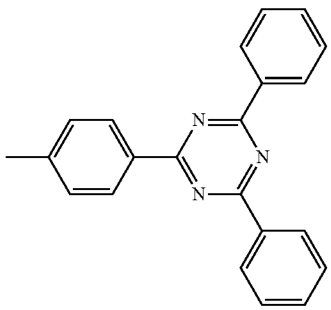 [SMILES: Cc1ccc(-c2nc(-c3ccccc3)nc(-c3ccccc3)n2)cc1]
compound 24-12
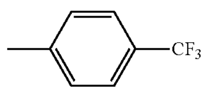
compound 24-13
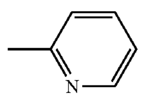
compound 24-14
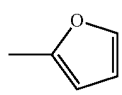
compound 24-15
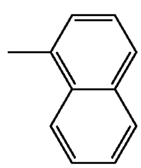
compound 24-16
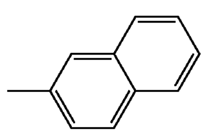
compound 24-17
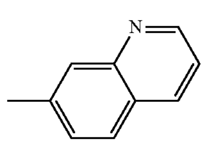
compound 24-18
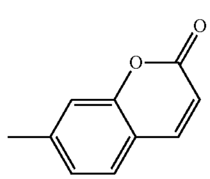
compound 24-19

-continued
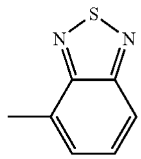
compound 24-20
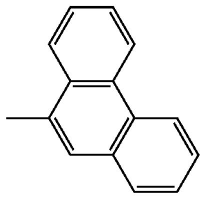
compound 24-21
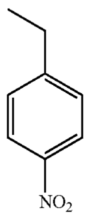
compound 24-22
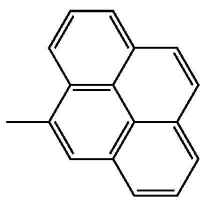 [SMILES: Cc1cc2cccc3ccc4cccc1c4c32]
compound 24-23
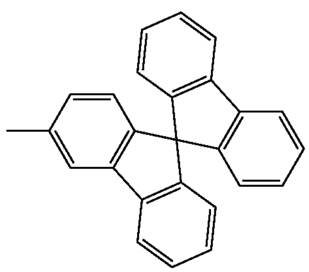 [SMILES: Cc1ccc2c(c1)-c1ccccc1C21c2ccccc2-c2ccccc21]
compound 24-24
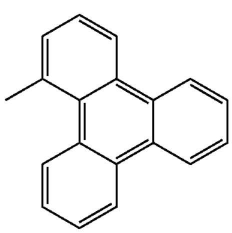 [SMILES: Cc1cccc2c3ccccc3c3ccccc3c12]
compound 24-25
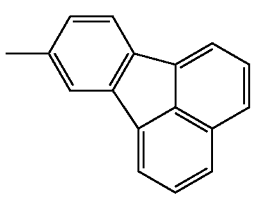 [SMILES: Cc1ccc2c(c1)-c1cccc3cccc-2c13]
compound 24-26

-continued
| R2 | R5 | compound |
|---|---|---|
| —H | 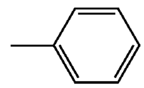 | compound 24-27 |
| 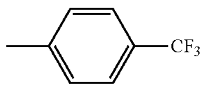 | 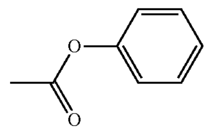 | compound 24-28 |
| —F | 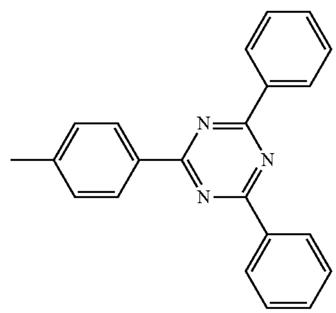 | compound 24-29 |
| —CN | 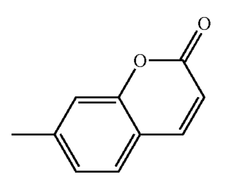 | compound 24-30 |
| 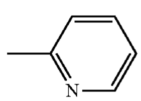 | 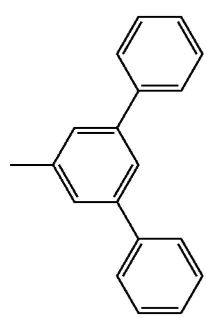 | compound 24-31 |
| 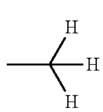 | 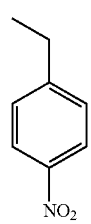 | compound 24-32 |

-continued
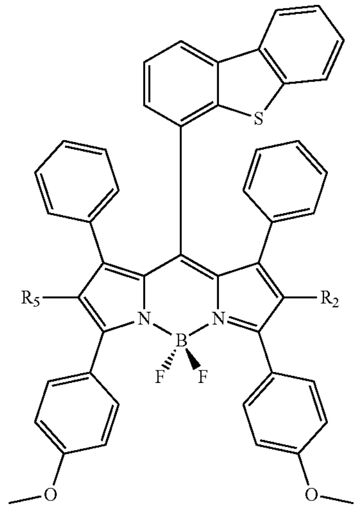
| R2, R5 | compound |
|---|---|
| —H | compound 25-1 |
| 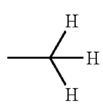 | compound 25-2 |
| —F | compound 25-3 |
| 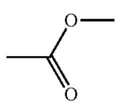 | compound 25-4 |
| 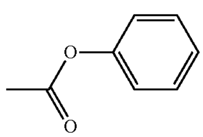 | compound 25-5 |
| —CN | compound 25-6 |
| 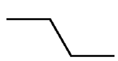 | compound 25-7 |
| 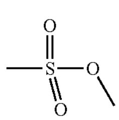 | compound 25-8 |
| 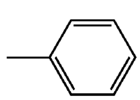 | compound 25-9 |
| 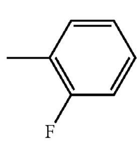 | compound 25-10 |

-continued
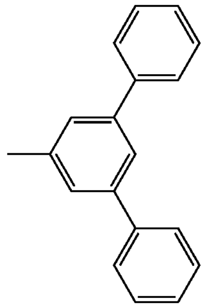 [SMILES: Cc1cc(-c2ccccc2)cc(-c2ccccc2)c1]
compound 25-11
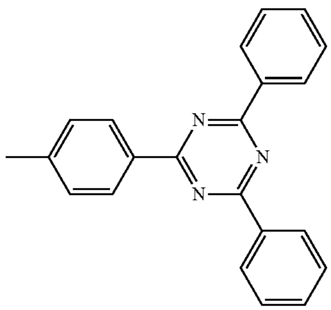 [SMILES: Cc1ccc(-c2nc(-c3ccccc3)nc(-c3ccccc3)n2)cc1]
compound 25-12
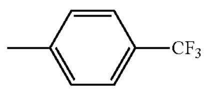
compound 25-13
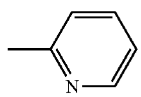
compound 25-14
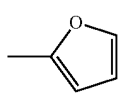
compound 25-15
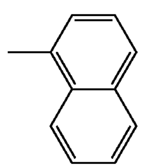
compound 25-16
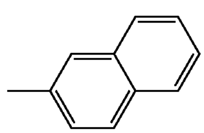
compound 25-17
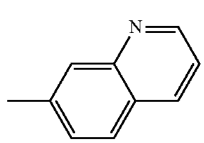
compound 25-18
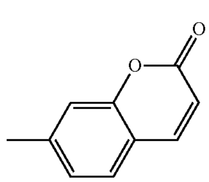
compound 25-19

-continued
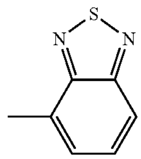
compound 25-20
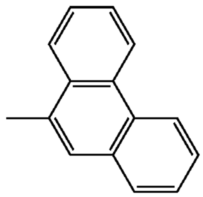
compound 25-21
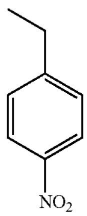
compound 25-22
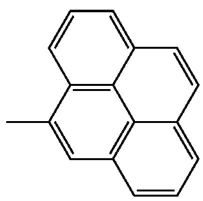 [SMILES: Cc1cc2cccc3ccc4cccc1c4c32]
compound 25-23
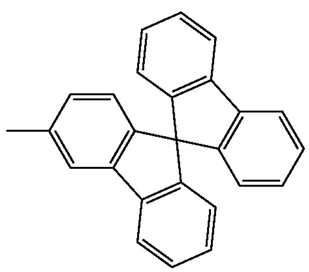 [SMILES: Cc1ccc2c(c1)-c1ccccc1C21c2ccccc2-c2ccccc21]
compound 25-24
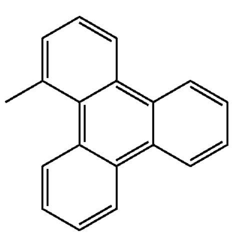 [SMILES: Cc1cccc2c3ccccc3c3ccccc3c12]
compound 25-25
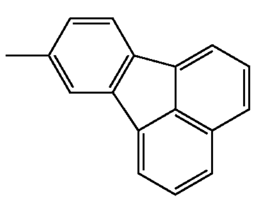 [SMILES: Cc1ccc2c(c1)-c1cccc3cccc-2c13]
compound 25-26

-continued
| R2 | R5 | compound |
| --- | --- | --- |
| —H | 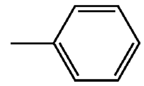 | compound 25-27 |
| 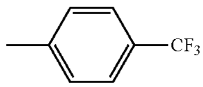 | 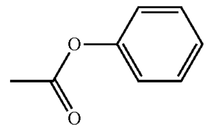 | compound 25-28 |
| —F | 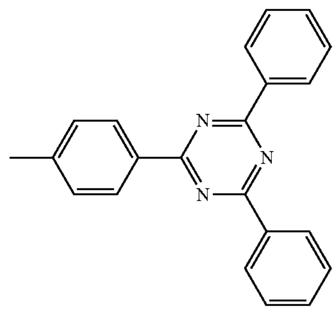 | compound 25-29 |
| —CN | 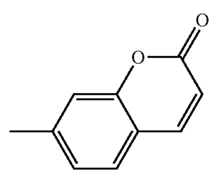 | compound 25-30 |
| 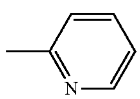 | 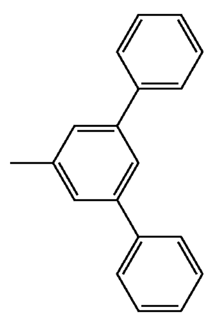 | compound 25-31 |
| 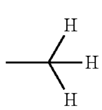 | 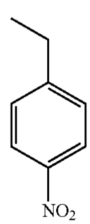 | compound 25-32 |

-continued
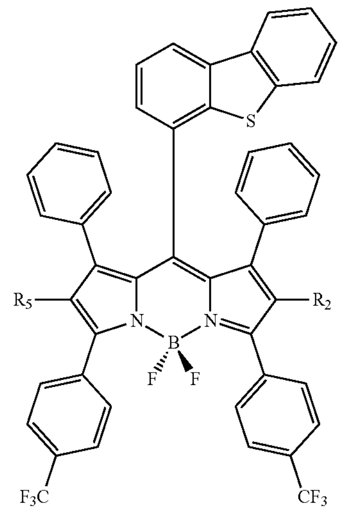
| R2, R5 | compound |
|---|---|
| —H | compound 26-1 |
| 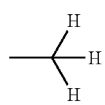 | compound 26-2 |
| —F | compound 26-3 |
| 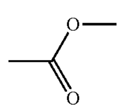 | compound 26-4 |
| 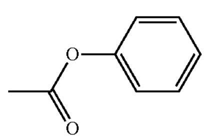 | compound 26-5 |
| —CN | compound 26-6 |
| 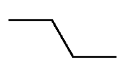 | compound 26-7 |
| 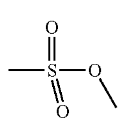 | compound 26-8 |
| 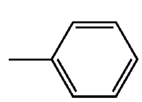 | compound 26-9 |
| 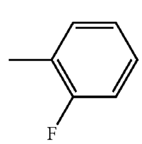 | compound 26-10 |

-continued
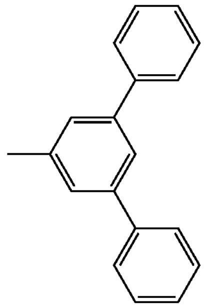 [SMILES: Cc1cc(-c2ccccc2)cc(-c2ccccc2)c1]
compound 26-11
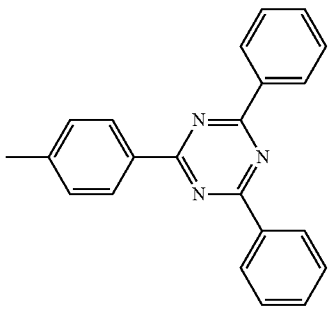 [SMILES: Cc1ccc(-c2nc(-c3ccccc3)nc(-c3ccccc3)n2)cc1]
compound 26-12
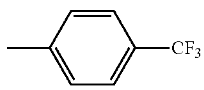
compound 26-13
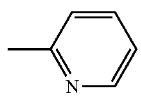
compound 26-14
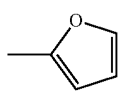
compound 26-15
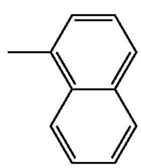
compound 26-16
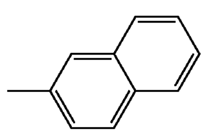
compound 26-17
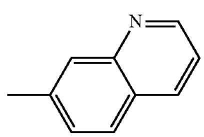
compound 26-18
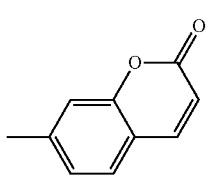
compound 26-19

-continued
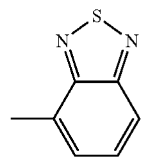
compound 26-20
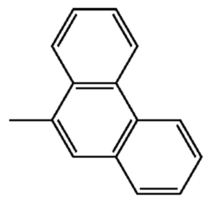
compound 26-21
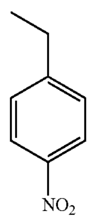
compound 26-22
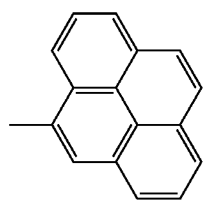 [SMILES: Cc1cc2cccc3ccc4cccc1c4c32]
compound 26-23
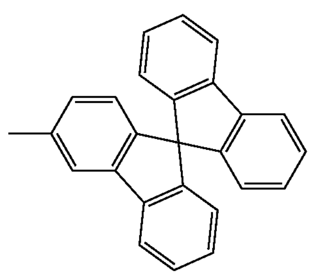 [SMILES: Cc1ccc2c(c1)-c1ccccc1C21c2ccccc2-c2ccccc21]
compound 26-24
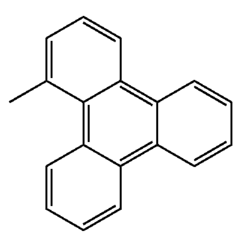 [SMILES: Cc1cccc2c3ccccc3c3ccccc3c12]
compound 26-25
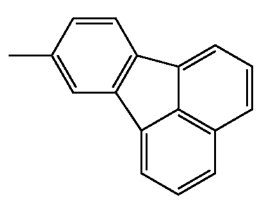 [SMILES: Cc1ccc2c(c1)-c1cccc3cccc-2c13]
compound 26-26

-continued
| R2 | R5 | compound |
| --- | --- | --- |
| —H | 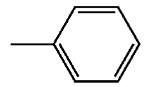 | compound 26-27 |
| 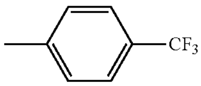 | 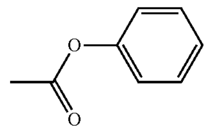 | compound 26-28 |
| —F | 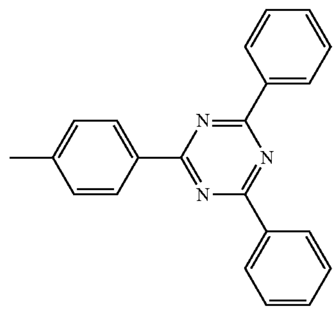 | compound 26-29 |
| —CN | 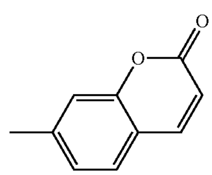 | compound 26-30 |
| 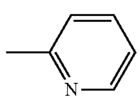 | 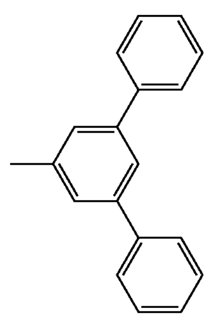 | compound 26-31 |
| 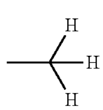 | 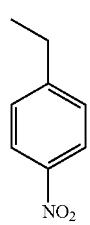 | compound 26-32 |

-continued
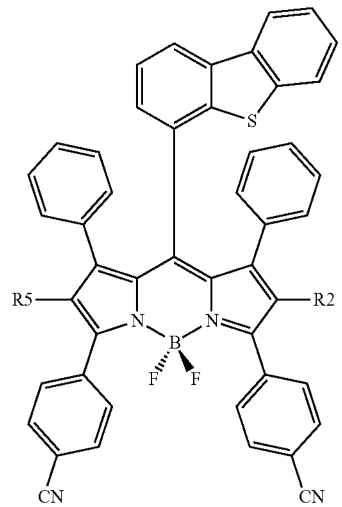
| R2, R5 | compound |
|---|---|
| —H | compound 27-1 |
| 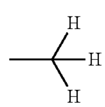 | compound 27-2 |
| —F | compound 27-3 |
| 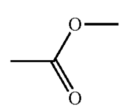 | compound 27-4 |
| 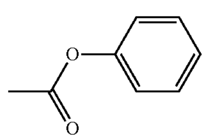 | compound 27-5 |
| —CN | compound 27-6 |
| 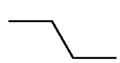 | compound 27-7 |
| 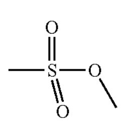 | compound 27-8 |
| 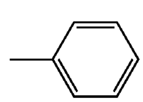 | compound 27-9 |
| 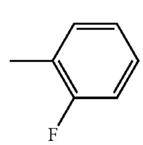 | compound 27-10 |

-continued
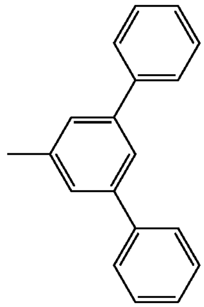 [SMILES: Cc1cc(-c2ccccc2)cc(-c2ccccc2)c1]
compound 27-11
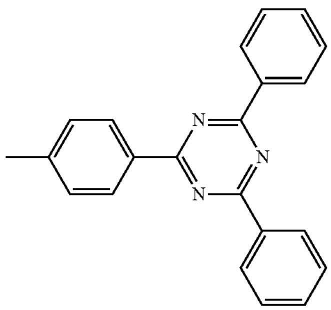 [SMILES: Cc1ccc(-c2nc(-c3ccccc3)nc(-c3ccccc3)n2)cc1]
compound 27-12
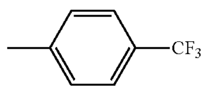
compound 27-13
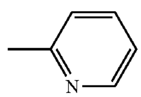
compound 27-14
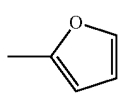
compound 27-15
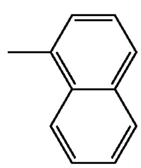
compound 27-16
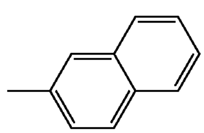
compound 27-17
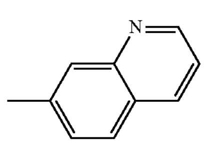
compound 27-18
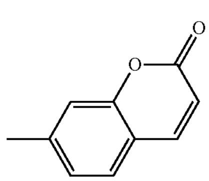
compound 27-19

-continued
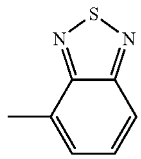
compound 27-20
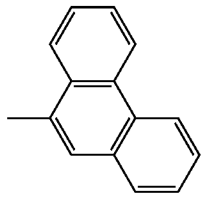
compound 27-21
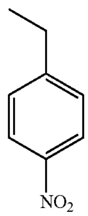
compound 27-22
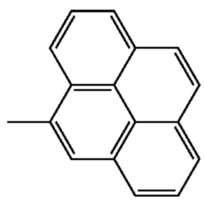 [SMILES: Cc1cc2cccc3ccc4cccc1c4c32]
compound 27-23
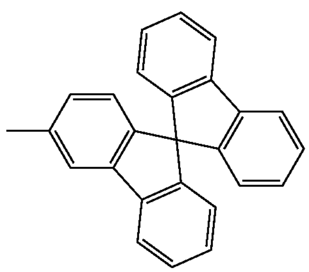 [SMILES: Cc1ccc2c(c1)-c1ccccc1C21c2ccccc2-c2ccccc21]
compound 27-24
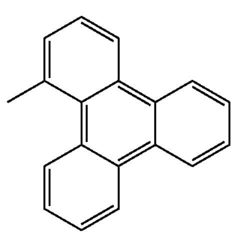 [SMILES: Cc1cccc2c3ccccc3c3ccccc3c12]
compound 27-25
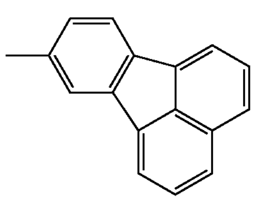 [SMILES: Cc1ccc2c(c1)-c1cccc3cccc-2c13]
compound 27-26

-continued
| R2 | R5 | compound |
| --- | --- | --- |
| —H | 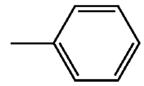 | compound 27-27 |
| 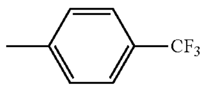 | 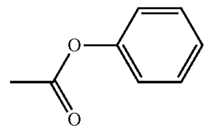 | compound 27-28 |
| —F | 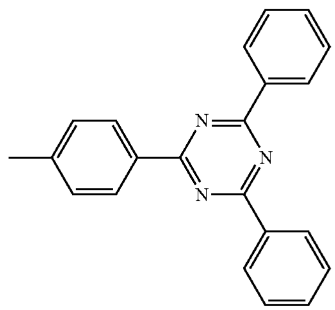 | compound 27-29 |
| —CN | 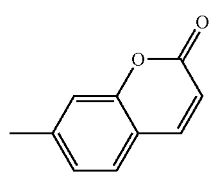 | compound 27-30 |
| 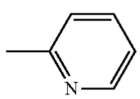 | 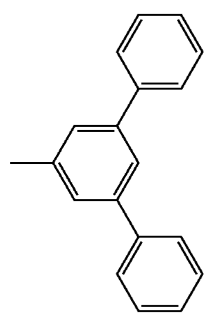 | compound 27-31 |
| 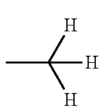 | 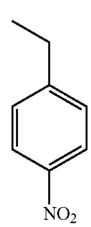 | compound 27-32 |

-continued
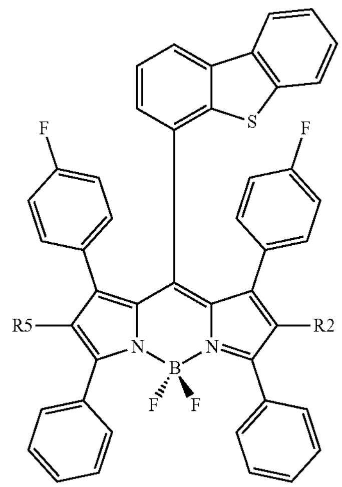
| R2, R5 | compound |
|---|---|
| —H | compound 28-1 |
| 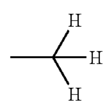 | compound 28-2 |
| —F | compound 28-3 |
| 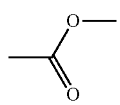 | compound 28-4 |
| 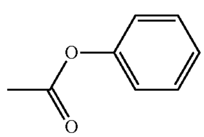 | compound 28-5 |
| —CN | compound 28-6 |
| 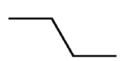 | compound 28-7 |
| 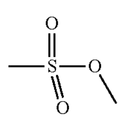 | compound 28-8 |
| 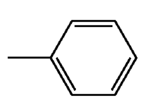 | compound 28-9 |
| 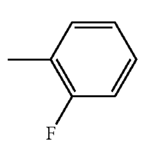 | compound 28-10 |

-continued
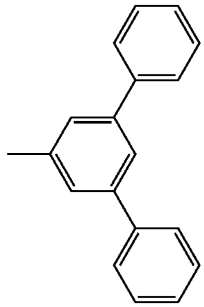 [SMILES: Cc1cc(-c2ccccc2)cc(-c2ccccc2)c1]
compound 28-11
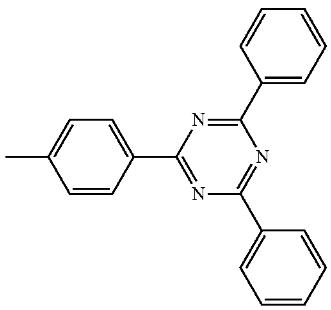 [SMILES: Cc1ccc(-c2nc(-c3ccccc3)nc(-c3ccccc3)n2)cc1]
compound 28-12
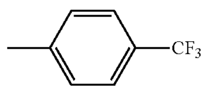
compound 28-13
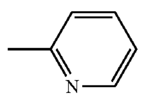
compound 28-14
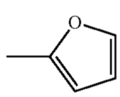
compound 28-15
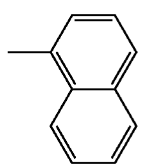
compound 28-16
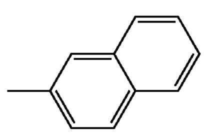
compound 28-17
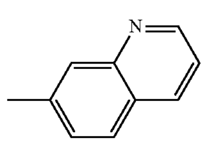
compound 28-18
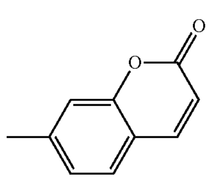
compound 28-19

-continued
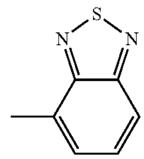
compound 28-20
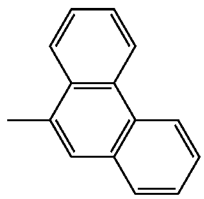
compound 28-21
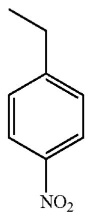
compound 28-22
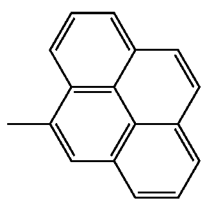 [SMILES: Cc1cc2cccc3ccc4cccc1c4c32]
compound 28-23
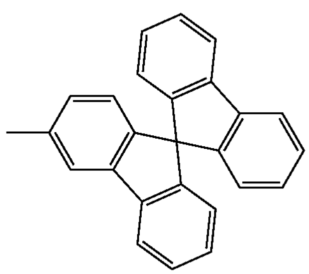 [SMILES: Cc1ccc2c(c1)-c1ccccc1C21c2ccccc2-c2ccccc21]
compound 28-24
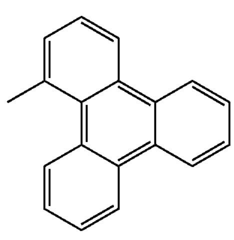 [SMILES: Cc1cccc2c3ccccc3c3ccccc3c12]
compound 28-25
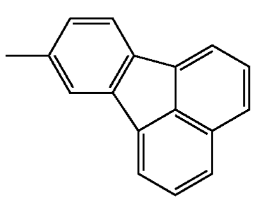 [SMILES: Cc1ccc2c(c1)-c1cccc3cccc-2c13]
compound 28-26

-continued
| R2 | R5 | compound |
|---|---|---|
| —H | 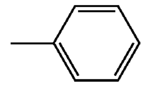 | compound 28-27 |
| 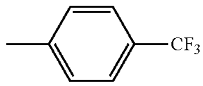 | 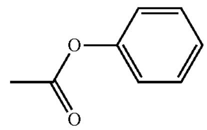 | compound 28-28 |
| —F | 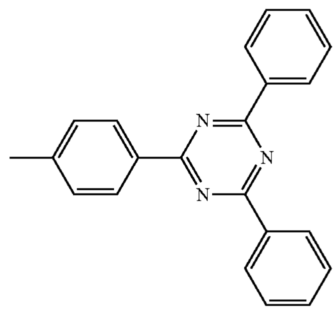 | compound 28-29 |
| —CN | 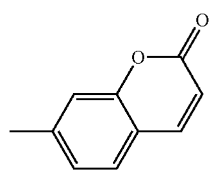 | compound 28-30 |
| 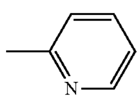 | 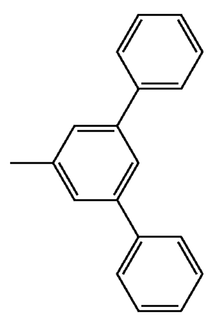 | compound 28-31 |
| 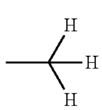 | 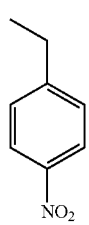 | compound 28-32 |

-continued
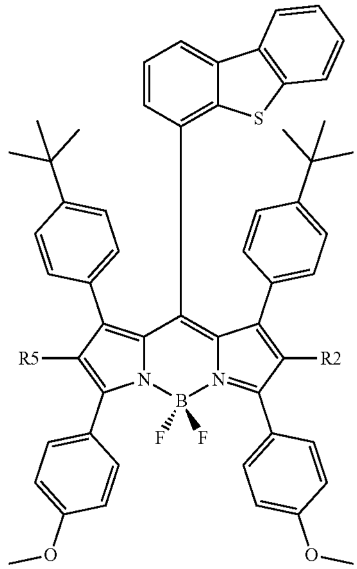
| R2, R5 | compound |
|---|---|
| —H | compound 29-1 |
| 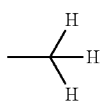 | compound 29-2 |
| —F | compound 29-3 |
| 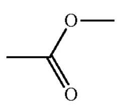 | compound 29-4 |
| 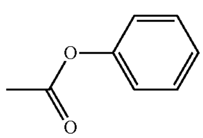 | compound 29-5 |
| —CN | compound 29-6 |
| 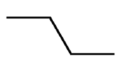 | compound 29-7 |
| 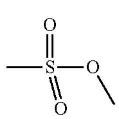 | compound 29-8 |
| 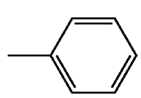 | compound 29-9 |
| 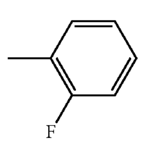 | compound 29-10 |

-continued
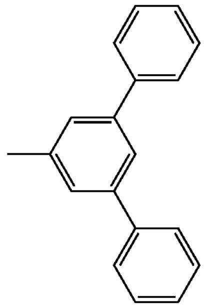 [SMILES: Cc1cc(-c2ccccc2)cc(-c2ccccc2)c1]
compound 29-11
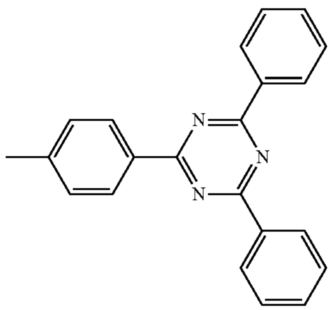 [SMILES: Cc1ccc(-c2nc(-c3ccccc3)nc(-c3ccccc3)n2)cc1]
compound 29-12
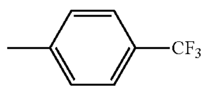
compound 29-13
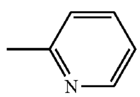
compound 29-14
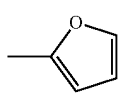
compound 29-15
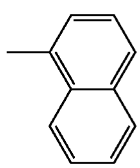
compound 29-16
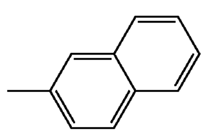
compound 29-17
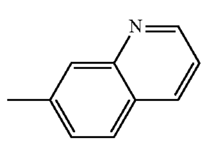
compound 29-18
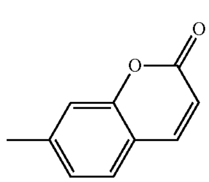
compound 29-19

-continued
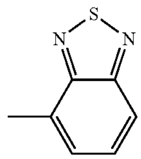
compound 29-20
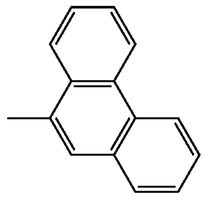
compound 29-21
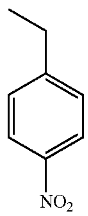
compound 29-22
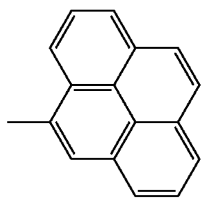 [SMILES: Cc1cc2cccc3ccc4cccc1c4c32]
compound 29-23
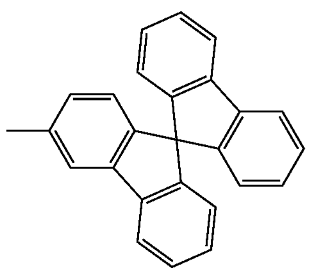 [SMILES: Cc1ccc2c(c1)-c1ccccc1C21c2ccccc2-c2ccccc21]
compound 29-24
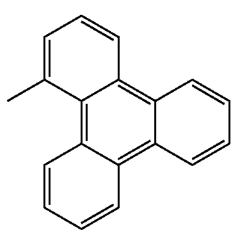 [SMILES: Cc1cccc2c3ccccc3c3ccccc3c12]
compound 29-25
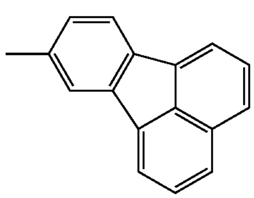 [SMILES: Cc1ccc2c(c1)-c1cccc3cccc-2c13]
compound 29-26

-continued
| R2 | R5 | compound |
|---|---|---|
| —H | 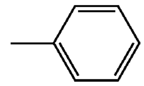 | compound 29-27 |
| 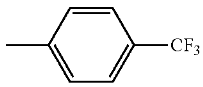 | 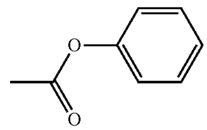 | compound 29-28 |
| —F | 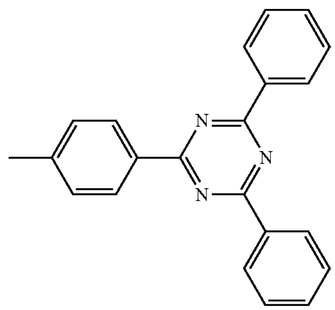 | compound 29-29 |
| —CN | 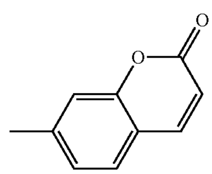 | compound 29-30 |
| 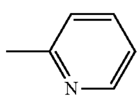 | 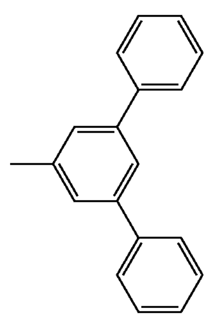 | compound 29-31 |
| 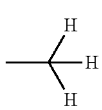 | 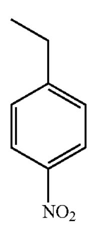 | compound 29-32 |

-continued
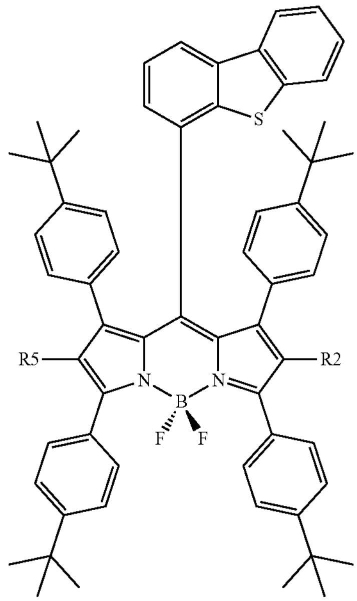
| R2, R5 | compound |
|---|---|
| —H | compound 30-1 |
| 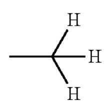 | compound 30-2 |
| —F | compound 30-3 |
| 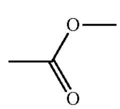 | compound 30-4 |
| 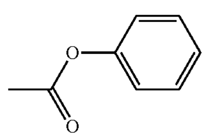 | compound 30-5 |
| —CN | compound 30-6 |
| 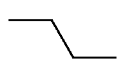 | compound 30-7 |
| 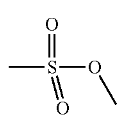 | compound 30-8 |
| 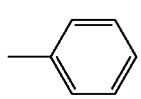 | compound 30-9 |
| 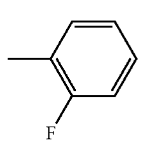 | compound 30-10 |

-continued
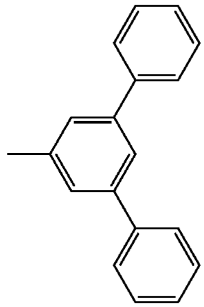 [SMILES: Cc1cc(-c2ccccc2)cc(-c2ccccc2)c1]
compound 30-11
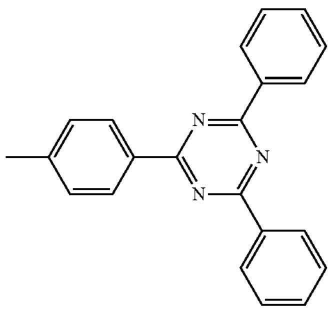 [SMILES: Cc1ccc(-c2nc(-c3ccccc3)nc(-c3ccccc3)n2)cc1]
compound 30-12
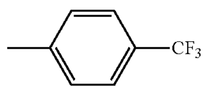
compound 30-13
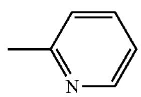
compound 30-14
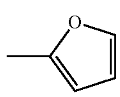
compound 30-15
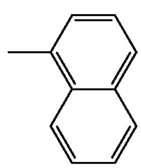
compound 30-16
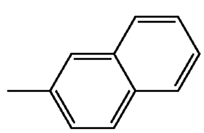
compound 30-17
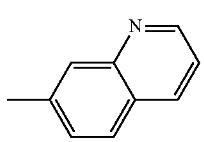
compound 30-18
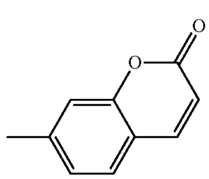
compound 30-19

-continued
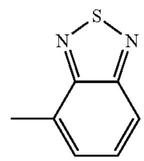
compound 30-20
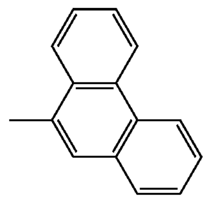
compound 30-21
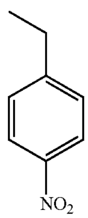
compound 30-22
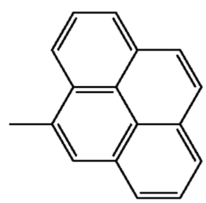 [SMILES: Cc1cc2cccc3ccc4cccc1c4c32]
compound 30-23
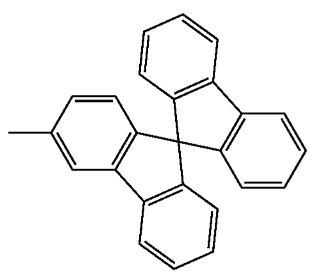 [SMILES: Cc1ccc2c(c1)-c1ccccc1C21c2ccccc2-c2ccccc21]
compound 30-24
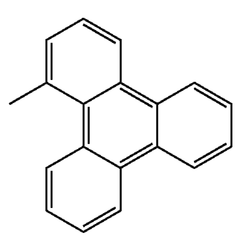 [SMILES: Cc1cccc2c3ccccc3c3ccccc3c12]
compound 30-25
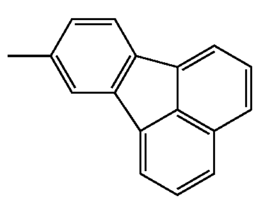 [SMILES: Cc1ccc2c(c1)-c1cccc3cccc-2c13]
compound 30-26

-continued
| R2 | R5 | compound |
| --- | --- | --- |
| —H | 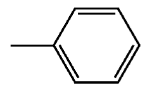 | compound 30-27 |
| 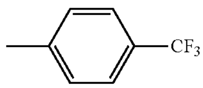 | 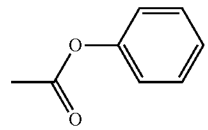 | compound 30-28 |
| —F | 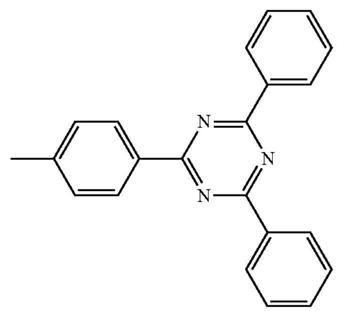 | compound 30-29 |
| —CN | 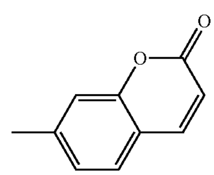 | compound 30-30 |
| 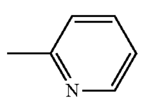 | 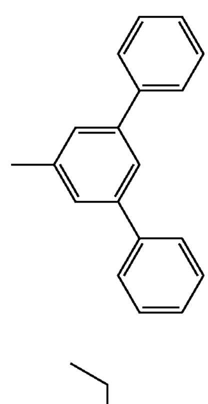 | compound 30-31 |
| 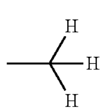 | 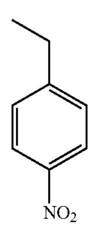 | compound 30-32 |

-continued
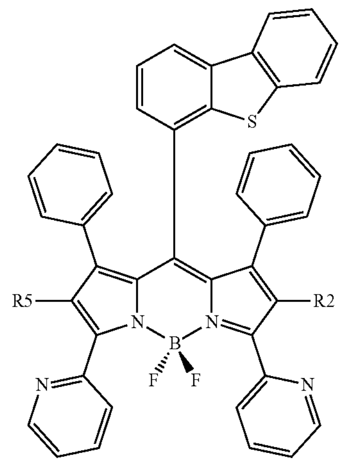
| R2, R5 | compound |
| --- | --- |
| —H | compound 31-1 |
| 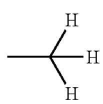 | compound 31-2 |
| —F | compound 31-3 |
| 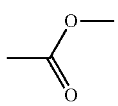 | compound 31-4 |
| 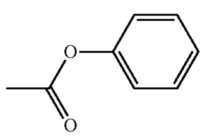 | compound 31-5 |
| —CN | compound 31-6 |
| 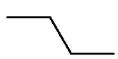 | compound 31-7 |
| 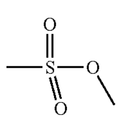 | compound 31-8 |
| 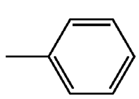 | compound 31-9 |
| 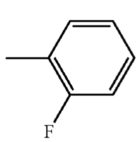 | compound 31-10 |

-continued
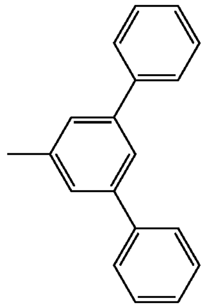 [SMILES: Cc1cc(-c2ccccc2)cc(-c2ccccc2)c1]
compound 31-11
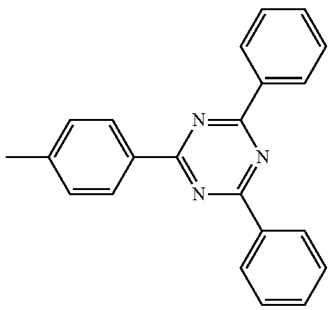 [SMILES: Cc1ccc(-c2nc(-c3ccccc3)nc(-c3ccccc3)n2)cc1]
compound 31-12
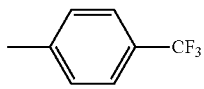
compound 31-13
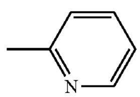
compound 31-14
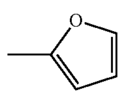
compound 31-15
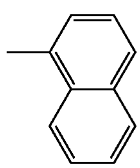
compound 31-16
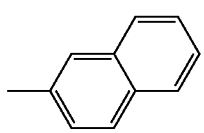
compound 31-17
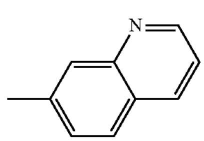
compound 31-18
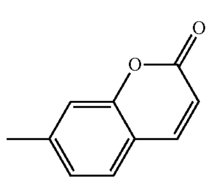
compound 31-19

-continued
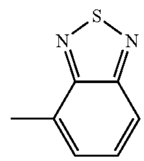
compound 31-20
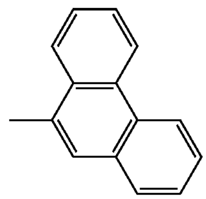
compound 31-21
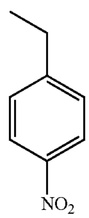
compound 31-22
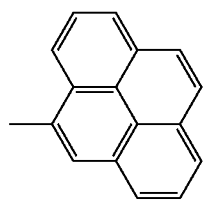 [SMILES: Cc1cc2cccc3ccc4cccc1c4c32]
compound 31-23
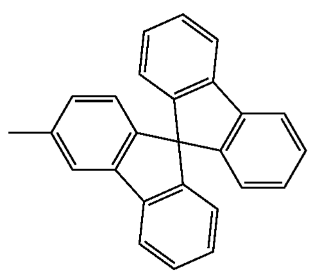 [SMILES: Cc1ccc2c(c1)-c1ccccc1C21c2ccccc2-c2ccccc21]
compound 31-24
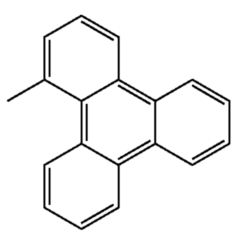 [SMILES: Cc1cccc2c3ccccc3c3ccccc3c12]
compound 31-25
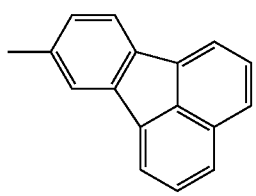 [SMILES: Cc1ccc2c(c1)-c1cccc3cccc-2c13]
compound 31-26

-continued
| R2 | R5 | compound |
|---|---|---|
| —H | 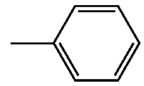 | compound 31-27 |
| 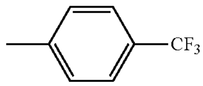 | 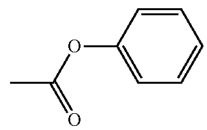 | compound 31-28 |
| —F | 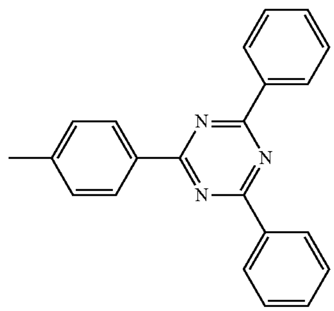 | compound 31-29 |
| —CN | 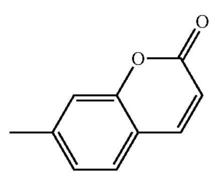 | compound 31-30 |
| 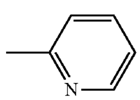 | 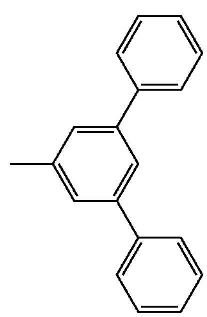 | compound 31-31 |
| 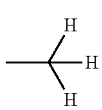 | 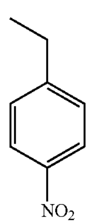 | compound 31-32 |

-continued
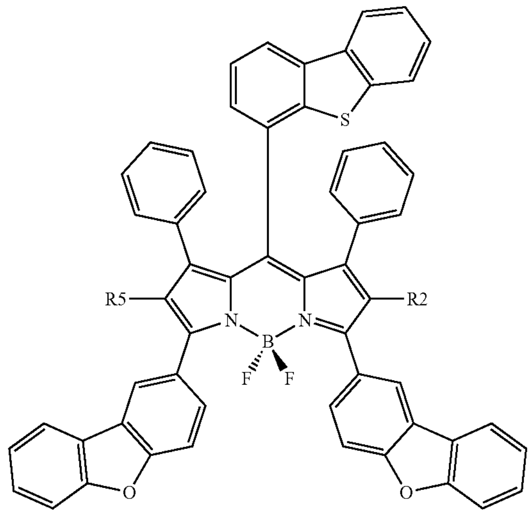
| R2, R5 | compound |
|---|---|
| —H | compound 32-1 |
| 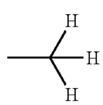 | compound 32-2 |
| —F | compound 32-3 |
| 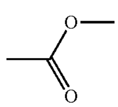 | compound 32-4 |
| 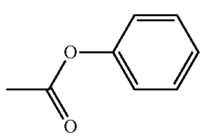 | compound 32-5 |
| —CN | compound 32-6 |
| 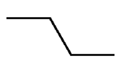 | compound 32-7 |
| 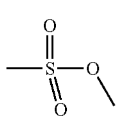 | compound 32-8 |
| 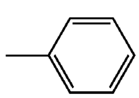 | compound 32-9 |
| 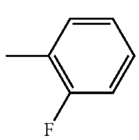 | compound 32-10 |

-continued
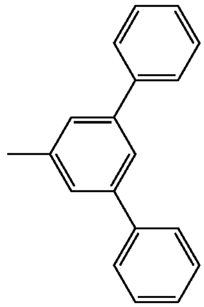 [SMILES: Cc1cc(-c2ccccc2)cc(-c2ccccc2)c1]
compound 32-11
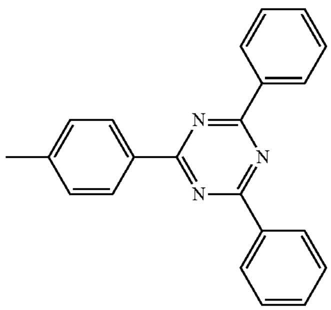 [SMILES: Cc1ccc(-c2nc(-c3ccccc3)nc(-c3ccccc3)n2)cc1]
compound 32-12
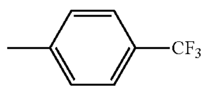
compound 32-13
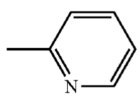
compound 32-14
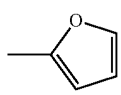
compound 32-15
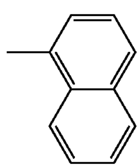
compound 32-16
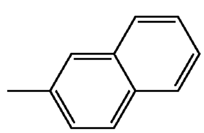
compound 32-17
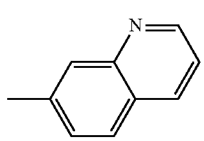
compound 32-18
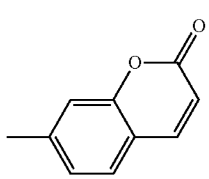
compound 32-19

-continued
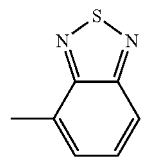
compound 32-20
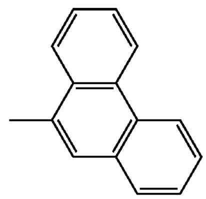
compound 32-21
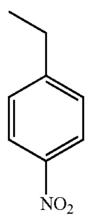
compound 32-22
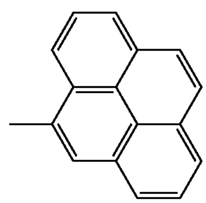 [SMILES: Cc1cc2cccc3ccc4cccc1c4c32]
compound 32-23
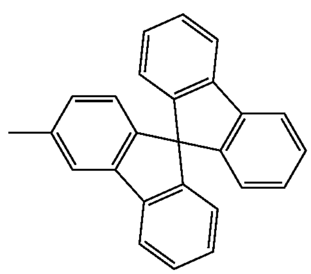 [SMILES: Cc1ccc2c(c1)-c1ccccc1C21c2ccccc2-c2ccccc21]
compound 32-24
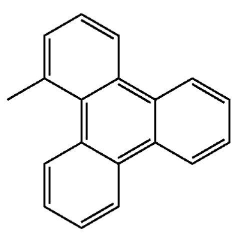 [SMILES: Cc1cccc2c3ccccc3c3ccccc3c12]
compound 32-25
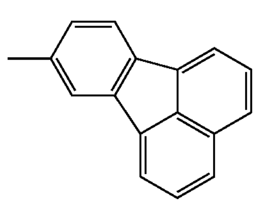 [SMILES: Cc1ccc2c(c1)-c1cccc3cccc-2c13]
compound 32-26

-continued
| R2 | R5 | compound |
|---|---|---|
| —H | 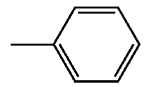 | compound 32-27 |
| 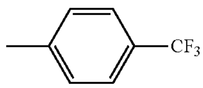 | 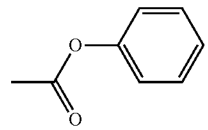 | compound 32-28 |
| —F | 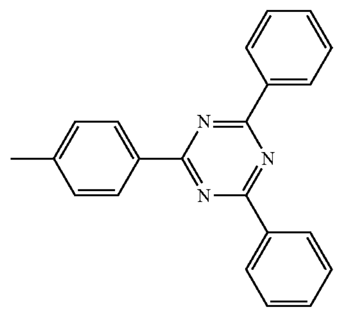 | compound 32-29 |
| —CN | 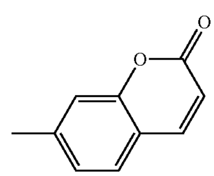 | compound 32-30 |
| 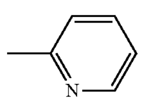 | 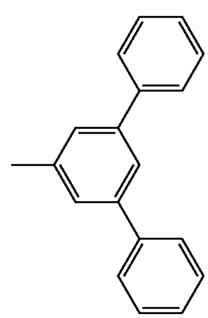 | compound 32-31 |
| 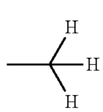 | 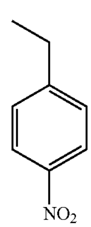 | compound 32-32 |

-continued
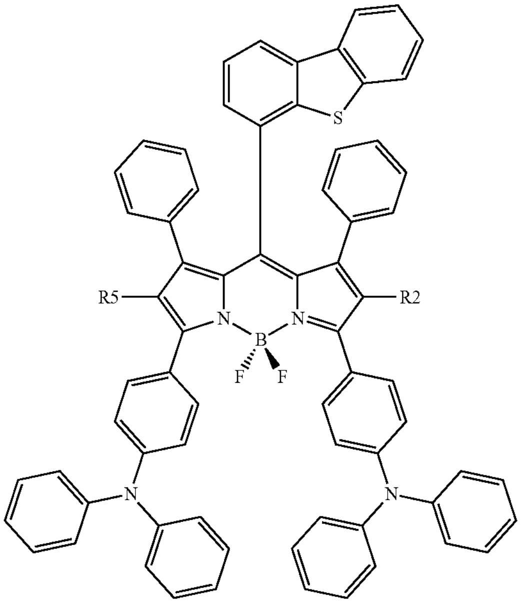
| R2, R5 | compound |
|---|---|
| —H | compound 33-1 |
| 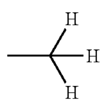 | compound 33-2 |
| —F | compound 33-3 |
| 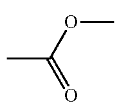 | compound 33-4 |
| 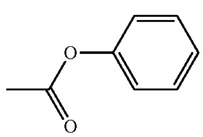 | compound 33-5 |
| —CN | compound 33-6 |
| 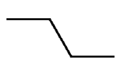 | compound 33-7 |
| 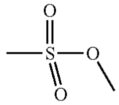 | compound 33-8 |
| 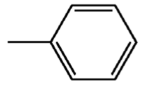 | compound 33-9 |
| 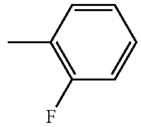 | compound 33-10 |

-continued
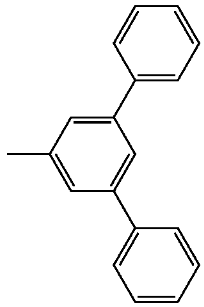 [SMILES: Cc1cc(-c2ccccc2)cc(-c2ccccc2)c1]
compound 33-11
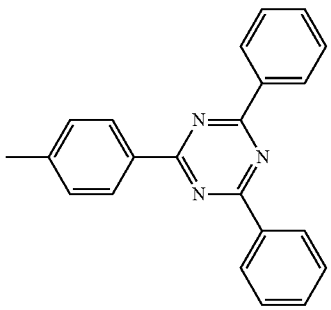 [SMILES: Cc1ccc(-c2nc(-c3ccccc3)nc(-c3ccccc3)n2)cc1]
compound 33-12
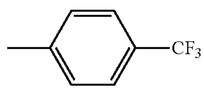
compound 33-13
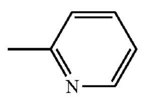
compound 33-14
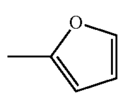
compound 33-15
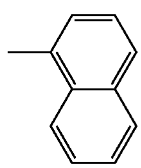
compound 33-16
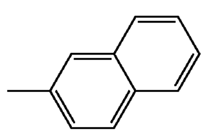
compound 33-17
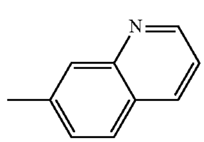
compound 33-18
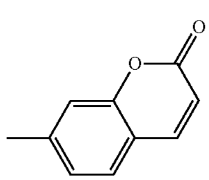
compound 33-19

-continued
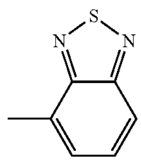
compound 33-20
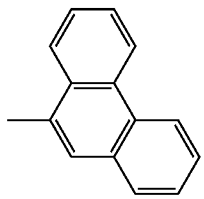
compound 33-21
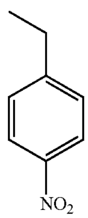
compound 33-22
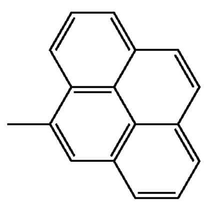 [SMILES: Cc1cc2cccc3ccc4cccc1c4c32]
compound 33-23
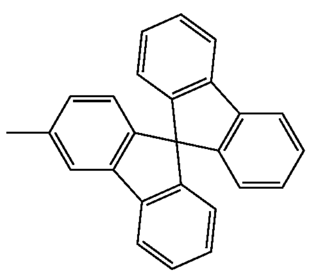 [SMILES: Cc1ccc2c(c1)-c1ccccc1C21c2ccccc2-c2ccccc21]
compound 33-24
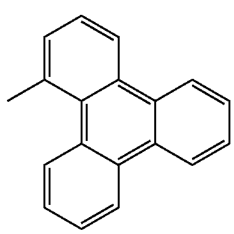 [SMILES: Cc1cccc2c3ccccc3c3ccccc3c12]
compound 33-25
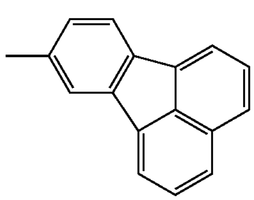 [SMILES: Cc1ccc2c(c1)-c1cccc3cccc-2c13]
compound 33-26

-continued
| R2 | R5 | compound |
|---|---|---|
| —H | 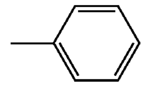 | compound 33-27 |
| 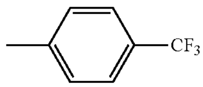 | 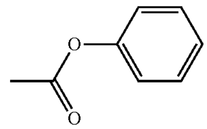 | compound 33-28 |
| —F | 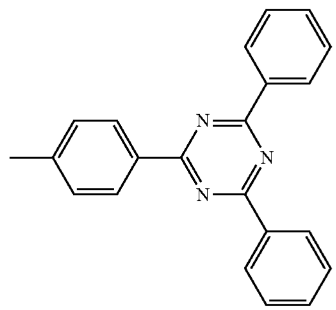 | compound 33-29 |
| —CN | 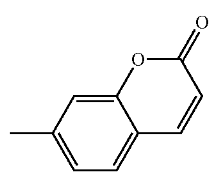 | compound 33-30 |
| 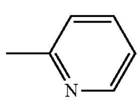 | 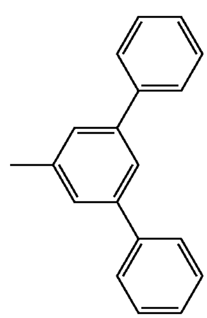 | compound 33-31 |
| 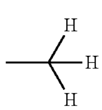 | 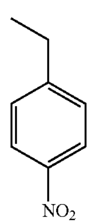 | compound 33-32 |

-continued
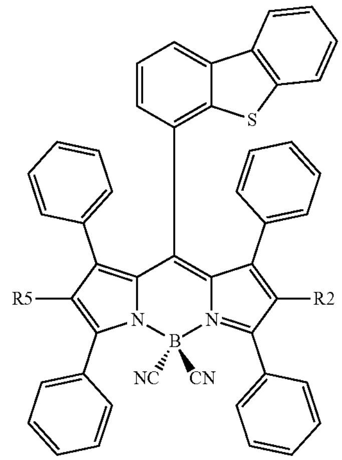
| R2, R5 | compound |
|---|---|
| —H | compound 34-1 |
| 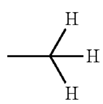 | compound 34-2 |
| —F | compound 34-3 |
| 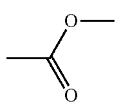 | compound 34-4 |
| 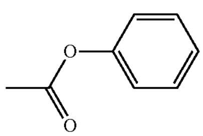 | compound 34-5 |
| —CN | compound 34-6 |
| 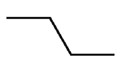 | compound 34-7 |
| 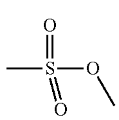 | compound 34-8 |
| 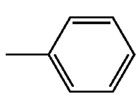 | compound 34-9 |
| 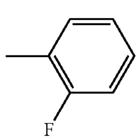 | compound 34-10 |

-continued
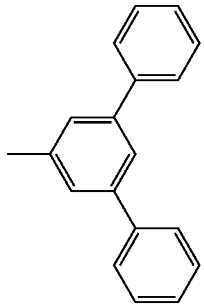 [SMILES: Cc1cc(-c2ccccc2)cc(-c2ccccc2)c1]
compound 34-11
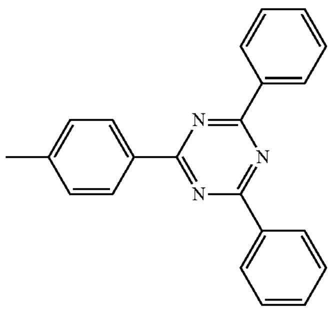 [SMILES: Cc1ccc(-c2nc(-c3ccccc3)nc(-c3ccccc3)n2)cc1]
compound 34-12
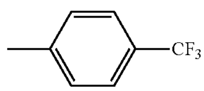
compound 34-13
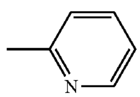
compound 34-14
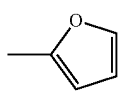
compound 34-15
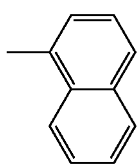
compound 34-16
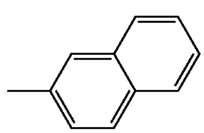
compound 34-17
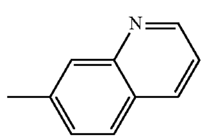
compound 34-18
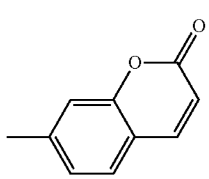
compound 34-19

-continued
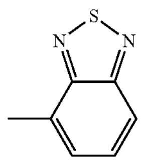
compound 34-20
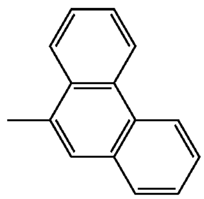
compound 34-21
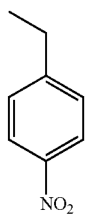
compound 34-22
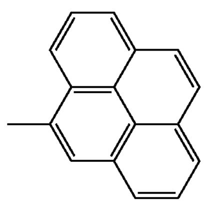 [SMILES: Cc1cc2cccc3ccc4cccc1c4c32]
compound 34-23
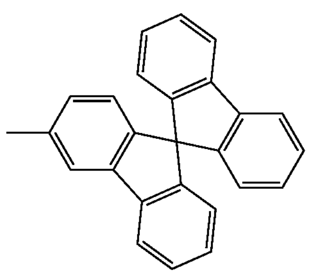 [SMILES: Cc1ccc2c(c1)-c1ccccc1C21c2ccccc2-c2ccccc21]
compound 34-24
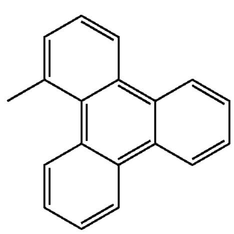 [SMILES: Cc1cccc2c3ccccc3c3ccccc3c12]
compound 34-25
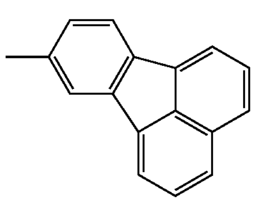 [SMILES: Cc1ccc2c(c1)-c1cccc3cccc-2c13]
compound 34-26

-continued
| R2 | R5 | compound |
|---|---|---|
| —H | 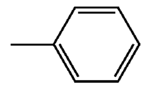 | compound 34-27 |
| 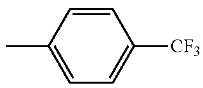 | 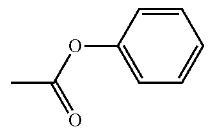 | compound 34-28 |
| —F | 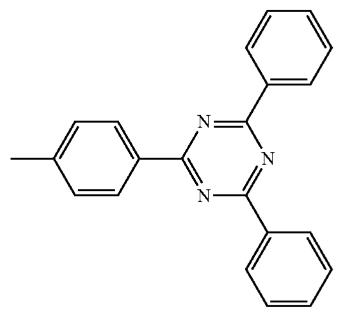 | compound 34-29 |
| —CN | 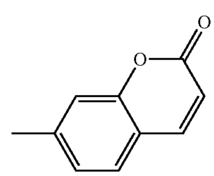 | compound 34-30 |
| 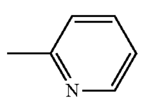 | 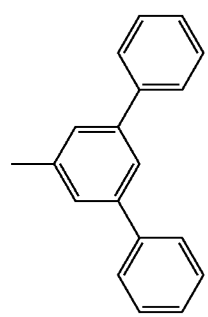 | compound 34-31 |
| 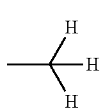 | 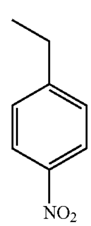 | compound 34-32 |

-continued
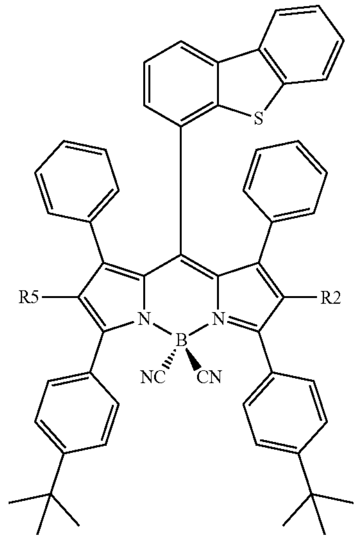
| R2, R5 | compound |
|---|---|
| —H | compound 35-1 |
| 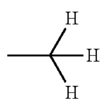 | compound 35-2 |
| —F | compound 35-3 |
| 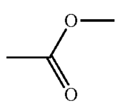 | compound 35-4 |
| 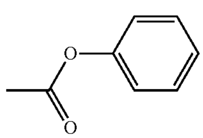 | compound 35-5 |
| —CN | compound 35-6 |
| 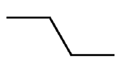 | compound 35-7 |
| 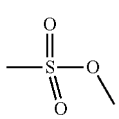 | compound 35-8 |
| 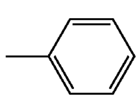 | compound 35-9 |
| 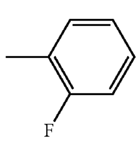 | compound 35-10 |

-continued
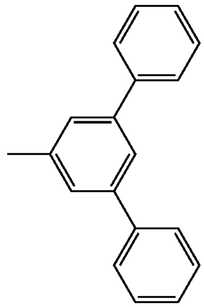 [SMILES: Cc1cc(-c2ccccc2)cc(-c2ccccc2)c1]
compound 35-11
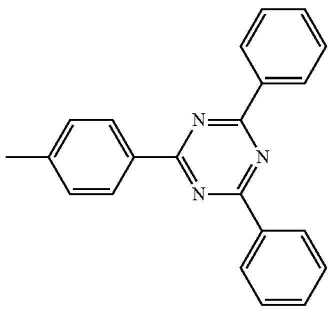 [SMILES: Cc1ccc(-c2nc(-c3ccccc3)nc(-c3ccccc3)n2)cc1]
compound 35-12
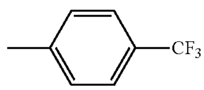
compound 35-13
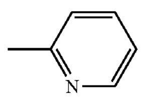
compound 35-14
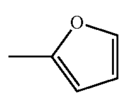
compound 35-15
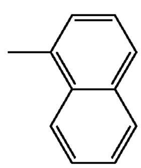
compound 35-16
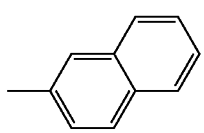
compound 35-17
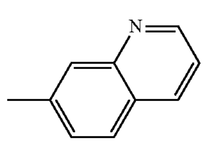
compound 35-18
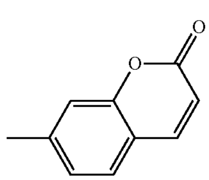
compound 35-19

-continued
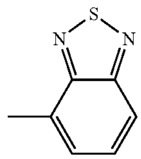
compound 35-20
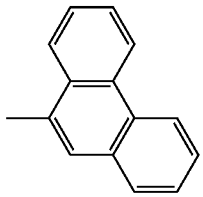
compound 35-21
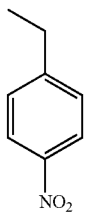
compound 35-22
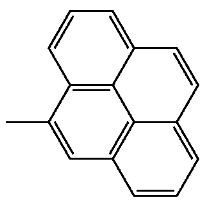 [SMILES: Cc1cc2cccc3ccc4cccc1c4c32]
compound 35-23
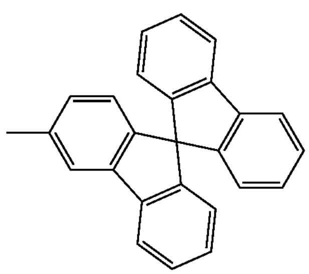 [SMILES: Cc1ccc2c(c1)-c1ccccc1C21c2ccccc2-c2ccccc21]
compound 35-24
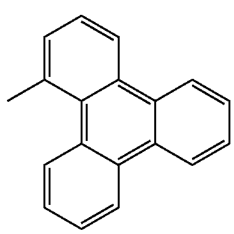 [SMILES: Cc1cccc2c3ccccc3c3ccccc3c12]
compound 35-25
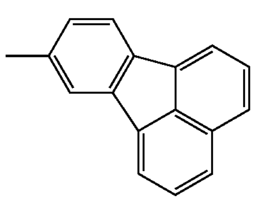 [SMILES: Cc1ccc2c(c1)-c1cccc3cccc-2c13]
compound 35-26

-continued
| R2 | R5 | compound |
| --- | --- | --- |
| —H | 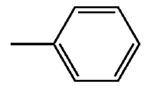 | compound 35-27 |
| 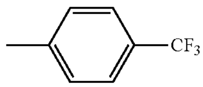 | 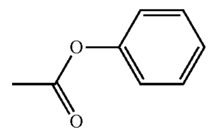 | compound 35-28 |
| —F | 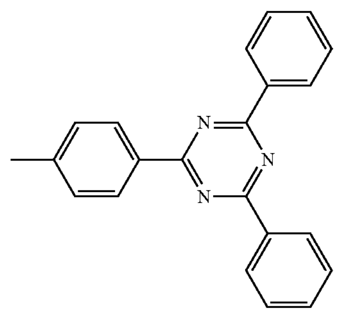 | compound 35-29 |
| —CN | 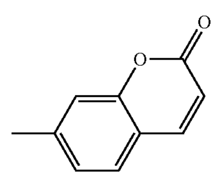 | compound 35-30 |
| 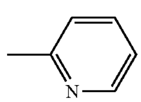 | 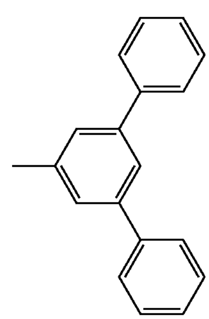 | compound 35-31 |
| 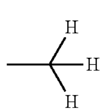 | 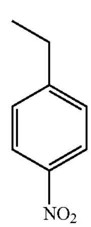 | compound 35-32 |

-continued
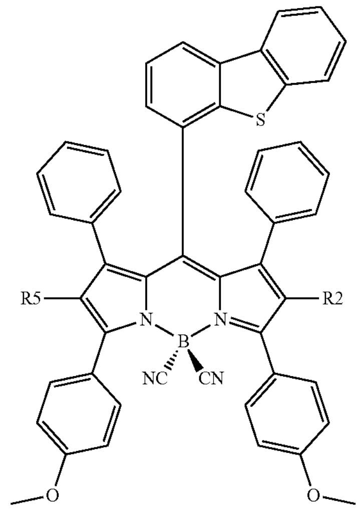
| R2, R5 | compound |
|---|---|
| —H | compound 36-1 |
| 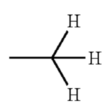 | compound 36-2 |
| —F | compound 36-3 |
| 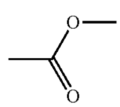 | compound 36-4 |
| 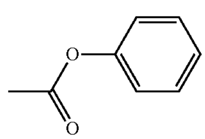 | compound 36-5 |
| —CN | compound 36-6 |
| 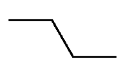 | compound 36-7 |
| 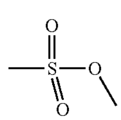 | compound 36-8 |
| 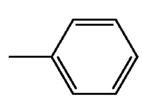 | compound 36-9 |
| 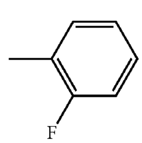 | compound 36-10 |

-continued
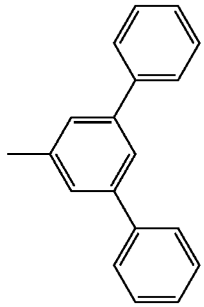 [SMILES: Cc1cc(-c2ccccc2)cc(-c2ccccc2)c1]
compound 36-11
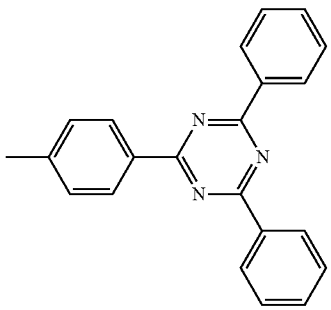 [SMILES: Cc1ccc(-c2nc(-c3ccccc3)nc(-c3ccccc3)n2)cc1]
compound 36-12
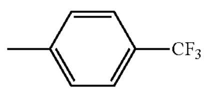
compound 36-13
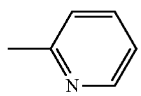
compound 36-14
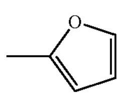
compound 36-15
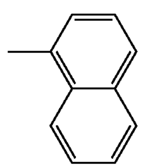
compound 36-16
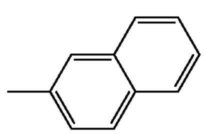
compound 36-17
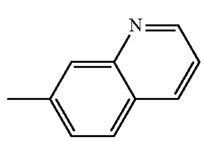
compound 36-18
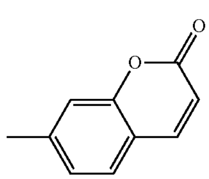
compound 36-19

-continued
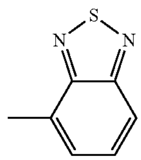
compound 36-20
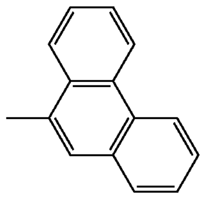
compound 36-21
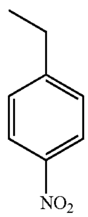
compound 36-22
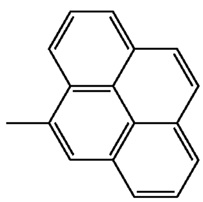 [SMILES: Cc1cc2cccc3ccc4cccc1c4c32]
compound 36-23
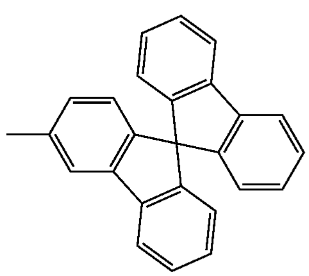 [SMILES: Cc1ccc2c(c1)-c1ccccc1C21c2ccccc2-c2ccccc21]
compound 36-24
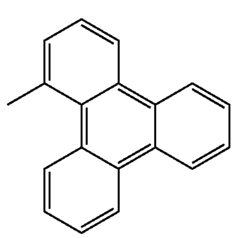 [SMILES: Cc1cccc2c3ccccc3c3ccccc3c12]
compound 36-25

-continued
| | | |
|---|---|---|
| 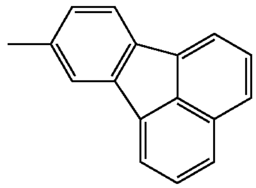 | | compound 36-26 |
| R2 | R5 | compound |
|---|---|---|
| —H | 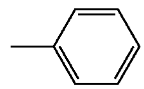 | compound 36-27 |
| 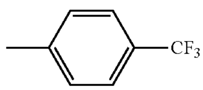 | 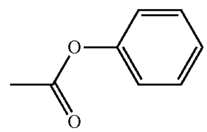 | compound 36-28 |
| —F | 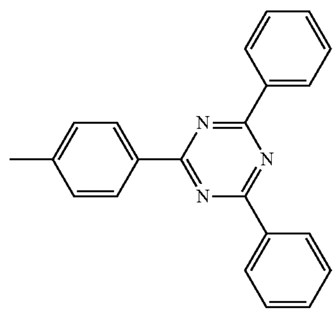 | compound 36-29 |
| —CN | 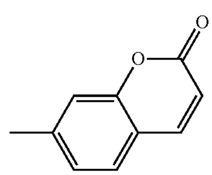 | compound 36-30 |
| 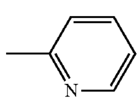 | 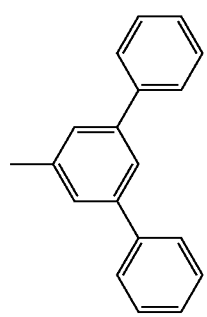 | compound 36-31 |
| 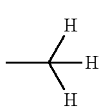 | 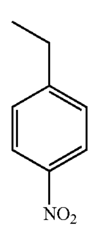 | compound 36-32 |

-continued
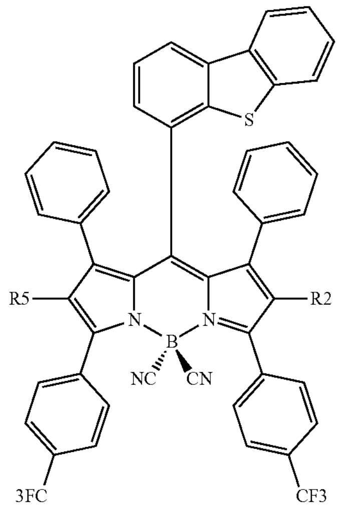
| R2, R5 | compound |
|---|---|
| —H | compound 37-1 |
| 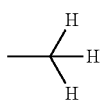 | compound 37-2 |
| —F | compound 37-3 |
| 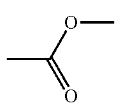 | compound 37-4 |
| 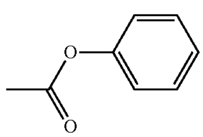 | compound 37-5 |
| —CN | compound 37-6 |
| 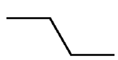 | compound 37-7 |
| 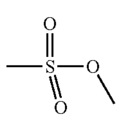 | compound 37-8 |
| 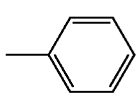 | compound 37-9 |
| 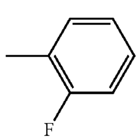 | compound 37-10 |

-continued
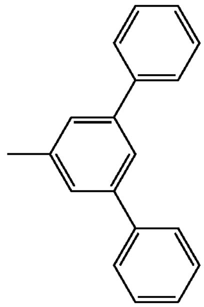 [SMILES: Cc1cc(-c2ccccc2)cc(-c2ccccc2)c1]
compound 37-11
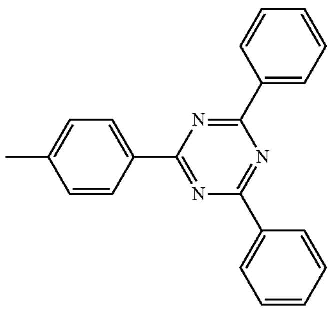 [SMILES: Cc1ccc(-c2nc(-c3ccccc3)nc(-c3ccccc3)n2)cc1]
compound 37-12
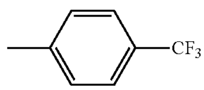
compound 37-13
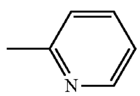
compound 37-14
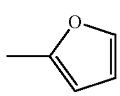
compound 37-15
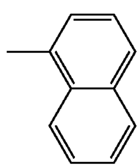
compound 37-16
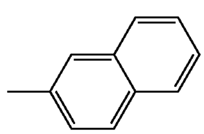
compound 37-17
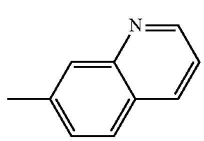
compound 37-18
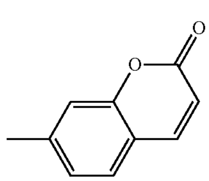
compound 37-19

-continued
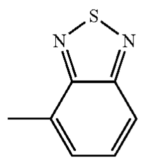
compound 37-20
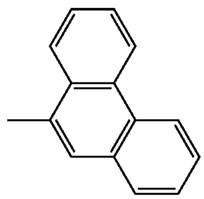
compound 37-21
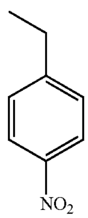
compound 37-22
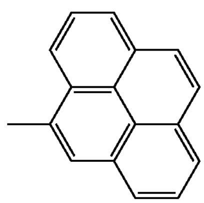 [SMILES: Cc1cc2cccc3ccc4cccc1c4c32]
compound 37-23
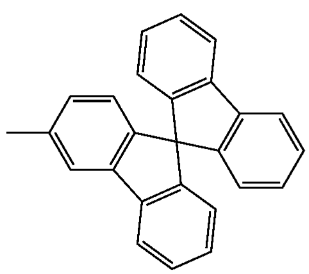 [SMILES: Cc1ccc2c(c1)-c1ccccc1C21c2ccccc2-c2ccccc21]
compound 37-24
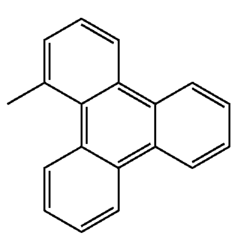 [SMILES: Cc1cccc2c3ccccc3c3ccccc3c12]
compound 37-25
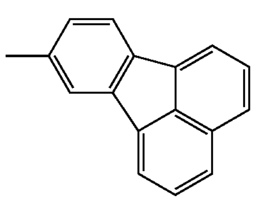 [SMILES: Cc1ccc2c(c1)-c1cccc3cccc-2c13]
compound 37-26

-continued
| R2 | R5 | compound |
|---|---|---|
| —H | 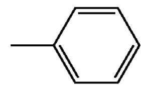 | compound 37-27 |
| 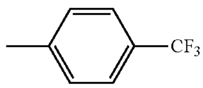 | 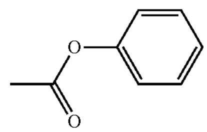 | compound 37-28 |
| —F | 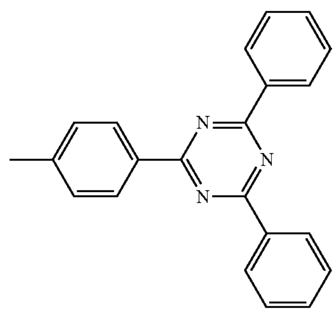 | compound 37-29 |
| —CN | 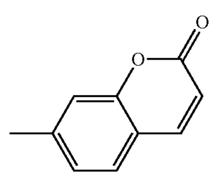 | compound 37-30 |
| 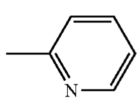 | 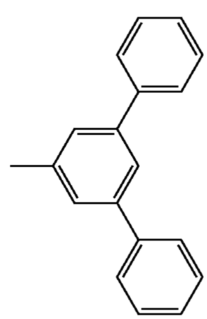 | compound 37-31 |
| 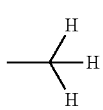 | 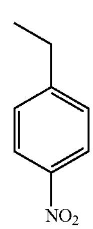 | compound 37-32 |

-continued
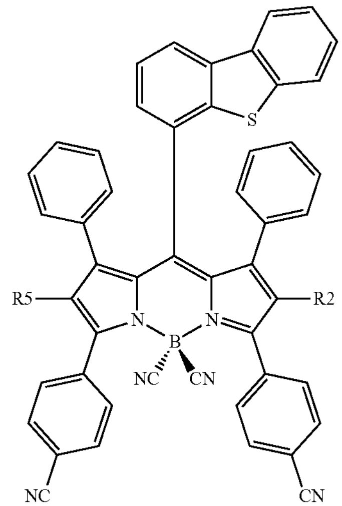
| R2, R5 | compound |
|---|---|
| —H | compound 38-1 |
| 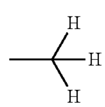 | compound 38-2 |
| —F | compound 38-3 |
| 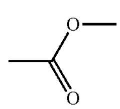 | compound 38-4 |
| 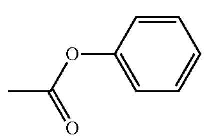 | compound 38-5 |
| —CN | compound 38-6 |
| 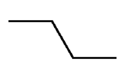 | compound 38-7 |
| 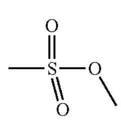 | compound 38-8 |
| 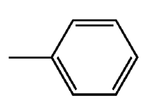 | compound 38-9 |
| 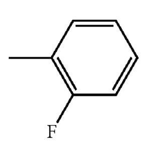 | compound 38-10 |

-continued
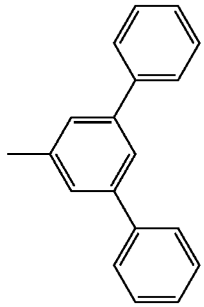 [SMILES: Cc1cc(-c2ccccc2)cc(-c2ccccc2)c1]
compound 38-11
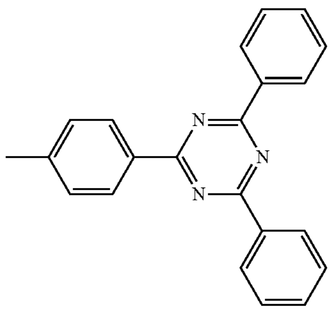 [SMILES: Cc1ccc(-c2nc(-c3ccccc3)nc(-c3ccccc3)n2)cc1]
compound 38-12
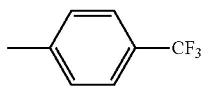
compound 38-13
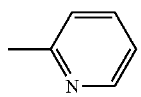
compound 38-14
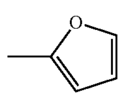
compound 38-15
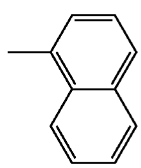
compound 38-16
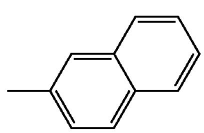
compound 38-17
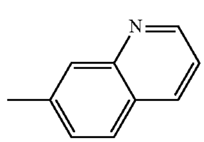
compound 38-18
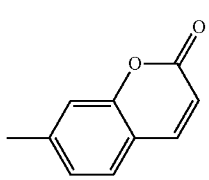
compound 38-19

-continued
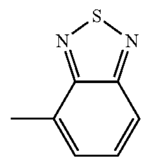
compound 38-20
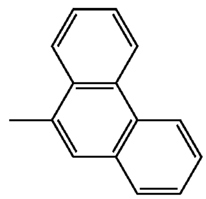
compound 38-21
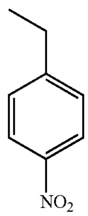
compound 38-22
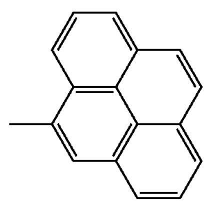 [SMILES: Cc1cc2cccc3ccc4cccc1c4c32]
compound 38-23
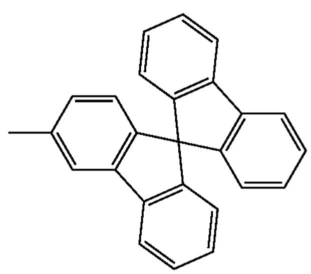 [SMILES: Cc1ccc2c(c1)-c1ccccc1C21c2ccccc2-c2ccccc21]
compound 38-24
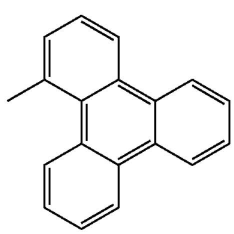 [SMILES: Cc1cccc2c3ccccc3c3ccccc3c12]
compound 38-25
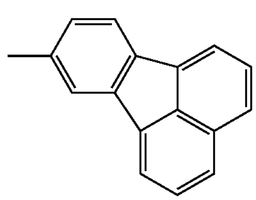 [SMILES: Cc1ccc2c(c1)-c1cccc3cccc-2c13]
compound 38-26

-continued
| R2 | R5 | compound |
|---|---|---|
| —H | 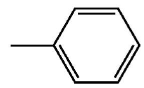 | compound 38-27 |
| 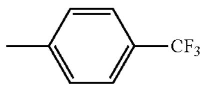 | 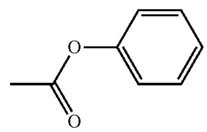 | compound 38-28 |
| —F | 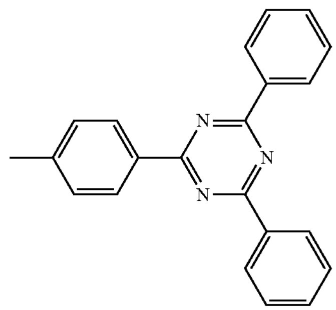 | compound 38-29 |
| —CN | 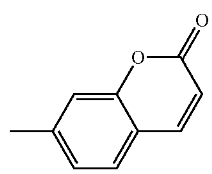 | compound 38-30 |
| 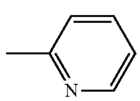 | 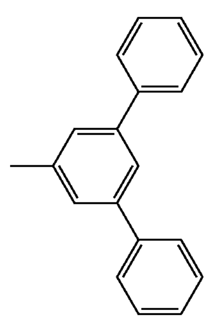 | compound 38-31 |
| 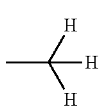 | 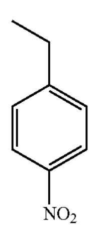 | compound 38-32 |

-continued
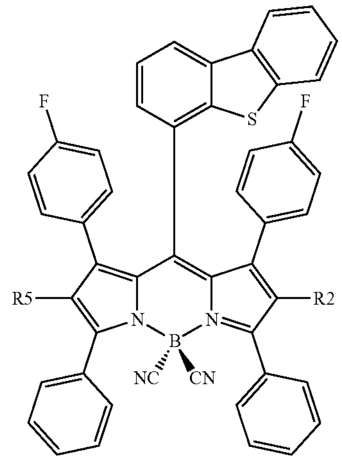
| R2, R5 | compound |
| --- | --- |
| —H | compound 39-1 |
| 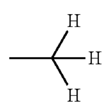 | compound 39-2 |
| —F | compound 39-3 |
| 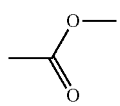 | compound 39-4 |
| 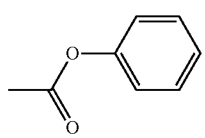 | compound 39-5 |
| —CN | compound 39-6 |
| 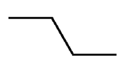 | compound 39-7 |
| 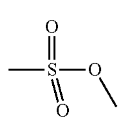 | compound 39-8 |
| 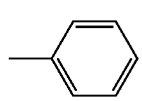 | compound 39-9 |
| 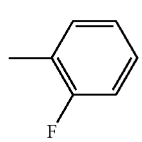 | compound 39-10 |

-continued
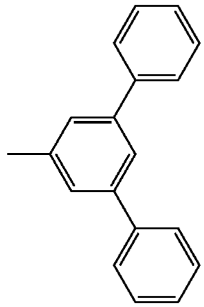 [SMILES: Cc1cc(-c2ccccc2)cc(-c2ccccc2)c1]
compound 39-11
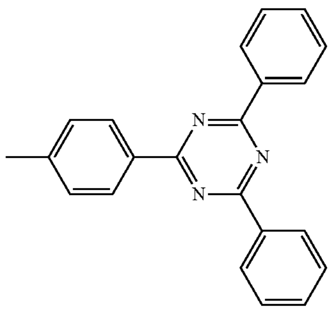 [SMILES: Cc1ccc(-c2nc(-c3ccccc3)nc(-c3ccccc3)n2)cc1]
compound 39-12
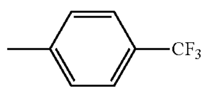
compound 39-13
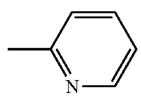
compound 39-14
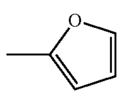
compound 39-15
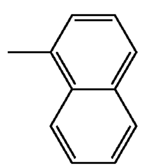
compound 39-16
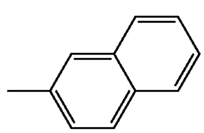
compound 39-17
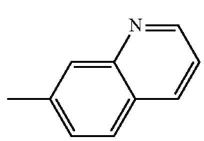
compound 39-18
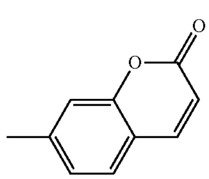
compound 39-19

-continued
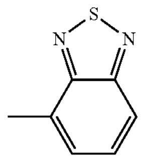
compound 39-20
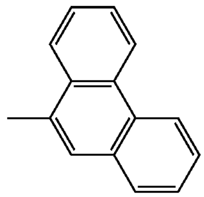
compound 39-21
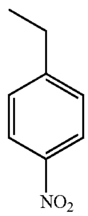
compound 39-22
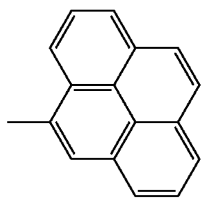 [SMILES: Cc1cc2cccc3ccc4cccc1c4c32]
compound 39-23
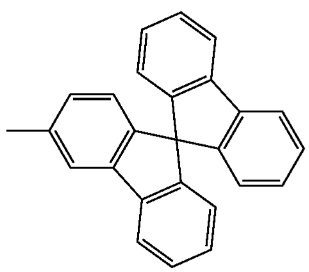 [SMILES: Cc1ccc2c(c1)-c1ccccc1C21c2ccccc2-c2ccccc21]
compound 39-24
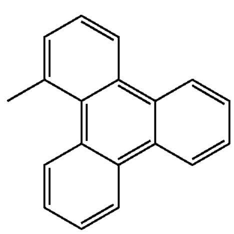 [SMILES: Cc1cccc2c3ccccc3c3ccccc3c12]
compound 39-25
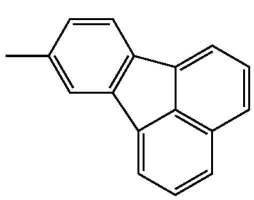 [SMILES: Cc1ccc2c(c1)-c1cccc3cccc-2c13]
compound 39-26

-continued
| R2 | R5 | compound |
| --- | --- | --- |
| —H | 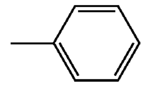 | compound 39-27 |
| 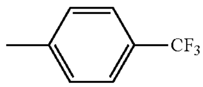 | 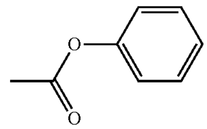 | compound 39-28 |
| —F | 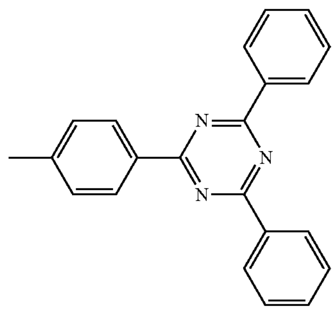 | compound 39-29 |
| —CN | 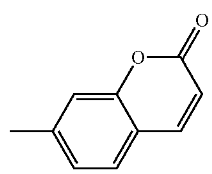 | compound 39-30 |
| 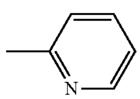 | 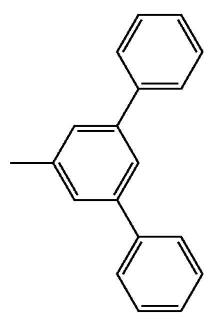 | compound 39-31 |
| 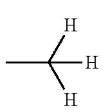 | 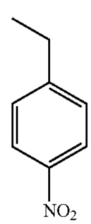 | compound 39-32 |

-continued
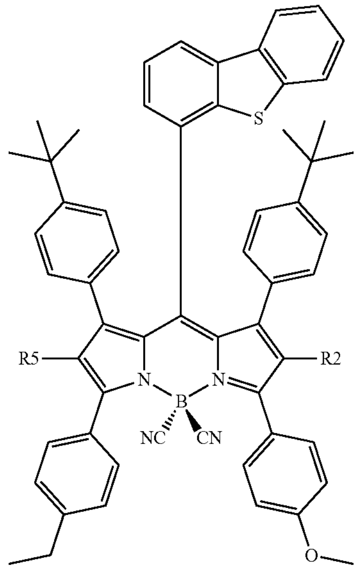
| R2, R5 | compound |
|---|---|
| —H | compound 40-1 |
| 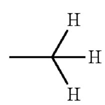 | compound 40-2 |
| —F | compound 40-3 |
| 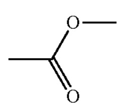 | compound 40-4 |
| 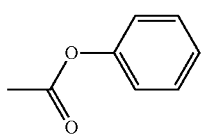 | compound 40-5 |
| —CN | compound 40-6 |
| 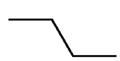 | compound 40-7 |
| 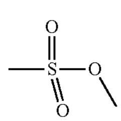 | compound 40-8 |
| 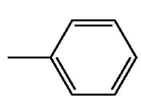 | compound 40-9 |
| 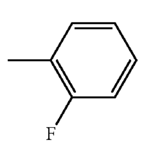 | compound 40-10 |

-continued
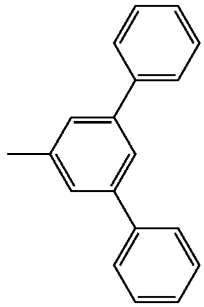 [SMILES: Cc1cc(-c2ccccc2)cc(-c2ccccc2)c1]
compound 40-11
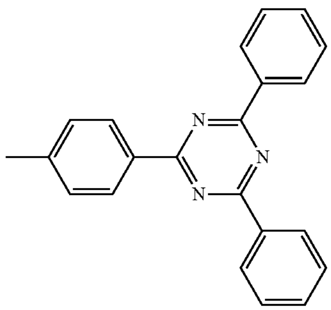 [SMILES: Cc1ccc(-c2nc(-c3ccccc3)nc(-c3ccccc3)n2)cc1]
compound 40-12
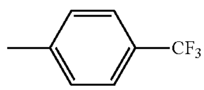
compound 40-13
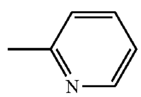
compound 40-14
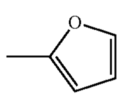
compound 40-15
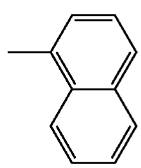
compound 40-16
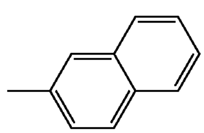
compound 40-17
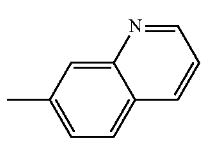
compound 40-18
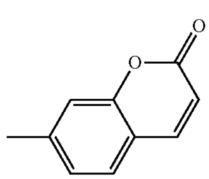
compound 40-19

-continued
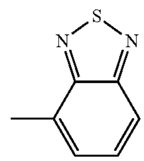
compound 40-20
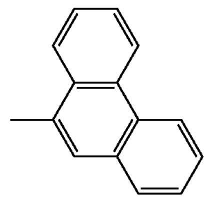
compound 40-21
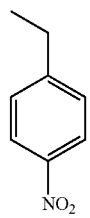
compound 40-22
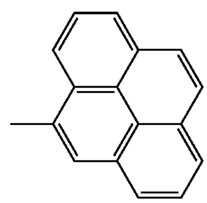 [SMILES: Cc1cc2cccc3ccc4cccc1c4c32]
compound 40-23
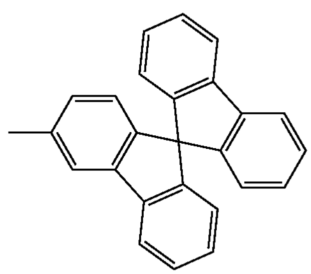 [SMILES: Cc1ccc2c(c1)-c1ccccc1C21c2ccccc2-c2ccccc21]
compound 40-24
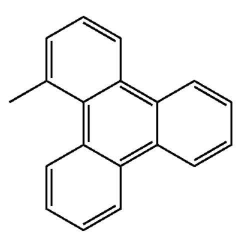 [SMILES: Cc1cccc2c3ccccc3c3ccccc3c12]
compound 40-25
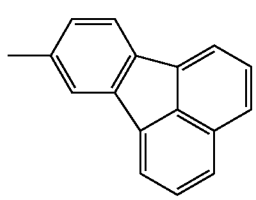 [SMILES: Cc1ccc2c(c1)-c1cccc3cccc-2c13]
compound 40-26

-continued
| R2 | R5 | compound |
| --- | --- | --- |
| —H | 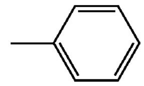 | compound 40-27 |
| 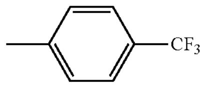 | 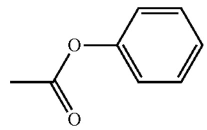 | compound 40-28 |
| —F | 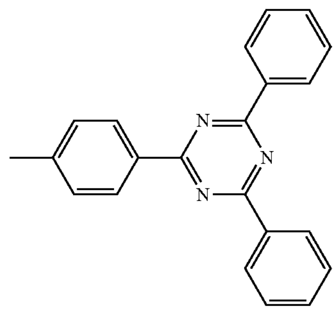 | compound 40-29 |
| —CN | 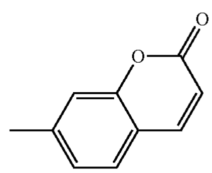 | compound 40-30 |
| 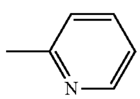 | 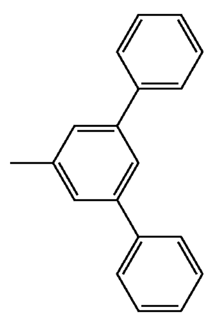 | compound 40-31 |
| 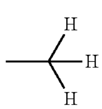 | 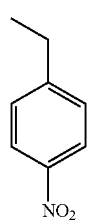 | compound 40-32 |

-continued
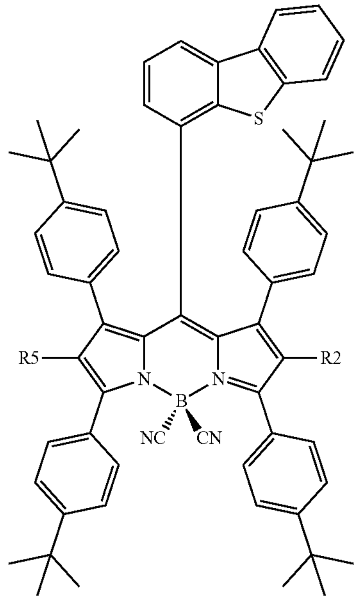
| R2, R5 | compound |
|---|---|
| —H | compound 41-1 |
| 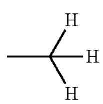 | compound 41-2 |
| —F | compound 41-3 |
| 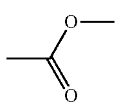 | compound 41-4 |
| 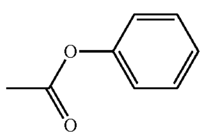 | compound 41-5 |
| —CN | compound 41-6 |
| 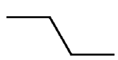 | compound 41-7 |
| 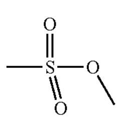 | compound 41-8 |
| 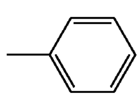 | compound 41-9 |
| 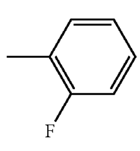 | compound 41-10 |

-continued
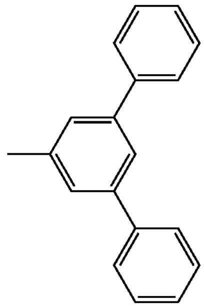 [SMILES: Cc1cc(-c2ccccc2)cc(-c2ccccc2)c1]
compound 41-11
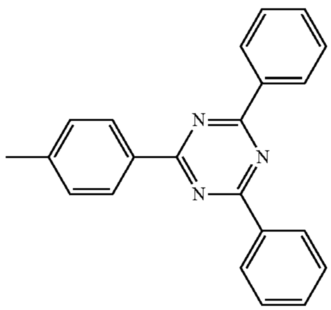 [SMILES: Cc1ccc(-c2nc(-c3ccccc3)nc(-c3ccccc3)n2)cc1]
compound 41-12
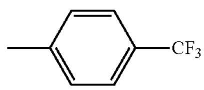
compound 41-13
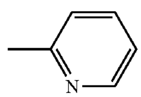
compound 41-14
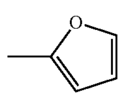
compound 41-15
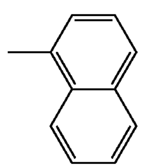
compound 41-16
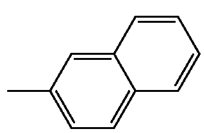
compound 41-17
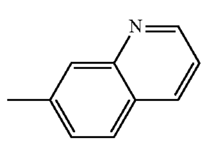
compound 41-18
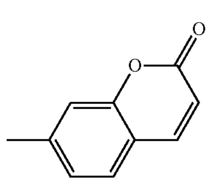
compound 41-19

-continued
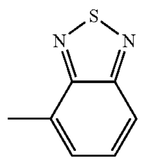
compound 41-20
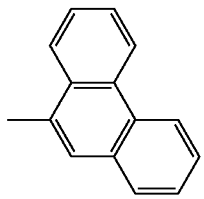
compound 41-21
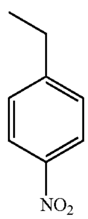
compound 41-22
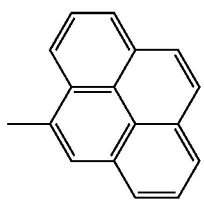 [SMILES: Cc1cc2cccc3ccc4cccc1c4c32]
compound 41-23
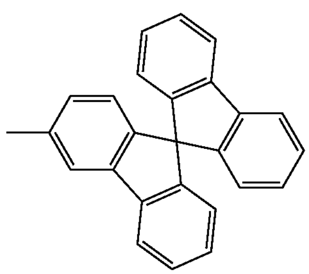 [SMILES: Cc1ccc2c(c1)-c1ccccc1C21c2ccccc2-c2ccccc21]
compound 41-24
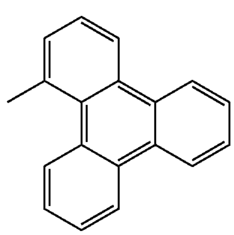 [SMILES: Cc1cccc2c3ccccc3c3ccccc3c12]
compound 41-25
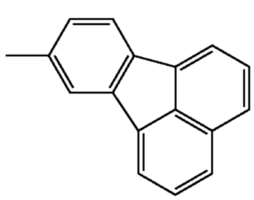 [SMILES: Cc1ccc2c(c1)-c1cccc3cccc-2c13]
compound 41-26

-continued
| R2 | R5 | compound |
|---|---|---|
| —H | 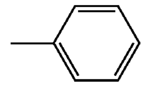 | compound 41-27 |
| 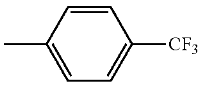 | 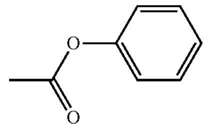 | compound 41-28 |
| —F | 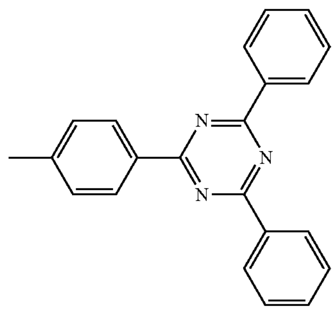 | compound 41-29 |
| —CN | 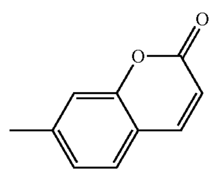 | compound 41-30 |
| 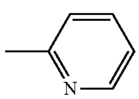 | 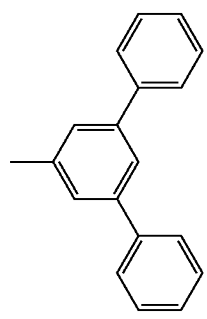 | compound 41-31 |
| 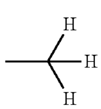 | 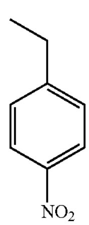 | compound 41-32 |

-continued
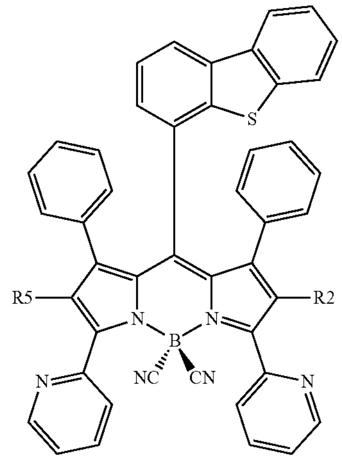
| R2, R5 | compound |
|---|---|
| —H | compound 42-1 |
| 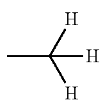 | compound 42-2 |
| —F | compound 42-3 |
| 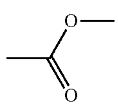 | compound 42-4 |
| 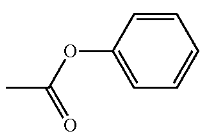 | compound 42-5 |
| —CN | compound 42-6 |
| 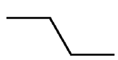 | compound 42-7 |
| 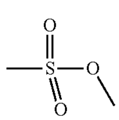 | compound 42-8 |
| 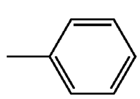 | compound 42-9 |
| 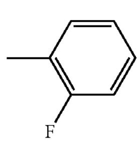 | compound 42-10 |

-continued
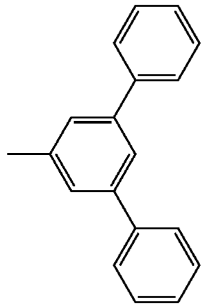 [SMILES: Cc1cc(-c2ccccc2)cc(-c2ccccc2)c1]
compound 42-11
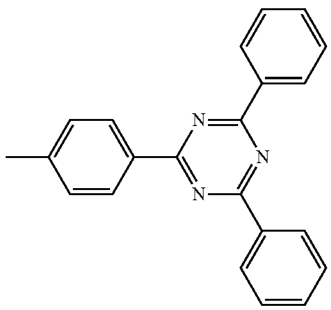 [SMILES: Cc1ccc(-c2nc(-c3ccccc3)nc(-c3ccccc3)n2)cc1]
compound 42-12
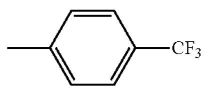
compound 42-13
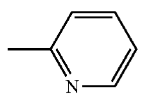
compound 42-14
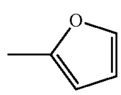
compound 42-15
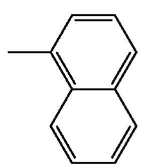
compound 42-16
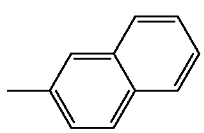
compound 42-17
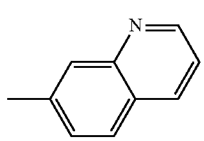
compound 42-18
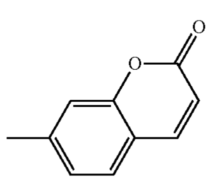
compound 42-19

-continued
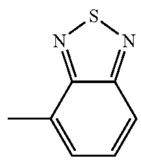
compound 42-20
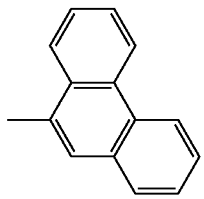
compound 42-21
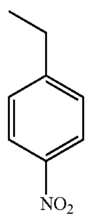
compound 42-22
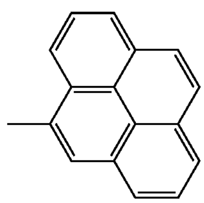 [SMILES: Cc1cc2cccc3ccc4cccc1c4c32]
compound 42-23
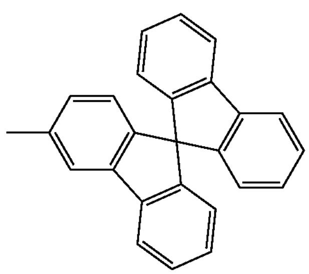 [SMILES: Cc1ccc2c(c1)-c1ccccc1C21c2ccccc2-c2ccccc21]
compound 42-24
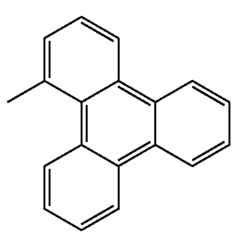 [SMILES: Cc1cccc2c3ccccc3c3ccccc3c12]
compound 42-25
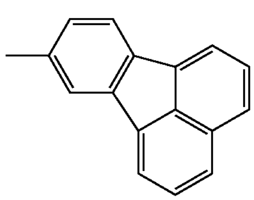 [SMILES: Cc1ccc2c(c1)-c1cccc3cccc-2c13]
compound 42-26

-continued
| R2 | R5 | compound |
|---|---|---|
| —H | 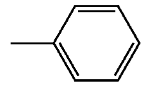 | compound 42-27 |
| 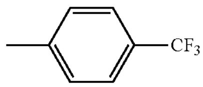 | 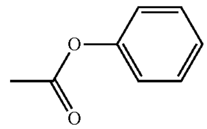 | compound 42-28 |
| —F | 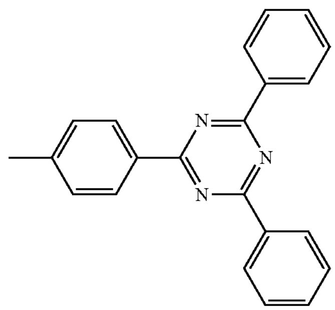 | compound 42-29 |
| —CN | 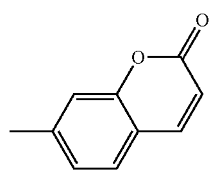 | compound 42-30 |
| 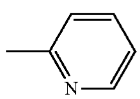 | 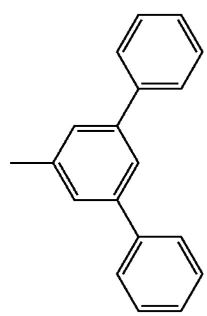 | compound 42-31 |
| 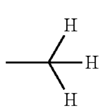 | 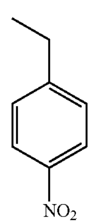 | compound 42-32 |

-continued
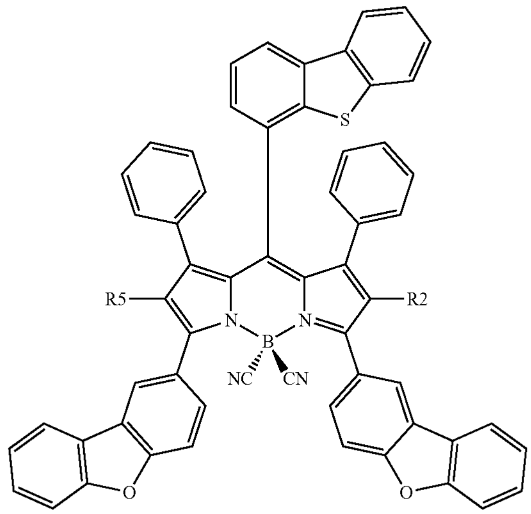
| R2, R5 | compound |
|---|---|
| —H | compound 43-1 |
| 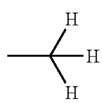 | compound 43-2 |
| —F | compound 43-3 |
| 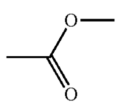 | compound 43-4 |
| 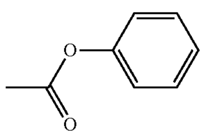 | compound 43-5 |
| —CN | compound 43-6 |
| 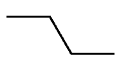 | compound 43-7 |
| 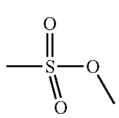 | compound 43-8 |
| 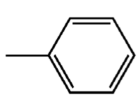 | compound 43-9 |
| 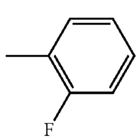 | compound 43-10 |

-continued
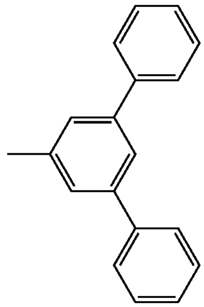 [SMILES: Cc1cc(-c2ccccc2)cc(-c2ccccc2)c1]
compound 43-11
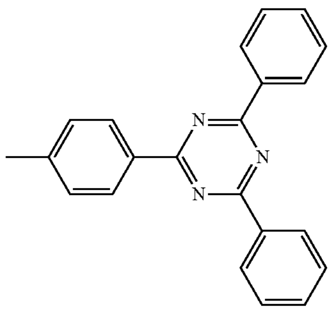 [SMILES: Cc1ccc(-c2nc(-c3ccccc3)nc(-c3ccccc3)n2)cc1]
compound 43-12
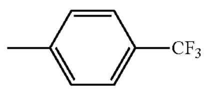
compound 43-13
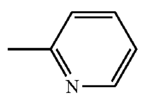
compound 43-14
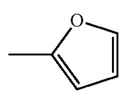
compound 43-15
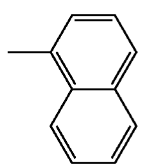
compound 43-16
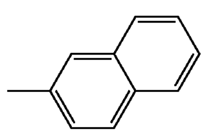
compound 43-17
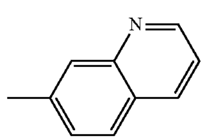
compound 43-18
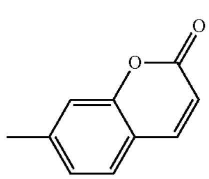
compound 43-19

-continued
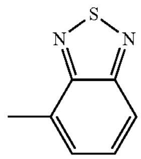
compound 43-20
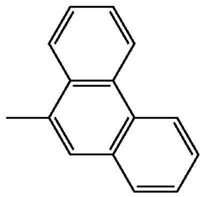
compound 43-21
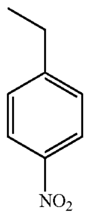
compound 43-22
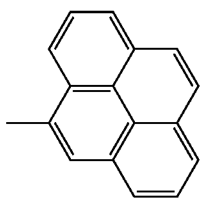 [SMILES: Cc1cc2cccc3ccc4cccc1c4c32]
compound 43-23
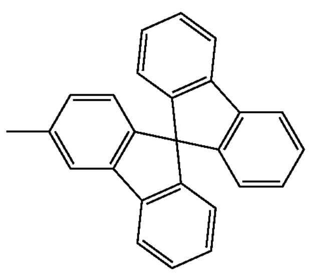 [SMILES: Cc1ccc2c(c1)-c1ccccc1C21c2ccccc2-c2ccccc21]
compound 43-24
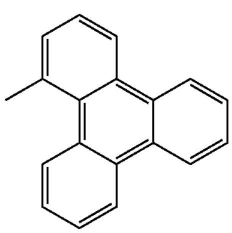 [SMILES: Cc1cccc2c3ccccc3c3ccccc3c12]
compound 43-25
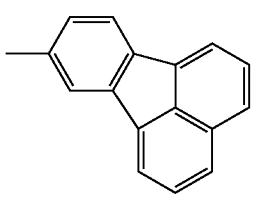 [SMILES: Cc1ccc2c(c1)-c1cccc3cccc-2c13]
compound 43-26

-continued
| R2 | R5 | compound |
| --- | --- | --- |
| —H | 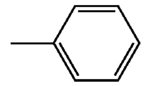 | compound 43-27 |
| 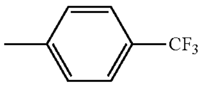  | 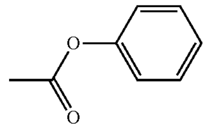  | compound 43-28 |
| —F | 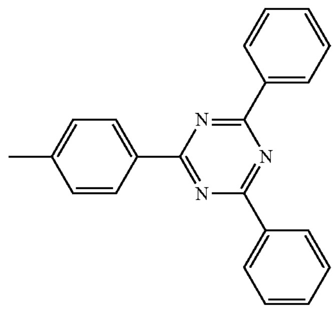  | compound 43-29 |
| —CN | 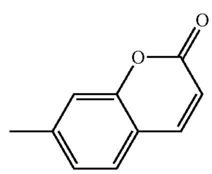  | compound 43-30 |
| 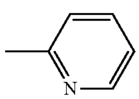  | 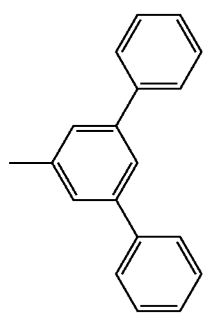 | compound 43-31 |
| 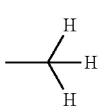  | 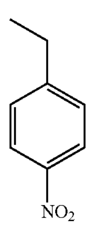  | compound 43-32 |

-continued
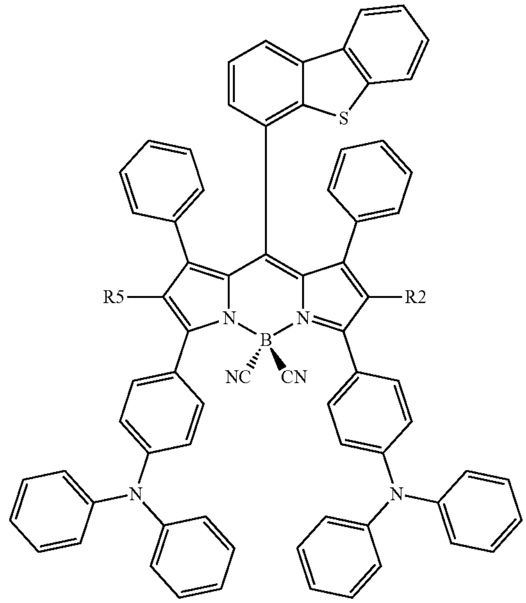
| R2, R5 | compound |
|---|---|
| —H | compound 44-1 |
| 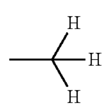 | compound 44-2 |
| —F | compound 44-3 |
| 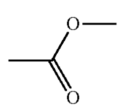 | compound 44-4 |
| 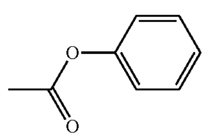 | compound 44-5 |
| —CN | compound 44-6 |
| 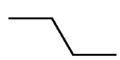 | compound 44-7 |
| 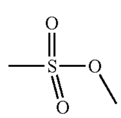 | compound 44-8 |
| 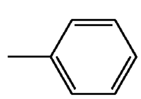 | compound 44-9 |
| 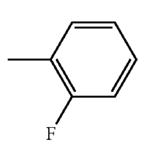 | compound 44-10 |

-continued
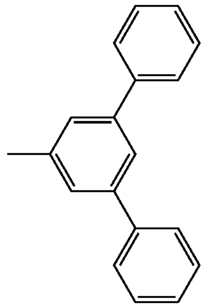 [SMILES: Cc1cc(-c2ccccc2)cc(-c2ccccc2)c1]
compound 44-11
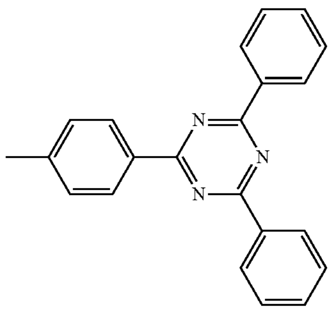 [SMILES: Cc1ccc(-c2nc(-c3ccccc3)nc(-c3ccccc3)n2)cc1]
compound 44-12
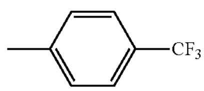
compound 44-13
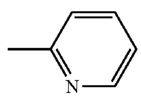
compound 44-14
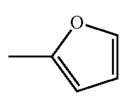
compound 44-15
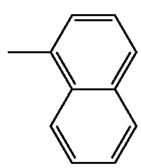
compound 44-16
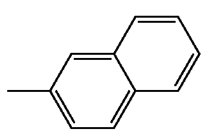
compound 44-17
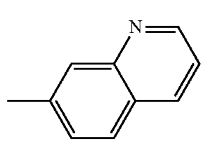
compound 44-18
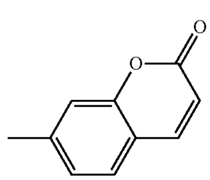
compound 44-19

-continued
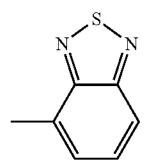
compound 44-20
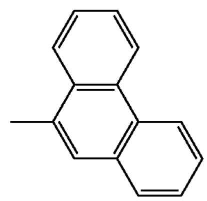
compound 44-21
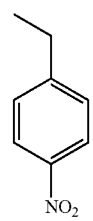
compound 44-22
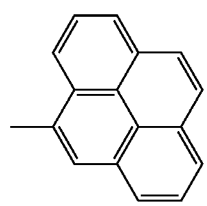 [SMILES: Cc1cc2cccc3ccc4cccc1c4c32]
compound 44-23
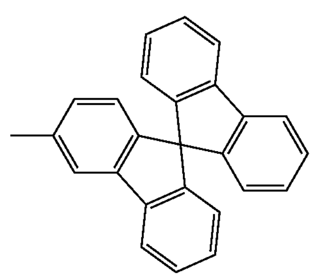 [SMILES: Cc1ccc2c(c1)-c1ccccc1C21c2ccccc2-c2ccccc21]
compound 44-24
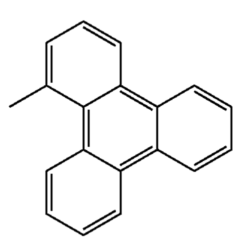 [SMILES: Cc1cccc2c3ccccc3c3ccccc3c12]
compound 44-25
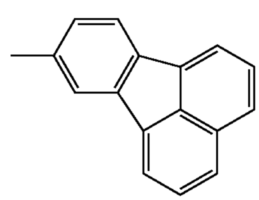 [SMILES: Cc1ccc2c(c1)-c1cccc3cccc-2c13]
compound 44-26

-continued
| R2 | R5 | compound |
|---|---|---|
| —H | 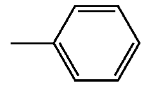 | compound 44-27 |
| 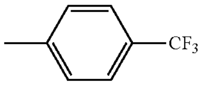 | 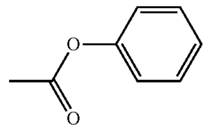 | compound 44-28 |
| —F | 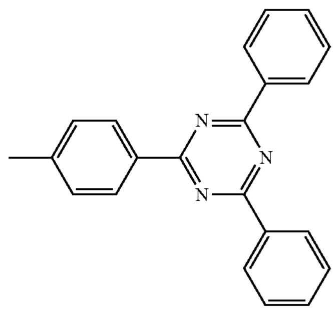 | compound 44-29 |
| —CN | 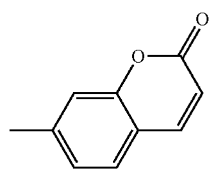 | compound 44-30 |
| 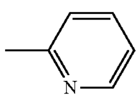 | 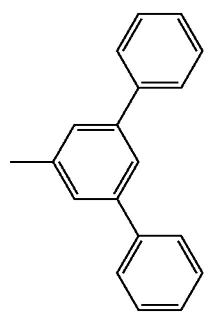 | compound 44-31 |
| 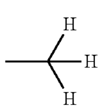 | 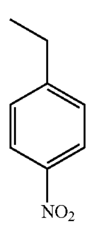 | compound 44-32 |

-continued
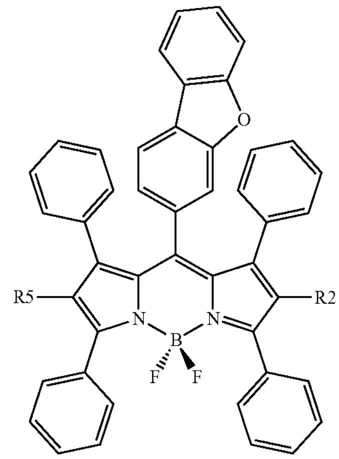
| R2, R5 | compound |
|---|---|
| —H | compound 45-1 |
| 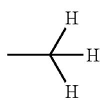 | compound 45-2 |
| —F | compound 45-3 |
| 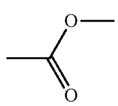 | compound 45-4 |
| 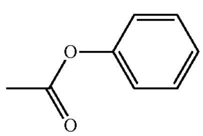 | compound 45-5 |
| —CN | compound 45-6 |
| 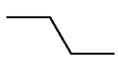 | compound 45-7 |
| 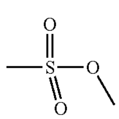 | compound 45-8 |
| 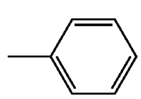 | compound 45-9 |
| 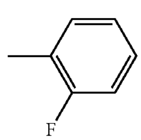 | compound 45-10 |

-continued
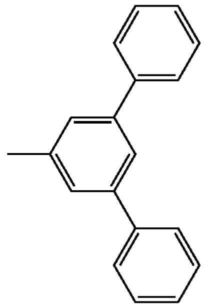 [SMILES: Cc1cc(-c2ccccc2)cc(-c2ccccc2)c1]
compound 45-11
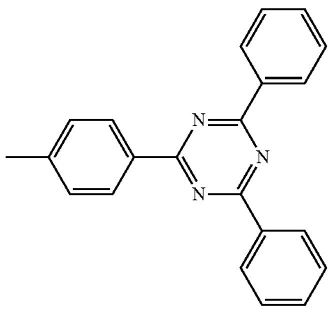 [SMILES: Cc1ccc(-c2nc(-c3ccccc3)nc(-c3ccccc3)n2)cc1]
compound 45-12
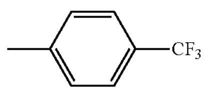
compound 45-13
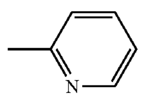
compound 45-14
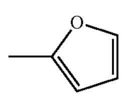
compound 45-15
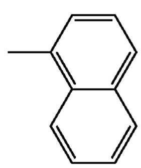
compound 45-16
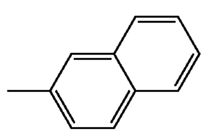
compound 45-17
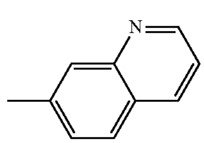
compound 45-18
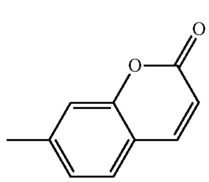
compound 45-19

-continued
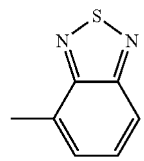
compound 45-20
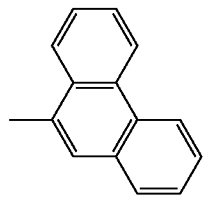
compound 45-21
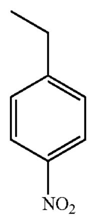
compound 45-22
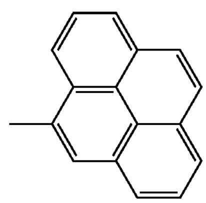 [SMILES: Cc1cc2cccc3ccc4cccc1c4c32]
compound 45-23
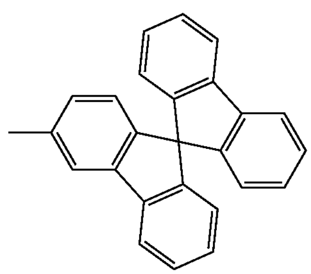 [SMILES: Cc1ccc2c(c1)-c1ccccc1C21c2ccccc2-c2ccccc21]
compound 45-24
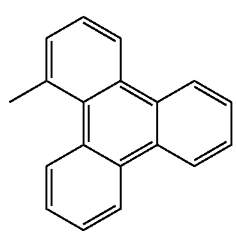 [SMILES: Cc1cccc2c3ccccc3c3ccccc3c12]
compound 45-25
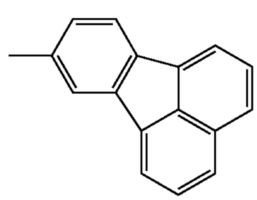 [SMILES: Cc1ccc2c(c1)-c1cccc3cccc-2c13]
compound 45-26

-continued
| R2 | R5 | compound |
| --- | --- | --- |
| —H | 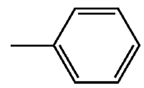 | compound 45-27 |
| 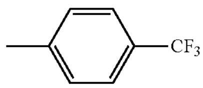 | 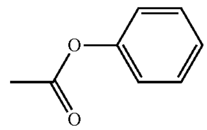 | compound 45-28 |
| —F | 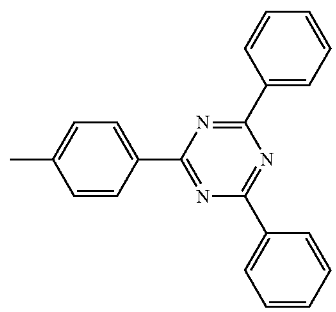 | compound 45-29 |
| —CN | 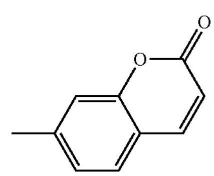 | compound 45-30 |
| 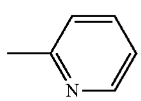 | 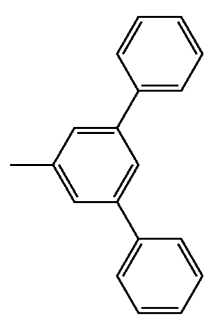 | compound 45-31 |
| 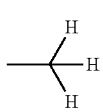 | 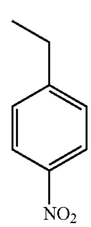 | compound 45-32 |

-continued
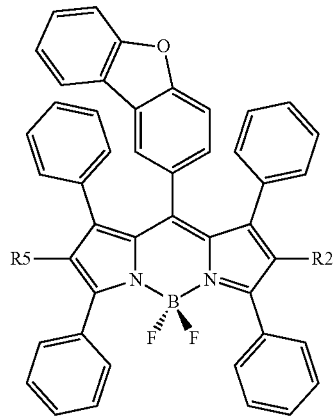
| R2, R5 | compound |
|---|---|
| —H | compound 46-1 |
| 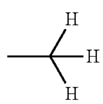 | compound 46-2 |
| —F | compound 46-3 |
| 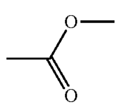 | compound 46-4 |
| 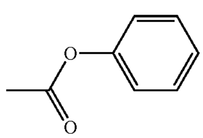 | compound 46-5 |
| —CN | compound 46-6 |
| 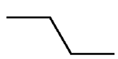 | compound 46-7 |
| 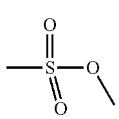 | compound 46-8 |
| 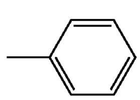 | compound 46-9 |
| 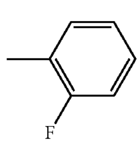 | compound 46-10 |

-continued
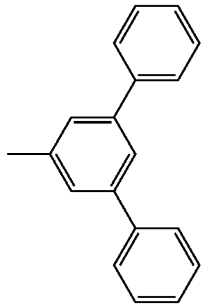 [SMILES: Cc1cc(-c2ccccc2)cc(-c2ccccc2)c1]
compound 46-11
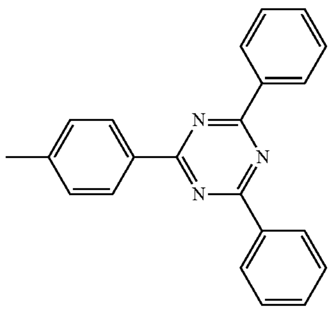 [SMILES: Cc1ccc(-c2nc(-c3ccccc3)nc(-c3ccccc3)n2)cc1]
compound 46-12
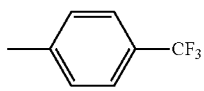
compound 46-13
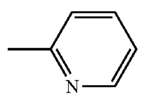
compound 46-14
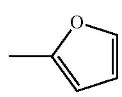
compound 46-15
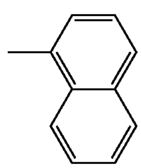
compound 46-16
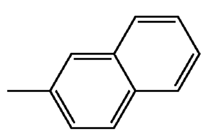
compound 46-17
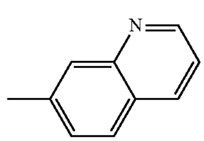
compound 46-18
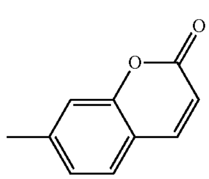
compound 46-19

-continued
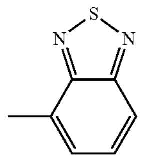
compound 46-20
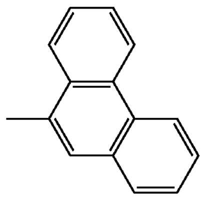
compound 46-21
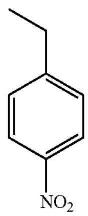
compound 46-22
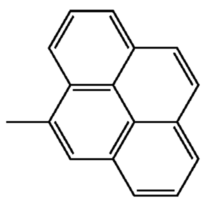 [SMILES: Cc1cc2cccc3ccc4cccc1c4c32]
compound 46-23
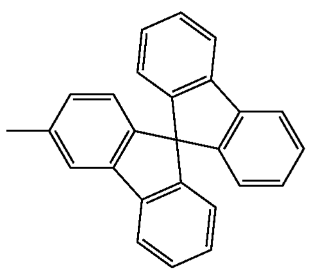 [SMILES: Cc1ccc2c(c1)-c1ccccc1C21c2ccccc2-c2ccccc21]
compound 46-24
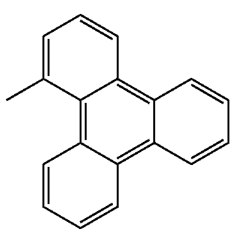 [SMILES: Cc1cccc2c3ccccc3c3ccccc3c12]
compound 46-25
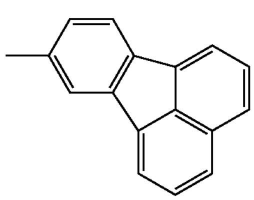 [SMILES: Cc1ccc2c(c1)-c1cccc3cccc-2c13]
compound 46-26

-continued
| R2 | R5 | compound |
|---|---|---|
| —H | 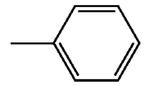 | compound 46-27 |
| 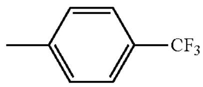 | 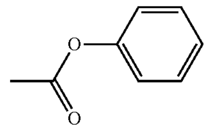 | compound 46-28 |
| —F | 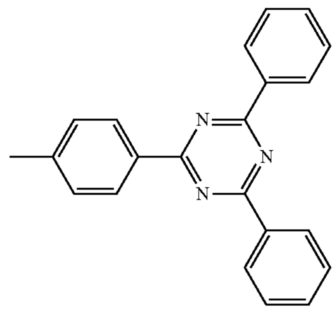 | compound 46-29 |
| —CN | 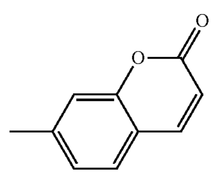 | compound 46-30 |
| 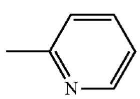 | 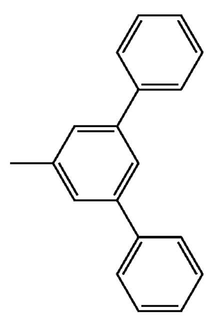 | compound 46-31 |
| 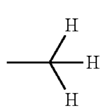 | 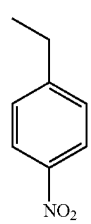 | compound 46-32 |

-continued
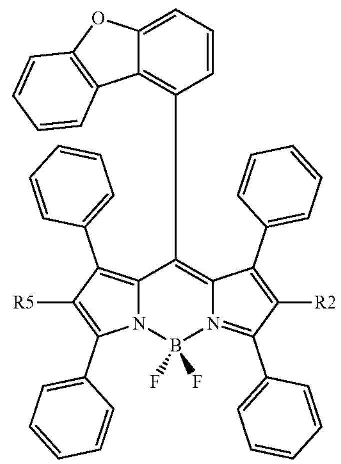
| R2, R5 | compound |
|---|---|
| —H | compound 47-1 |
| 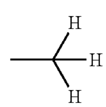 | compound 47-2 |
| —F | compound 47-3 |
| 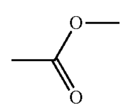 | compound 47-4 |
| 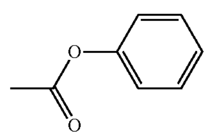 | compound 47-5 |
| —CN | compound 47-6 |
| 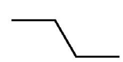 | compound 47-7 |
| 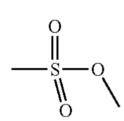 | compound 47-8 |
| 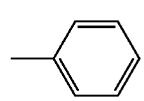 | compound 47-9 |
| 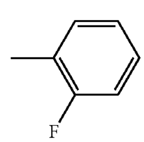 | compound 47-10 |

-continued
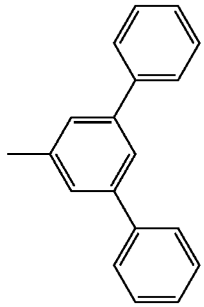 [SMILES: Cc1cc(-c2ccccc2)cc(-c2ccccc2)c1]
compound 47-11
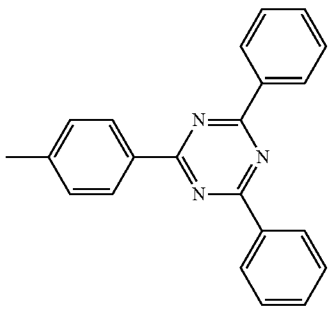 [SMILES: Cc1ccc(-c2nc(-c3ccccc3)nc(-c3ccccc3)n2)cc1]
compound 47-12
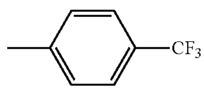
compound 47-13
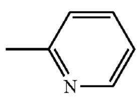
compound 47-14
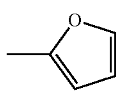
compound 47-15
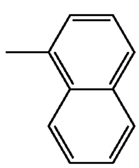
compound 47-16
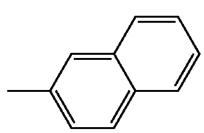
compound 47-17
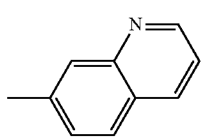
compound 47-18
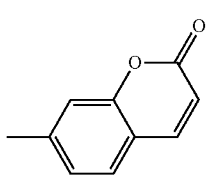
compound 47-19

-continued
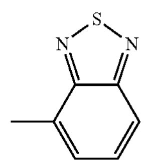
compound 47-20
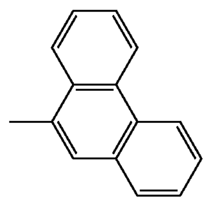
compound 47-21
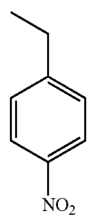
compound 47-22
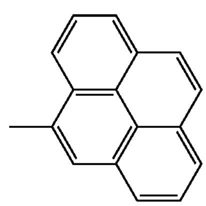 [SMILES: Cc1cc2cccc3ccc4cccc1c4c32]
compound 47-23
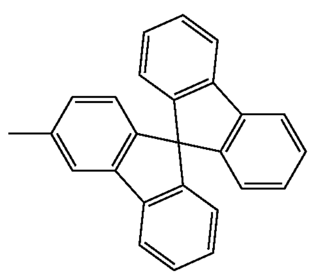 [SMILES: Cc1ccc2c(c1)-c1ccccc1C21c2ccccc2-c2ccccc21]
compound 47-24
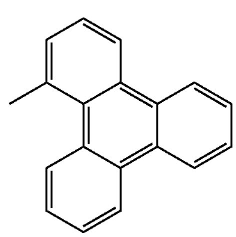 [SMILES: Cc1cccc2c3ccccc3c3ccccc3c12]
compound 47-25
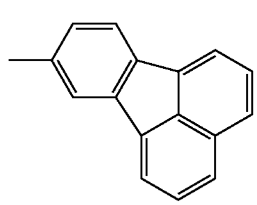 [SMILES: Cc1ccc2c(c1)-c1cccc3cccc-2c13]
compound 47-26

-continued
| R2 | R5 | compound |
|---|---|---|
| —H | 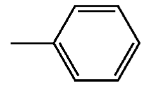 | compound 47-27 |
| 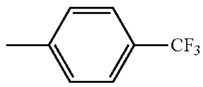 | 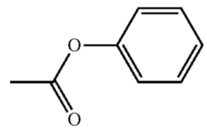 | compound 47-28 |
| —F | 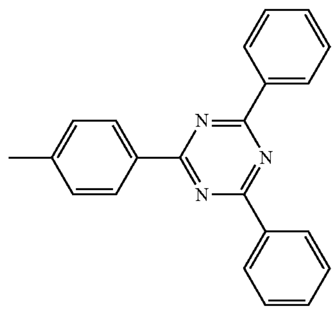 | compound 47-29 |
| —CN | 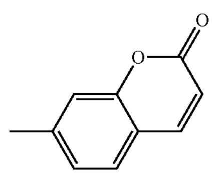 | compound 47-30 |
| 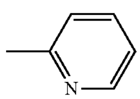 | 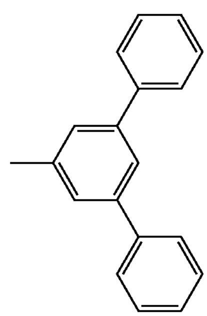 | compound 47-31 |
| 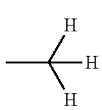 | 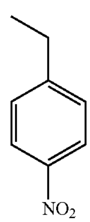 | compound 47-32 |

-continued
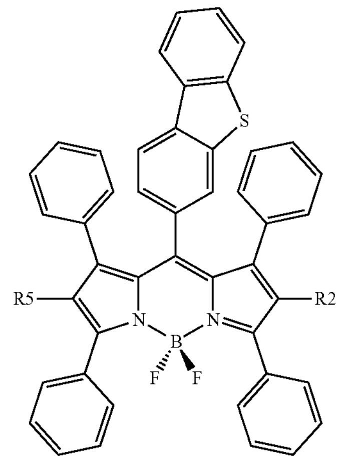
| R2, R5 | compound |
|---|---|
| —H | compound 48-1 |
| 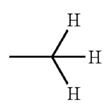 | compound 48-2 |
| —F | compound 48-3 |
| 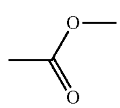 | compound 48-4 |
| 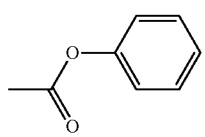 | compound 48-5 |
| —CN | compound 48-6 |
| 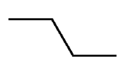 | compound 48-7 |
| 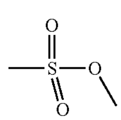 | compound 48-8 |
| 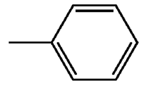 | compound 48-9 |
| 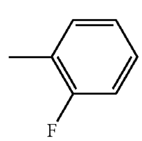 | compound 48-10 |

-continued
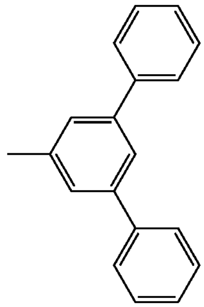 [SMILES: Cc1cc(-c2ccccc2)cc(-c2ccccc2)c1]
compound 48-11
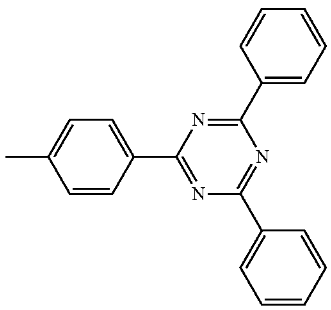 [SMILES: Cc1ccc(-c2nc(-c3ccccc3)nc(-c3ccccc3)n2)cc1]
compound 48-12
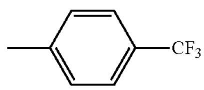
compound 48-13
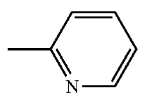
compound 48-14
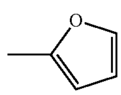
compound 48-15
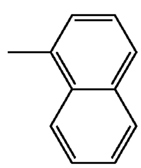
compound 48-16
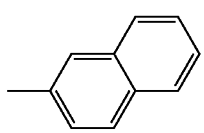
compound 48-17
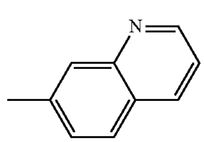
compound 48-18
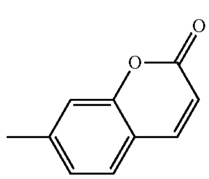
compound 48-19

-continued
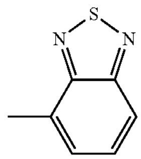
compound 48-20
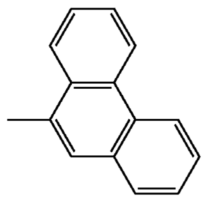
compound 48-21
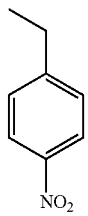
compound 48-22
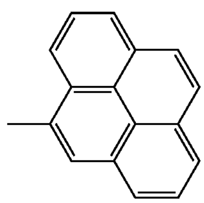 [SMILES: Cc1cc2cccc3ccc4cccc1c4c32]
compound 48-23
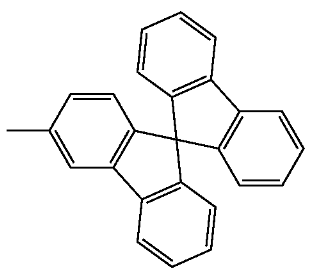 [SMILES: Cc1ccc2c(c1)-c1ccccc1C21c2ccccc2-c2ccccc21]
compound 48-24
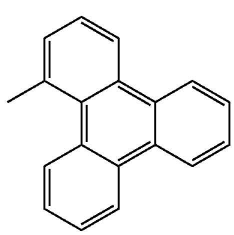 [SMILES: Cc1cccc2c3ccccc3c3ccccc3c12]
compound 48-25
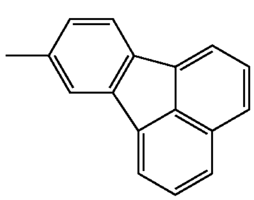 [SMILES: Cc1ccc2c(c1)-c1cccc3cccc-2c13]
compound 48-26

-continued
| R2 | R5 | compound |
| --- | --- | --- |
| —H | 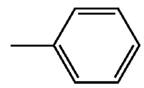 | compound 48-27 |
| 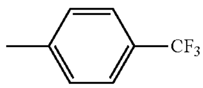 | 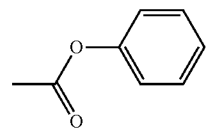 | compound 48-28 |
| —F | 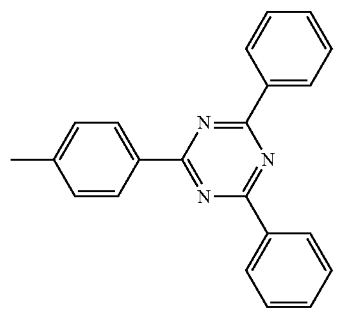 | compound 48-29 |
| —CN | 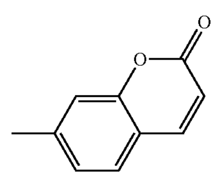 | compound 48-30 |
| 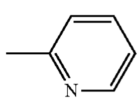 | 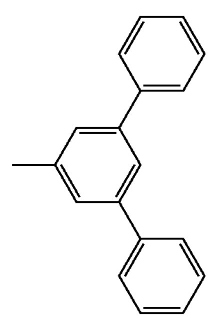 | compound 48-31 |
| 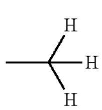 | 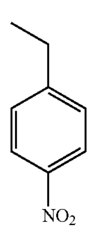 | compound 48-32 |

-continued
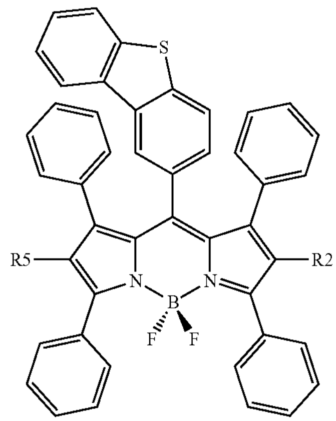
| R2, R5 | compound |
| --- | --- |
| —H | compound 49-1 |
| 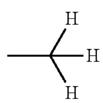 | compound 49-2 |
| —F | compound 49-3 |
| 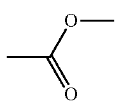 | compound 49-4 |
| 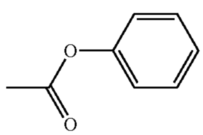 | compound 49-5 |
| —CN | compound 49-6 |
| 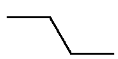 | compound 49-7 |
| 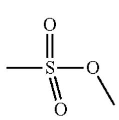 | compound 49-8 |
| 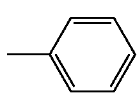 | compound 49-9 |
| 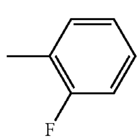 | compound 49-10 |

-continued
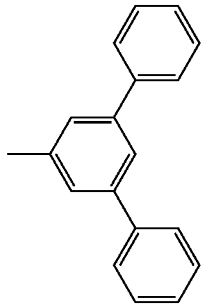 [SMILES: Cc1cc(-c2ccccc2)cc(-c2ccccc2)c1]
compound 49-11
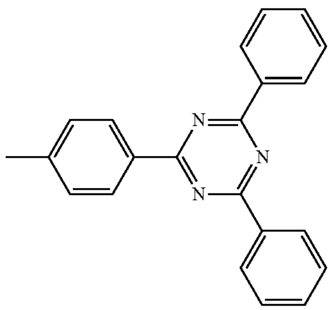 [SMILES: Cc1ccc(-c2nc(-c3ccccc3)nc(-c3ccccc3)n2)cc1]
compound 49-12
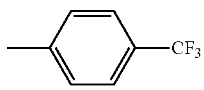
compound 49-13
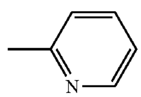
compound 49-14
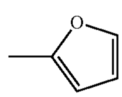
compound 49-15
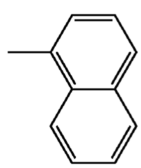
compound 49-16
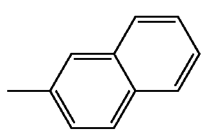
compound 49-17
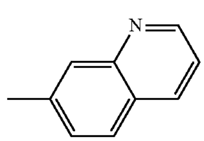
compound 49-18
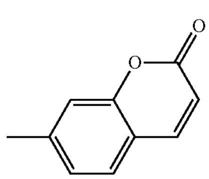
compound 49-19

-continued
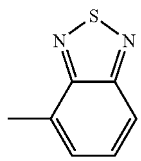
compound 49-20
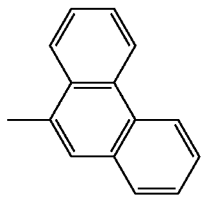
compound 49-21
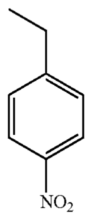
compound 49-22
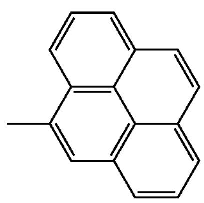 [SMILES: Cc1cc2cccc3ccc4cccc1c4c32]
compound 49-23
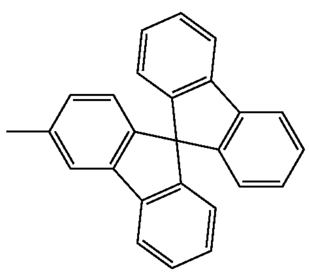 [SMILES: Cc1ccc2c(c1)-c1ccccc1C21c2ccccc2-c2ccccc21]
compound 49-24
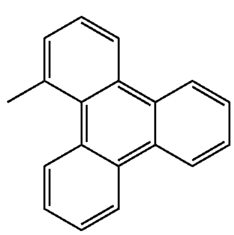 [SMILES: Cc1cccc2c3ccccc3c3ccccc3c12]
compound 49-25
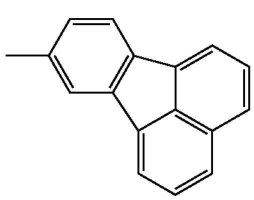 [SMILES: Cc1ccc2c(c1)-c1cccc3cccc-2c13]
compound 49-26

-continued
| R2 | R5 | compound |
|---|---|---|
| —H | 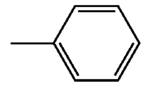 | compound 49-27 |
| 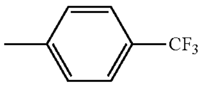 | 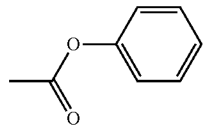 | compound 49-28 |
| —F | 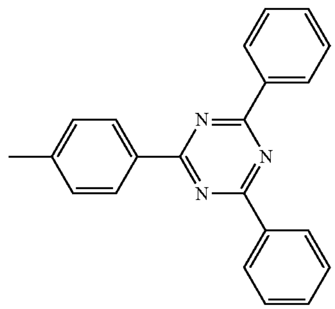 | compound 49-29 |
| —CN | 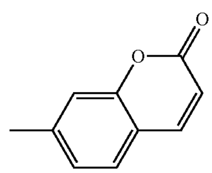 | compound 49-30 |
| 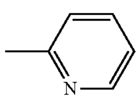 | 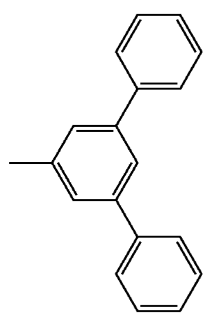 | compound 49-31 |
| 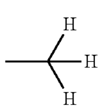 | 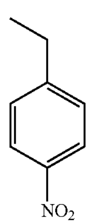 | compound 49-32 |

-continued
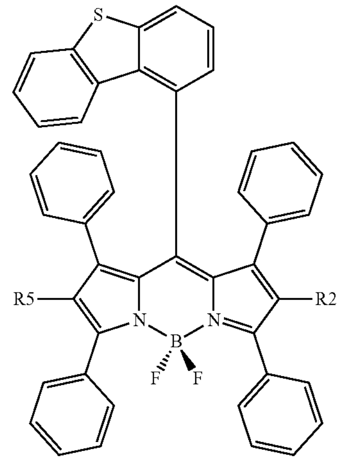
| R2, R5 | compound |
|---|---|
| —H | compound 50-1 |
| 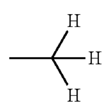 | compound 50-2 |
| —F | compound 50-3 |
| 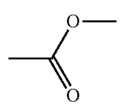 | compound 50-4 |
| 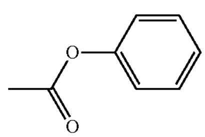 | compound 50-5 |
| —CN | compound 50-6 |
| 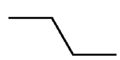 | compound 50-7 |
| 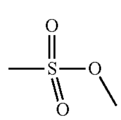 | compound 50-8 |
| 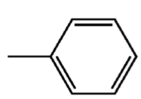 | compound 50-9 |
| 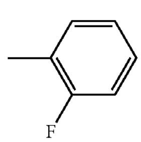 | compound 50-10 |

-continued
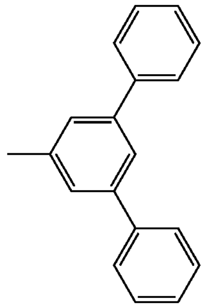 [SMILES: Cc1cc(-c2ccccc2)cc(-c2ccccc2)c1]
compound 50-11
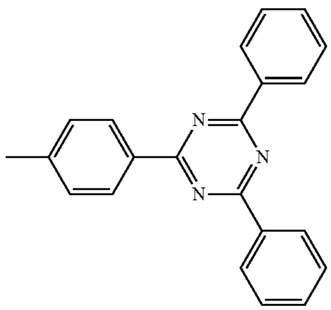 [SMILES: Cc1ccc(-c2nc(-c3ccccc3)nc(-c3ccccc3)n2)cc1]
compound 50-12
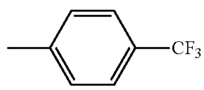
compound 50-13
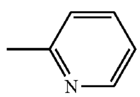
compound 50-14
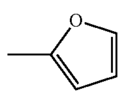
compound 50-15
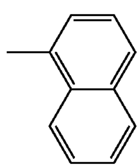
compound 50-16
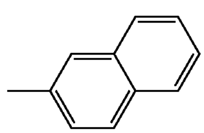
compound 50-17
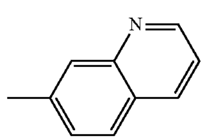
compound 50-18
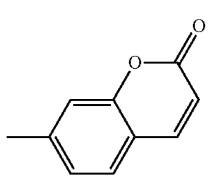
compound 50-19

-continued
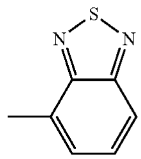
compound 50-20
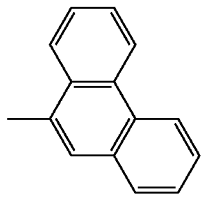
compound 50-21
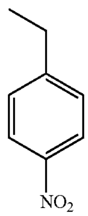
compound 50-22
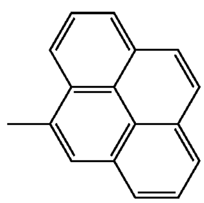 [SMILES: Cc1cc2cccc3ccc4cccc1c4c32]
compound 50-23
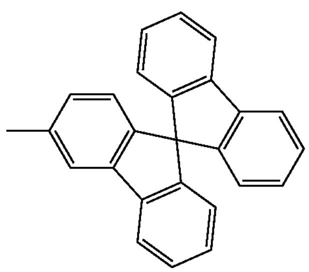 [SMILES: Cc1ccc2c(c1)-c1ccccc1C21c2ccccc2-c2ccccc21]
compound 50-24
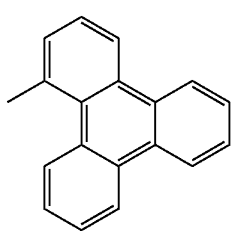 [SMILES: Cc1cccc2c3ccccc3c3ccccc3c12]
compound 50-25
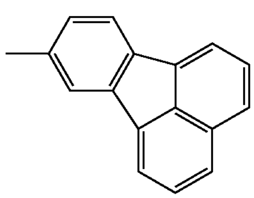 [SMILES: Cc1ccc2c(c1)-c1cccc3cccc-2c13]
compound 50-26

-continued
| R2 | R5 | compound |
| --- | --- | --- |
| —H | 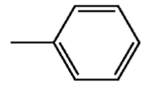 | compound 50-27 |
| 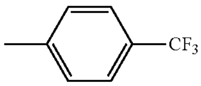 | 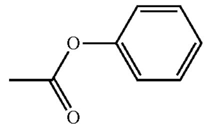 | compound 50-28 |
| —F | 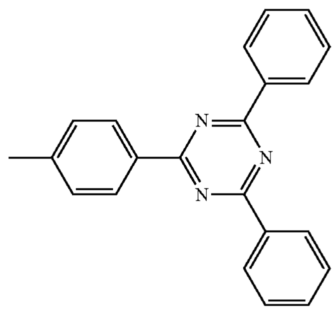 | compound 50-29 |
| —CN | 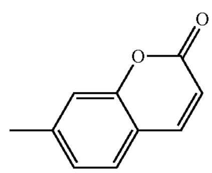 | compound 50-30 |
| 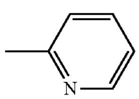 | 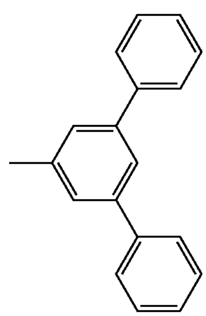 | compound 50-31 |
| 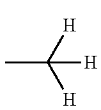 | 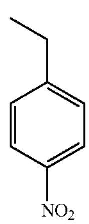 | compound 50-32 |

-continued

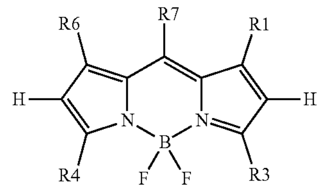

| R1, R6 | R3, R4 | R7 | | | | | |
|---|---|---|---|---|---|---|---|
| | | 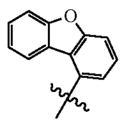 [SMILES: *c1cccc2oc3ccccc3c12] | 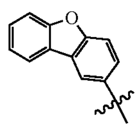 [SMILES: *c1ccc2oc3ccccc3c2c1] | 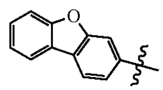 [SMILES: *c1ccc2c(c1)oc1ccccc12] | 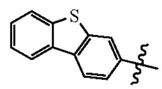 [SMILES: *c1ccc2c(c1)sc1ccccc12] | 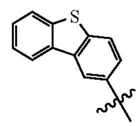 [SMILES: *c1ccc2sc3ccccc3c2c1] | 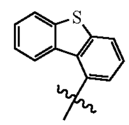 [SMILES: *c1cccc2sc3ccccc3c12] |
| 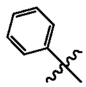 | 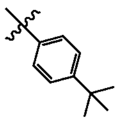 [SMILES: *c1ccc(C(C)(C)C)cc1] | compound 51-1 | compound 52-1 | compound 53-1 | compound 54-1 | compound 55-1 | compound 56-1 |
| | 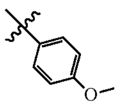 [SMILES: *c1ccc(OC)cc1] | compound 51-2 | compound 52-2 | compound 53-2 | compound 54-2 | compound 55-2 | compound 56-2 |
| | 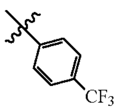 | compound 51-3 | compound 52-3 | compound 53-3 | compound 54-3 | compound 55-3 | compound 56-3 |
| | 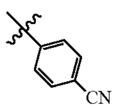 [SMILES: *c1ccc(C#N)cc1] | compound 51-4 | compound 52-4 | compound 53-4 | compound 54-4 | compound 55-4 | compound 56-4 |
| 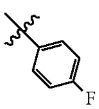 [SMILES: *c1ccc(F)cc1] | 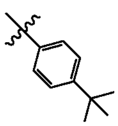 [SMILES: *c1ccc(C(C)(C)C)cc1] | compound 51-5 | compound 52-5 | compound 53-5 | compound 54-5 | compound 55-5 | compound 56-5 |
| | 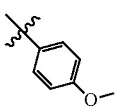 [SMILES: *c1ccc(OC)cc1] | compound 51-6 | compound 52-6 | compound 53-6 | compound 54-6 | compound 55-6 | compound 56-6 |
| | 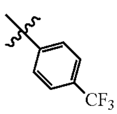 | compound 51-7 | compound 52-7 | compound 53-7 | compound 54-7 | compound 55-7 | compound 56-7 |
| | 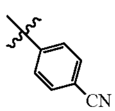 [SMILES: *c1ccc(C#N)cc1] | compound 51-8 | compound 52-8 | compound 53-8 | compound 54-8 | compound 55-8 | compound 56-8 |
| 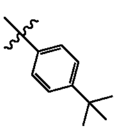 [SMILES: *c1ccc(C(C)(C)C)cc1] | 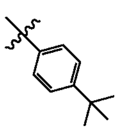 [SMILES: *c1ccc(C(C)(C)C)cc1] | compound 51-9 | compound 52-9 | compound 53-9 | compound 54-9 | compound 55-9 | compound 56-9 |
| | 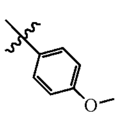 [SMILES: *c1ccc(OC)cc1] | compound 51-10 | compound 52-10 | compound 53-10 | compoun d54-10 | compound 55-10 | compound 56-10 |

-continued

| | | | | | | |
|---|---|---|---|---|---|---|
| 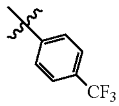 [SMILES: *c1ccc(C(F)(F)F)cc1] | compound 51-11 | compound 52-11 | compound 53-11 | compound 54-11 | compound 55-11 | compound 56-11 |
| 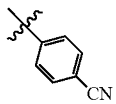 [SMILES: *c1ccc(C#N)cc1] | compound 51-12 | compound 52-12 | compound 53-12 | compound 54-12 | compound 55-12 | compound 56-12 |

9. A color conversion film comprising:

a resin matrix; and the compound represented by Chemical Formula 1 of claim 1 dispersed into the resin matrix.

10. A backlight unit comprising the color conversion film of claim 9.

11. A display apparatus comprising the backlight unit of claim 10.

* * * * *